(12) United States Patent
Lee et al.

(10) Patent No.: US 12,256,057 B2
(45) Date of Patent: Mar. 18, 2025

(54) POSITIONING, STABILISING, AND INTERFACING STRUCTURES AND SYSTEM INCORPORATING SAME

(71) Applicant: RESMED ASIA PTE. LTD., Singapore (SG)

(72) Inventors: Deng Siong Lee, Singapore (SG); Nathalie Aurelie Champier Charpentier, Singapore (SG); Mohankumar Krishnan Valiyambath, Singapore (SG); Robin Yew, Singapore (SG); Muhammad Adil Bin Abdul Halim, Singapore (SG); Amit Arunchandra Jadhav, Singapore (SG); Wai Hoong Leng, Singapore (SG); Beng Hai Tan, Singapore (SG); Barry Eng Keong Tay, Singapore (SG); Bangzheng Tan, Singapore (SG); Han Seong Chew, Singapore (SG); Ian Law, Sydney (AU); Stewart Joseph Wagner, Hawkesbury (AU); Aaron Samuel Davidson, Sydney (AU)

(73) Assignee: ResMed Asia Pte. Ltd., Singapore (SG)

( * ) Notice: Subject to any disclaimer, the term of this patent is extended or adjusted under 35 U.S.C. 154(b) by 115 days.

(21) Appl. No.: 17/789,722

(22) PCT Filed: Dec. 30, 2020

(86) PCT No.: PCT/SG2020/050793
§ 371 (c)(1),
(2) Date: Jun. 28, 2022

(87) PCT Pub. No.: WO2021/137766
PCT Pub. Date: Jul. 8, 2021

(65) Prior Publication Data
US 2023/0049355 A1     Feb. 16, 2023

Related U.S. Application Data

(63) Continuation-in-part of application No. 16/865,480, filed on May 4, 2020, now Pat. No. 11,243,405, and
(Continued)

(30) Foreign Application Priority Data

Dec. 31, 2019    (SG) ........................... 10201914125V
Dec. 31, 2019    (SG) ........................... 10201914128Q
(Continued)

(51) Int. Cl.
*H04N 13/344*     (2018.01)
*B08B 7/00*     (2006.01)
*D06M 11/46*     (2006.01)

(52) U.S. Cl.
CPC ......... *H04N 13/344* (2018.05); *B08B 7/0057* (2013.01); *D06M 11/46* (2013.01)

(58) Field of Classification Search
CPC ..... H04N 13/344; B08B 7/0057; D06M 11/46
See application file for complete search history.

(56) References Cited

U.S. PATENT DOCUMENTS 4,782,832 A    11/1988   Trimble et al.
4,913,135 A    4/1990   Mattingly
(Continued)

FOREIGN PATENT DOCUMENTS

CN     201826192 U    5/2011
CN     105148374      12/2015
(Continued)

OTHER PUBLICATIONS

Del Campo translation of WO-2011070198 Dec. 11, 2011 (Year: 2011).*
(Continued)

*Primary Examiner* — Zaihan Jiang
(74) *Attorney, Agent, or Firm* — Nixon & Vanderhye P.C.

(57) ABSTRACT

A head-mounted display system includes a head mounted display unit with a display and a positioning and stabilising structure configured to hold the head-mounted display unit in an operable position on the user's head in use. The positioning and stabilizing structure includes headgear with at least one strap configured to contact the user's head, in use. The head mounted display unit and at least a portion of the positioning and stabilizing structure are formed from a one piece construction of textile material.

25 Claims, 163 Drawing Sheets

Related U.S. Application Data a continuation-in-part of application No. 16/865,526, filed on May 4, 2020, now Pat. No. 11,262,589.

(30) Foreign Application Priority Data

| | | |
|---|---|---|
| Dec. 31, 2019 | (SG) | 10201914129W |
| Dec. 31, 2019 | (SG) | 10201914131Q |
| Mar. 23, 2020 | (SG) | 10201914123U |
| Mar. 27, 2020 | (AU) | 2020900953 |
| May 5, 2020 | (AU) | 2020901432 |
| May 6, 2020 | (AU) | 2020901437 |
| Jul. 20, 2020 | (AU) | 2020902514 |
| Aug. 26, 2020 | (AU) | 2020903055 |
| Aug. 31, 2020 | (AU) | 2020903112 |
| Sep. 22, 2020 | (AU) | 2020903395 |
| Sep. 29, 2020 | (AU) | 2020903502 |
| Oct. 7, 2020 | (AU) | 2020903638 |
| Oct. 8, 2020 | (WO) | PCT/AU2020/051081 |
| Oct. 28, 2020 | (WO) | PCT/AU2020/051158 |

(56) References Cited

U.S. PATENT DOCUMENTS

| | | |
|---|---|---|
| 4,944,310 A | 7/1990 | Sullivan |
| 5,538,000 A | 7/1996 | Rudolph |
| 5,671,037 A | 9/1997 | Ogasawara et al. |
| 5,687,715 A | 11/1997 | Landis |
| 5,793,835 A | 8/1998 | Blanck |
| 5,832,926 A | 11/1998 | Towlen |
| 6,532,959 B1 | 3/2003 | Berthon-Jones |
| 6,581,594 B1 | 6/2003 | Drew et al. |
| 7,120,939 B1 | 10/2006 | Howard |
| 7,390,286 B1 | 6/2008 | Edgeton |
| 7,866,944 B2 | 1/2011 | Kenyon et al. |
| 8,537,200 B2 | 9/2013 | Zhang et al. |
| 8,636,479 B2 | 1/2014 | Kenyon et al. |
| 8,638,014 B2 | 1/2014 | Sears et al. |
| 8,733,349 B2 | 5/2014 | Bath et al. |
| 8,950,404 B2 | 2/2015 | Formica |
| 9,703,103 B2 | 7/2017 | Araki |
| 9,731,090 B2 | 8/2017 | Ovizinsky et al. |
| 9,878,118 B2 | 1/2018 | Formica et al. |
| 9,901,132 B2 | 2/2018 | Hairston |
| 9,981,104 B1 | 5/2018 | Groll |
| 9,989,998 B1 | 6/2018 | Yee |
| 10,078,349 B1 | 9/2018 | Morris et al. |
| 10,133,305 B1 | 11/2018 | Sulllivan et al. |
| 10,261,555 B1 | 4/2019 | Cooper et al. |
| 10,470,512 B1 | 11/2019 | Yee |
| 10,496,130 B1 | 12/2019 | Yee |
| 10,675,428 B2 | 6/2020 | Guney |
| 10,739,600 B1 | 8/2020 | Yee |
| 10,761,567 B2 | 9/2020 | Ellis et al. |
| 10,860,100 B2 | 12/2020 | Osterhout et al. |
| 11,169,384 B2 | 11/2021 | Law |
| 11,262,589 B2 | 3/2022 | Law et al. |
| 11,395,895 B2 | 7/2022 | Gibson |
| 11,517,700 B2 | 12/2022 | Dunn |
| 11,547,827 B2 | 1/2023 | Barlow |
| 11,565,068 B2* | 1/2023 | Wells ............ A61M 16/0622 |
| 11,574,472 B2* | 2/2023 | Herzberg ............ G06V 20/20 |
| 11,583,447 B2* | 2/2023 | Woermann ............ A61F 9/027 |
| 11,598,967 B2* | 3/2023 | Law .................. G02B 27/028 |
| 11,619,821 B2* | 4/2023 | Araki .................. G06F 1/1605 |
| | | 359/630 |
| 11,686,948 B2* | 6/2023 | Law .................. G02B 27/0176 |
| | | 345/8 |
| 2004/0058780 A1 | 3/2004 | Edgeton |
| 2004/0097839 A1 | 5/2004 | Epley |
| 2006/0118117 A1 | 6/2006 | Berthon-Jones |
| 2008/0027400 A1* | 1/2008 | Harding ............ A61M 25/0097 |
| | | 604/265 |
| 2009/0044808 A1 | 2/2009 | Guney et al. |
| 2009/0050156 A1 | 2/2009 | Ng et al. |
| 2009/0173343 A1 | 7/2009 | Omura |
| 2009/0180194 A1 | 7/2009 | Yamaguchi |
| 2010/0000534 A1 | 1/2010 | Kooij et al. |
| 2011/0247628 A1 | 10/2011 | Ho |
| 2014/0026890 A1* | 1/2014 | Haskard ............ A61M 16/0683 |
| | | 128/207.11 |
| 2014/0053844 A1 | 2/2014 | Rummery |
| 2014/0109911 A1 | 4/2014 | Asvadi et al. |
| 2014/0209098 A1 | 7/2014 | Dunn et al. |
| 2014/0296060 A1* | 10/2014 | Chen .................. B01D 53/885 |
| | | 502/159 |
| 2015/0128953 A1 | 5/2015 | Formica |
| 2015/0352308 A1 | 12/2015 | Cullen |
| 2016/0044981 A1 | 2/2016 | Frank et al. |
| 2016/0045701 A1 | 2/2016 | Arcilla et al. |
| 2016/0054570 A1 | 2/2016 | Bosveld et al. |
| 2016/0082214 A1 | 3/2016 | Barlow |
| 2016/0082217 A1 | 3/2016 | McLaren |
| 2016/0106945 A1 | 4/2016 | Swift |
| 2016/0140887 A1 | 5/2016 | Kim |
| 2016/0216512 A1 | 7/2016 | Miller et al. |
| 2016/0235875 A1 | 8/2016 | Schmidt et al. |
| 2016/0261300 A1 | 9/2016 | Fei et al. |
| 2017/0017085 A1* | 1/2017 | Araki .................. G02B 27/028 |
| 2017/0021121 A1 | 1/2017 | Guney |
| 2017/0185140 A1 | 1/2017 | Yen |
| 2017/0049983 A1 | 2/2017 | Ellis |
| 2017/0168303 A1 | 6/2017 | Petrov |
| 2017/0189636 A1 | 7/2017 | Gibson |
| 2017/0242262 A1 | 8/2017 | Fuchs et al. |
| 2017/0261656 A1 | 9/2017 | Kim et al. |
| 2017/0281893 A1 | 10/2017 | Kwok et al. |
| 2017/0319806 A1 | 11/2017 | Teller et al. |
| 2017/0326320 A1 | 11/2017 | Baigent et al. |
| 2017/0337737 A1 | 11/2017 | Edwards et al. |
| 2017/0367423 A1 | 12/2017 | Reitz et al. |
| 2018/0055202 A1 | 3/2018 | Miller et al. |
| 2018/0056023 A1 | 3/2018 | Han |
| 2018/0095497 A1 | 4/2018 | Hsu et al. |
| 2018/0095498 A1 | 4/2018 | Raffle et al. |
| 2018/0239430 A1 | 8/2018 | Tadi |
| 2018/0256845 A1 | 9/2018 | Gibson et al. |
| 2018/0296786 A1 | 10/2018 | Barlow |
| 2018/0307282 A1 | 10/2018 | Allin et al. |
| 2018/0335632 A1 | 11/2018 | Cho et al. |
| 2018/0338130 A1 | 11/2018 | Miller et al. |
| 2018/0364491 A1 | 12/2018 | Park et al. |
| 2019/0009045 A1 | 1/2019 | Bernard |
| 2019/0070379 A1 | 3/2019 | Lockhart et al. |
| 2019/0075689 A1 | 3/2019 | Selvakumar et al. |
| 2019/0091431 A1 | 3/2019 | Formica et al. |
| 2019/0243145 A1 | 8/2019 | Ellis et al. |
| 2019/0243414 A1 | 8/2019 | Bae et al. |
| 2019/0258061 A1 | 8/2019 | Solomon |
| 2019/0258065 A1 | 8/2019 | Yun et al. |
| 2019/0290878 A1 | 9/2019 | Romagnoli et al. |
| 2019/0333480 A1 | 10/2019 | Lang |
| 2019/0339736 A1 | 11/2019 | Chang |
| 2019/0351172 A1 | 11/2019 | Formica |
| 2020/0033601 A1 | 1/2020 | Magrath et al. |
| 2020/0042035 A1 | 2/2020 | Chen et al. |
| 2020/0089007 A1 | 3/2020 | Maric |
| 2020/0159040 A1 | 5/2020 | Kiritz |
| 2020/0233453 A1* | 7/2020 | Hatfield .................. G06F 1/163 |
| 2020/0353196 A1 | 11/2020 | Cullen et al. |
| 2021/0041706 A1 | 2/2021 | Hatfield et al. |
| 2021/0069442 A1 | 3/2021 | Baigent |
| 2021/0080996 A1 | 3/2021 | Hudman |
| 2021/0085908 A1 | 3/2021 | Dunn |
| 2021/0121272 A1* | 4/2021 | Gad .................. A61C 13/04 |
| 2021/0205563 A1 | 7/2021 | Mah |
| 2021/0263323 A1 | 8/2021 | Ellis |
| 2021/0302748 A1 | 9/2021 | Law |
| 2021/0302749 A1 | 9/2021 | Law |
| 2021/0302750 A1 | 9/2021 | Law |
| 2022/0176055 A1 | 6/2022 | Eves et al. |

(56) References Cited

U.S. PATENT DOCUMENTS

| | | | |
|---|---|---|---|
| 2022/0218934 A1 | 7/2022 | Ozolins | |
| 2023/0050356 A1 | 2/2023 | Lee et al. | |
| 2023/0106307 A1 | 4/2023 | Wells et al. | |

FOREIGN PATENT DOCUMENTS

| | | | | |
|---|---|---|---|---|
| CN | 205720878 U | | 11/2016 | |
| CN | 205958850 U | | 2/2017 | |
| CN | 106802484 A | | 6/2017 | |
| CN | 106842577 A | | 6/2017 | |
| CN | 206657145 U | | 11/2017 | |
| CN | 107995957 A | | 5/2018 | |
| CN | 209417425 U | | 9/2019 | |
| EP | 3 287 865 A2 | | 2/2018 | |
| EP | 3 848 078 A1 | | 7/2021 | |
| JP | 2012-511341 A | | 5/2012 | |
| JP | 2014-142654 A | | 8/2014 | |
| JP | 2014-533185 A | | 12/2014 | |
| JP | 2014-534030 A | | 12/2014 | |
| JP | 2015-522381 A | | 8/2015 | |
| JP | 2016-503699 A | | 2/2016 | |
| JP | 2019-129484 A | | 8/2019 | |
| KR | 10-2014-0066258 | | 5/2014 | |
| KR | 10-2017-0037355 | | 4/2017 | |
| KR | 10-2018-0136222 | | 12/2018 | |
| TW | 233859 | | 11/1994 | |
| WO | WO 98/004310 A1 | | 2/1998 | |
| WO | WO 98/034665 A1 | | 8/1998 | |
| WO | WO 2000/078381 A1 | | 12/2000 | |
| WO | WO 2004/073778 A1 | | 9/2004 | |
| WO | WO 2005/063328 A1 | | 7/2005 | |
| WO | WO 2006/074513 A1 | | 7/2006 | |
| WO | WO 2006/130903 A1 | | 12/2006 | |
| WO | WO 2009/052560 A1 | | 4/2009 | |
| WO | WO-2009118552 A1 | * | 10/2009 | ............... B05D 1/60 |
| WO | 2010/073142 A1 | | 7/2010 | |
| WO | WO 2010/135785 A1 | | 12/2010 | |
| WO | WO-2011070198 | * | 12/2011 | |
| WO | 2012/027792 A1 | | 3/2012 | |
| WO | WO 2012/171072 A1 | | 12/2012 | |
| WO | WO 2013/020167 A1 | | 2/2013 | |
| WO | 2013/049248 | | 4/2014 | |
| WO | 2014/082023 A1 | | 5/2014 | |
| WO | 2017/185140 A1 | | 11/2017 | |
| WO | WO 2018/053509 A1 | | 3/2018 | |
| WO | 2018/064712 A2 | | 4/2018 | |
| WO | WO 2018/067421 A1 | | 4/2018 | |
| WO | 2018/179094 A1 | | 10/2018 | |
| WO | 2018/217366 A1 | | 11/2018 | |
| WO | WO 2019/190448 A1 | | 10/2019 | |
| WO | 2019/212591 | | 11/2019 | |
| WO | WO-2021041871 | * | 8/2020 | |
| WO | 2022/221907 A1 | | 10/2022 | |

OTHER PUBLICATIONS

"*Respiratory Physiology*", by John B. West, Lippincott Williams & Wilkins, 9$^{th}$ edition published 2012 (8 pages).
So Clean® 2 "Fast and Easy Sleep Equipment Maintenance" User Manual, Copyright 2011-2019 (28 pages).
International Search Report and Written Opinion dated Apr. 6, 2021 issued in International Application No. PCT/SG2020/050793 (21 pages).
International Search Report and Written Opinion dated Jun. 3, 2021 issued in International Application No. PCT/SG2020/050792 (24 pages).
Written Opinion of the International Preliminary Examining Authority dated Jan. 1, 2022 issued in International Application No. PCT/SG2020/050792 (13 pages).
Notice of Allowance mailed Oct. 25, 2021 issued in U.S. Appl. No. 16/865,526 (12 pages).
Office Action Mailed May 14, 2021 in U.S. Appl. No. 16/865,526, 23 pages.
Office Action mailed Apr. 8, 2021 in U.S. Appl. No. 17/082,071, 25 pages.
Notification of Transmittal of the International Search Report and the Written Opinion of the International Search Authority mailed Feb. 4, 2021 in International Application No. PCT/AU2020/051081, 7 pages.
Written Opinion of the International Search Authority mailed Feb. 4, 2021 in International Application No. PCT/AU2020/051081, 8 pages.
Notification of Transmittal of the International Search Report and the Written Opinion of the International Search Authority mailed Dec. 24, 2020 in International Application No. PCT/AU2020/051158, 9 pages.
Written Opinion of the International Search Authority mailed Dec. 24, 2020 in International Application No. PCT/AU2020/051158, 10 pages.
Office Action Mailed Dec. 31, 2020 in U.S. Appl. No. 17/082,071, 17 pages.
Office Action dated Dec. 22, 2021 issued in U.S. Appl. No. 17/498,808 (26 pages).
Office Action dated Mar. 29, 2022 issued in U.S. Appl. No. 17/498,808 (22 pages).
Office Action and Search Report dated Jan. 31, 2023 issued in Malaysian Application No. PI2022005337 (3 pages).
Extended European Search Report dated Jul. 5, 2023 issued in European Application No. 20908855.8 (7 pages).
Office Action dated Mar. 20, 2023 issued in Japanese Application No. 2022-558257 with English translation (6 pages).
Office Action dated May 12, 2023 issued in Taiwanese Application No. 111103857 with English translation (8 pages).
Office Action dated May 18, 2023 issued in U.S. Appl. No. 18/100,676 (21 pages).
Notice of Allowance dated Jun. 2, 2023 issued in Taiwanese Application No. 110131602 (3 pages).
Office Action dated Jun. 14, 2023 issued in U.S. Appl. No. 17/789,711 (17 pages).
Notice of Allowance dated Sep. 20, 2023 issued in U.S. Appl. No. 18/100,676 (13 pages).
Office Action dated May 2, 2022 issued in Korean Application No. 10-2022-7001969 with English translation (34 pages).
Office Action dated May 31, 2022 issued in Chinese Application No. 202080038956.4 with English translation (8 pages).
International Preliminary Report on Patentability dated Jul. 5, 2022 issued in International Application No. PCT/SG2020/050793 (12 pages).
Office Action dated Feb. 3, 2023 issued in U.S. Appl. No. 17/789,711 (14 pages).
Notice of Allowance dated Jan. 19, 2023 issued in U.S. Appl. No. 17/498,808 (9 pages).
Notice of Allowance dated Jan. 25, 2024 issued in U.S. Appl. No. 18/133,711 citing U.S. Pat. No. 8,553,910 and U.S. Pat. No. 10,130,785 (10 pages).
Office Action dated Mar. 25, 2024 issued in U.S. Appl. No. 18/263,303 citing U.S. Pat. No. 10,754,175 B2 (15 pages).

* cited by examiner

Relatively Large Positive Curvature

Relatively Small Positive Curvature

Zero Curvature

Relatively Small Negative Curvature

Relatively Large Negative Curvature

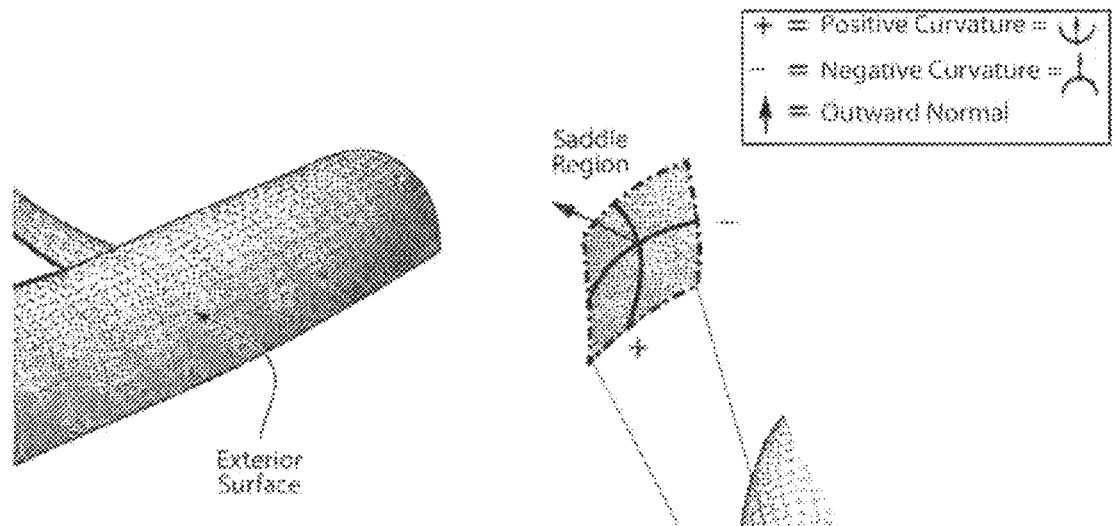
FIG. 2f
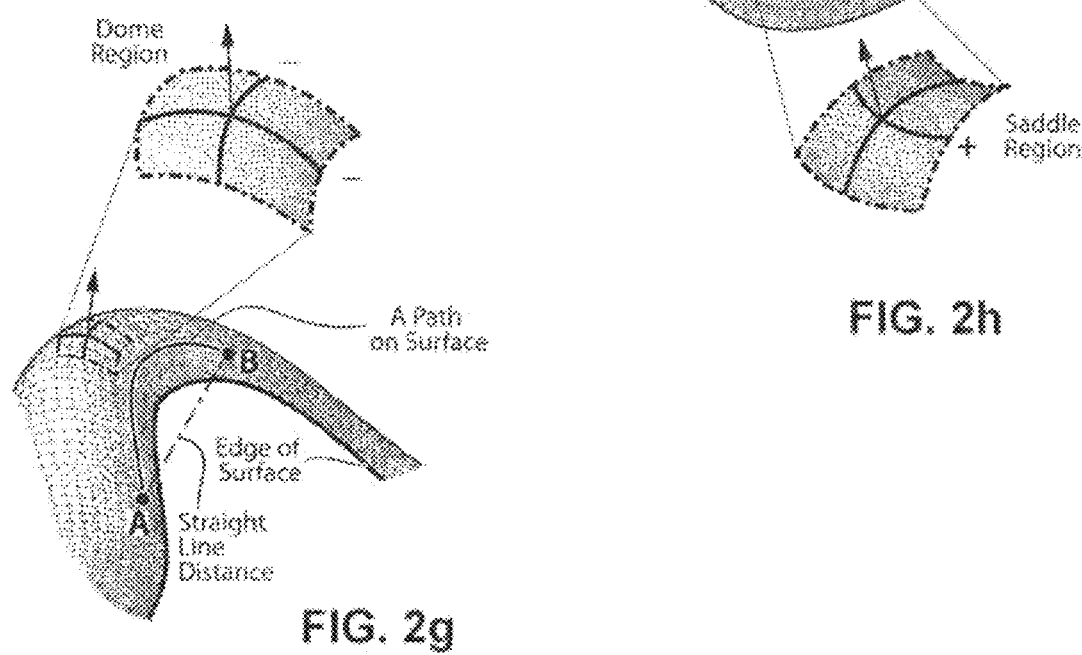
FIG. 2h
FIG. 2g

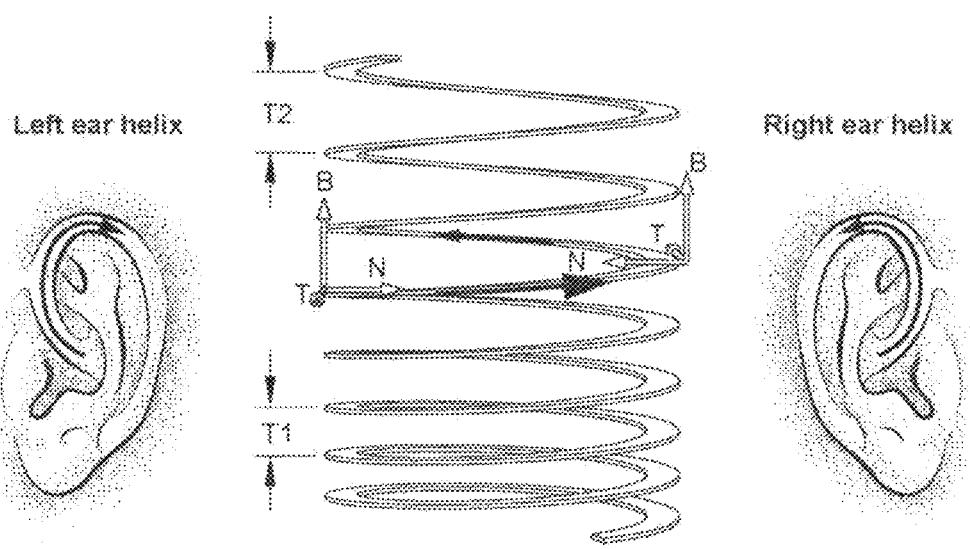
Left ear helix
FIG. 2i
Right ear helix
FIG. 2k
Right-hand helix
Right-hand positive
FIG. 2j
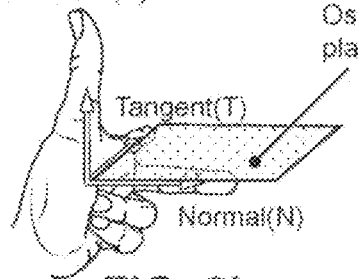
Left-hand rule
FIG. 2l
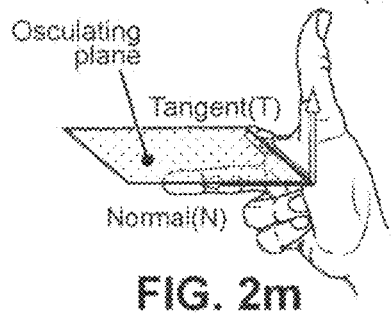
Right-hand rule
FIG. 2m
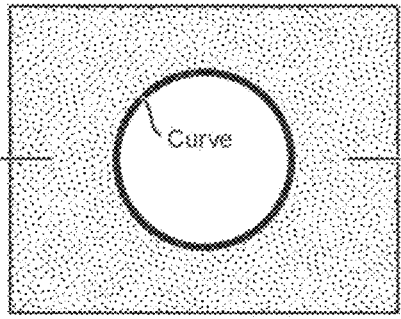
FIG. 2n
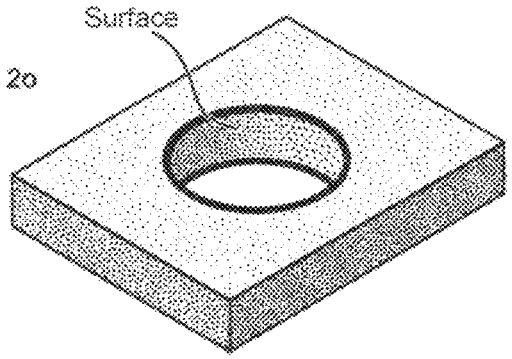
FIG. 2p
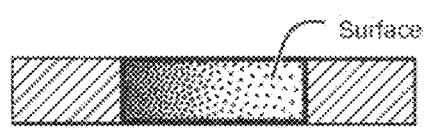
FIG. 2o

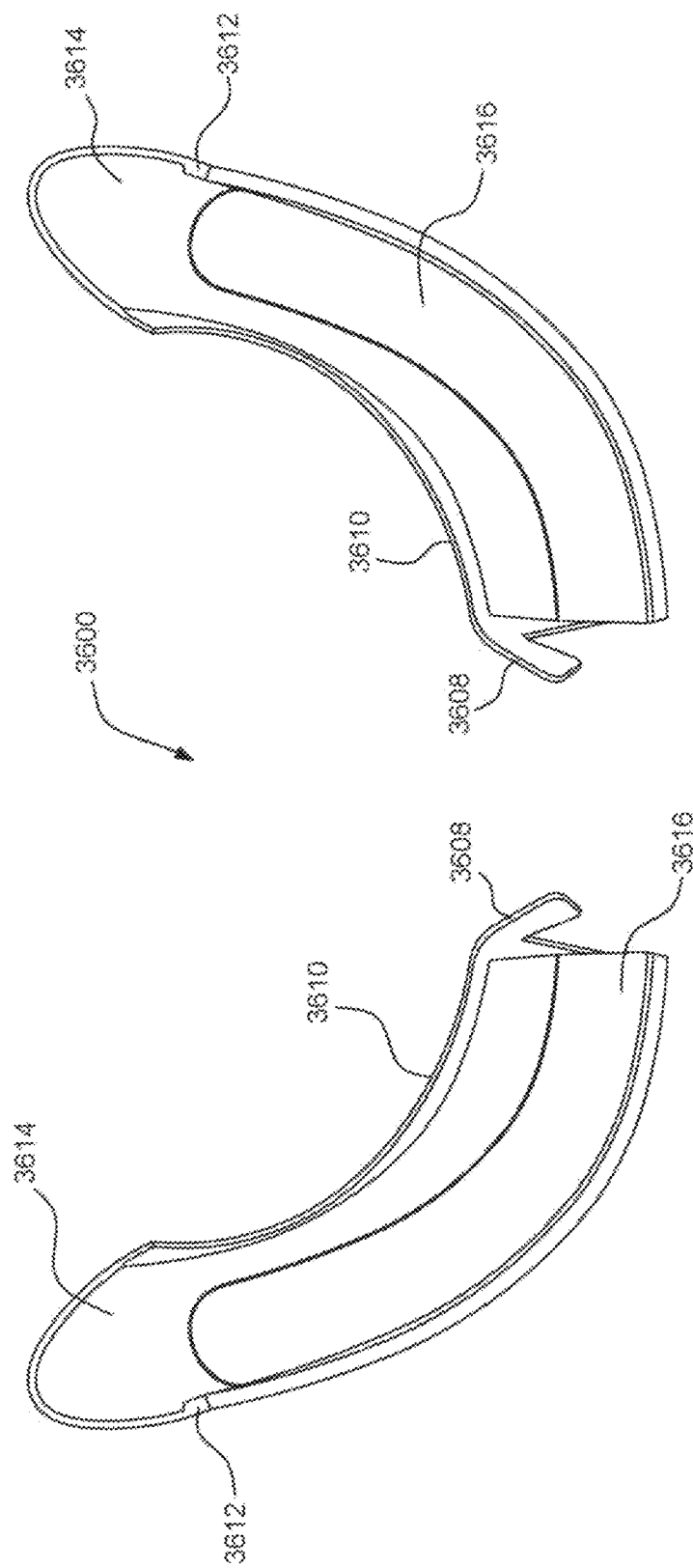

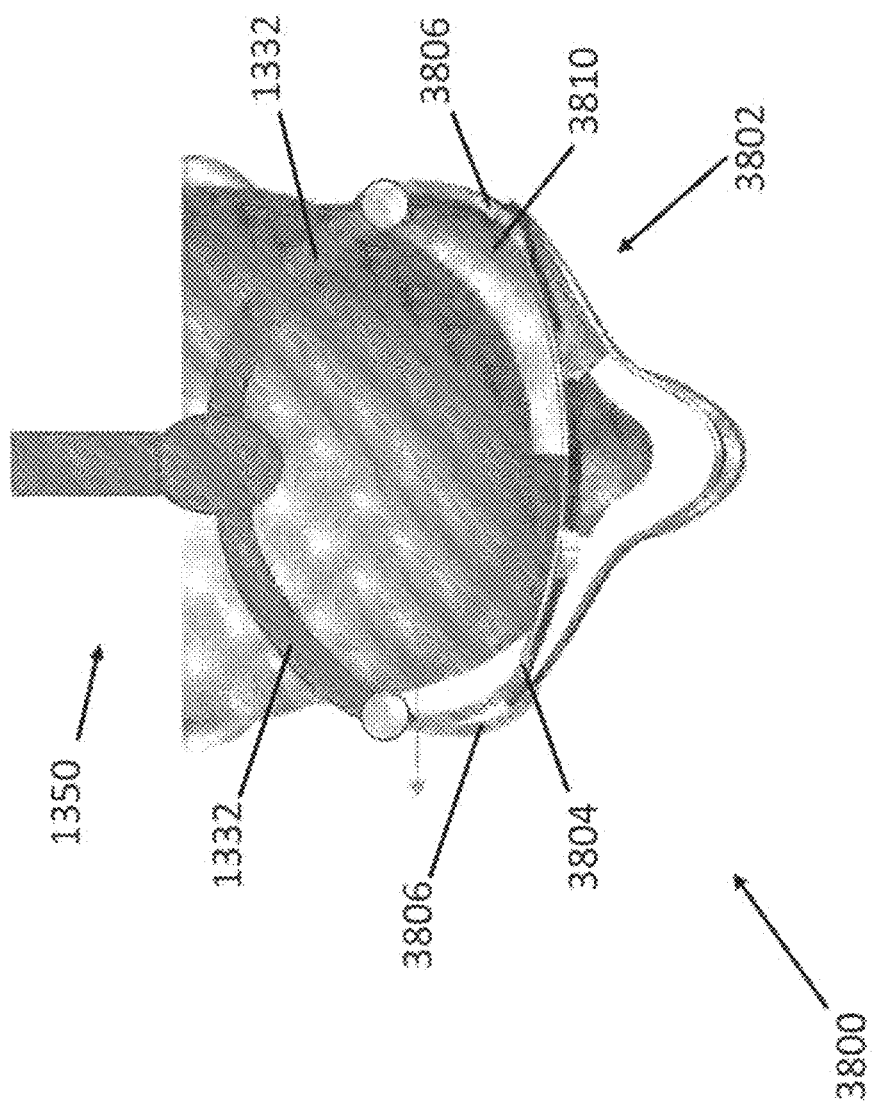

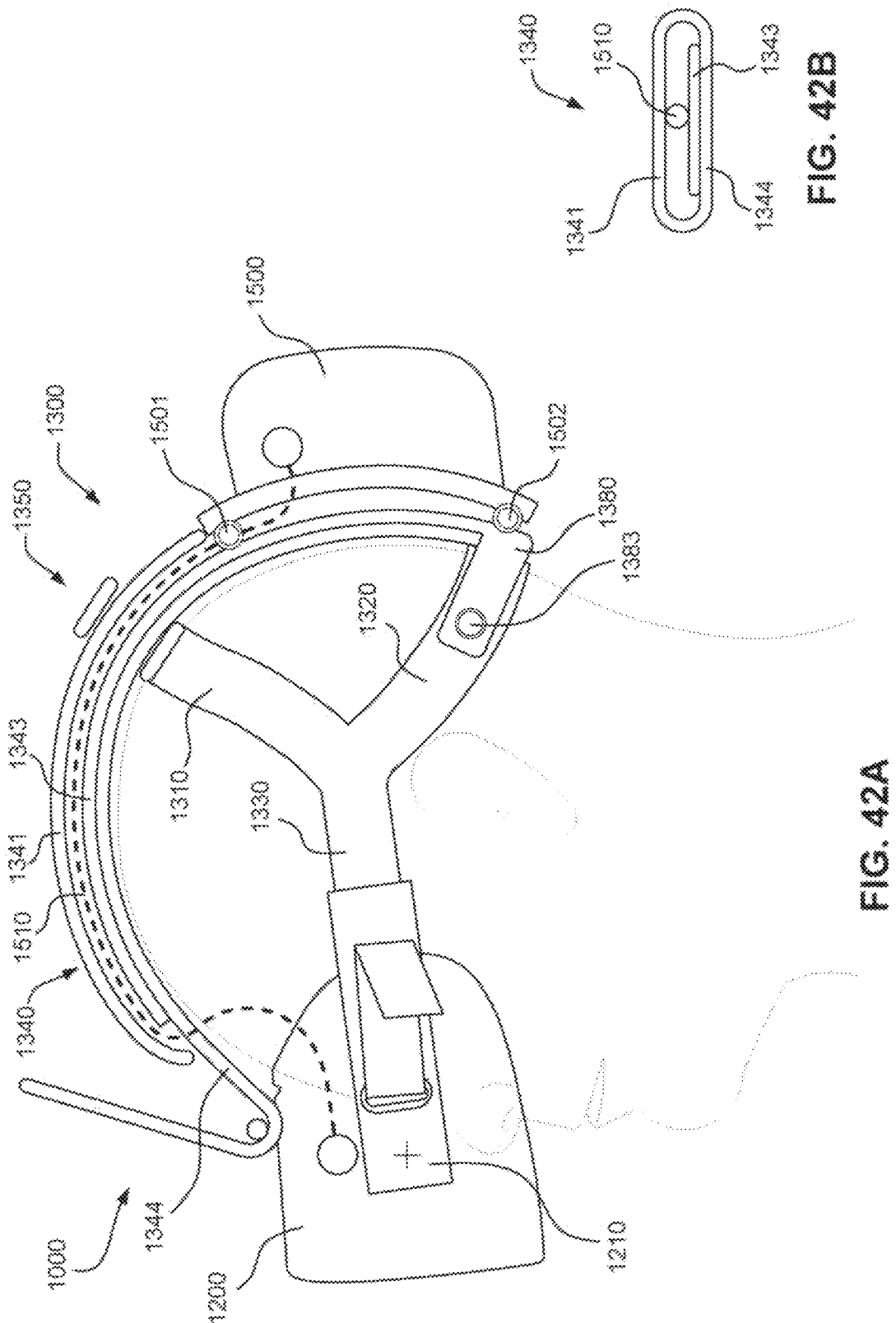

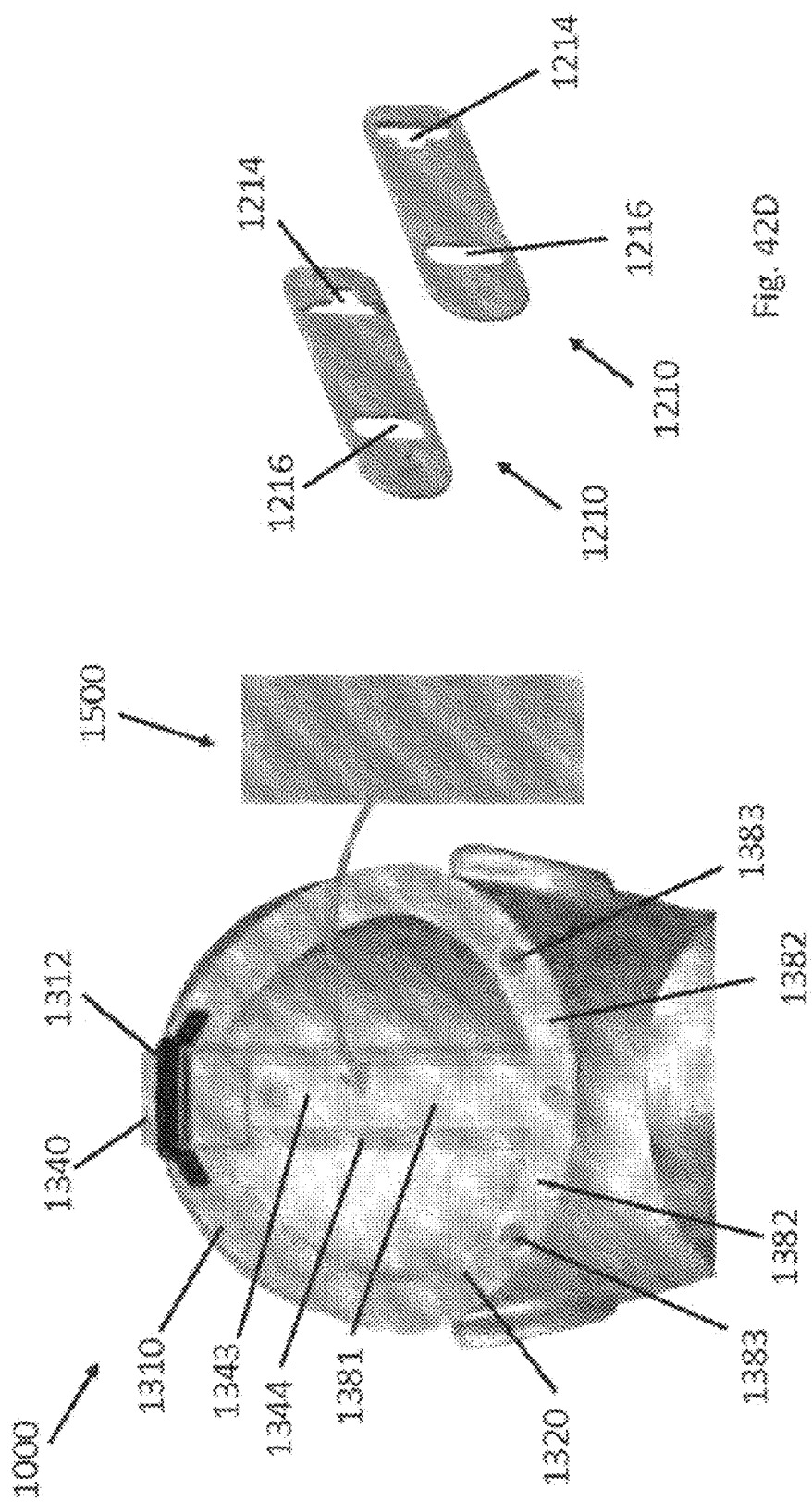

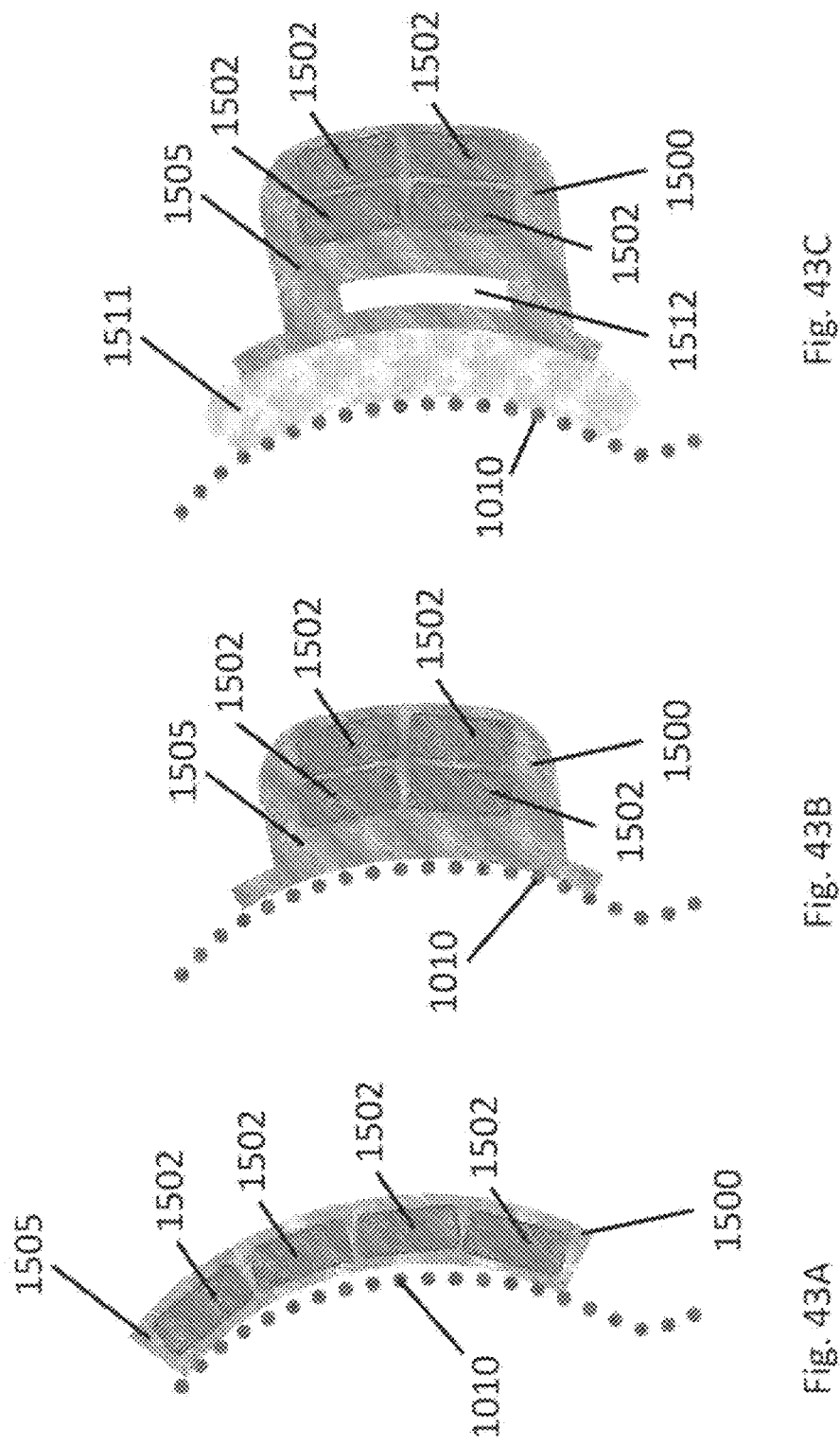

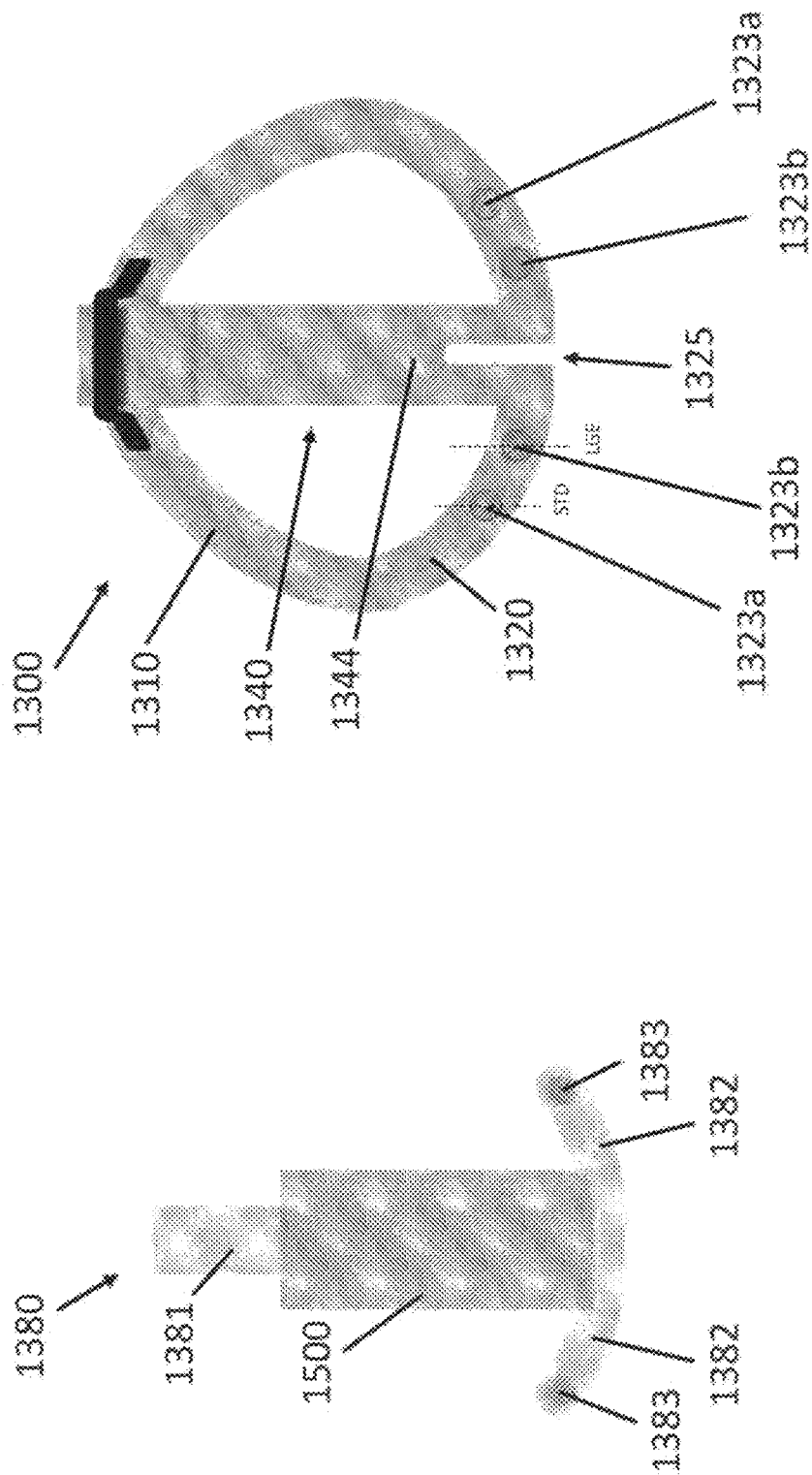

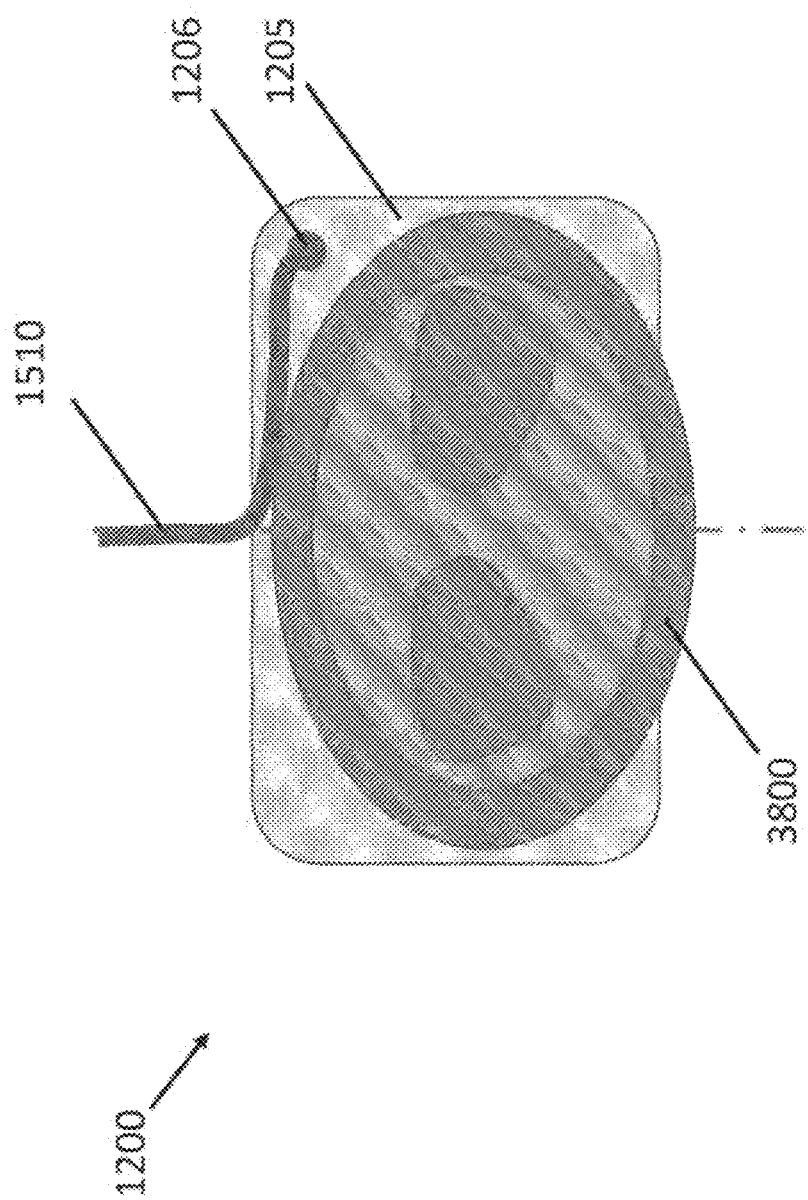

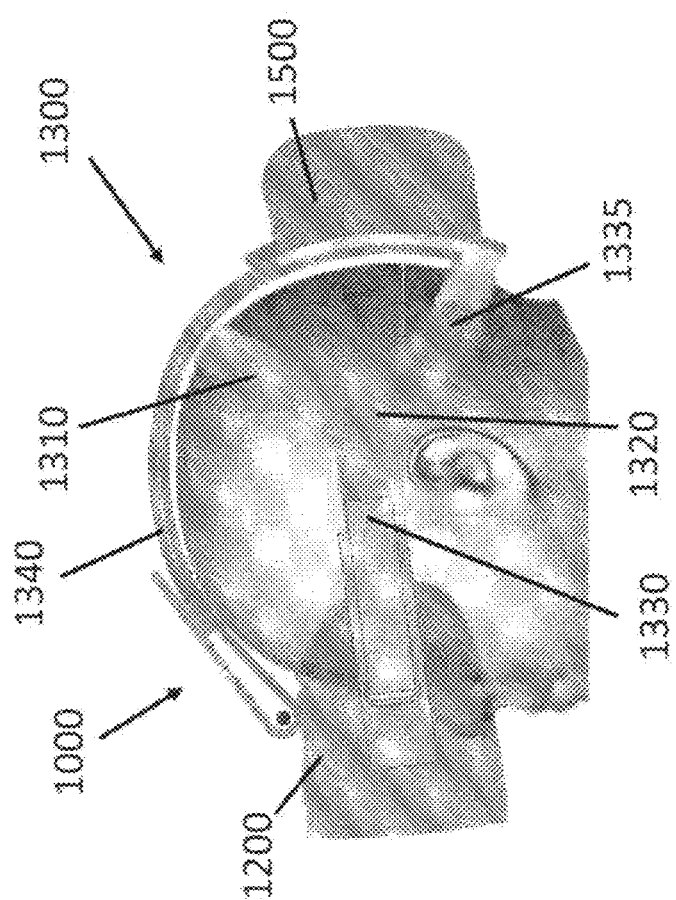

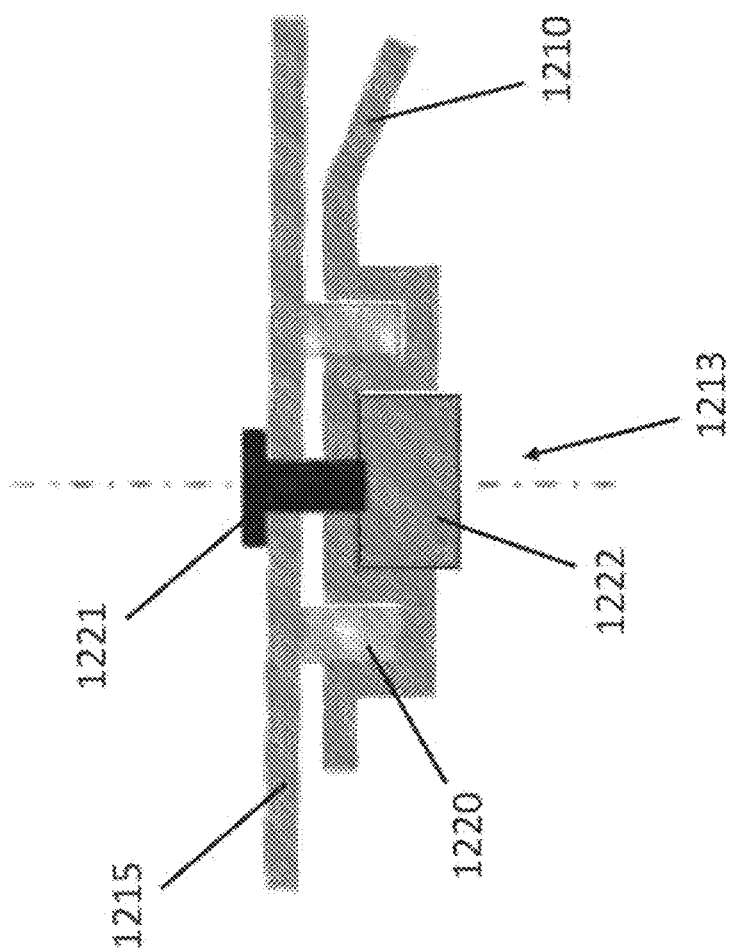

POSITIONING, STABILISING, AND INTERFACING STRUCTURES AND SYSTEM INCORPORATING SAME

1 CROSS-REFERENCE TO RELATED APPLICATIONS

This application is a U.S. national phase application of International Application PCT/SG2020/050793, filed Dec. 30, 2020, which designated the U.S. and claims the benefit of International Application No. PCT/AU2020/051158, filed Oct. 28, 2020, International Application No. PCT/AU2020/051081, filed Oct. 8, 2020, Australian Application No. 2020903055, filed Aug. 26, 2020, Australian Application No. 2020903112, filed Aug. 31, 2020, Australian Application No. 2020903395, filed Sep. 22, 2020, Australian Application No. 2020903502, filed Sep. 29, 2020, and Australian Application No. 2020903638, filed Oct. 7, 2020, Singapore Provisional Application No. 10201914129W, filed Dec. 31, 2019, Singapore Provisional Application No. 10201914128Q, filed Dec. 31, 2019, Singapore Provisional Application No. 10201914125V, filed Dec. 31, 2019, Singapore Provisional Application No. 10/201,914131Q, filed Dec. 31, 2019, and Singapore Provisional Application No. 10201914123U, filed Mar. 23, 2020, each of which is incorporated herein by reference in its entirety.

International Application No. PCT/AU2020/051158, filed Oct. 28, 2020, which claims the benefit of Australian Provisional Application No. 2020900953, filed Mar. 27, 2020, U.S. application Ser. No. 16/865,480, filed May 4, 2020 (now U.S. Pat. No. 11,243,405, issued on Feb. 8, 2022), U.S. application Ser. No. 16/865,526, filed May 4, 2020 (now U.S. Pat. No. 11,262,589, issued on Mar. 1, 2022), Australian Provisional Application No. 2020901432, filed May 5, 2020, Australian Provisional Application No. 2020901437, filed May 6, 2020, and Australian Provisional Application No. 2020902514, filed Jul. 20, 2020, each of which is incorporated herein by reference in its entirety.

2 BACKGROUND OF THE TECHNOLOGY

2.1 Field of the Technology

This disclosure relates generally to head mounted displays, positioning and stabilising structures, user interfacing structures, and other components for use in head mounted displays, associated head-mounted display assemblies and systems including a display unit and positioning and stabilising structure, interfacing structures and or components, and methods. The present technology finds particular application in the use of virtual reality head mounted displays and is herein described in that context. However, it is to be appreciated that the disclosure may have broader application and be used in other head-mounted display arrangement including augmented reality displays.

2.2 Description of the Related Art 2.2.1 Head Mounted Display

It is to be understood that, if any prior art is referred to herein, such reference does not constitute an admission that the prior art forms a part of the common general knowledge in the art, in Australia or any other country.

Virtual reality (or VR) head-mounted displays enable a user to have a fully immersive experience of a virtual environment and have broad application in fields such as communications, training, medical and surgical practice, engineering and video gaming.

Virtual reality head mounted displays typically are provided as a system that includes a display unit which is arranged to be held in an operational position in front of a user's face. The unit typically includes a housing containing a display and a user interface structure constructed and arranged to be in opposing relation with the user's face. The user interface structure may extend about the display and define in conjunction with the housing, a viewing opening to the display. The user interfacing structure may engage with the face and include a cushion for user comfort and/or be light sealing to cut ambient light from the display. The head-mounted display system further comprises a positioning and stabilising structure that is disposed on the user's head to maintain the display unit in position.

2.2.1.1 Interfacing Structure

The head-mounted displays may include a user interfacing structure. Since it is in direct contact with the user's face, the shape and configuration of the interfacing portion can have a direct impact the on effectiveness and comfort of the display unit.

The design of a user interfacing structure presents a number of challenges. The face has a complex three-dimensional shape. The size and shape of noses and heads varies considerably between individuals. Since the head includes bone, cartilage and soft tissue, different regions of the face respond differently to mechanical forces.

One type of interfacing structure extends around the periphery of the display unit and is intended to seal against the user's face when force is applied to the user interface with the interfacing structure in confronting engagement with the user's face. The interfacing structure may include a pad made of a polyurethane (PU). With this type of interfacing structure, there are often gaps between the interfacing structure and the face, and additional force will be required to force the display unit against the face in order to achieve the desired contact.

The regions not engaged at all by the user interface may allow gaps to form between the facial interface and the user's face through which undesirable light pollution may ingress into the display unit. The light pollution may decrease the efficacy and enjoyment of the overall virtual reality experience for the user. In addition, previous systems may be difficult to adjust to enable application for a wide variety of head sizes. Further still, the display unit and associated stabilising structure may often be relatively heavy and may be difficult to clean which may thus further limit the comfort and useability of the system.

Another type of interfacing structure incorporates a flap seal of thin material positioned about a portion of the periphery of the display unit so as to provide a sealing action against the face of the user. Like the previous style of interfacing structure, if the match between the face and the interfacing structure is not good, additional force may be required to achieve a seal, or light may leak into the display unit in-use. Furthermore, if the shape of the interfacing structure does not match that of the user, it may crease or buckle in-use, giving rise to undesirable light penetration.

2.2.1.2 Positioning and Stabilising

To hold the display unit in its correct operational position, the head-mounted display system further comprises a positioning and stabilising structure that is disposed on the user's head. In the past these structures have been formed from expandable rigid structures that are typically applied to the head under tension to maintain the display unit in its operational position. Such systems have been prone to exert a clamping pressure on the user's face which can result in user discomfort at localised stress points. Also, previous systems may be difficult to adjust to allow wide application head sizes. Further, the display unit and associated stabilising structure are often heavy, difficult to clean which further limit the comfort and useability of the system.

Certain other head mounted display systems may be functionally unsuitable for the present field. For example, positioning and stabilising structures designed for ornamental and visual aesthetics may not have the structural capabilities to maintain a suitable pressure around the face. For example, an excess of clamping pressure may cause discomfort to the user, or alternatively, insufficient clamping pressure on the user's face may not effectively seal the display from ambient light.

Certain other head mounted display systems may be uncomfortable or impractical for the present technology. For example, if the system is used for prolonged time periods.

As a consequence of these challenges, some head mounted displays suffer from being one or more of obtrusive, aesthetically undesirable, costly, poorly fitting, difficult to use, and uncomfortable especially when worn for long periods of time or when a user is unfamiliar with a system. Wrongly sized positioning and stabilising structures can give rise reduced comfort and in turn, shortened periods of use.

Therefore, an interfacing portion of a user interface used for the fully immersive experience of a virtual environment are subject to forces corresponding to the movement of a user during the experience.

2.2.1.3 Materials

Materials used in head mounted display assemblies have included dense foams for contacting portions in the interfacing structures, rigid shells for the housings, and positioning and stabilising structures formed from rigid plastic clamping structures. These materials have various drawbacks including not permitting the skin covered by the material to breath, being inflexible, difficult to clean and to prone trapping bacteria. As a result, products made with such material may be uncomfortable to wear for extended periods of time, causes skin irritation in some individuals and limit the application of the products.

BRIEF SUMMARY OF THE TECHNOLOGY

Disclosed is a positioning and stabilising structure for a head-mounted display comprising a rear support structure arranged, in use, to contact a posterior region of the user's head. In some forms, the rear support structure includes a hoop having an occipital portion and a parietal portion.

The hoop or at least one of the portions may be resiliently extensible along at least a portion of its length. In some forms, the hoop is flexible along at least a portion of its length. In some forms, where the rear support structure is a hoop, the occipital portion may extend low on the user head such that it resists upward movement (as a result of its locational in contact with the occipital region of the head) and as such provides an anchor for the system. In some forms the hoop is orientated in a generally upright plane (such upright plane including as an example the coronal plane).

In some forms, the rear support structure is disposed posterior of the otobasion superior of the user.

Also disclosed is a positioning and stabilising structure for a head-mounted display comprising: a back support portion arranged in use to contact a posterior region of the user's head; and a front support portion that is arranged to contact an anterior region of the user's head, the back and front support portions extending transverse to the sagittal plane. In some forms, the positioning and stabilising structure further comprises an adjustment mechanism to allow adjustment between the back and front portions.

In some forms, the adjustment mechanism allows lateral adjustment between the back and front support portions. In some forms, the adjustment mechanism allows angular adjustment between the front and rear portions.

Also disclosed is a positioning and stabilising structure for a head-mounted display comprising: a back support portion arranged in use to contact a posterior region of the user's head; and a front support portion that is arranged to contact an anterior region of the users head, the back and front support portions extending transverse to the sagittal plane and being laterally offset from one another.

In some forms, the back or occipital support portion is biased into contact with the occipital region of the user.

Also disclosed is a positioning and stabilising structure for a head-mounted display comprising: a support portion arranged in use to accommodate the weight of the display unit of the head mounted display, and one or more adjustment mechanisms that allow adjustment of the position of the display unit relative to the support portion.

In some forms, the adjustment of the display relative to the support portion may be angular and/or in an anterior-posterior direction relative to the user's head.

Also disclosed is a positioning and stabilising structure for a head-mounted display includes resilient components that are extensible and rigidisers that are substantially inextensible and resilient.

In some forms, the positioning and stabilising structure further comprises opposing connectors that are disposed on opposing sides of, and extending along the temporal regions of, the user's head to interconnect the rear support structure or support portion to the display unit.

In some forms, the connectors are rigid along at least a portion of their length. In some forms, the connectors each comprise an arm having an anterior end connected to the display unit and a posterior end connected to the rear support structure or one of the support portions. In some forms, the arm is rigid. In some forms, the posterior end of the arm is disposed at or posterior to the otobasion superior of the user.

In some forms, at least one of the connectors further comprises an adjustment mechanism for adjustment of the positioning and stabilising structure to fit different size heads. In some forms, the adjustment mechanism is disposed at the connection between the posterior end of the temporal arm and the rear support structure.

In some forms, the positioning and stabilising structure includes one or more connection tabs that connects to the arm of the connector (i.e., connector arm), and the adjustment mechanism allows for adjustment of the effective length of the tab. In some forms, a posterior end of the connector arm incorporates an eyelet that is arranged to receive the connection tab, the adjustment mechanism comprising a releasably fastening arrangement to fasten the connecting tab to the temporal arm. In some forms, the releasable fastening arrangement may be arranged to secure a free end of the connection tab back onto a proximal portion of the connection tab. Other types of releasable fastening arrangement may take other forms, such as clips or retainers that allow a friction, interference, snap or other mechanical fixing arrangement.

In some forms, the positioning and stabilising structure may further include a forehead support connector. In some forms, the forehead support connector may extend generally in the direction of the sagittal plane and connects the rear support structure, or front support portion to a superior edge region of the display unit. In some forms, the forehead support connector may comprise a strap. In some forms, the forehead connector support strap may be resiliently extensible along at least a portion of its length. In some forms, the forehead connector strap may be flexible along at least a portion of its length.

In some forms, the forehead support connector may further include an adjustment mechanism for adjustment of the positioning and stabilising structure to fit different size heads. In some forms, the adjustment mechanism may adjust the effective length of the forehead connector strap when the connector is in that form.

In some forms, the forehead support connector further comprises a forehead support rigidiser that provides rigidification to a portion of the connector. In some forms, the forehead support rigidiser provides rigidification to a portion of the forehead support connector located along the frontal region of the user's head. The extent and positioning of the rigidiser may assist in correct positioning of display unit and relieve pressure being applied to a zygomatic bone of the user. In some forms, the rigidiser may be adjustable (angularly or translational) on other components of the forehead support connector, such as the forehead connector strap to allow fine positioning of the head display and assist in improving user comfort and fit.

In some forms, the positioning and stabilising structure further includes additional rigidisers which may bridge other portions of the structure, such as the rear support, front or back support portions and/or connector arms. These rigidisers may assist in controlling the movement of the display unit about the rear support structure to further stabilise and support the system. In particular, these rigidisers may limit hinging movement at the connection of the temporal connectors to the rear support. The rigidisers may also extend through along the occipital region of the rear support structure to further anchor the display unit in its correction operational position. The rigidiser may be adjustable (angularly or translational) on other components of the forehead support connector to further assist in comfort, adjustability, and fit.

In some forms, the positioning and stabilising structure may allow for upward (e.g., superior) pivoting movement of the display unit to allow for movement of the display unit to a non-operational position without removal of the positional and stabilising structure (e.g., flip-up version). In some forms, the pivoting movement of the display unit involves a pivoting arrangement which includes the positioning and stabilising structure. In some forms, this may be provided by a release mechanism at the frontal connector support and/or provided by limited hinging regions at the temporal connectors.

The positional and stabilising structure in any form described above may be incorporated in a hood or other head wear either integrated therein or releasably connected thereto. The positional and stabilising structure may also include other components integrated therein such as audio, tactile (haptic) stimulation or feedback.

Also disclosed is a positioning and stabilising structure for supporting a facial interface on a user's face. The positioning and stabilising structure includes headgear constructed from at least one strap. The straps may contact the user's head and apply a force to the facial interface where the force is configured to maintain the position of the facial interface in a desired position.

In some forms, the straps may be at least partially constructed from a flexible material.

Also disclosed is an interfacing structure of the head mounted display constructed and arranged to be in opposing relation with the user's face.

In some forms, the interfacing structure comprises a face engaging surface including one or more regions of silicone, or one or more layers of a textile material or foam.

In some forms, the interfacing structure may have varying compliance to allow more selective distribution of force onto a user's face. In some forms, one or more regions of the face engaging surface may be formed to have varying thicknesses and/or varying surface finishes, whereby the resultant face engaging surface can have a variable compliance therealong when compressed against a user's face in use.

In some forms, the interfacing structure comprises includes a face engaging portion, a support structure to support the face engaging portion in position, and a chassis, which may be rigid (i.e., a rigid chassis).

Also disclosed is an interfacing structure for a head mounted display, the interfacing structure extending about the display and defining a viewing opening to the display. In some forms the structure may include a plurality of adjustable face engaging portions being located at a respective one of the left and right hand sides of the interfacing structure. The adjustable face engaging portions may be movable relative to each other.

In some forms, the adjustable face engaging portions may be movable relative to a chassis of the interfacing structure. The interfacing structure may include an adjustment mechanism, such as a sliding tab (or a slidable tab) or rack-and-pinion style adjustment mechanism, to allow a user to selectively adjust the spacing of the face engaging portions.

In some forms, the interfacing structure includes components and/or regions that are removably mountable to a housing of the display unit.

3.1 Head-Mounted Display System with Battery Pack, Top Strap, Lateral Strap Portions and Parietal and Occipital Strap Portions Another aspect of the present technology relates to a head-mounted display system comprising:
a head-mounted display unit comprising a display;
a battery pack for powering the head-mounted display system;
a positioning and stabilising structure configured to hold the head-mounted display unit anterior to a user's eyes such that the display is viewable by the user in use and configured to hold the battery posterior to the user's head in use, the positioning and stabilizing structure comprising:
  a posterior support portion configured to engage a posterior portion of a user's head, the posterior support portion comprising a parietal strap portion configured to overlie the parietal bones of the user's head in use and an occipital strap portion configured to overlie or lie below an occipital bone of the user's head in use;
  a pair of lateral strap portions configured to connect between the posterior support portion and the head-mounted display unit, each configured to be located on a respective lateral side of the user's head in use;
  a top strap portion configured to connect between the battery pack and the head-mounted display unit, the top strap portion configured to overlie a superior portion of the user's head in use.

3.1.1 Parietal Strap Portion

In examples:

The position of the parietal strap portion is moveable with respect to the top strap portion in the anterior and posterior directions;

An angle between the parietal strap portion and the occipital strap portion is able to be adjusted by the user;

The parietal strap portion passes underneath the top strap portion;

The top strap portion passes through a buckle connected to the parietal strap portion, the buckle configured to limit lateral movement of the top strap portion; and/or The buckle is located in the sagittal plane of the user's head in use.

3.1.2 Top Strap Portion

In further examples:

The top strap portion is connected to the occipital strap portion;

The top strap portion is adjustable in length between the head-mounted display unit and the battery;

The top strap portion is connected to the head-mounted display unit through an eyelet connected to the head-mounted display unit and looped back and secured to itself;

An outer layer of the top strap portion is configured to be passed through the eyelet and looped back and secured to itself, wherein a user-facing layer does not pass through the eyelet;

A user-facing layer of the top strap portion is configured to be passed through the eyelet and looped back and secured to itself;

The top strap portion is substantially inextensible;

The top strap portion comprises a layered construction;

The top strap portion comprises a substantially inextensible layer;

An anterior end of the substantially inextensible layer is spaced along the length of the top strap portion from the head-mounted display unit;

The top strap portion comprises a textile user-facing layer;

The top strap portion comprises a textile outer layer;

The top strap portion comprises a power cable connecting the battery pack to the head-mounted display unit to provide power from the battery to the head-mounted display unit in use;

The power cable is internal to the top strap portion;

The power cable is insertable through an interior of the top strap portion by the user; and/or The power cable is insertable through the top strap portion between the substantially inextensible layer and the textile outer layer.

3.1.3 Anterior Portion and Posterior Portion of Top Strap Portion

In further examples:

The top strap portion comprises an anterior portion and a posterior portion, the posterior portion being configured to engage the user's head in use, and the anterior portion being configured to not engage the user's head in use;

The top strap portion comprises a shape having a bend between the posterior portion of the top strap portion and the anterior portion of the top strap portion;

The top strap portion is shaped to follow a curvature of the user's head in the posterior portion of the top strap portion and deviate from the curvature of the user's head in the anterior portion of the top strap portion;

The top strap portion is rigidised to support the anterior portion in spaced relation to the user's head in use;

The anterior portion of the top strap portion curves inferiorly towards the head-mounted display unit;

The anterior portion of the top strap portion extends in a partially superior direction from the posterior portion of the top strap portion;

The anterior portion of the top strap portion is connected to the posterior portion of the top strap portion at an anterior end of the posterior portion, the anterior end of the posterior portion being located posteriorly to a fringe region of the user's head;

The anterior end of the posterior portion of the top strap portion is located posteriorly of the frontal bone of the user's head in use;

The anterior end of the posterior portion of the top strap portion is located proximate a coronal plane of the user in use, the coronal plane aligned with each otobasion superior of the user;

The anterior end of the posterior portion of the top strap portion is located posteriorly of the coronal plane in use; and/or The anterior end of the posterior portion of the top strap portion is located proximate the parietal strap portion in use.

3.1.4 Battery Pack

In further examples:

The battery pack is connected to the top strap portion at a superior location and an inferior location;

The battery pack is removably connected to the top strap portion;

The battery pack is connected to the top strap portion by a hook-and-loop connection;

The inferior location is proximate the occipital strap portion;

The battery pack comprises a battery pack housing and a plurality of cells contained within the housing;

The cells are spaced equidistantly in the battery pack housing from an anterior wall of the battery pack housing;

One of more of the cells are spaced further from an anterior wall of the battery pack housing than another one or more of the cells;

Each of the plurality of cells are spaced from an anterior wall of the battery pack housing;

The battery pack housing contains a counterweight configured to contribute to a balance of weight between the battery pack and the head-mounted display unit and/or;

The battery pack housing is spaced from a posterior surface of the user's head.

3.1.5 Retractable Power Cable

In further examples:

A portion of the power cable is located within the battery pack and is able to be extended from and retracted into the battery pack;

One or more layers of the top strap portion are partially located within the battery pack and are able to be extended from and retracted into the battery pack together with the power cable;

An outer layer of the top strap portion is located within the battery pack and is able to be extended from and retracted into the battery pack together with the power cable;

A substantially inextensible layer of the top strap portion is located within the battery pack and is able to be extended from and retracted into the battery pack together with the power cable;

A user contacting layer of the top strap portion is located between the battery pack and the user's head;

The portion of the power cable located within the battery pack and the one or more layers of the top strap portion partially located within the battery pack form a retractable portion of the top strap portion able to be extended from and retracted into the battery pack to adjust a length of the top strap portion between the battery pack and the head-mounted display unit;

The retractable portion is able to be moved between a plurality of predetermined positions with respect to the battery pack at which the position of the retractable portion is able to be fixed with respect to the battery pack; and/or The retractable portion is able to be moved continuously within a range of positions with respect to the battery pack.

3.1.6 Arms

In further examples:

The head-mounted display unit comprises a display unit housing and a pair of arms extending from the display unit housing, the lateral strap portions each connecting to a respective one of the arms;

Each lateral strap portion connects to a posterior end of a respective one of the pair of arms;

Each lateral strap portion passes through an eyelet at the posterior end of the respective arm and is fastened back onto itself;

Each lateral strap portion connects to a respective one of the pair of arms proximate an anterior end of the arm;

Each lateral strap portion passes through an eyelet at or proximate the posterior end of the respective arm and through a hole proximate the anterior end of the arm and is fastened to the arm;

Each lateral strap portion is fastened to a laterally facing side of the arm;

Each lateral strap portion is fastened to an exposed portion of itself within the arm;

The eyelet at or proximate the posterior end of the arm is partially open allowing the strap to move in a transverse direction with respect to the strap into/out of the eyelet;

Each arm is covered in a sock, each lateral strap portion being fastened to the sock;

Each arm comprises a substantially rigid portion overmoulded to a textile portion; and/or Each of the pair of arms is able to pivot with respect to the display unit housing.

3.1.7 Adjustment Rigidiser

In examples:

the positioning and stabilising structure further comprises an adjustment rigidiser comprising a substantially inextensible member configured to connect to the occipital strap portion, the adjustment rigidiser configured to reduce a length of the occipital strap portion;

the occipital strap portion comprises three or more occipital strap connection points, the adjustment rigidiser being selectively connectable to a first pair of the occipital strap connection points and to a second pair of the occipital strap connection points, wherein when the adjustment rigidiser is connected to the first pair of the occipital strap connection points the occipital strap portion has a first effective length and wherein when the adjustment rigidiser is connected to the second pair of the occipital strap connection points the occipital strap portion has a second effective length longer than the first effective length;

the adjustment rigidiser constrains the occipital strap portion to the first effective length when the adjustment rigidiser is connected to the first pair of the occipital strap connection points;

the adjustment rigidiser comprises a pair of adjustment rigidiser connection points configured to connect to the occipital strap connection points;

the occipital strap portion comprises four occipital strap connection points;

the second pair of occipital strap connection points are located medially of the first pair of occipital strap connection points;

the occipital strap portion comprises a left portion separated from a right portion, the adjustment rigidiser being configured to connect the left portion and the right portion;

the adjustment rigidiser comprises a medial rigidising portion and a pair of lateral rigidising portions extending laterally from the medial rigidising portion, the adjustment rigidiser connection points located on the lateral rigidising portions;

one adjustment rigidiser connection point is located on each lateral rigidising portion;

the medial rigidising portion is configured to be located in use overlying the user's occipital bone and overlying a junction between the user's parietal bones;

the medial rigidising portion is configured to be located on the user's head at or proximate the user's frontal bone, overlying a junction between the user's parietal bones and connecting to the occipital strap portion;

the adjustment rigidiser forms part of the top strap portion of the positioning and stabilising structure;

the adjustment rigidiser forms a substantially inextensible layer of the top strap portion;

the adjustment rigidiser is permanently attached within the top strap portion;

the adjustment rigidiser is permanently attached to a user-facing layer of the top strap portion;

the battery pack is configured to connect to the adjustment rigidiser;

a power cable is located in use between the adjustment rigidiser and an outer layer of the top strap portion;

the power cable is insertable between the adjustment rigidiser and the outer layer of the top strap portion;

the adjustment rigidiser is separable from a user-facing layer of the top strap portion;

the adjustment rigidiser is insertable between the user-facing layer and an outer layer of the top strap portion;

the adjustment rigidiser is configured to connect to the user-facing layer;

the adjustment rigidiser comprises hook material configured to form a hook-and-loop connection to the user-facing layer of the top strap portion;

the power cable is permanently attached to the adjustment rigidiser;

the battery pack is permanently attached to the adjustment rigidiser;

the adjustment rigidiser comprises an inferior cutout between the pair of lateral rigidising portions allowing the adjustment rigidiser to flex at or proximate the connection of the lateral rigidising portions to the medial rigidising portion;

the adjustment rigidiser comprises lateral cutouts on opposing lateral sides of the medial rigidising portion proximate the lateral rigidizing portions allowing the adjustment rigidiser to flex proximate the lateral cutouts; and/or the user-facing layer of the top strap portion comprises a cutout corresponding to (e.g. aligned with) the inferior cutout in the adjustment rigidiser.

3.1.8 Lockable Adjustable Connection Portion

In examples:

the positioning and stabilising structure comprises a first strap portion and a second strap portion connected by a lockable extendable connection portion comprising:

an elastically extendable connector strap portion configured to allow a predetermined amount of separation of the first strap portion from the second strap portion; and a substantially inextensible connector strap portion configured to releaseably attach the first strap portion to the second strap portion to prevent separation of the first strap portion from the second strap portion.

the substantially inextensible connector strap portion is able to be adjusted in length;

the substantially inextensible connector strap portion comprises a magnetic clip configured to magnetically attach to a connection point on the positioning and stabilising structure;

the positioning and stabilising structure comprises a lockable extendable connection portion in each lateral strap portion;

each lockable extendable connection portion is located at an arm extending posteriorly from the head-mounted display unit;

each lockable extendable connection portion is located proximate a junction between each lateral strap portion, the parietal strap portion and the occipital strap portion; and/or the positioning and stabilising structure comprises a lockable extendable connection portion in the occipital strap portion.

3.1.9 Power Cable Strap Portion

In examples:

the head-mounted display system comprises a power cable connected between the battery pack and the head-mounted display unit;

the power cable may be located within the top strap portion in use;

the power cable may be located alongside the top strap portion in use;

the power is cable attached to a power cable strap portion proximate the head-mounted display unit;

the power cable strap portion is extendable in length and a serpentine portion of the power cable is attached to the power cable strap portion in a serpentine pattern enabling the power cable strap portion and the serpentine portion of the power cable to extend in length; and/or the power cable is attached to the parietal strap portion.

3.2 Lockable Extendable Connection Portion

Another aspect of the present technology relates to a positioning and stabilising structure configured to hold a head-mounted display unit in an operable position on a user's head in use, the positioning and stabilizing structure comprising:

a posterior support portion configured to engage a posterior portion of a user's head;

a pair of lateral strap portions configured to connect between the posterior support portion and the head-mounted display unit, each configured to be located on a respective lateral side of the user's head in use;

wherein a first strap portion and a second strap portion of the positioning and stabilising structure are connected by a lockable extendable connection portion comprising:

an elastically extendable connector strap portion configured to allow a predetermined amount of separation of the first strap portion from the second strap portion; and a substantially inextensible connector strap portion configured to releaseably attach the first strap portion to the second strap portion to prevent separation of the first strap portion from the second strap portion.

In examples:

the substantially inextensible connector strap portion is able to be adjusted in length;

the substantially inextensible connector strap portion comprises a magnetic clip configured to magnetically attach to a connection point on the positioning and stabilising structure;

the positioning and stabilising structure comprises a lockable extendable connection portion in each lateral strap portion;

each lockable extendable connection portion is located at an arm extending posteriorly from the head-mounted display unit;

the posterior support portion comprises a parietal strap portion configured to overlie the parietal bones of the user's head in use and an occipital strap portion configured to overlie or lie below an occipital bone of the user's head in use;

each lockable extendable connection portion is located proximate a junction between each lateral strap portion, the parietal strap portion and the occipital strap portion; and/or the positioning and stabilising structure comprises a lockable extendable connection portion in the occipital strap portion.

3.3 Anterior and Posterior Portions of Top Strap Portion

Another aspect of the present technology relates to a positioning and stabilising structure configured to hold a head-mounted display unit in an operable position on a user's head in use, the positioning and stabilizing structure comprising:

a posterior support portion configured to engage a posterior portion of a user's head;

a pair of lateral strap portions configured to connect between the posterior support portion and the head-mounted display unit, each configured to be located on a respective lateral side of the user's head in use; and a top strap portion configured to connect between the posterior support portion and the head-mounted display unit, the top strap portion configured to overlie a superior portion of the user's head in use;

wherein the top strap portion comprises an anterior portion and a posterior portion, the posterior portion being configured to engage the user's head in use, and the anterior portion being configured to not engage the user's head in use.

In examples:

The top strap portion comprises a shape having a bend between the posterior portion of the top strap portion and the anterior portion of the top strap portion;

The top strap portion is shaped to follow a curvature of the user's head in the posterior portion of the top strap portion and deviate from the curvature of the user's head in the anterior portion of the top strap portion;

The top strap portion is rigidised to support the anterior portion in spaced relation to the user's head in use;

The anterior portion of the top strap portion curves inferiorly towards the head-mounted display unit;

The anterior portion of the top strap portion extends in a partially superior direction from the anterior end of the posterior portion of the top strap portion;

The anterior portion of the top strap portion is connected to the posterior portion of the top strap portion at an anterior end of the posterior portion, the anterior end of the posterior portion being located posteriorly to a fringe region of the user's head;

The anterior end of the posterior portion of the top strap portion is located posteriorly of the user's frontal bone in use;

The anterior end of the posterior portion of the top strap portion is located proximate a coronal plane of the user in use, the coronal plane aligned with each otobasion superior of the user;

The anterior end of the posterior portion of the top strap portion is located posteriorly of the coronal plane in use; and/or The anterior end of the posterior portion of the top strap portion is located proximate the parietal strap portion in use.

In further examples:

The top strap portion is configured to connect between the head-mounted display unit and a battery pack of the head-mounted display system for powering the head-mounted display system.

The top strap portion is adjustable in length;

The top strap portion is configured to be connected to the head-mounted display unit through an eyelet connected to a display unit housing of the head-mounted display unit and looped back and secured to itself;

A user-facing layer of the top strap portion is configured to be passed through the eyelet and looped back and secured to itself, wherein an outer layer of the top strap portion does not pass through the eyelet;

The top strap portion is substantially inextensible;

The top strap portion comprises a layered construction;

The top strap portion comprises a substantially inextensible layer;

An anterior end of the substantially inextensible layer is spaced along the length of the top strap portion from the head-mounted display unit;

The top strap portion comprises a textile user-facing layer;

The top strap portion comprises a textile outer layer;

The top strap portion comprises a power cable for connecting the battery pack to the head-mounted display unit to provide power from the battery to the head-mounted display unit in use;

The power cable is internal to the top strap portion;

The power cable is insertable through an interior of the top strap portion by the user; and/or The power cable is insertable through the top strap portion between the substantially inextensible layer and the textile outer layer.

Another aspect of the present technology relates to a head-mounted display system comprising:
- a head-mounted display unit comprising a display;
- a battery pack for powering the head-mounted display system;
- a positioning and stabilising structure according to any one of the above aspects or examples, configured to hold the head-mounted display unit in an operable position in use and configured to hold the battery posterior to the user's head in use.

3.4 Power Cable Management

Another aspect of the present technology relates to a head-mounted display system, comprising:
- a head-mounted display unit comprising:
  - a display unit housing comprising a display; and
  - an interfacing structure constructed and arranged to be in opposing relation with the user's face and engage the user's face;
- a positioning and stabilising structure structured and arranged to hold the head-mounted display unit in an operational position over a user's face in use;
- a battery pack for powering the head-mounted display system; and
- a power cable connecting the head-mounted display unit and the battery pack.

In examples:

wherein the power cable enters the display unit housing outside of a periphery of the interfacing structure;

the display unit housing comprises a posterior-facing side and an interfacing structure extending posteriorly from the posterior-facing side, the posterior-facing facing side being larger than the periphery of the interfacing structure, wherein the power cable enters the display unit housing through an opening in the posterior-facing side;

the posterior facing side comprises a rectangular shape and the interfacing structure comprises a rounded shape, wherein the opening in the posterior-facing side is located proximate a corner of the rectangular shape of the posterior-facing side;

wherein the positioning and stabilising structure comprises:
- a posterior support portion comprising a parietal strap portion configured to overlie the parietal bones of the user's head in use and an occipital strap portion configured to overlie or lie below an occipital bone of the user's head in use;
- a pair of lateral strap portions configured to connect between the posterior support portion and the head-mounted display unit, each configured to be located on a respective lateral side of the user's head in use;
- a top strap portion configured to connect between the battery pack and the head-mounted display unit, the top strap portion configured to overlie a superior portion of the user's head in use;

wherein the power cable runs along the top strap portion from the battery pack to the head-mounted display unit;

wherein the power cable runs along the parietal strap portion and one of the lateral strap portions from the battery pack to the head-mounted display unit;

wherein the power cable connects to the head-mounted display unit at a laterally-facing side thereof;

wherein the power cable runs along the occipital strap portion and one of the lateral strap portions; and/or wherein the power cable comprises a slack portion configured to tolerate movement between the head-mounted display unit and the battery pack.

3.5 Interfacing Structures

Another aspect of the present technology relates to a head-mounted display system, comprising:
- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a rigid support portion and a flexible and resilient face engaging portion provided to the rigid support portion, and wherein the face engaging portion has a curved cross-section.

Another aspect of the present technology relates to an interfacing structure for a head-mounted display unit constructed and arranged to be in opposing relation with a user's face, the interfacing structure comprising a rigid support portion and a flexible and resilient face engaging portion provided to the rigid support portion, wherein the face engaging portion has a curved cross-section.

In examples:
- the face engaging portion comprises a support flange and an integral face engaging flange having a face engaging surface;
- an overlapping portion of the face engaging portion is secured to the rigid support portion;
- the rigid support portion comprises a locating portion;
- the face engaging portion comprises a biasing portion configured to provide a biasing force to the face engaging portion in the direction of the user's face;
- the biasing portion comprises a spring;
- the biasing portion is received within the locating portion; and/or
- the face engaging portion comprises a concertina section between the rigid support portion and the face engaging flange.

In further examples:
- The interfacing structure comprises a foam portion supported by the resilient and flexible face engaging portion, wherein the foam portion provides the face engaging surface;
- the foam portion is permanently attached to the face engaging flange;
- the foam portion is releasably attached to the face engaging flange; and/or
- the foam cushion comprises one of a textile-foam composite, a flocked foam, or a raw foam.

In further examples:
- the interfacing structure comprises a textile layer provided to the resilient and flexible face engaging portion, wherein the textile layer provides the face engaging surface;
- the textile layer is releasably attached to the face engaging portion; and/or
- the textile layer is permanently attached to the face engaging portion.

Another aspect of the present technology relates to a head-mounted display system, comprising:
- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a face engaging portion supported by a more rigid support portion, wherein the face engaging portion comprises a foam cushion and an elastomeric cover over the foam cushion.

Another aspect of the present technology relates to an interfacing structure for a head-mounted display unit constructed and arranged to be in opposing relation with a user's face, the interfacing structure comprising a face engaging portion supported by a more rigid support portion, wherein the face engaging portion comprises a foam cushion and an elastomeric cover over the foam cushion.

In examples:
- The face engaging portion comprises a support flange, and a cushion support flange extending from the support flange;
- The foam cushion is provided on the cushion support flange;
- The cushion cover is releasably attached to the interfacing structure;
- The cushion cover is permanently attached to the interfacing structure;
- The cushion cover is integrally formed with the support flange and cushion support flange (for example, being integrally formed);
- The cushion cover does not extend around the foam cushion so far as to reach the cushion support flange;
- The cushion support flange extends from the rigid support portion, and is made of a more rigid material than the cushion cover;
- The cushion cover extends from a position on the cushion support flange proximal to the user's face in use;
- the face engaging portion comprises an overlapping portion secured to the rigid support portion;
- The cushion cover overlays the foam cushion and the support flange;
- An edge of the cushion cover sits proximal to the rigid support portion; and/or
- The cushion cover is connected to the rigid support portion.

Another aspect of the present technology relates to a head-mounted display system, comprising:
- a head-mounted display unit; and
- a positioning and stabilising structure structured and arranged to hold the head-mounted display unit in an operational position over a user's face in use,
- the head-mounted display unit comprising an interfacing structure constructed and arranged to be in opposing relation with the user's face,
- wherein the interfacing structure comprises a support structure and a face engaging portion integrally formed as a single component comprising varying thicknesses so as to provide desired levels of rigidity and/or cushioning effect at face engaging surfaces.

Another aspect of the present technology relates to an interfacing structure for a head-mounted display unit constructed and arranged to be in opposing relation with a user's face, the interfacing structure comprising a support structure and a face engaging portion integrally formed as a single component comprising varying thicknesses so as to provide desired levels of rigidity and/or cushioning effect at face engaging surfaces.

In examples:

The interfacing structure comprises a forehead portion, two cheek portions, and two side portions proximate the user's sphenoid regions in use and connecting the forehead portion to the respective cheek portions;

A tab extends from a free end of each cheek portion;

The interfacing structure comprises a first region extending around the inner periphery of the interfacing structure;

The interfacing structure comprises a second region extending around the outer periphery of the interfacing structure;

The interfacing structure comprises a third region extending around the inner periphery of the interfacing structure, positioned between the first region and the second region;

The interfacing structure comprises fourth regions in each cheek portion, bounded by the first region and the third region;

The first region has a greater thickness than the fourth regions;

The fourth regions have a greater thickness than the third region;

The third region has a greater thickness than the second region;

The first region has a thickness of about 2 mm;

The fourth regions have a thickness of about 1.5 mm;

The second region has a thickness of about 1 mm;

The third region has a thickness of about 0.7 mm;

The width of the first region is wider through the forehead portion than at the cheek portions, or side portions; and/or The width of the second region is greater through the forehead portion than at the cheek portions.

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a face engaging portion configured to be biased towards engagement with a user's face, in use.

Another aspect of the present technology relates to an interfacing structure for a head-mounted display unit constructed and arranged to be in opposing relation with a user's face, the interfacing structure comprising a face engaging portion configured to be biased towards engagement with a user's face, in use.

In examples:

only selected regions of the face engaging portion are biased towards engagement with a user's face;

the interfacing structure is shaped such that, when unloaded, regions of the face engaging portion extend towards the user at an angle non-parallel to the surface of the user's face with which the face engaging portion is intended to engage;

a first interface portion corresponding to a typically recessed region of the user's face is shaped to bias a face engaging flange towards engagement with the user's face; and/or a second interface portion corresponding to a typically protruding region of the user's face is shaped to avoid biasing a face engaging flange towards engagement with the user's face.

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a chassis configured to permit airflow into the space between the interfacing structure and the user.

Another aspect of the present technology relates to an interfacing structure for a head-mounted display unit constructed and arranged to be in opposing relation with a user's face, the interfacing structure comprising a chassis configured to permit airflow into the space between the interfacing structure and the user.

In examples:

The chassis comprises at least one opening;

The chassis comprises one or more of: a lateral opening, a superior opening, and an inferior opening.

The chassis comprises a main chassis portion configured to extend laterally across the user's face in use, and side chassis portions configured to extend in a generally posterior direction;

The chassis comprises at least one opening between the main chassis portion and each side chassis portion;

the head-mounted display unit comprises a display unit housing, and an air pathway is provided between the interfacing structure and the display unit housing to the at least one opening;

The chassis comprises reinforcing provided between the main chassis portion and each side chassis portion;

The chassis comprises one or more reinforcing members spanning between the main chassis portion and each side chassis portion;

The interfacing structure comprises a face engaging portion;

The face engaging portion is integral with the chassis.

3.6 Slidable Interfacing Structure

An aspect of the present technology relates to a head-mounted display system including a positioning and stabilising structure structured and arranged to hold a display unit in an operational position over a user's face in use and an interfacing structure for the display unit constructed and arranged to be in opposing relation with the user's face, the interfacing structure extending about a display that is visible to the user when the display unit is in the operational position and defining (or forming) a viewing opening to the display. The interfacing structure comprises face engaging portions located at a respective one of left and right hand sides of the viewing opening, the face engaging portions structured and arranged to be slidably movable relative to each other. In an example, the head-mounted display system may further comprise the display unit.

An aspect of the present technology relates to an interfacing structure for a display unit constructed and arranged to be in opposing relation with a user's face. The interfacing structure extends about a display that is visible to the user when the display unit is in an operational position and defines a viewing opening to the display. The interfacing structure includes moveable face engaging portions located at a respective one of left and right hand sides of the viewing opening, the moveable face engaging portions structured and arranged to be slidably movable relative to each other.

3.7 Frontal Support Portion

Another aspect of the present technology relates to a head-mounted display system comprising:
- a head-mounted display unit comprising a display;
- a positioning and stabilising structure configured to hold the head-mounted display unit in an operable position on the user's head in use, the positioning and stabilizing structure comprising:
  - a posterior support portion configured to engage a posterior portion of a user's head;
  - a pair of lateral strap portions configured to connect between the posterior support portion and the head-mounted display unit, each configured to be located on a respective lateral side of the user's head in use;
  - a frontal support portion configured to engage the user's head at a location overlying a frontal bone of the user's head in use;
  - wherein the frontal support portion is connected to the head-mounted display unit.

3.7.1 Frontal Support Portion Connects to Head-Mounted Display Unit

In examples:
- the positioning and stabilising structure comprises a frontal connector connected between the frontal support portion and the head-mounted display unit;
- the frontal connector is located substantially in the sagittal plane of the user's head;
- the frontal connector is formed from a flexible material;
- the flexible material comprises a flexible inelastic material, such as a thermoplastic material;
- the flexible material comprises an elastic material, such as one of silicone, TPE or an elastic textile strap; and/or
- the frontal connector is formed from a substantially rigid material, such as a thermoplastic material.

3.7.2 Frontal Support Portion Connects to Posterior Support Portion

In further examples:
- the positioning and stabilising structure comprises a pair of lateral connectors each connected between the frontal support portion and the posterior support portion;
- the posterior support portion comprises a parietal strap portion configured to overlie the parietal bones of the user's head in use and an occipital strap portion configured to overlie or lie below an occipital bone of the user's head in use;
- each of the lateral connectors is connected to a respective side of the posterior support portion proximate the occipital strap portion, or connected to a respective side of the occipital strap portion;
- each lateral connector is elastically extendable;
- each lateral connector is adjustable in length;
- each lateral connector is fixedly connected to the frontal support portion and releasably attachable to the posterior support portion;
- each lateral connector is connected to the posterior support portion by a snap button, a clip or a hook-and-loop connection;
- each lateral connector is releasably attachable to the frontal support portion and releasably attachable to the posterior support portion; and/or
- each lateral connector is releasably attachable to the frontal support portion and fixedly connected to the posterior support portion.

3.7.3 Frontal Support Portion (FSP) Connects to Arms

In further examples:
- the head-mounted display unit comprises a display unit housing and a pair of arms extending from the display unit housing, the lateral strap portions each connecting to a respective one of the arms;
- each lateral strap portion connects to a posterior end of a respective one of the pair of arms;
- each lateral strap portion passes through an eyelet at the posterior end of the respective arm and is fastened back onto itself; and/or
- each of the pair of arms is able to pivot with respect to the display unit housing.

In further examples:
- the positioning and stabilising structure comprises a pair of lateral connectors each connected between the frontal support portion and a respective one of the pair of arms;
- each lateral connector is elastically extendable;
- each lateral connector is adjustable in length;
- each lateral connector is fixedly connected to the frontal support portion and releasably attachable to a respective one of the arms;
- each lateral connector is connected to a respective one of the arms by a snap button, a clip or a hook-and-loop connection;
- each lateral connector is releasably attachable to the frontal support portion and releasably attachable to a respective one of the arms; and/or
- each lateral connector is releasably attachable to the frontal support portion and fixedly connected to a respective one of the arms.

3.8 Hair Strap Portion

A positioning and stabilizing structure for a head-mounted display system, the positioning and stabilizing structure configured to hold a head-mounted display unit in an operable position on the user's head in use, the positioning and stabilizing structure comprising:
- a posterior support portion configured to engage a posterior portion of a user's head;
- one or more anterior support portions configured to connect the posterior support portion and the head-mounted display unit in use; and
- a hair strap portion connected to the posterior support portion, the hair strap portion being positionable in use between the user's head and hair descending from the posterior portion of the user's head.

In examples:
- The one or more anterior support portions comprises a pair of lateral strap portions connecting the posterior support portion to the head-mounted display unit;
- the hair strap portion comprises a pair of ends connected to respective lateral sides of the posterior support portion;
- each end of the hair strap portion is located proximate the Frankfort horizontal plane of the user's head in use;

the hair strap portion is removably attachable at one or both ends to the posterior support portion;
the hair strap portion comprises a left strap portion and a right strap portion removably attached thereto;
the left strap portion is removably attached to the right strap portion proximate a sagittal plane of the user's head in use;
the hair strap portion is elastically extendable;
the hair strap portion is substantially non-extendable;
the posterior support portion comprises a parietal strap portion configured to overlie the parietal bones of the user's head in use and an occipital strap portion configured to overlie or lie below an occipital bone of the user's head in use;
the hair strap portion is connected to the occipital strap portion in use;
the hair strap portion is connected to the occipital strap portion proximate ends of the occipital strap portion.

3.9 Inwardly Biased Interfacing Structure

Another aspect of the present technology relates to an interfacing structure for a head-mounted display unit constructed and arranged to be in opposing relation with a user's face, the interfacing structure comprising:
a chassis comprising a main chassis portion configured to extend laterally across the user's face in use, and side chassis portions configured to extend in a generally posterior direction;
a face engaging portion connected about at a periphery of the chassis, the face engaging portion configured to contact the user's face in use;
wherein each of the side chassis portions is biased medially towards the user's head to bias the face engaging portion into contact with the user's head on each side of the user's head at or proximate the user's sphenoid bone.
In examples:
The chassis is flexible allowing the side chassis portions to be spread laterally to a splayed configuration by the user's head and biased medially towards an unsplayed configuration in use;
The side chassis portions are flexible so as to flex or pivot with respect to the main chassis portion allowing the side chassis portions to be spread laterally to a splayed configuration by the user's head and biased medially towards an unsplayed configuration in use;
The side chassis portions are able to flex or pivot with respect to the main chassis portion allowing the side chassis portions to be spread laterally to a splayed configuration by the user's head and biased medially towards an unsplayed configuration in use, each side chassis portion biased medially by a biasing component;
The biasing component comprises a spring element configured to pull each side chassis portion medially;
The biasing component comprises a spring element configured to push each side chassis portion medially;
The face engaging portion comprises a face engaging flange;
The face engaging flange curves inwardly from the chassis;
The face engaging flange is formed from silicone;
The chassis comprises at least one opening between the main chassis portion and each side chassis portion; and/or
the head-mounted display unit comprises a display unit housing, and an air pathway is provided between the interfacing structure and the display unit housing to the at least one opening.

3.10 Positioning and Stabilising Structure that Connects to Interfacing Structure Another aspect of the present technology relates to a head-mounted display system comprising:
a head-mounted display unit comprising:
a display unit housing comprising a display; and
an interfacing structure configured to contact the user's face in use;
a positioning and stabilising structure configured to hold the head-mounted display unit in an operable position on the user's head in use, the positioning and stabilising structure comprising:
a posterior support portion configured to engage a posterior portion of a user's head; and
a pair of lateral strap portions connected to the posterior support portion and configured to connect to the interfacing structure of the head-mounted display.

3.11 Positioning and Stabilising Structure Pulls Sides of Chassis Inwards

Another aspect of the present technology relates to a head-mounted display system comprising:
a head-mounted display unit comprising a display and an interfacing structure, the interfacing structure comprising:
a chassis comprising a main chassis portion configured to extend laterally across the user's face in use, and a pair of side chassis portions each configured to extend in a generally posterior direction from a respective lateral side of the main chassis portion;
a face engaging portion connected about at a periphery of the chassis, the face engaging portion configured to contact the user's face in use;
a positioning and stabilising structure configured to hold the head-mounted display unit in an operable position on the user's head in use, the positioning and stabilising structure comprising:
a posterior support portion configured to engage a posterior portion of a user's head;
a pair of lateral strap portions configured to connect the posterior support portion and the head-mounted display unit in use;
wherein in use the positioning and stabilising structure is connected to the head-mounted display unit such that in use the side chassis portions are urged medially towards the user's head by the lateral strap portions to urge the face engaging portion into contact with the user's head on each side of the user's head at or proximate the user's sphenoid bone.
In examples:
each lateral strap portion is configured to connect to a respective one of the side chassis portions;
each lateral strap portion is configured to pull the respective side chassis portion rearwardly causing the side chassis portion to flex or pivot medially to urge the face engaging portion into contact with the user's head at or proximate the user's sphenoid bone;
each lateral strap portion is configured to push the respective side chassis portion medially causing the side chassis portion to flex or pivot medially to urge the face engaging portion into contact with the user's head at or proximate the user's sphenoid bone;

each lateral strap portion is configured to push the respective side chassis portion medially via a substantially rigid member;

the posterior support portion comprises a parietal strap portion configured to overlie the parietal bones of the user's head in use and an occipital strap portion configured to overlie or lie below an occipital bone of the user's head in use;

the anterior support portion comprises a pair of upper lateral strap portions each configured to connect between the posterior support portion and the head-mounted display unit on a respective side of the user's head in use and a pair of lower lateral strap portions each configured to connect between the posterior support portion and the head-mounted display unit on a respective side of the user's head in use;

the upper lateral strap portions are each configured to apply a force to the head-mounted display unit having both a superior and posterior component;

the lower lateral strap portions are each configured to be removably connected to a respective side chassis portion with a magnetic connection; and/or the posterior support portion comprises a loop strap portion having a superior portion overlying the parietal bones of the user's skull and an inferior portion overlying the occipital bone of the user's skull.

Interfacing Structure Comprising Two or More Components

Another aspect of the present technology relates to a head-mounted display system, comprising:

a head-mounted display unit; and a positioning and stabilising structure structured and arranged to hold the head-mounted display unit in an operational position over a user's face in use, the head-mounted display unit comprising an interfacing structure constructed and arranged to be in opposing relation with the user's face, wherein the interfacing structure comprises a chassis and a face engaging portion, wherein at least a portion of the face engaging portion is configured to be releasably attached to the chassis.

Another aspect of the present technology relates to an interfacing structure for a head-mounted display unit constructed and arranged to be in opposing relation with a user's face, the interfacing structure comprising a chassis and a face engaging portion, wherein at least a portion of the face engaging portion is configured to be releasably attached to the chassis.

In examples:

the releasably attached portion(s) of the face engaging portion may be provided at discrete locations to the chassis;

the releasably attached portion(s) may be provided in one or more of: a forehead region, and/or one or more cheek regions, of the interfacing structure;

the releasably attached portion(s) of the interfacing structure may be provided to the entire periphery of the chassis, or at least a substantial portion thereof;

the releasably attached portion(s) of the interfacing structure may be made of one or more of: a foam material, an elastomeric material, a textile material, or a composite material;

the face engaging portion of the interfacing structure may comprise at least one elastomeric portion, and at least one foam portion;

the at least one foam portion may be attached to the interfacing structure such that the elastomeric portion covers the foam portion to provide a face engaging surface;

the at least one foam portion may be attached to the chassis, the elastomeric portion, or both the chassis and the elastomeric portion;

a portion of the face engaging portion of the interfacing structure may be permanently attached to the chassis;

spaces in the permanently attached portion of the face engaging portion may be provided in which the removeably attached portions may be positioned and attached relative to the chassis.

3.12 Offset Positioning and Stabilizing Structure

An aspect of the present technology relates to a head-mounted display system including a positioning and stabilising structure structured and arranged to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The support hoop comprises an offset configuration in which the posterior support portion is offset from the anterior support portion so that the first plane of the posterior support portion is arranged in a different plane to the second plane of the anterior support portion. In an example, the head-mounted display system may further comprise the display unit.

An aspect of the present technology relates to a positioning and stabilising structure to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The support hoop comprises an offset configuration in which the posterior support portion is offset from the anterior support portion so that the first plane of the posterior support portion is arranged in a different plane to the second plane of the anterior support portion.

An aspect of the present technology relates to a positioning and stabilising structure to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane, and each of the first plane of the posterior support portion and the second plane of the anterior support portion is adapted to extend transverse to the sagittal plane. The posterior support portion and the anterior support portion are moveable relative to each other into at least one offset configuration in which the posterior support portion is offset from the anterior support portion so that the first plane of the posterior support portion is arranged in a different plane to the second plane of the anterior support portion.

An aspect of the present technology relates to a head-mounted display system including a positioning and stabilising structure structured and arranged to hold a display unit in an operational position over a user's face. The positioning and stabilising structure includes a support hoop including a posterior support portion adapted to contact a posterior region of the user's head and an anterior support portion adapted to contact an anterior region of the user's head. The posterior support portion of the support hoop is adapted to extend in a first plane and the anterior support portion of the support hoop is adapted to extend in a second plane. Each of the first plane of the posterior support portion and the second plane of the anterior support portion is adapted to extend transverse to the sagittal plane. The posterior support portion and the anterior support portion are moveable relative to each other into at least one offset configuration in which the posterior support portion is offset from the anterior support portion so that the first plane of the posterior support portion is arranged in a different plane to the second plane of the anterior support portion. In an example, the head-mounted display system may further comprise the display unit.

In examples:
The head-mounted display system may further comprise an adjustment mechanism structured and arranged to allow selectable adjustment of the posterior support portion relative to the anterior support portion;
The adjustment mechanism may be structured and arranged to allow selectable adjustment between (1) an in-line configuration in which the first plane of the posterior support portion is arranged co-planar to the second plane of the anterior support portion, and (2) the at least one offset configuration;
The at least one offset configuration may form a spacing or displacement between the first plane and the second plane, and the adjustment mechanism allows selectable adjustment of the spacing or displacement;
The adjustment mechanism may allow angular adjustment of an angle formed between the first plane of the posterior support portion and the second plane of the anterior support portion;
The posterior support portion may comprise an elastic strap that is biased into contact with an occipital region of the user;
The posterior support portion may be configured and arranged engage the user's head along a portion of the occipital bone;
The anterior support portion may be configured and arranged to engage the user's head along an upper portion of the frontal bone;
The head-mounted display system may further comprise at least one connector structured and arranged to interconnect the posterior support portion and the anterior support portion to the display unit;
The posterior support portion and the anterior support portion in the offset configuration may create a moment configured to counter-act or resist a moment induced by the display unit;
The posterior support portion may comprise an elastic strap that is biased into contact with a portion of the occipital bone which creates an additional moment to counter-act or resist the moment induced by the display unit;
The display unit may comprise a housing containing a display that is visible to the user when the display unit is in the operational position, and an interfacing structure constructed and arranged to be in opposing relation with the user's face, the interfacing structure extending about the display and defining a viewing opening to the display;
The positioning and stabilising structure may further comprise a pair of central support structures, each of the pair of central support structures adapted to be positioned around a respective one of the user's ears, and wherein the display unit is rotatably connected to the pair of central support structures to enable the display unit to rotate relative to Frankfort horizontal; and/or
At least one of the anterior support portion and the posterior support portion may be rotatable relative to the pair of central support structures.

3.13 Ear Loop Positioning and Stabilizing Structure

An aspect of the present technology relates to a head-mounted display system including a positioning and stabilising structure structured and arranged to hold a display unit in an operational position over a user's face in use. The positioning and stabilising structure includes a support portion configured and arranged to accommodate a weight of the head-mounted display unit. The support portion comprises a pair of central support structures, each of the pair of central support structures adapted to be positioned around a respective one of the user's ears. In an example, the display unit may be rotatably connected to the pair of central support structures to enable the display unit to rotate relative to Frankfort horizontal. In an example, the head-mounted display system may further comprise the display unit.

An aspect of the present technology relates to a positioning and stabilising structure to hold a display unit in an operational position over a user's face. The positioning and stabilising structure includes a support portion configured and arranged to accommodate a weight of the display unit. The support portion comprises a pair of central support structures, each of the pair of central support structures adapted to be positioned around a respective one of the user's ears. The display unit is rotatably connected to the pair of central support structures to enable the display unit to rotate relative to Frankfort horizontal.

An aspect of the present technology relates to a head-mounted display system including a positioning and stabilising structure structured and arranged to hold a display unit in an operational position over a user's face in use. The positioning and stabilising structure includes a posterior support portion adapted to contact a posterior region of the user's head and an anterior support portion adapted to contact an anterior region of the user's head. The posterior support portion comprises a rigidiser that is substantially inextensible and substantially resilient. The rigidiser comprises a plurality of slots on at least one side of the rigidiser, and the plurality of slots form a plurality of hinges. In an example, the head-mounted display system may further comprise the display unit.

3.14 Hinge Portions

An aspect of the present technology relates to a head-mounted display system including a positioning and stabilising structure structured and arranged to hold a display unit in an operational position over a user's face in use. The positioning and stabilising structure includes a posterior support portion adapted to contact a posterior region of the user's head and an anterior support portion adapted to contact an anterior region of the user's head. The posterior support portion comprises a rigidiser that is substantially inextensible and substantially resilient. The rigidiser comprises a plurality of slots on at least one side of the rigidiser, and the plurality of slots form a plurality of hinges. In an example, the head-mounted display system may further comprise the display unit.

An aspect of the present technology relates to a positioning and stabilising structure to hold a display unit in an operational position over a user's face. The positioning and stabilising structure includes a posterior support portion adapted to contact a posterior region of the user's head and an anterior support portion adapted to contact an anterior region of the user's head. The posterior support portion comprises a rigidiser that is substantially inextensible and substantially resilient. The rigidiser comprises a plurality of slots on at least one side of the rigidiser, and the plurality of slots form a plurality of hinges.

3.15 Force Distribution

An aspect of the present technology relates to a head-mounted display system including a positioning and stabilising structure structured and arranged to hold the display unit in an operational position over a user's face in use and an interfacing structure for the display unit constructed and arranged to be in opposing relation with the user's face. The interfacing structure comprises a substantially continuous face engaging surface adapted to contact the user's face around a periphery of the user's eyes. The interfacing structure comprises silicone. The interfacing structure is configured and arranged such that force applied to the user's face is distributed around the periphery thereof. The interfacing structure comprises a first compliance at a first region and a second compliance at a second region, wherein the first region and the second region are configured around the periphery of the interfacing structure to allow selective distribution of the force onto the user's face. In an example, the head-mounted display system may further comprise the display unit.

An aspect of the present technology relates to an interfacing structure for a display unit constructed and arranged to be in opposing relation with a user's face. The interfacing structure comprises a substantially continuous face engaging surface adapted to contact the user's face around a periphery of the user's eyes. The interfacing structure comprises silicone. The interfacing structure is configured and arranged such that force applied to the user's face is distributed around the periphery thereof. The interfacing structure includes a first compliance at a first region and a second compliance at a second region, wherein the first region and the second region are configured around the periphery of the interfacing structure to allow selective distribution of the force onto the user's face.

3.16 Side Arms Inside of Housing Periphery

Another aspect of the present technology relates to a head-mounted display system comprising:
a head-mounted display unit;
a positioning and stabilising structure structured and arranged to hold the head-mounted display unit in an operational position over a user's face in use, the positioning and stabilising structure comprising:
a posterior support portion configured to engage a posterior portion of a user's head;
a pair of lateral strap portions configured to connect between the posterior support portion and the head-mounted display unit, each configured to be located on a respective lateral side of the user's head in use;
wherein the head-mounted display unit comprises:
a display unit housing comprising a display;
an interfacing structure configured to contact the user's face in use;
a pair of arms, each arm extending posteriorly from the display unit housing, the arms each being configured for attachment to a respective one of the lateral strap portions of the positioning and stabilising structure;
wherein the display unit housing has a posterior side having a periphery, each of the arms extending from the display unit housing from within the periphery of the posterior side of the display unit housing.

Another aspect of the present technology relates to a head-mounted display unit therefor.

In examples:

The interfacing structure has a periphery, and each of the arms is located between the periphery of the posterior side of the display unit housing and the periphery of the interfacing structure;

Each of the arms comprises an eyelet configured to receive a respective one of the lateral strap portions of the positioning and stabilising structure;

The eyelet of each arm is located at or proximate a posterior end of the respective arm;

Each of the pair of arms is able to pivot with respect to the display unit housing;

Each of the arms is configured to pivot about a horizontal axis perpendicular to the sagittal plane of the user's head in use;

Each of the arms is configured to pivot through an angular range of at least 9 degrees;

The angular range is at least 19 degrees;

Each of the arms has a predetermined resistance to pivotal movement with respect to the display unit housing;

Each of the arms is configured to pivot between a plurality of predetermined incremental orientations, the predetermined resistance to pivotal movement being required to be overcome before the arms are able to pivot from one predetermined incremental orientation to another;

The display unit housing comprises a plurality of recesses corresponding to the predetermined incremental orientations, each of the arms comprises a protrusion configured to fit to each of the recesses;

Each of the arms is connected to the display unit housing such that a predetermined static torque resistance is required to be overcome for each arm to pivot with respect to the display unit housing;

The predetermined static torque resistance is provided by static friction;

The head-mounted display system comprises a pair of friction rings, each of which is mounted in contact with a respective one of the arms and with an adjacent surface within the head-mounted display unit to provide static friction required to be overcome for each arm to pivot with respect to the display unit housing;

Each of the arms is attached to a respective one of a pair of arm mounting portions, the display unit housing comprises a pair of lateral portions on opposing lateral sides of the display unit housing, each of the arm mounting portions being attached to a medial side of a respective one of the lateral portions;

Each of the arms is located between a respective arm mounting portion and a respective lateral portion of the display unit housing;

Each of the arms has a transverse cross sectional shape comprising a major axis and a minor axis, each arm being larger in the major axis than in the minor axis, wherein at a point along the length of each arm located interior to the display unit housing, the major axis is oriented at an oblique angle to the sagittal plane of the user's head in use;

At the point along the length of each arm located interior to the display unit housing, the major axis of the transverse cross sectional shape has a superomedial-inferolateral orientation in use;

Each of the arms is shaped such that the major axis of the transverse cross section changes orientation along the length of the arm; and/or At a point along the length of each arm located exterior to the display unit housing, the major axis is oriented substantially parallel to the sagittal plane of the user's head in use.

3.17 Headgear Buckle Integrated into Interface Structure

Another aspect of the present technology relates to a head-mounted display system, comprising:
a head-mounted display unit; and
a positioning and stabilising structure structured and arranged to hold the head-mounted display unit in an operational position over a user's face in use, the positioning and stabilising structure comprising:
  a posterior support portion configured to engage a posterior portion of a user's head; and
  a pair of lateral strap portions configured to connect between the posterior support portion and the head-mounted display unit, each configured to be located on a respective lateral side of the user's head in use;
  a top strap portion configured to connect between the posterior support portion and the head-mounted display unit;
wherein the head-mounted display unit comprises:
  a display unit housing; and
  an interfacing structure constructed and arranged to be in opposing relation with the user's face, the interfacing structure comprising:
    a face-engaging portion configured to engage the user's face in use; and
    a chassis connected to the face-engaging portion, the chassis further connected to the display unit housing to attach the interfacing structure to the display unit housing;
    wherein the chassis is configured for attachment to the top strap portion.

Another aspect of the present technology relates to a head-mounted display unit therefor.

In examples:
The chassis comprises an eyelet through which the top strap portion is able to be looped back and secured to itself;
The eyelet is formed by both the chassis and the display unit housing such that the top strap portion is able to be looped around both a portion of the chassis and a portion of the display unit housing;

The eyelet is formed in a superiorly projecting portion of the chassis; and/or
The superiorly projecting portion projects through an opening in the display unit housing.

3.18 Lateral Occipital Strap Portions Attached Using Releasable Fasteners

Another aspect of the present technology relates to a head-mounted display system comprising:
a head-mounted display unit comprising a display;
a positioning and stabilising structure configured to hold the head-mounted display unit in an operable position on the user's head in use, the positioning and stabilizing structure comprising:
  a posterior support portion configured to engage a posterior portion of a user's head, the posterior support portion comprising:
    a parietal strap portion configured to overlie the parietal bones of the user's head in use;
    a medial occipital portion configured to overlie or lie below an occipital bone of the user's head in use;
    a pair of lateral occipital strap portions configured to connect between the parietal strap portion and the medial occipital portion, each lateral occipital strap portion configured to be located on a respective lateral side of the user's head in use;
  a pair of lateral strap portions configured to connect between the posterior support portion and the head-mounted display unit, each configured to be located on a respective lateral side of the user's head in use; and
  a top strap portion configured to connect between the posterior support portion and the head-mounted display unit, the top strap portion configured to overlie a superior portion of the user's head in use;
  wherein each of the pair of lateral occipital strap portions is configured to be releasably attached to the medial occipital portion.

In examples:
The head-mounted display system comprises a battery pack for powering the head-mounted display system, the battery pack configured to be located posteriorly to the user's head in use;
The battery pack is configured to be connected to the top strap portion in use;
The medial occipital portion comprises an occipital rigidiser;
The medial occipital portion forms part of the top strap portion of the positioning and stabilising structure;
The medial occipital portion comprises a medial occipital portion strap;
The medial occipital portion forms a substantially inextensible layer of the top strap portion;
The medial occipital portion is permanently attached within the top strap portion;
The medial occipital portion is permanently attached to a user-facing layer of the top strap portion;
The positioning and stabilising structure comprises a releasable fastener between each of the pair of lateral occipital strap portions and the medial occipital portion;
Each releasable fastener comprises a fastener portion configured to be attached to a corresponding connection point;

The medial occipital portion comprises a pair of connection points configured to connect to corresponding fastener portions provided to the respective lateral occipital strap portions;

Each releasable fastener comprises a magnetic fastener;

Each magnetic fastener comprises a magnetic clip portion configured to magnetically attach to a respective one of the connection points;

Each of the pair of lateral occipital strap portions are configured to be adjustable in length; and/or Each releasable fastener comprises an eyelet, and a portion of each of the pair of lateral occipital strap portions is threaded through a respective one of the eyelets and fastened back onto itself.

3.19 Washable User-Contacting Layer Separable from Outer Layer of Top Strap Portion Another aspect of the present technology relates to a head-mounted display system comprising:
a head-mounted display unit comprising a display;
a positioning and stabilising structure configured to hold the head-mounted display unit in an operable position on the user's head in use, the positioning and stabilizing structure comprising:
  a posterior support portion configured to engage a posterior portion of a user's head, the posterior support portion comprising a parietal strap portion configured to overlie the parietal bones of the user's head in use and an occipital strap portion configured to overlie or lie below an occipital bone of the user's head in use;
  a pair of lateral strap portions configured to connect between the posterior support portion and the head-mounted display unit, each configured to be located on a respective lateral side of the user's head in use;
  a top strap portion configured to connect between the posterior support portion and the head-mounted display unit, the top strap portion configured to overlie a superior portion of the user's head in use, the top strap portion comprising a user-facing layer and an outer layer;
  wherein the user-facing layer of the top strap portion, the parietal strap portion, the occipital strap portion and lateral strap portions are separable from the outer layer of the top strap portion.

In examples:

The user-facing layer of the top strap portion, the parietal strap portion, the occipital strap portion and lateral strap portions form a washable portion, the washable portion being separable from the outer layer of the top strap portion for washing;

The top strap portion comprises a substantially inextensible layer located between the outer layer and the user-facing layer in use;

The washable portion is separable from the substantially inextensible layer;

The head-mounted display system comprises a battery pack for powering the head-mounted display system, the battery pack configured to be located posteriorly to the user's head in use, the top strap portion being connected to the battery pack in use;

The top strap portion comprises a sleeve forming the outer layer, the substantially inextensible layer being located within the sleeve;

The sleeve is connected to the battery pack;

The head-mounted display system comprises a power cable connected between the battery pack and the head-mounted display unit, the power cable located within the sleeve;

The washable portion is releasably attached to the sleeve with one or more hook and loop fastenings; and/or The outer layer of the top strap portion is configured to connect to the head-mounted display unit.

Further disclosed is a head mounted-display system including a positional and stabilising structure and/or an interfacing structure in any form described above, and a display unit connected thereto.

3.20 One-Piece Construction

Another aspect of the present technology is directed to a head-mounted display system comprising:
a head mounted display unit comprising a display; and
a positioning and stabilising structure configured to hold the head-mounted display unit in an operable position on the user's head in use, the positioning and stabilizing structure comprising:
  headgear including at least one strap configured to contact the user's head, in use,
wherein the head mounted display unit and at least a portion of the positioning and stabilizing structure is formed from a one piece construction of textile material.

In examples:

The one piece construction can be one piece of continuous textile (e.g., of a homogeneous base material);

The one piece of continuous textile may include discrete portions that are treated or otherwise include certain attributes that are specific for a given engagement area with the user's head;

The at least one strap includes a magnetic section;

The magnetic section is a first magnetic section, and the at least one strap further includes a second magnetic section that has an opposite polarity as the first magnetic section;

The headgear includes a pair of ear pieces each configured to partly or fully surround the ear of the user;

The head mounted display system comprises a posterior support portion configured to engage a posterior portion of a user's head;

The posterior support portion comprises a parietal strap portion configured to overlie the parietal bones of the user's head in use and an occipital strap portion configured to overlie or lie below an occipital bone of the user's head in use;

The at least one strap includes a pair of lateral strap portions configured to connect between a posterior support portion and the head-mounted display unit;

Each lateral strap of the pair of lateral straps is configured to be located on a respective lateral side of the user's head in use;

The at least one strap includes a top strap portion is configured to connect between a posterior support portion and the head-mounted display unit;

The top strap portion configured to overlie a superior portion of the user's head in use;

The top strap portion comprises a user-facing layer and an outer layer;

The at least one strap includes a rigidized portion that includes at least one thread that is more rigid than at least one other thread of the one piece construction of textile material;

The head mounted display system comprises a display unit housing for housing the display and a user interfacing structure connected to the display unit housing and configured to contact the user's face in use;

The display unit housing and the at least a portion of the positioning and stabilizing structure is formed from a one piece construction of textile material;

The display unit housing is removably connected to the user interfacing structure;

A magnetic coupling guides the display unit housing and the user interfacing structure towards a connected position, and/or releasably connects the display unit housing and the user interfacing structure;

The magnetic coupling includes at least a first magnetic portion on the display unit housing and at least a second magnetic portion on the user interfacing structure of opposite polarity to the first magnetic portion, the first and second magnetic portions being arranged so that the display unit housing and the user interfacing structure are attracted to one another when they are oriented in a proper assembly position, and they are repelled from one another when the display unit housing and the user interfacing structure are not oriented in the proper assembly position;

The first magnetic portion includes a first magnet and/or a first magnetic thread incorporated into the one piece construction of textile material of the display unit housing;

The second magnetic thread includes a fully formed perimeter on the user interfacing structure;

The display unit housing and the positioning and stabilising structure are connected together with a seamless joint;

The user interfacing structure includes textile material forming a bellows that is configured to fold or expand under predetermined conditions; and/or The headgear includes a stretchable portion and a relatively non-stretchable portion.

3.21 Adaptive Materials

Another aspect of the present technology is directed to a head-mounted display system comprising:

a head mounted display unit comprising a display; and a positioning and stabilising structure configured to hold the head-mounted display unit in an operable position on the user's head in use, the positioning and stabilizing structure comprising:

headgear including at least one strap configured to contact the user's head, in use, wherein the head mounted display unit and/or the positioning and stabilising structure includes an adaptive portion that adjusts based on usage conditions.

In examples:

The adaptive portion includes a swellable material that increases in size upon absorption of moisture;

The swellable material includes swellable foam;

The swellable material is polyurethane;

The head mounted display system comprises a posterior support portion configured to engage a posterior portion of a user's head;

The posterior support portion comprises a parietal strap portion configured to overlie the parietal bones of the user's head in use and an occipital strap portion configured to overlie or lie below an occipital bone of the user's head in use;

The at least one strap includes a pair of lateral strap portions is configured to connect between a posterior support portion and the head-mounted display unit;

Each lateral strap of the pair of lateral straps is configured to be located on a respective lateral side of the user's head in use;

The at least one strap includes a top strap portion is configured to connect between a posterior support portion and the head-mounted display unit;

The top strap portion configured to overlie a superior portion of the user's head in use;

The top strap portion comprising a user-facing layer and an outer layer;

The at least one strap includes a rigidized portion that includes at least one thread that is more rigid than at least one other thread of the one piece construction of textile material;

The head mounted display unit comprises a display unit housing for housing the display and a user interfacing structure connected to the display unit housing and configured to contact the user's face in use;

The swellable material is disposed on an outer edge of the user interfacing structure;

One of the user interfacing structure and the display unit housing includes a rigid support that is configured to bias expansion of the swellable material toward the user's face;

The swellable material returns to approximately its original size with evaporation of moisture;

The user interfacing structure includes the swellable material and a non-swellable material, the non-swellable material extending around a portion of the swellable material in order to direct the expansion of the swellable material;

The non-swellable material is a non-swellable thread sewn around a portion of the swellable material;

The adaptive portion includes a heat activated material that increases in size upon application of heat;

The heat activated material is activated between 85° F. and 110° F.;

The heat activated material is activated between 90° F. and 100° F.;

The heat activated material returns to approximately its original size with removal of heat;

The heat activated material is disposed on an outer edge of the user interfacing structure;

The user interfacing structure includes the heat activated material and a non-heat activated material, the non-heat activated material extending around a portion of the heat activated material in order to direct the expansion of the heat activated material;

The non-heat activated material is a non-heat activated thread sewn around a portion of the heat activated material;

The heat activated material has a closed cell foam structure;

The adaptive portion includes an auxetic material that increases in size upon application of tension;

The auxetic material increases in size in a direction substantially perpendicular to a direction of tension;

The auxetic material includes a thread having auxetic properties;

The auxetic material on the head mounted display unit (e.g., the user interfacing portion and/or the display unit housing) is substantially aligned with tension of the at least one strap of the positioning and stabilising structure;

The user interfacing structure includes a rigidizer or a rigidized portion that is positioned to abut the auxetic material, such that the user interfacing structure is biased in a direction toward the user upon the application of tension to the auxetic material, whilst restraining the auxetic material from expanding in at least one other direction;

The rigidizer or the rigidized portion includes a thread having a stiffness greater than the auxetic material;

The auxetic material includes auxetic foam;

The auxetic material is polyurethane;

The auxetic material is disposed on an outer edge of the user interfacing structure;

The auxetic material returns to approximately its original size with removal of tension;

The adaptive portion is structured to increase in size over time, based on tension, heat and/or moisture, to enhance sealing between the head mounted display unit (e.g., the user interfacing structure) and the user's face in use;

The user interfacing structure includes at least one fold forming a bellows;

The bellows folds or expands in a predetermined manner based on the application of a predetermined tension, heat or moisture;

The positioning and stabilising structure includes the adaptive portion, and the usage conditions include tension, heat, and moisture;

The at least one strap includes an auxetic material;

A rigid or stiffened portion (e.g., a metal wire or a stiffened thread) may be positioned within the adaptive portion; and/or The rigid or stiffened portion may limit the amount of compression and/or expansion of the adaptive portion.

Another aspect of the present technology is directed to a positioning and stabilising structure configured to hold a head mounted display unit of a head mounted display system in an effective position against the user's head, the positioning and stabilising structure comprising:

headgear having at least one strap;

wherein the at least one strap has an adaptive portion that adjusts based on usage conditions.

3.22 Magnetic Materials

Another aspect of the present technology is directed to a head-mounted display system comprising:

a head mounted display unit comprising a display; and a positioning and stabilising structure configured to hold the head-mounted display unit in an operable position on the user's head in use, the positioning and stabilizing structure comprising:

headgear including at least one strap configured to contact the user's head, in use;

wherein the positioning and stabilizing structure and/or the head mounted display unit includes and/or is formed of a textile material; and wherein the textile material includes at least one magnetic thread constructed of magnetic material to provide a magnetic interaction between a first part of the head mounted display system and a second part of the head mounted display system.

In examples:

The head mounted display system comprises a posterior support portion configured to engage a posterior portion of a user's head;

The posterior support portion comprises a parietal strap portion configured to overlie the parietal bones of the user's head in use and an occipital strap portion configured to overlie or lie below an occipital bone of the user's head in use;

The at least one strap includes a pair of lateral strap portions is configured to connect between a posterior support portion and the head-mounted display unit;

Each lateral strap of the pair of lateral straps is configured to be located on a respective lateral side of the user's head in use;

The at least one strap includes a top strap portion is configured to connect between a posterior support portion and the head-mounted display unit;

The top strap portion configured to overlie a superior portion of the user's head in use;

The top strap portion comprising a user-facing layer and an outer layer;

The at least one strap includes a rigidized portion that includes at least one thread that is more rigid than at least one other thread of the one piece construction of textile material;

The head mounted display unit comprises a display unit housing for housing the display and a user interfacing structure connected to the display unit housing and configured to contact the user's face in use;

The first part is the display unit housing and the second part is the user interfacing structure, the first part magnetically attracted to the second part;

The at least one strap has a first end and a second end that are connected in length adjustable fashion (e.g., the position of the first end with respect to the second end may change in order to adjust the overall length of the at least one strap), the first end is the first part and has the at least one magnetic thread;

The positioning and stabilising structure includes a sleeve though which the at least one strap can be inserted and double-backed on itself for length adjustment;

A section of the at least one strap is spaced apart from the first end and includes a second magnetic material attracted to the first part in order to retain the length adjustment from the at least one strap;

The positioning and stabilising structure includes a strap with the at least one magnetic thread, and a clip structure through which the strap is threaded, and the head mounted display unit includes a projection that releasably attaches to the clip structure;

The first part is the head mounted display unit and the second part is the positioning and stabilising structure, the first part magnetically attracted to the second part;

One of the display unit housing and the user interfacing structure includes a first material, and the other of the display unit housing and the user interfacing structure includes the at least one magnetic thread attracted to the first material;

The at least one magnetic thread is sewn around at least a portion of a perimeter of the user interfacing structure;

The at least one magnetic thread is sewn entirely around the user interfacing structure; and/or The positioning and stabilising structure includes a lateral arm though which the at least one strap can be inserted and double-backed on itself for length adjustment.

Another aspect of the present technology is directed to a positioning and stabilising structure configured to hold a head mounted display unit of a head mounted display system in an effective position against the user's head, the positioning and stabilising structure comprising:

headgear having at least one strap that includes at least one magnetic thread constructed of magnetic material adapted to provide a magnetic interaction.

3.23 Treatment-Induced Stiffness

Another aspect of the present technology is directed to a head-mounted display system comprising:
- a head mounted display unit comprising a display;
- a positioning and stabilising structure configured to hold the head-mounted display unit in an operable position on the user's head in use, the positioning and stabilizing structure comprising:
  - headgear including at least one strap configured to contact the user's head, in use; and
- a stiffener coupled to the head mounted display unit and/or the positioning and stabilising structure;
- wherein the head mounted display unit and/or the positioning and stabilising structure is constructed from a first textile material, and wherein the stiffener is constructed from a second textile material configured, upon application of treatment, to have a treatment-induced stiffness that is greater than a stiffness of the first textile material.

In examples:
The head mounted display system comprises a posterior support portion configured to engage a posterior portion of a user's head;
The posterior support portion comprises a parietal strap portion configured to overlie the parietal bones of the user's head in use and an occipital strap portion configured to overlie or lie below an occipital bone of the user's head in use;
The at least one strap includes a pair of lateral strap portions is configured to connect between a posterior support portion and the head-mounted display unit;
Each lateral strap of the pair of lateral straps is configured to be located on a respective lateral side of the user's head in use;
The at least one strap includes a top strap portion is configured to connect between a posterior support portion and the head-mounted display unit;
The top strap portion configured to overlie a superior portion of the user's head in use;
The top strap portion comprising a user-facing layer and an outer layer;
The head mounted display unit comprises a display unit housing for housing the display and a user interfacing structure connected to the display unit housing and configured to contact the user's face in use;
The second textile material is a rigidized thread;
The stiffness of the first textile material is not affected by the application of the treatment;
The second textile material is configured to increase in stiffness with the application of a laser treatment, a heat treatment, and/or a pressure treatment;
The length of time the treatment is applied affects the resulting stiffness of the second textile material;
The second textile material has a stiffness greater than the stiffness of the first textile material before the application of the treatment;
The second textile material is a thermoplastic material;
The at least one strap includes a left side strap, the second textile material positioned along a length of the left side strap;
The at least one strap further including a right side strap opposite the left side strap, the second textile material positioned along a length of the right side strap substantially equivalent to the length of the left side strap;
The second textile material is configured, once treated, to limit deformation along the length of the left side strap;
The second textile material includes a first portion and a second portion spaced apart from the first portion, the first textile material configured to deform in locations without the second textile material;
The positioning and stabilising structure includes ear pieces that define a hole, wherein each ear piece is configured to receive a user's ear in use, the second textile material positioned around at least a portion of each ear piece;
Each ear piece includes a first section of the second textile material and a second section of the second textile material spaced apart from the first section, so that, in use, each ear piece is configured to deform in a first direction with an application of a force, and is configured to remain static in a second direction with the application of the force;
The second textile material is positioned along a length of the occipital strap portion;
The user interfacing structure includes the second textile material that is positioned around at least a portion of a user interfacing structure perimeter; and/or
The second textile material is configured to be a tie that is coupled to the first textile material and is configured to assist the first textile material in retaining its shape under application of a force.

Another aspect of the present technology is directed to a positioning and stabilising structure configured to hold a head mounted display unit of a head mounted display system in an effective position against the user's head, the positioning and stabilising structure comprising:
- a left side strap including a first end configured to be coupled to the head mounted display unit and a second end opposite the first end; and
- a right side strap including a first end configured to be coupled to the head mounted display unit and a second end opposite the first end;
- wherein the left side strap and the right strap are at least partially constructed from a first textile material; and
- wherein at least one of the left and right side straps includes a stiffener constructed from second textile material configured, upon application of a treatment, to have a treatment-induced stiffness that is greater than a stiffness of the first textile material.

Another aspect of the present technology is directed to a method of manufacturing a positioning and stabilising structure configured to maintain a head mounted display unit of a head mounted display in an effective position on a head of a user by, the method comprising:
- constructing a positioning and stabilising structure from a first textile material, the positioning and stabilising structure including headgear having at least one strap;
- connecting a first stiffener to a first portion of the at least one strap, the first stiffener constructed from a second textile material configured, upon application of a treatment, to have a treatment-induced stiffness that is greater than a stiffness of the first textile material;
- connecting a second stiffener to a second portion of the at least one strap, the second stiffener being spaced apart from the first stiffener, the second stiffener constructed from the second textile material; and selectively applying the treatment to the second textile material, wherein the second textile material reaches the treatment-induced stiffness; and wherein subsequent the applying the treatment, the first stiffener and/or the second stiffener configured to maintain a length of at least a portion of the at least one strap.

In examples:

The treatment is a laser treatment, a pressure treatment, a chemical treatment, and/or a heat treatment;

The method includes scanning the user's face to determine locations of the at least one strap to stiffen, and selectively applying the treatment to stiffen the determined locations; and/or Connecting further comprises sewing the first stiffener and/or the second stiffener into the at least one strap.

3.24 Self-Cleaning Materials

Another aspect of the present technology is directed to a head-mounted display system comprising:

a head mounted display unit comprising a display;

a positioning and stabilising structure configured to hold the head-mounted display unit in an operable position on the user's head in use, the positioning and stabilizing structure comprising:

headgear including at least one strap configured to contact the user's head, in use; and wherein at least one of the head mounted display unit and the positioning and stabilising structure include a self-cleaning textile material; and wherein the textile material includes a surface structure that limits adhesion of debris.

In examples:

The head mounted display system comprises a posterior support portion configured to engage a posterior portion of a user's head;

The posterior support portion comprises a parietal strap portion configured to overlie the parietal bones of the user's head in use and an occipital strap portion configured to overlie or lie below an occipital bone of the user's head in use;

The at least one strap includes a pair of lateral strap portions is configured to connect between a posterior support portion and the head-mounted display unit;

Each lateral strap of the pair of lateral straps is configured to be located on a respective lateral side of the user's head in use;

The at least one strap includes a top strap portion is configured to connect between a posterior support portion and the head-mounted display unit;

The top strap portion is configured to overlie a superior portion of the user's head in use;

The top strap portion comprising a user-facing layer and an outer layer;

The head mounted display unit comprises a display unit housing for housing the display and a user interfacing structure connected to the display unit housing and configured to contact the user's face in use;

The surface structure includes a microstructure;

The textile material includes a hydrophilic surface;

The textile material is configured to allow water to lift the debris off of the textile material, and remove the debris as the water moves off of the textile material;

The surface structure is rough and is configured to prevent adhesion of debris;

the textile material is coated with a layer of silver that contributes to the microstructure and increases surface roughness, the layer of silver interfering with a formation of a biofilm on the textile material;

The surface structure is smooth and limits a formation of a biofilm;

A photocatalytic layer is formed on the textile material;

The photocatalytic layer is made of titanium dioxide;

The photocatalytic layer is configured to be activated when exposed to UV light;

The user interfacing structure includes the surface structure;

The textile material includes a nano-membrane;

The head mounted display unit and/or the positioning and stabilising structure includes an exterior surface configured to face a user's skin or ambient; an interior surface positioned opposite the exterior surface and at least partially isolated from the user's skin and the ambient; and wherein the exterior surface and/or the interior surface include the self-cleaning textile material;

A cleaning receptacle comprises: a housing defining an interior cavity configured to house the head mounted display system; a lid selectively enclosing the interior cavity; and an inactivation agent configured to inactivate biofilm from the textile material;

The cleaning module is a UV light source and the inactivation agent is UV light; and/or The inactivation agent is configured to interact with the photocatalytic layer on the textile material.

Another aspect of the present technology is directed to a positioning and stabilising structure configured to hold a head mounted display unit of a head mounted display system in an effective position against the user's head, the positioning and stabilising structure comprising:

headgear having at least one strap that includes a self-cleaning textile material; and wherein the textile material includes a surface structure that limits adhesion of debris.

Another aspect of the present technology is directed to a cleaning receptacle comprising:

a housing defining an internal cavity and configured to house a head mounted display unit;

a lid for selectively enclosing the internal cavity; and a cleaning module selectively provides an inactivation agent to the internal cavity and clean the head mounted display unit; and wherein the cleaning module is configured to provide the inactivation agent.

In examples:

The cleaning module is a UV light source and the inactivation agent is UV light;

The inactivation agent is configured to interact with the photocatalytic material within the internal cavity;

The inactivation agent is configured to inactivate biofilm from the internal cavity;

The cleaning receptacle includes a sensor;

The sensor determines a quantity of inactivation agent to release into the interior cavity;

The sensor is configured to detect imperfections in the head mounted display unit;

The sensor is coupled to the lid;

The housing further includes a control configured to operate the cleaning module at a desired control pattern;

The housing further includes a button to allow for user input, the button configured to allow the user to select the desired control pattern;

The housing includes a connection port for selectively receiving a communication cable, the control configured to transmit and/or receive data through the connection port;

The lid includes an open position configured to allow ingress to the internal cavity, and a closed position configured to prevent ingress to the internal cavity; and/or The cleaning module is configured to release negative air ions to assist with the removal of biofilm from the user interface.

Another aspect of the present technology is directed to a head-mounted display system comprising:

a head mounted display unit comprising a display;

a positioning and stabilising structure configured to hold the head-mounted display unit in an operable position on the user's head in use, the positioning and stabilizing structure comprising:

headgear including at least one strap configured to contact the user's head, in use; and wherein at least one of the head mounted display unit and the positioning and stabilising structure includes a textile material with a surface structure including, a first peak, a second peak spaced apart from the first peak, and a valley disposed between the first peak and the second peak; and wherein a width of the valley limits debris from settling in the valley and limits adhesion of debris to the textile.

In examples:

The head mounted display system comprises a posterior support portion configured to engage a posterior portion of a user's head;

The posterior support portion comprises a parietal strap portion configured to overlie the parietal bones of the user's head in use and an occipital strap portion configured to overlie or lie below an occipital bone of the user's head in use;

The at least one strap includes a pair of lateral strap portions is configured to connect between a posterior support portion and the head-mounted display unit;

Each lateral strap of the pair of lateral straps is configured to be located on a respective lateral side of the user's head in use;

The at least one strap includes a top strap portion is configured to connect between a posterior support portion and the head-mounted display unit;

The top strap portion is configured to overlie a superior portion of the user's head in use;

The top strap portion comprising a user-facing layer and an outer layer;

The head mounted display unit comprises a display unit housing for housing the display and a user interfacing structure connected to the display unit housing and configured to contact the user's face in use;

The first peak and/or the second peak include a hydrophilic material;

The valley includes a hydrophobic material;

Silver is coupled to the first peak and/or the second peak, the silver is configured to interfere with the formation of debris on the textile;

A photocatalytic material is applied to at least a portion of the surface structure;

The photocatalytic material is applied to the first peak and the valley;

The valley is configured to allow water to lift debris off of the textile material, further limiting adhesion of debris;

The first peak and the second peak are different lengths (e.g., measured in a direction substantially perpendicular to a peak-to-peak direction); and/or The first peak overlaps at least a portion of the second peak.

Another aspect of the present technology is directed to a positioning and stabilising structure configured to hold a head mounted display unit of a head mounted display system in an effective position against the user's head, the positioning and stabilising structure comprising:

headgear having at least one strap that includes a self-cleaning textile material; and wherein at the at least one strap includes a textile material with a surface structure including, a first peak, a second peak spaced apart from the first peak, and a valley disposed between the first peak and the second peak; and wherein a width of the valley limits debris from settling in the valley and limits adhesion of debris to the textile.

4 BRIEF DESCRIPTION OF THE DRAWINGS

The present technology is illustrated by way of example, and not by way of limitation, in the figures of the accompanying drawings, in which like reference numerals refer to similar elements including:

4.1 Facial Anatomy

Figure 1A:
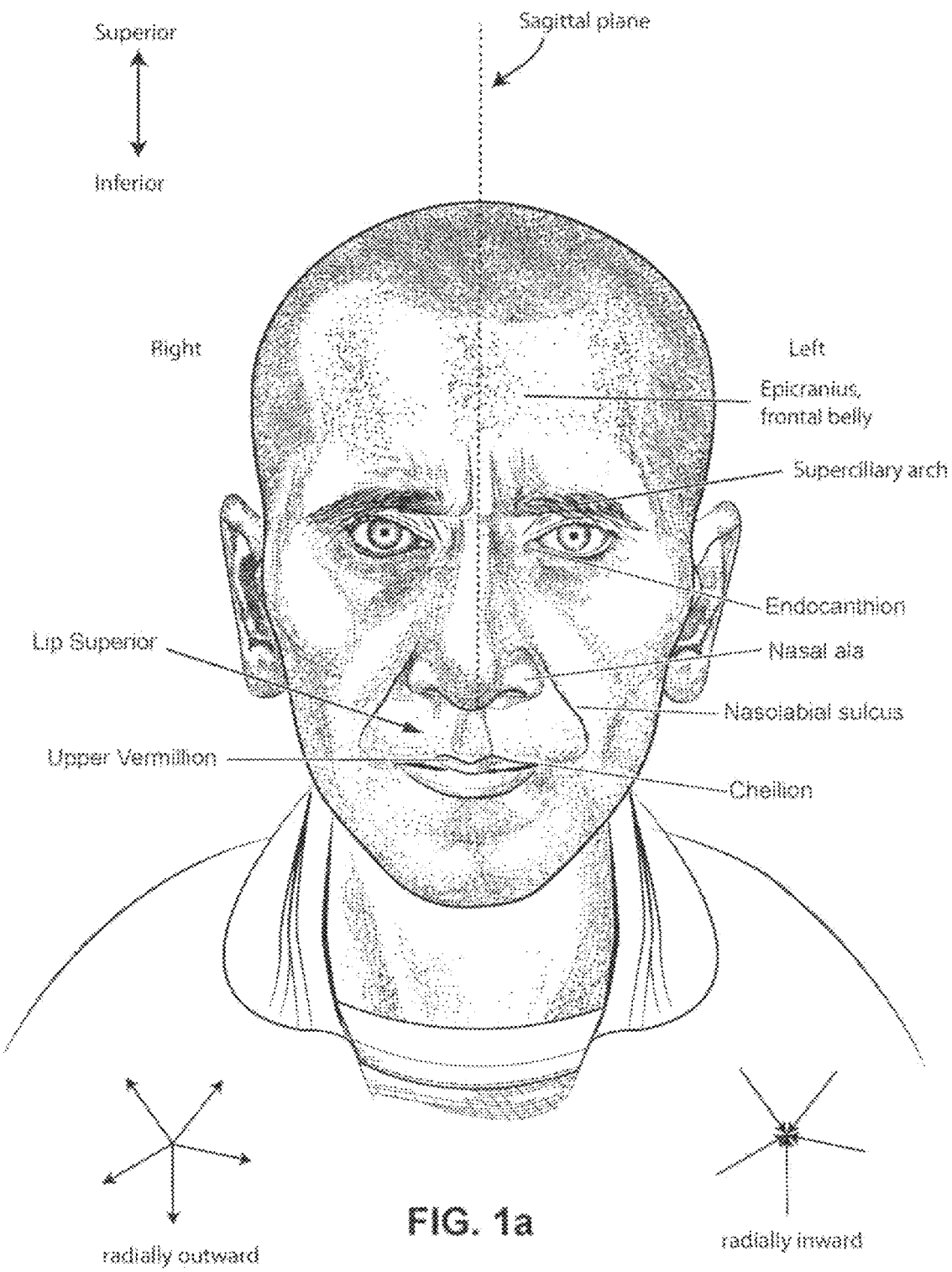
FIG. 1a is a front view of a face with several features of surface anatomy identified including the endocanthion, superciliary arch and epicranius, lip superior, upper vermilion, nasal ala, nasolabial sulcus and cheilion. Also indicated is the left and right side of the sagittal plane and the directions superior, inferior, radially inward and radially outward.
Figure 1B:
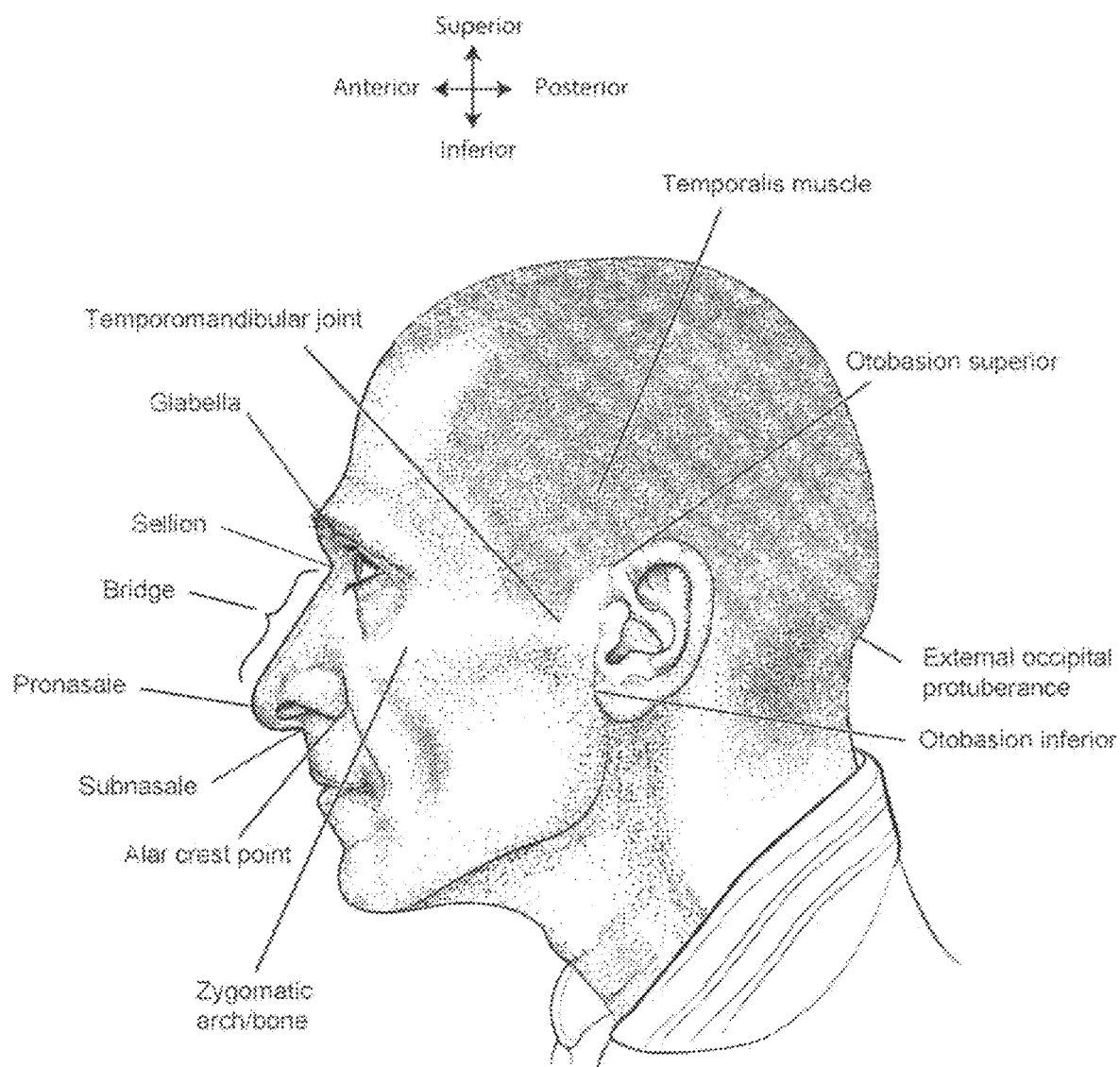
FIG. 1b is a side view of a head with several features of surface anatomy identified including the temporomandibular joint, glabella, sellion, nasal bridge, zygomatic arch/bone, otobasion superior, external occipital protuberance, otobasion inferior, pronasale, subnasale, alar crest point and the temporalis muscle. Also indicated are the directions superior & inferior, and anterior & posterior.
Figure 1C:
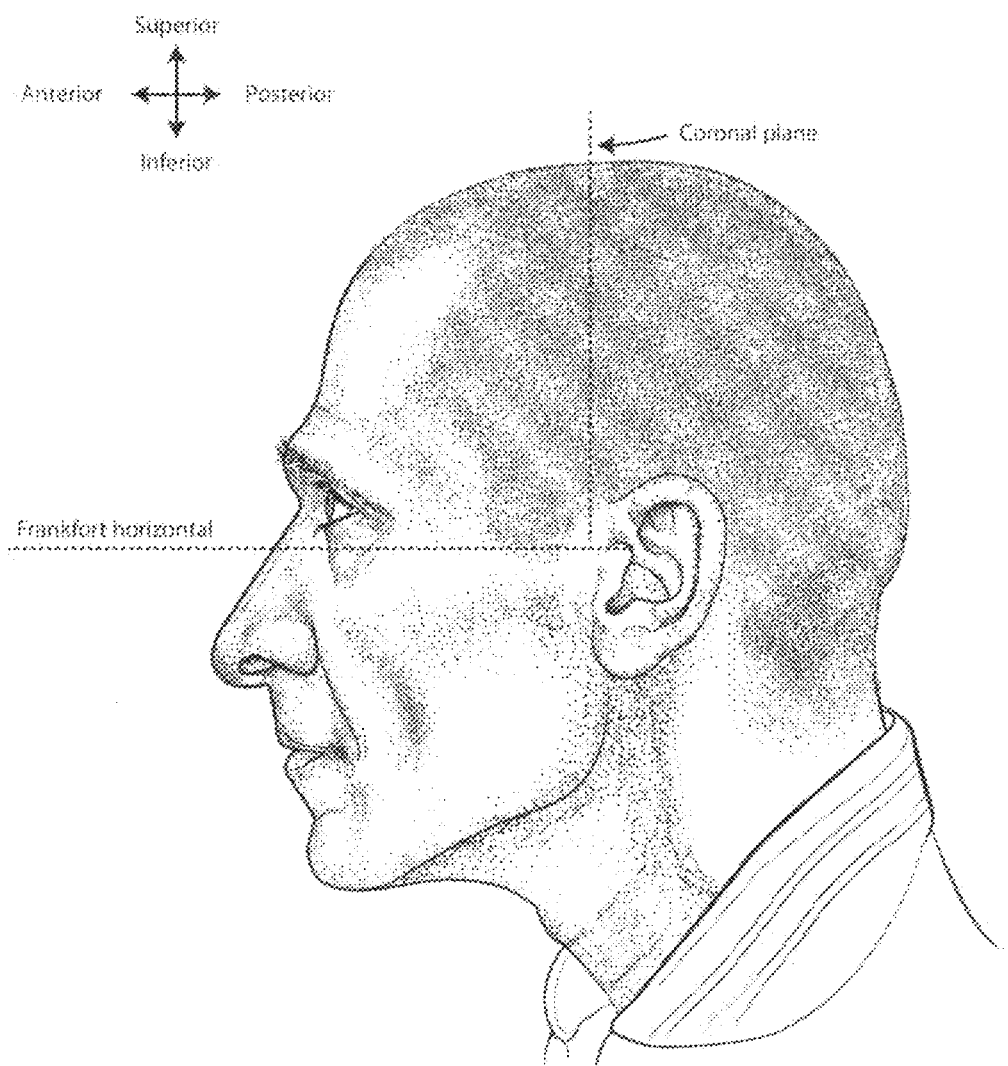

FIG. 1c is a further side view of a head. The approximate location of the Frankfort horizontal is indicated. The coronal plane is also indicated.

Figure 1D:
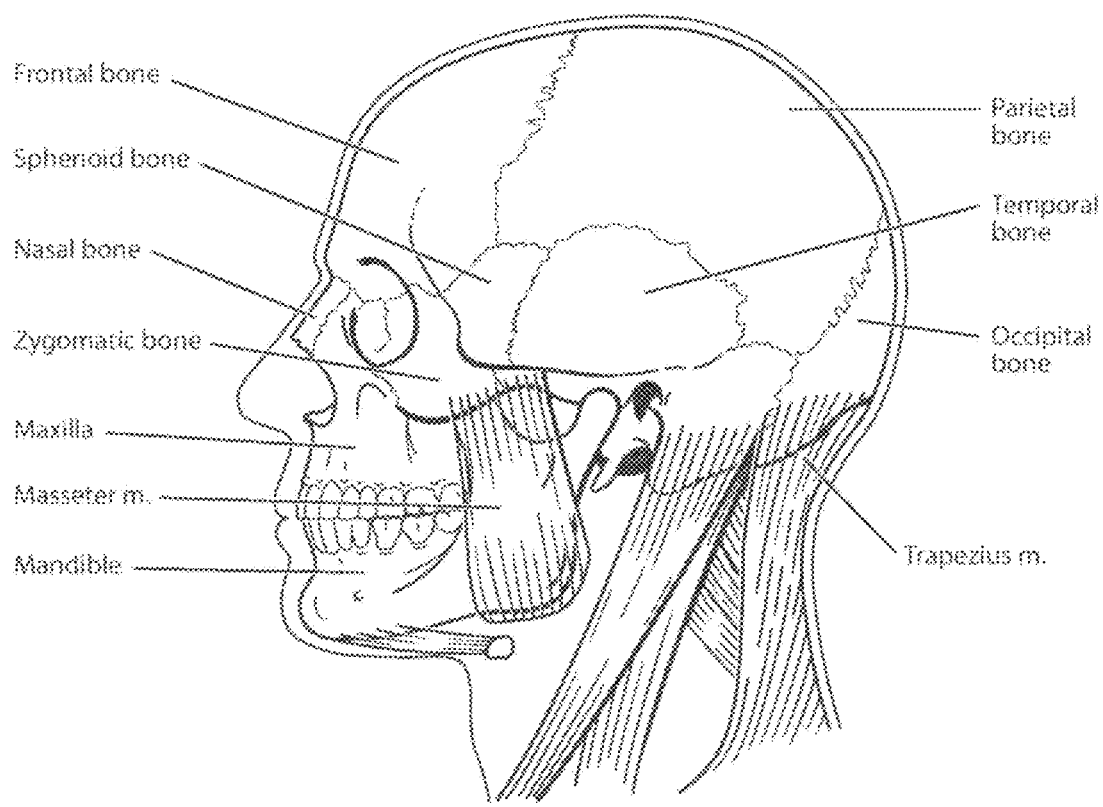

FIG. 1d shows a lateral view of a skull with the outline of the surface of a head, as well as several muscles. The following bones are shown: frontal, sphenoid, nasal, zygomatic, maxilla, mandible, parietal, temporal and occipital. The following muscles are shown: masseter minor and trapezius.

Figure 1E:
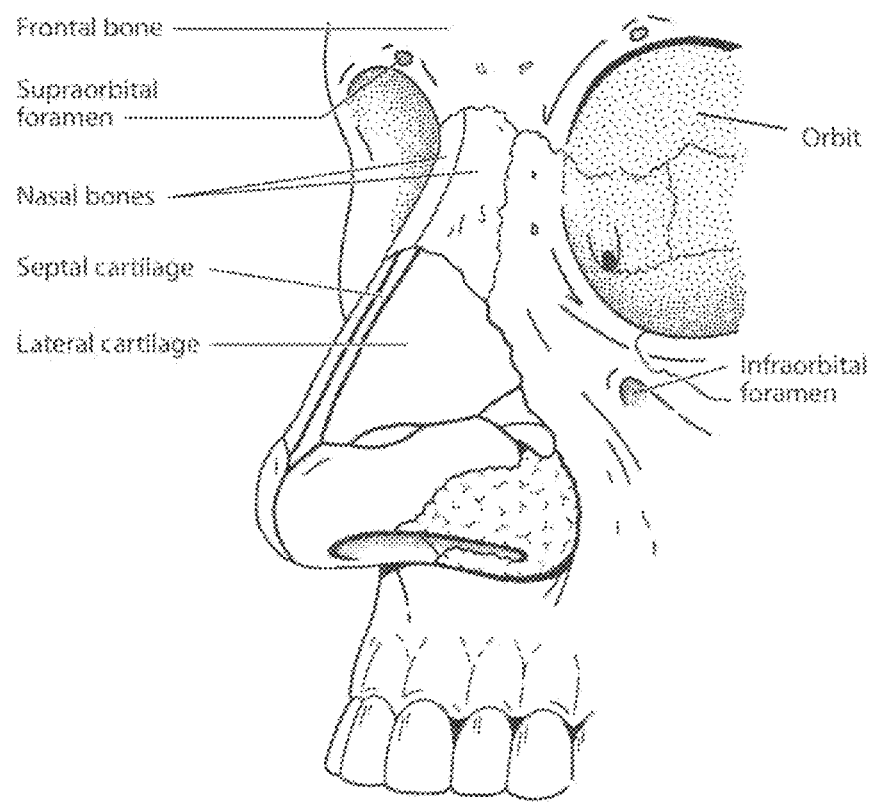

FIG. 1e shows an anterolateral view of a nose. The following bones are shown: frontal, supraorbital foramen, nasal, septal cartilage, lateral cartilage, orbit and infraorbital foramen.

4.2 Shape of Structures

Figure 2A:
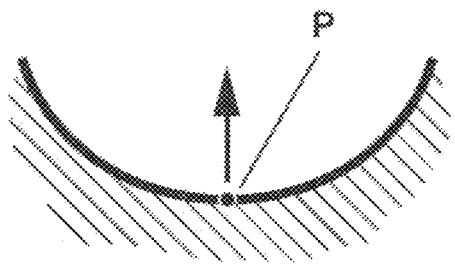

FIG. 2a shows a schematic of a cross-section through a structure at a point. An outward normal at the point is indicated. The curvature at the point has a positive sign, and a relatively large magnitude when compared to the magnitude of the curvature shown in FIG. 2b.

Figure 2B:
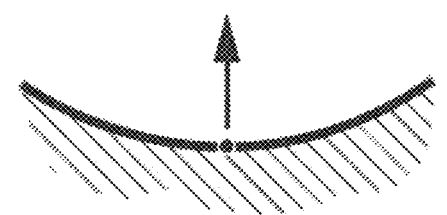

FIG. 2b shows a schematic of a cross-section through a structure at a point. An outward normal at the point is indicated. The curvature at the point has a positive sign, and a relatively small magnitude when compared to the magnitude of the curvature shown in FIG. 2a.

Figure 2C:
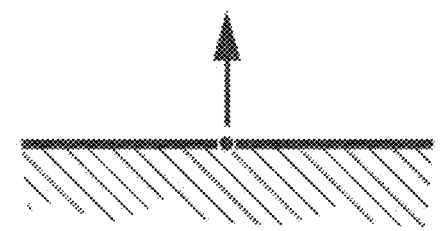

FIG. 2c shows a schematic of a cross-section through a structure at a point. An outward normal at the point is indicated. The curvature at the point has a value of zero.

Figure 2D:
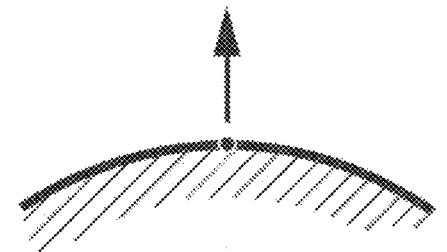

FIG. 2d shows a schematic of a cross-section through a structure at a point. An outward normal at the point is indicated. The curvature at the point has a negative sign, and a relatively small magnitude when compared to the magnitude of the curvature shown in FIG. 2c.

Figure 2E:
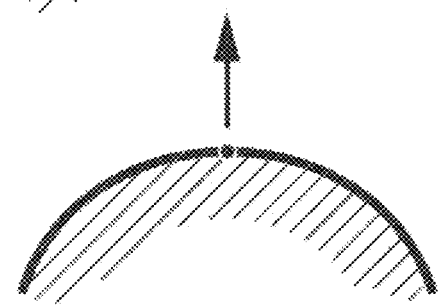

FIG. 2e shows a schematic of a cross-section through a structure at a point. An outward normal at the point is indicated. The curvature at the point has a negative sign, and a relatively large magnitude when compared to the magnitude of the curvature shown in FIG. 2d.

FIGS. 2f-2h shows a seal forming structure. An exterior surface of the cushion is indicated. An edge of the surface is indicated in FIG. 2g. A path on the surface between points A and B is indicated. A straight-line distance between A and B is indicated. Two saddle regions and a dome region are indicated in FIG. 2h.

FIG. 2i shows a left ear, including the left ear helix.

FIG. 2j shows a right-hand helix.

FIG. 2k shows a right ear, including the right ear helix.

FIG. 2l illustrates a left-hand rule.

FIG. 2m illustrates a right-hand rule.

FIG. 2n shows the surface of a structure, with a one-dimensional hole in the surface. The illustrated plane curve forms the boundary of a one-dimensional hole.

FIG. 2o shows a cross-section through the structure of FIG. 2n. The illustrated surface bounds a two-dimensional hole in the structure of FIG. 2n.

FIG. 2p shows a perspective view of the structure of FIG. 2n, including the two-dimensional hole and the one-dimensional hole. Also shown is the surface that bounds a two-dimensional hole in the structure of FIG. 2n.

4.3 Head Mounted Display 4.3.1 Positioning and Stabilising Structure

Figure 3A:
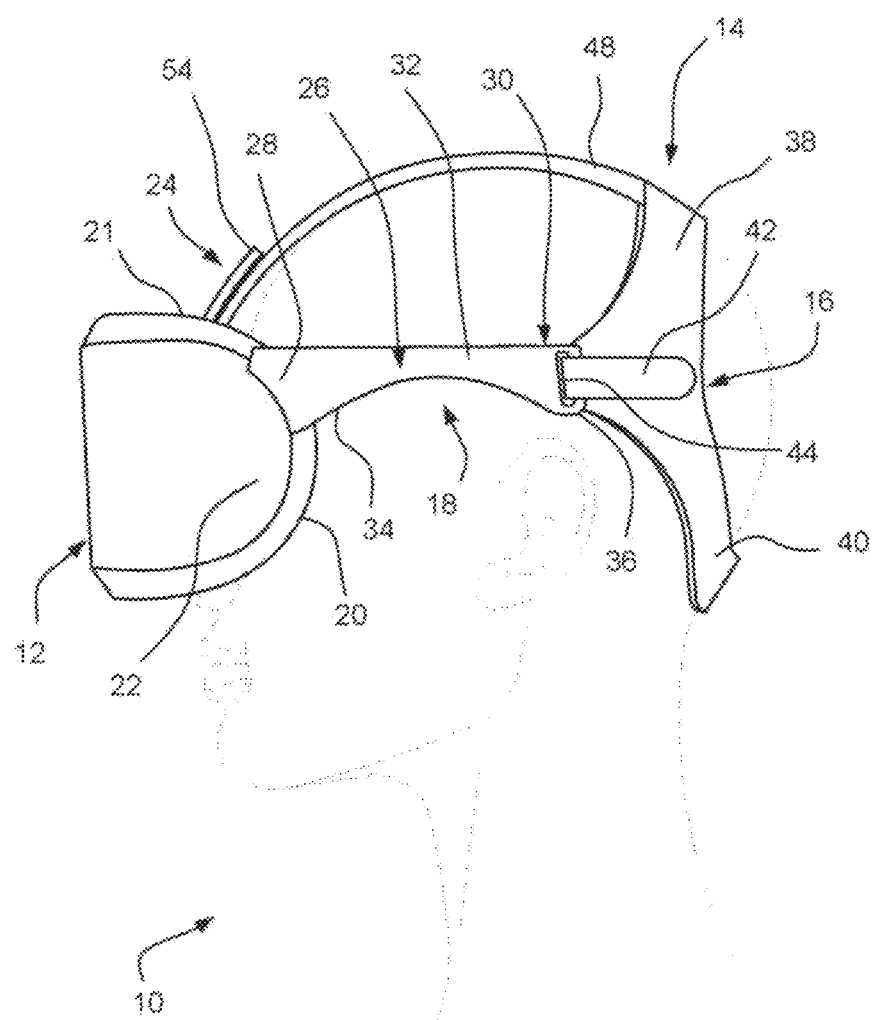

FIG. 3a is a side view of a first example of a positioning and stabilising structure of a head-mounted display.

Figures 1, 3A:
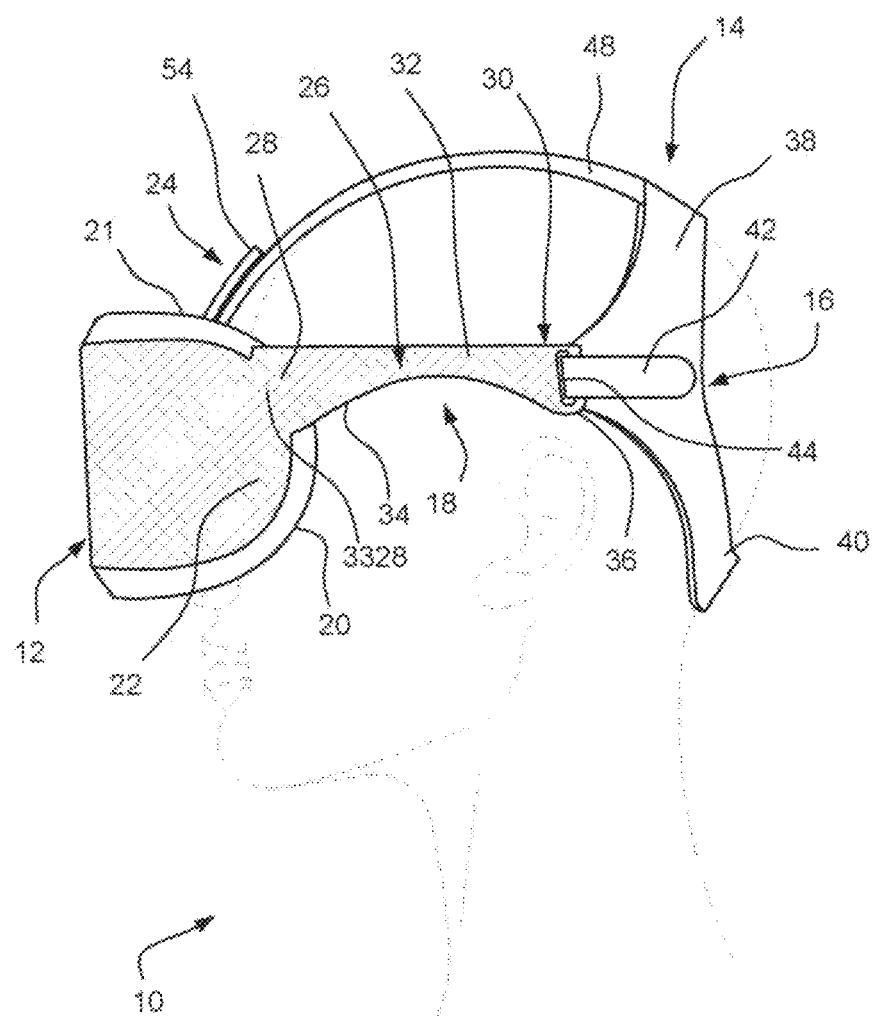

FIG. 3a-1 is a side view of an alternate version of the first example of the positioning and stabilising structure of FIG. 3a, illustrating a portion of the head mounted display unit and a portion of the positioning and stabilising structure formed with a one-piece textile construction.

Figures 2, 3A:
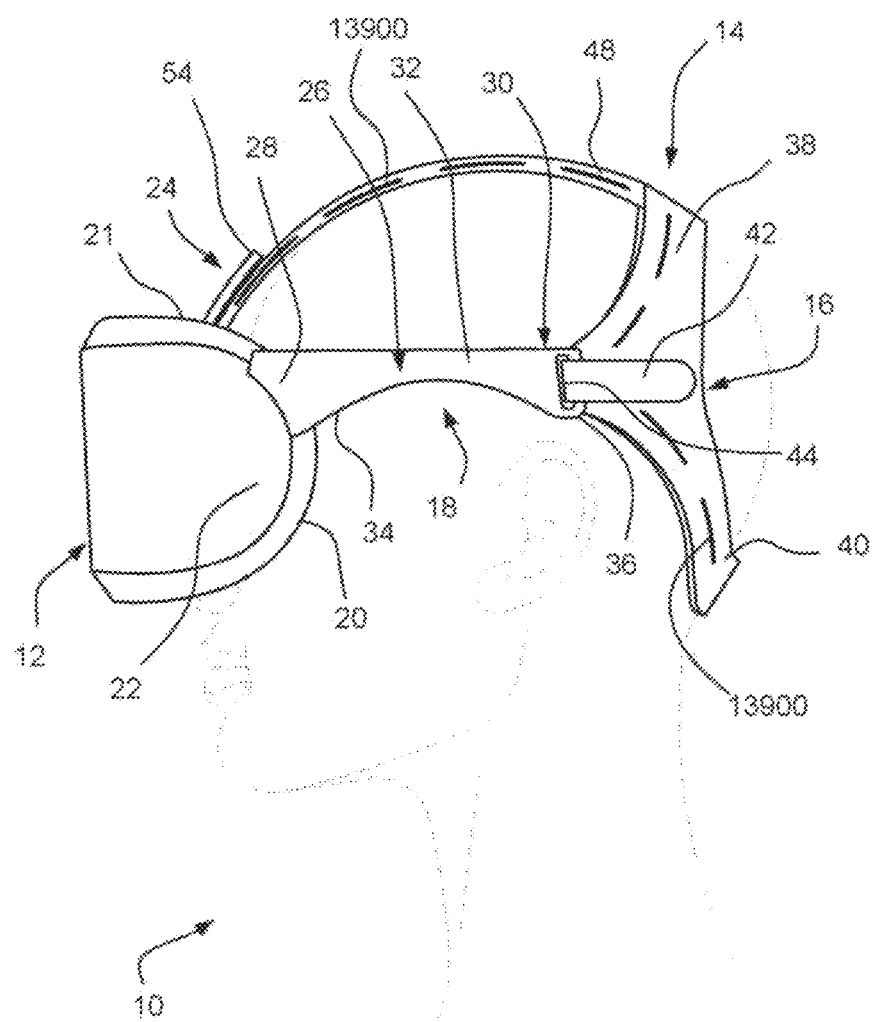

FIG. 3a-2 is a side view of an alternate version of the first example of the positioning and stabilising structure of FIG. 3a, illustrating a portion of the positioning and stabilising structure including stiffener threads.

Figure 3B:
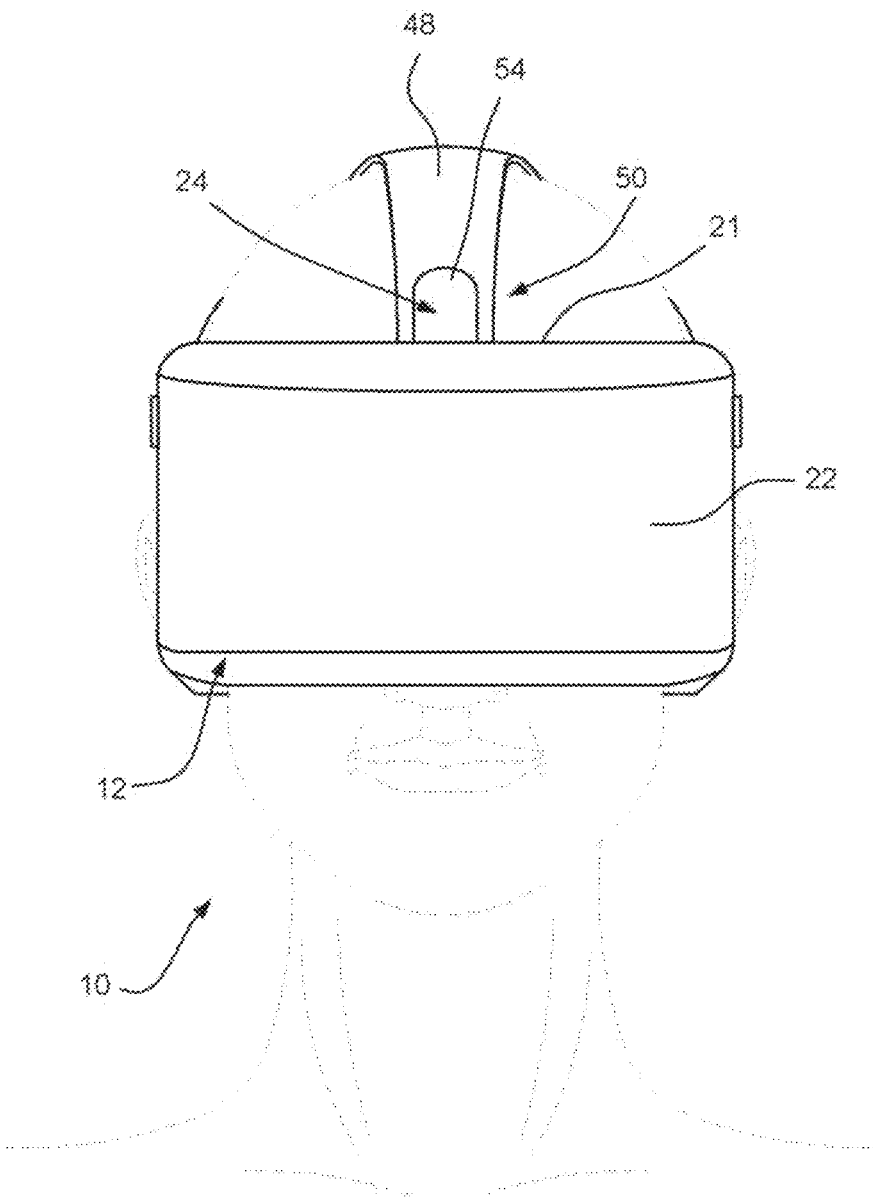

FIG. 3b is a front view of the first example of a positioning and stabilising structure of FIG. 3a.

Figure 3C:
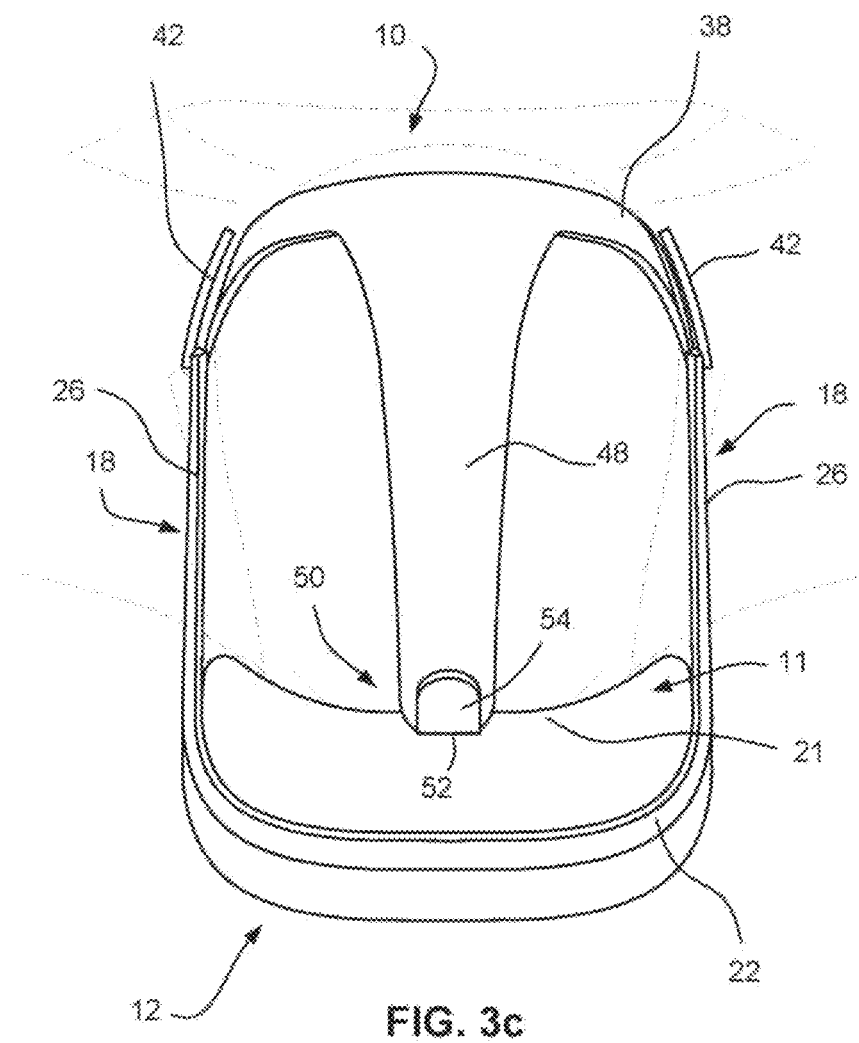
Figures 1, 3C:
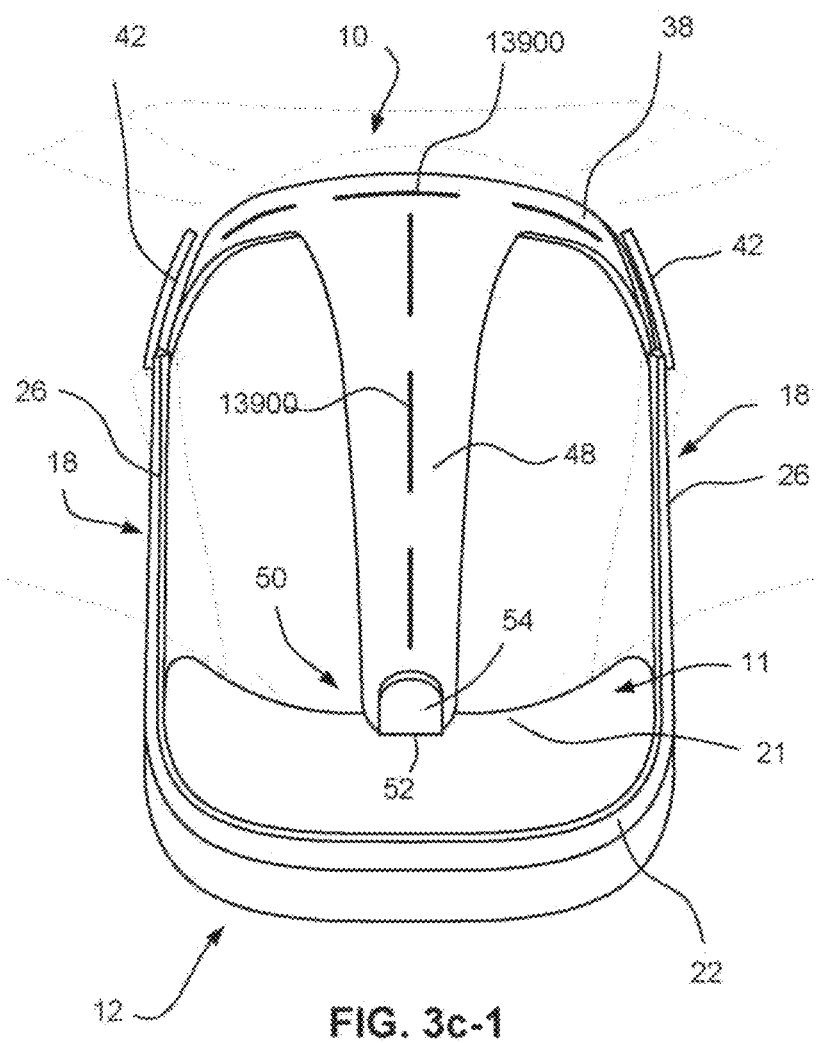

FIG. 3c is a top view of the first example of a positioning and stabilising structure of FIG. 3a.

FIG. 3c-1 is a top view of the alternate version of the first example of the positioning and stabilising structure of FIG. 3a-2.

Figures 3D, 3E:
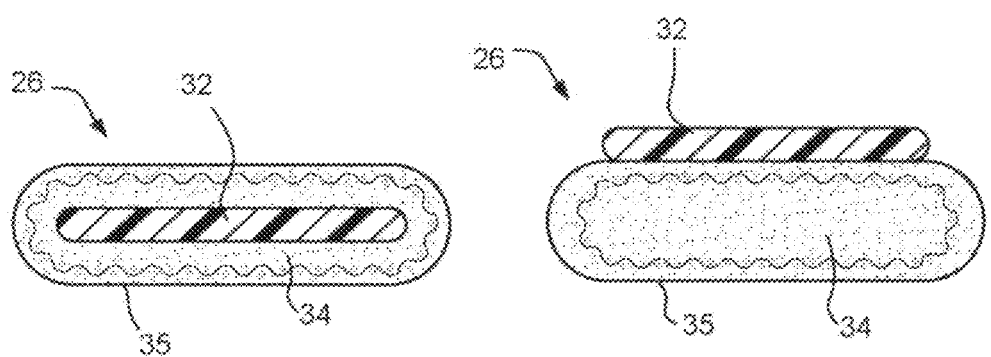

FIG. 3d is a cross-sectional view of a temporal arm of the head-mounted display assembly of FIGS. 3a to 3c according to an example of the present technology.

FIG. 3e is a cross-sectional view of a temporal arm of the head-mounted display assembly of FIGS. 3a to 3c according to another example of the present technology.

Figure 4A:
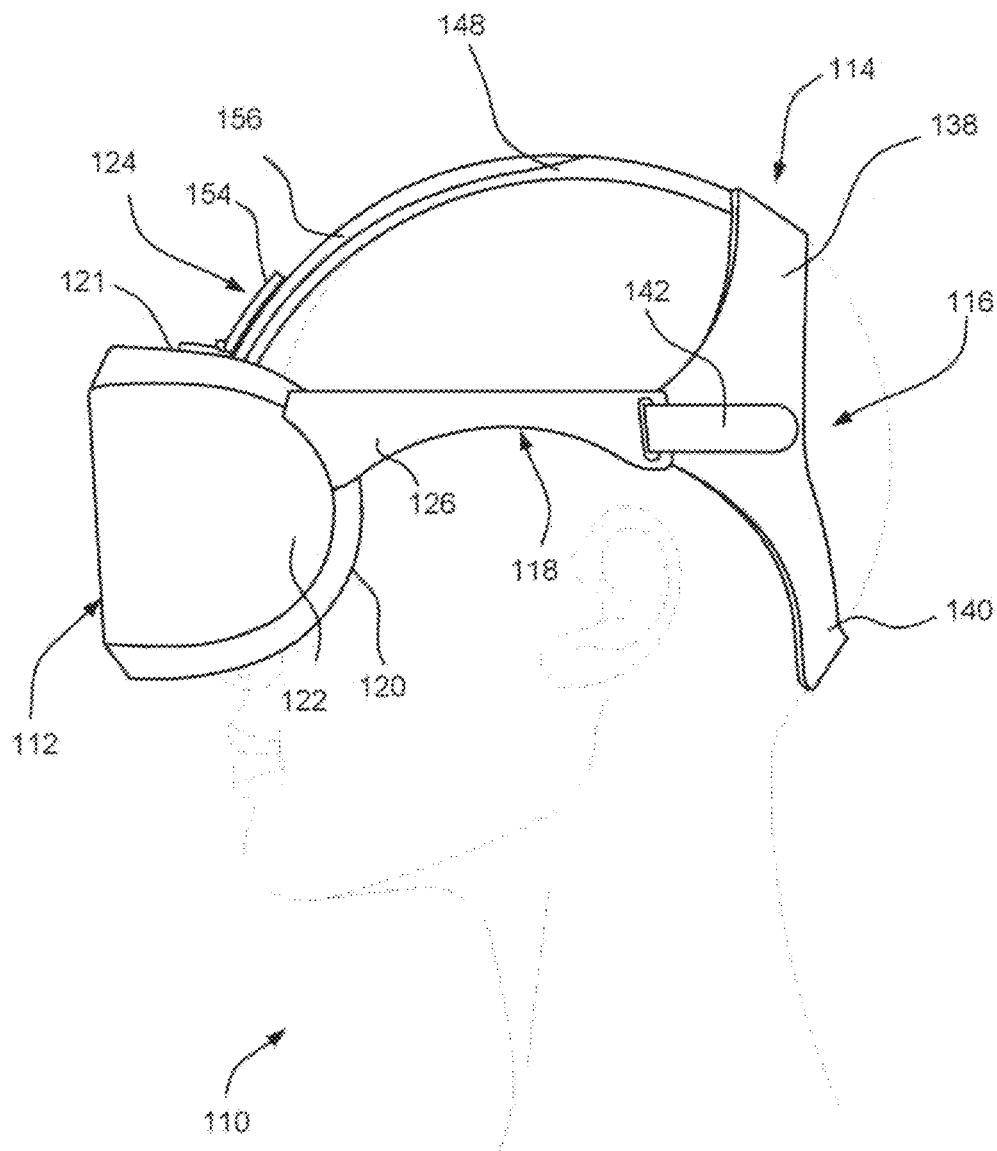
Figures 1, 4A:
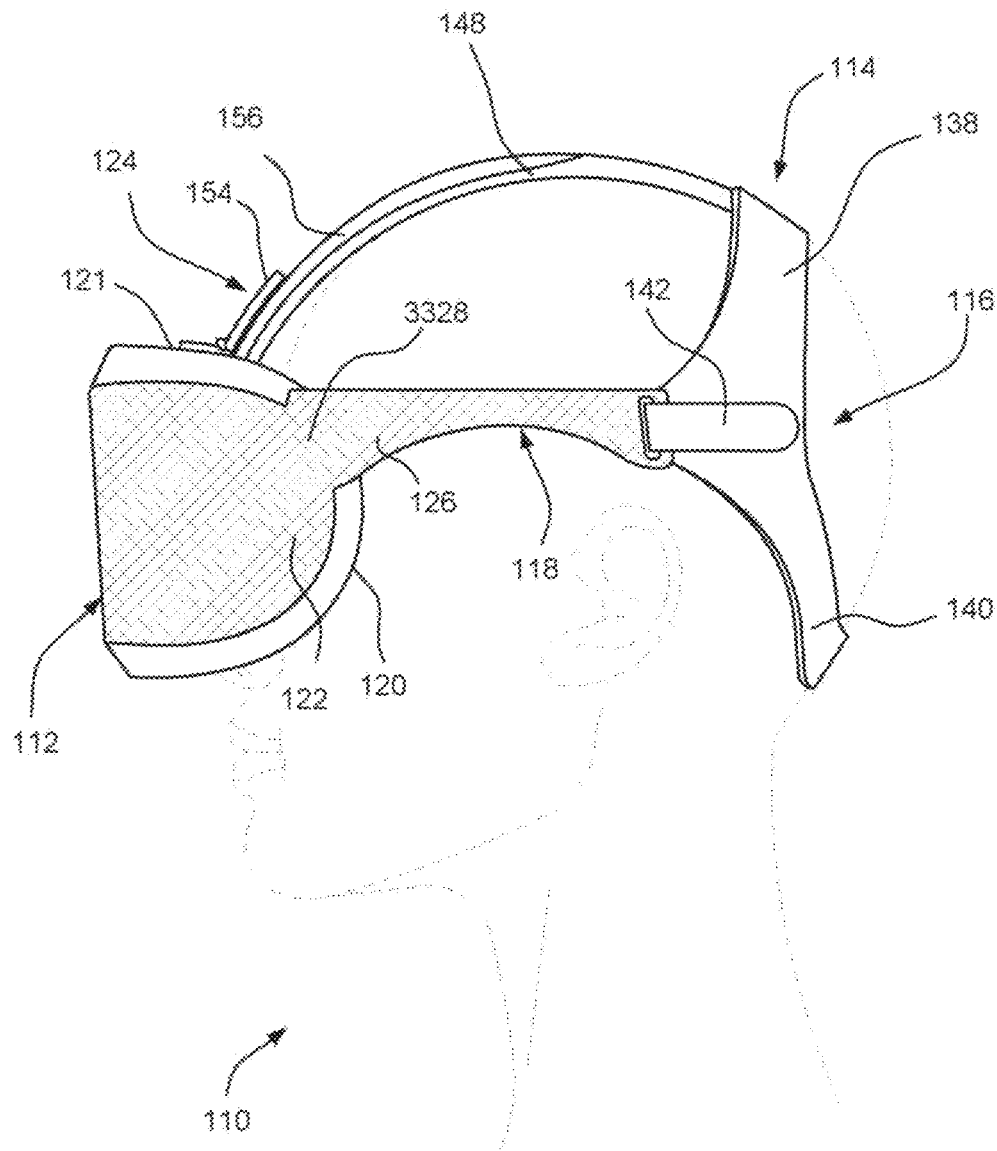
Figures 2, 4A:
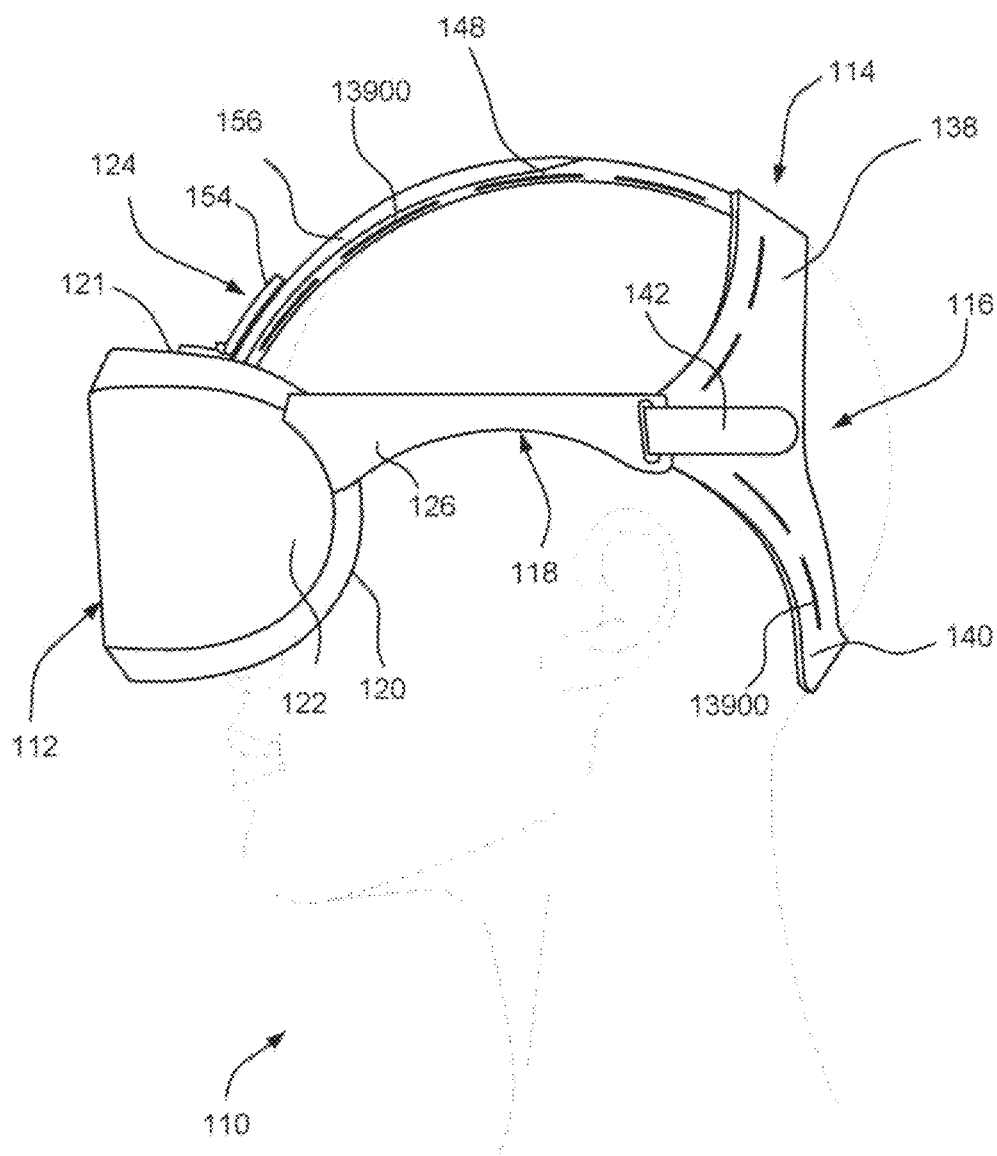

FIG. 4a is a side view of a second example of a positioning and stabilising structure of a head mounted display.

FIG. 4a-1 is a side view of an alternate version of the second example of the positioning and stabilising structure of FIG. 4a, illustrating a portion of the head mounted display unit and a portion of the positioning and stabilising structure formed with a one-piece textile construction.

FIG. 4a-2 is a side view of an alternate version of the second example of the positioning and stabilising structure of FIG. 4a, illustrating a portion of the positioning and stabilising structure including stiffener threads.

Figure 4B:
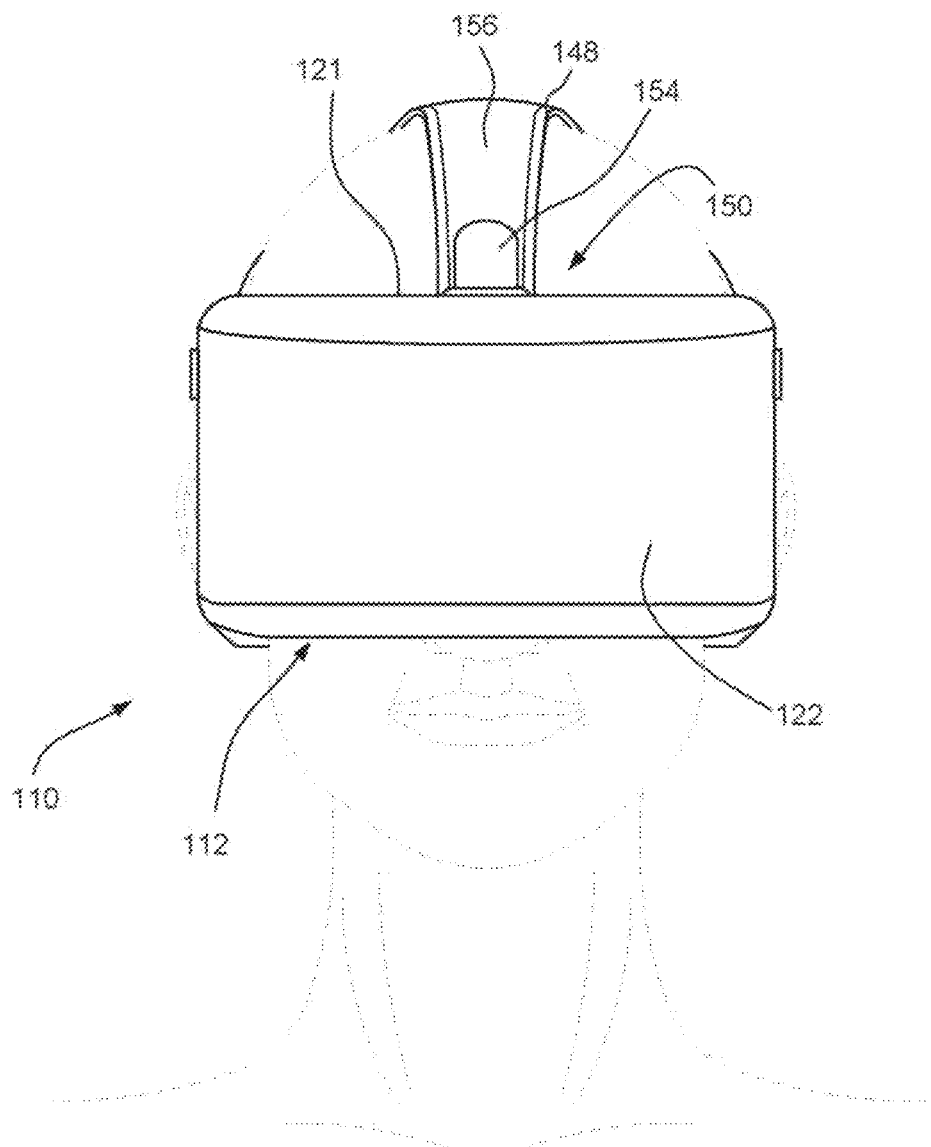

FIG. 4b is a front view of the second example of a positioning and stabilising structure of FIG. 4a.

Figure 4C:
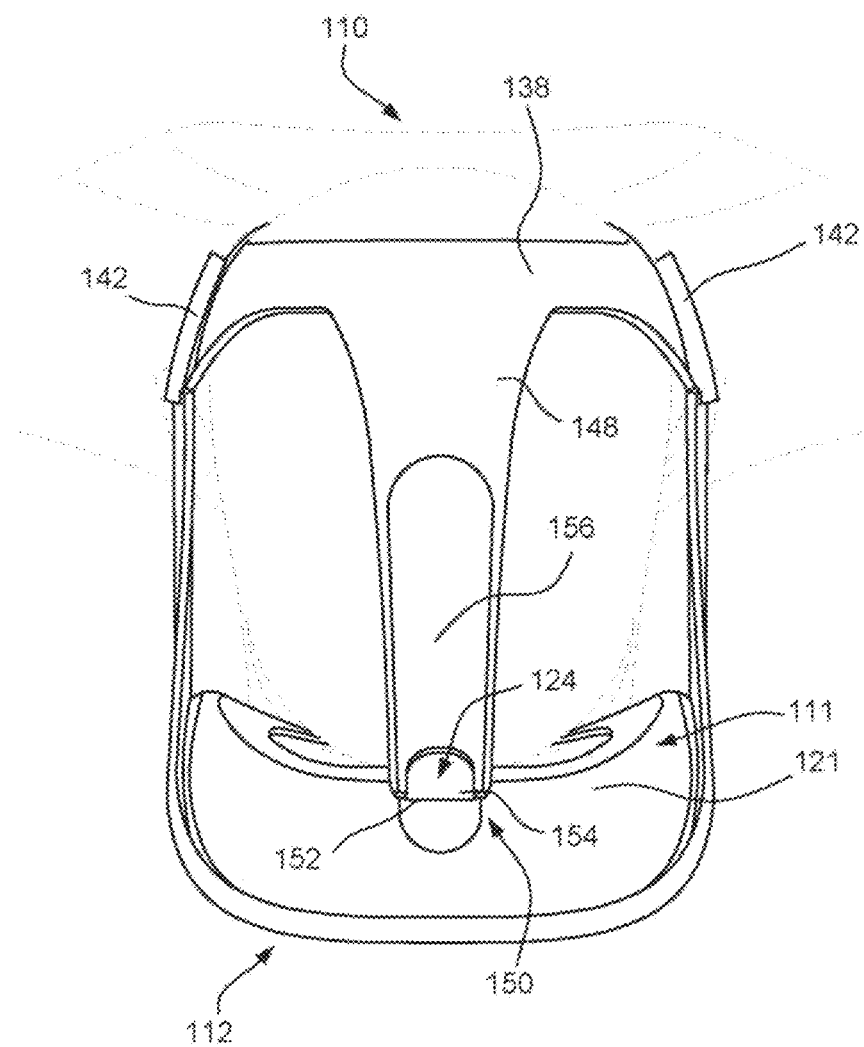
Figures 1, 4C:
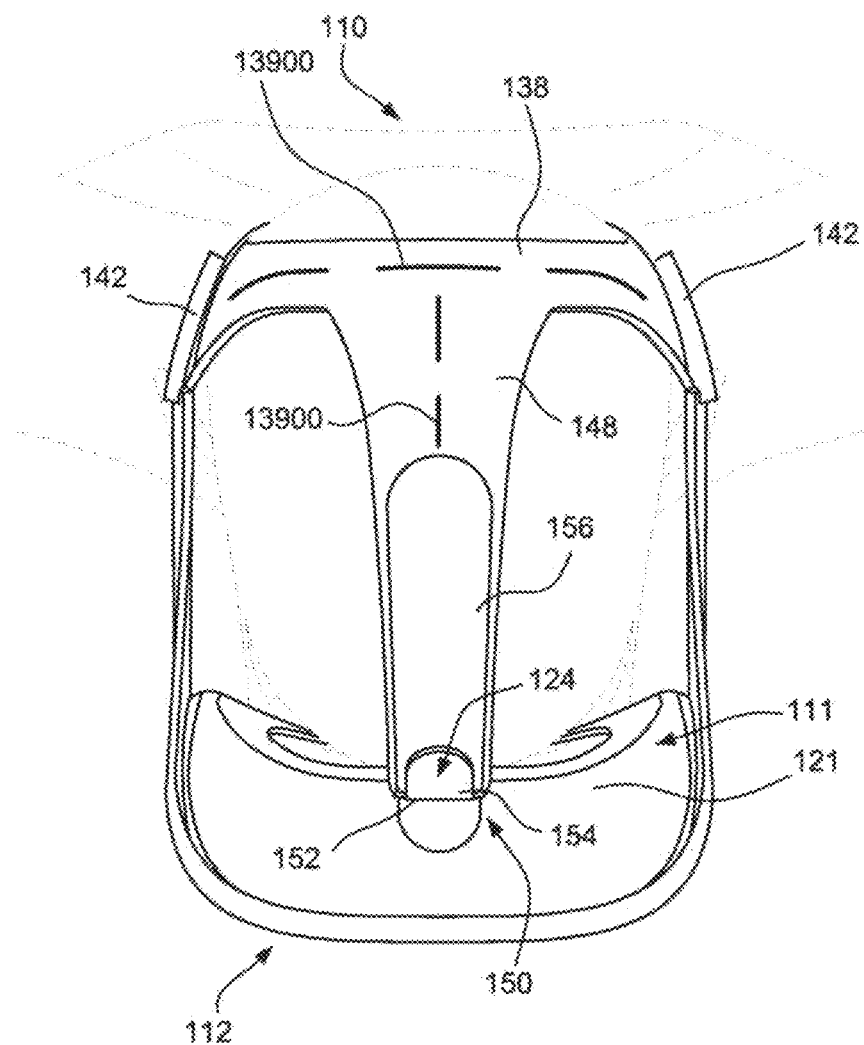

FIG. 4c is a top view of the second example of a positioning and stabilising structure of FIG. 4a.

FIG. 4c-1 is a top view of the alternate version of the second example of the positioning and stabilising structure of FIG. 4a-2.

Figure 5A:
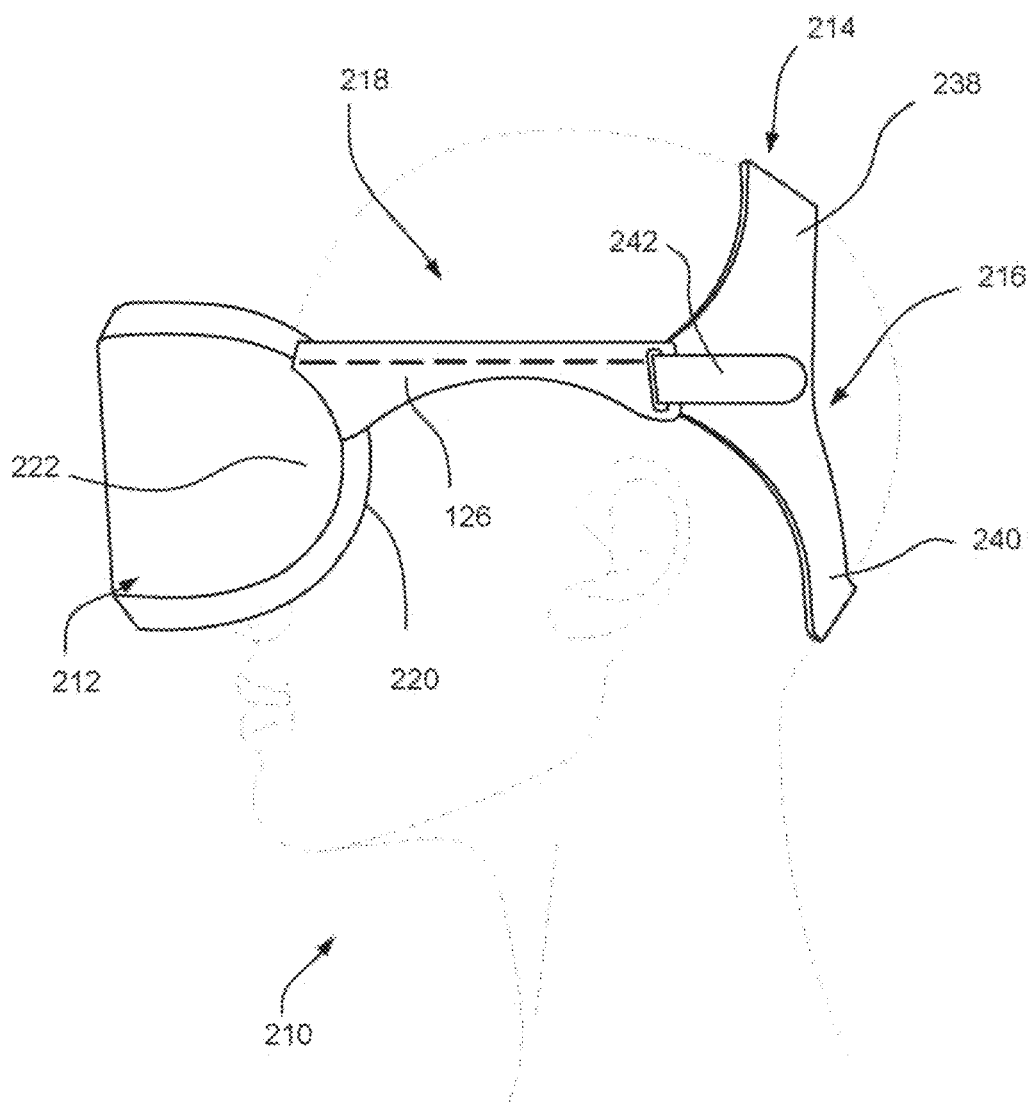
Figures 1, 5A:
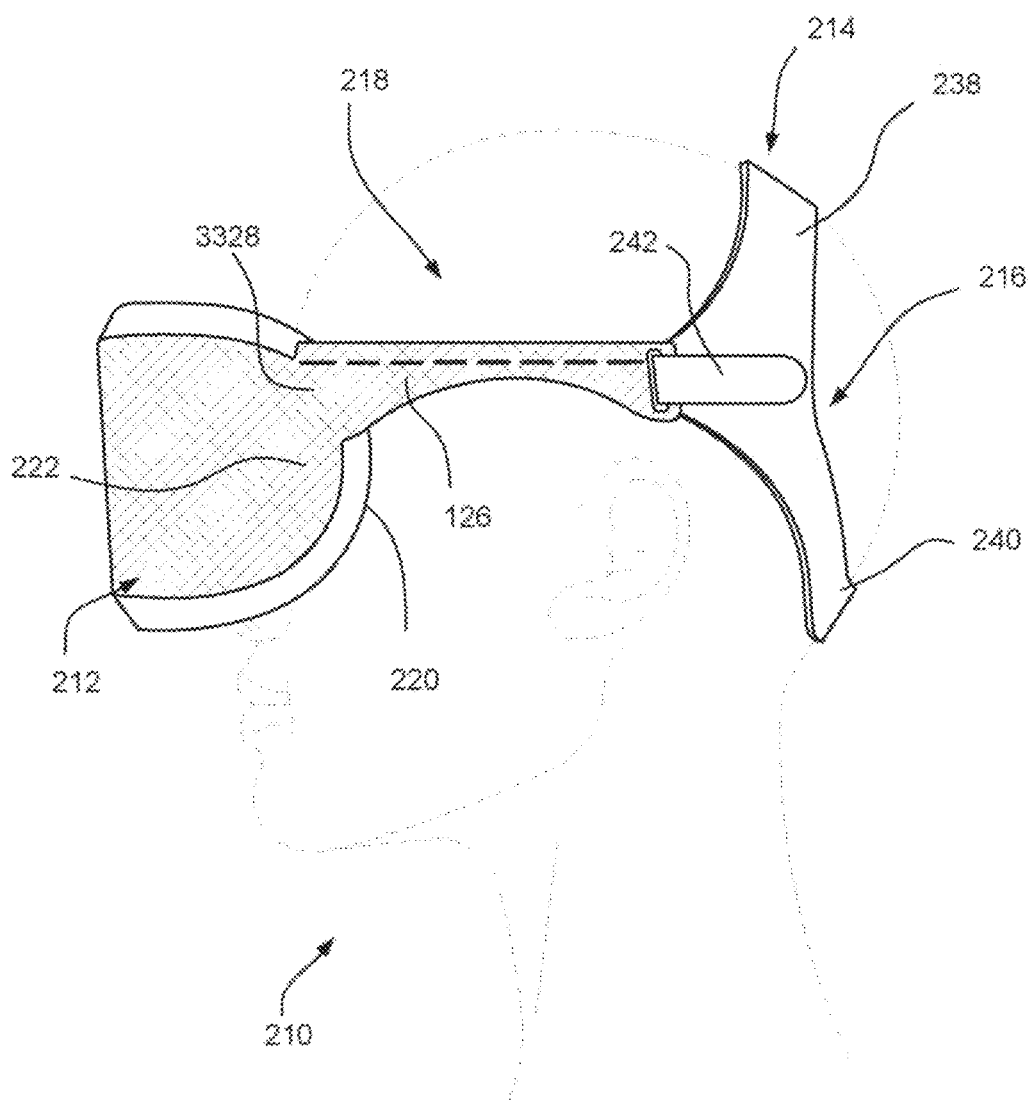
Figures 2, 5A:
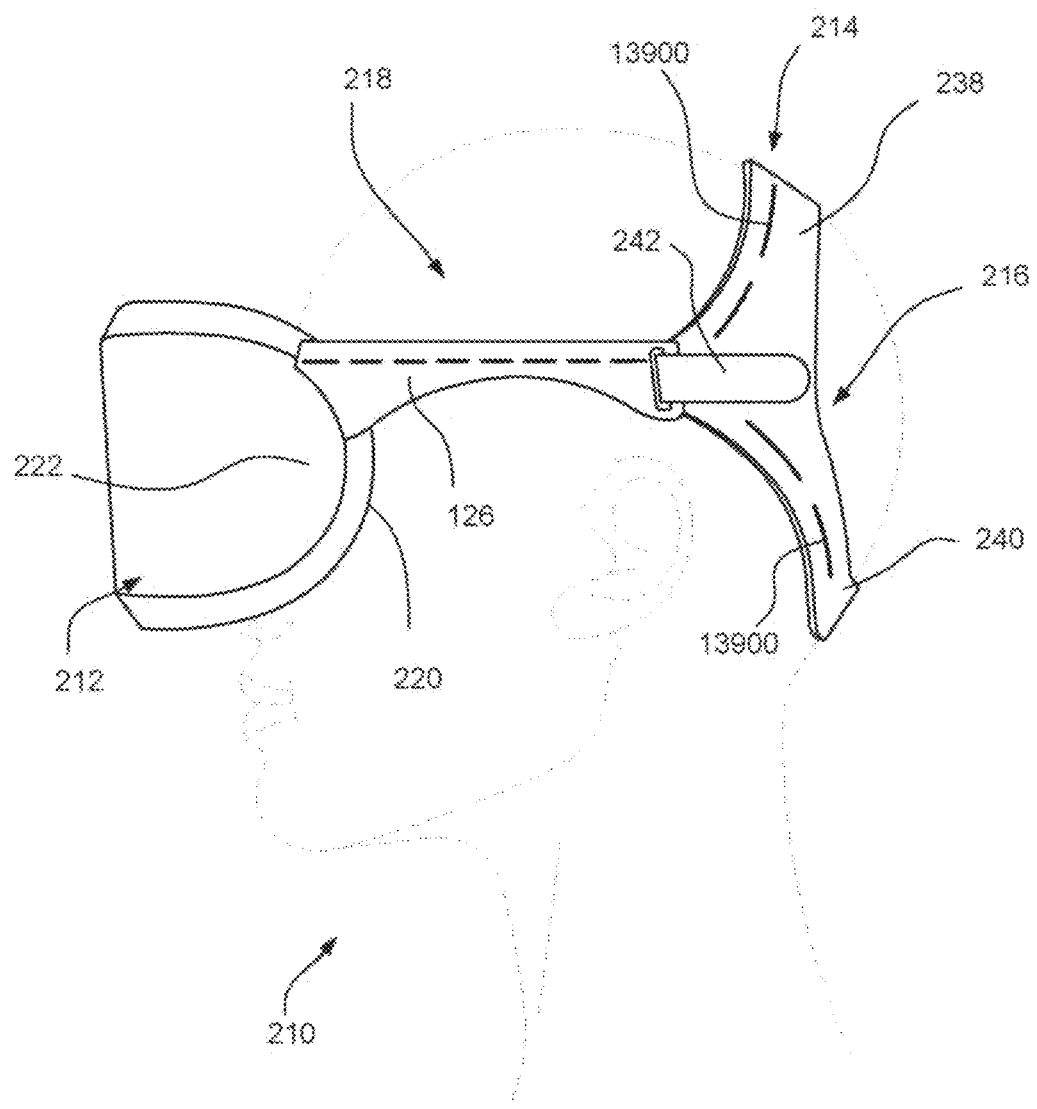

FIG. 5a is a side view of a third example of a positioning and stabilising structure of a head-mounted display assembly.

FIG. 5a-1 is a side view of an alternate version of the third example of the positioning and stabilising structure of FIG. 5a, illustrating a portion of the head mounted display unit and a portion of the positioning and stabilising structure formed with a one-piece textile construction.

FIG. 5a-2 is a side view of an alternate version of the third example of the positioning and stabilising structure of FIG. 5a, illustrating a portion of the positioning and stabilising structure including stiffener threads.

Figure 5B:
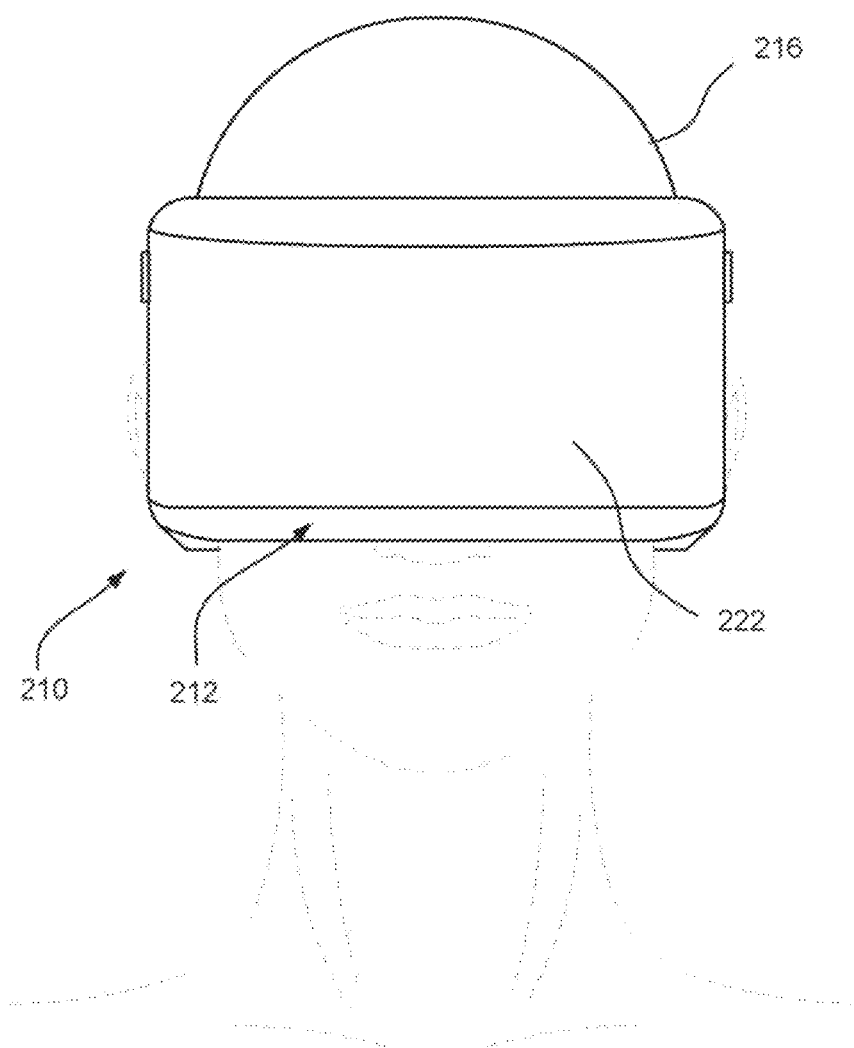

FIG. 5b is a front view of the third example of a positioning and stabilising structure of FIG. 5a.

Figure 5C:
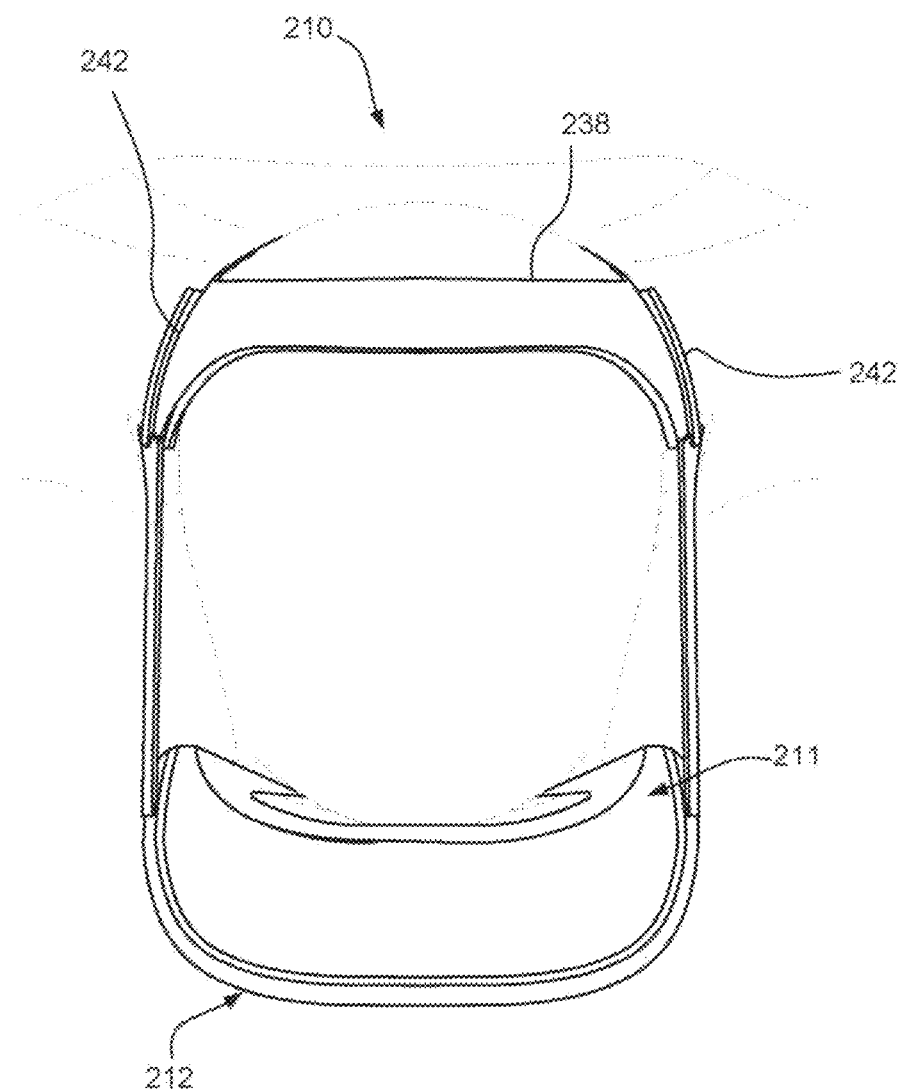

FIG. 5c is a top view of the third example of a positioning and stabilising structure of FIG. 5a.

Figure 6:
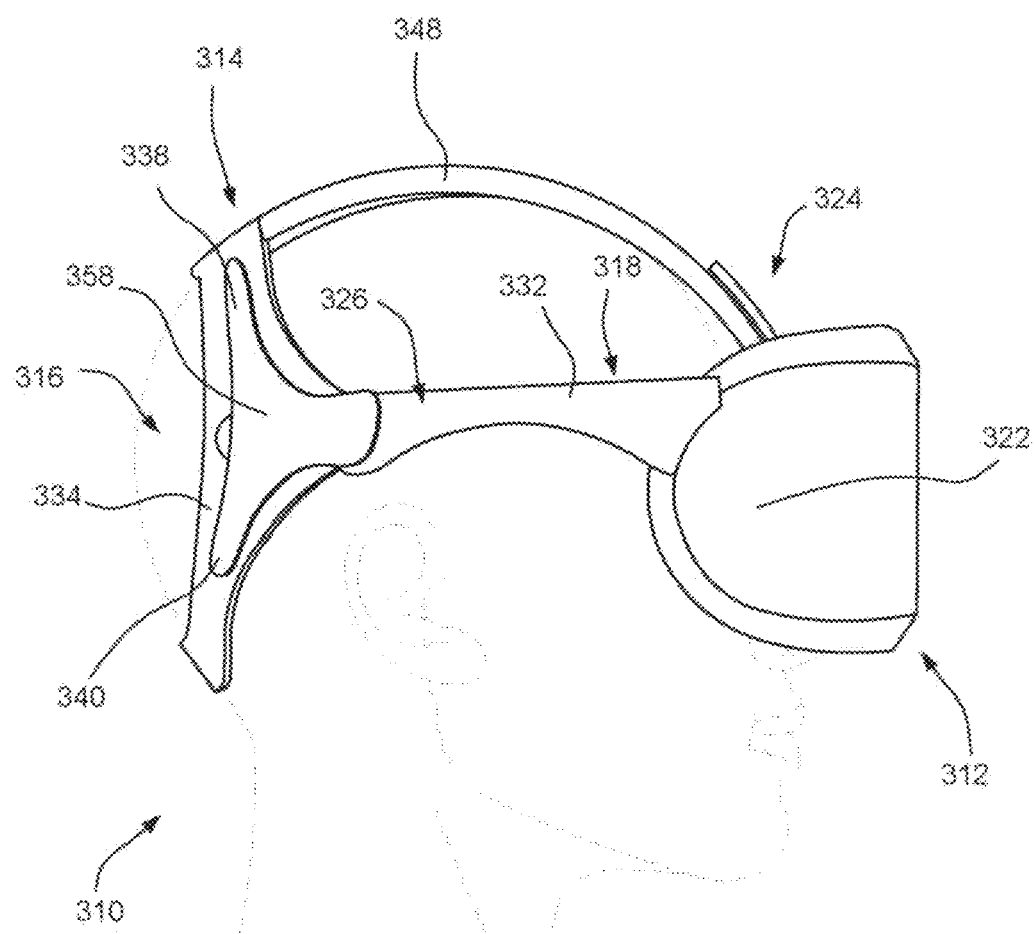
Figures 1, 6:
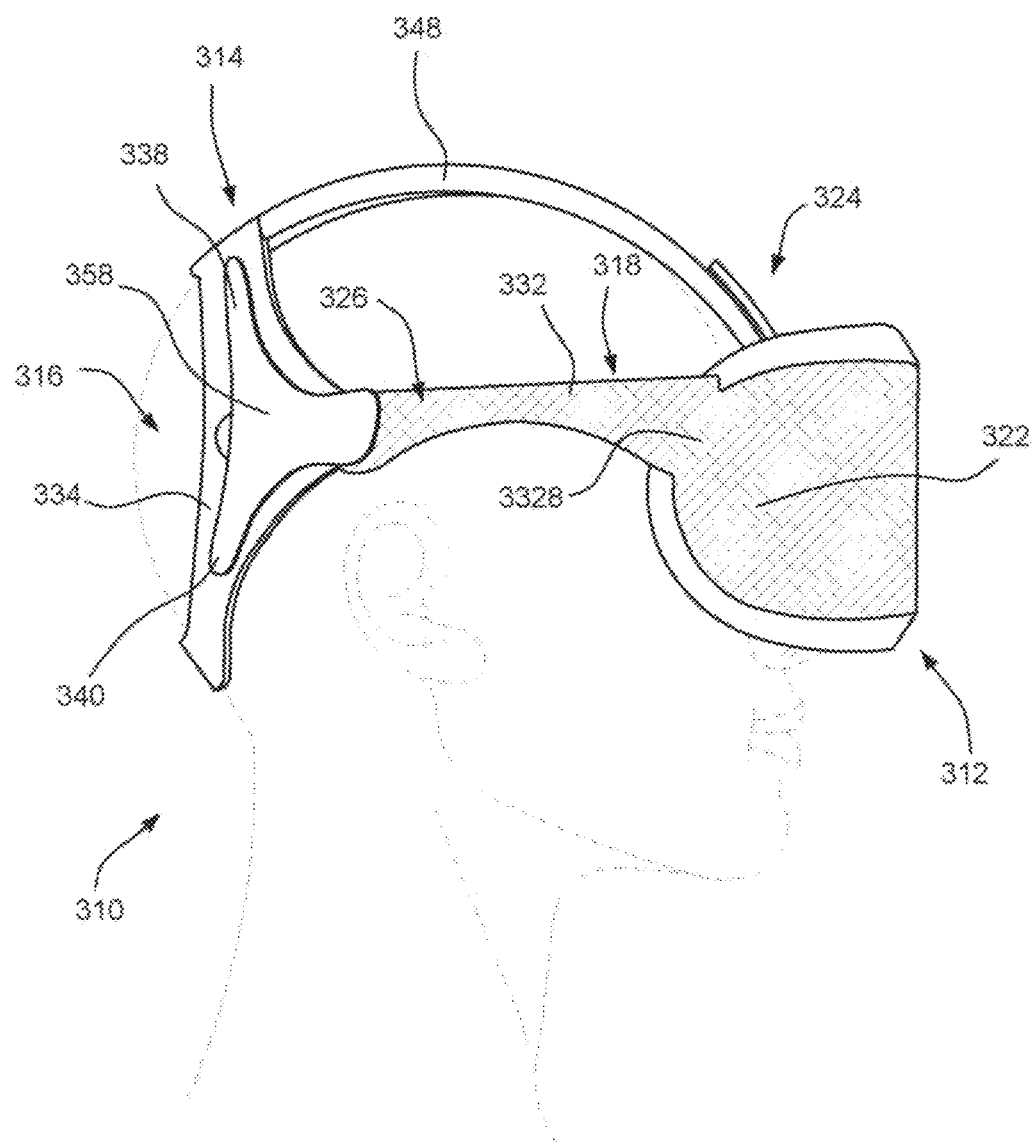

FIG. 6 is a side view of a fourth example of a positioning and stabilising structure of head-mounted display.

FIG. 6-1 is a side view of an alternate version of the example of the positioning and stabilising structure of FIG. 6a, illustrating a portion of the head mounted display unit and a portion of the positioning and stabilising structure formed with a one-piece textile construction.

Figure 7A:
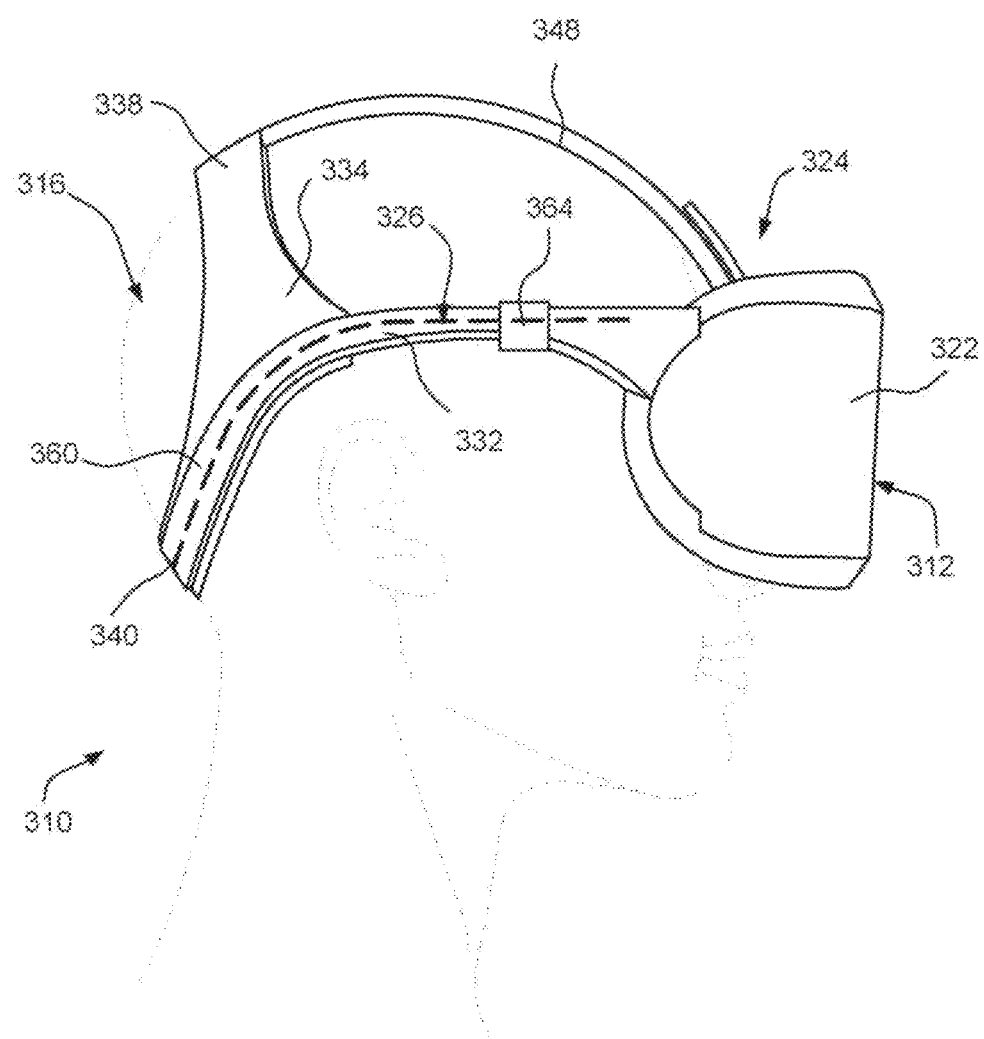
Figures 1, 7A:
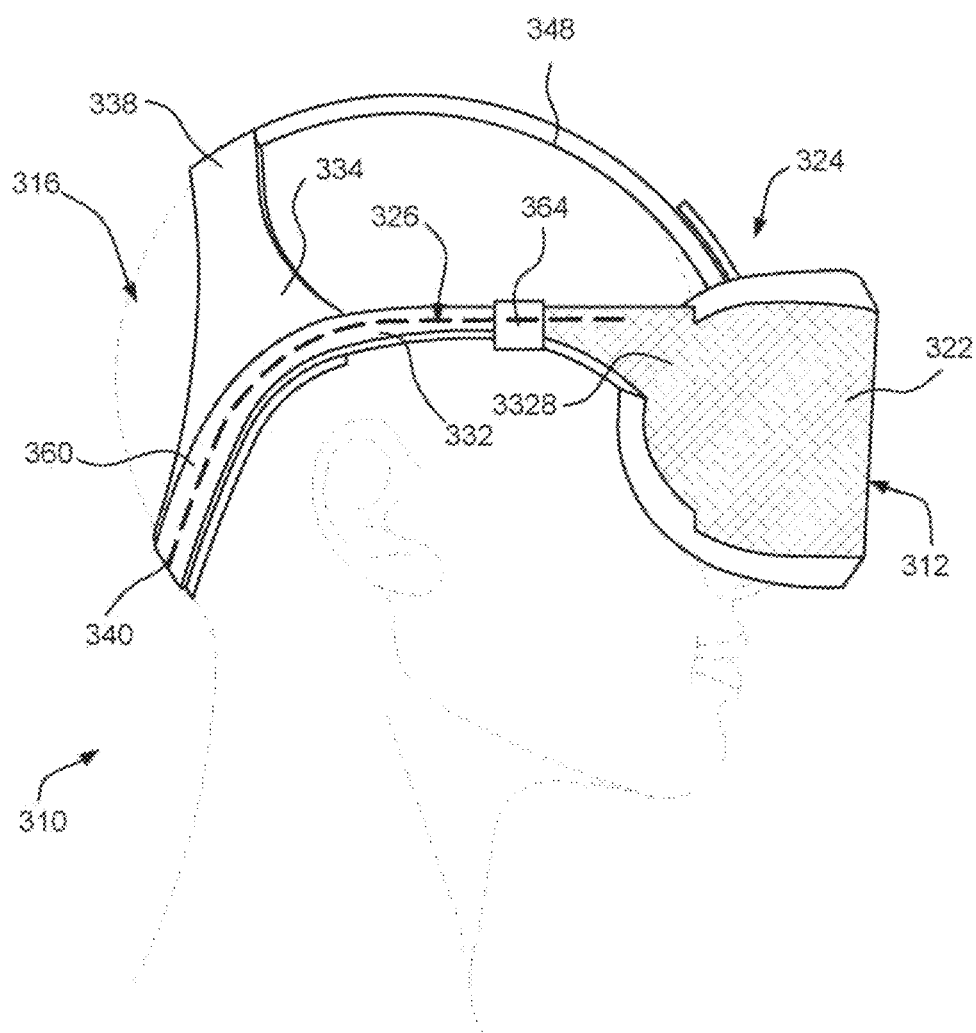

FIG. 7a is a side view of a variation of the fourth embodiment of a head-mounted display.

FIG. 7a-1 is a side view of an alternate version of the variation of the fourth example of the positioning and stabilising structure of FIG. 7a, illustrating a portion of the head mounted display unit and a portion of the positioning and stabilising structure formed with a one-piece textile construction.

Figure 7B:
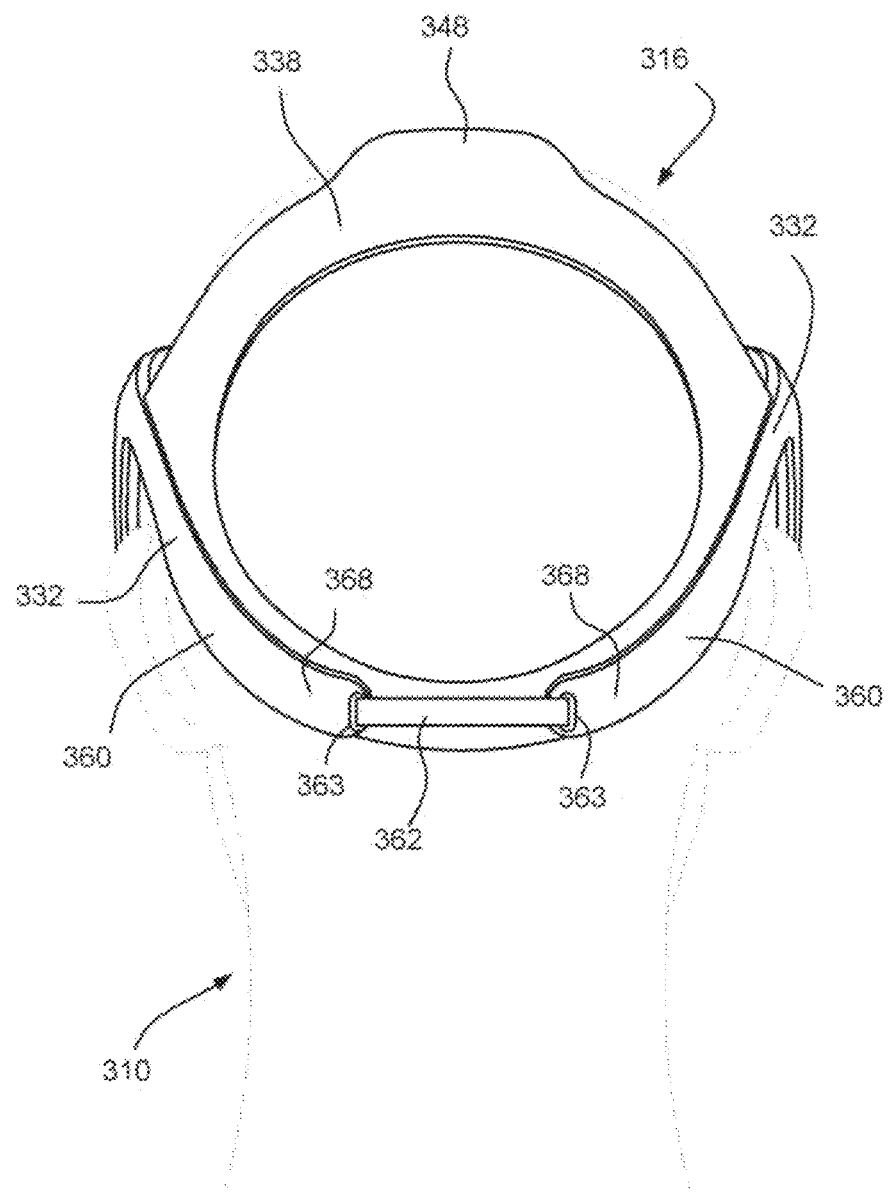

FIG. 7b is a front view of the variation of the fourth example of a positioning and stabilising structure of FIG. 7a.

Figure 7C:
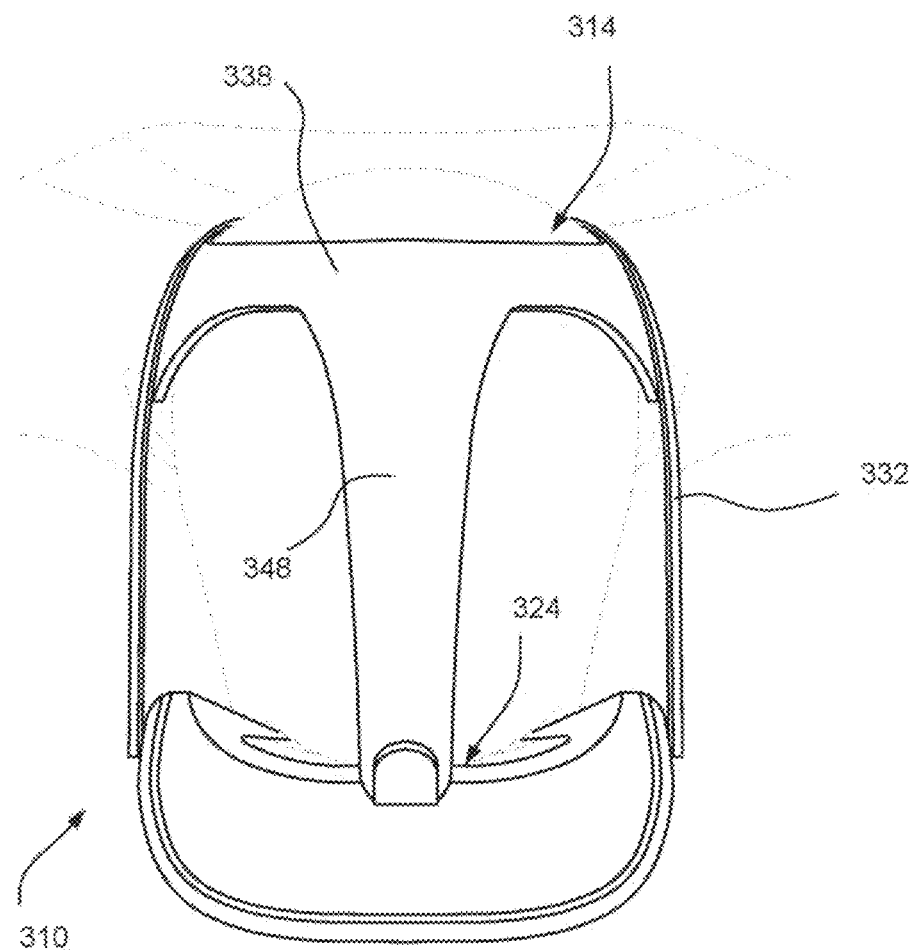
Figures 1, 7C:
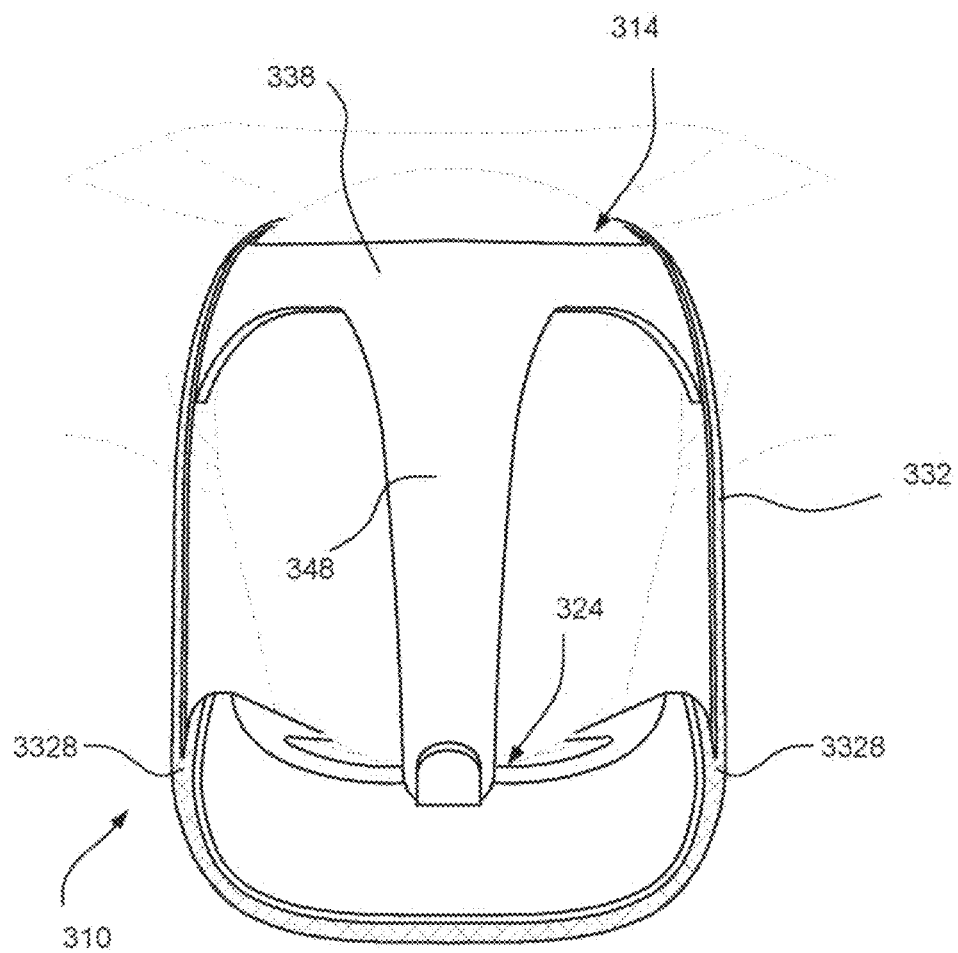

FIG. 7c is a top view of the variation of the fourth example of a positioning and stabilising structure of FIG. 7a.

FIG. 7c-1 is a top view of the alternate version of the variation of the fourth example of the positioning and stabilising structure of FIG. 7a-1.

Figure 8:
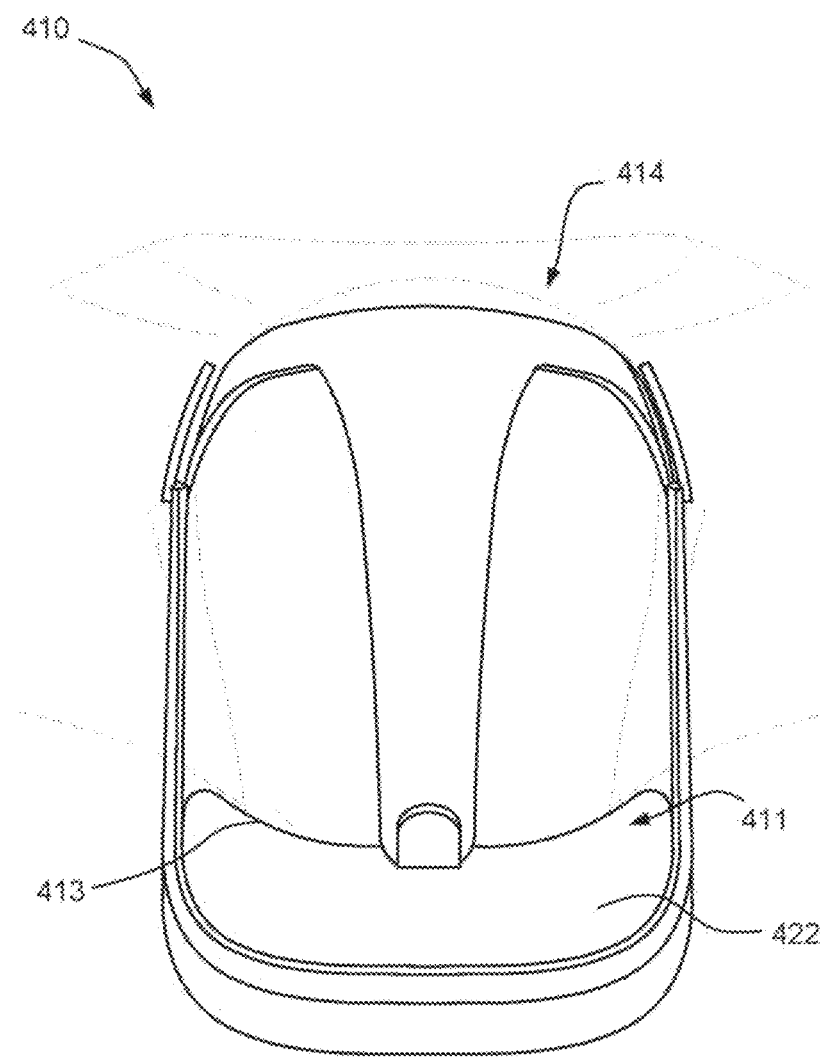

FIG. 8 is a top view of a variation of the fourth example of a head-mounted display assembly, in-use.

Figure 9A:
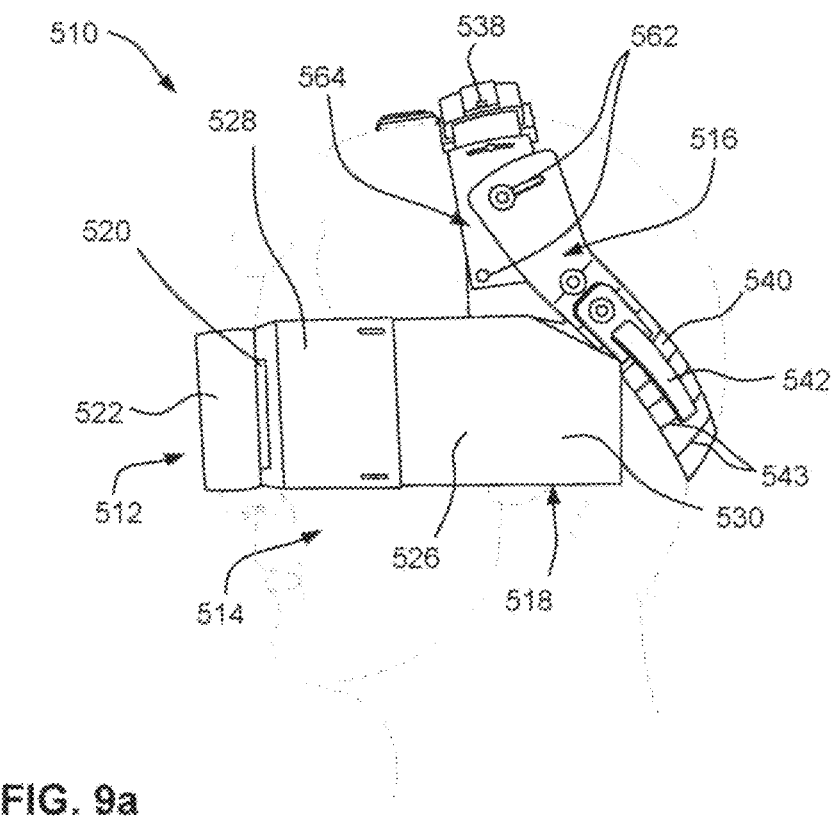
Figure 9B:
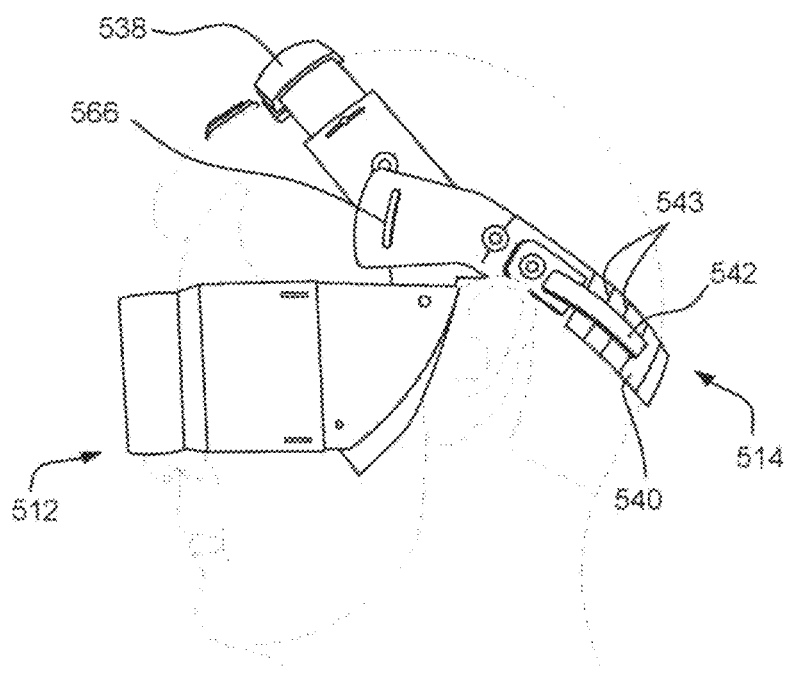

FIGS. 9a-9b are side views of a positioning and stabilising structure of a head-mounted display system according to an example of the present technology.

Figure 10A:
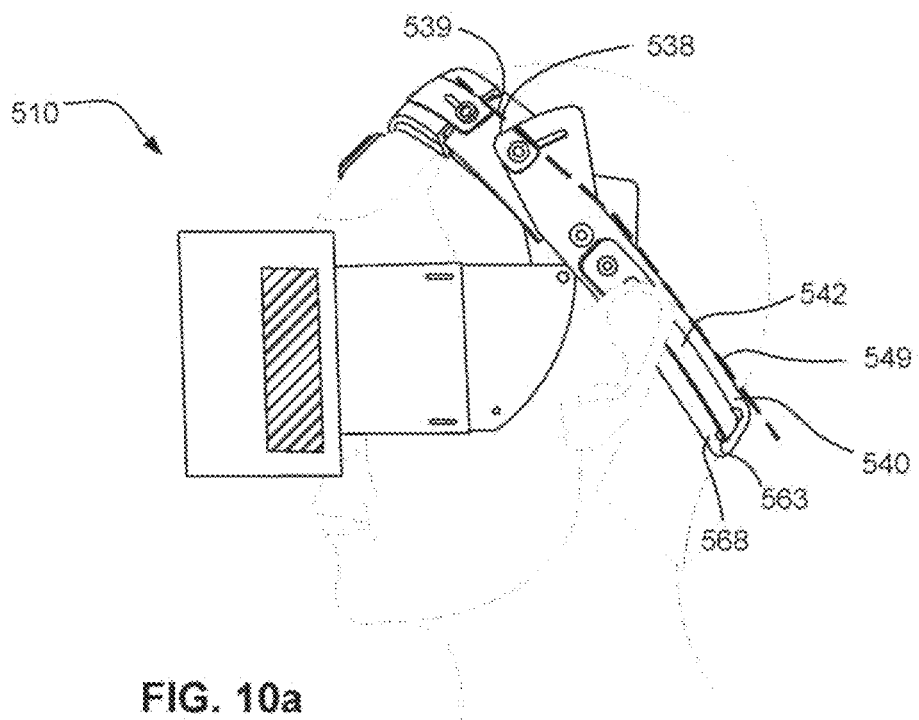
Figure 10B:
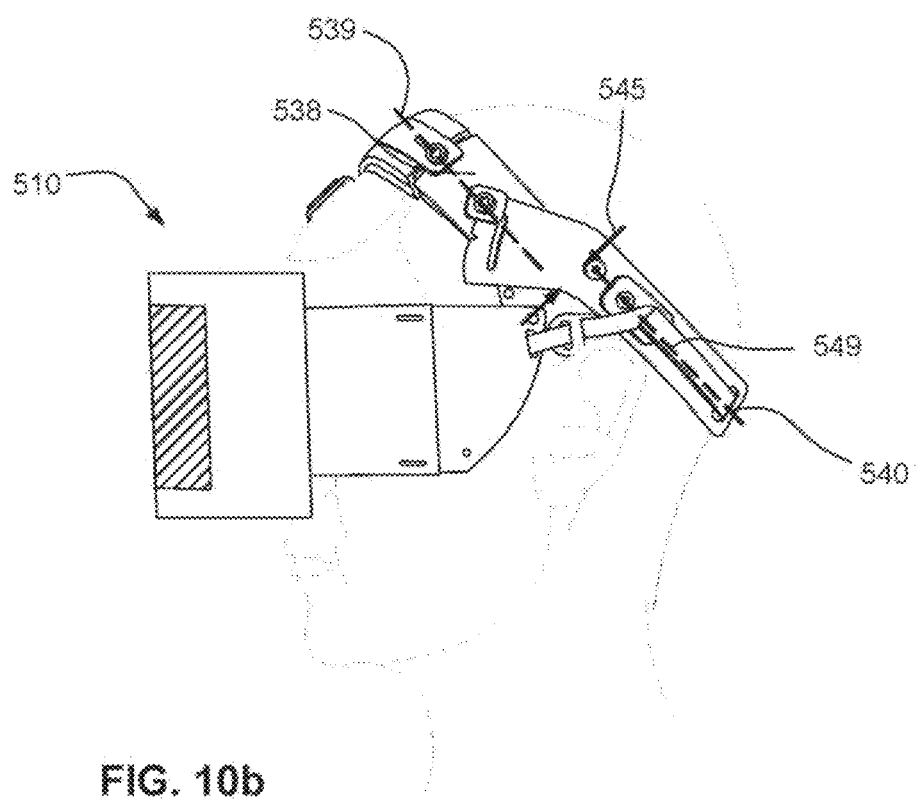
Figure 10C:
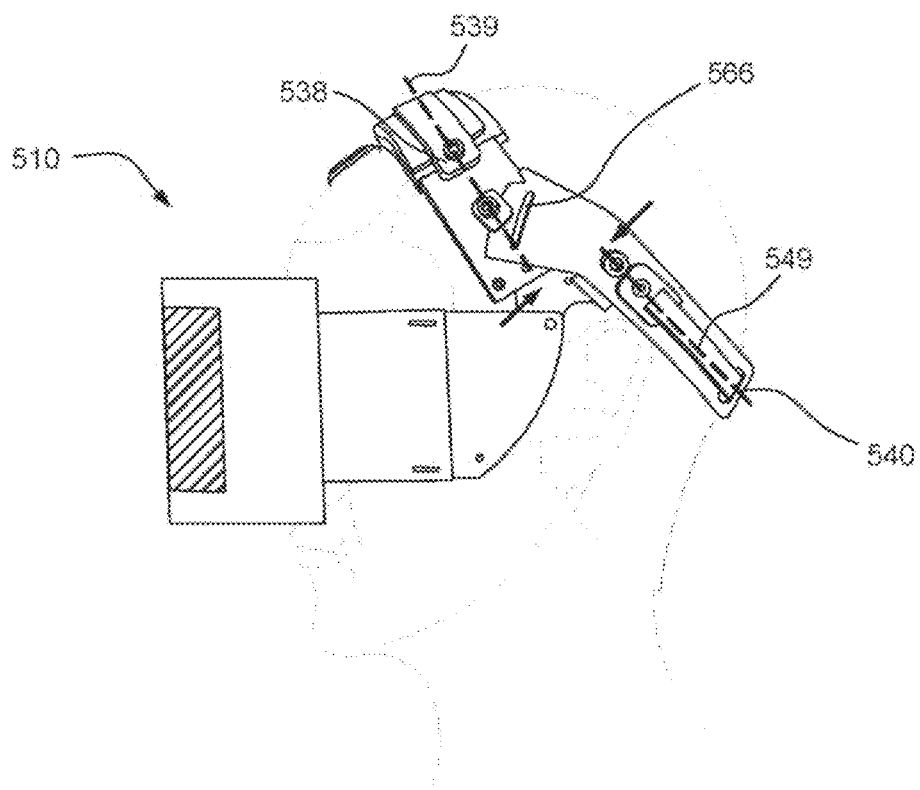

FIGS. 10a-10c are side views of an example of a positioning and stabilising structure of a head-mounted display.

Figure 11A:
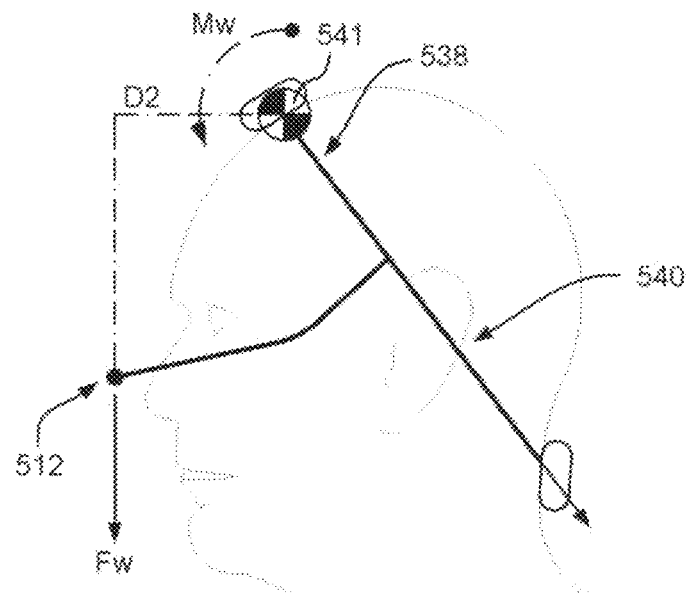
Figure 11B:
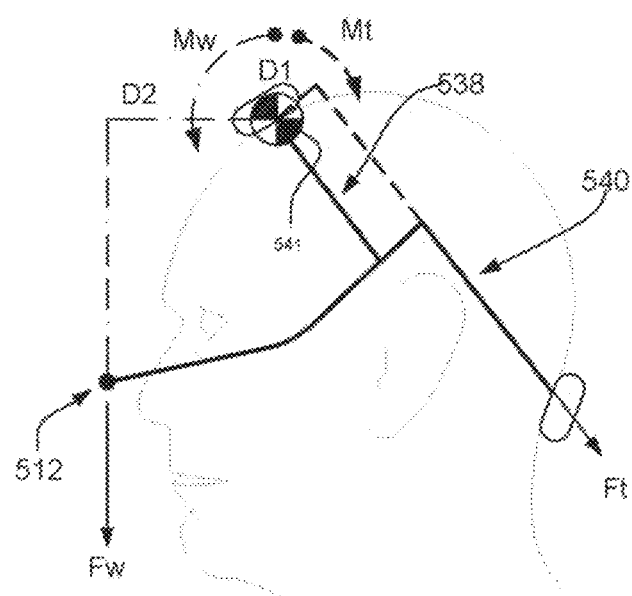
Figure 11C:
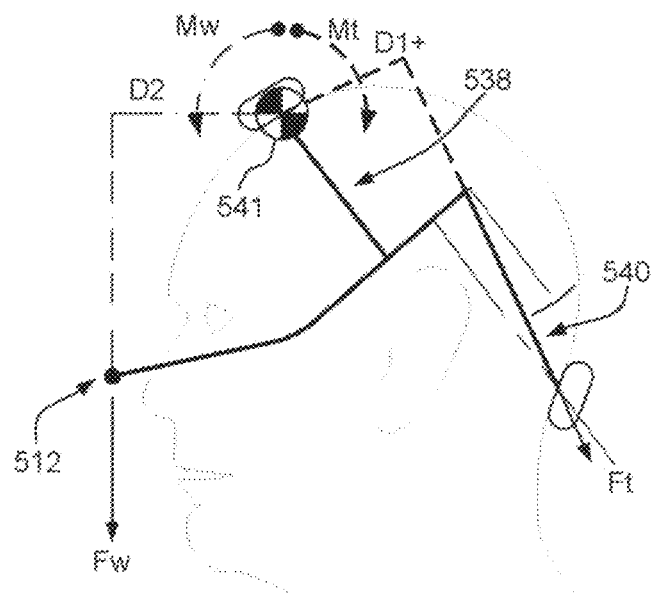

FIGS. 11a-11c are schematic side views of a positioning and stabilising structure of a head-mounted display.

Figure 12A:
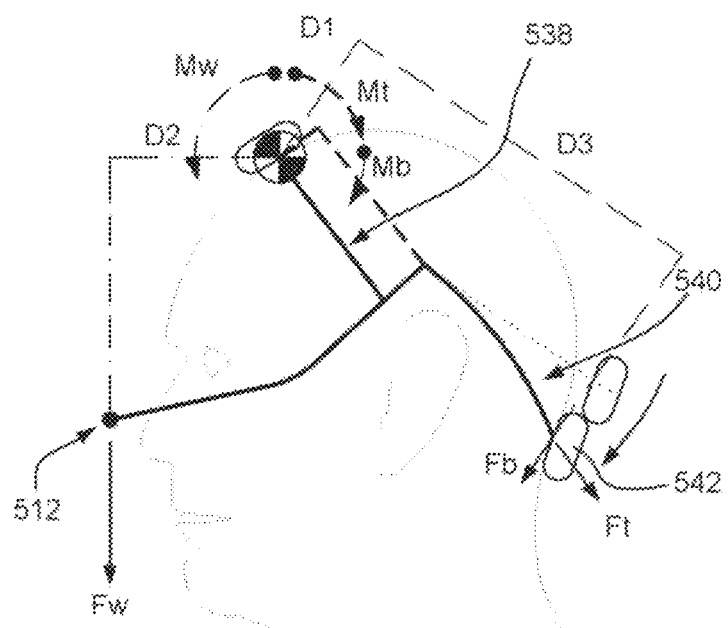
Figure 12B:
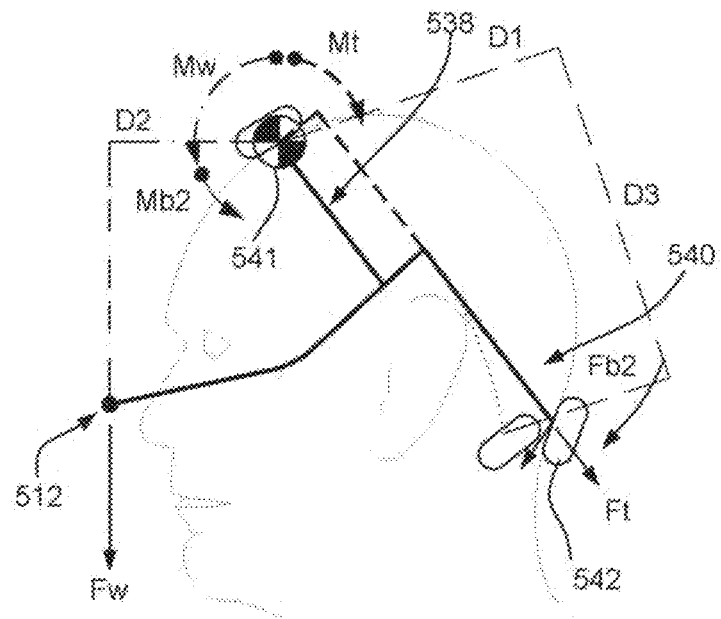

FIGS. 12a-12b are schematic side views of a positioning and stabilising structure of a head-mounted display.

Figure 12C:
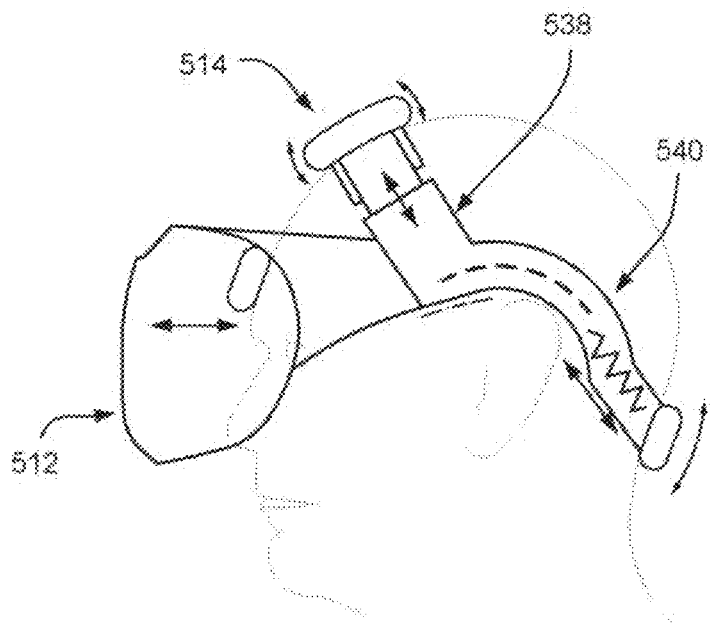

FIG. 12c is a schematic side view of the positioning and stabilising structure of a head mounted display illustrating adjustability characteristics according to an example of the present technology.

Figure 13A:
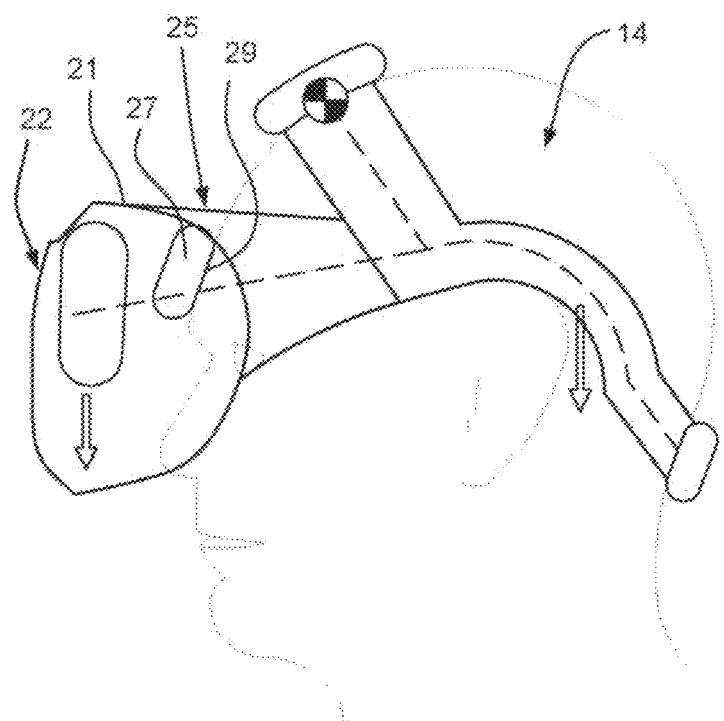
Figure 13B:
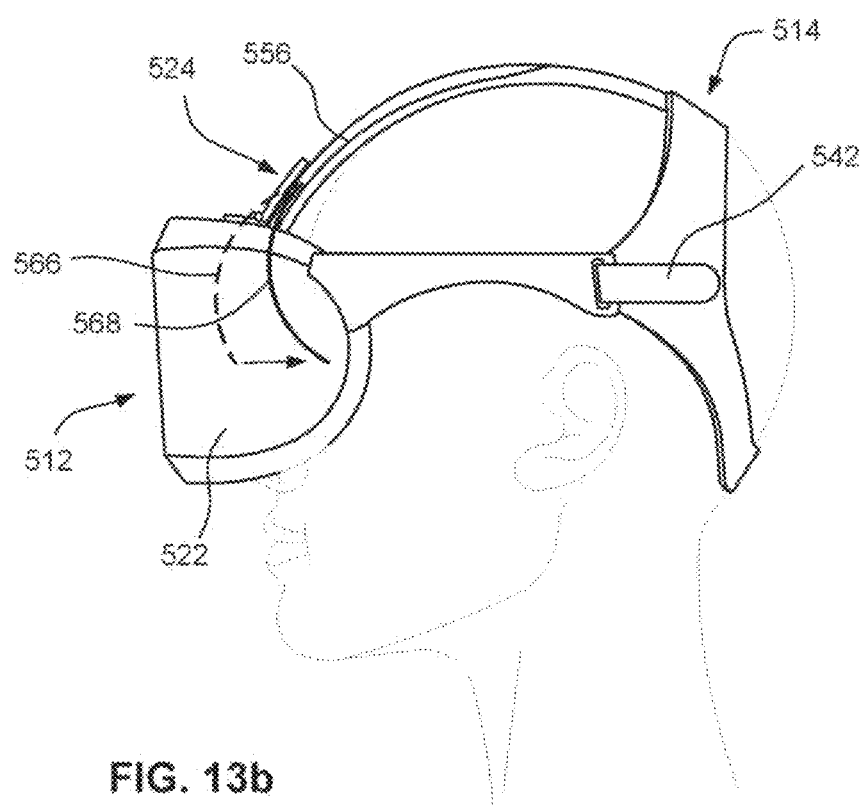
Figures 1, 13B:
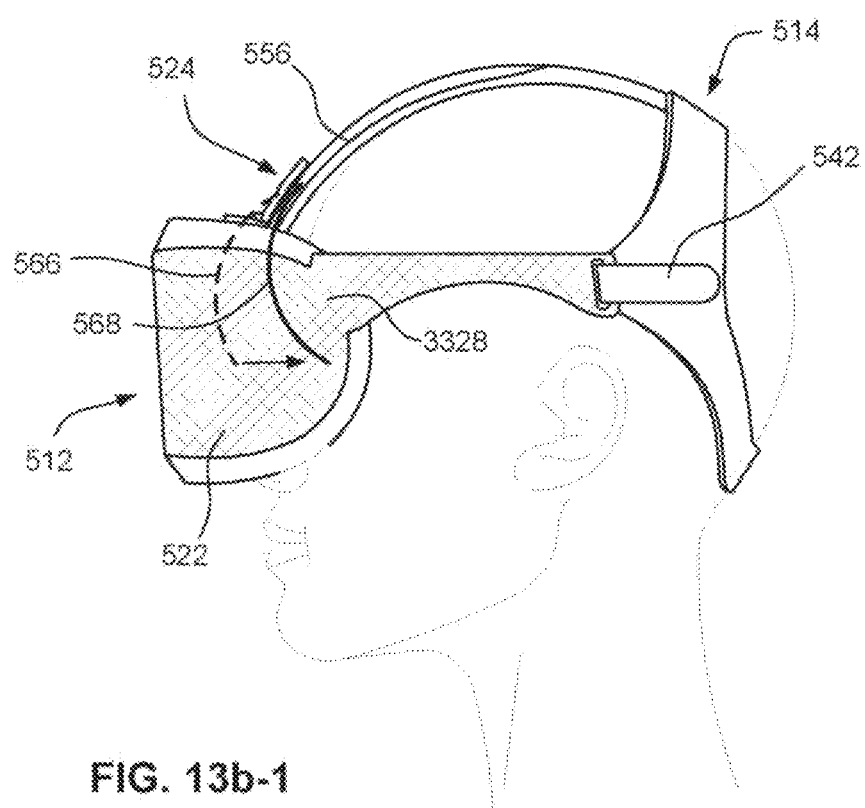

FIG. 13a-13b are schematic side views of positioning and stabilising structures including forehead support arrangements of a head-mounted display.

FIG. 13b-1 is an alternate version of the schematic side view of the positioning and stabilising structure of FIG. 13b, illustrating a portion of the head mounted display unit and a portion of the positioning and stabilising structure formed as a one-piece textile construction.

Figure 14A:
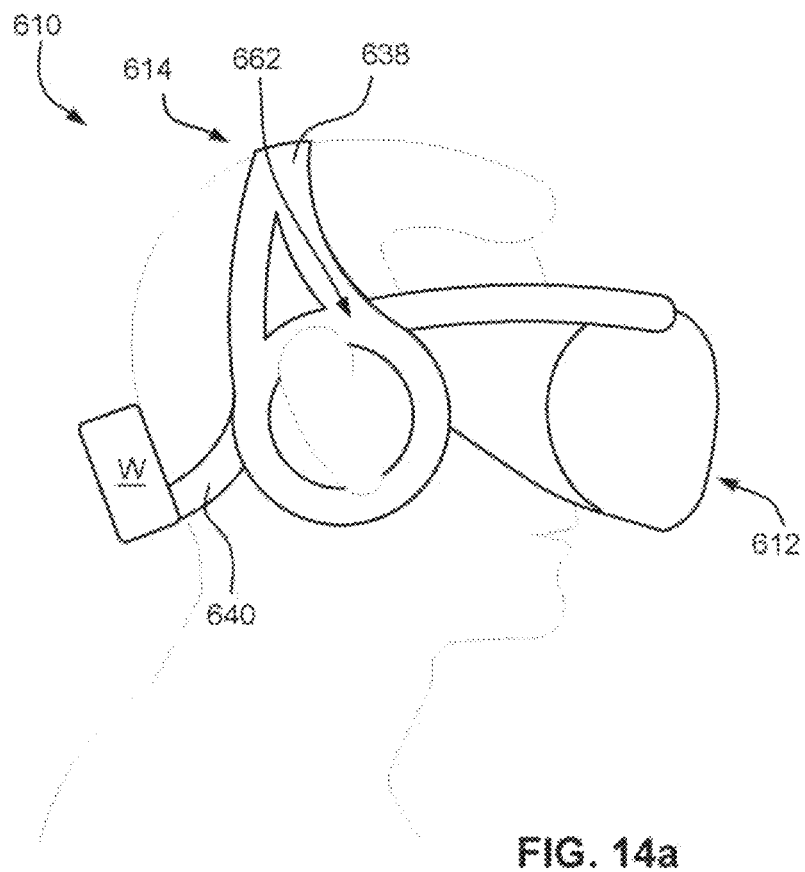

FIG. 14a is a schematic side view of a further example of a positioning and stabilising device, in-use.

Figure 14B:
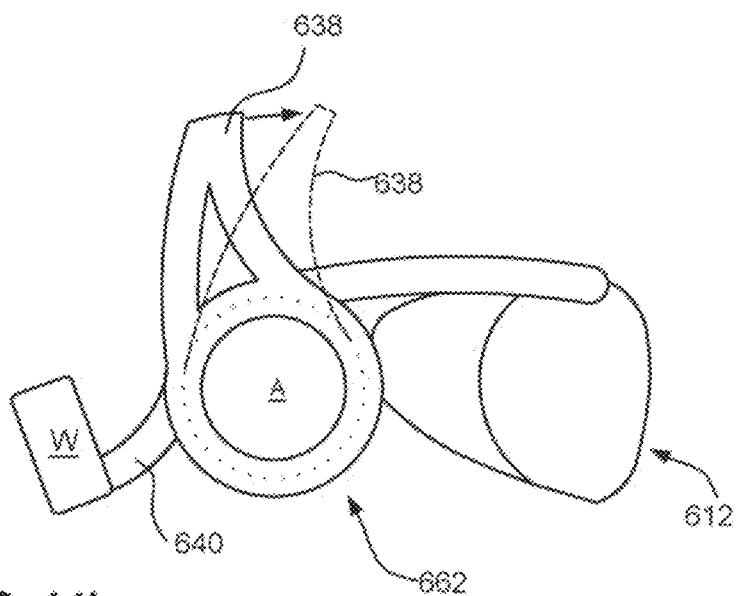

FIG. 14b is a schematic side view of a further example of a positioning and stabilising device with a frontal portion configured in examples of first and second configurations.

Figure 14C:
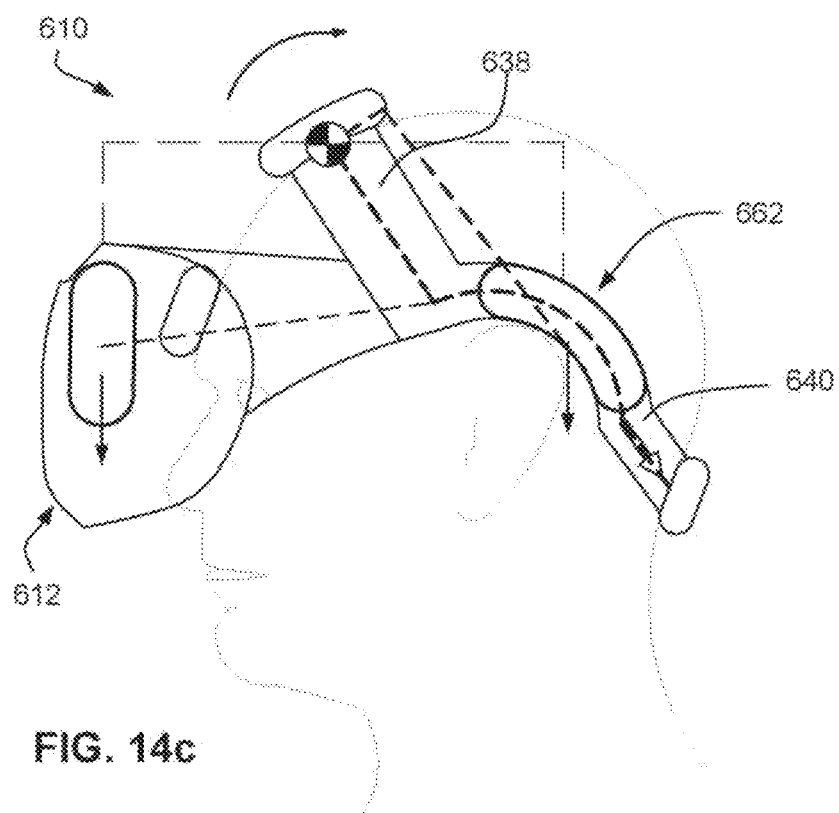

FIG. 14c is a schematic side view of a further example of a positioning and stabilising device illustrating vector locations according to an example of the present technology.

Figure 14D:
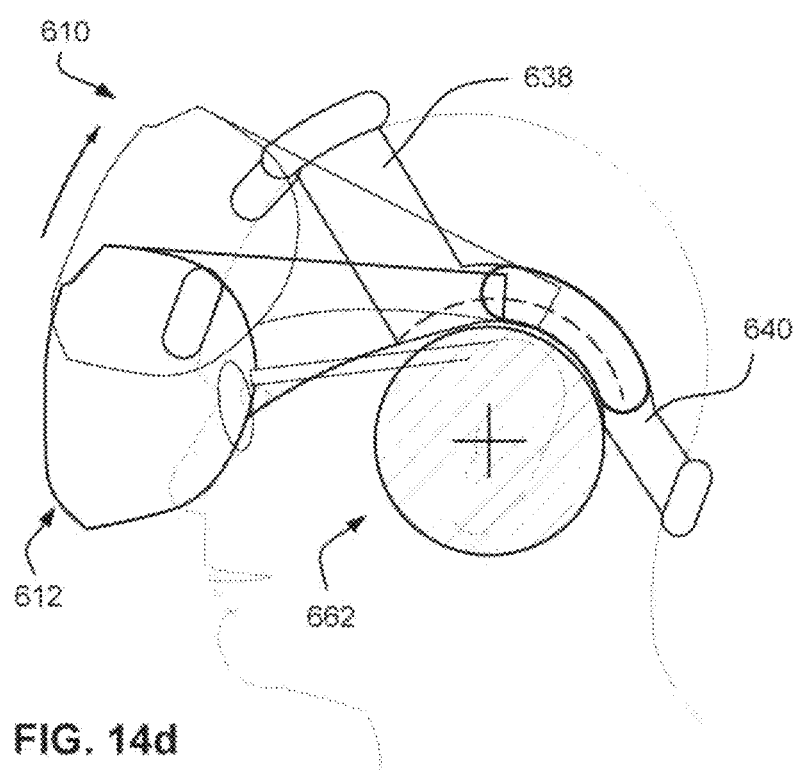
Figure 15A:
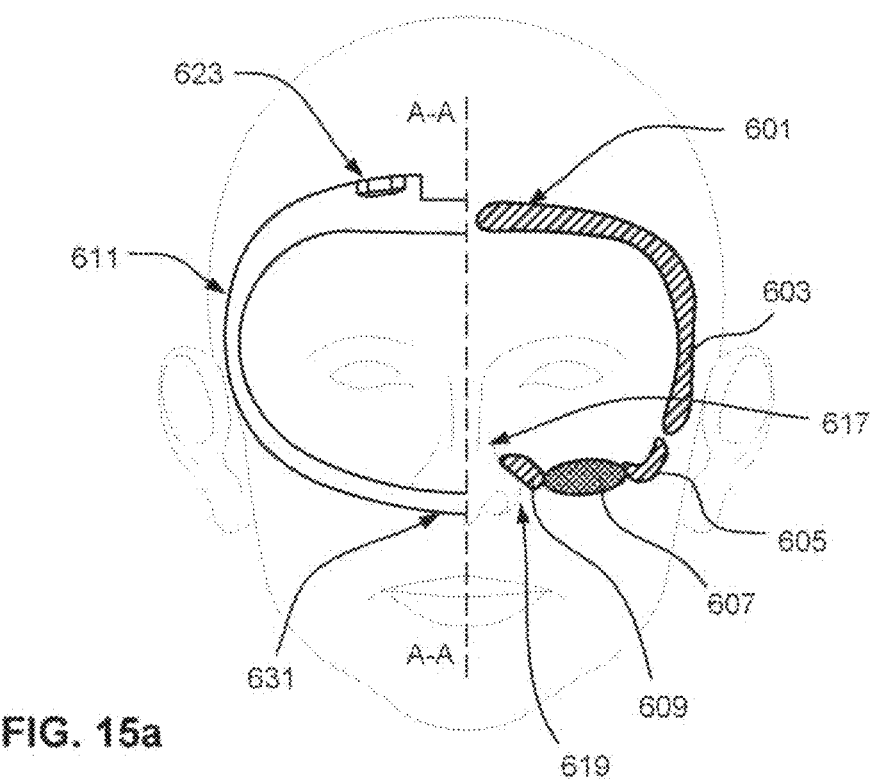

FIG. 14d is a schematic side view of a further example of a positioning and stabilising device with a display unit configured in examples of first and second configurations 4.3.2 Interfacing Structures FIG. 15a is a split front view across axis A-A of an example of the interfacing structure in use, the left-hand side showing the location of the interfacing structure and the right-hand side showing approximate facial areas that are engaged by the interfacing structure.

Figure 15B:
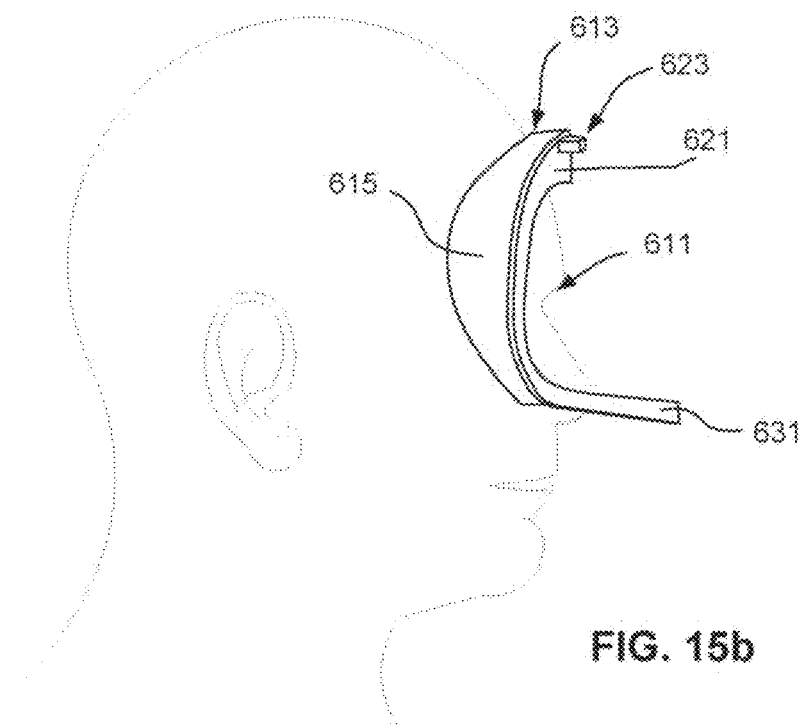

FIG. 15b is a side view of the interfacing structure of FIG. 15a, in use.

Figure 16A:
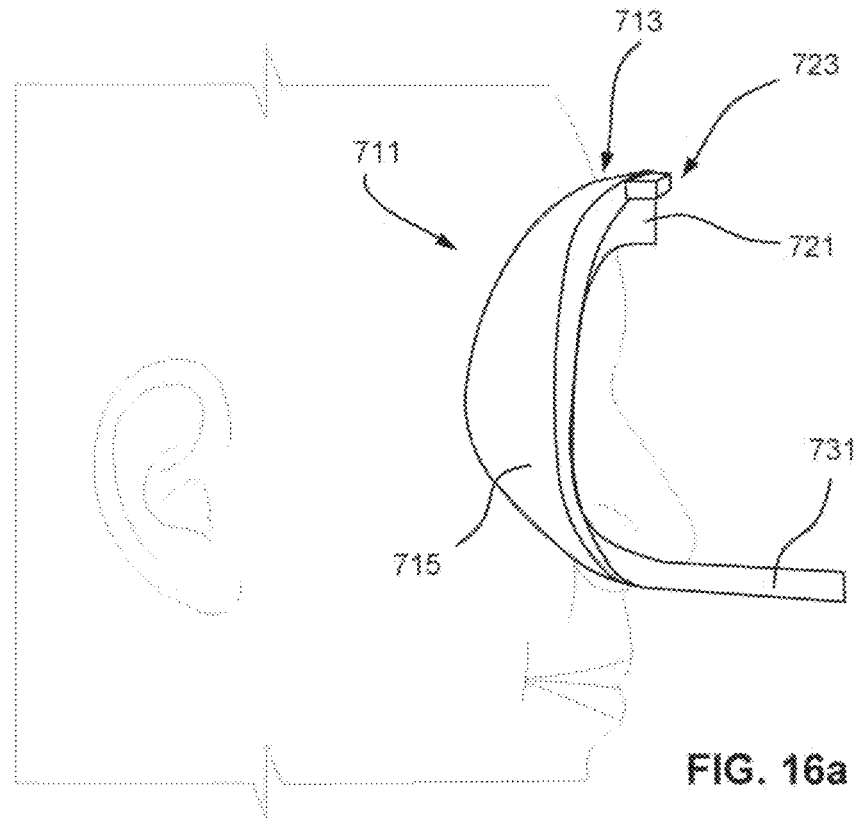
Figure 16B:
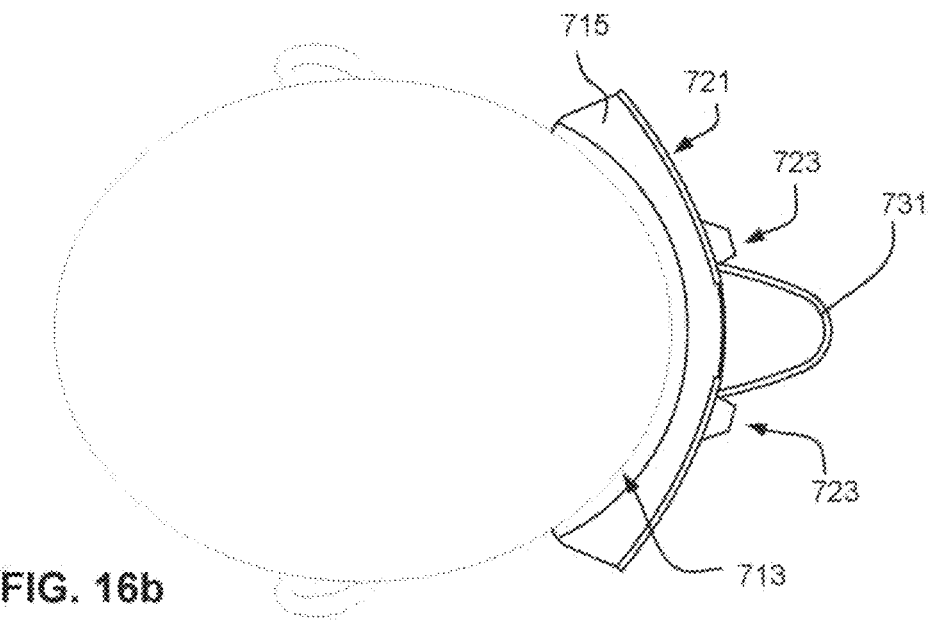
Figure 16C:
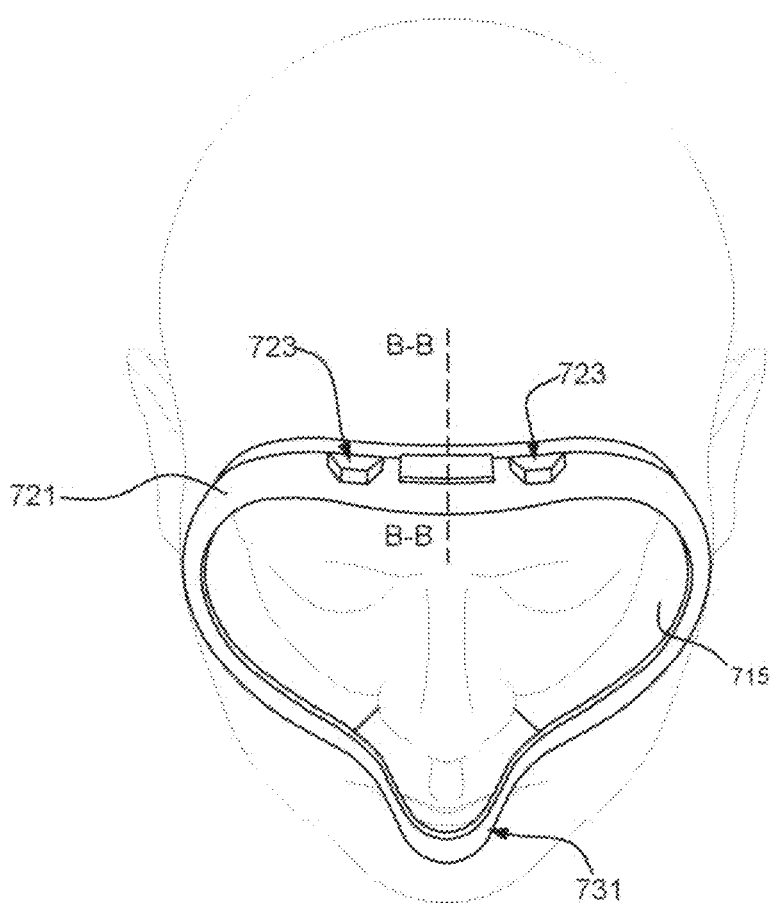

FIGS. 16a, 16b, and 16c are side, top and frontal superior views, respectively, of a second example of the interfacing structure in use.

Figures 17A, 17B:
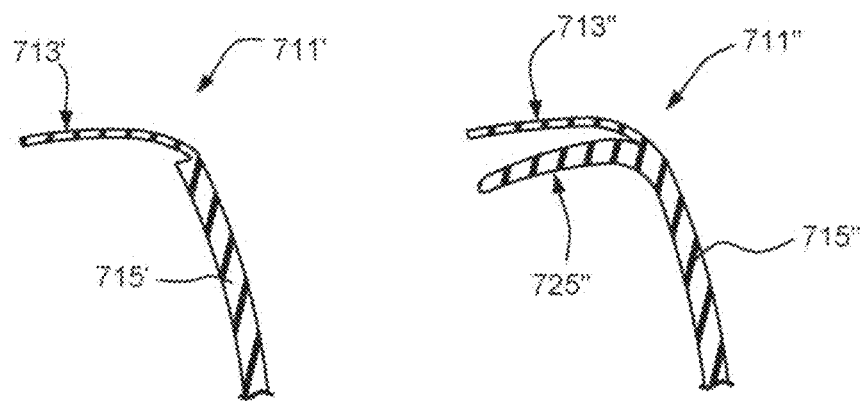

FIG. 17a is a side cross section view through axis B-B of FIG. 16c, showing an example of the support structure and face engaging surface according to an example of the present technology.

FIG. 17b is a side cross section view through axis B-B of FIG. 16c, showing a second example of the support structure and face engaging surface, further comprising a supporting flange.

Figure 18:
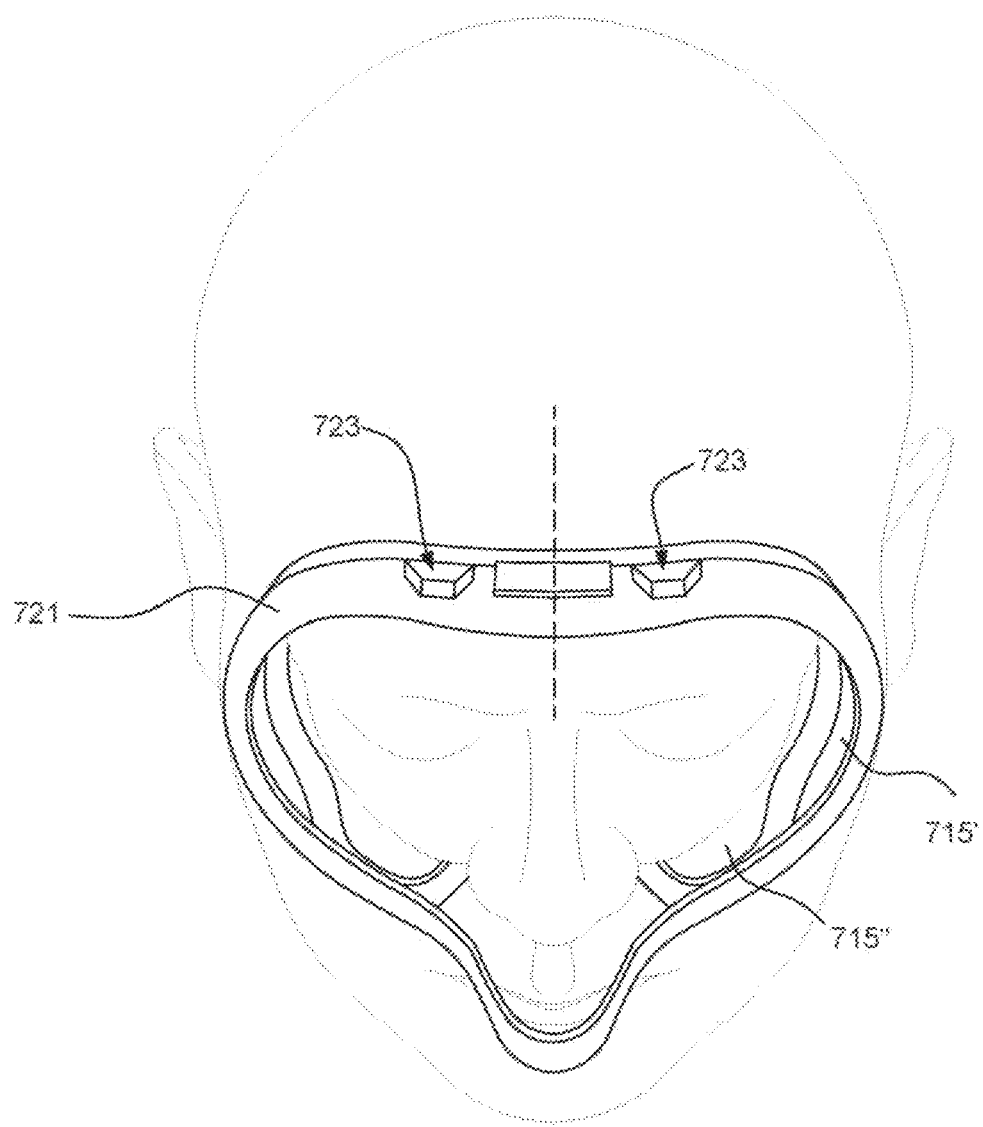

FIG. 18 is a frontal superior view of a third example of the interfacing structure, in use.

Figure 19:
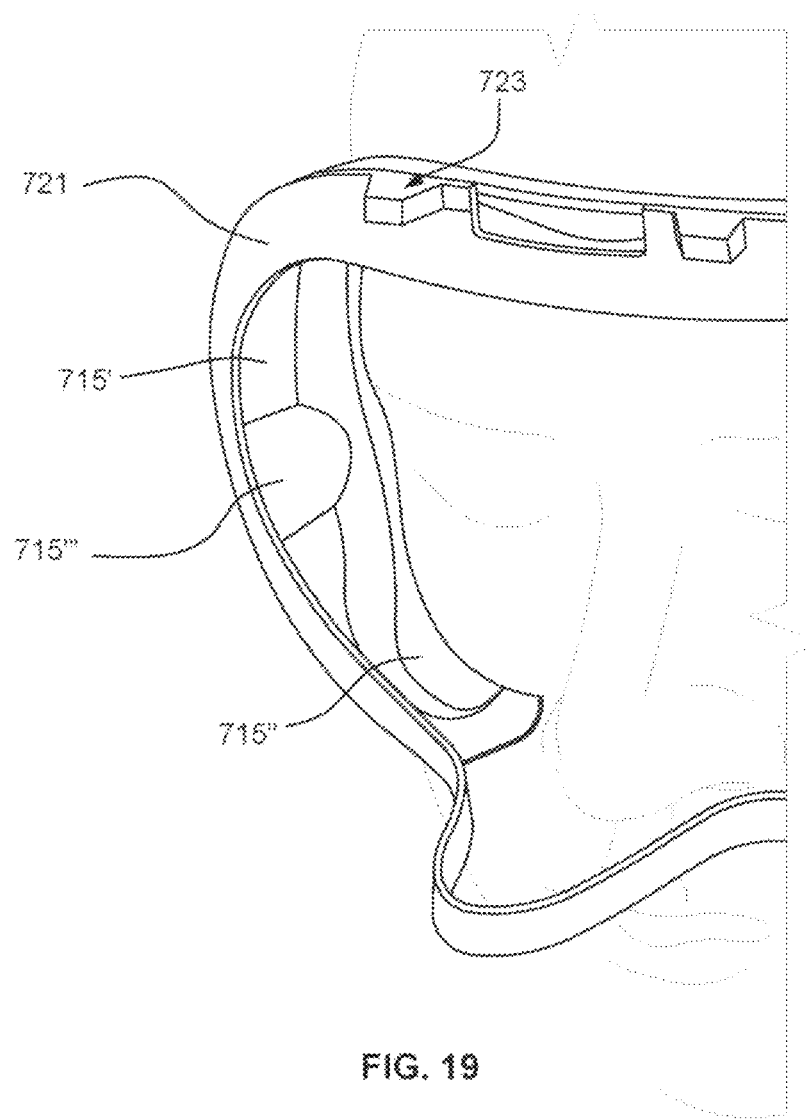

FIG. 19 is a partial frontal superior view of a fourth example of the interfacing structure, in use.

Figure 20A:
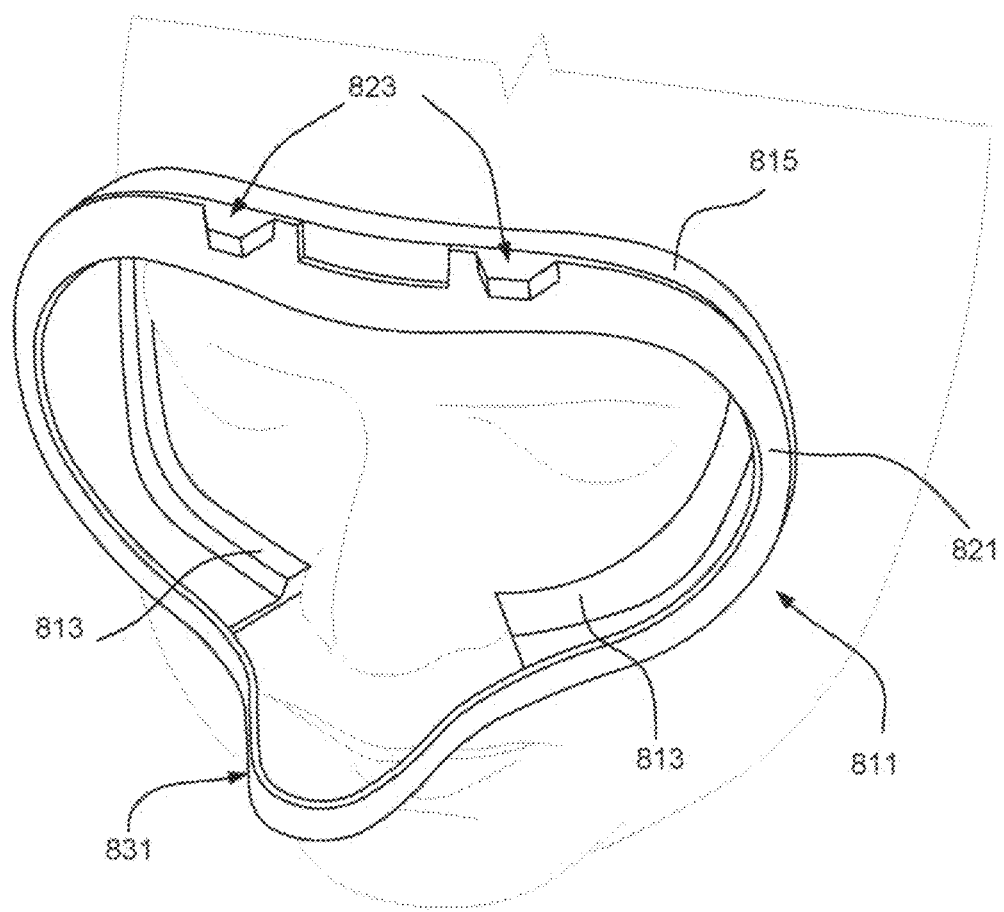
Figures 1, 20A:
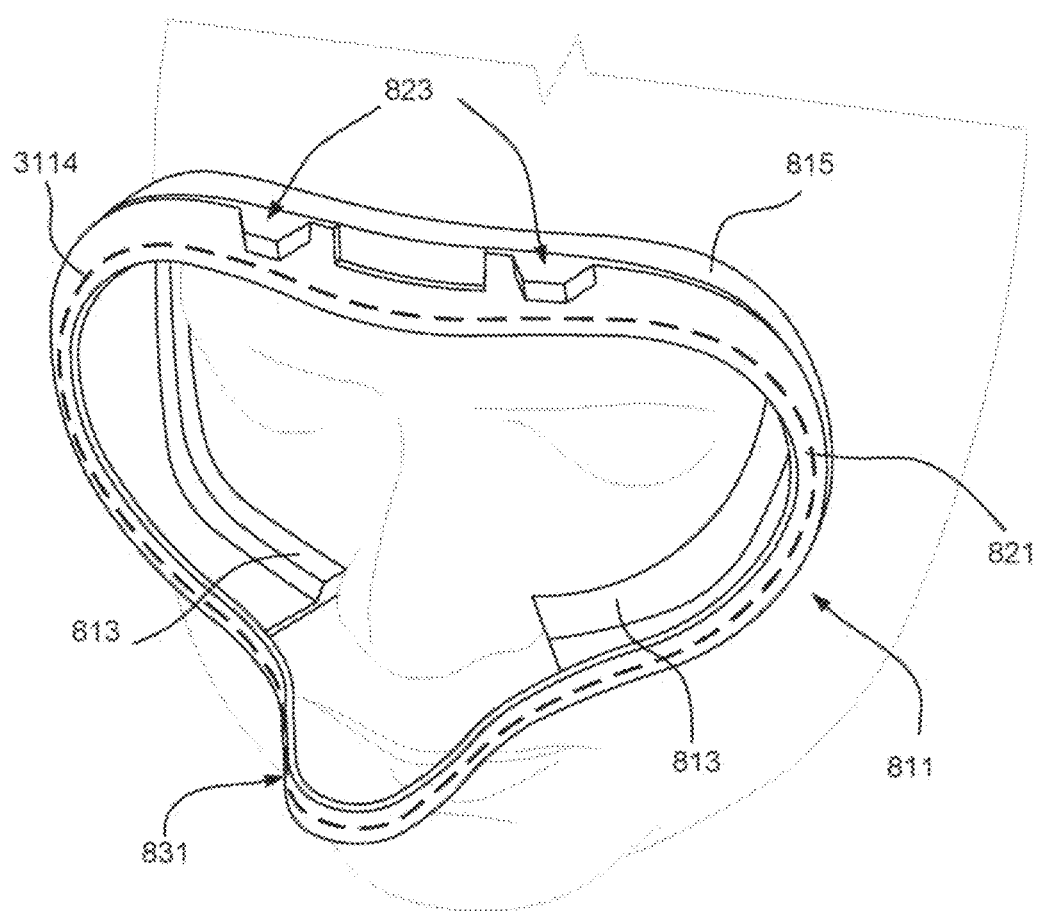

FIG. 20a is a frontal superior from a side angle view of a fifth example of the interfacing structure in use.

FIG. 20a-1 is a frontal superior from a side angle view of an alternate example of the fifth example of FIG. 20a, illustrating a magnetic portion.

Figure 20B:
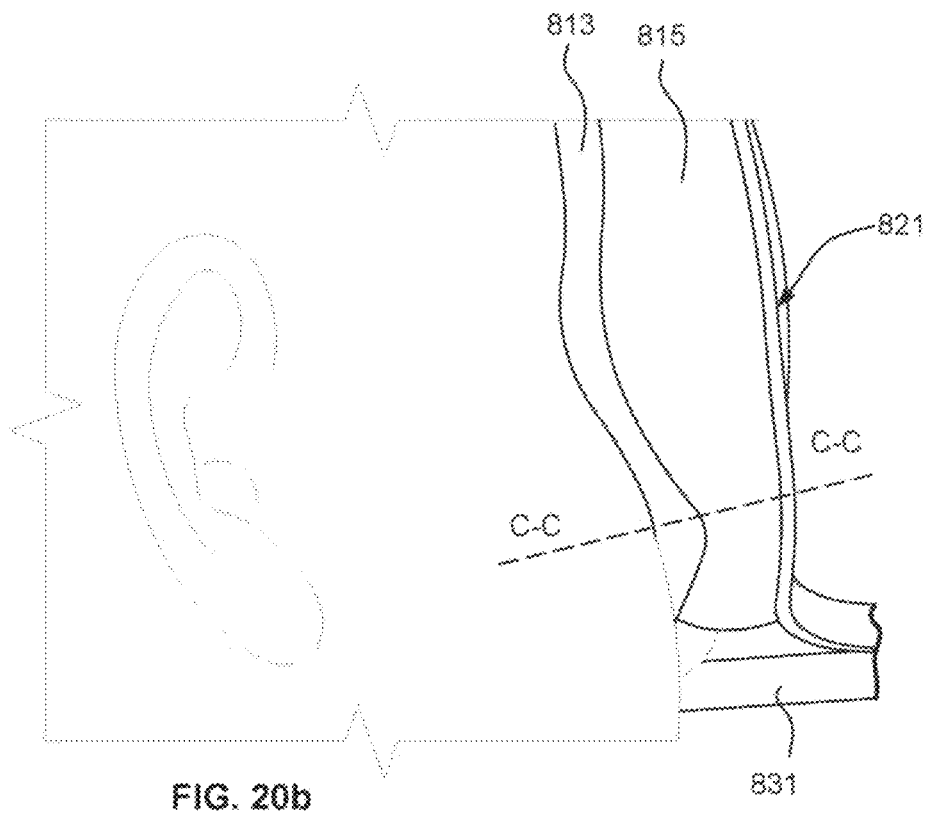
Figures 1, 20B:
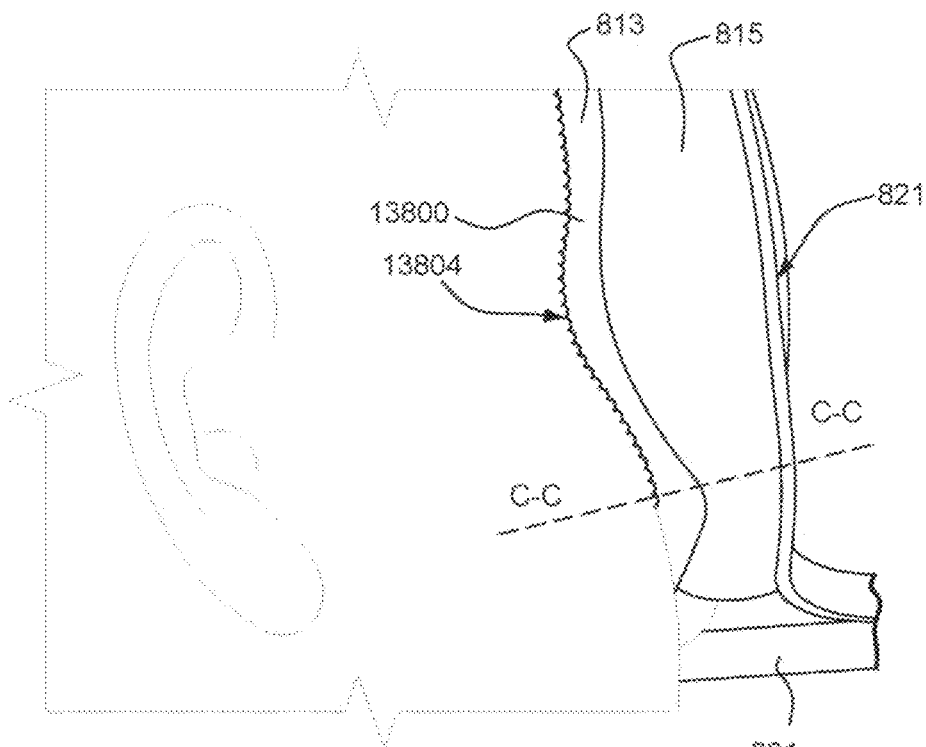
Figures 2, 20B:
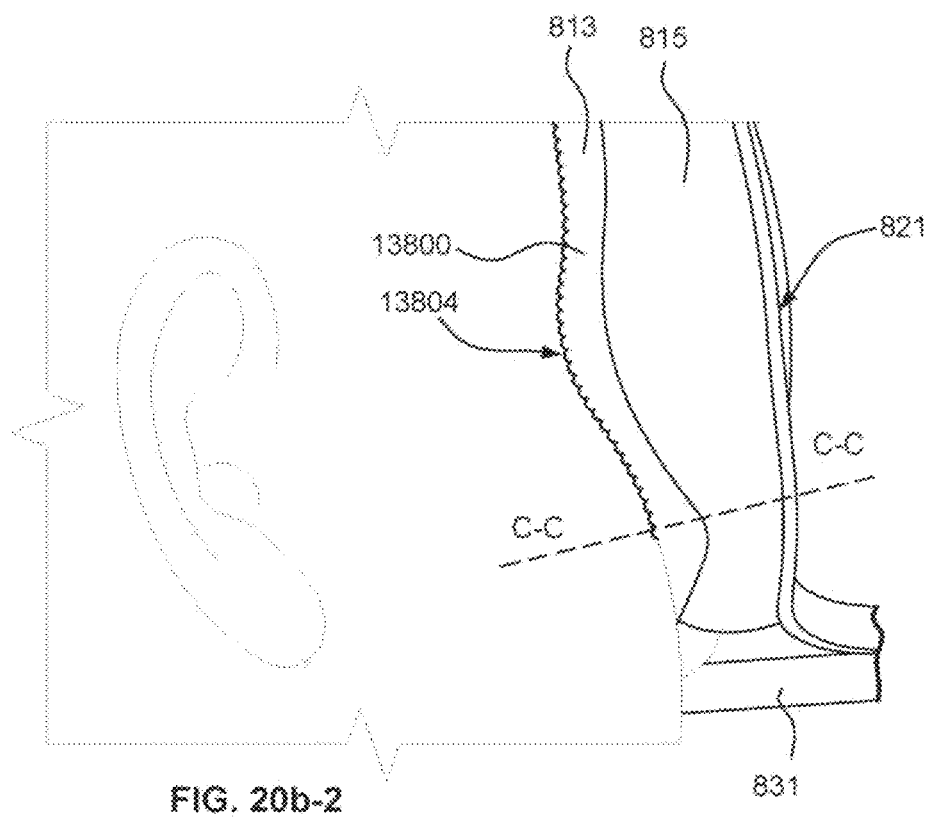

FIG. 20b is a side from a side angle view of the fifth example of FIG. 20a.

FIG. 20b-1 is a side from a side angle view of an alternate example of the fifth example of FIG. 20b, illustrating a user interfacing structure with a bellows portion in a first position.

FIG. 20b-2 is a side from a side angle view of the alternate example of the fifth example of FIG. 20b-1, illustrating a user interfacing structure with a bellows portion in a second position.

Figure 20C:
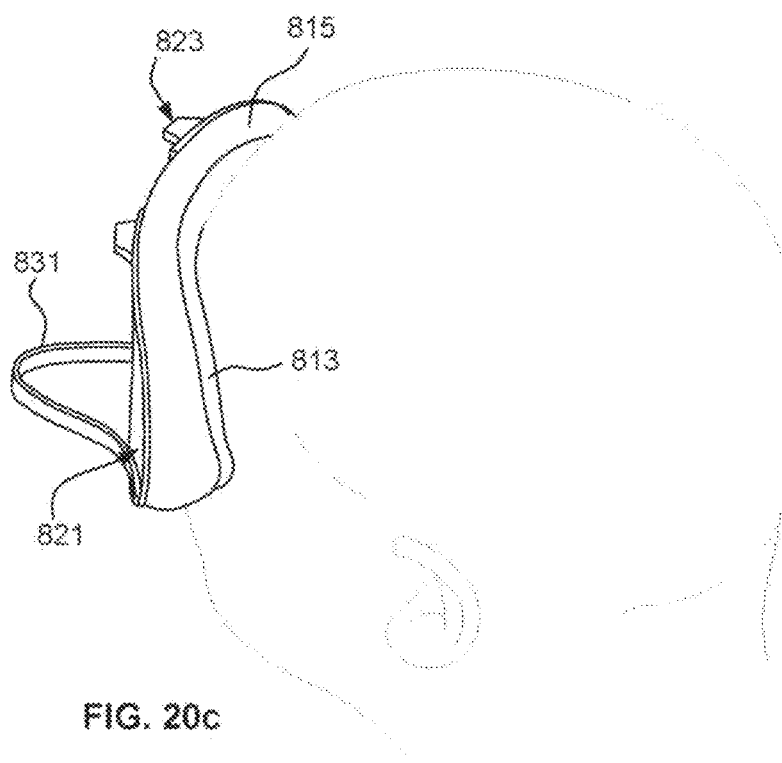
Figures 1, 20C:
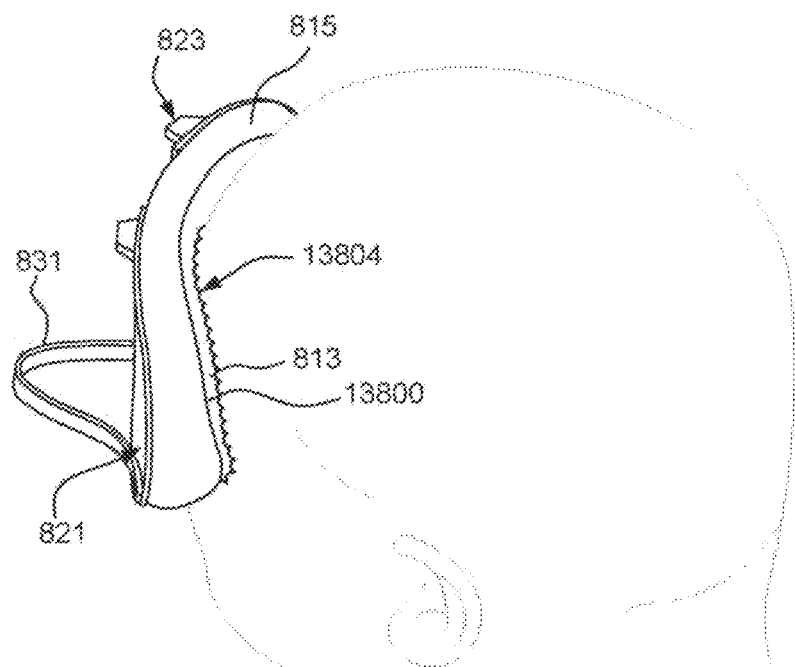
Figures 2, 20C:
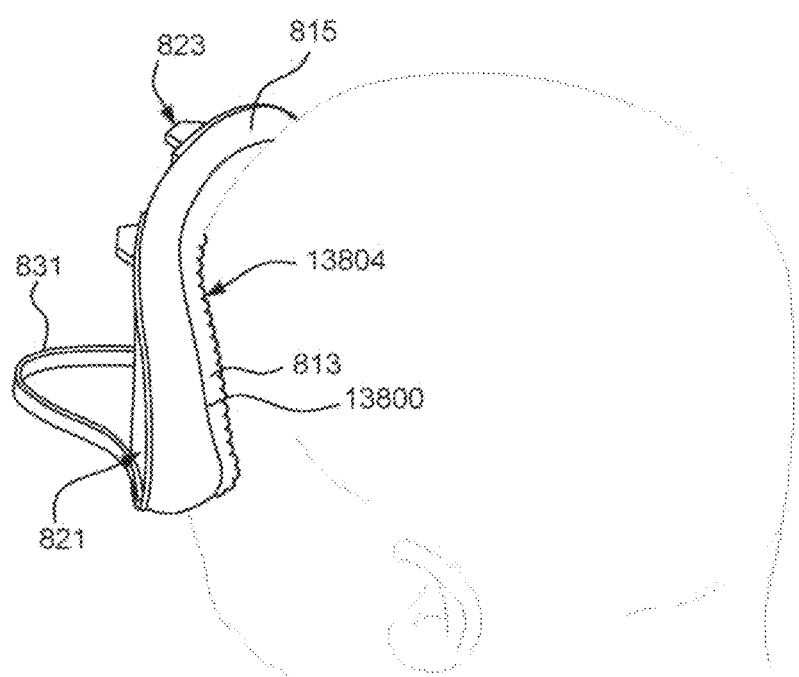

FIG. 20c is a top from a side angle view of the fifth example of FIG. 20a.

FIG. 20c-1 is a side from a side angle view of an alternate example of the fifth example of FIG. 20c, illustrating a user interfacing structure with a bellows portion in a first position.

FIG. 20c-2 is a side from a side angle view of the alternate example of the fifth example of FIG. 20c-1, illustrating a user interfacing structure with a bellows portion in a second position.

Figure 20D:
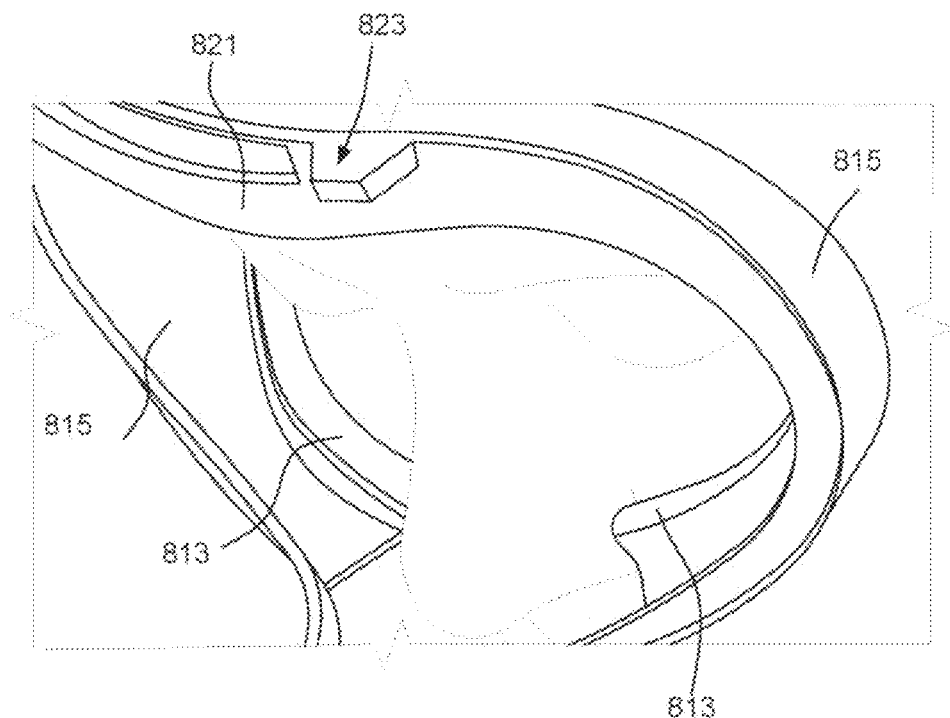

FIG. 20d is a frontal superior from a side angle view of the fifth example of FIG. 20a.

Figures 21A, 21B:
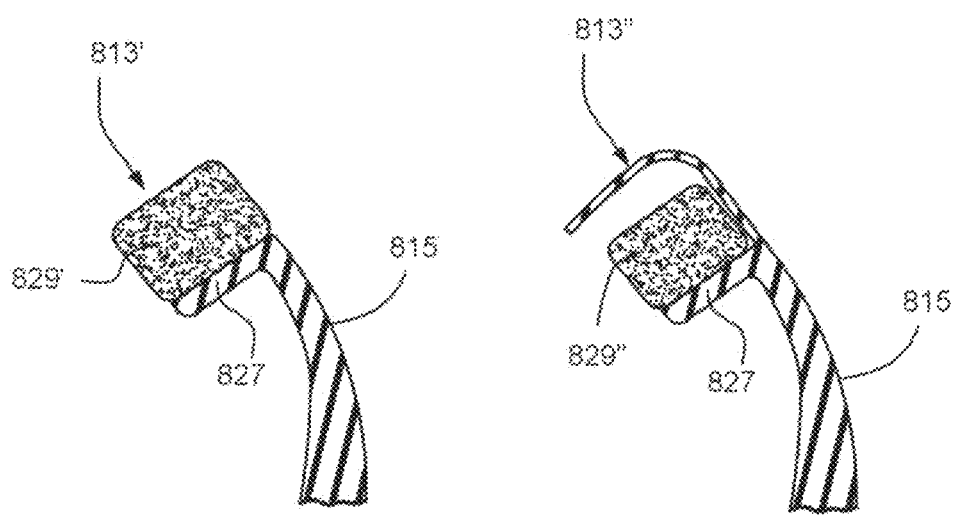

FIG. 21a is a side cross section view through axis C-C of FIG. 20b, showing an example of a foam cushion face engaging surface attached directly to an upper portion of the support structure according to an example of the present technology.

FIG. 21b is a side cross section view through axis C-C of FIG. 20b, showing an embodiment of a face engaging surface that covers a foam cushion under layer, the foam cushion being attached directly to an upper portion of the support structure according to an example of the present technology.

Figure 22:
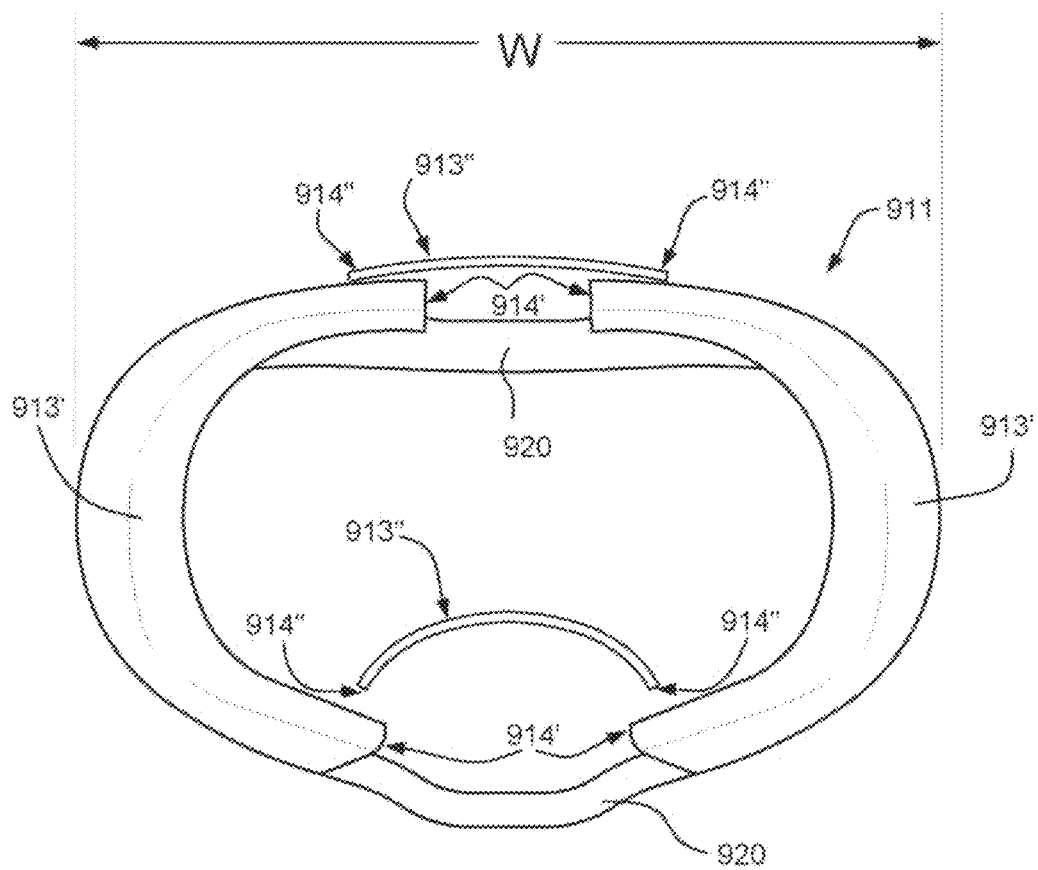

FIG. 22 is a rear view of a sixth embodiment of the interfacing structure in use, the interfacing structure being adjustable in width W according to a sixth example of the present technology.

Figure 23A:
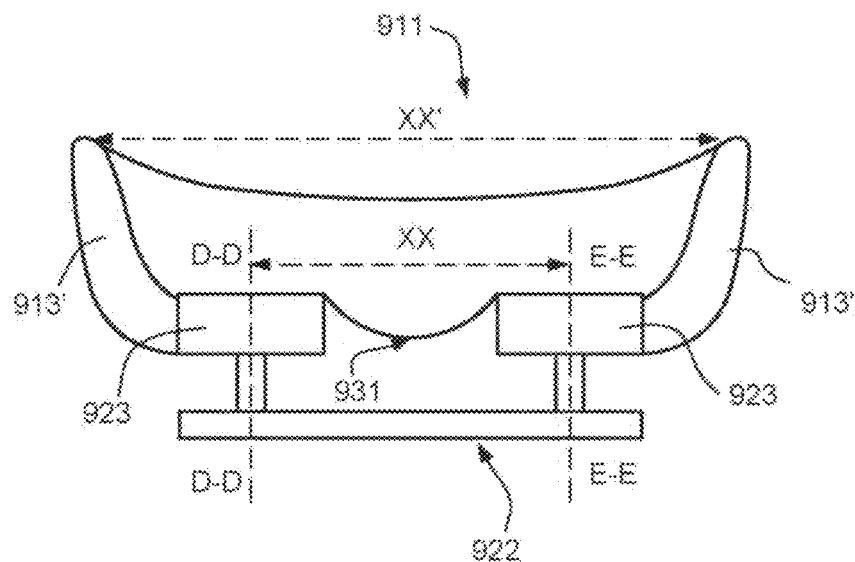
Figure 23B:
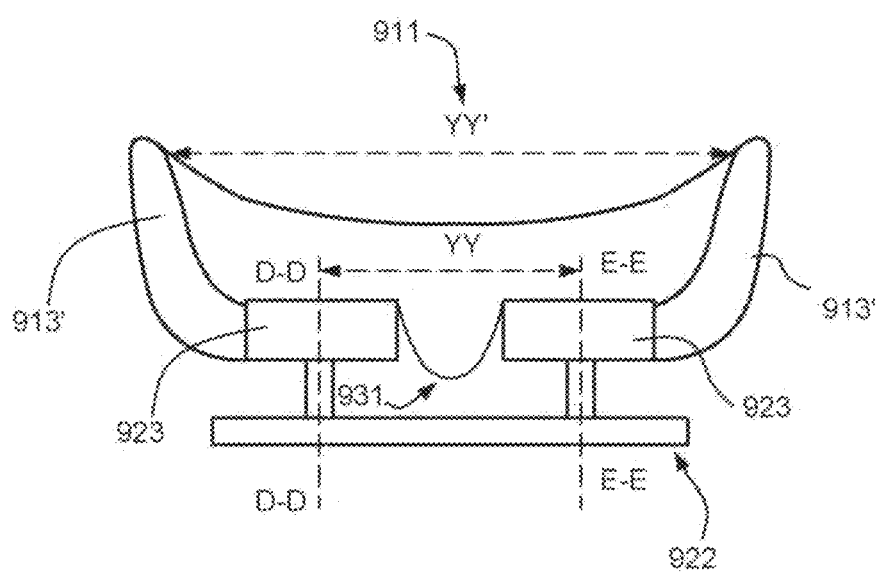

FIGS. 23a and 23b are a cross-section view from below of a further embodiment of the adjustable interfacing structure in use, at a wider lens width XX and narrower lens width YY respectively according to an example of the present technology. The lens width is measured from a central axis (e.g. axis E-E) of the first lens to a central axis (e.g. axis D-D) of the second lens.

Figure 24:
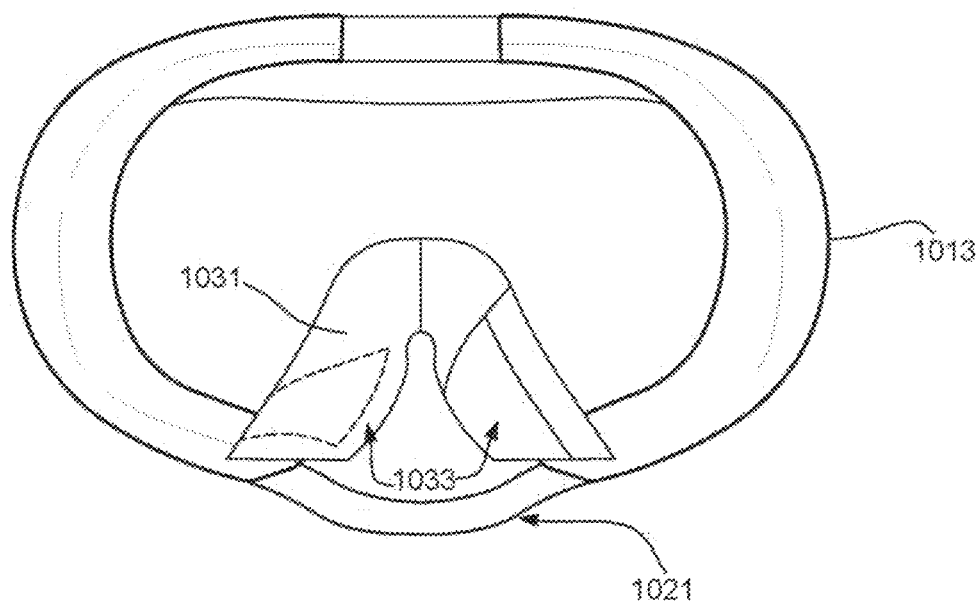

FIG. 24 is a rear view of a seventh embodiment of the interfacing structure in use.

4.3.3 Anthropometrical Data Models

Figure 25A:
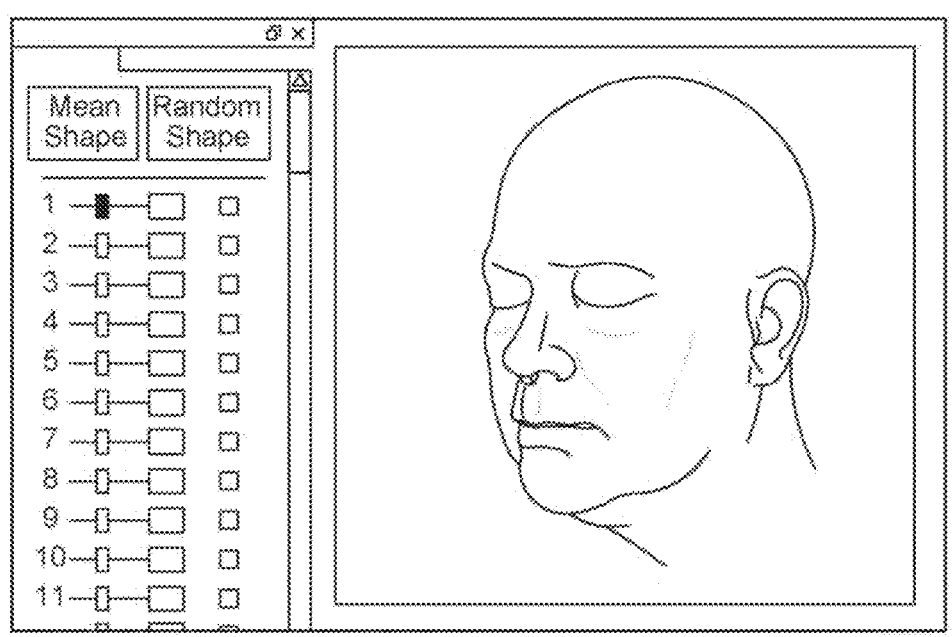
Figure 25B:
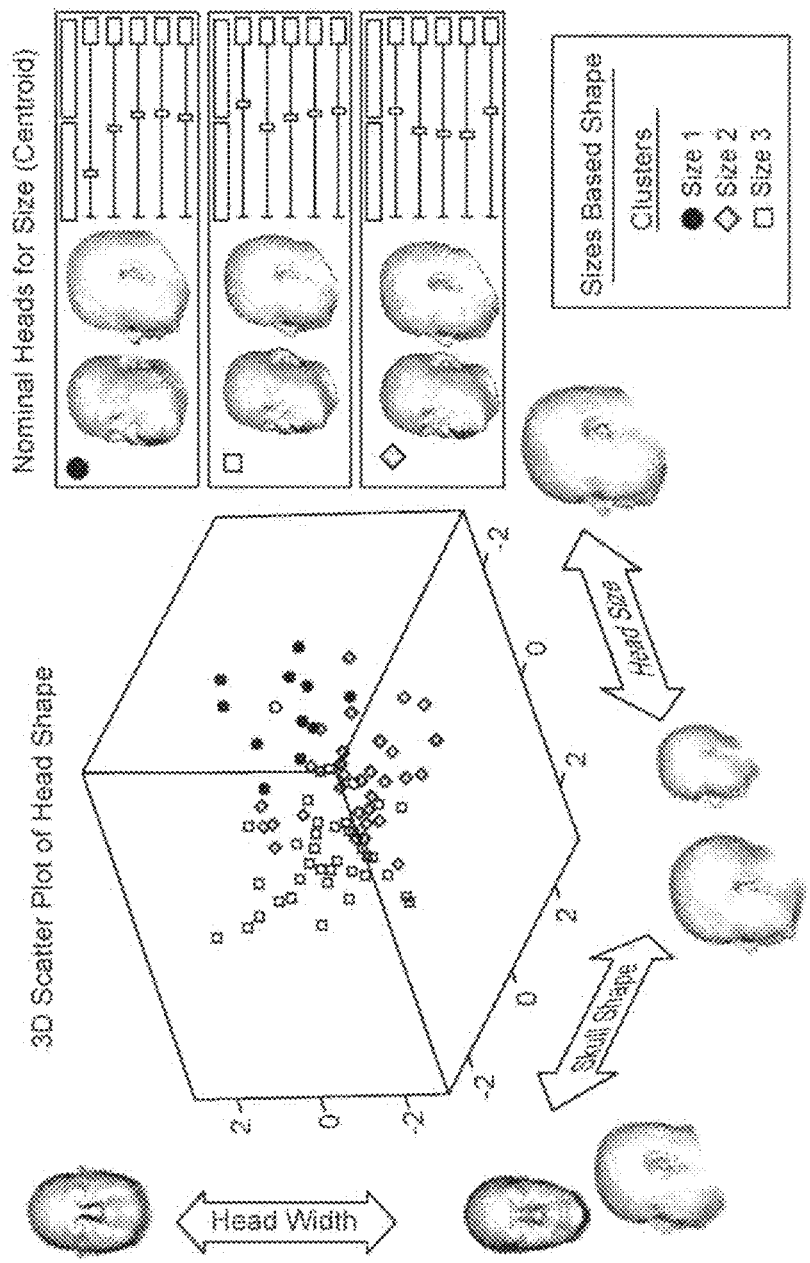

FIGS. 25a-25b are an anthropometrical data model of sizing and clustering based on head shape variation according to an example of the present technology.

Figure 26A:
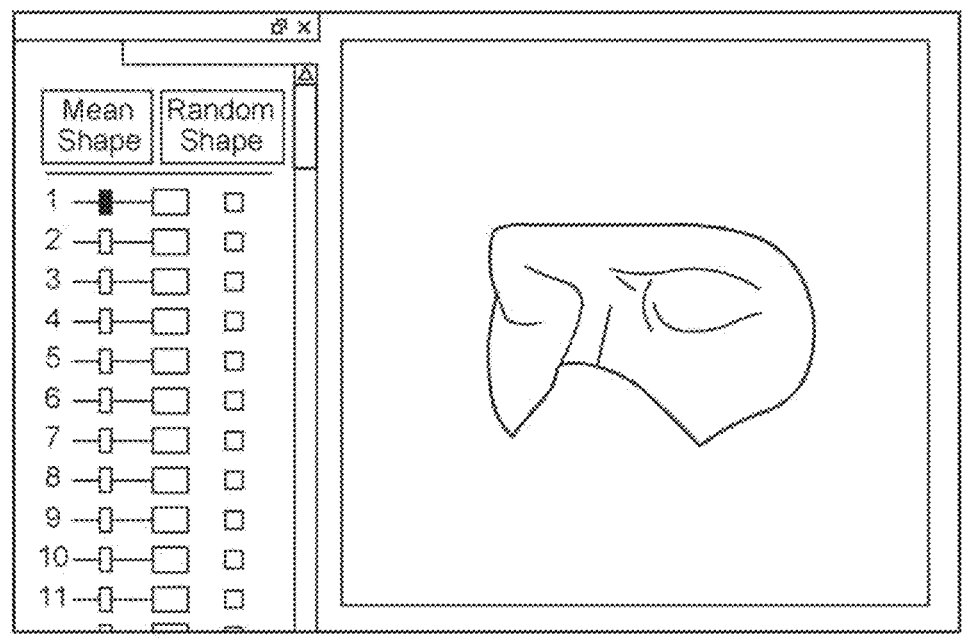
Figure 26B:
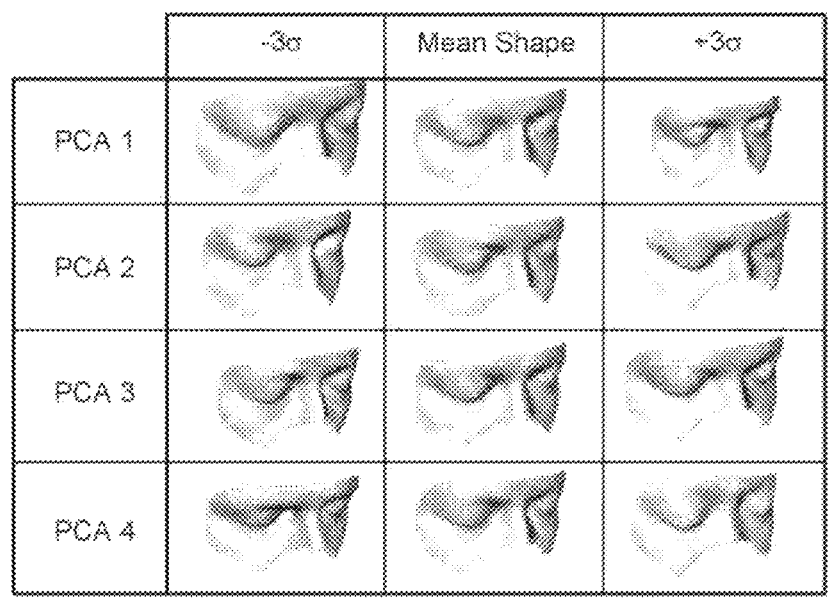

FIGS. 26a-26b are an anthropometrical data model of sizing based on nominated facial zones according to an example of the present technology.

Figure 27A:
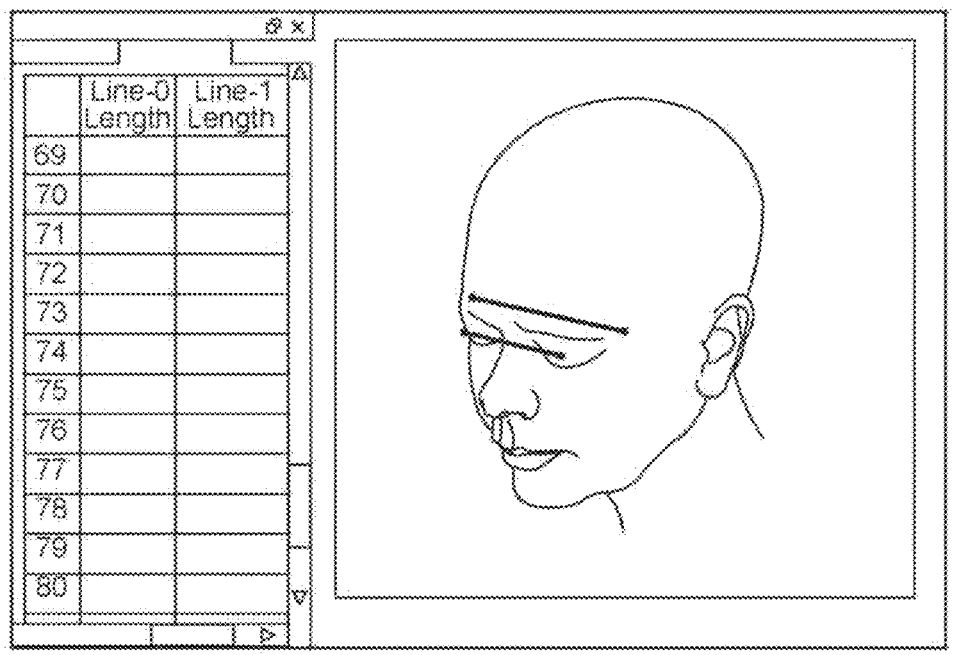
Figure 27B:
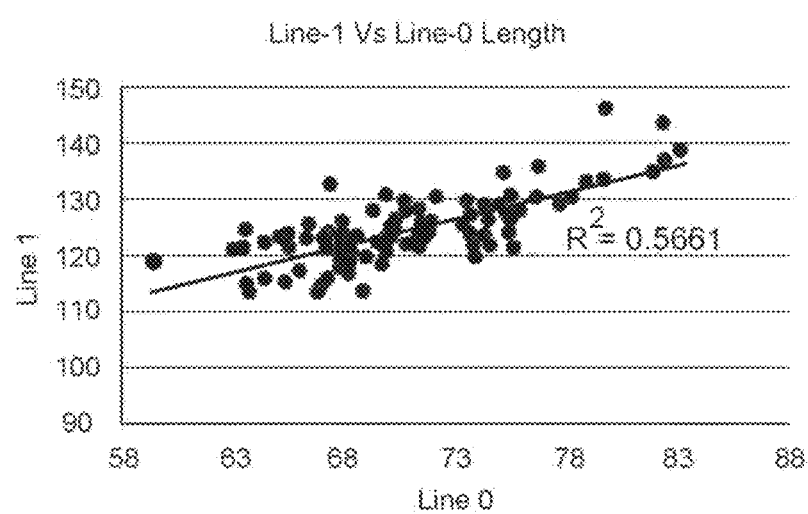

FIG. 27a-27b are an anthropometrical data model of sizing based on anthropometrical landmarks according to an example of the present technology.

4.4 Additional Aspects of the Present Technology

Figure 28A:
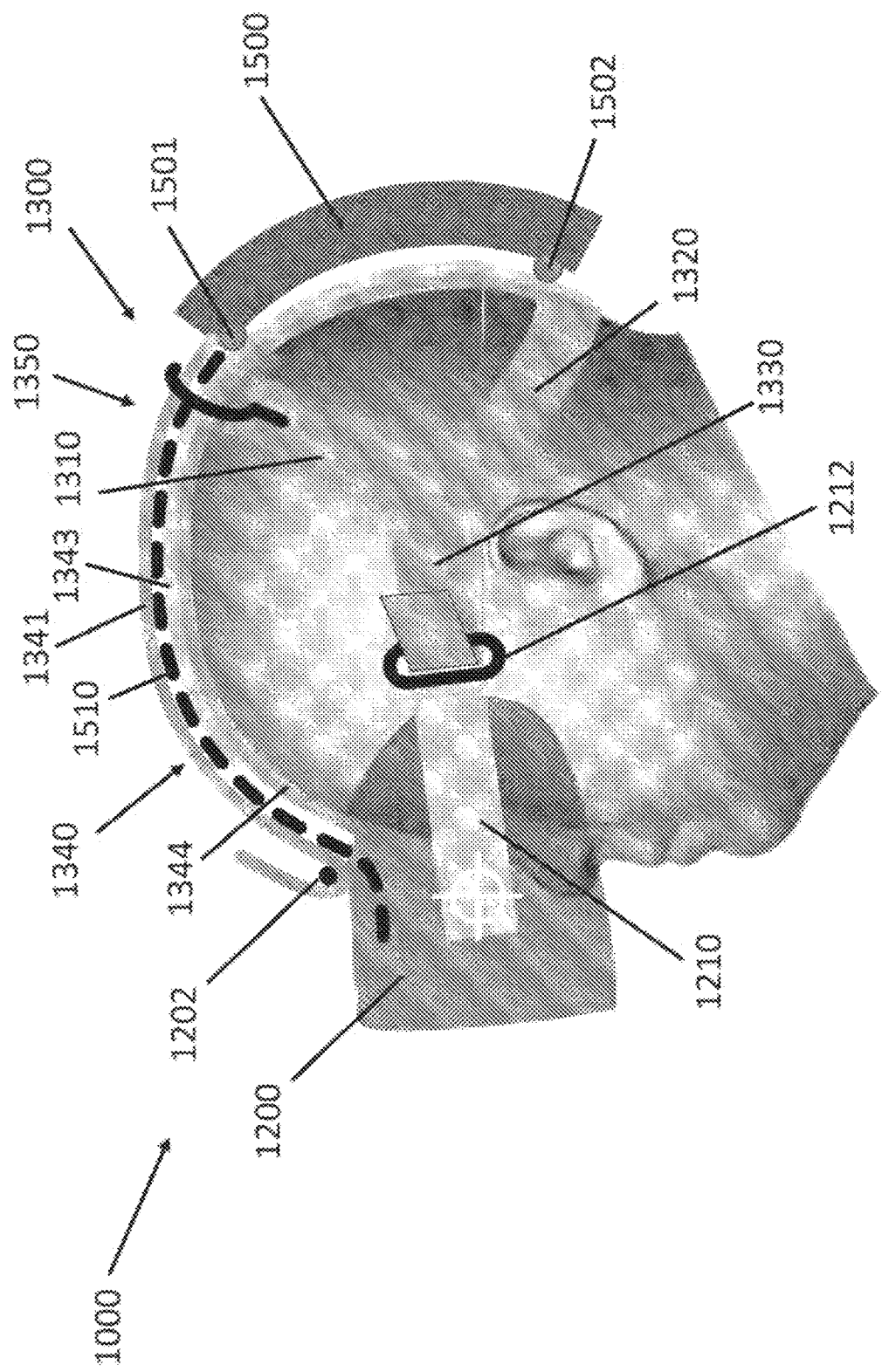
Figure 28B:
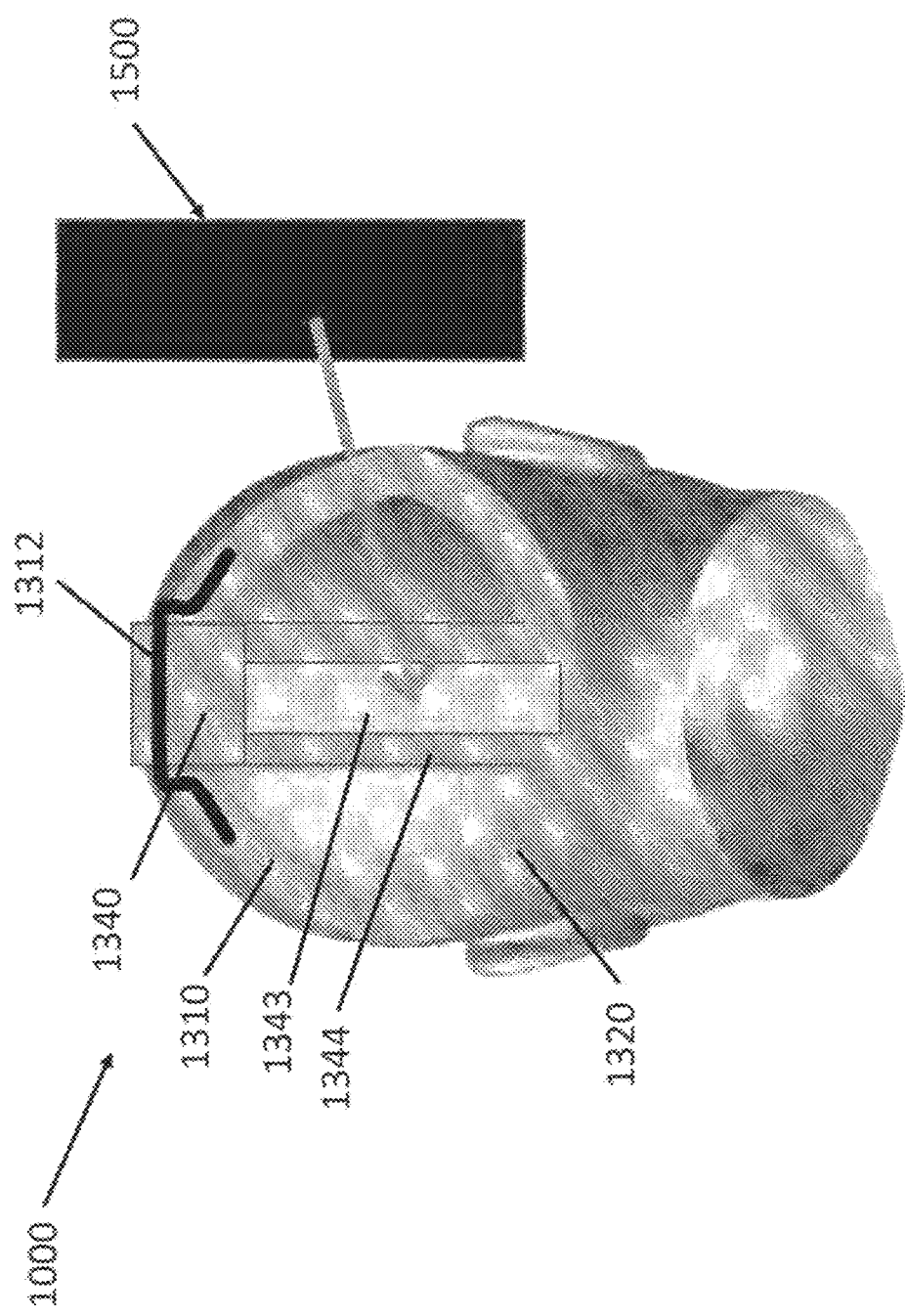

FIG. 28A is a schematic side view of a head-mounted display system according to another example of the present technology, in use;

FIG. 28B is a schematic rear view of the head-mounted display system shown in FIG. 7A, in use.

Figure 28C:
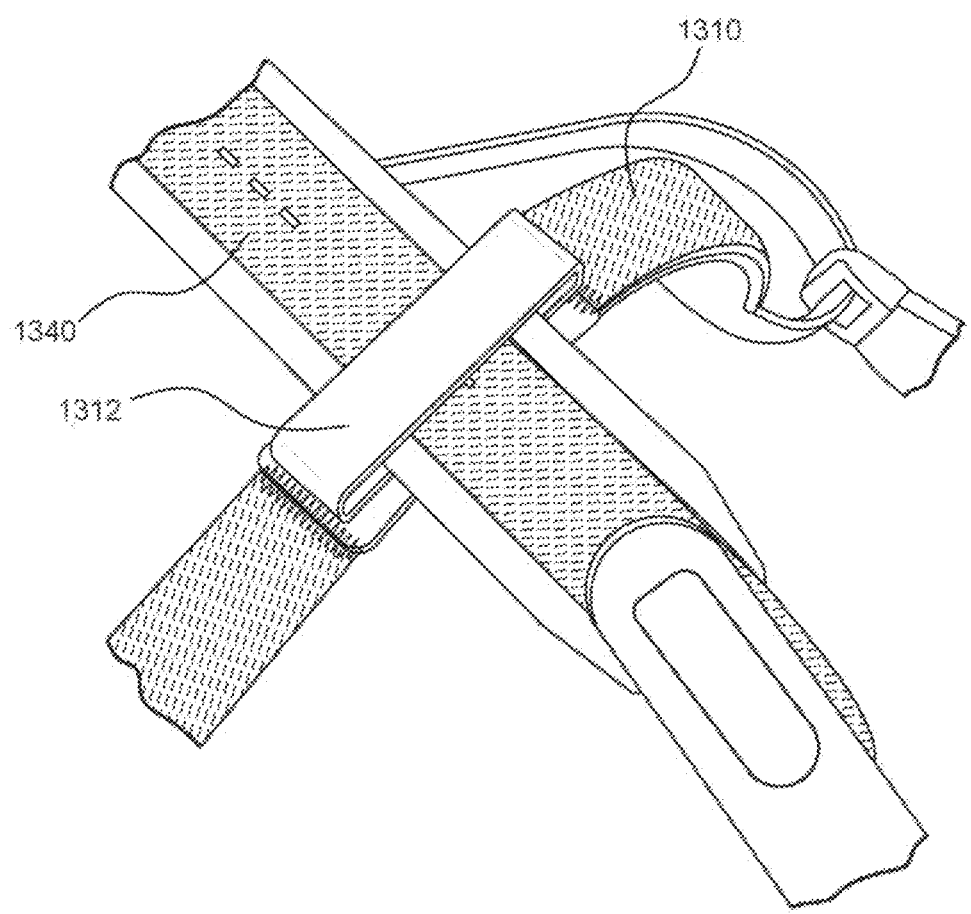

FIG. 28C shows components of a positioning and stabilising structure of the head-mounted display system shown in FIG. 28A.

Figure 29:
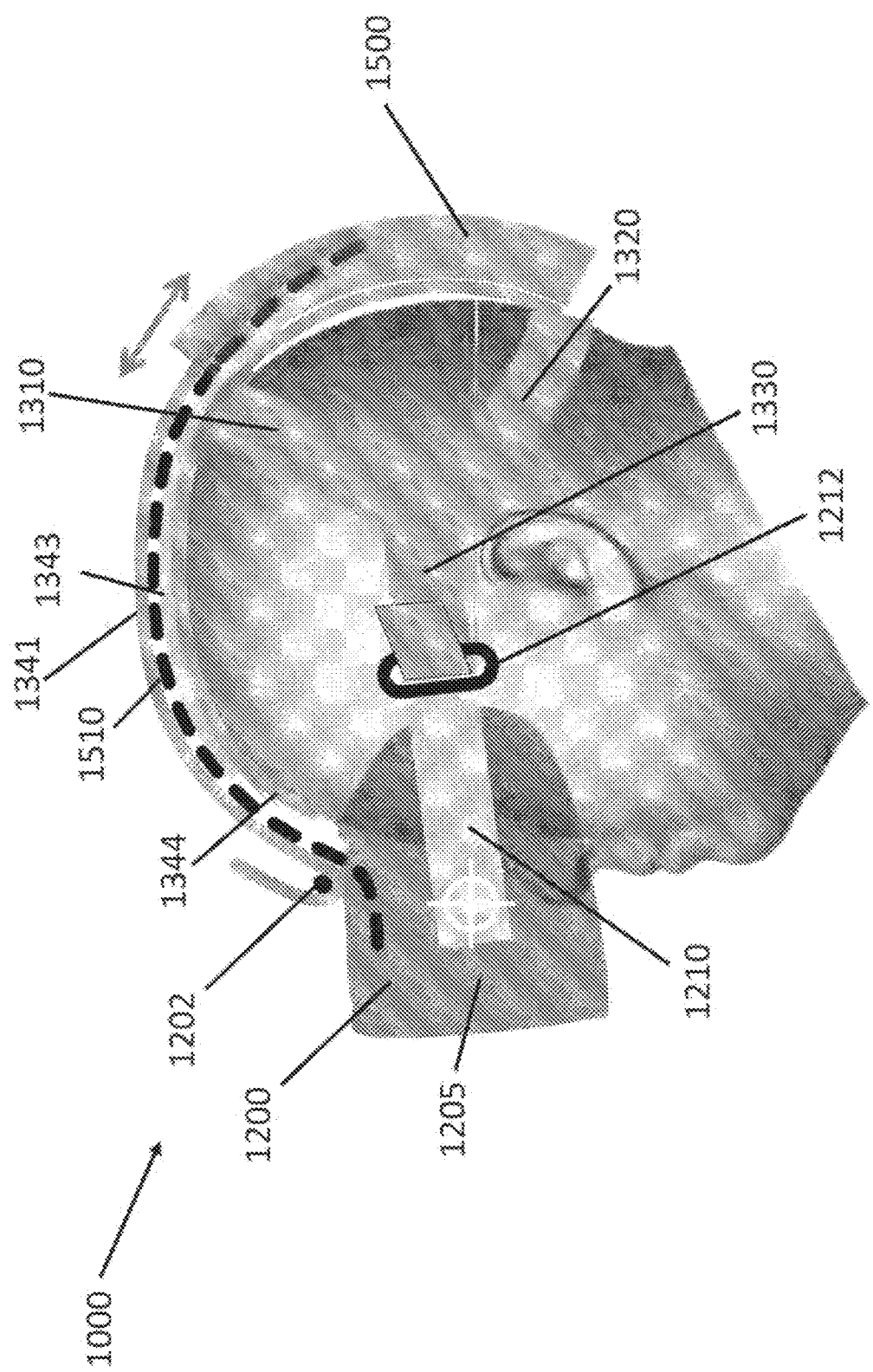

FIG. 29 shows a schematic side view of a head-mounted display system according to another example of the present technology, in use.

Figure 30:
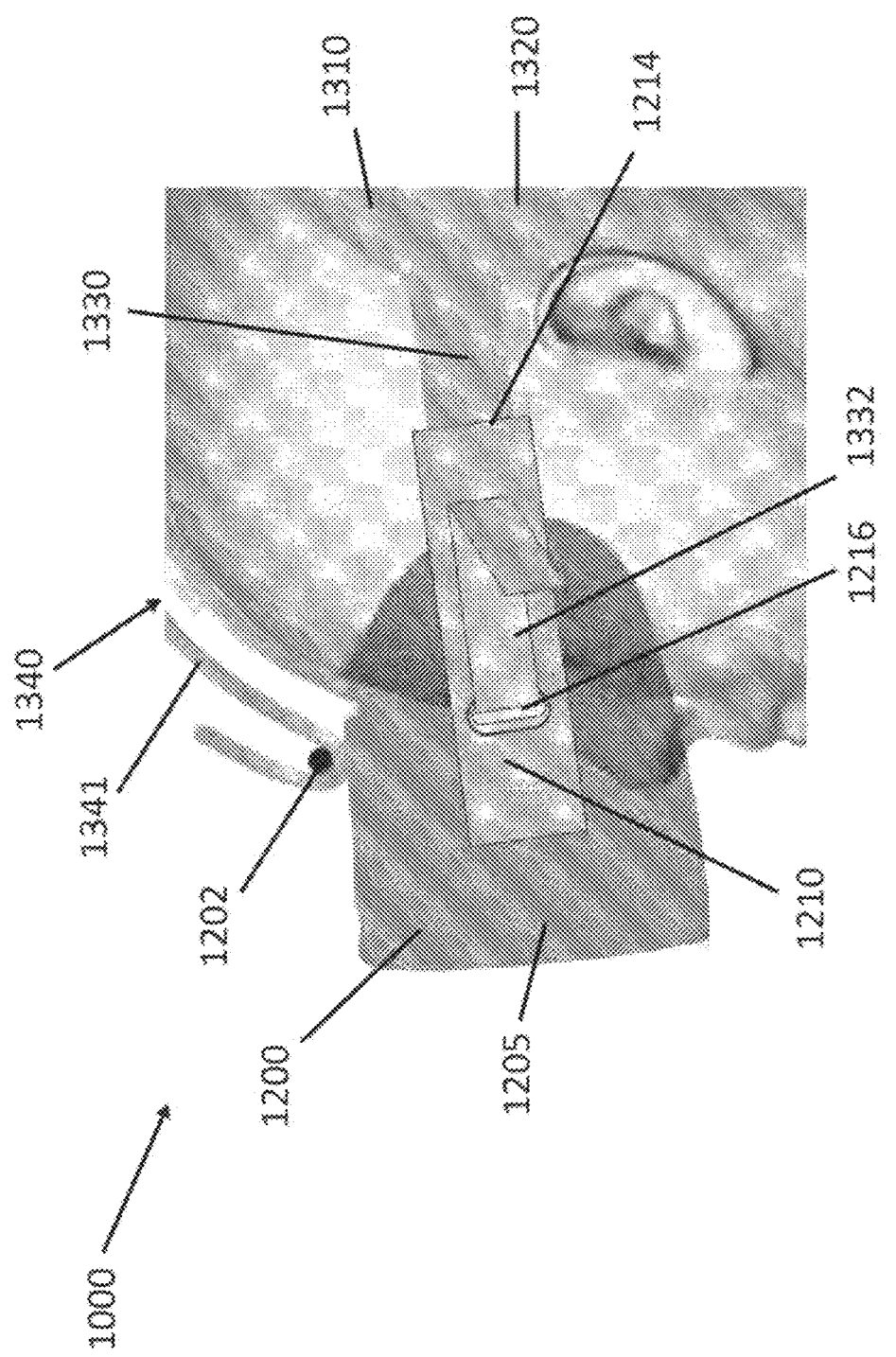

FIG. 30 shows a schematic side view of a portion of a head-mounted display system according to another example of the present technology, in use.

Figure 31A:
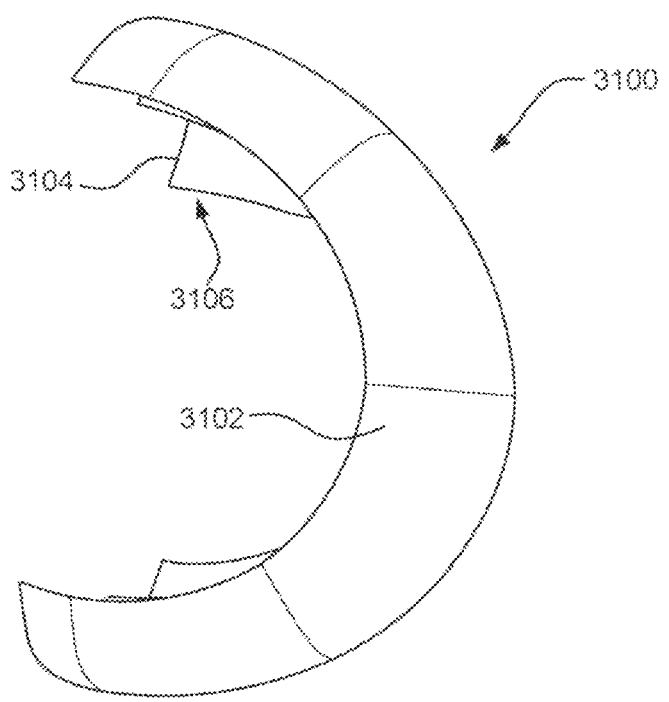
Figure 31B:
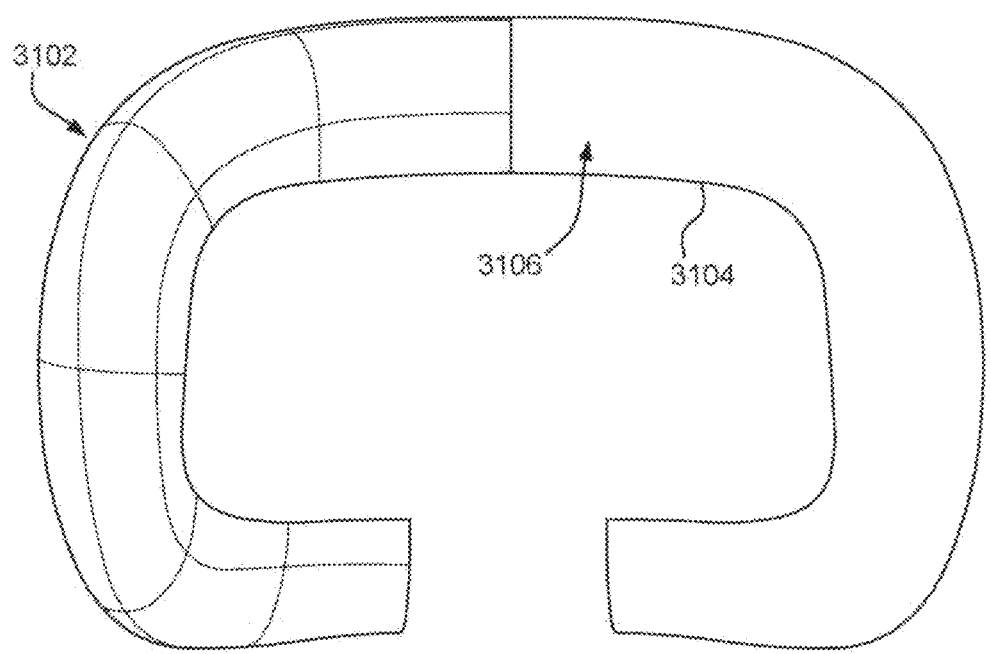
Figure 31C:
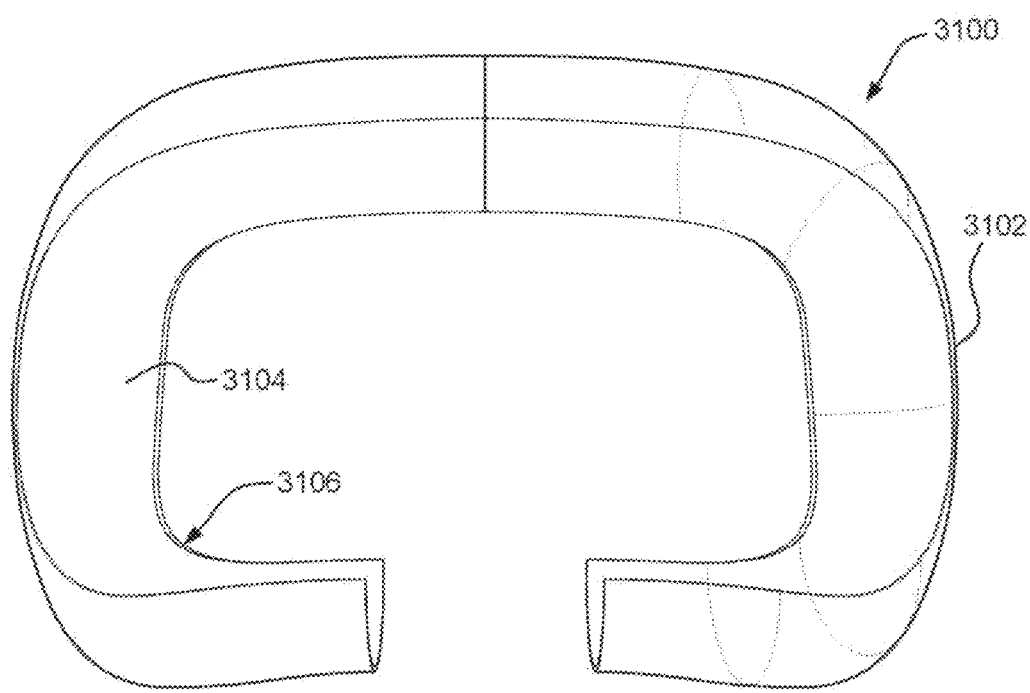

FIGS. 31A, 31B, and 31C are side, rear, and frontal views, respectively, of a further embodiment of an interfacing structure.

Figure 32A:
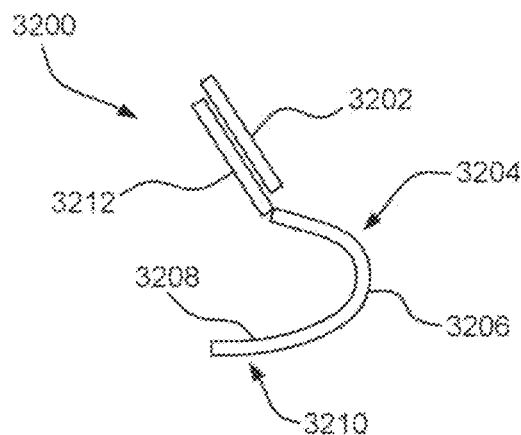
Figure 32B:
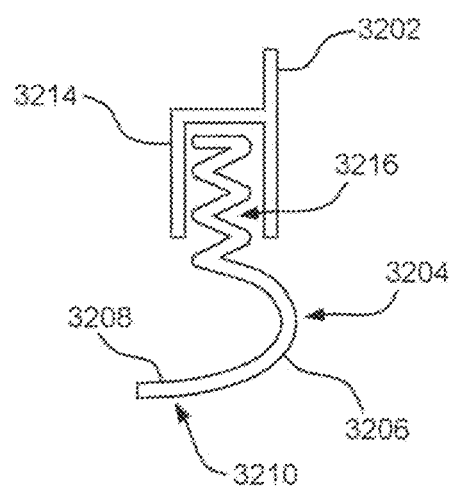
Figure 32C:
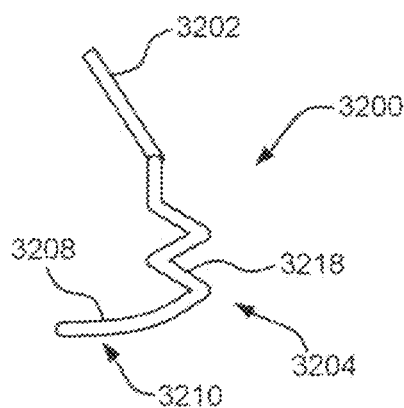

FIGS. 32A-32C are side cross-section views showing further examples of interfacing structures according to another example of the present technology.

Figure 33A:
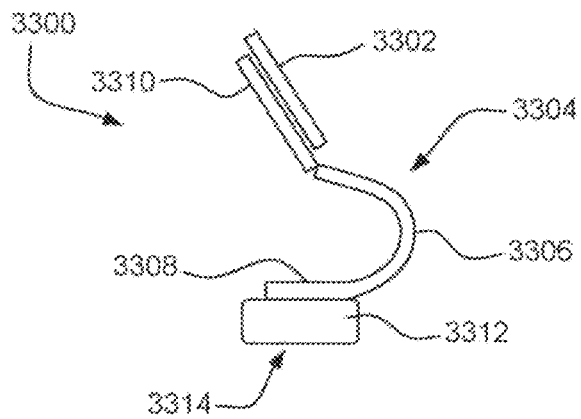
Figure 33B:
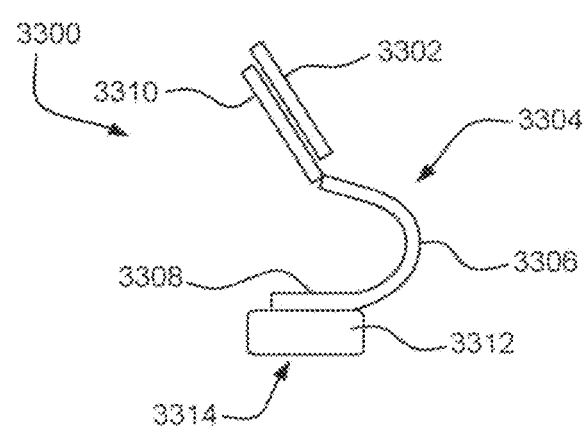
Figure 33C:
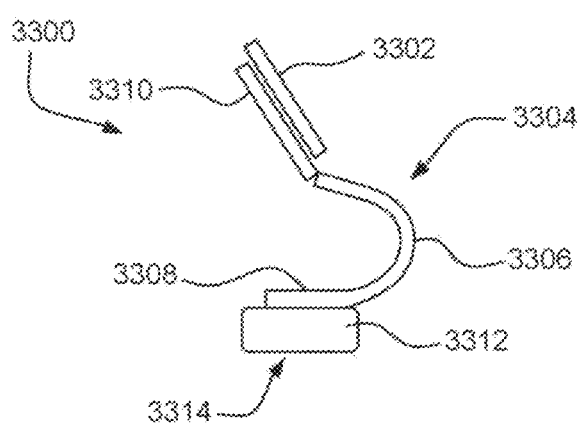
Figures 1, 33A:
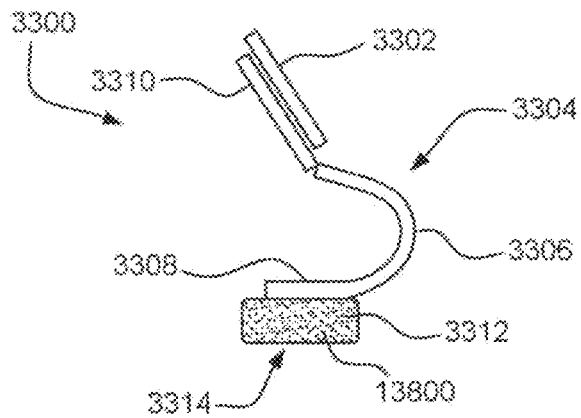
Figures 1, 33B:
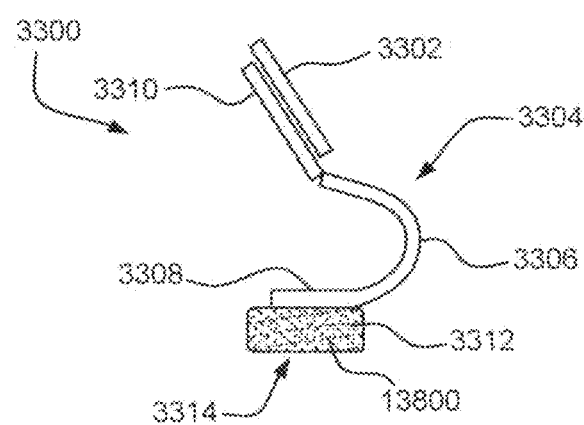
Figures 1, 33C:
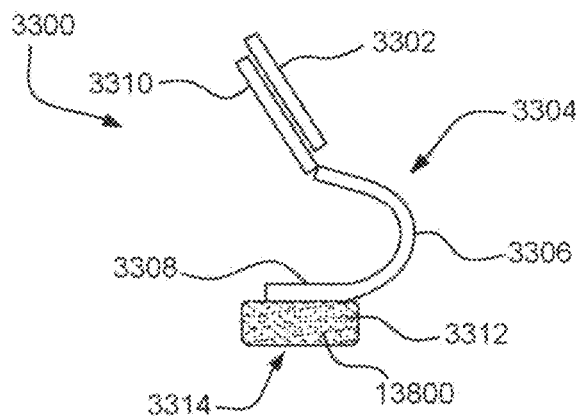

FIGS. 33A-33C are side cross-section views showing further examples of interfacing structures according to another example of the present technology.

FIGS. 33A-1 to 33C-1 are side cross-section views showing alternate versions of the examples of FIGS. 33A to 33C, illustrating an adaptive material.

Figure 34A:
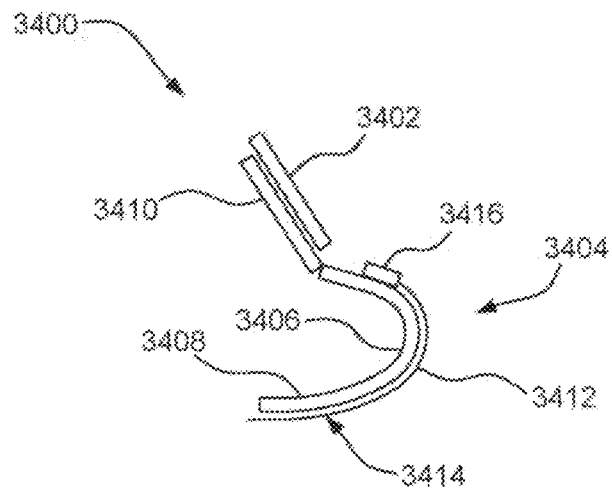
Figure 34B:
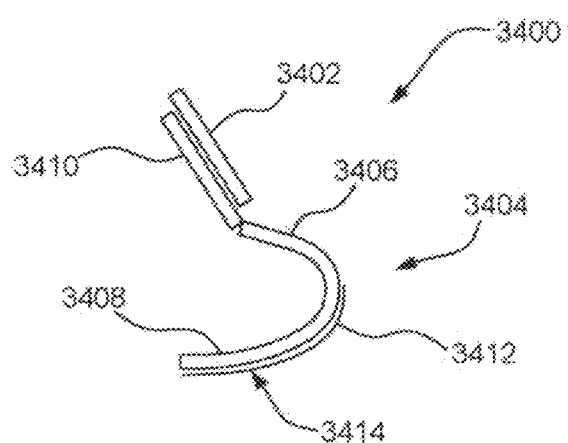

FIGS. 34A and 34B are side cross-section views showing further examples of interfacing structures according to another example of the present technology.

FIGS. 35A-35E are side cross-section views showing further examples of interfacing structures according to another example of the present technology.

Figure 35A:
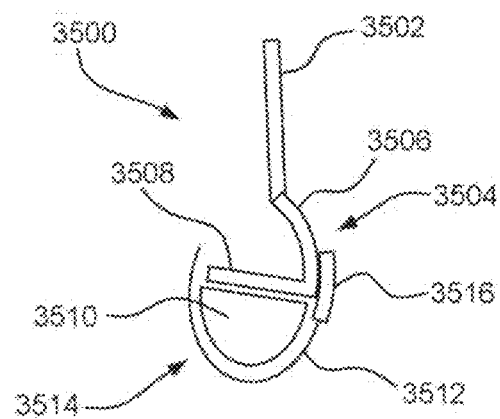
Figure 35B:
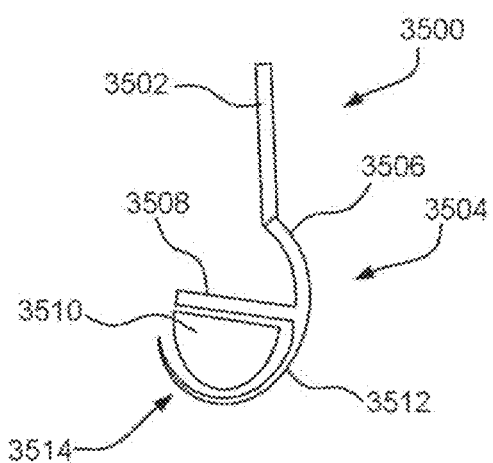
Figure 35C:
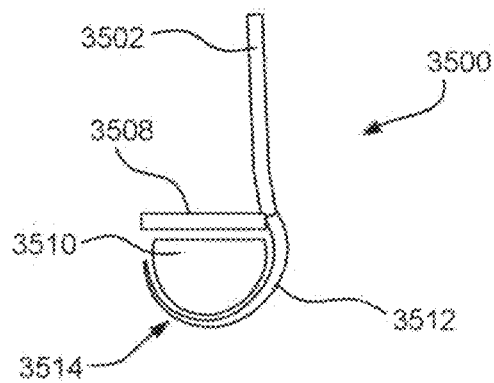
Figures 1, 35A:
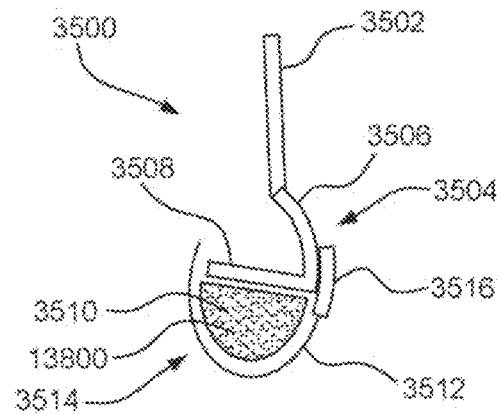
Figures 1, 35B:
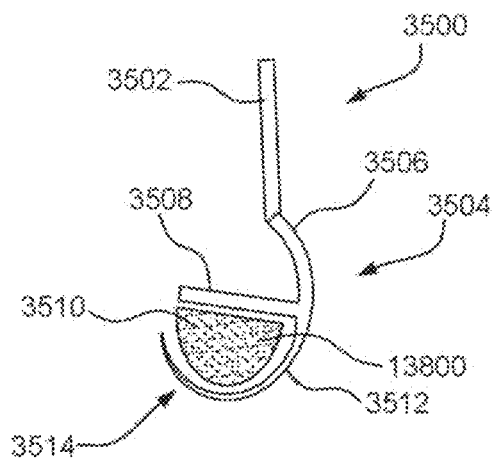
Figures 1, 35C:
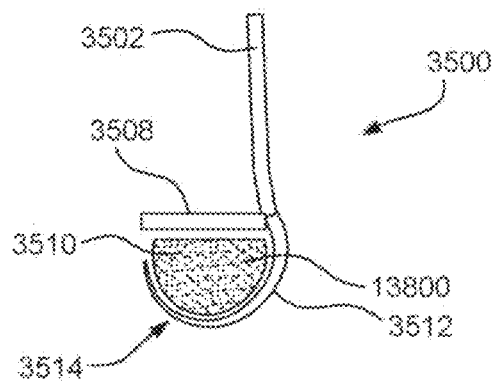
Figure 35D:
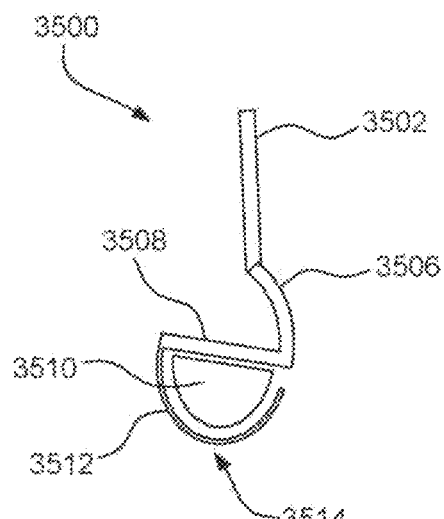
Figure 35E:
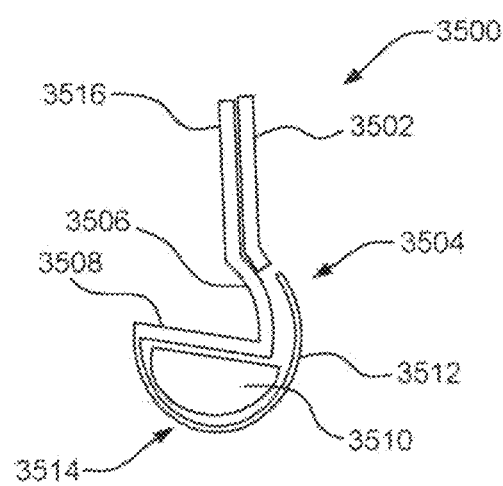
Figures 1, 35D:
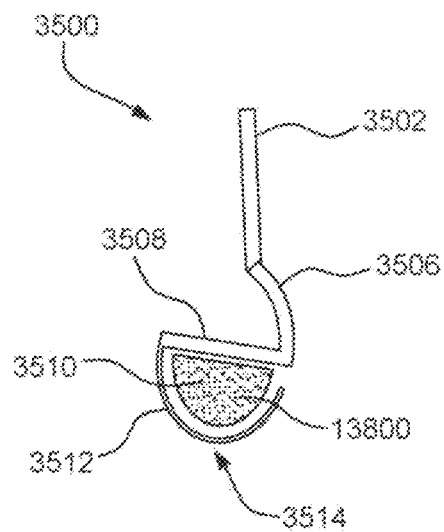
Figures 1, 35E:
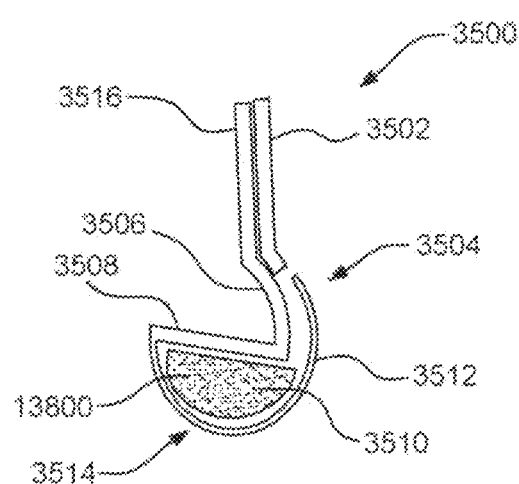

FIGS. 35A-1 to 35E-1 are side cross-section views showing alternate versions of the examples of FIGS. 35A to 35E, illustrating an adaptive material.

FIGS. 36A-36E are show a further example of an interfacing structure according to another example of the present technology.

Figure 36A:
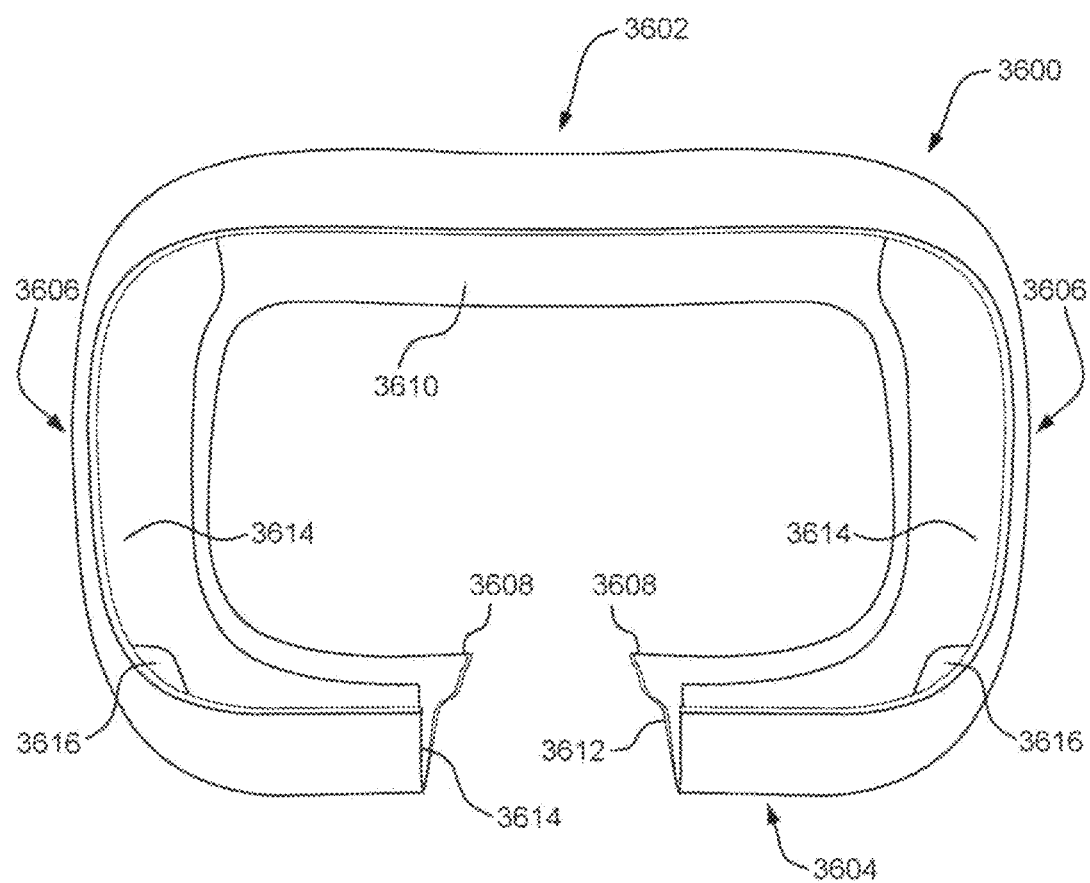
Figures 1, 36A:
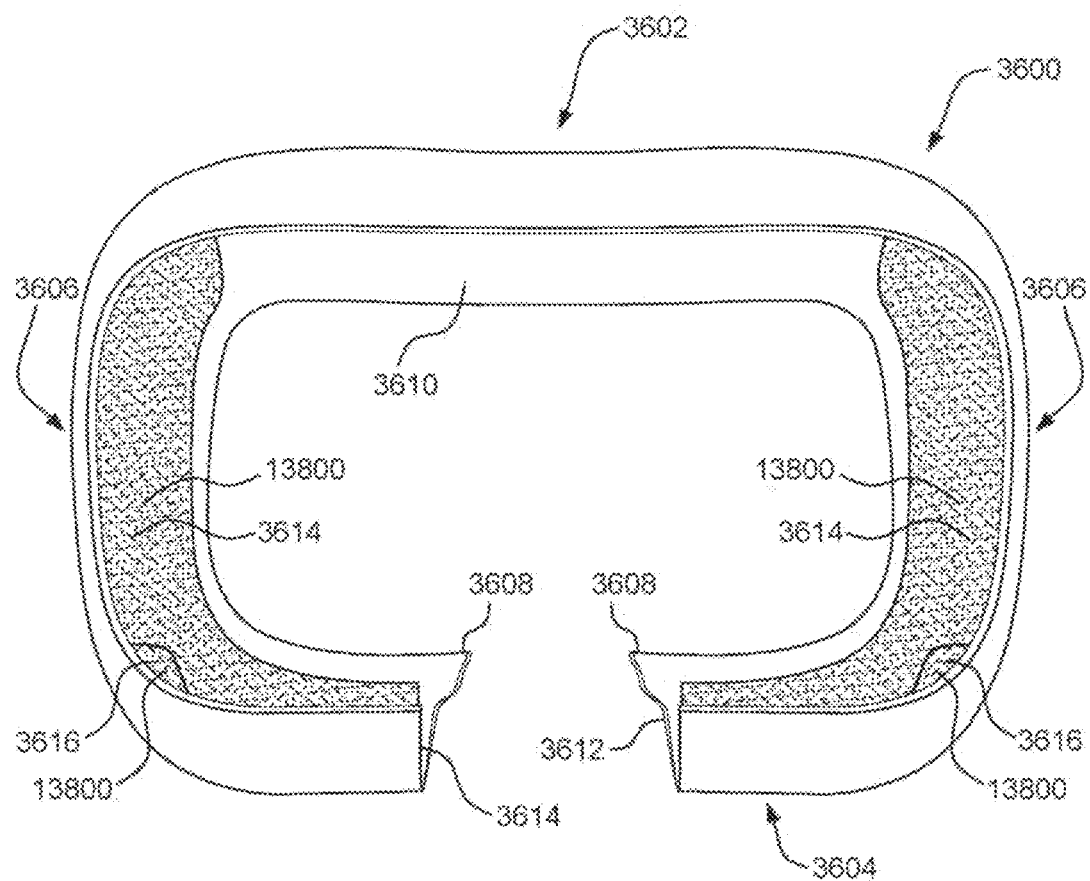
Figure 36B:
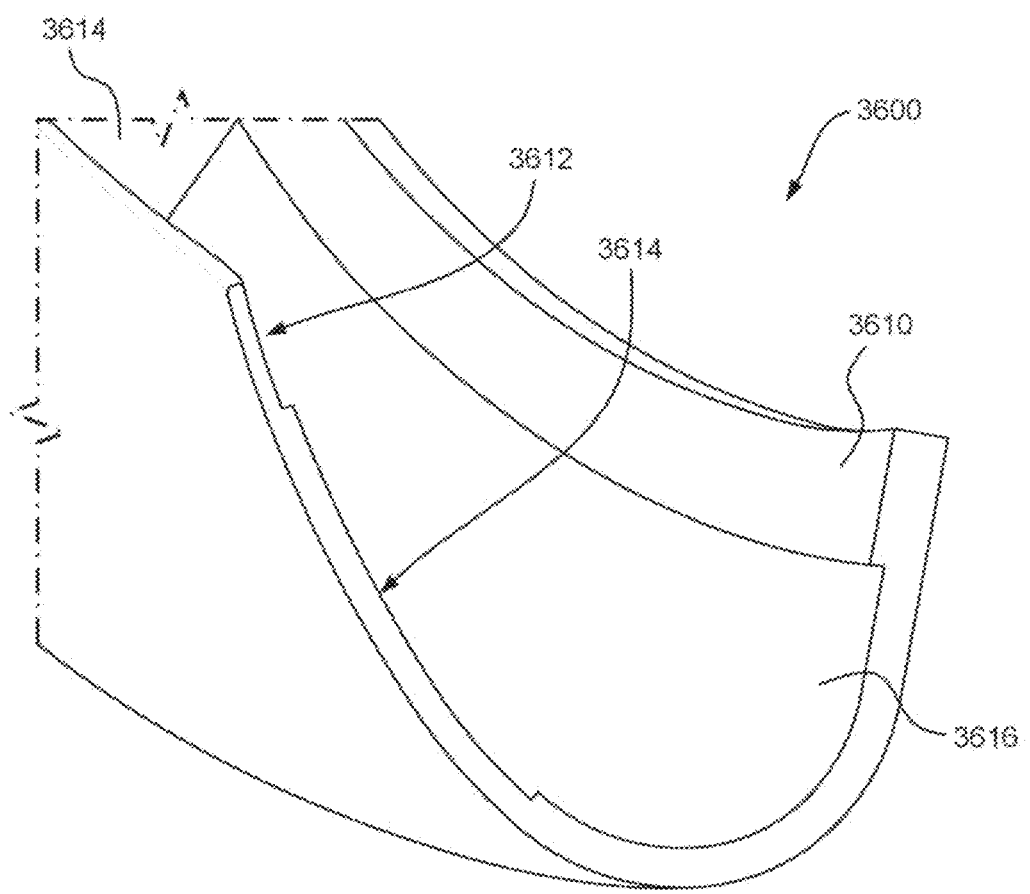
Figures 1, 36B:
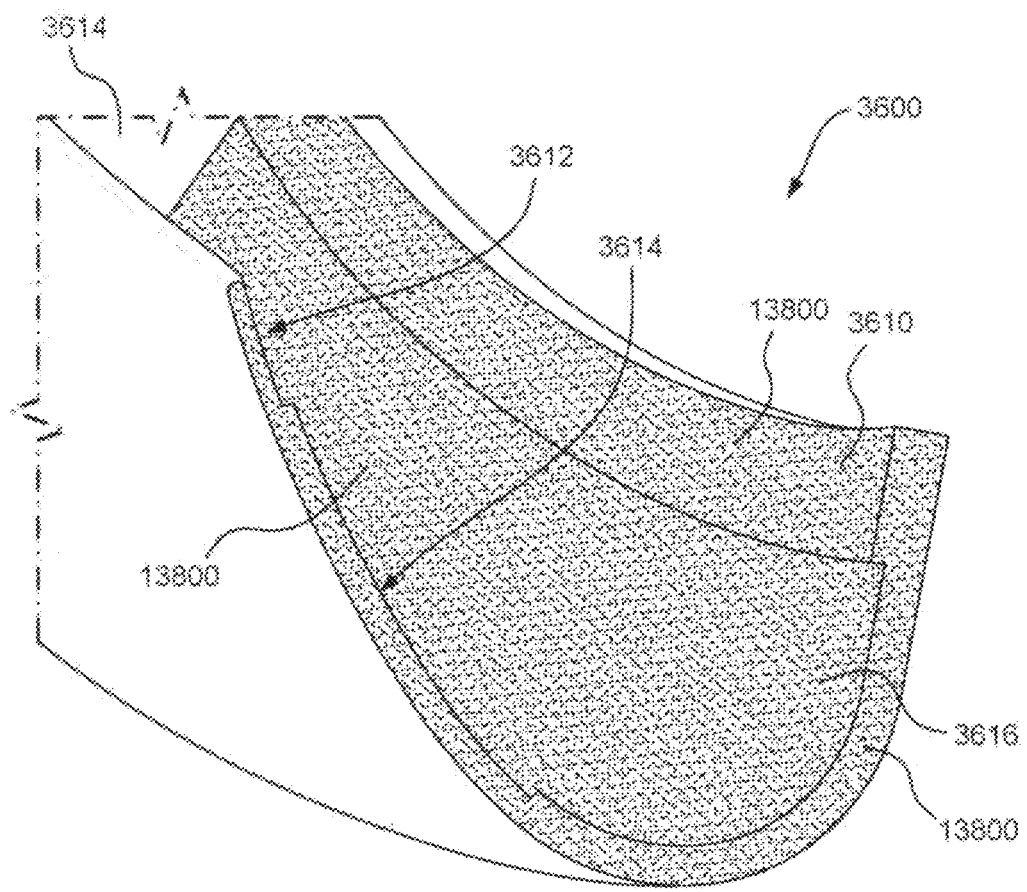
Figures 1, 36C:
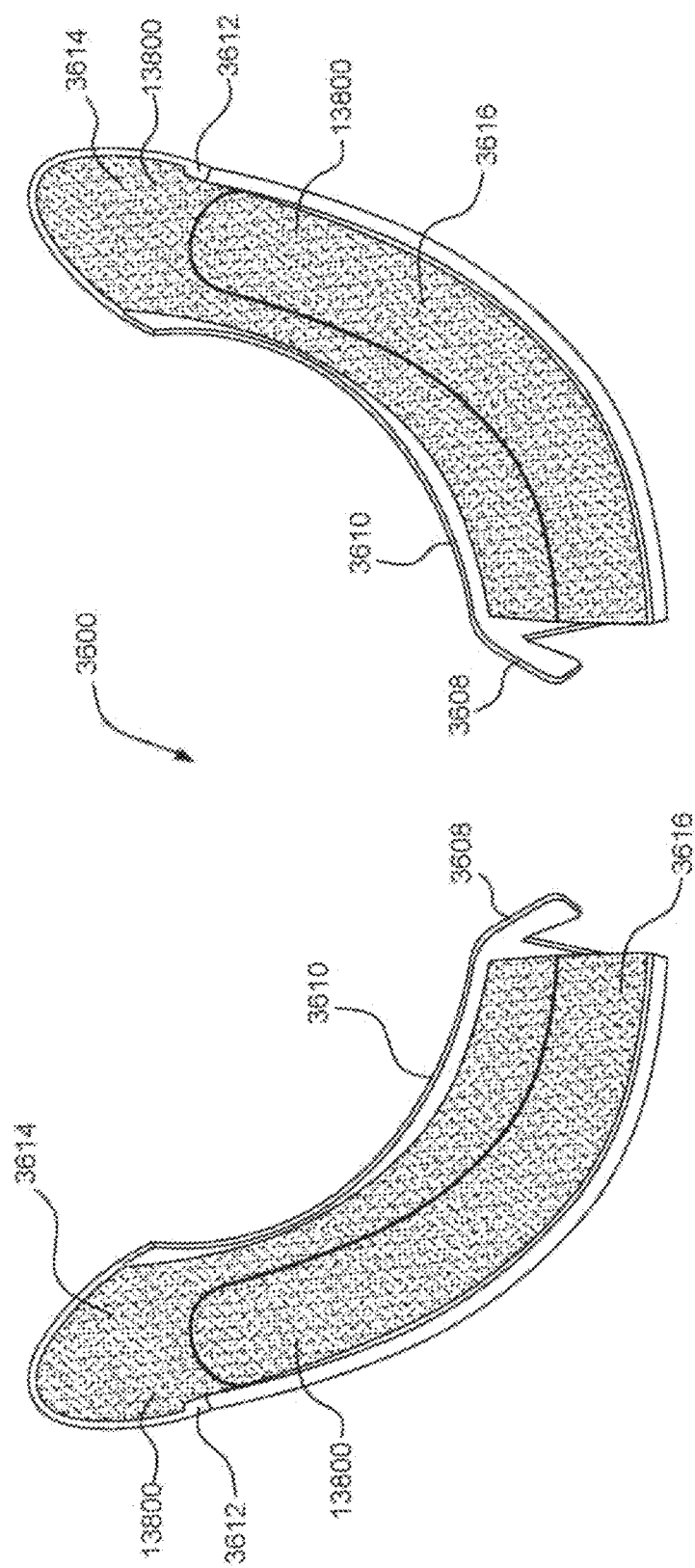
Figure 36D:
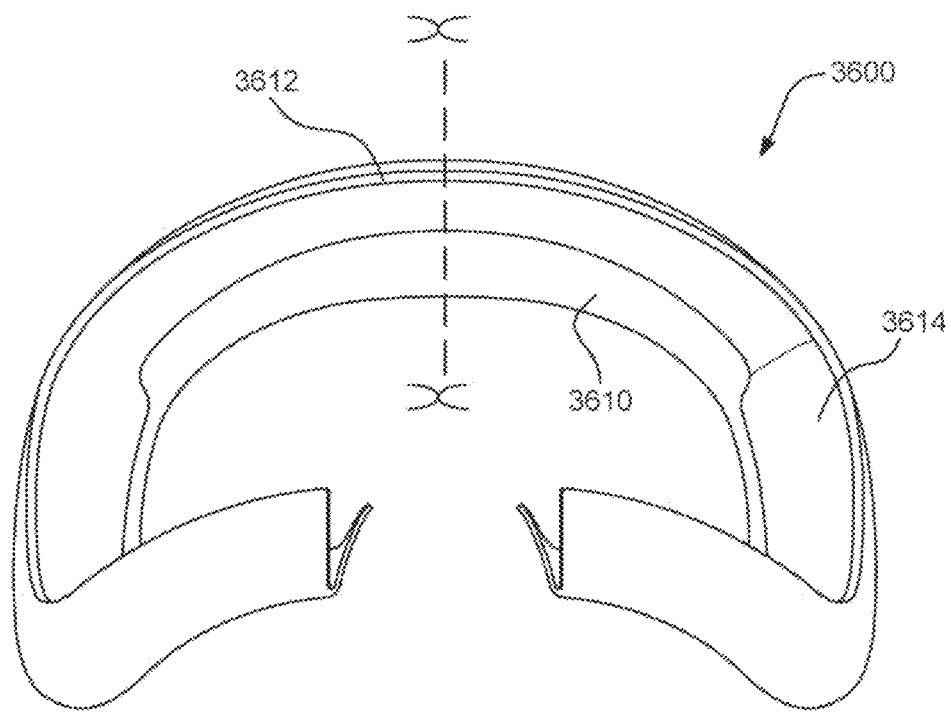
Figure 36E:
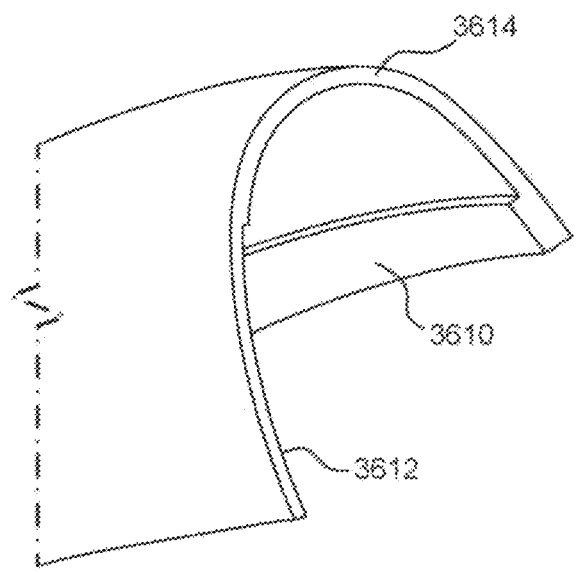

FIGS. 36A-1 to 36C-1 show alternate versions of the examples in FIGS. 36A to 36C, illustrating an adaptive material.

Figure 37A:
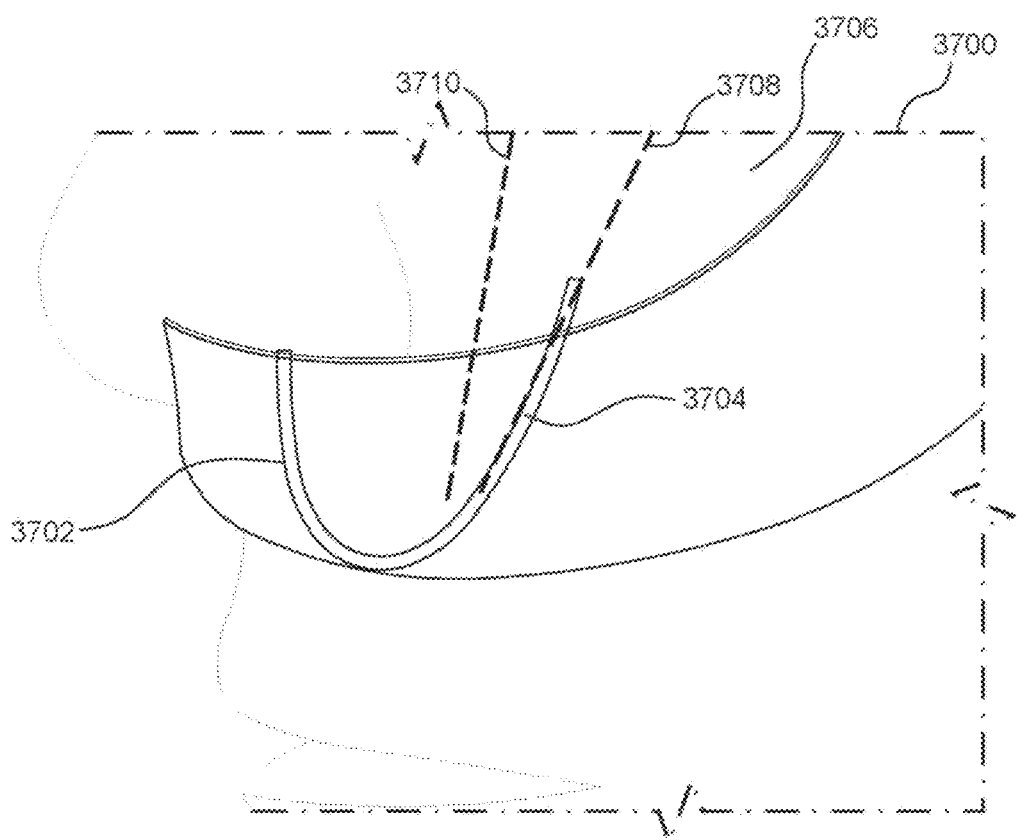
Figure 37B:
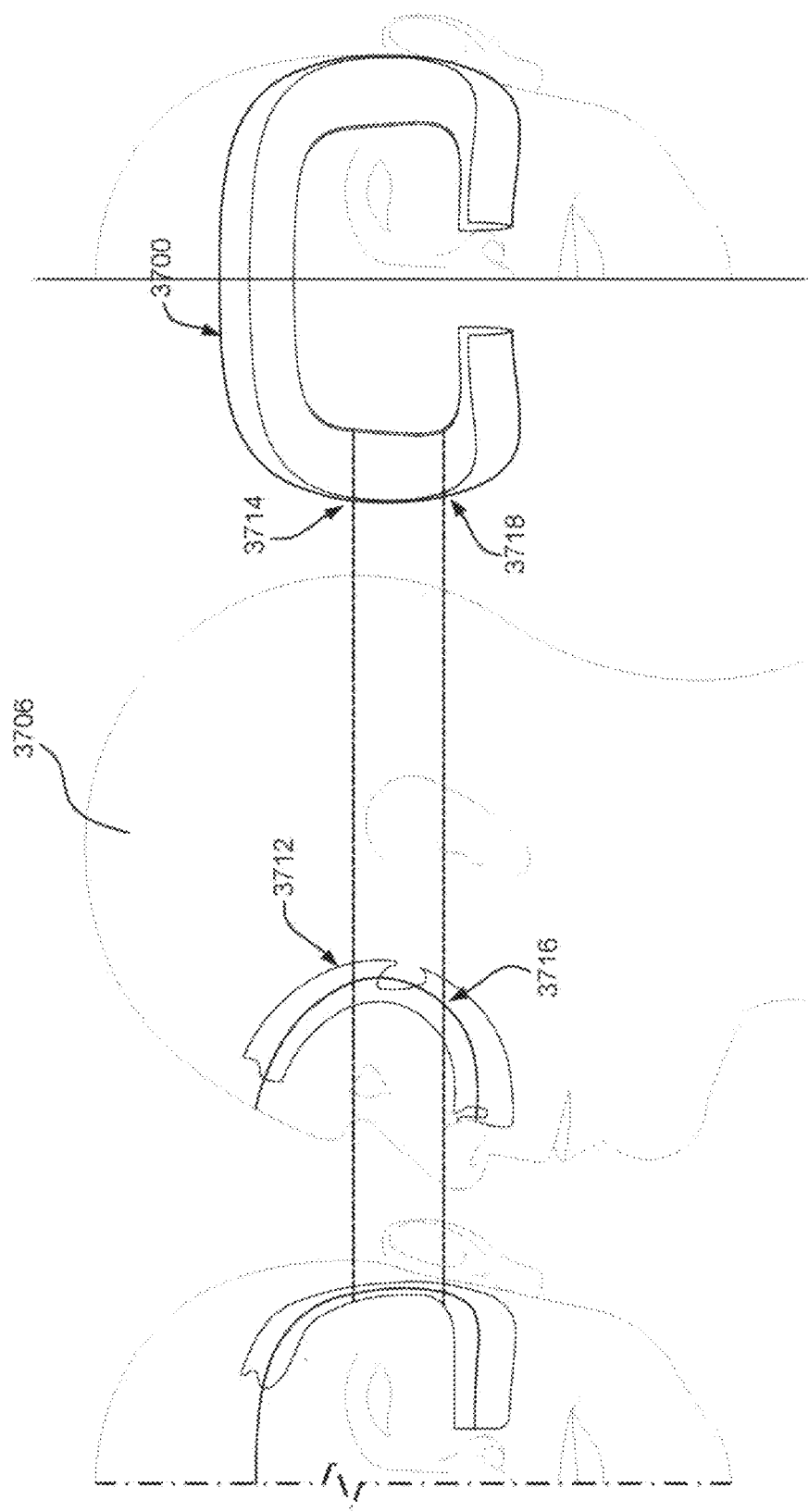

FIGS. 37A and 37B are show a further embodiment of an interfacing structure according to another example of the present technology.

Figure 38A:
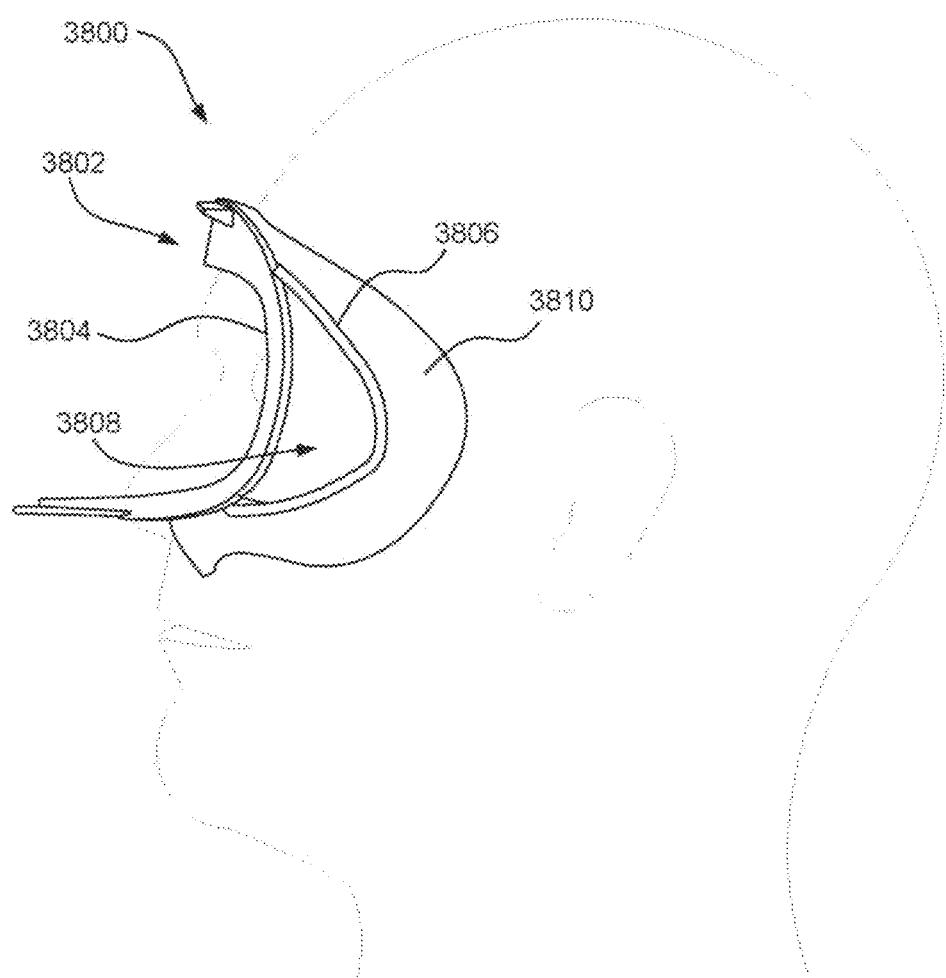
Figure 38B:
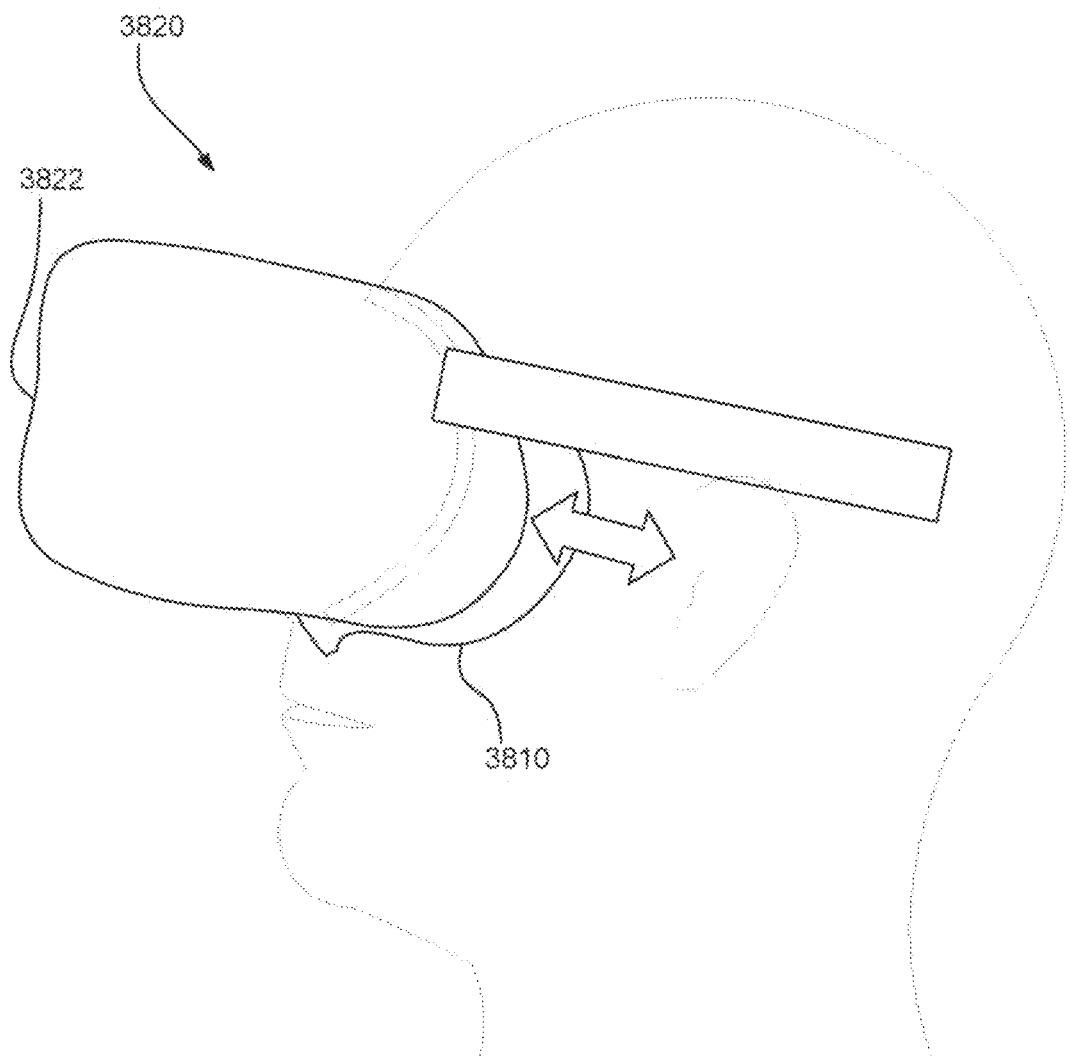
Figure 38C:
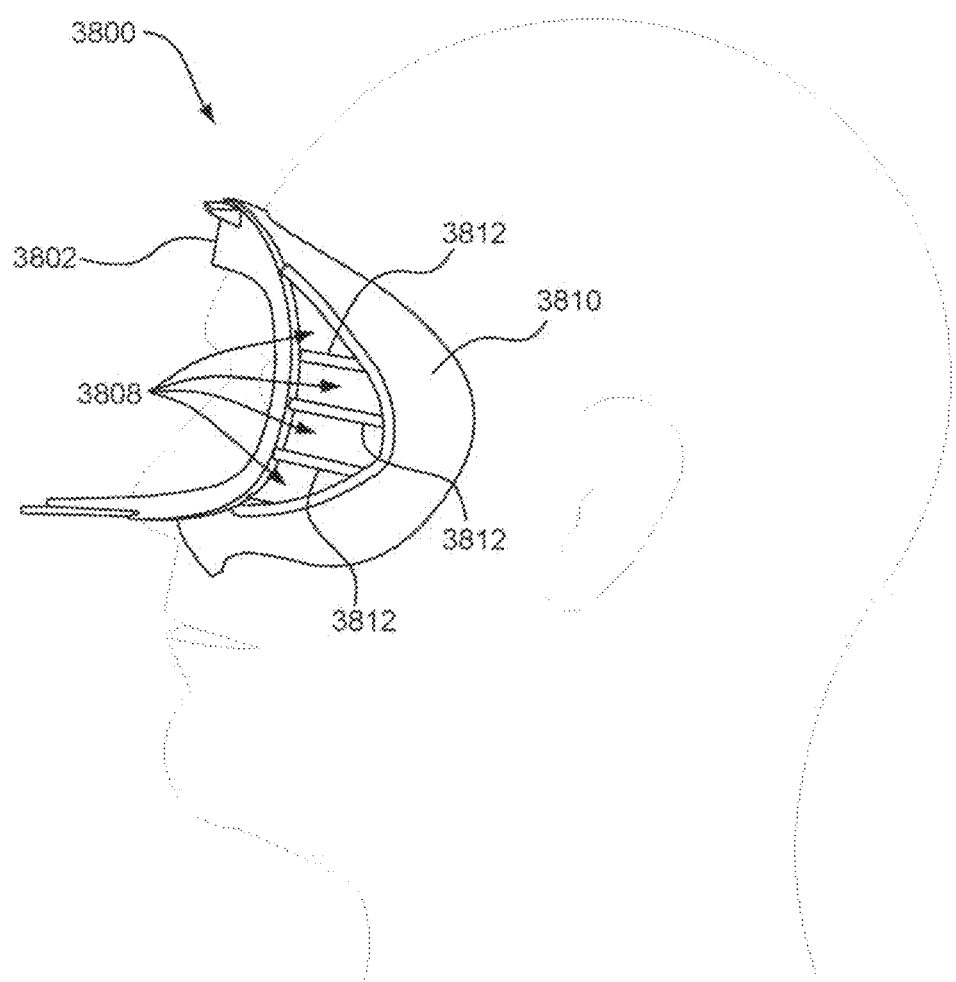

FIGS. 38A-38C show further embodiments of interfacing structures according to another example of the present technology.

Figure 38D:
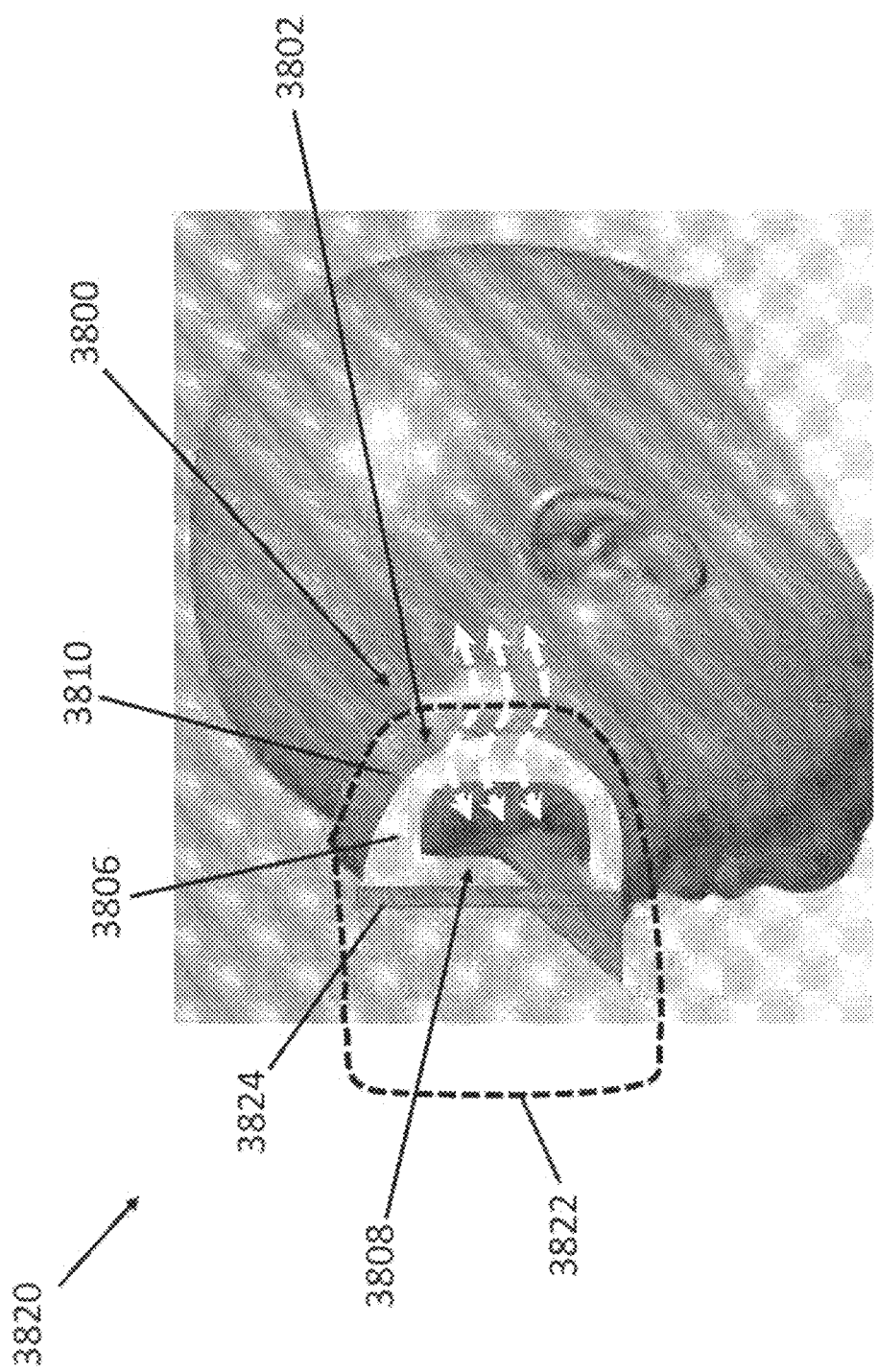
Figure 38E:
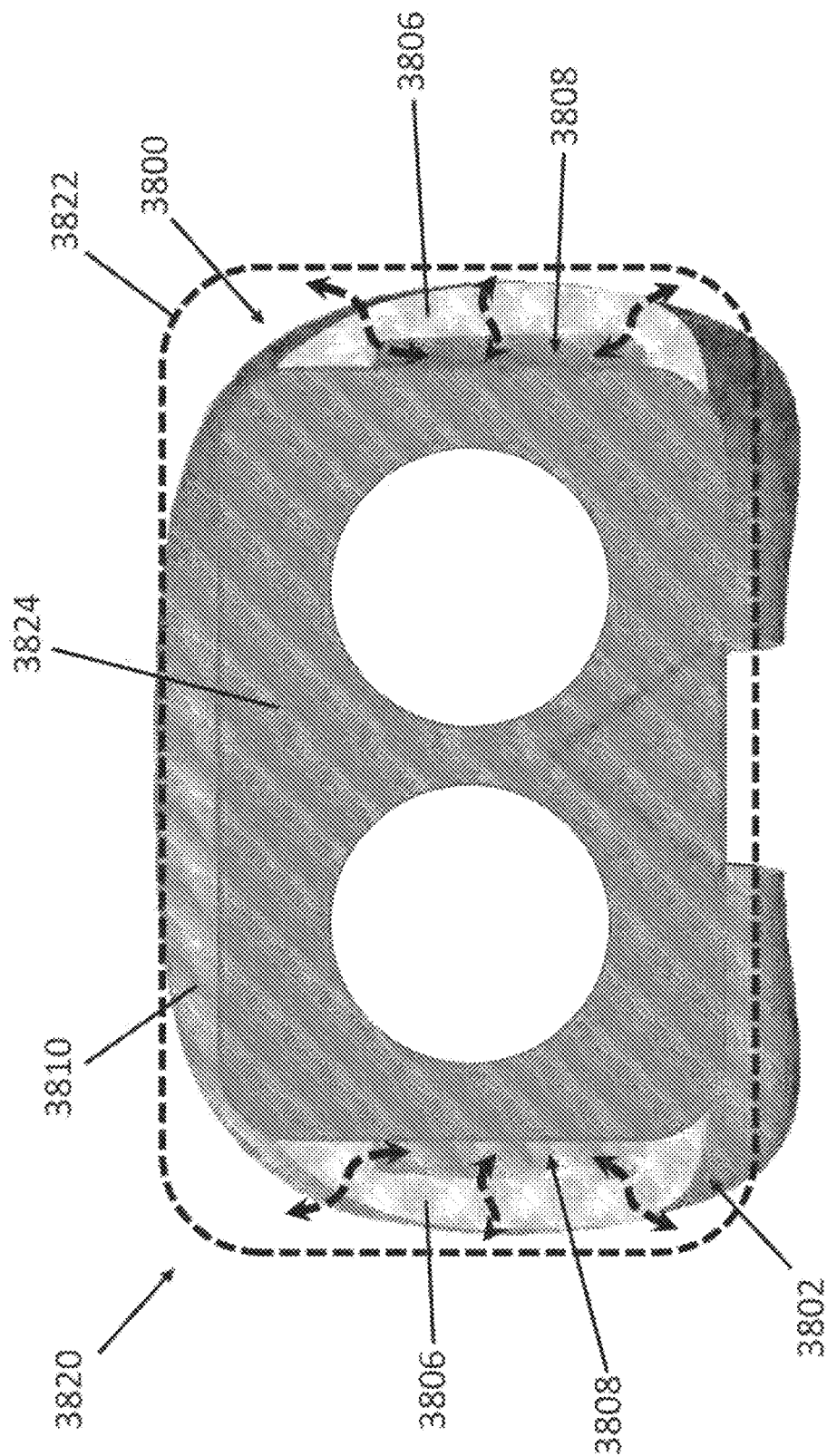

FIGS. 38D and 38E show a further embodiment of an interfacing structure according to another example of the present technology.

Figure 39A:
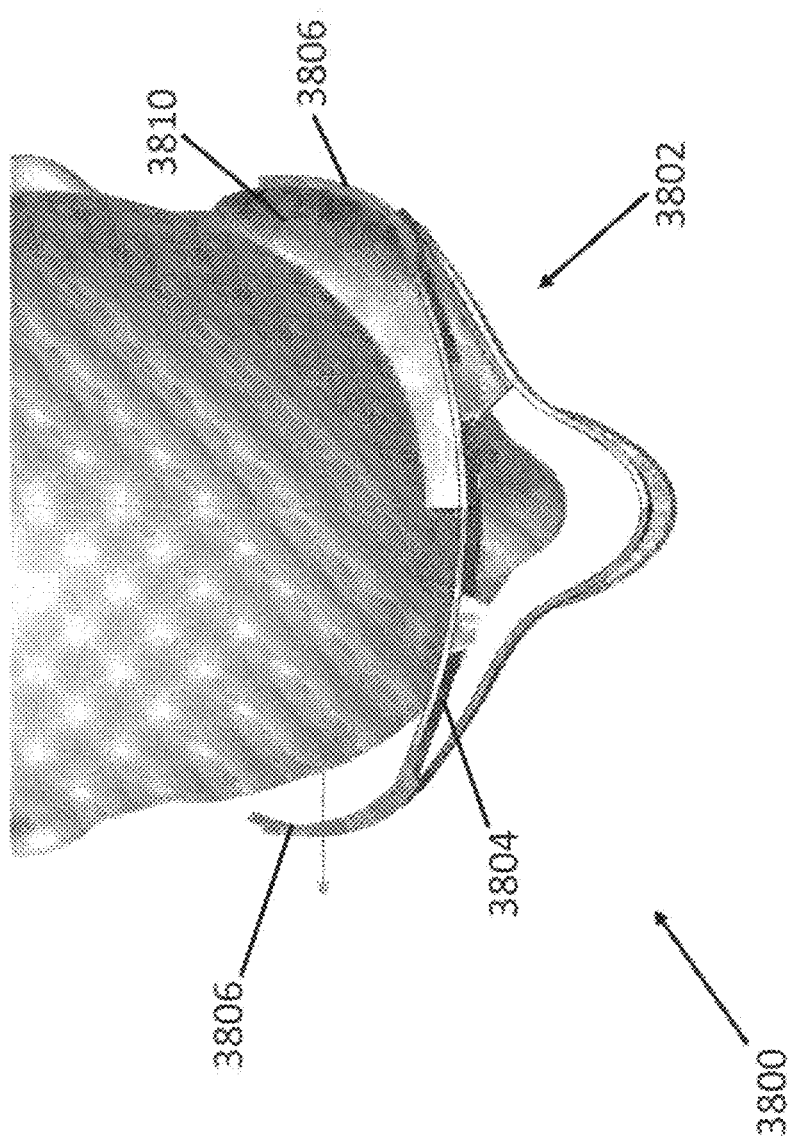

FIG. 39A shows an interfacing structure according to another example of the present technology.

Figure 39B:
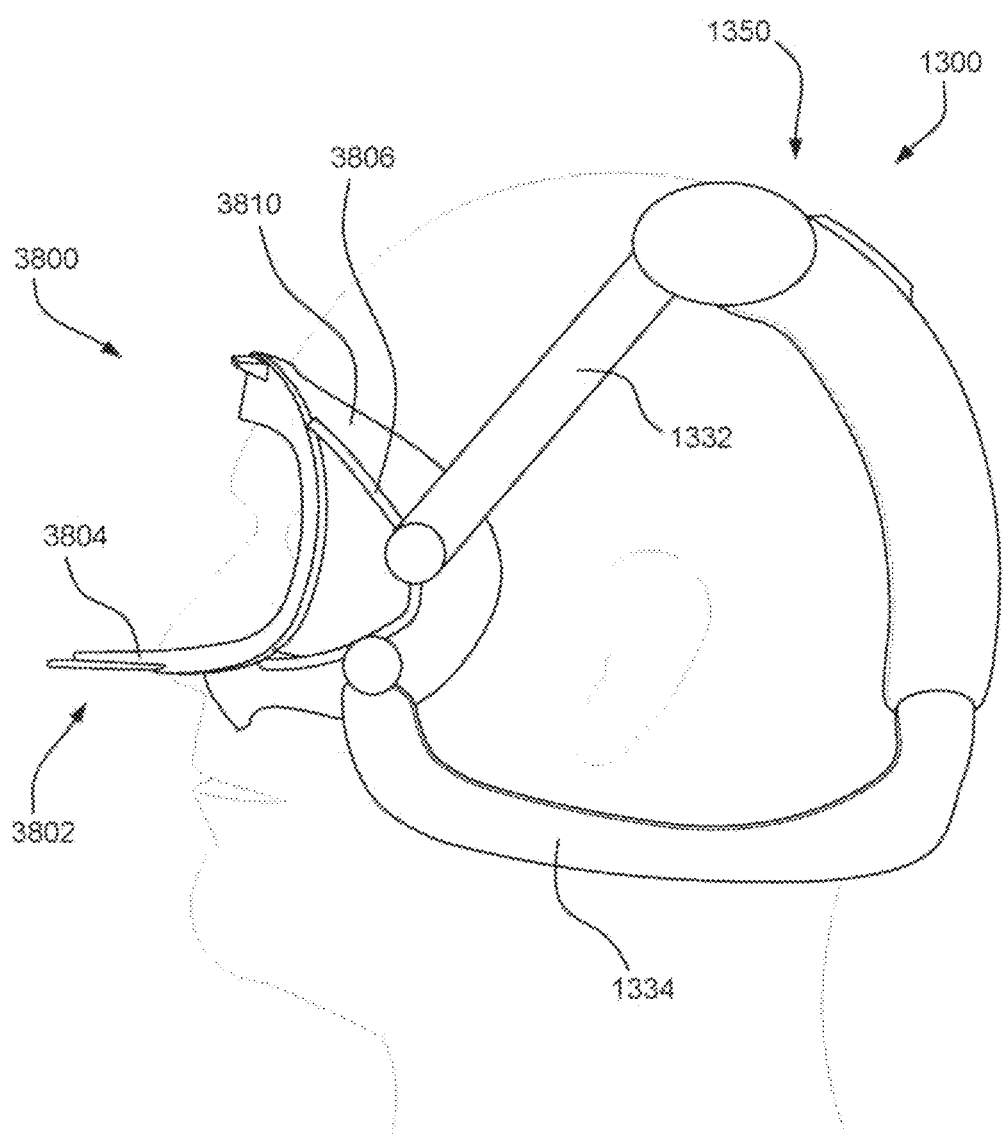

FIG. 39B-39C show an interfacing structure and positioning and stabilising structure according to another example of the present technology.

Figure 39D:
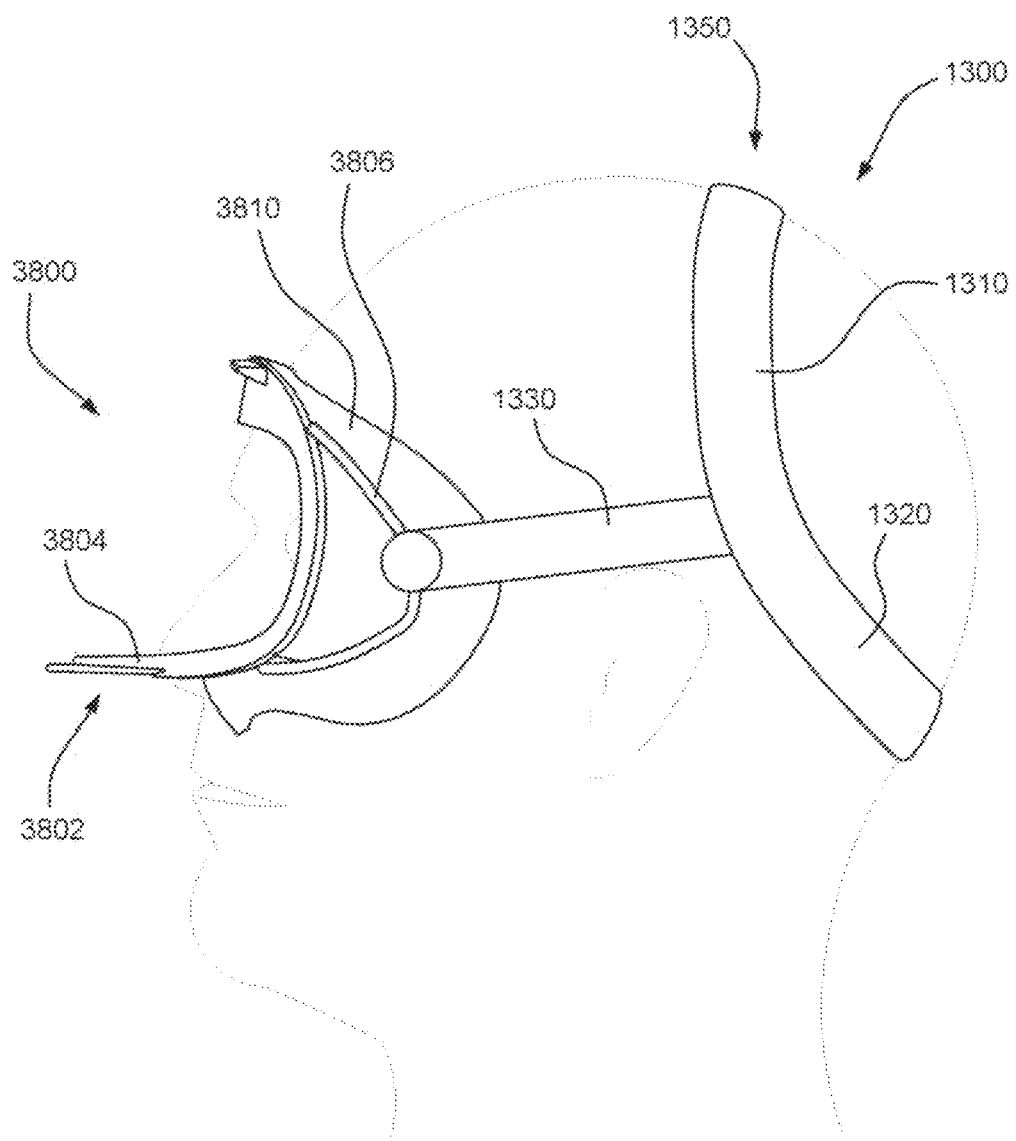

FIG. 39D shows an interfacing structure and positioning and stabilising structure according to another example of the present technology.

Figure 40A:
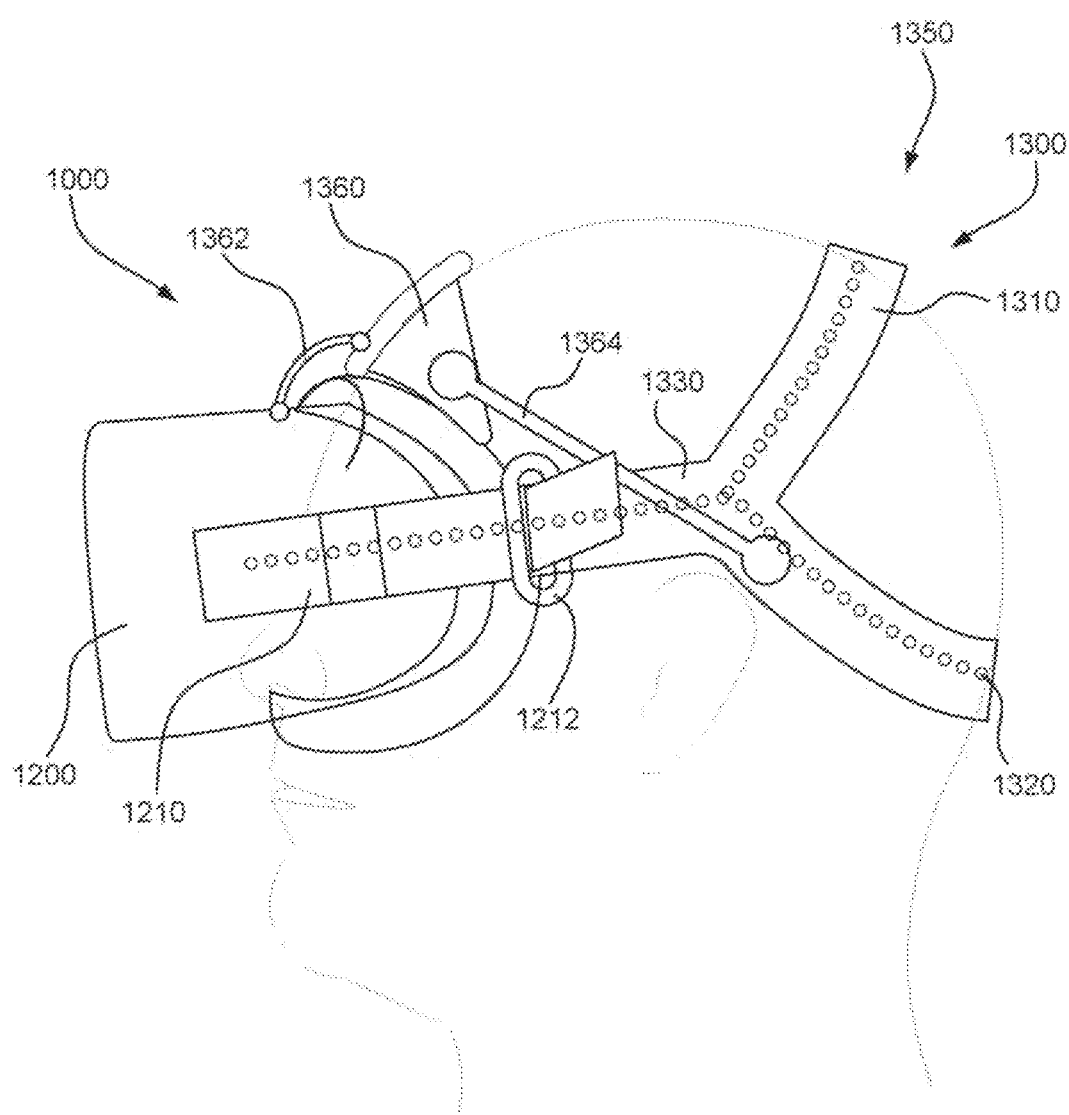

FIG. 40A shows a head-mounted display system according to another example of the present technology.

Figure 40B:
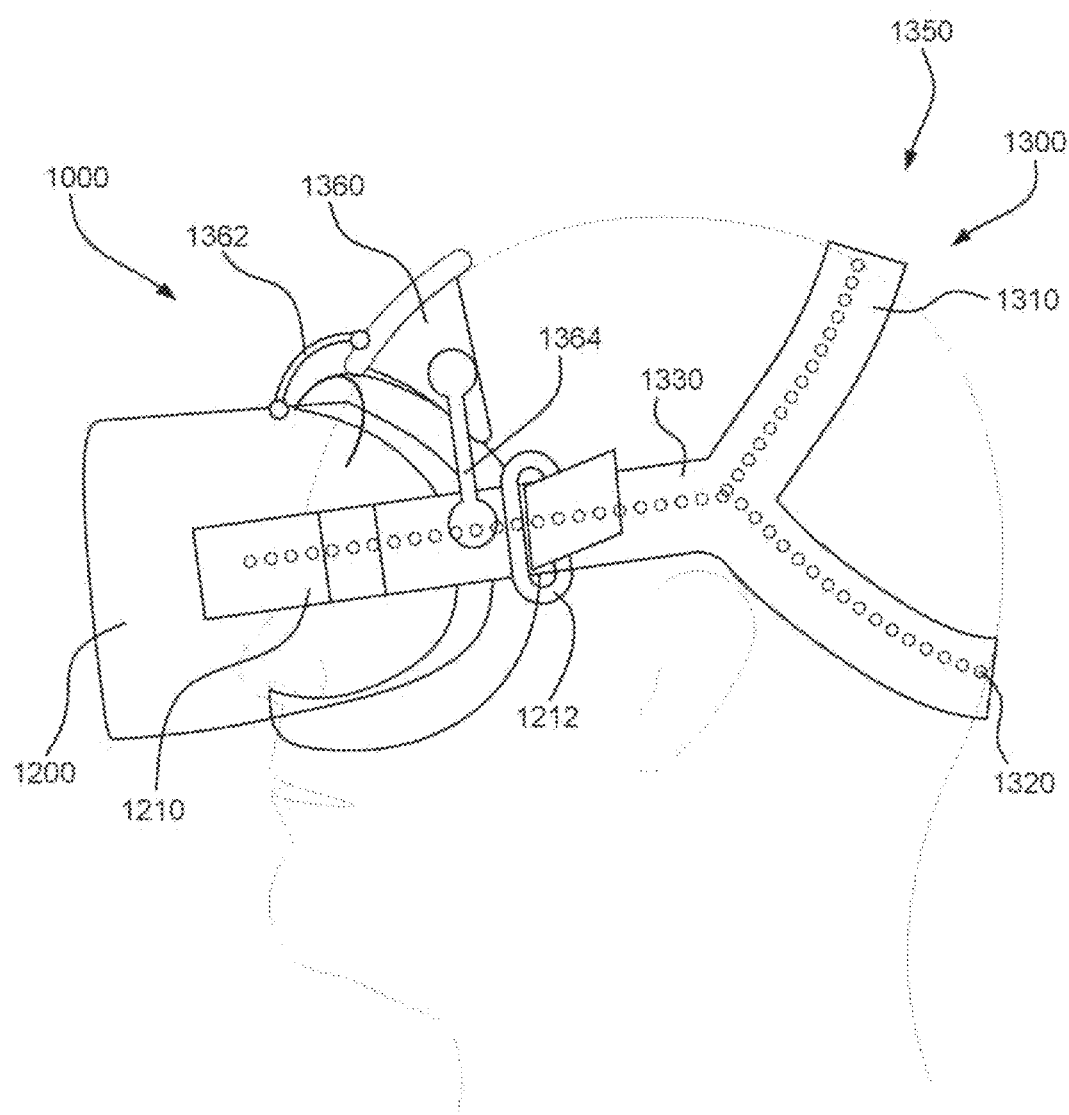

FIG. 40B shows a head-mounted display system according to another example of the present technology.

Figure 41A:
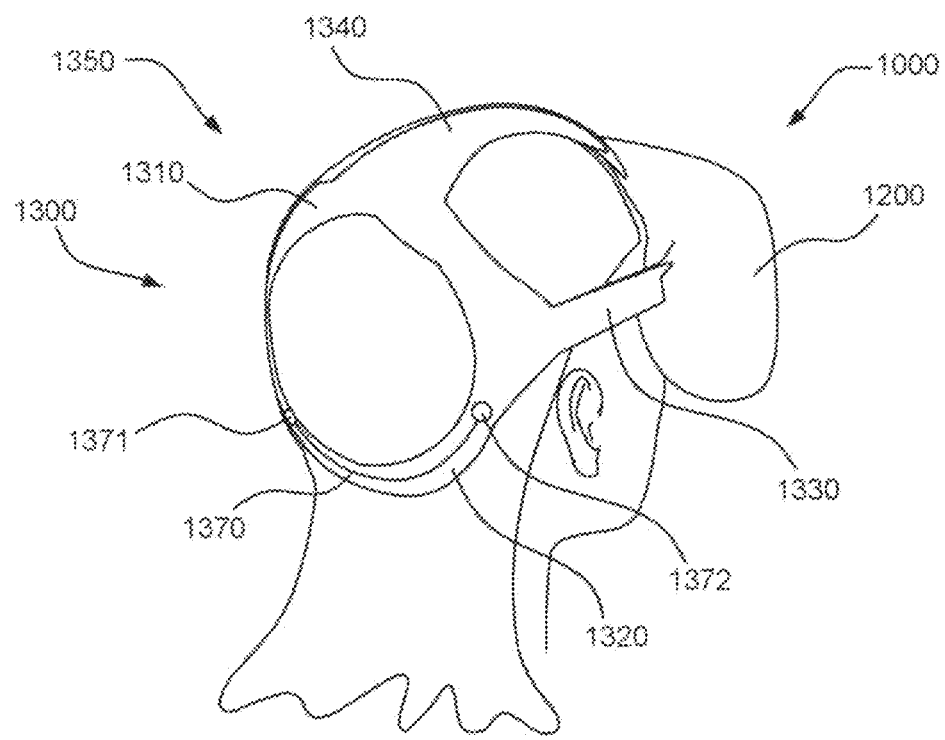
Figures 1, 41A:
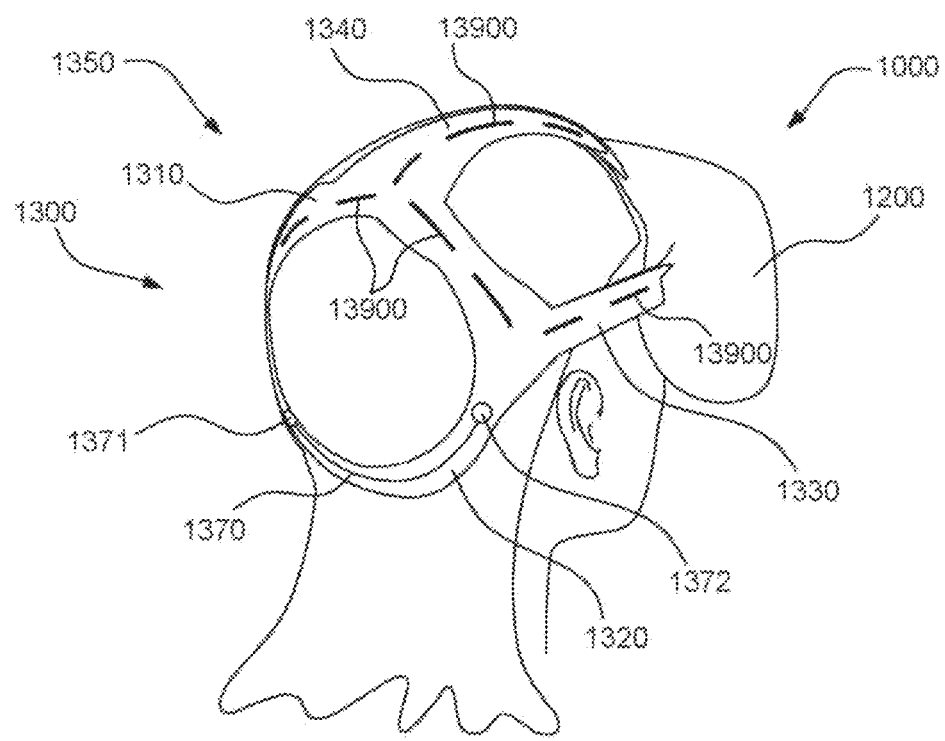
Figure 41B:
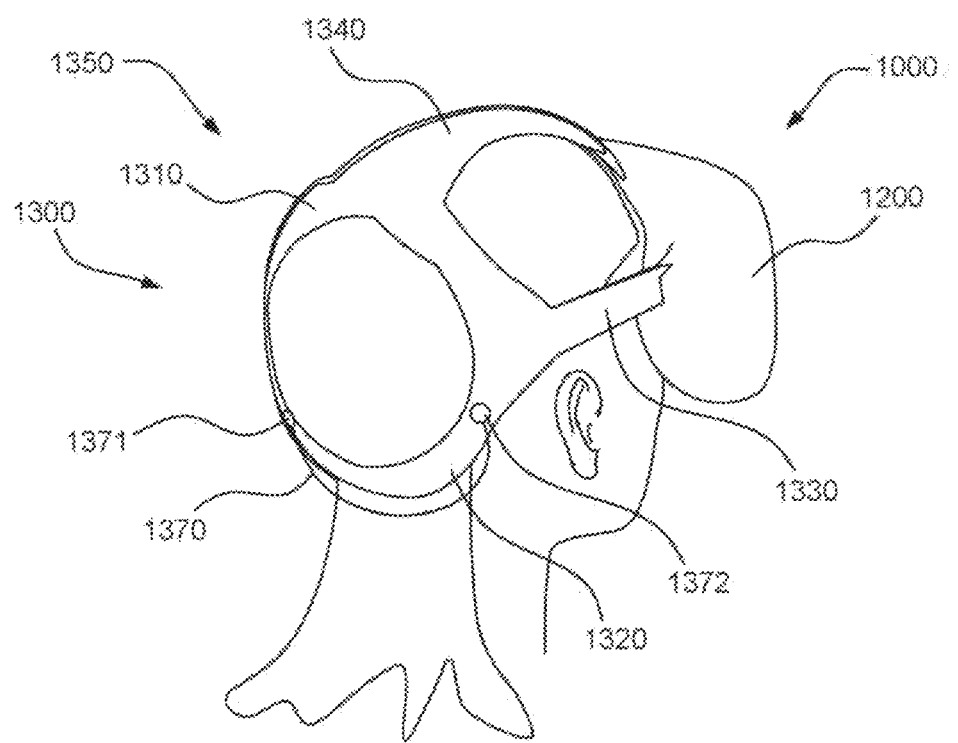

FIGS. 41A-41B show a head-mounted display system according to another example of the present technology.

FIG. 41A-1 shows an alternate view of the head-mounted display system of FIG. 41A, illustrating stiffening portions on the positioning and stabilising structure.

FIGS. 42A-42E show a head-mounted display system according to another example of the present technology.

FIGS. 43A-43C show battery packs according to examples of the present technology.

FIGS. 44A-44D show a head-mounted display system according to another example of the present technology.

Figure 44A:
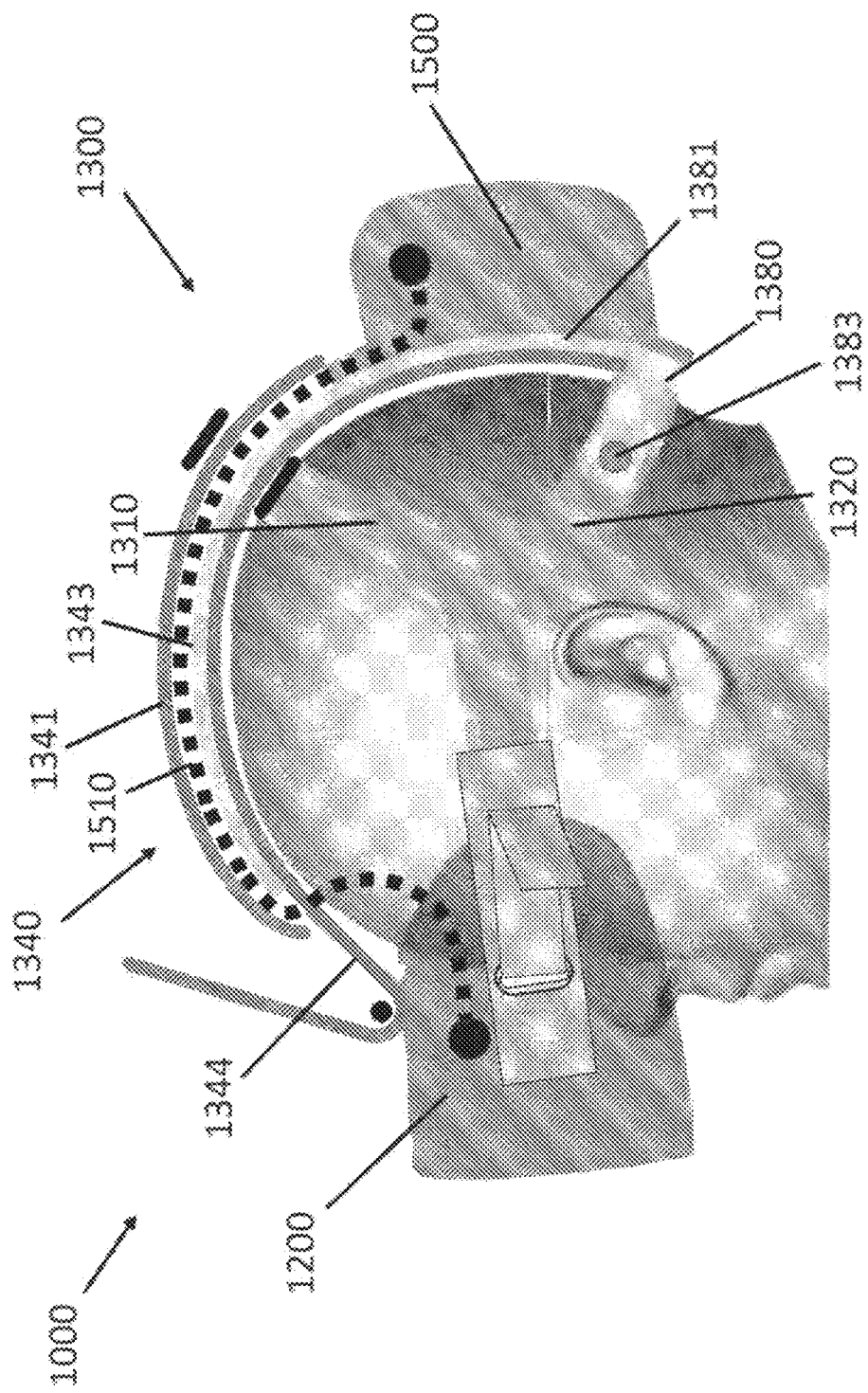
Figure 44B:
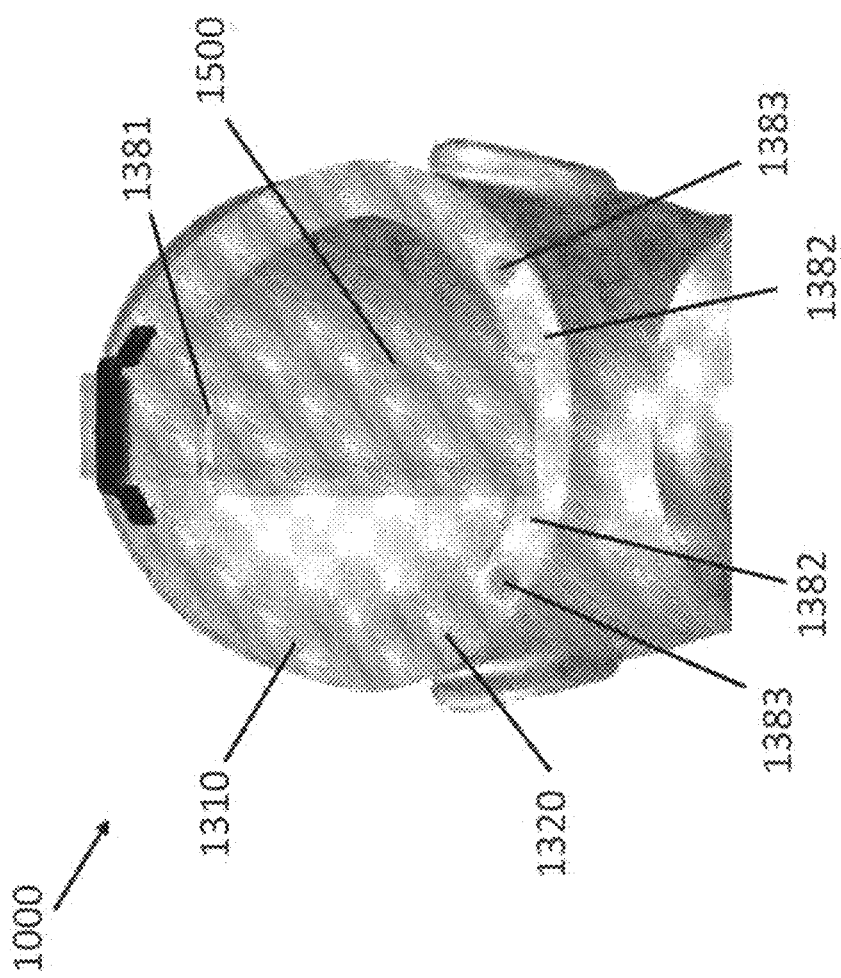
Figure 44C:
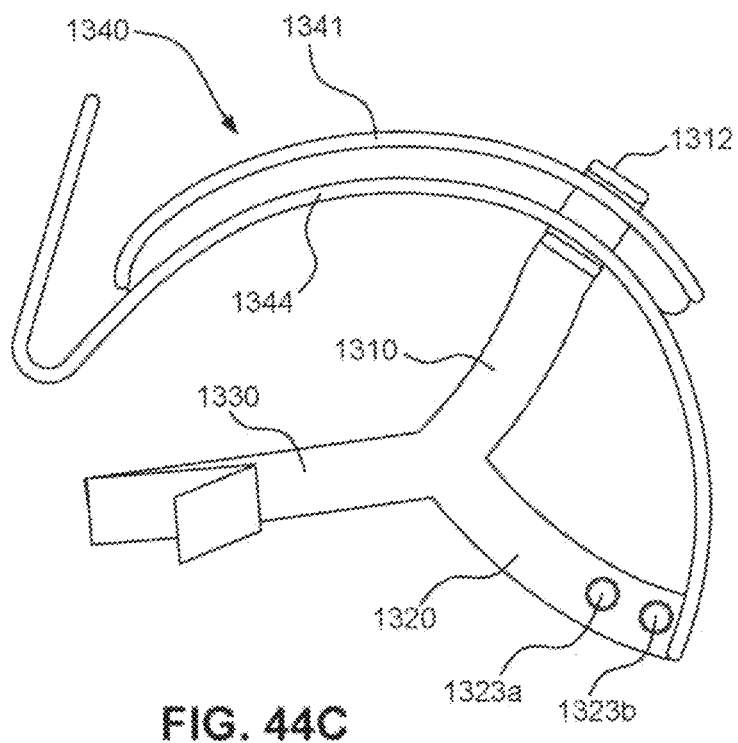
Figure 44D:
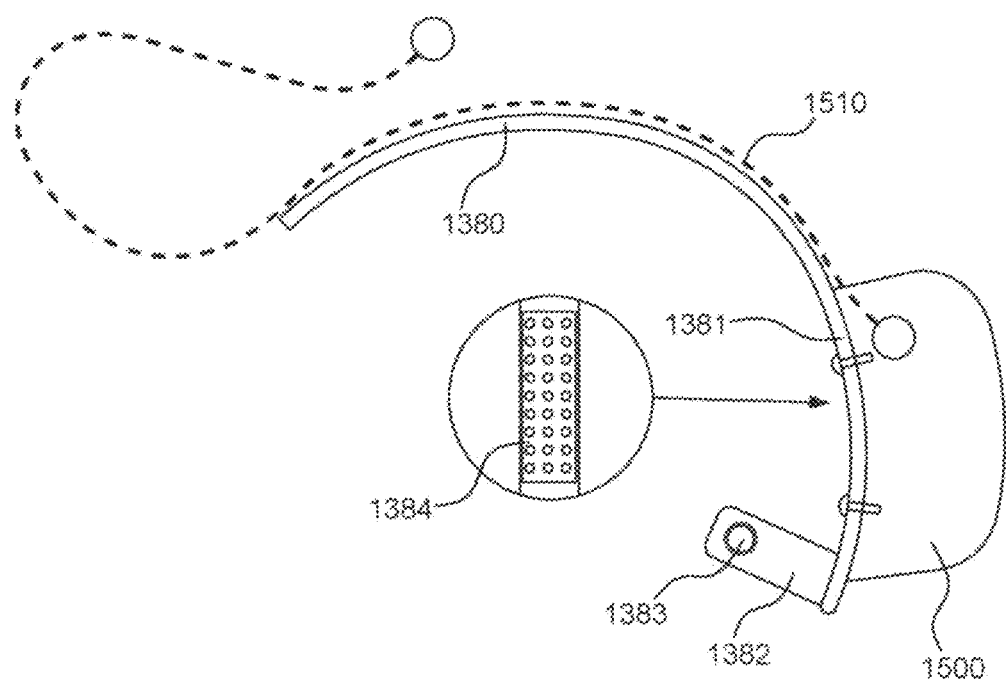
Figures 1, 44C:
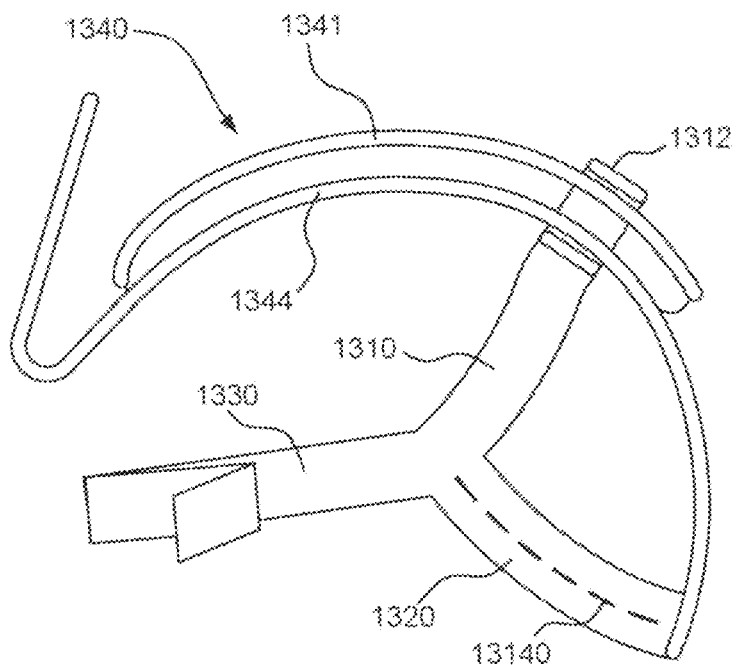
Figures 1, 44D:
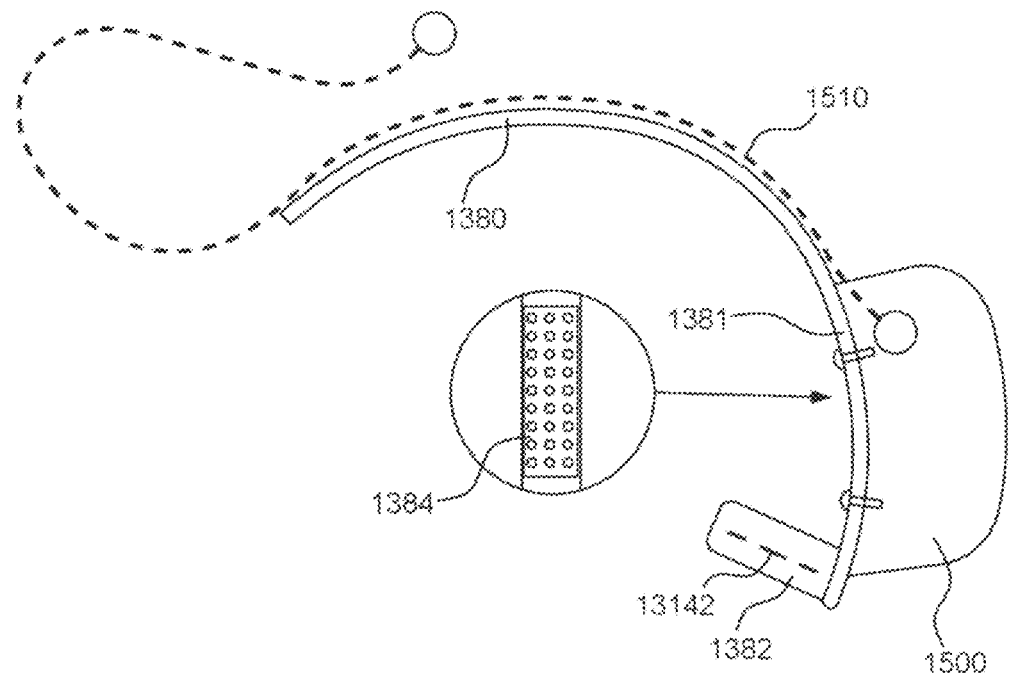

FIGS. 44C-1 to 44D-1 show an alternate version of the head-mounted display system of FIGS. 44C and 44D, illustrating a magnetic thread.

FIGS. 45A-45D show components of positioning and stabilising structures according to examples of the present technology.

Figure 46A:
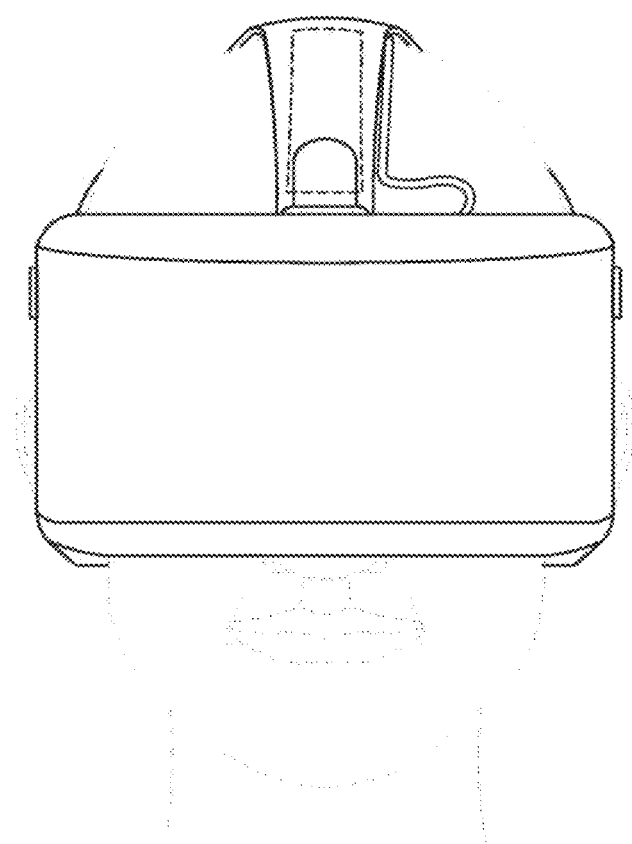
Figure 46B:
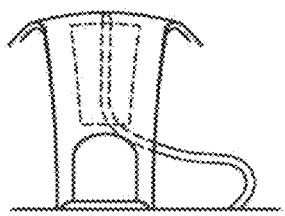
Figure 46C:
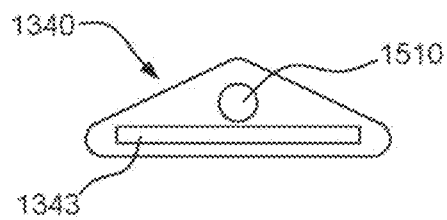

FIGS. 46A-46C show a head-mounted display system according to another example of the present technology.

Figure 47A:
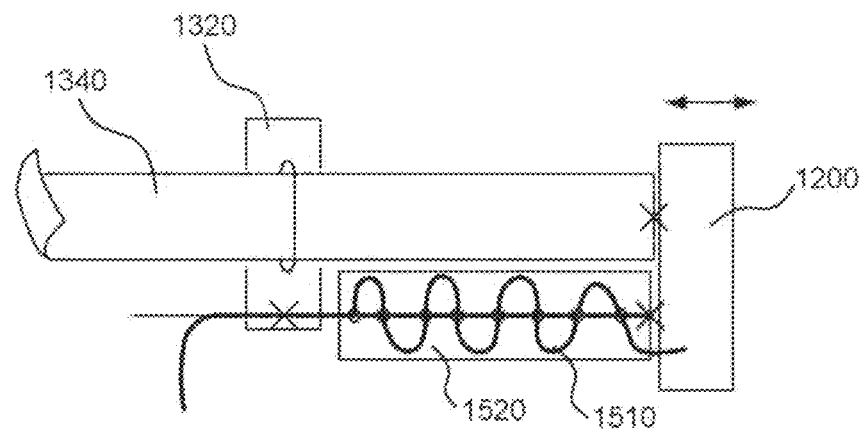
Figure 47B:
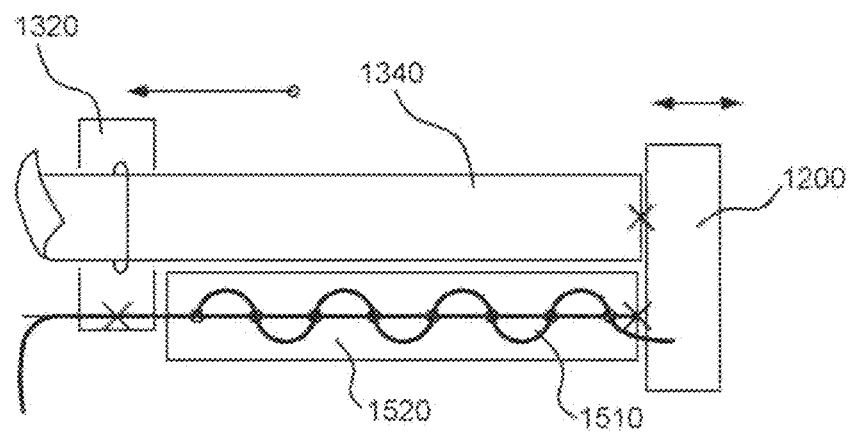

FIGS. 47A-47B show a power cord strap portion according to an example of the present technology.

FIG. 48 shows a head-mounted display unit according to an example of the present technology.

FIGS. 49A-49E show head-mounted display systems according to examples of the present technology having power cords.

FIGS. 50A-50D show arms according to examples of the present technology.

Figure 51A:
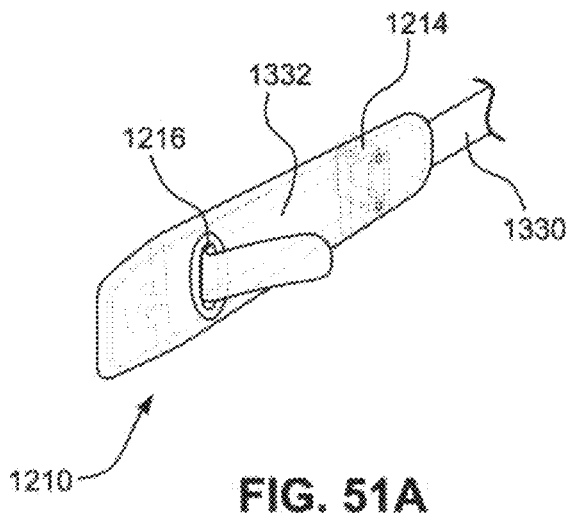
Figure 51B:
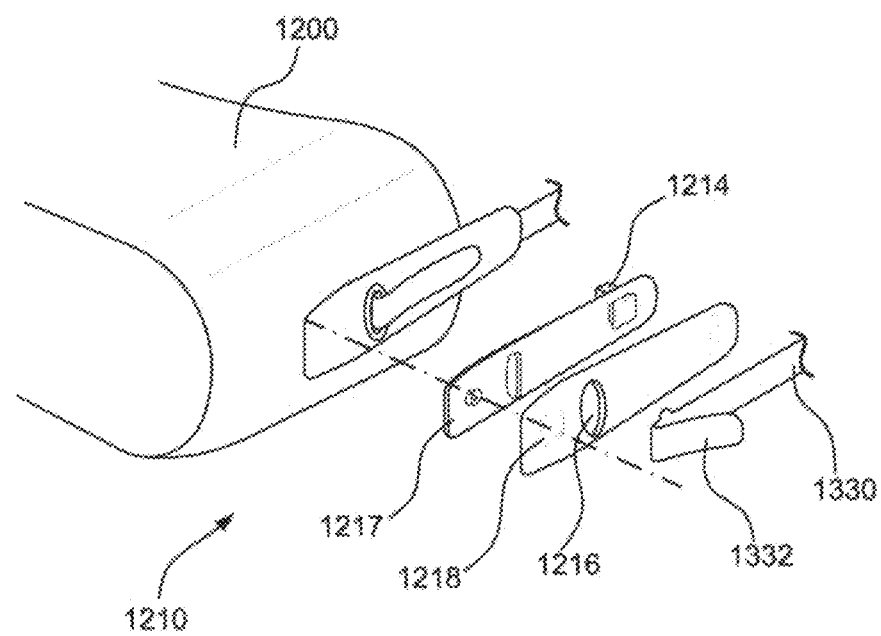

FIGS. 51A-51B show an arm according to a further example of the present technology.

Figure 52A:
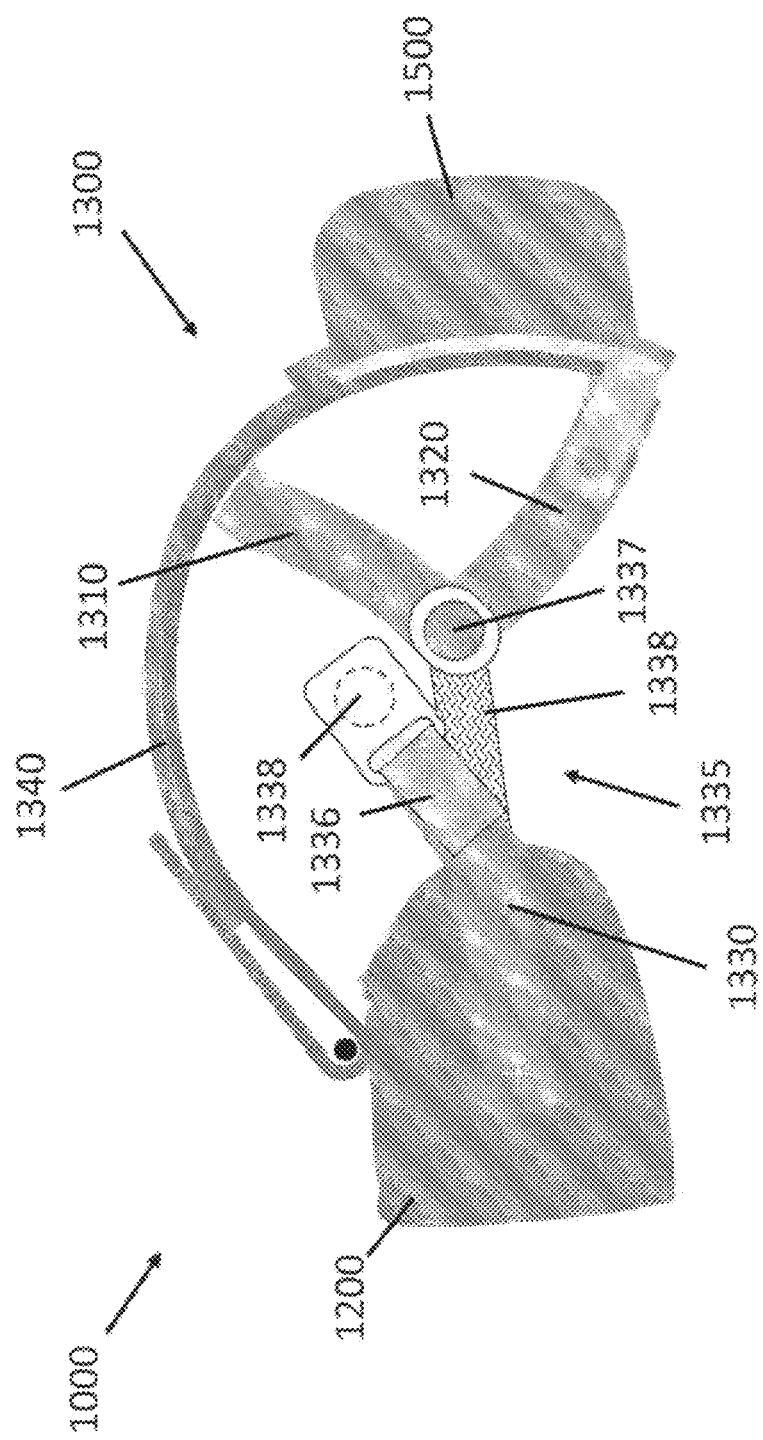
Figure 52B:
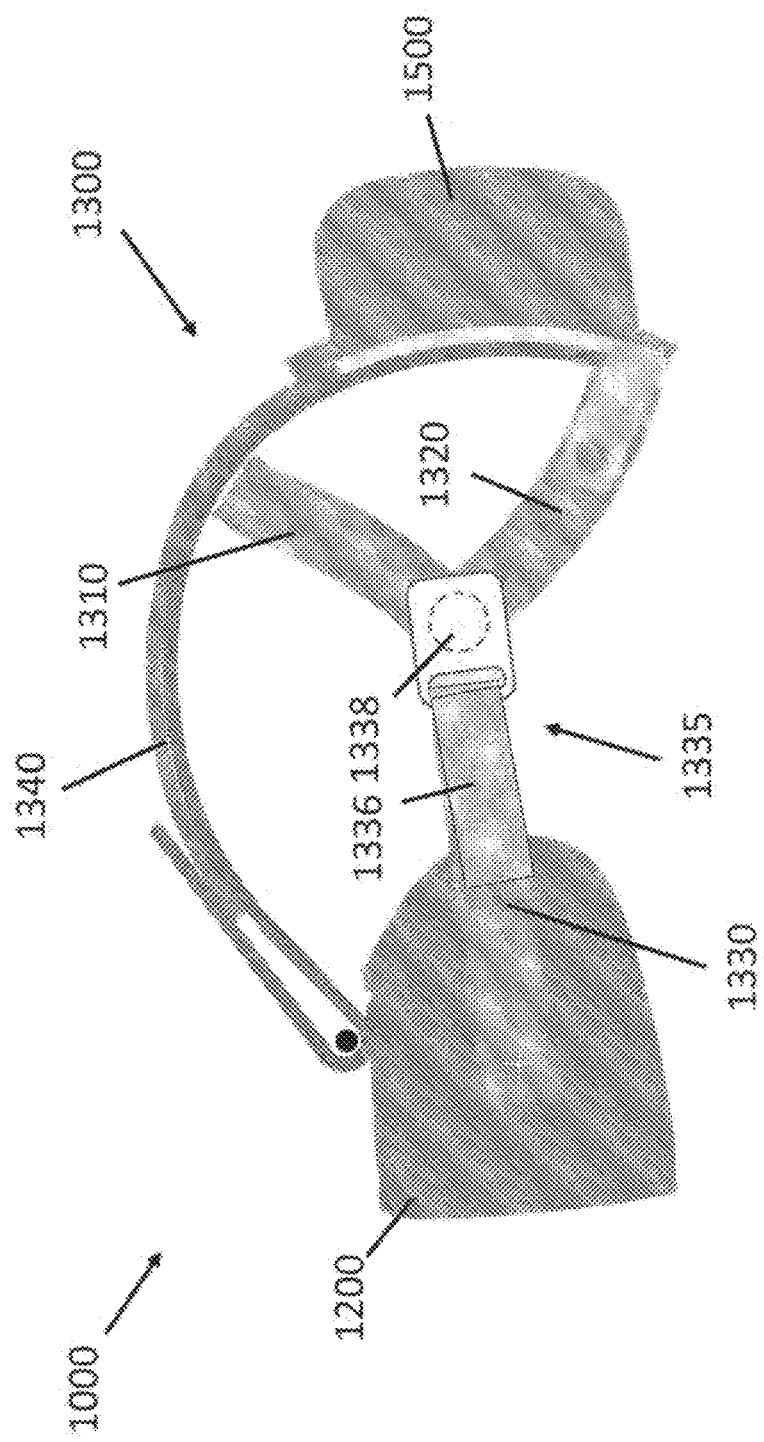

FIGS. 52A-52B show a head-mounted display system according to another example of the present technology.

Figures 53A, 53B:
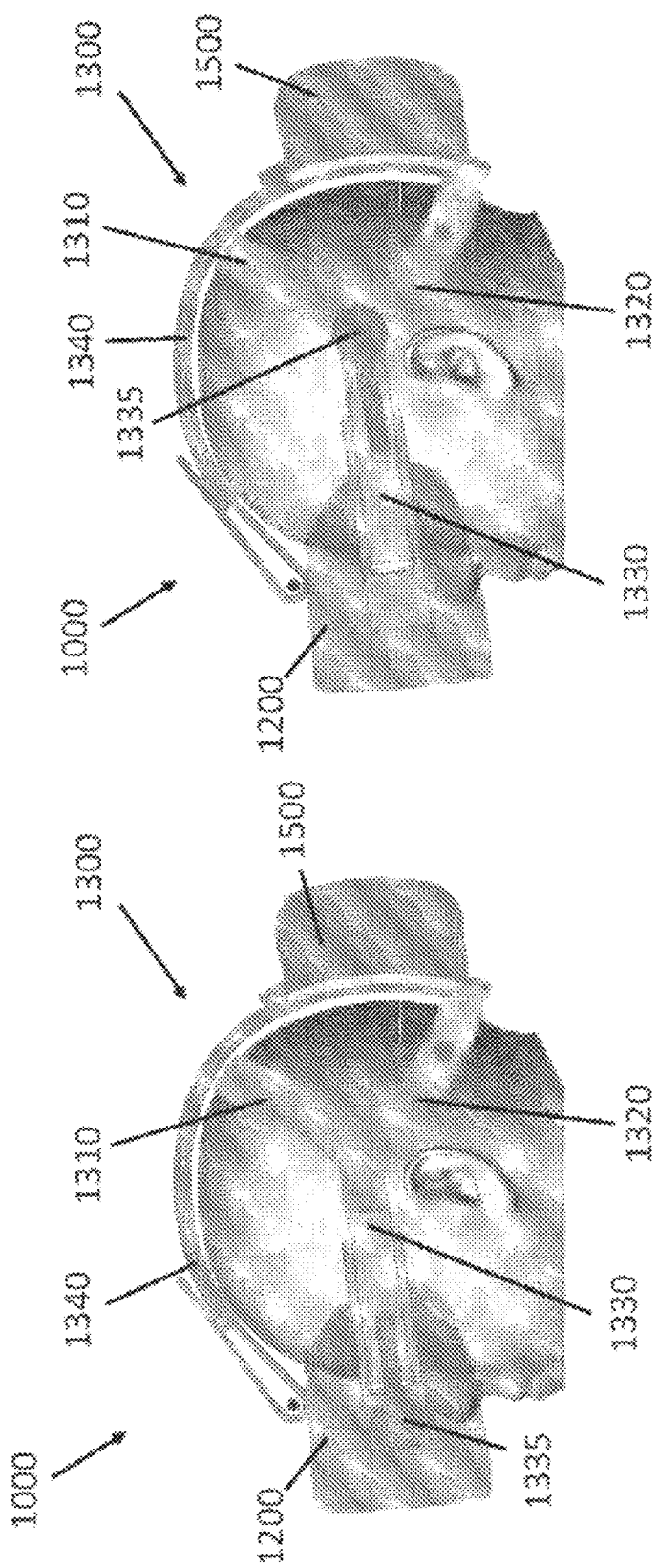

FIGS. 53A-53C show head-mounted display systems according to examples of the present technology.

Figure 54:
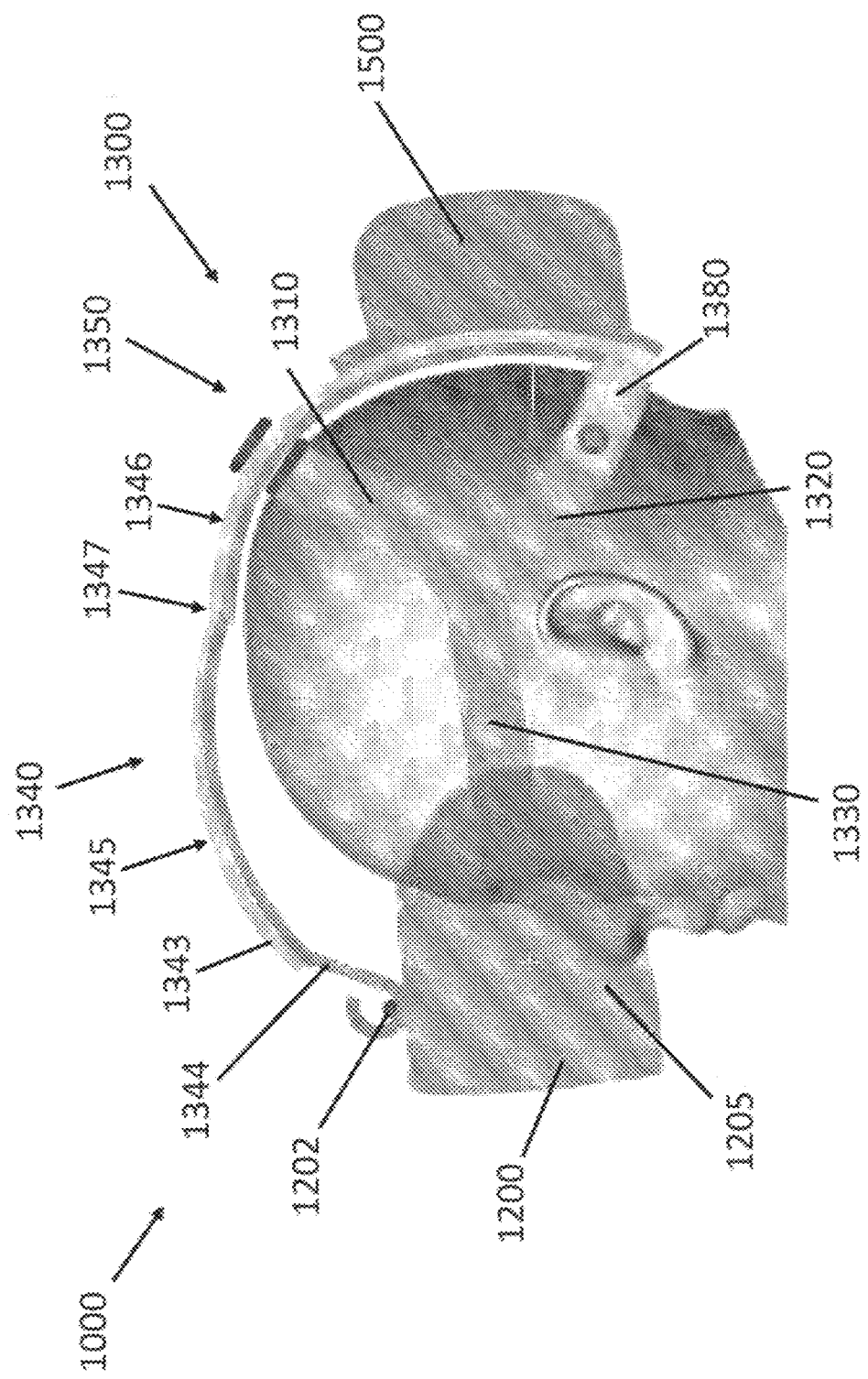

FIG. 54 shows a head-mounted display system according to another example of the present technology.

FIGS. 55A-55I show a head-mounted display unit according to another example of the present technology.

Figure 56A:
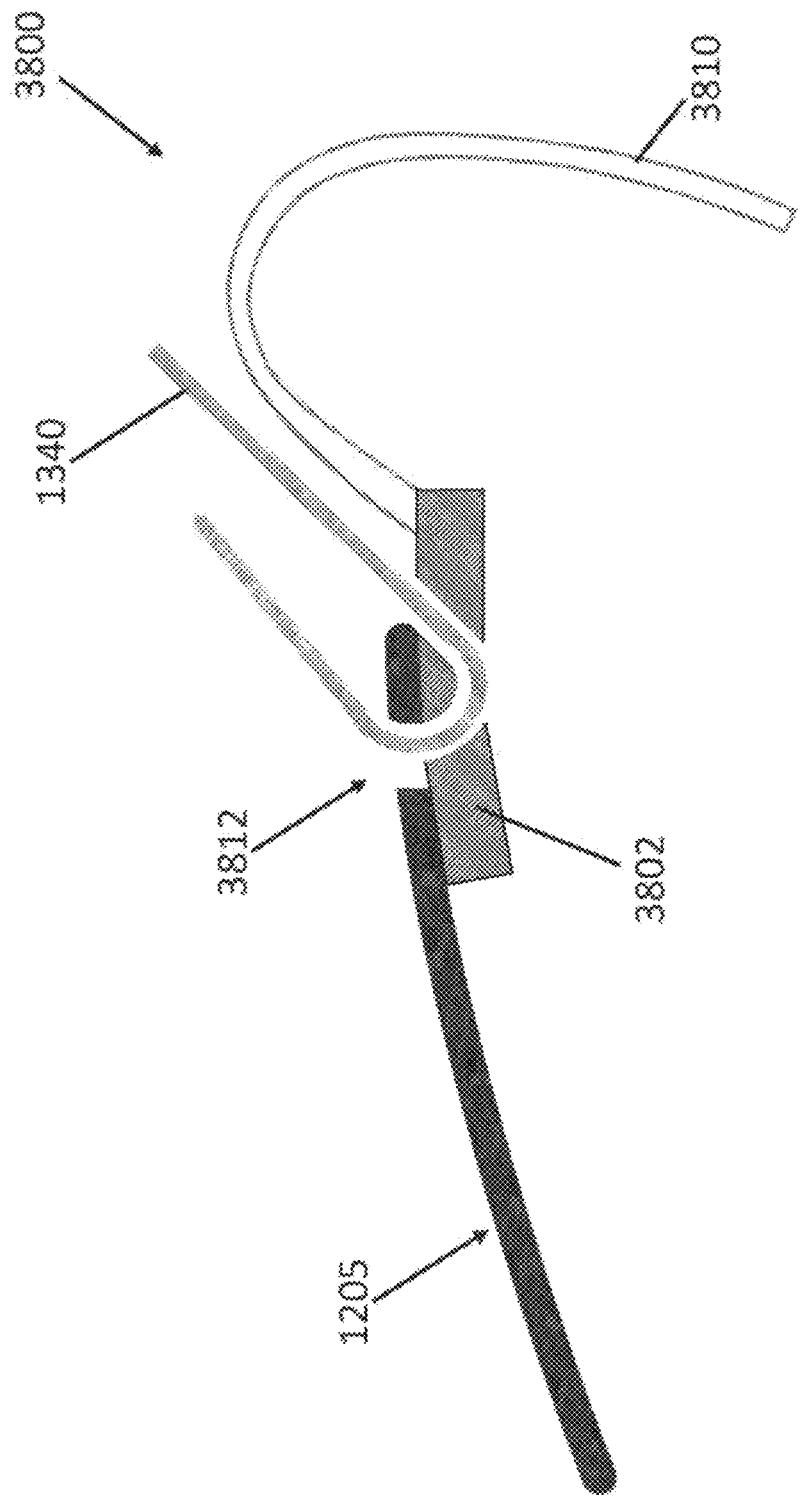
Figure 56B:
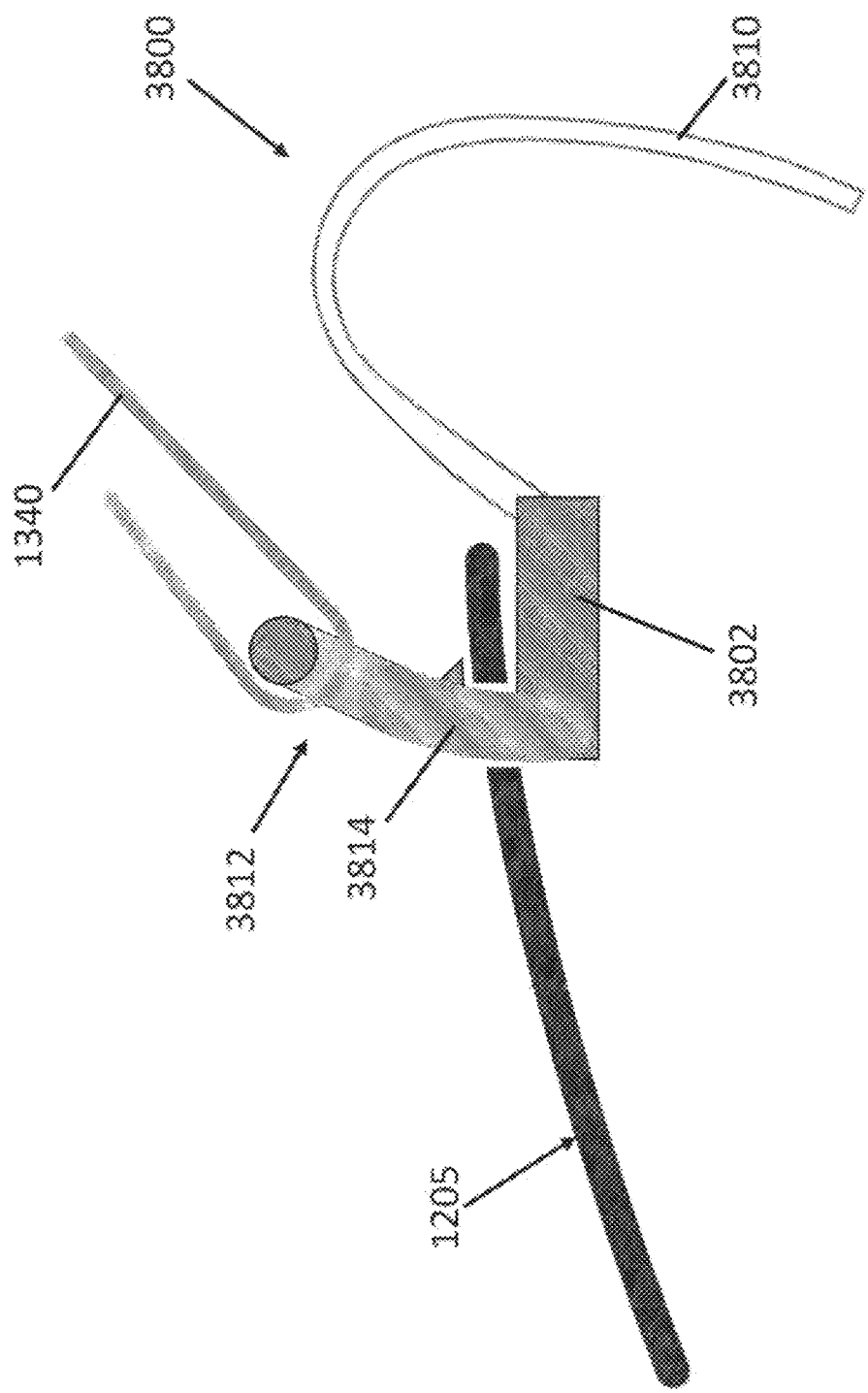

FIGS. 56A-56B show connections between a top strap portion and a display unit housing according to examples of the present technology.

FIGS. 57A-57D show a head-mounted display system according to another example of the present technology.

Figure 58B:
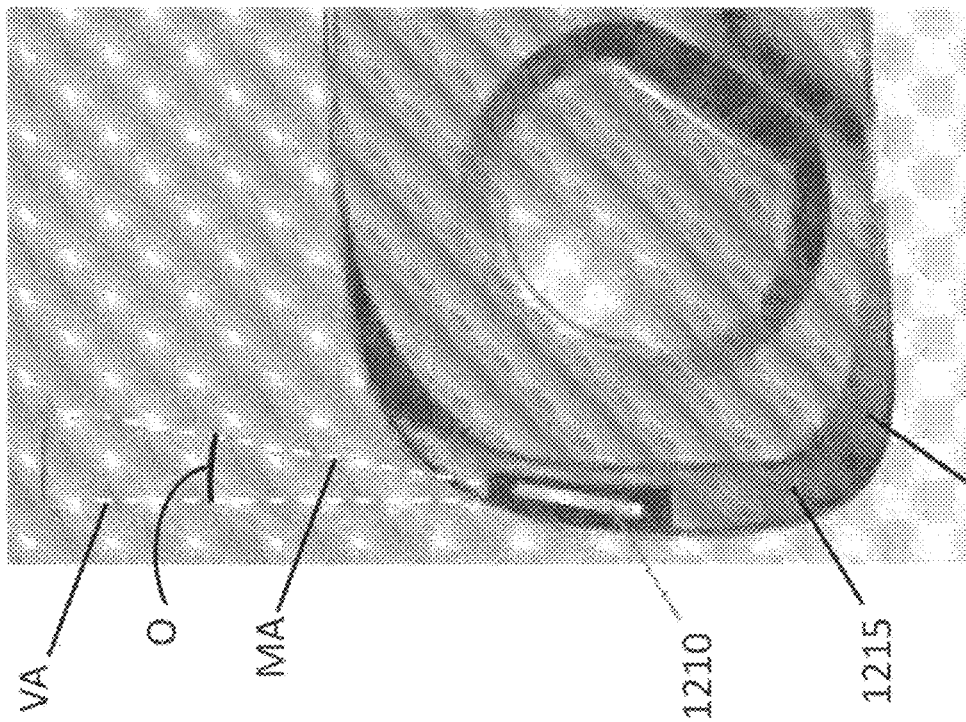
Figure 58A:
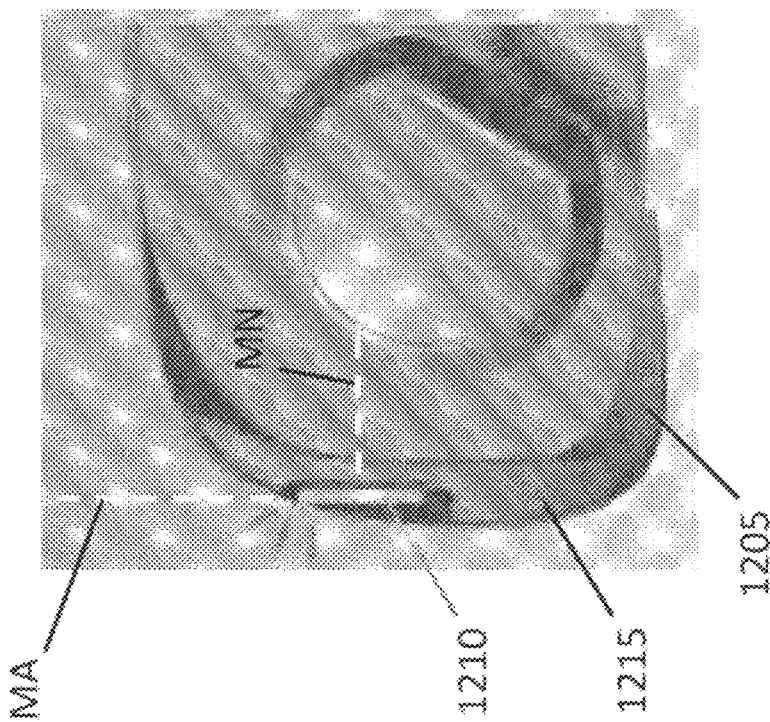

FIGS. 58A-58B show a display unit housing according to further examples of the present technology.

FIG. 59 shows an arm and arm mounting portion according to another example of the present technology.

Figure 60A:
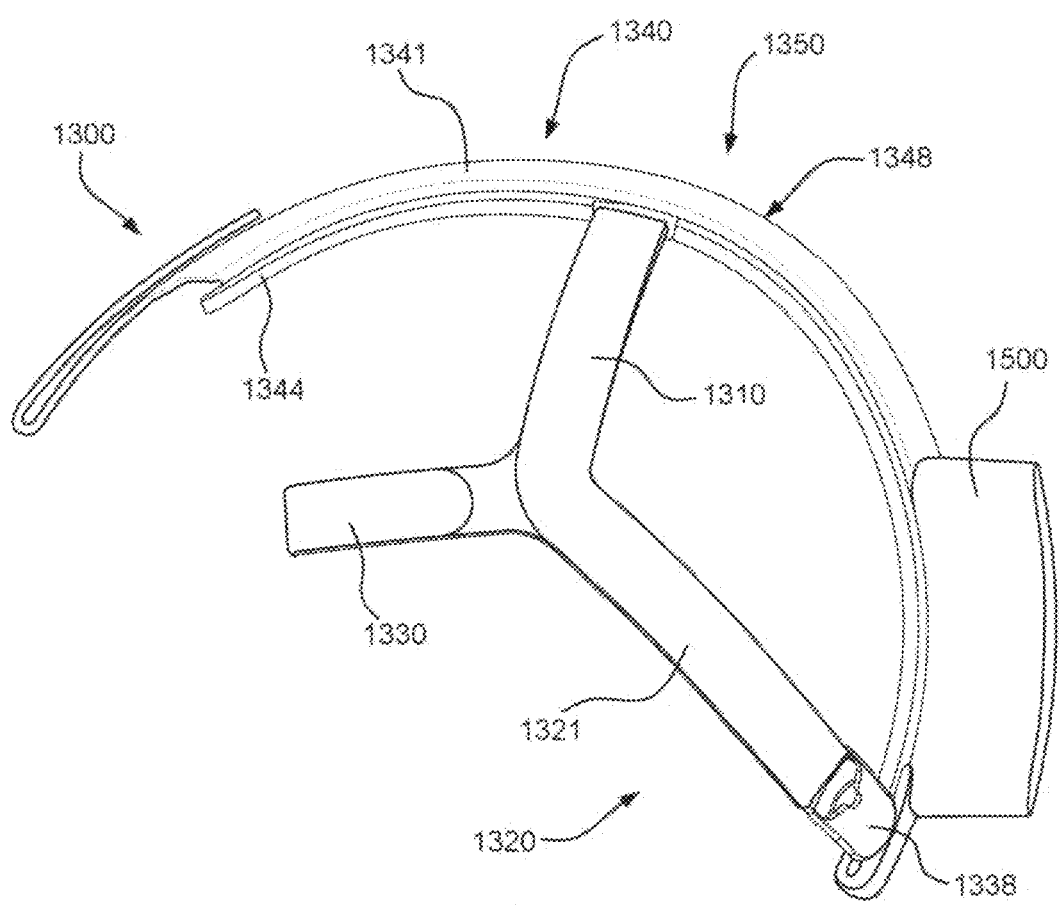
Figure 60B:
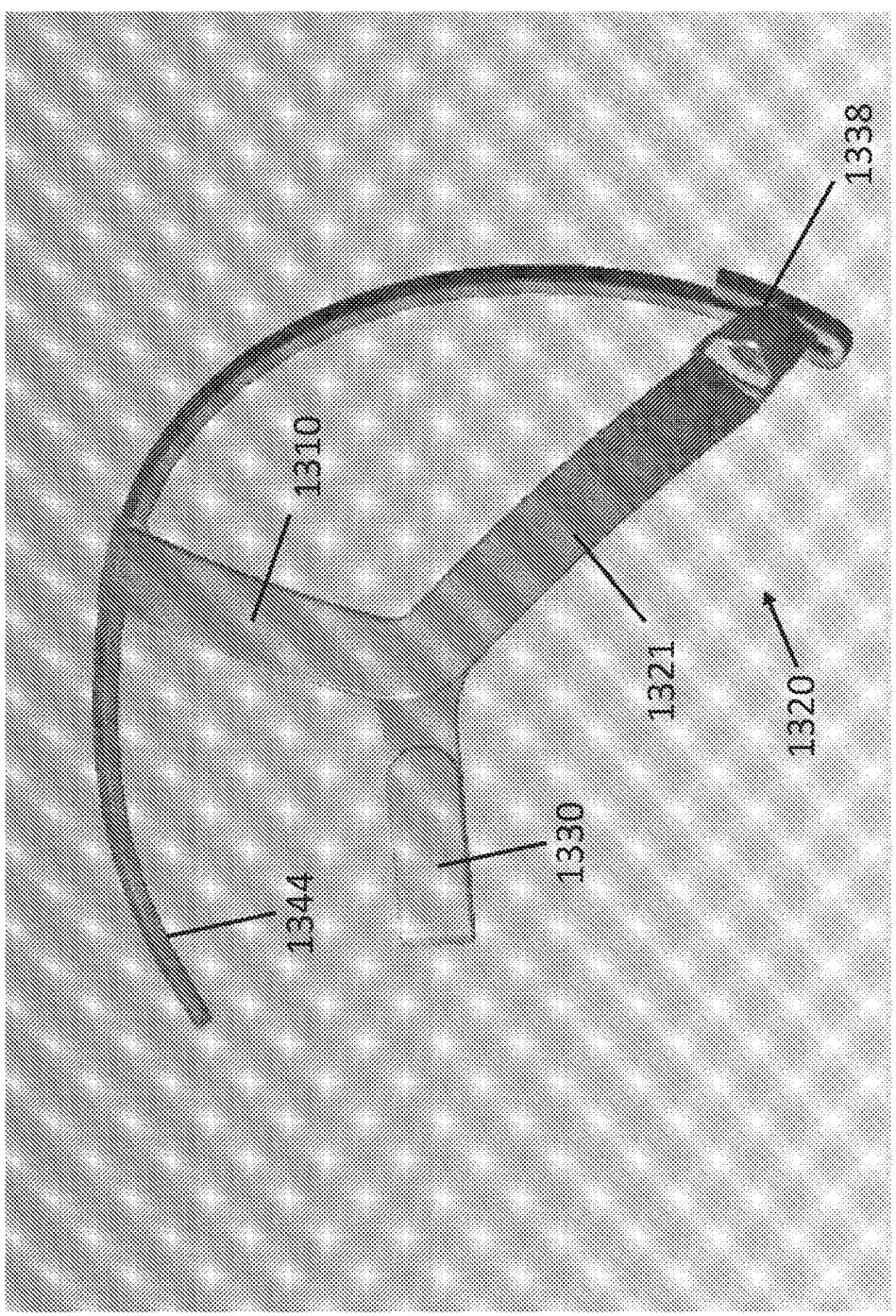
Figure 60C:
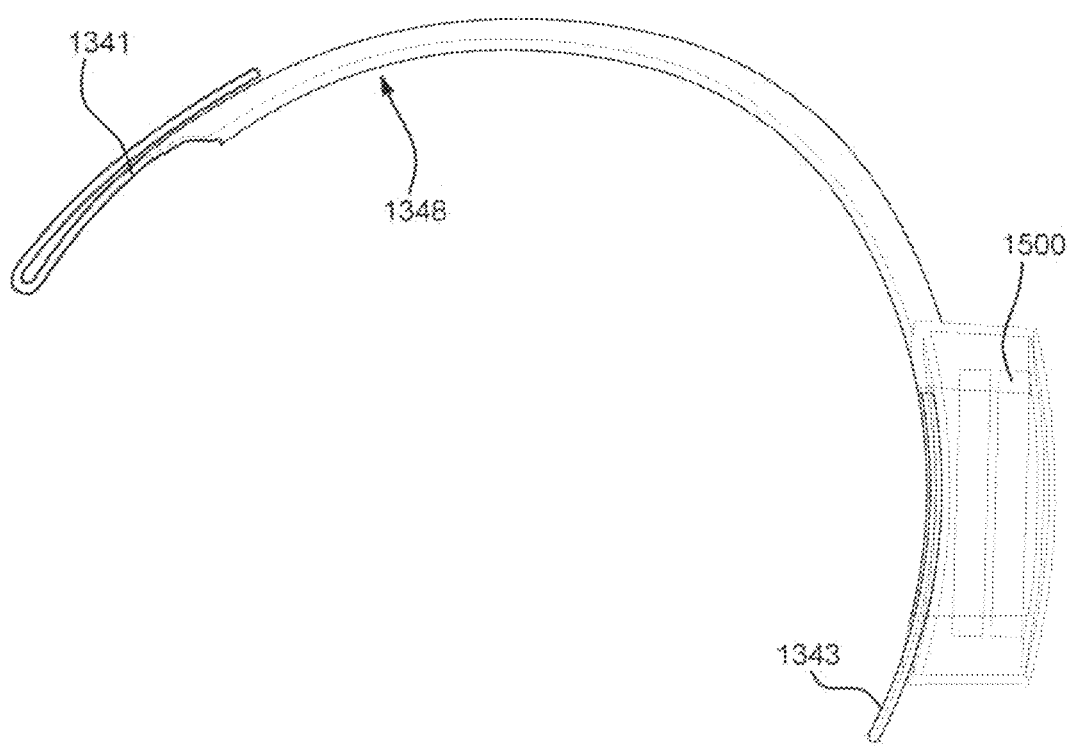

FIGS. 60A-60C show, in isolation, the positioning and stabilising structure of the head-mounted display system shown in FIGS. 57A-57D.

Figure 61:
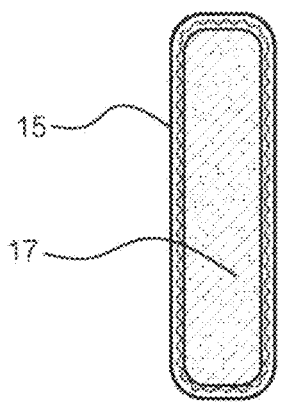

FIG. 61 is a cross-sectional view of a positioning and stabilising structure according to an example of the present technology.

Figure 62:
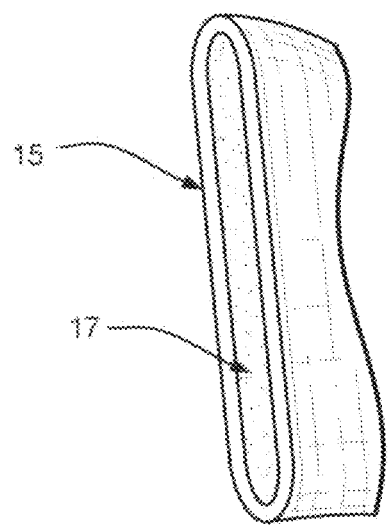

FIG. 62 is a cross-sectional view of a positioning and stabilising structure according to another example of the present technology.

Figure 63:
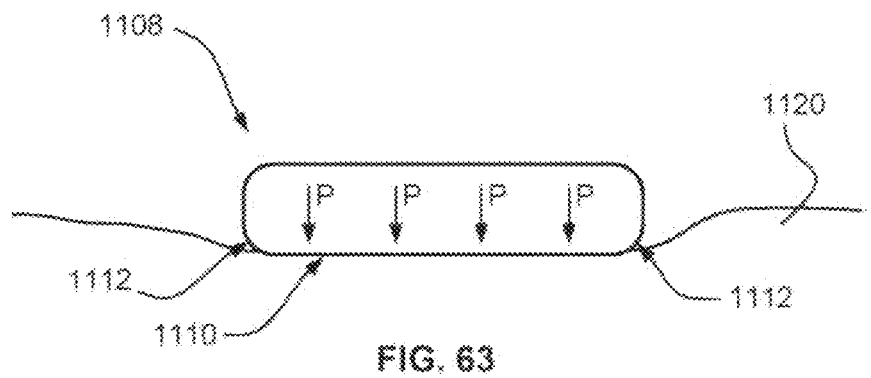

FIG. 63 is a close-up side view of an engagement structure (e.g., interfacing structure or positioning and stabilising structure) applying a pressure against a user's head when the engagement structure is in use according to an example of the present technology, wherein pressure is the force exerted on a surface divided by the area over which that force acts.

Figure 64:
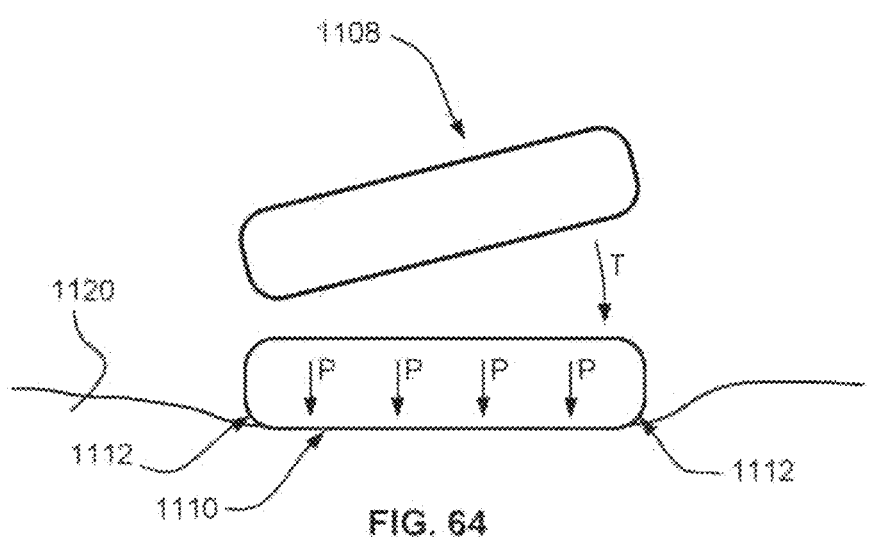

FIG. 64 is a close-up side view of an engagement structure twisting T to improve engagement and thus achieve even (or uniform) distribution of a pressure against a user's head when the engagement structure is in use according to an example of the present technology.

Figure 65:
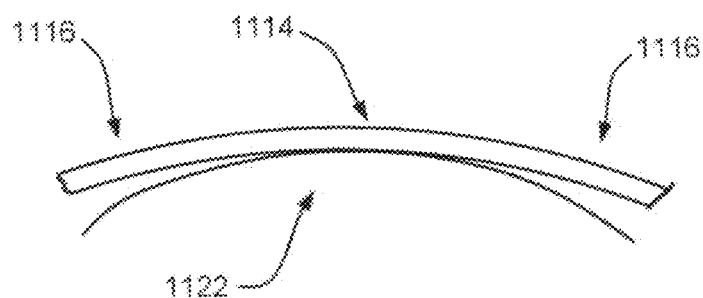

FIG. 65 is a close-up front view of a positioning and stabilising structure over at least a portion (e.g., the crown) of a user's head according to an example of the present technology.

Figure 66:

FIG. 66 is a close-up top view of an elastic portion of a positioning and stabilising structure in the form of a strap according to an example of the present technology.

Figure 67:
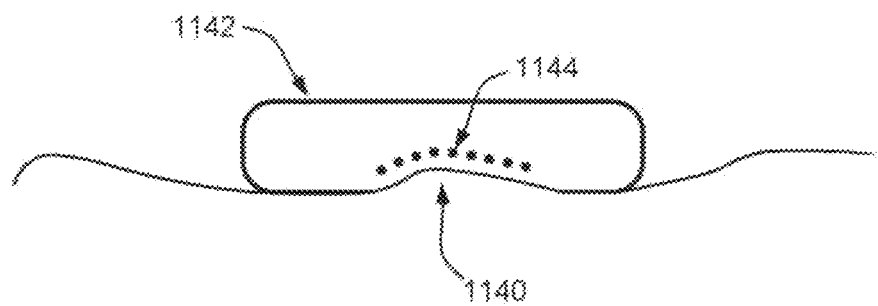

FIG. 67 is a close-up side view of an engagement structure that is locally compliant when engaging a protrusion of a user's head, when the engagement structure is in use according to an example of the present technology.

Figure 68:
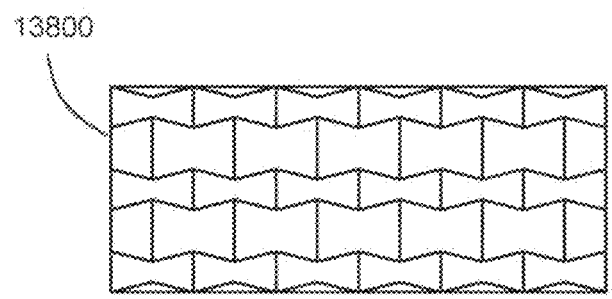

FIG. 68 shows a schematic view of auxetic material in an unstressed position.

Figure 69:
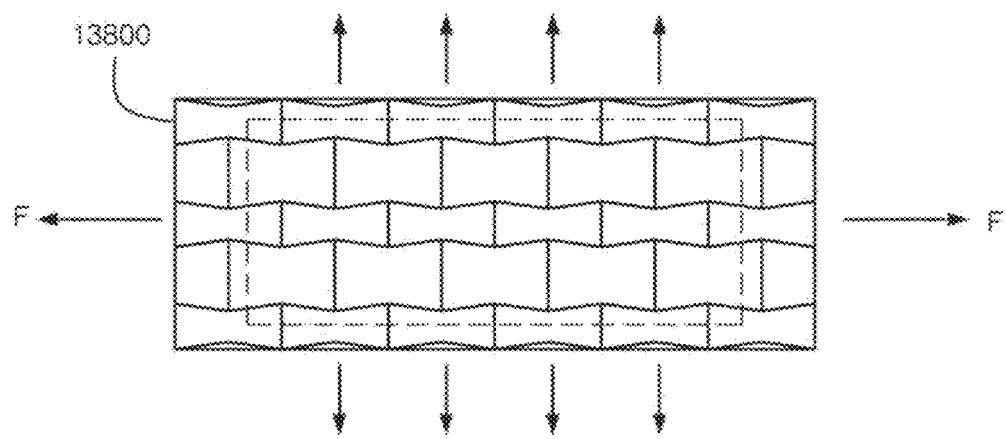

FIG. 69 shows a schematic view of the auxetic material of FIG. 68 in a stressed position. A tensile force is provided along the length of the auxetic material, and the auxetic material expands along its width.

Figure 70:
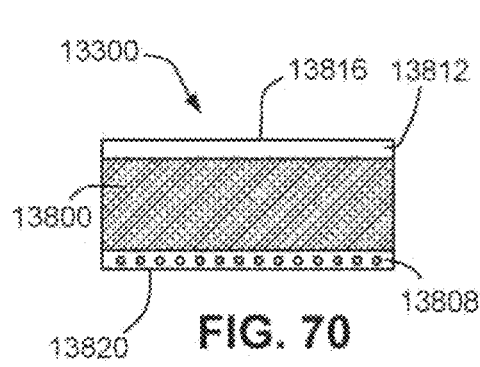

FIG. 70 shows a cross-sectional view of a portion of a head mounted display system according to one example of the present technology with an adaptive material in a relaxed position.

Figure 71:
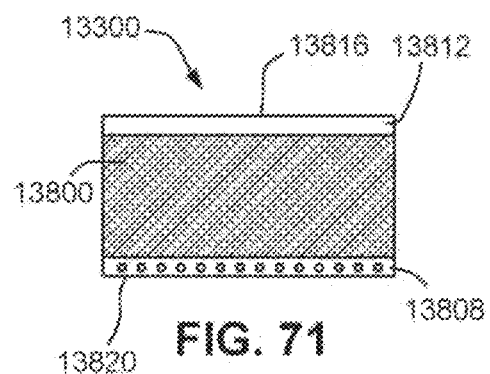

FIG. 71 shows a cross-sectional view of the portion of the head mounted display system of FIG. 70 in a stressed position. An adaptive section of the head mounted display system has expanded as a result in a change in conditions. A rigid section of the head mounted display system directs the expansion on the adaptive section in one direction.

Figure 72:
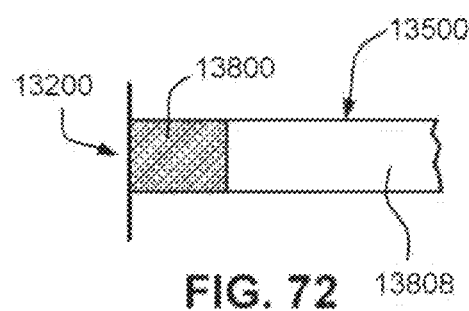

FIG. 72 shows a cross-sectional view of a strap of a positioning and stabilising structure coupled to a head mounted display unit. The strap is in a relaxed position.

Figure 73:
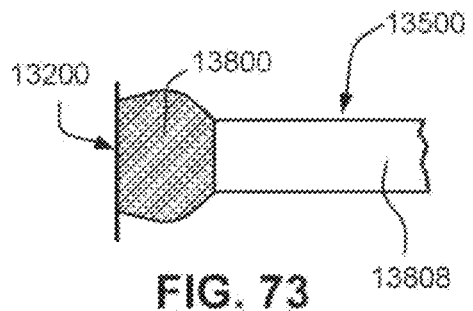

FIG. 73 shows a cross-sectional view of the strap of FIG. 72 in a stressed position. An adaptive section of the strap has expanded as a result in a change in conditions. A rigid section of the strap remains substantially the same length.

Figure 74:
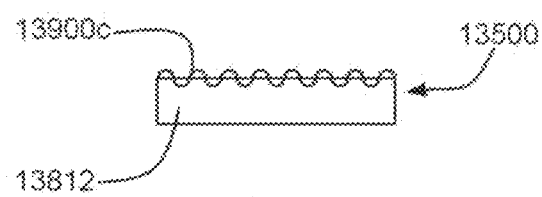

FIG. 74 shows a detail view of the stiffened portions of an example of the present technology, illustrating the stiffened portions as textile threads sewn into the head mounted display system.

Figure 75:
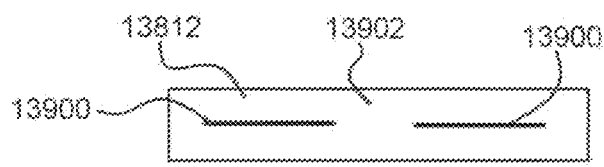

FIG. 75 shows a schematic view of a textile material in an unstressed position, with a pair of stiffened portions coupled to the textile material.

Figure 76:
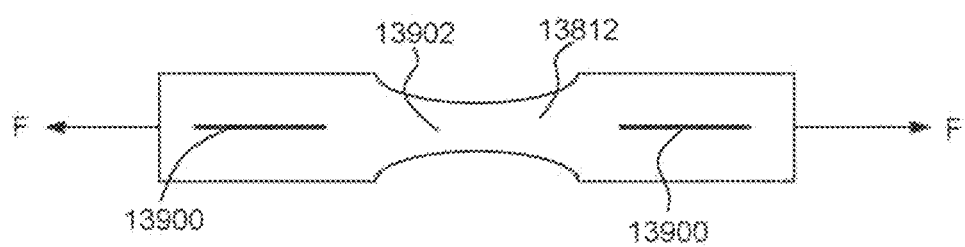

FIG. 76 shows a schematic view of the textile material of FIG. 75 in a stressed position, where the sections with stiffened portions do not deform and sections without stiffened portions deform.

Figure 77:
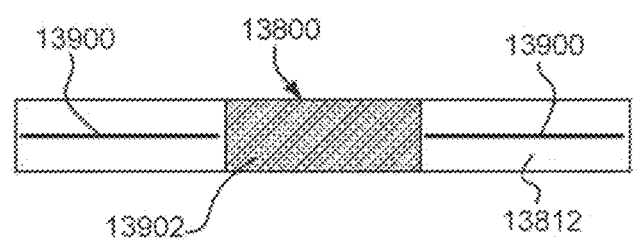

FIG. 77 shows a schematic view of a textile material in an unstressed position, with an adaptive material positioned between a pair of stiffened portions.

Figure 78:
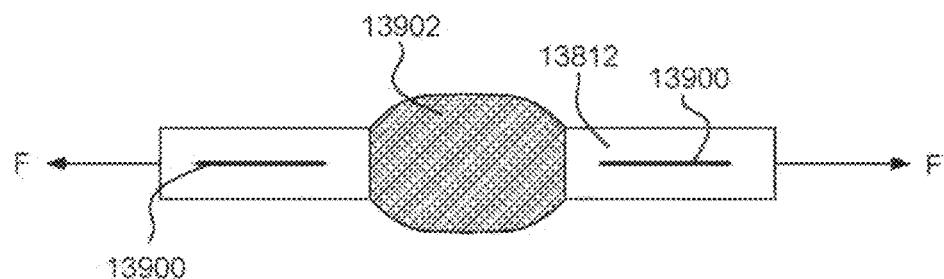

FIG. 78 shows a schematic view of the textile material of FIG. 77 in a stressed position, where the sections with stiffened portions do not deform and sections with the adaptive material deform.

Figure 79:
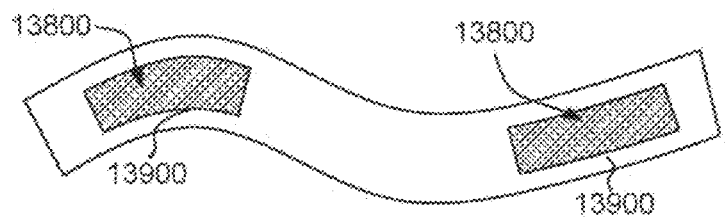

FIG. 79 shows a schematic view of a textile material in an unstressed position, with a pair of stiffened portions having adaptive properties.

Figure 80:
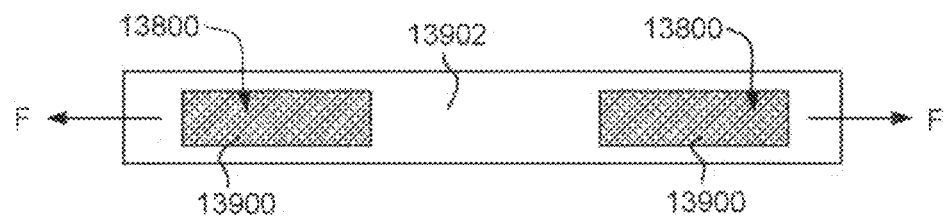

FIG. 80 shows a schematic view of the textile material of FIG. 79 in a first stressed position, where the stiffened portions expand and the textile material does not deform.

Figure 81:
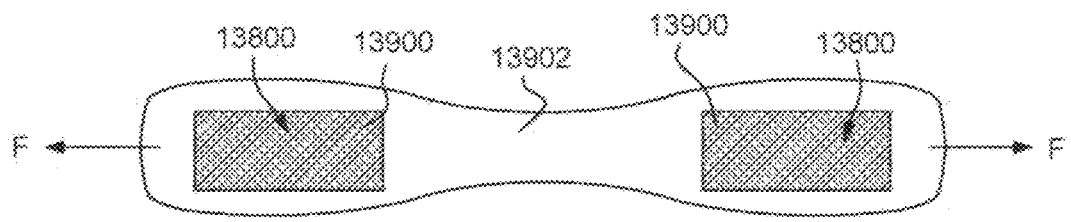

FIG. 81 shows a schematic view of the textile material of FIG. 79 in a second stressed position, where the stiffened portions are fully expanded and the textile material is deformed.

Figure 82:
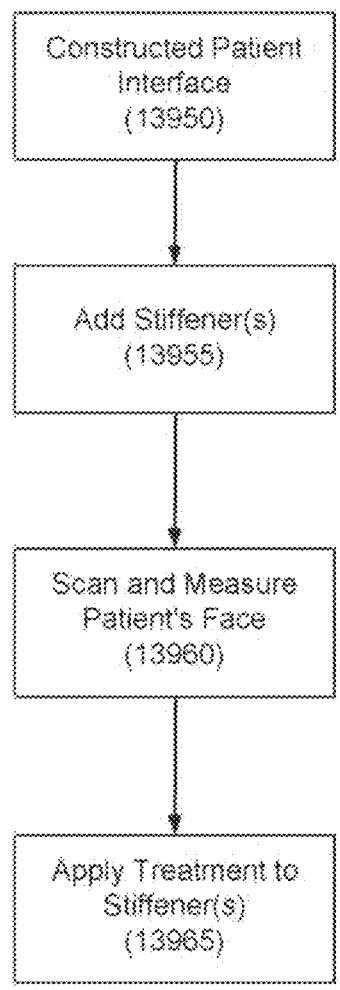

FIG. 82 shows a flow diagram illustrating a first method of selectively stiffening portions of a head mounted display system.

Figure 83:
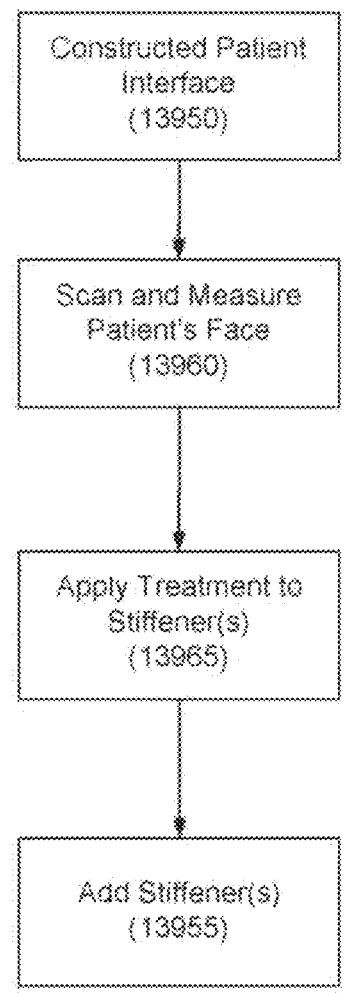

FIG. 83 shows a flow diagram illustrating a second method of selectively stiffening portions of a head mounted display system.

Figure 84:
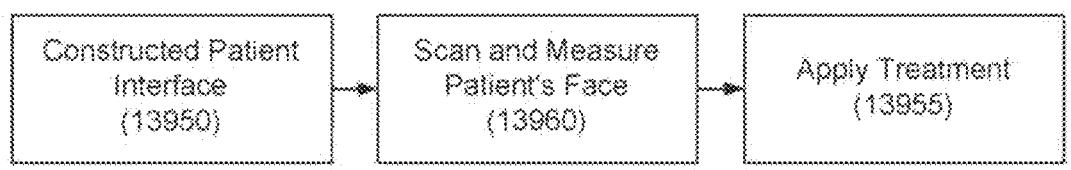

FIG. 84 shows a flow diagram illustrating a third method of selectively stiffening portions of a head mounted display system.

Figure 85:
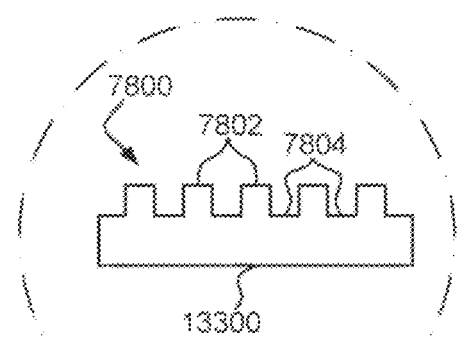

FIG. 85 is a detail view of a head mounted display system, illustrating a rough surface.

Figure 86:
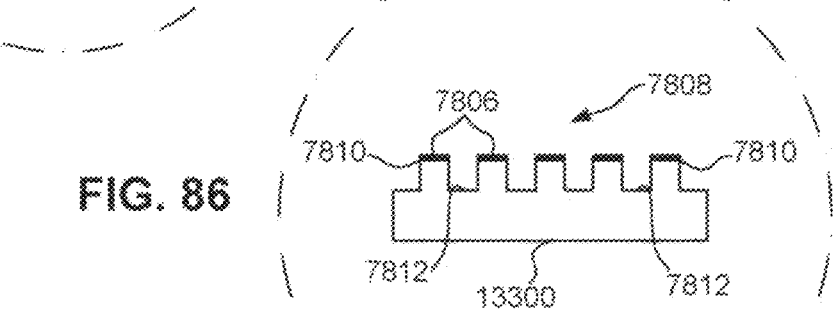

FIG. 86 is a detail view of a head mounted display system, illustrating a rough surface having a surface infused with particles.

Figure 87:
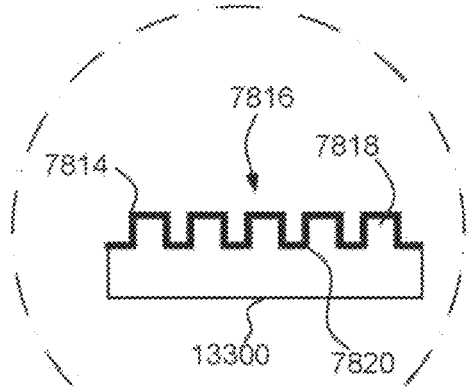

FIG. 87 is a detail view of a head mounted display system, illustrated a rough surface coated with a material.

Figure 88:
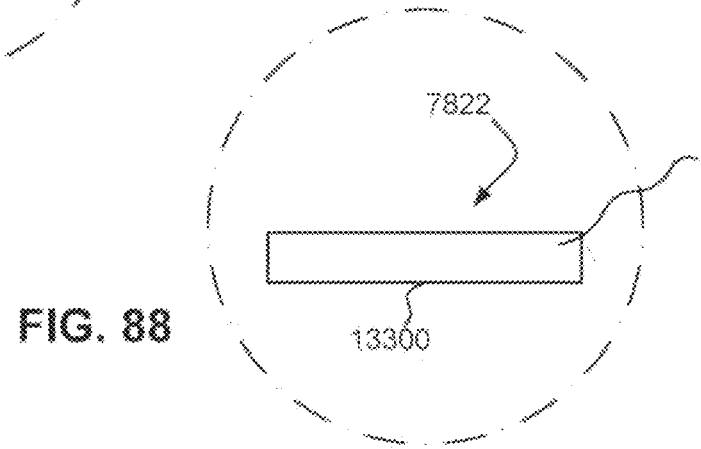
Figures 1, 88:
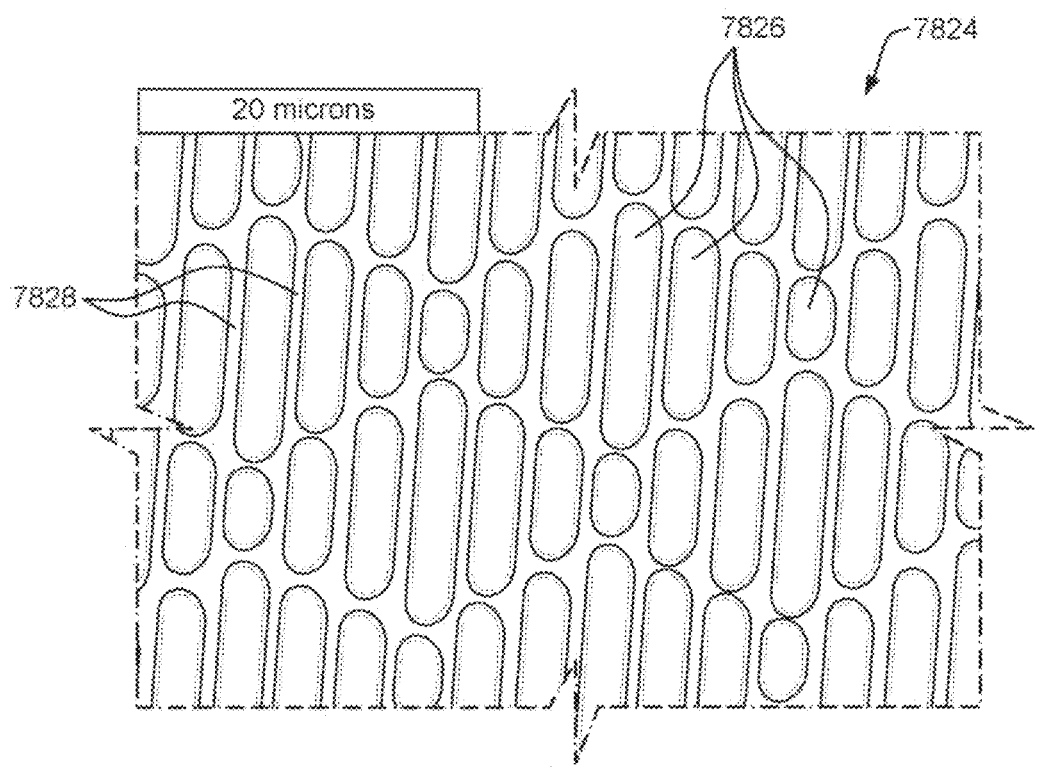
Figures 2, 88:
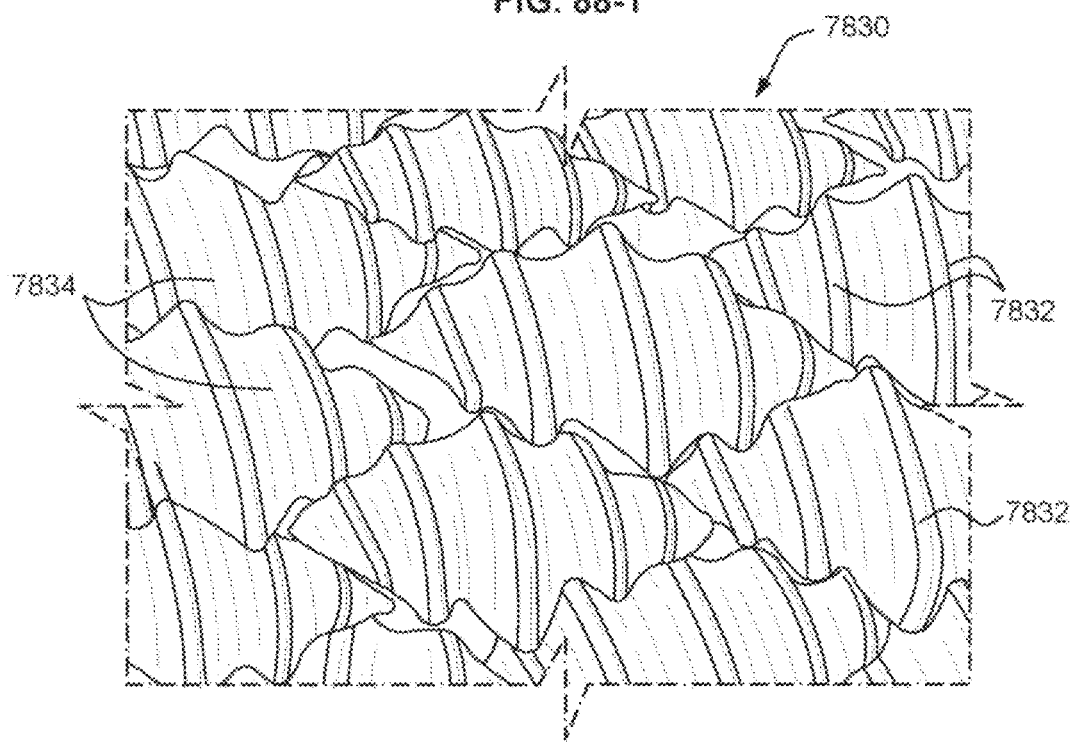

FIG. 88 is a detail view of a head mounted display system, illustrating a smooth surface.

FIG. 88-1 is a detail view of a head mounted display system, illustrating a rough surface having various lengths.

FIG. 88-2 is a detail view of a head mounted display system, illustrating a rough overlapping surface.

Figure 89:
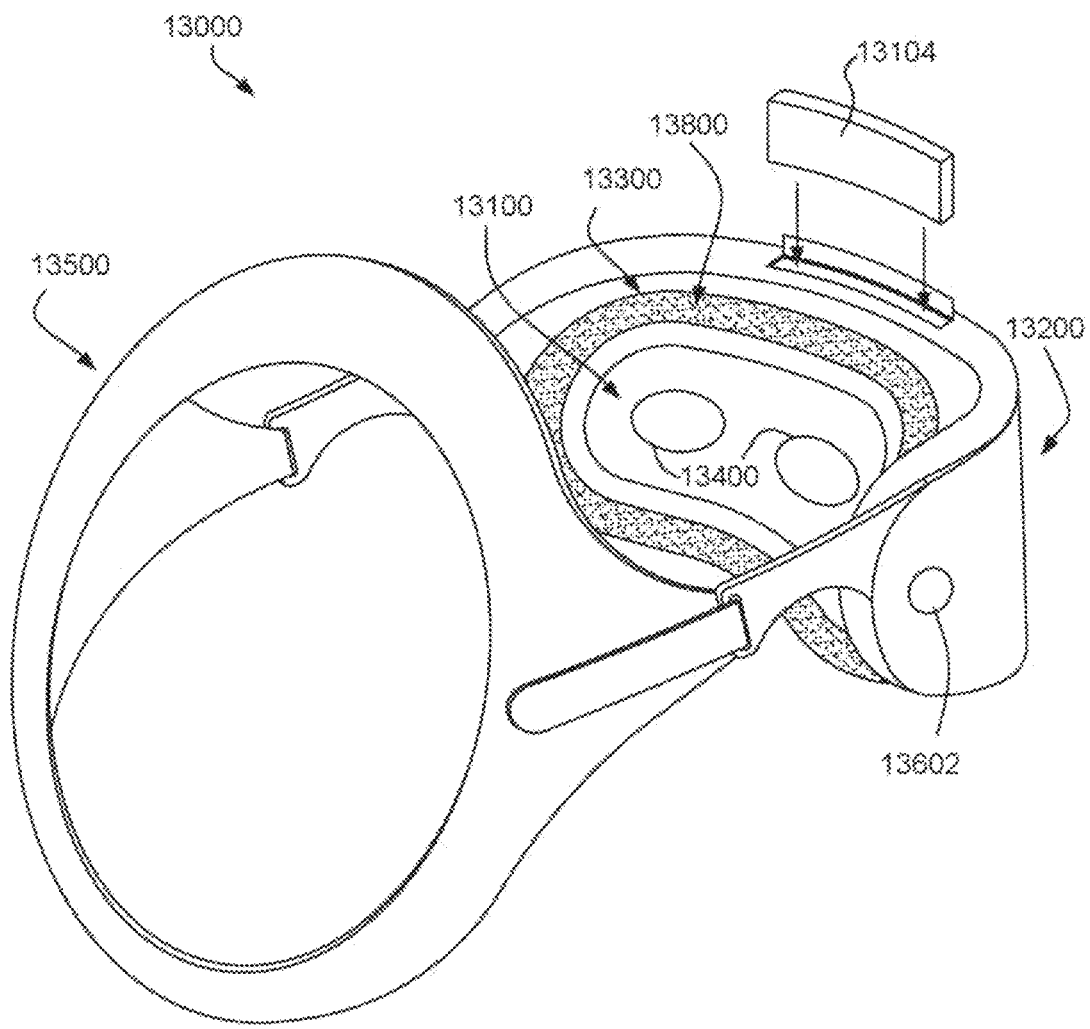
Figures 1, 89:
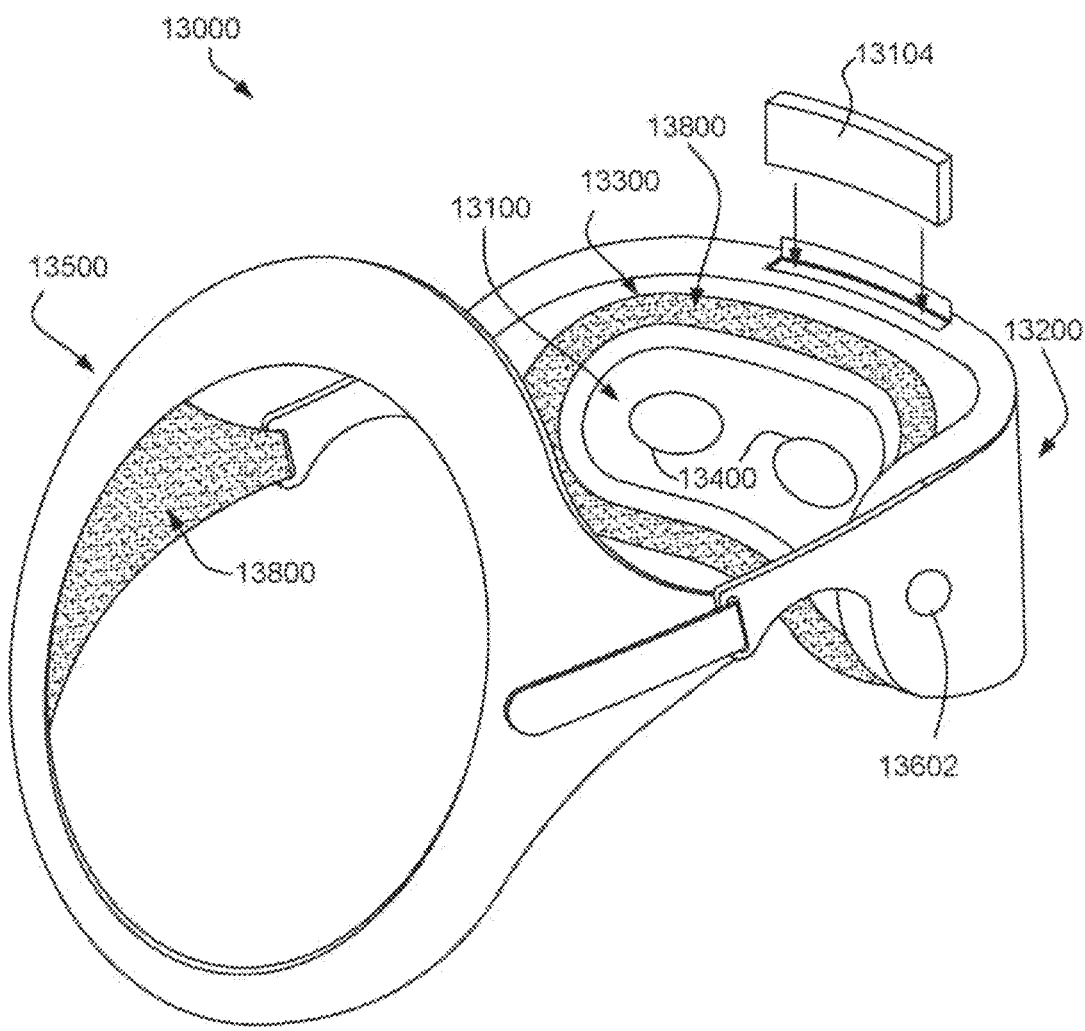
Figures 2, 89:
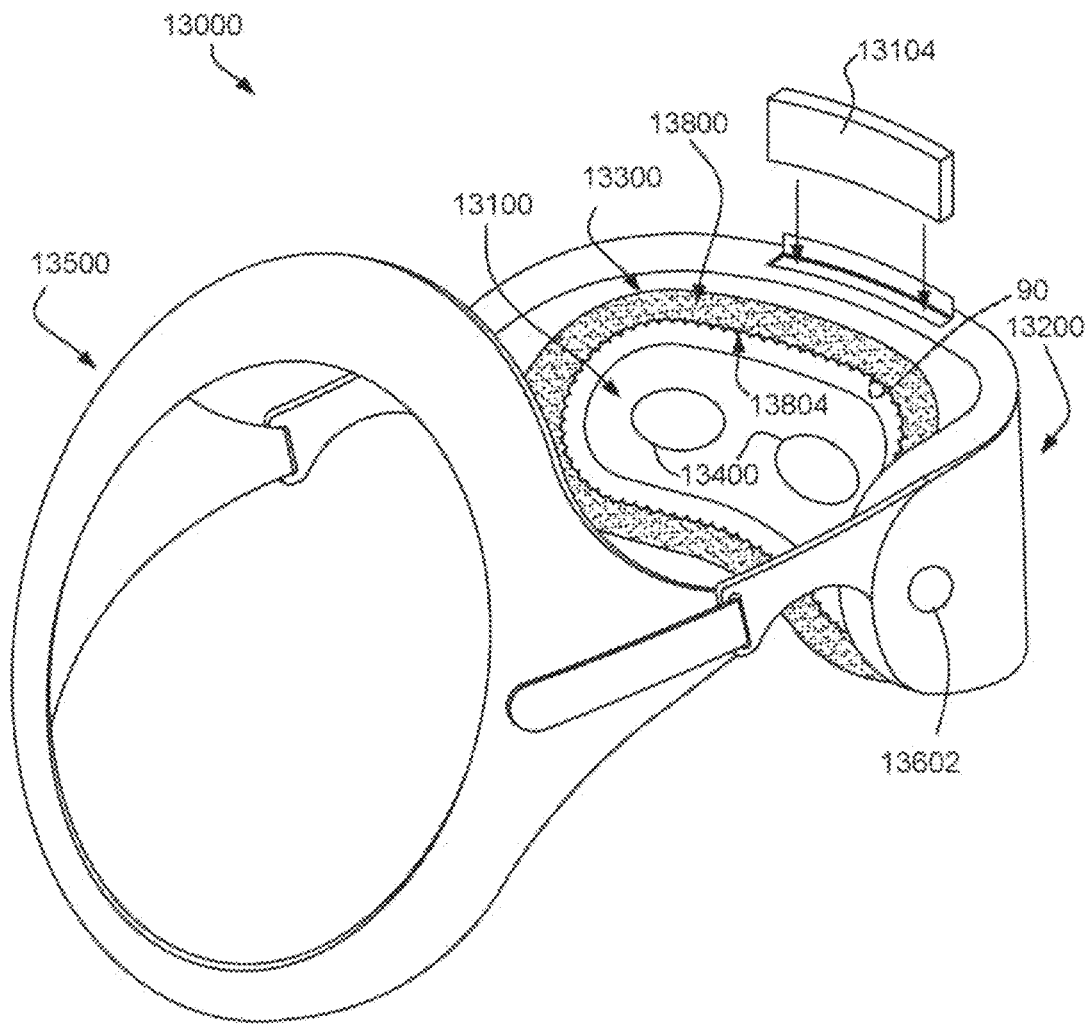

FIG. 89 is a perspective view of a VR head-mounted display apparatus according to an example of the present technology.

FIG. 89-1 is a perspective view according to an alternate example of the VR head-mounted display apparatus of FIG. 89, illustrating adaptive materials on the head mounted display unit and the positioning and stabilising structure.

FIG. 89-2 is a perspective view according to an alternate example of the VR head-mounted display apparatus of FIG. 89, illustrating adaptive materials on the head mounted display unit having a bellows configuration in a first position.

Figures 3, 89:
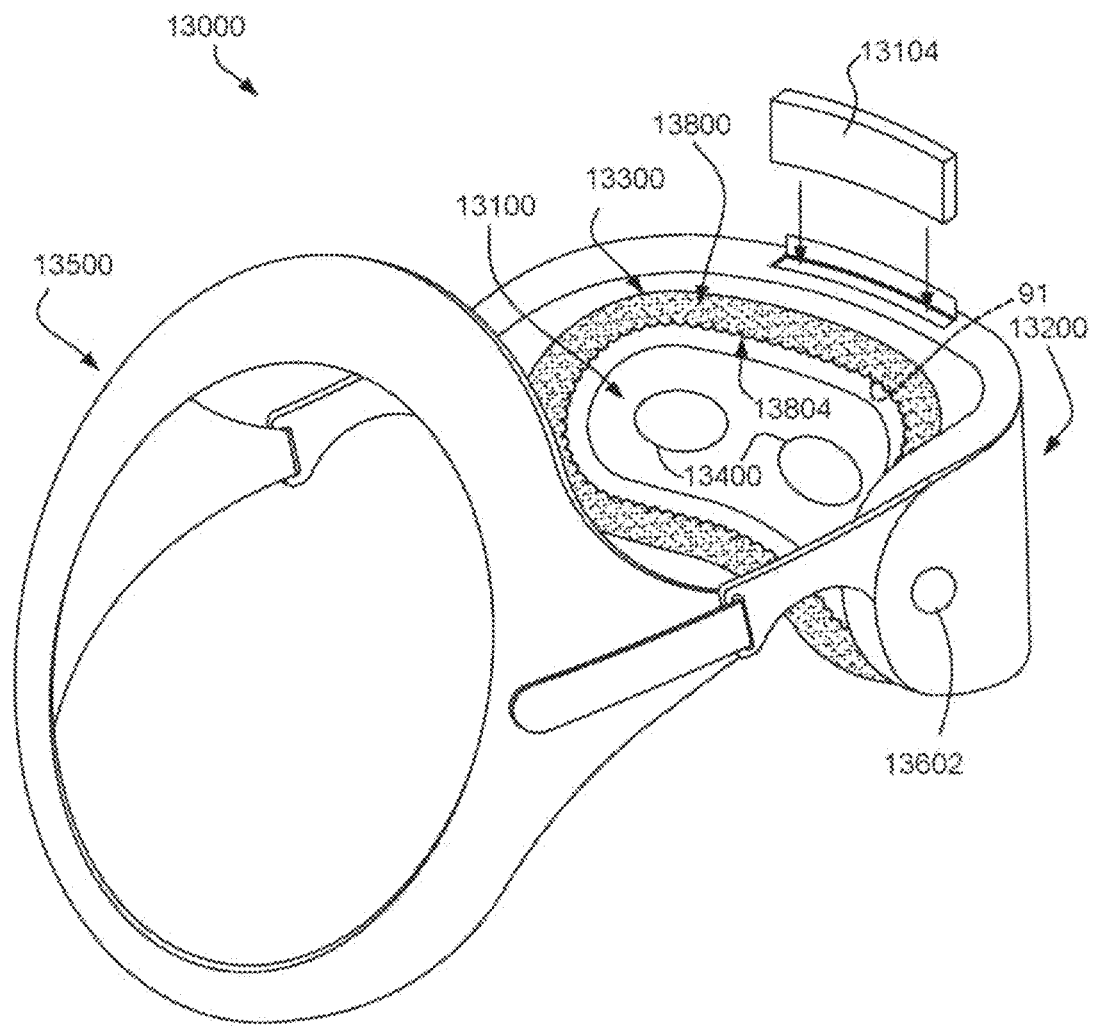

FIG. 89-3 is a perspective view according to an alternate example of the VR head-mounted display apparatus of FIG. 89, illustrating adaptive materials on the head mounted display unit having a bellows configuration in a second position.

Figures 4, 89:
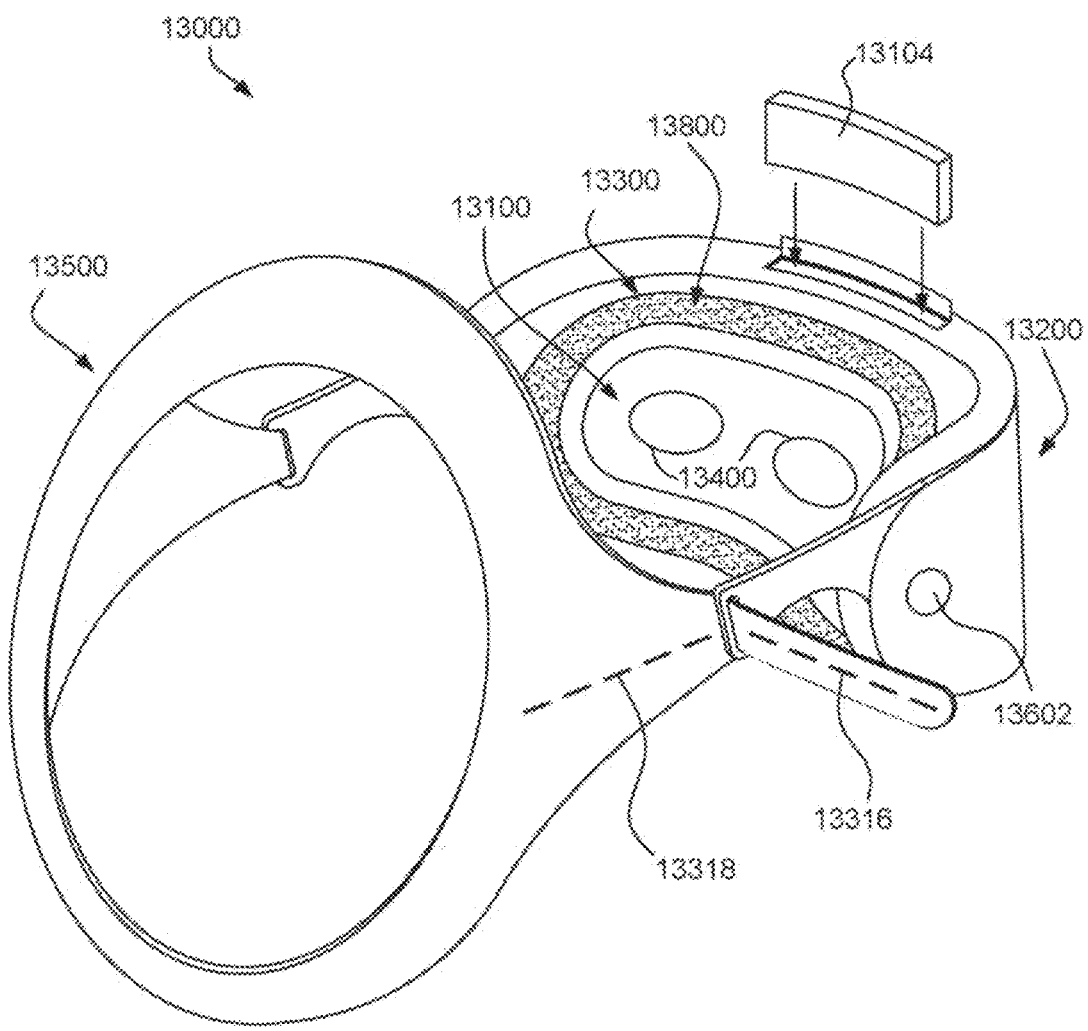

FIG. 89-4 is a perspective view according to an alternate example of the VR head-mounted display apparatus of FIG. 89, illustrating magnetic materials on the positioning and stabilising structure.

Figures 5, 89:
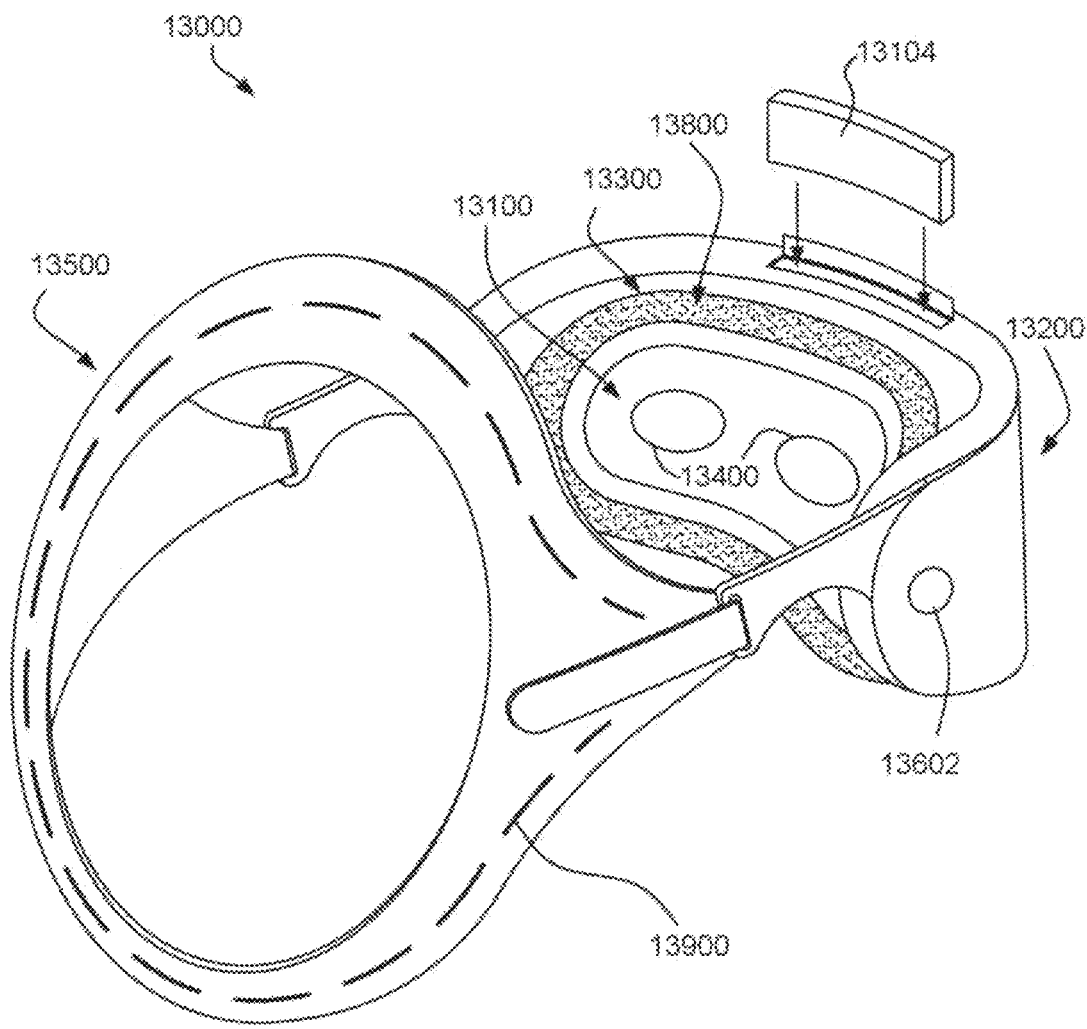

FIG. 89-5 is a perspective view according to an alternate example of the VR head-mounted display apparatus of FIG. 89, illustrating a portion of the positioning and stabilising structure including stiffener threads.

Figure 90:
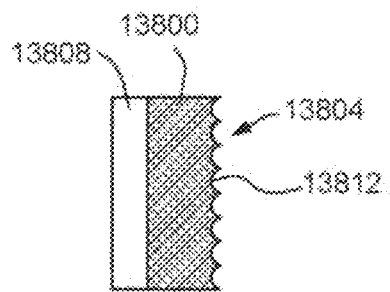

FIG. 90 shows a cross-sectional view of the user interfacing structure of FIG. 89-2. The bellows are made up of a rigid material, an adaptive material, and a textile material. The textile material is on the inner surface of the user interfacing structure.

Figure 91:
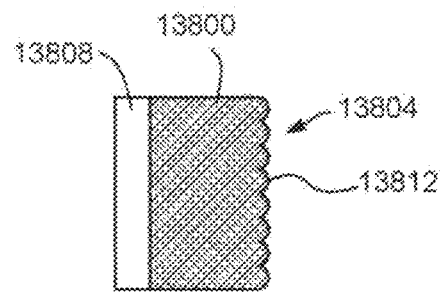

FIG. 91 shows a cross-sectional view of the user interfacing structure of FIG. 89-3. The adaptive material has expanded based on a change in conditions, which caused the bellows to expand.

Figure 92:
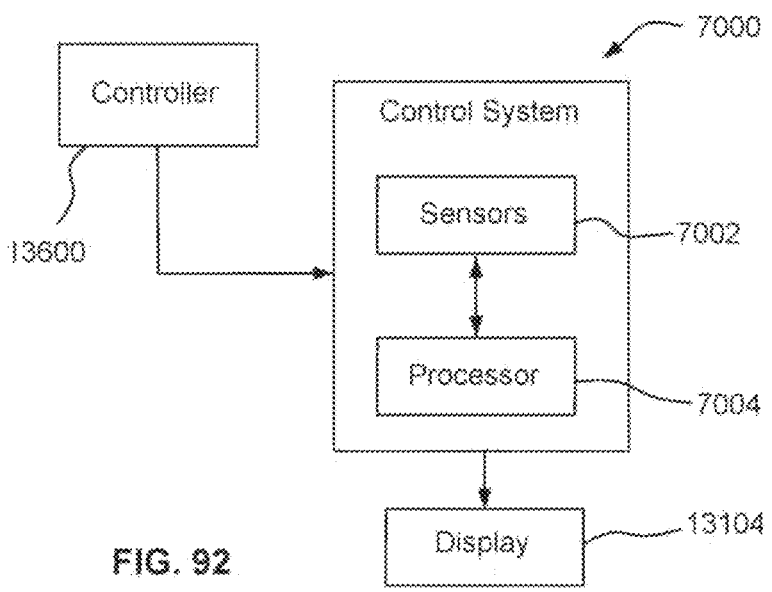

FIG. 92 is a schematic view of a controller and control system according to an example of the present technology.

Figure 93:
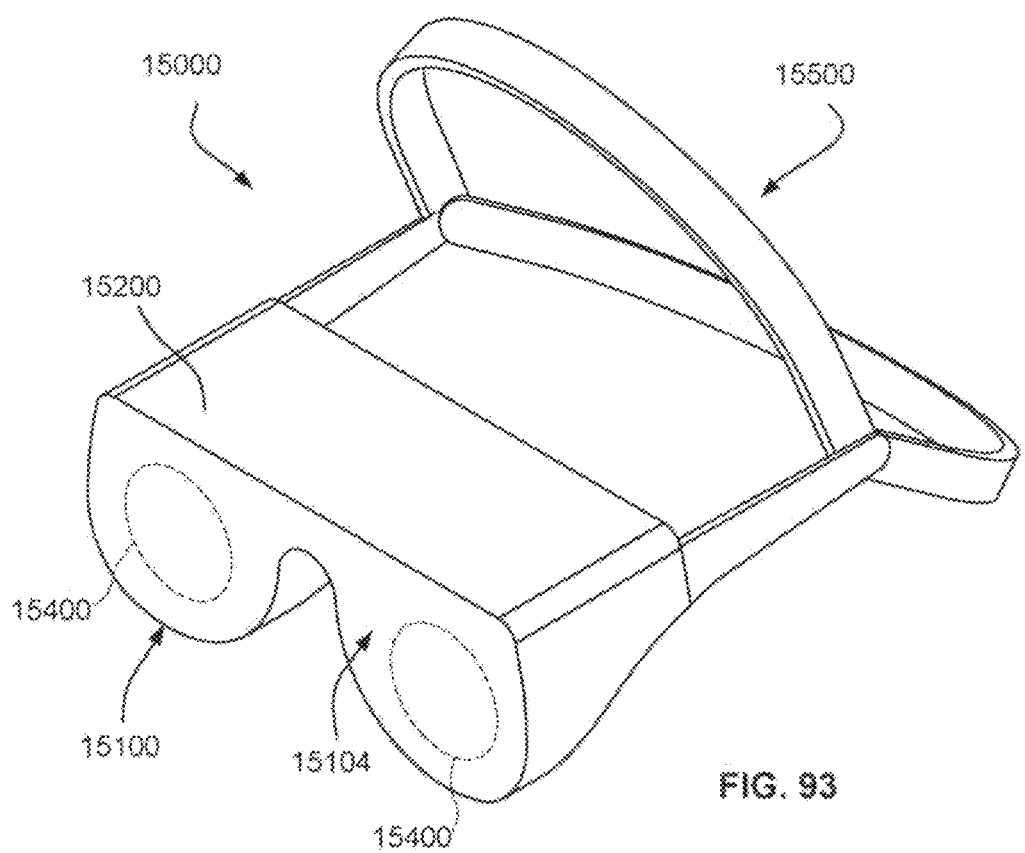
Figures 1, 93:
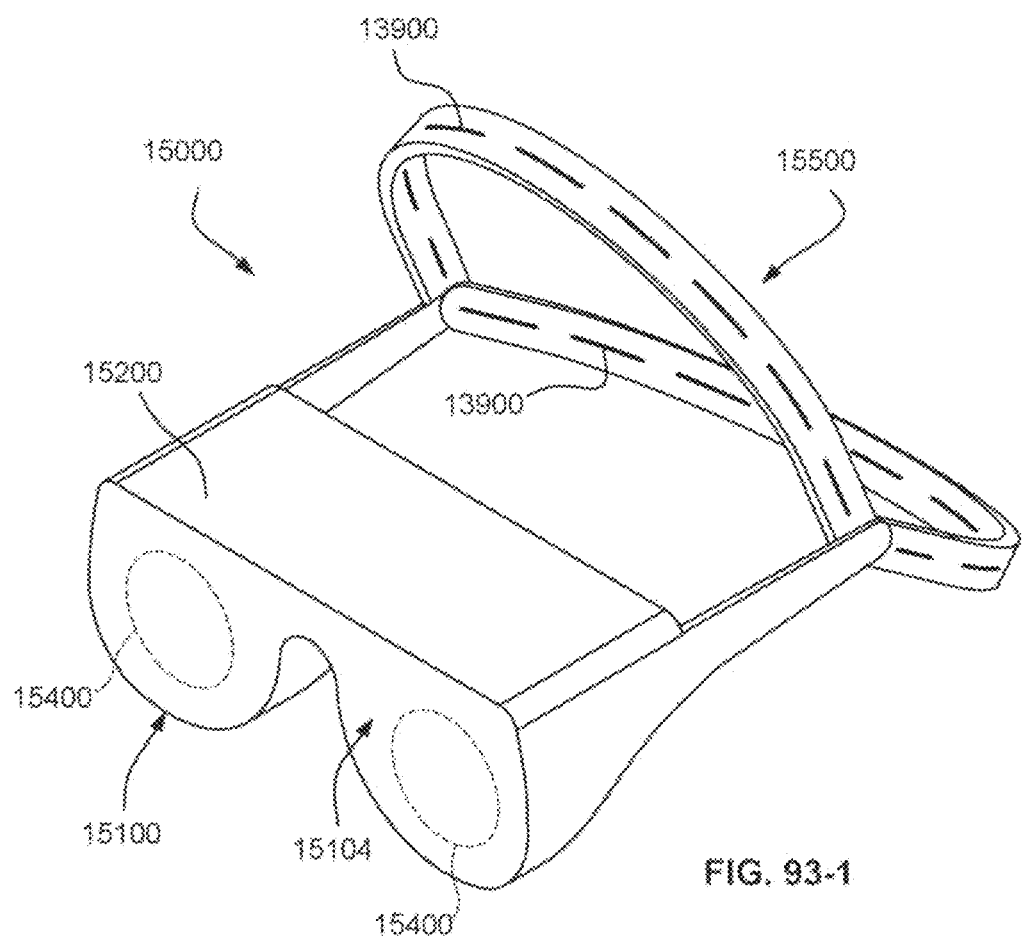
Figures 2, 93:
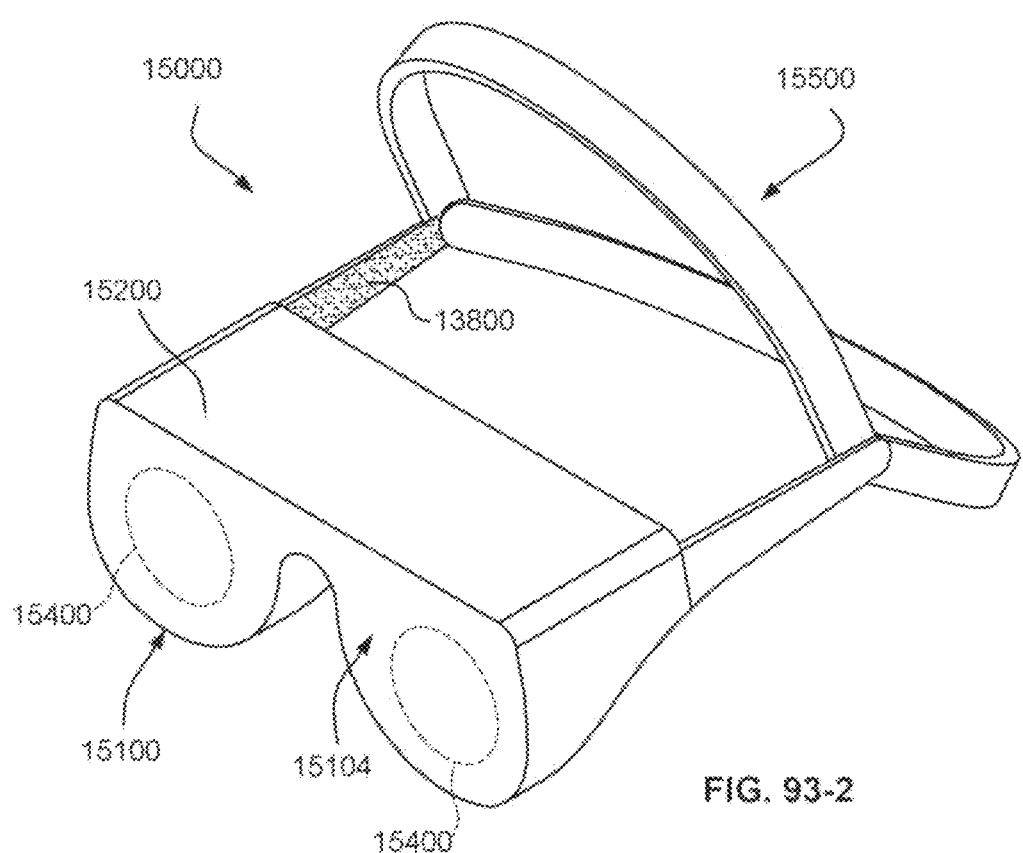

FIG. 93 is a perspective view of an AR head-mounted display apparatus according to an example of the present technology.

FIG. 93-1 is a perspective view of an alternate example of the AR head-mounted display apparatus of FIG. 93, illustrating a portion of the positioning and stabilising structure including stiffener threads.

FIG. 93-2 is a perspective view of an alternate example of the AR head-mounted display apparatus of FIG. 93, illustrating adaptive materials on the positioning and stabilising structure.

Figure 94:
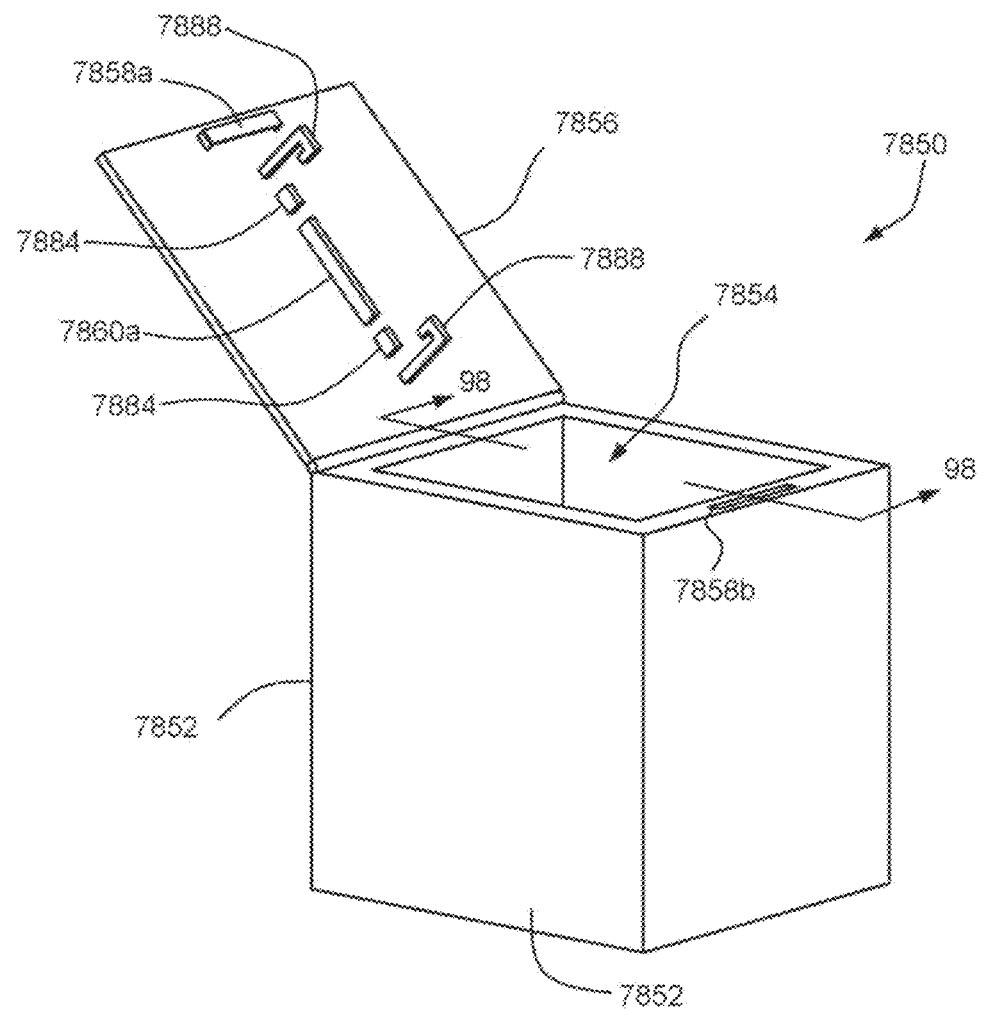

FIG. 94 is a perspective view of a cleaning box for cleaning the head mounted display of FIG. 3a.

Figure 95:
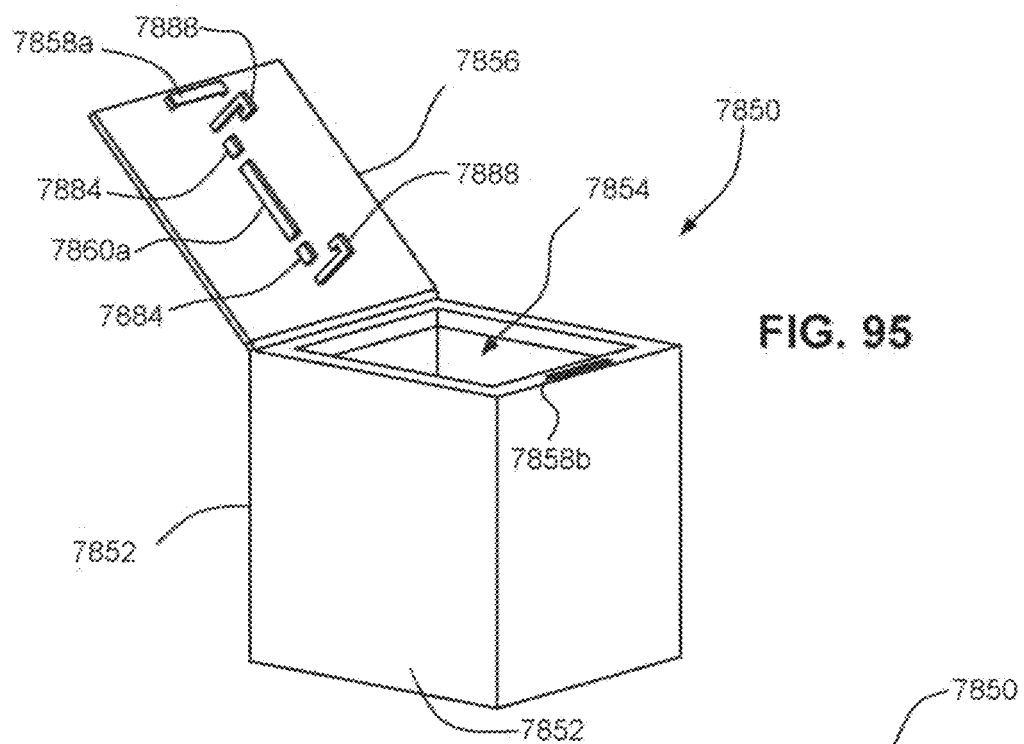

FIG. 95 is a detail view of the cleaning box of FIG. 94, illustrating a latching mechanism between a lid and a wall of the cleaning box.

Figure 96:
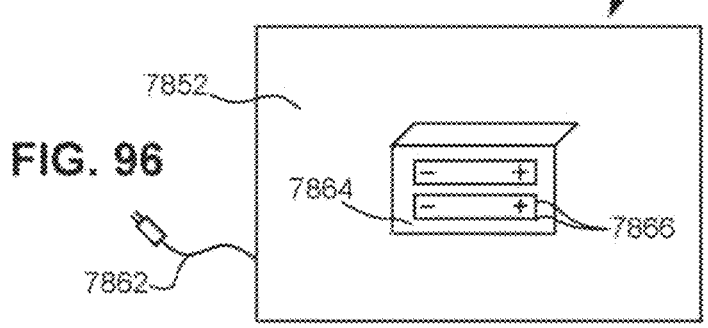

FIG. 96 is a bottom view of the cleaning box of FIG. 94, illustrating an electrical cord and battery compartment.

Figure 97:
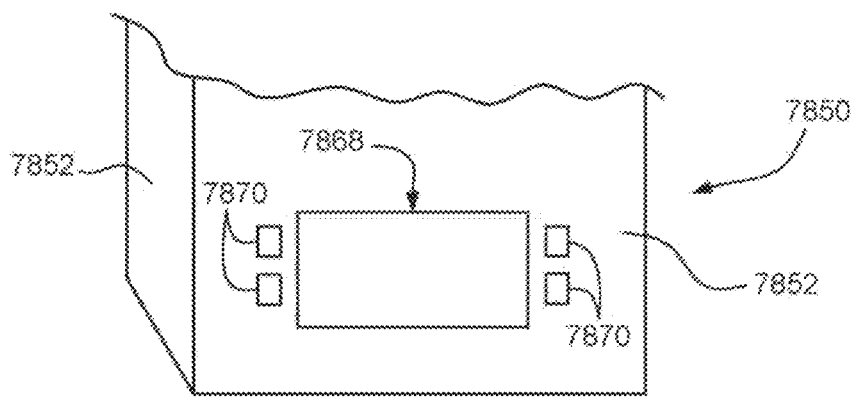

FIG. 97 is a detail view of the cleaning box of FIG. 94, illustrating a control on a wall of the cleaning box.

Figure 98:
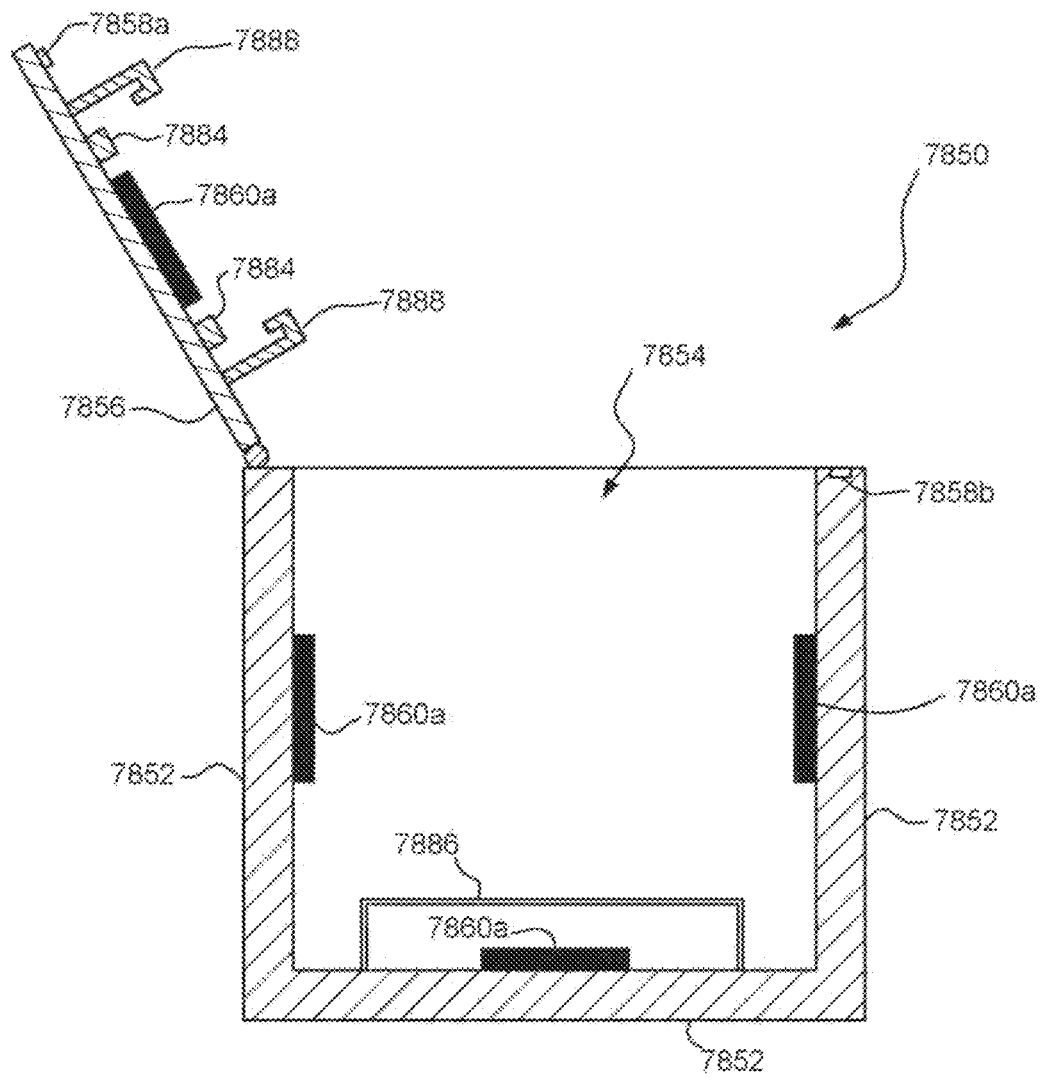

FIG. 98 is a cross-sectional view of the cleaning box of FIG. 94, viewed along line 98-98.

Figure 99:
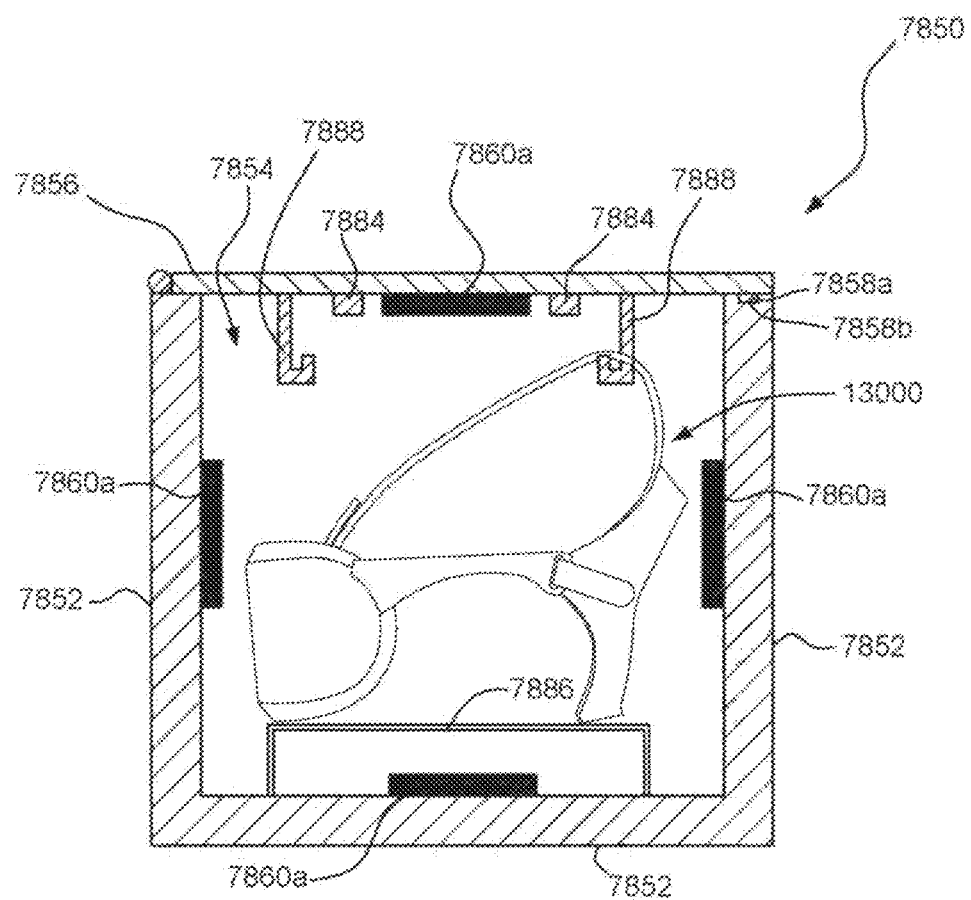

FIG. 99 is a cross-sectional view of the cleaning box of FIG. 94, housing the head mounted display of FIG. 3a to be cleaned.

Figure 100:
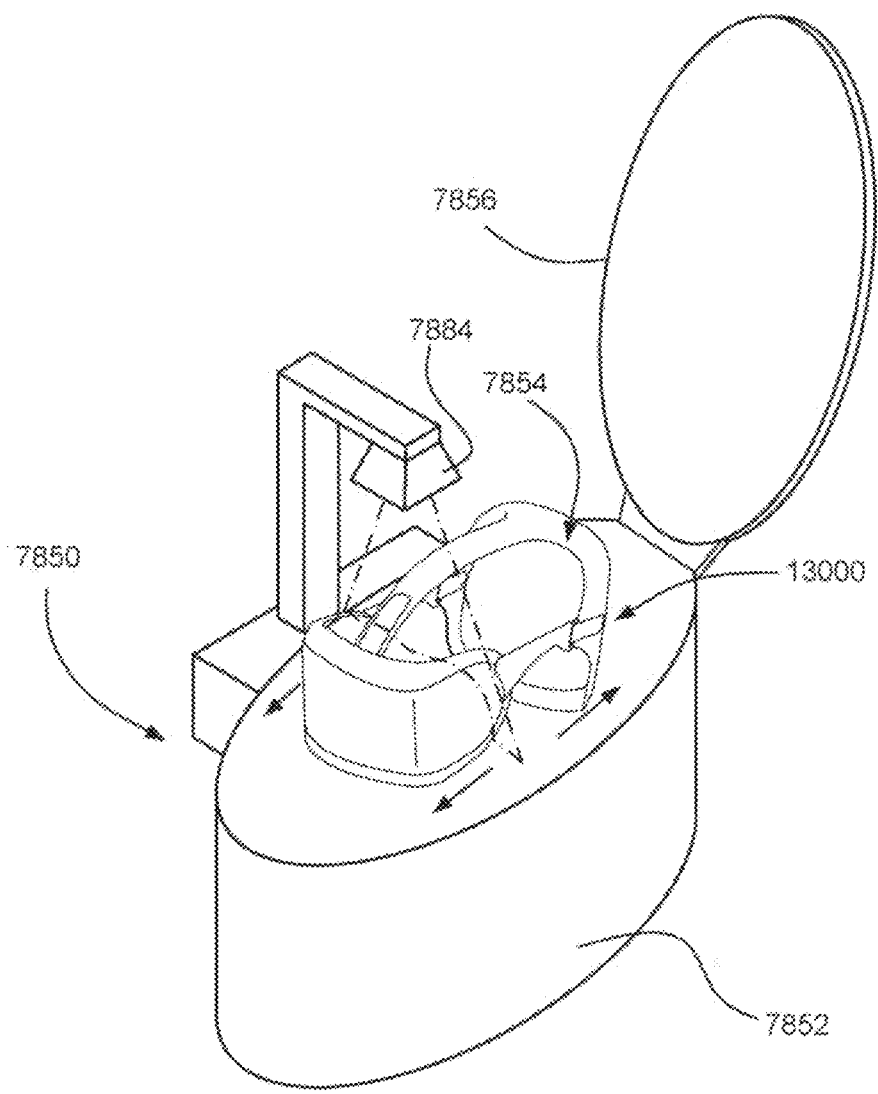

FIG. 100 is a perspective view of a cleaning box according to an alternate embodiment, which includes a sensor for detecting imperfections in a head mounted display system.

5 DETAILED DESCRIPTION OF EXAMPLES OF THE TECHNOLOGY

In the following detailed description, reference is made to accompanying drawings which form a part of the detailed description. It is to be understood that the technology is not limited to the particular examples described herein, which may vary. The illustrative embodiments described in the detailed description, depicted in the drawings and defined in the claims, are not intended to be limiting. The following description is provided in relation to various examples which may share one or more common characteristics and/or features. It is to be understood that one or more features of any one example may be combinable with one or more features of another example or other examples. In addition, any single feature or combination of features in any of the examples may constitute a further example. Other embodiments may be utilised and other changes may be made without departing from the spirit or scope of the subject matter presented. It will be readily understood that the aspects of the present disclosure, as generally described herein and illustrated in the drawings can be arranged, substituted, combined, separated and designed in a wide variety of different configurations, all of which are contemplated in this disclosure.

The head-mounted display system according to examples of the present technology is structured and arranged to provide a balanced system, i.e., not overly tight at any singular point along the user's head and/or face, while providing a substantially complete sealing around the user's eyes, i.e., to provide or facilitate immersion in the use of virtual reality head-mounted displays. That is, the head-mounted display system according to examples of the present technology provides a more even fit that is structured and arranged to distribute pressure (e.g., universal and regional load distribution) in a comfortable stable manner to lessen hot spots or localised stress points.

Also, the head-mounted display system according to examples of the present technology comprises soft and flexible (e.g., elastic) materials (e.g., breathable material, e.g., textile-foam composite) structured and arranged to allow more conformity to the user's head and cushioning for comfort. In addition, the head-mounted display system according to examples of the present technology comprises simple adjustment mechanisms to facilitate adjustment while on the user's head and allow a wide fit range.

5.1 Head Mounted Displays 5.1.1 Positioning and Stabilising Structure

To hold the display unit in its correct operational position, the head-mounted display system further comprises a positioning and stabilising structure that is disposed on the user's head. The positioning and stabilising structures that are comfortable need to be able to accommodate the induced loading from the weight of the display unit in a manner that minimise facial markings and pain from prolonged use. There is also need to allow for a universal fit without trading off comfort, usability and cost of manufacture. The design criteria may include adjustability over a predetermined range with low-touch simple set up solutions that have a low dexterity threshold. Further considerations include catering for the dynamic environment in which the head mounted display may be used. As part of the immersive experience of a virtual environment, user's may communicate, i.e. speak, during while using the head mounted display. In this way, the jaw or mandible of the user may move relative to other bones of the skull. Additionally, the whole head may move during the course of a period of use of the virtual reality display. For example, movement of a user's upper body, and in some cases lower body, and in particular, movement of the head relative to the upper and lower body. Positioning and stabilising structures may be constructed at least partially out of a textile material in order to be comfortable and easier to manufacture, while also providing a substantially universal or adjustable fit. The positioning and stabilising structure may be constructed entirely out of a textile material, or only portions may be constructed out of a textile material. Other portions may be constructed from another material (e.g., a foam, a rigidised material, etc.).

Referring to FIGS. 3a and 3b, disclosed is a first embodiment of a positioning and stabilising structure 14 for a head-mounted display system 10. The head-mounted display system 10 comprises a display unit 12, and the positioning and stabilising structure 14 to maintain the display unit 12 in position on a user's face.

The display unit 12 includes a user interfacing structure 11 constructed and arranged to be in opposing relation with the user's face, i.e., the user interfacing structure is facing or placed opposite the user's face as shown in FIG. 3c. The user interfacing structure 11 extends about a display contained by the display unit housing 22. The user interfacing structure 11 may extend about the display and define a viewing opening (i.e., an opening for viewing) to the display. The user interfacing structure 11 extends around the user's eyes, and may engage (e.g., light sealing) with the user's face, e.g., along the user's nose, cheeks and/or forehead.

In the illustrated version of FIGS. 3a to 3c, the positioning and stabilising structure 14 comprises a rear support hoop 16 (also referred to as a rear support structure) adapted to contact regions of the user's head (e.g., positionable at a crown of the user's head), and at least one connector structured and arranged to interconnect (or connect) the rear support hoop 16 to the display unit 12. In the illustrated example, the at least one connector comprises opposing temporal connectors 18 disposed on respective sides of the user's head that interconnect the rear hoop 16 to respective posterior edge regions 20 of the display unit housing 22, and a forehead support connector 24 that extends across the frontal bone of the user to interconnect (or connect) the support hoop 16 with a superior edge region 21 of the display unit housing 22. However, it should be appreciated that one or more connectors may be provided to interconnect the rear support hoop 16 to the head-mounted display unit 12.

5.1.1.1 Temporal Connectors

The temporal connectors 18 each comprise temporal arms 26, having an anterior end 28 mounted to the posterior edge regions 20 of the housing 22, and a posterior end 30 that forms part of a releasable coupling to connect the temporal arms 26 to the support hoop 16.

In some forms, the temporal arms 26 comprise a rigidiser 32, a resilient (e.g. elastomeric and/or textile) component 34 and tabs 36 arranged at the posterior ends 30 for connecting to the rear support hoop 16. A portion of the temporal arms 26, in-use, are in contact with a region of the user's head proximal to the otobasion superior, i.e. above the user's ear. The arms 26 are arranged in-use to run generally along or parallel to the Frankfort Horizontal plane of the head and superior to the zygomatic bone, i.e. above the user's cheek bone. In some forms, a sleeve (e.g., constructed from comfortable material like textile) may be removably positioned along at least a portion of one or both temporal arms 26. The sleeve may be wider than the temporal arm 26 and may move along the temporal arm relatively easily, and may constructed from magnetic threads (described below), which allow the sleeve to engage the temporal arm 26 (e.g., a magnetic material in the temporal arm).

An advantage of the positioning and stabilising structure 14 is that it is relatively self-supporting and/or able to hold its shape without being worn. This can make it more intuitive or obvious for users to understand how to use the positioning and stabilising structure and may contrast with a positioning and stabilising structure that is entirely floppy and does not retain a shape. In one form the rigidisers provide the self-supporting aspect of the positioning and stabilising structure.

5.1.1.2 Rigidisers

In some forms of the technology, for example in the rigidisers 32, the rigidisers 32 can take the form of stiffened and/or thickened elements. In one form, the rigidisers 32 may be encapsulated within the resilient (e.g. elastomeric and/or textile) component 34 of the temporal arms 26. For example, FIG. 3d shows an example of the resilient component 34 (e.g., elastomeric and/or textile) in the form of a cover configured to encapsulate the rigidiser 32. In this example, the textile component 34 includes a face contacting side arranged on one side of the rigidiser 32 that can provide a soft, face contacting surface 35 adapted to contact the user's face in use. In some alternative forms, the rigidiser may be stitched or otherwise attached (e.g., overmolded) to the resilient component 34, or the resilient component can be made of materials that can be selectively rigidized by heat treatment. For example, FIG. 3e shows an example of the resilient component 34 (e.g., elastomeric and/or textile) attached to a face contacting side of the rigidiser 32 that can provide a soft, face contacting surface 35 adapted to contact the user's face in use. In an example, the resilient component 34 may comprise a textile material or a textile-foam composite (e.g., breathable material, e.g., multi-layered construction including an outer textile layer and an inner foam layer) to provide a soft support for the rigidiser 32 to cushion against the user's head for optimised comfort. In some alternative forms, the rigidiser can be stitched to the resilient component. The rigidiser 32 can allow the arms 26, or other component to which it is connected or formed, to retain an in-use shape and configuration when not worn by a user. Advantageously, maintaining the rigidiser in the in-use state prior to use may prevent or limit distortion whilst the user is donning the positioning and stabilising structure and allow a user to quickly fit or wear the display system 10.

The rigidiser can be made from a rigid material e.g. Hytrel® (thermoplastic polyester elastomer). In the embodiment of FIGS. 3a to 3c, the rigid nature, i.e. inextensibility, of the arm 26 limits the magnitude of elongation or deformation of the arm while in-use. Advantageously, this enables a more effective, i.e. direct translation of tension through the arm.

In another embodiment, the positioning and stabilising structure may be designed so that e.g., the positioning and stabilising structure springs 'out of the box' and generally into its in-use configuration. In addition, the positioning and stabilising structure may be arranged to hold its in-use shape once out of the box, for example a rigidiser may be formed to maintain the shape of some or part of the positioning and stabilising structure. Advantageously, the orientation of the positioning and stabilising structure is made clear to the user as the shape of the positioning and stabilising structure is generally curved much like the rear portion of the user's head. That is, the positioning and stabilising structure is generally dome shaped.

Another aspect of the positioning and stabilising structure described herein is to direct the display unit 12 to direct contact with the user's face, that is, the vectors of the positioning and stabilising structure may cause the display unit to apply pressure perpendicular or normal to the user's face.

In some forms, the rigidiser 32 may form a lever-arm, i.e. a means to pivot, about the rear support hoop 16. Advantageously, the support hoop 16 can provide an anchor point for the positioning and stabilising structure 14, thus forming a pivot point. The rigidiser may articulate about the anchor point of the hoop 16 to enable the forehead support connector 24 to raise or lower the position of the display unit 12 relative to the user's nose. Advantageously, this can minimise the magnitude of clamping pressure required to stabilise the display unit 12 on the user's head.

In some forms of the present technology, as shown in FIGS. 7a and 7b, the rigidiser (e.g. arm 32) may have an arcuate and/or curvilinear shape. For example, the rigidiser 32 may take a crescent or semi-circular shape. In other forms, as shown in FIG. 3a, the rigidiser 32 can take the form of a partial crescent shape.

The rigidiser arm 32 may have a generally elongate and flat configuration. In other words, the rigidiser arm is far longer and wider (direction from top to bottom in the paper plane) than thick (direction into the paper plane). In an example, the thickness and/or width of the rigidiser arm 32 may vary along at least a portion of its length, e.g., rigidiser arm 32 may include wider and thinner sections along its length to facilitate connection and to distribute load.

While the rigidiser arm may be flat as represented in FIGS. 3-5, it will be appreciated that the rigidiser arm may have a desired spatial configuration in the direction into the paper plane (see e.g., FIGS. 6-7), particularly in order to allow improved alignment with the shape of a user's face, such as the shape of a user's head side region (see specifically, e.g., FIG. 7c). Referring to FIGS. 6 and 7a, c, the rigidiser arm has a three-dimensional shape which has curvature in all three axes (X, Y and Z). Although the thickness of the rigidiser arm may be substantially uniform, its height varies throughout its length. The purpose of the shape and dimension of the rigidiser arm 32 is to conform closely to the head of the user in order to remain unobtrusive and maintain a low profile (ie. not appear overly bulky).

The rigidiser arm may have a longitudinal axis which may be understood to be the axis substantially parallel to the paper plane, along which the rigidiser arm extends (see dashed line in FIGS. 5a and 7a as examples).

In some forms of the technology, the rigidiser (such as rigidiser arm 32) is more rigid than the resilient (e.g. elastomeric and/or textile) component 34 and less rigid than the display unit housing 22. In particular, the rigidiser arm and/or the textile component are such that in combination the rigidiser arm imparts a shape, and an increased degree of rigidity in at least one direction or in or around at least one axis, to the resilient component.

The rigidiser may be able to bend or deform along its length but resist or prevent stretching of the positioning and stabilising structure along the longitudinal axis of the rigidiser (see dashed line in FIGS. 5a and 7a). As indicated in FIGS. 5a and 7a, the longitudinal axis of the rigidiser extends along the length of the rigidiser (e.g., generally through its center) and may be straight (FIG. 5a) or curved (FIG. 7a). The rigidiser may be substantially inextensible and resilient. A rigidiser in accordance with the present technology preferably has one or more of the following features: holds it shape, allows components to redirect force vectors around curves such as around the cheeks, or around the ears, ability to flex and/or in certain planes provides a structure to maintain a predefined form.

In one form, the rigidisers can be flexible or able to conform to the user's head along the longitudinal axis of the rigidiser. In one form, the rigidisers, however, cannot flex or deform across their width. This is so that the positioning and stabilising structure is comfortable whilst maintaining its structural function of anchoring the display in position (e.g., rigidiser is flexible in one direction (into the user's head) while provide support or load bearing in another direction).

In some forms, the rigidiser 32 may have bows or bends. Bends may be provided in select region(s) of rigidiser to allow the rigidiser 32 to readily flex or hinge at the region(s). Bends may be weakened regions to achieve a flexibility in the rigidiser 32 so that the weakened portions act as live hinges. This may be beneficial for fitting a larger range of user head sizes. The bends may be positioned so as to allow portions of the rigidiser 32 to flex outwards towards the ears of the user or inwards towards the centre of the user's head.

In some forms, the rigidiser 32 comprises a plurality of slots (e.g. on each side of the arm, i.e., slots on anterior and posterior sides of the arm) forming a plurality of hinges along the component (such as temporal connector 18). The hinges form flexible portions in each arm. The hinges allow the arms to articulate and conform to micro variations of the cheek region and distribute load on the face more evenly upon headgear tension, e.g., when compared to a rigidiser arm without any flexible portions. In some forms, where the rigidises are elongate extending in a general longitudinal direction, the hinges and/or weakened regions may extend transverse to the longitudinal direction or may extend in the longitudinal direction to increase the degree of conformity allowed.

The slots are generally parallel to one another, generally evenly spaced apart from one another, and include similar widths and depths into the thickness of the arm. However, it should be appreciated that the slots may include other suitable arrangements and configurations to modify the location and flexibility characteristics of the arm, for e.g., number of slots, slots on one or both sides of the arm (anterior and/or posterior sides), spacing between slots, width, depth, orientation or angle of slot on the arm (e.g., slots angled relative to one another to provide bending in different orientations). In an example, one or more of the slots may be filled with a flexible material. In an alternative example, the hinge may be provided by a plurality of flexible sections (e.g., flexible section formed by a flexible or bendable material) spaced apart by rigid segments.

In some forms, the rigidiser may be comprised of a material to guide or define the direction or path of stretch for the resilient (e.g. elastomeric and/or textile) component, i.e. of the hoop 16. In other words, the user stretches the positioning and stabilising structure 14 in a direction substantially parallel to the longitudinal axis of the rigidiser 32 (see dashed line in FIG. 7a). Stretching of the positioning and stabilising structure in other directions leads to rotation of the rigidiser relative to the display unit housing 22 which is undesirable. The rigidity of the rigidiser biases the rigidiser towards its natural, unrotated, untwisted and undeformed state. To some degree, this enables the positioning and stabilising structure 14 to be a self-adjusting head-mounted display system. In an example, the rigidiser may be biased to a particular size (such as a relatively small fit), and the rigidiser can adjust to the user's head such as by opening up or flexing outwardly to scale head size, thereby conforming to the shape of the user's head and providing support as required.

In some forms, a resilient (e.g. elastomeric and/or textile) component may be encapsulated by rigidiser. For example, a textile may be over-moulded onto one side of the rigidiser (e.g., see FIG. 3e). The rigidiser may be encapsulated within a suitable resilient (e.g. elastomeric and/or textile) material to improve user comfort and wearability (see e.g., FIG. 3d). The textile may be arranged on the user contacting side of the rigidiser to provide a soft contact with the user's skin.

In some forms, the rigidiser may be formed separately to the resilient component and then a sock (e.g., a cover or an enclosure) of user contacting material (e.g., Breath-O-Prene™) may be wrapped or slid over the rigidiser. In alternative embodiments, the user contacting material may be provided to the rigidiser by adhesive, ultrasonic welding, sewing, hook and loop material, and/or stud connectors. In an embodiment, the user contacting material (e.g., a soft or comfortable material (e.g., Breath-O-Prene™) may be on both sides of the rigidiser, or alternatively may only be on the user contacting side of the rigidiser to reduce bulk and cost of materials.

The rigidiser may also be formed by a layer of additional material applied to the resilient component, such as silicone, polyurethane or other tacky material, which may be applied to the resilient component to reinforce the component. Silicone beading or polymeric over-moulding may also be used.

The rigidiser may have composite construction with two or more materials (e.g., rigid or semi-rigid materials). For example, the rigidiser may be constructed by thickening or treating a textile such that it is stiffer or impedes the stretch of the material. In a specific example, the textile may be printed on such that the ink from the print restrains or reduces the capacity of the textile to stretch. Additionally, the textile may be stitched in selected regions to stiffen it. Also, the textile may be ultrasonically welded in selected regions to stiffen it.

In some alternative forms, the rigidiser may be constructed from a non-woven material, for example netting, such that it is resistant to stretching in at least one direction. The rigidiser may alternatively be formed from a woven material, where the grain of the material is aligned such that the textile may not stretch in the lateral direction (e.g., when positioned on the user's head) to secure and anchor the positioning and stabilising structure in position on the user's head.

In an example, the rigidiser can be formed from Hytrel® and the display unit housing 22 may be formed from polypropylene (PP). PP is a thermoplastic polymer with good resistance to fatigue. Hytrel® is desirable for forming the rigidiser 32 because this material is resistant to creep. Since these materials cannot be integrally bonded the housing may be overmolded to the rigidiser, in this example, to form a secure connection, i.e. a joint between the anterior end 28 of the arm 26 and the posterior edge regions 20 of the housing 22.

In alternative forms, the rigidiser (such as the rigidiser arm) may be made from thermoplastic elastomer (TPE) which provides high elastic properties. For example, a Dynaflex™ TPE compound or Medalist® MD-1 15 may be used. The housing may be made from polypropylene (PP) material. An advantage of the rigidiser being moulded in TPE may be that it enables the rigidiser and the housing to be permanently connected to each other. In other words, a fusion bond or chemical bond (molecular adhesion) is formed between the two components.

The joint that connects rigidiser to the housing may provide a targeted point of flexibility and the joint may be shaped and formed to allow flexing in a desired direction and degree. Thus, once the user interface is donned and the temporal arms 26 are stressed by tension from the hoop of the positioning and stabilising structure 114 the rigidiser 32 may flex at the joints to allow them to retain a face framing shape while helping to retain the temporal arms 26 in a desired position relative to the user's face.

Although the rigidiser and display unit housing have been described as permanently connected to each other, it is envisaged that the rigidiser (i.e. temporal arm 26) may be detachable from the housing, for example, by a mechanical clip (e.g., snap-fit) assembly. The straps of the positioning and stabilising structure may also be connected to the temporal arm with a clip, hook, or similar mechanical fastener. Alternatively or addition, magnetic fasteners (e.g., magnetic thread) may be used to connect the straps to the temporal arm. The length of the straps may be adjustable so that the straps and temporal arms may be connected in a length adjustable fashion. This arrangement may provide a modular system with exchangeable display units and/or positioning and stabilising structures.

5.1.1.3 Rear Support Hoop

The rear support hoop 16 may have a ring-like form (as best shown in FIG. 7*b*) and be arranged to have a three-dimensional contour curve to fit to the shape of a user's head (e.g., the user's crown). In an example, the support hoop provides a hoop-like or ring-like arrangement (e.g., closed loop) adapted to enclose or encircle a portion of the user's head therebetween. It should be appreciated that the support hoop is not limited to a circular or round shape, e.g., support hoop may be oval or part circular/oval or C-shaped. In some forms, the rear support hoop 16 may comprise a parietal portion 38, which may be in proximity to the parietal bone of head when in use, and an occipital portion 40, being in proximity to the occipital bone when in use. In an example, the occipital portion 40 is preferably arranged along a portion of the occipital bone when in use, e.g., along a portion of the occipital bone adjacent or near a junction where the neck muscles attach to the occipital bone, and the parietal portion 38 is preferably arranged rearward of the coronal plane when in use. In an example, the occipital portion 40 is adapted to be positioned along a portion of the occipital bone and above a junction where the neck muscles attach to the occipital bone. The junction may also be referred to as the external occipital protuberance (EOP). However, the exact location of the occipital portion 40 on the user's head may vary depending on the size and shape of the user's head with which the occipital portion 40 is being used, e.g., the occipital portion 40 may be positioned adjacent to, above, or below a portion of the occipital bone where the neck muscles attach to the occipital bone. In an example, the occipital portion 40 may be arranged beneath or underneath the occipital bone near the junction where the neck muscles attach. This hoop-like arrangement (e.g., ring-like, circular or oval or part circular/oval or C-shaped) of the rear support hoop 16 anchors the positioning and stabilising structure 14 around the rear or rear bump of the user's head, which provides an effective support structure to hold weight (i.e., the display unit) at the front of the user's head. The rear support hoop 16 may be formed from an elastic material, which elasticity may be used to stretch the hoop and securely hold the rear support hoop 16 in position.

In some forms, the three-dimensional shape of the support hoop may have a generally round three-dimensional shape adapted to cup the parietal bone and occipital bone of the user's head in use.

In some forms, the occipital portion 40 engages with the occipital bone in order to maintain the occipital portion 40 and the rear support hoop 16 in position and prevent the positioning and stabilising structure from riding up the back of the user's head in-use. Further, the parietal portion 38 could capture or pass over the upper part of the user's parietal bone in-use, so as to prevent the positioning and stabilising structure from slipping back down the user's head in-use.

In some forms, the hoop 16 further comprises connection straps or tabs 42 (see e.g., FIG. 3*a*).

In some forms, the rear support hoop 16 is orientated in a generally vertical direction, i.e. arranged in a vertical plane generally parallel to the coronal plane. This arrangement of the rear support hoop 16 appropriately orients the rear support hoop 16 at the crown of the user's head to support the transverse (e.g., horizontal) tension applied by the connection straps 42 and support the weight of the display unit 12, in-use, at the anterior of the user's head.

In some forms, the rear support hoop 16 and straps 42 may be formed from an elastic and/or textile material to assist conforming to the shape of a user's head (e.g., the rear support hoop 16 and/or connection straps 42 provide stretch capacity). Also, such elastic and/or textile material at the back of the user's head may allow easier lifting of the display unit 12 away from the user's face (e.g., to move the display unit 12 away from the user's eyes to talk to someone while the positioning and stabilising structure 14 remains on the user's head). For example, the support hoop 16 may be a neoprene material, or other textile-foam composite (e.g., a breathable material with a multi-layered construction including at an outer textile layer and an inner foam layer), or spacer fabric. Advantageously, textiles can provide a soft support structure to stabilise the display unit 12 on a user's head and allow the positioning and stabilising structure 14 to cushion against the user's head for optimised comfort.

In some forms, the rear support hoop 16, including portions of the temporal arms 26, may be stretchable (e.g., elastically deformable). This may enable the positioning and stabilising structure 14 to be stretched which leads to a comfortable (or relatively flat) force-displacement (or extension) profile. In an example, when the positioning and stabilising structure 14 is stretched apart under load L, the strain force can be substantially evenly spread across the positioning and stabilising structure 14. Consequently, the positioning and stabilising structure 14 has a relatively flat force (y-axis) vs. displacement (x-axis) profile, thereby illustrating that the force does not change much when the positioning and stabilising structure 14 is extended, particularly when compared to a prior art structure.

5.1.1.4 Adjustable Straps

The straps or tabs will be understood to be a structure designed to resist tension. In use, a strap 42 is part of the positioning and stabilising structure 14 that is under tension. In certain forms of the present technology, the strap 42 can be bendable and e.g. non-rigid. An advantage of this aspect is that the strap is more comfortable for a user to tension against their head.

Some straps will impart an elastic force as a result of this tension, as will be described. The straps of the positioning and stabilising structure 14 provide a retention force to overcome the effect of the gravitational force on the display unit 12. In this way, a strap may for part of the positioning and stabilising structure to maintain a light-sealing position of the display unit on the user's head.

In some forms the positioning and stabilising structure 14 provides a retention force as a safety margin to overcome the potential effect of disrupting forces on the user interface in-use, such as from head and body movement, or accidental interference with the display unit. The strap may be configured in-use to direct a force to draw an interfacing surface of a display unit 12 into sealing contact with a portion of a user's face. In an example the strap may be configured as a tie.

In the form of FIGS. 3*a* to 3*c*, the connection straps 42 are adjustable (e.g., in a length adjustable fashion) and operate to change the distance between the rear support hoop 16 and the display unit housing 22. The connection straps 42, in use, are threaded through an eyelet 44 in each end region 36 (e.g., a tab) of a respective temporal arms 26. The length of each connection strap 42 between the end regions 36 of opposing temporal connectors 18 may be adjusted by pulling more or less of the strap 42 through one or both of the eyelets 44. The strap 42 may be secured to itself after passing through the eyelets in the tabs 36, for example, with hook-and-loop fastening means, which allows fine or micro adjustment of the straps for comfort and fit (e.g., tightness). The rear support hoop 16 therefore is able to be adjusted to fit around different head sizes. Such adjustable strap arrangement also allows adjustment while the display unit 12 is on the user's head, e.g., user can pull straps 42 to posteriorly tighten.

In an example, the thickness and/or width of the rear support hoop 16 and/or the straps 42 may vary along at least a portion of its length. For example, the rear support hoop 16 may include wider and thinner sections along its length, e.g., wider sections adjacent the straps 42 to facilitate connection to the temporal arms 26 and to distribute load. Also the straps 42 may be thinner along its free end to facilitate threading through the eyelet 44 in the respective temporal arm 26.

In some arrangements not shown, the straps or rigidiser provide a press stud arrangement in a length adjustable fashion in order to change the surface area of a strap that may contact a user's head. For example, the rigidiser may include a portion with a plurality of holes and one end of strap 42 may provide a stud (e.g., over-moulded or sonically welded to the strap) adapted to be press fit into a selected one of the holes. The stud and holes are configured to provide a snap-fit arrangement. In other forms, the strap could be secured to itself with an arrangement of holes and studs.

In some arrangements, an adjustment mechanism is provided for adjusting the distance between the rear support hoop 16 and the display unit housing 22 (e.g., the adjustment mechanism connects the rear support hoop 16 and the display unit housing in a length adjustable fashion). The rigidisers may comprise an aperture to loop the strap 42 therethrough so as to form a looped portion of the strap 42. The rigidisers may be provided with a push-tab that is pre-loaded or biased with spring so as to allow for engagement and disengagement of the looped through portion of the strap 42. A gripping portion may be provided on an opposite side of the aperture to the push-tab for the user to stabilize the positioning and stabilising structure on their face. The gripping portion may prevent disassembly of the looped portion by preventing it from pulling back through aperture.

In certain forms of the present technology, more than one positioning and stabilizing structure 14 is provided, each of the positioning and stabilising structures being configured to provide a retaining force to correspond to a different size and/or shape range. For example, one form of positioning and stabilising structure 14 may be suitable for a large sized head, but not a small sized head, and another form of positioning and stabilizing structure may be suitable for a small sized head, but not a large sized head. As such, the display unit may be provided with a set of different positioning and stabilizing structures that caters to a different size and/or shape range. Advantageously, the display unit is versatile and may be better fitting and comfortable.

5.1.1.5 Modifications to Rear Support 5.1.1.5.1 Extended Rigidiser

FIGS. 5*a*-5*c* show a support for a head-mounted display system or assembly 210 according to a third example of the present technology. Like reference numerals denote similar or like parts to FIGS. 3*a* to 3*c* with the addition of 200 to allowing distinguishing between embodiments. In a third embodiment, the support for a head-mounted display assembly 210 does not comprise the forehead support (e.g., the display unit 212 and the user interfacing structure 211 are supported by a positioning and stabilising structure 214 without any forehead support connector or forehead support straps).

FIG. 6 shows a support for a head-mounted display system or assembly 310 according to a fourth example of the present technology. In a fourth embodiment as shown in FIG. 6, like reference numerals denote similar or like parts to FIGS. 3*a* to 3*c* with the addition of 300 to allowing distinguishing between examples. The support for a head-mounted display 310 assembly comprises opposing temporal connectors 318, each having a temporal arm 326 with an extended rigidiser 358. Each extended rigidiser 358 may be extended from the temporal arms 326 to the rear support hoop 316 to enhance support of the display unit 312, in use. Each extended rigidiser 358 can be extended along a portion of the rear support hoop 316 and into both the parietal 338 and occipital 340 portions (e.g., to generally take a Y-shaped form as shown in FIG. 6). Alternatively, each extended rigidiser 358 may as shown only extend along one of the parietal portion 338 or the occipital portion 340 (e.g., only extend along the occipital portion 340 as discussed later in FIG. 7*a*). In the example of FIG. 6, the parietal and occipital portions of the extended arms of the rigidiser 358 are provided along the parietal portion 338 and occipital portion 340 of the rear support hoop 316 and positioned proximal to (e.g., overlaying) the parietal and occipital bones of the user's head to support respective portions of the hoop 316.

The extended rigidisers 358 may increase the length of the connectors 318 so as to increase the lever-arm moment created about the rear support hoop 316. In use, the larger lever-arm extends the moment of inertia further rearward of the user's head when compared with the first and second embodiments. Advantageously, this can provide more comfort to the user by decreasing the tension applied to the forehead support connector to support the display unit 312.

Additionally, the extended arms 358 may provide a more even distribution of pressure on the user's head under the weight of the display unit 312 and any clamping force applied by tension induced in the positioning and stabilising structure 314.

In some forms, the extended arms can help prevent the rear support hoop 316 of the positioning and stabilising structure 314 from translating vertically upwards (e.g., riding upwards on the user's head when tensioning the forehead support connector 324). The extended arm 358 can more effectively secure the occipital portion 340 of the hoop beneath the corresponding occipital bone (e.g., along a portion of the occipital bone adjacent a junction where the neck muscles attach to the occipital bone) of the user's head.

In other words, the occipital portion 340 of the extended rigidisers 358 engages with the occipital bone in order to maintain the occipital portion 340 and the rear support hoop 316 in position when in-use. Further, the parietal portion 338 of the extended rigidisers 358 could capture or pass over the upper part of the user's parietal bone in-use, so as to prevent the positioning and stabilising structure from slipping back down the user's head when in-use.

In an example, each of the parietal 338 and occipital 340 portions may have different elastic properties so as to provide increased stability to the positioning and stabilising structure on the user's face in-use.

In an example, the parietal portion 338 may be constructed from an extensible material to allow for adjustment of the positioning and stabilising structure when in-use. For example, the parietal portion 338 may be made from an elastic material (e.g., capable of elastic deformation). The extensibility provided by the elastic parietal portion may allow for a greater fit range of users. Additionally, the occipital portions 340 may be made from a material with lower extensibility than that of the parietal portion 338. That is, the occipital portions 340 may be constructed of a material with less stretch for a given force when compared to the material used for the parietal portion 338. This is to secure the positioning and stabilising structure in position while allowing for some adjustment of the display unit position on the face of the user.

5.1.1.5.2 Biased Extended Rigidiser

FIGS. 7a-7c show a variation of the fourth example in FIG. 6. In this example, each of the temporal arms 326 comprises a biased extended rigidisers 360. Each biased extended rigidisers 360 may extend from the temporal arms 326 to the occipital portion 340 portions of the rear support hoop 316 (e.g., to generally take a J-shaped form) so as to enhance support of the display unit 312, in use.

The biased extended rigidisers 360 extend along and/or below at least a portion of the occipital bone of the user's head (e.g., along a portion of the occipital bone adjacent a junction where the neck muscles attach to the occipital bone) to securely anchor the positioning and stabilising structure 314 so as to support the device unit 312 above the user's nose and cheek.

As best shown in FIGS. 7a and 7c, the biased extended rigidisers can further comprise a medial and temporal adjustment mechanisms 362, 364. The medial adjustment mechanism 362 may be adapted to connect a first biased extended rigidiser 360 to a second biased extended rigidiser 360, such that the medial adjustment mechanism 362 is located between the first and the second medial adjustment mechanisms 362. The medial adjustment mechanism 362 may have an adjustable length, thereby controlling the distance between the opposing arms of the rigidisers 360. The medial adjustment mechanism 362 can be mounted about the medial region of the occipital portion of the biased extended arms 360. The adjustment mechanism can be a strap threaded through opposing holes 363 in each of the posterior ends 368 of the opposing arms 360. The distance between the opposing arms can be controlled by pulling more or less of the strap through the tabs.

The temporal adjustment mechanism 364 can be disposed on each temporal arm 326, along the temporal region of the user's head. The temporal adjustment mechanism 364 can be adjustable and operate to change the distance between the biased extended rigidisers 360 and the display housing 322.

The biased extended rigidisers may be formed from a flat component and then bent or deformed into a shape suitable for use. For example, the rigidiser 360 may be die cut from sheet material.

5.1.1.6 Adjustable Support Hoop and Offset Configuration

Referring to FIGS. 9a to 10c, disclosed is a further example of a positioning and stabilising structure 514 for a head-mounted display system 510 for the present technology. The head-mounted display system 510 comprises a display unit 512, and the positioning and stabilising structure 514 to maintain the display unit 512 in position on a user's face.

The positioning and stabilising structure 514 comprises a support hoop 516 that is positionable between a frontal bone and a temporal bone of the user's head, and opposing connectors 518 disposed on respective sides of the user's head that interconnect the hoop 516 to respective posterior edge regions 520 of the display unit housing 522. In the illustrated form, the connectors 518 connect to a portion of the support hoop 516 at a location closer to the mid coronal plane, as compared to the anterior coronal plane of the head, when in use.

The connectors 518 each comprise arms 526, having an anterior end 528 mounted to the posterior edge regions 520 of the housing 522, and a posterior end 530 that forms part of a coupling 564 to connect the arms 526 to the support hoop 516.

The support hoop 516 can have a three-dimensional contour curve to fit or conform to the shape of a user's head. The support hoop 516 comprises a frontal portion 538 (also referred to as a front support portion or anterior support portion), arranged to generally locate on, or between, either of the frontal bone or parietal bone (e.g., to contact an anterior region of the user's head), and an occipital portion 540 (also referred to as a back support portion or posterior support portion), being arranged to generally locate on, or between, either of the occipital bone or parietal bone (e.g., to contact a posterior region of the user's head). The occipital portion 540 is preferably arranged along and/or beneath at least a portion of the occipital bone (e.g., along a portion of the occipital bone adjacent a junction where the neck muscles attach to the occipital bone), and the frontal portion 538 is preferably arranged forward of the coronal plane extending through the otobasion superior. In the illustrated example, the frontal portion 538 and the occipital portion 540 extend transverse to the sagittal plane. For example, as shown in FIGS. 10a to 10c, the frontal or anterior support portion 538 of the support hoop 516 is adapted to extend or lie in a plane 539 and the occipital or posterior support portion 540 of the support hoop 516 is adapted to extend or lie in a plane 549, and each of the plane 539 and the plane 549 is adapted to extend transverse to the sagittal plane. In an example, the plane 549 may be referred to as a first plane, and the plane 539 may be referred to as a second plane, merely to distinguish between the planes 549, 539. That is, although the terms "first" and "second" may be used, unless otherwise specified, they are not intended to indicate any order but simply utilised to distinguish between distinct elements, e.g., planes.

In some forms, the frontal portion 538 and occipital portion 540 can be rigid components and comprise adjustment mechanisms 562. In particular, the rigid components of the frontal portion 538 and the occipital portion 540 may be in any of the form of rigidisers or rigidiser arms as previously described. In an example, the frontal portion 538 and/or the occipital portion 540 may comprise a plurality of slots (e.g., on one or both sides of the frontal portion 538 and/or the occipital portion 540) forming a plurality of hinges along the component, e.g., see slots 543 in the occipital portion in FIGS. 9a and 9b. The hinges form flexible portions in the frontal portion 538 and/or the occipital portion 540. The hinges allow the frontal portion 538 and/or the occipital portion 540 to articulate and conform to micro variations of the user's head and distribute load on the head more evenly.

In some forms, the adjustment mechanism 562 can be disposed on either one or both the rigidiser arms, and/or at a connection point between the frontal portion 538 and occipital portion 540. In some alternative forms, the adjustment mechanism can be disposed on either the connector arms or at the connection point between the frontal and occipital portion. The adjustment mechanism 562 can be adjustable and operate to move the frontal portion 538 and occipital portion 540 relative to each other. In some forms, the adjustment mechanism can be adjustable and operate to change the distance or displacement (e.g., offset) between planes 539, 549 of the frontal portion 538 and occipital portion 540 (see e.g., FIG. 10b). In some forms, the adjustment mechanism 562 can be adjustable and operate to change the angle between the frontal portion 538 and occipital portion 540.

In some forms, the frontal portion 538 and occipital portion 540 may articulate about the adjustment mechanism 562 of the support hoop 516 to enable the frontal portion 538 to, for example, rotate forward or rearward relative to the coronal plane, and the occipital portion 540 to raise or lower relative to the Frankfort horizontal.

In some forms, the frontal portion 538 and occipital portion 540 may be articulated to adjust the distance between the frontal portion 538 and occipital portions 540. The adjustment mechanism 562, in some forms, may comprise a sliding assembly where at least one of the frontal or occipital portions 538, 540 are slidable between an in-line position and at least one offset position. In the in-line position the frontal portion 538 lies co-planar with the occipital portion 540. In the at least one offset position, the frontal portion 538 lies in an offset plane (i.e., not co-planar) to the occipital portion 540. The offset plane may or may not be a parallel plane to the occipital portion 540.

The adjustment mechanism 562 in this form can further comprise a guide 566 for guiding one of the frontal or occipital portions 538, 540 as they move relative to each other, between the in-line position and the at least one offset position. The guide 566 may take the form of an elongate slot disposed in either of the frontal or occipital portions 538, 540, and a corresponding guide pin disposed in the other of the frontal or occipital portions 538, 540. The guide 566 enables the corresponding guide pin to move within the elongate slot for slidable adjustment.

In some forms, the guide 566 provides a cam and slide movement to the frontal and occipital portions 538, 540. The guide 566 can take the form of a straight slot, arcuate slot, or other variation to introduce additional movement behaviour between the frontal and occipital portions 538, 540. Further, the guide 566 can be arranged at specific angles relative to the Frankfort horizontal so as to adjust the movement behaviour of the two portions 538, 540.

The adjustment mechanism 562 enables the frontal and occipital portions 538, 540 of the support hoop 516 to be configured in any one of, or combination of, parallel and co-planar to each other, parallel and offset to each other, arranged at an angle to each other and to the temporal arms. The advantages of some of the above combinations are described below.

Referring to FIG. 10a, an in-line configuration is shown wherein the frontal portion 538 is arranged in the same plane as the occipital portion 540, as indicated by a dotted line (e.g., the plane 539 formed by the frontal portion 538 of the hoop 516 is co-planar with the plane 549 formed by the occipital portion 540 of the hoop 516). The frontal portion 538 and occipital portion 540 can move outwards, i.e. away from each other, to move from the in-line position to the offset position. Referring to FIGS. 10b and 10c, an offset configuration is shown, wherein the frontal portion 538 has been offset into a different, but parallel, plane to the occipital portion 540. As shown in FIGS. 10b and 10c the frontal portion can be offset more or less distant from the occipital portion (e.g., the offset configuration forms a spacing, distance, or displacement 545 between the plane 549 (e.g., a first plane) and the plane 539 (e.g., a second plane), and the adjustment mechanism 562 allows the spacing or displacement to be selectively adjusted). That is, in FIGS. 10b and 10c, the plane 539 formed by the frontal portion 538 of the hoop 516 is offset or not co-planar with the plane 549 formed by the occipital portion 540 of the hoop 516. In an example, as shown in FIG. 10b, the offset planes 539, 540 may be substantially parallel to one another but spaced apart by a displacement 545 so that the plane 539 is out of line from the plane 549 (i.e., substantially parallel but not co-planar). In an alternative example, as shown in FIG. 10c, the offset planes may not be parallel, i.e., the plane 539 is arranged at an angle to the plane 549.

In some forms, the frontal and occipital portions are constrained in parallel configurations to each other, i.e. the portions cannot be rotated away from a parallel configuration. Examples of this configuration are shown in FIGS. 10b and 10c. Corresponding schematic diagrams of FIGS. 10b and 10c are shown in FIGS. 11a and 11b, respectively.

Referring to the schematic representations of FIG. 11a, the in-line configuration is shown (e.g., no offset between the frontal and occipital portions 538, 540). In this configuration, a counter-clockwise moment Mw is created by the weight Fw of the display unit 512 and its horizontal displacement D2 from the pivot point 541 of the display system which is located at the contacting region of the frontal portion 538 of the support hoop 516 (i.e., Mw=Fw×D2). As a result of both frontal and occipital portions 538, 540 being in alignment, there is no internal moment created within the frontal and occipital portions 538, 540 to either assist or impede the resisting forces provide by the positioning and stabilising structure 514 (e.g., no clockwise moment from created by the frontal and occipital portions). By comparison, and referring to FIG. 11b, when an offset (e.g., displacement D1) is introduced between the frontal and occipital portions 538, 540, a corresponding clockwise moment Mt is created (i.e., Mt=Ft×D1) in the support hoop 516 which assist in resisting the moment Mw induced on the system by the display system 512.

In the co-planar offset configuration of FIG. 11b, the separation introduced between the frontal and occipital portions 538, 540 creates a moment that is clockwise, and counteracting to, the counter-clockwise moment Mw created on the user's face by the display unit 512. Advantageously, this configuration can balance the acting moments place on the system 510 to thereby improve the in-use comfort when wearing the positioning and stabilising structure 514.

Further, as disclosed in FIGS. 11a to 11c, the location of the pivot point 541 dictates the length D2 of the moment arm for the moment Mw induced by display unit 512. However, as this pivot point 541 moves forward on the forehead (under different adjustments of the support hoop 516), the more vertical the surface becomes on which the frontal portion 538 would locate. Whilst this may reduce the induced moment, it may require increased clamping pressure on the support hoop 516 to resist sliding of the support hoop 516 down the face. Accordingly, obtaining a balance between these competing criteria allows a more optimal solution to be achieved that assists both comfort and fit for the user. In an example, the frontal portion 538 (e.g., providing pivot point 541) is configured and arranged to engage the user's head along an upper portion of the frontal bone or along a portion of the parietal bone (e.g., superior the user's forehead where the head shape is less vertical), which allows a reduction in the force to prevent the positioning and stabilising structure from slipping down the front of the user's head when in-use under the weight of the display unit 512. The reduction in force provides improved comfort while stably supporting the display system. In an example (e.g., see FIG. 13a), a forehead support 25 (e.g., forehead pad) may be optionally provided to the display unit to provide a light loading contact point at the user's forehead, e.g., for added stability. In such example, the forehead support would apply less force than the frontal portion 538, e.g., to avoid discomfort (e.g., red marks on the skin) at the forehead.

In some other forms, as shown in FIG. 11c, the occipital portion 540 can be independently angled relative to the frontal portion 538 in addition to being offset from the frontal portion 538. Adjusting the angle of the occipital portion 540 to become more vertically oriented enables the occipital portion 540 to more effectively apply a downward load to the positioning and stabilising structure 514. Advantageously, this can more effectively balance the load of the display unit 512 and in turn, create a more stable positioning and stabilising structure 514. Further, in some users, adjusting the angle of the occipital portion 540 can more effectively anchor the occipital portion 540 to individual (e.g., to the unique shape of the user's head). In this example, adjustment of the angle of the occipital portion 540 increases the offset (i.e., displacement D1+) between the frontal and occipital portions, which increases the clockwise moment Mt (i.e., Mt=Ft×D1+) in the hoop 516 to more effectively assist in resisting the moment Mw induced on the system by the display unit 512.

In some other forms, the frontal portion 538 can be independently angled or moved relative to the occipital portion 540. Angling the frontal portion 538 can allow the centre of mass of the head-mounted display to be optimally positioned on the user's head. Advantageously, controlling the position of the centre of mass can assist with balancing the moment loads on the head-mounted display, and therefore improve the stability of the positioning and stabilising structure. In-use, this can prevent then head-mounted display from sliding down the user's face.

As shown in the embodiments of FIGS. 9a-10c, the occipital portion 540 can further comprise a medial adjustment mechanism. In some forms, the adjustment mechanism is in the form of connection strap 542. For example, as shown in FIG. 10a, the strap 542 can be mounted about the posterior, medial region of the occipital portion 540, threaded through opposing holes 563 in each of the posterior ends 568 of the opposing arms of the occipital portion 540 (e.g., similar to the strap 362 in FIG. 7b).

The strap 542 may be formed from an elastic material to assist conforming to the shape of a user's head. In some forms, the distance between the posterior ends 568 can be manually controlled (e.g., changed) by pulling more or less of the strap 542 through the holes 563. Both methods of elastic and manual control act to maintain a positive pressure on the occipital portion 540, and in turn, the positioning and stabilising structure 514 in-use. Advantageously, the strap 542 maintains tension in the positioning and stabilising structure 514 during dynamic loading scenarios (e.g., a user moving their head and body when operating the head-mounted display).

In some forms, the medial adjustment mechanism does not support the moment load of the display unit 512. In this form, the configuration of frontal and occipital portions 538, 540 act to balance the head-mounted display on the user's head and so do not require the strap 542 to support the moment load applied by the display unit. In this way, the medial adjustment mechanism is decoupled from bearing loads in the positioning and stabilising structure 514.

As shown in FIGS. 12a and 12b, the positive pressure (e.g., pre-load) applied to the positioning and stabilising structure 514 by the strap 542 holds the occipital portion 540 of the support hoop 516 close to the occipital bone of the user's head. The loading applied by the occipital portion 540 can be small in magnitude, sufficient to counter-act the dynamic loads applied to the head-mounted display when in-use, and not applying excess pressure into the user's occiput. The tension applied to the strap 542 can assist preventing the head-mounted display from sliding down the user's face in-use.

For example, FIG. 12a shows a first example of pre-load applied by the strap 542. In this configuration, a counter-clockwise moment Mw is created by the weight vector Fw of the display unit 512 and its horizontal displacement D2 from the pivot point 541 of the display system (i.e., Mw=Fw×D2), and a clockwise moment Mt is created (i.e., Mt=Ft×D1) in the hoop 516 via the tension force vector Ft and offset (i.e., displacement D1) between the frontal and occipital portions 538, 540 to resist the moment Mw. Further, an additional force vector Fb is created by bending the occipital portion 540 inwards (via the pre-load applied by strap 542), which creates an additional moment Mb (i.e., Mb=Fb×D3). Thus, the moments Mt and Mb together more effectively assist in resisting the moment Mw induced on the system by the display unit 512.

FIG. 12b shows a second example of pre-load applied by the strap 542. In this configuration, a counter-clockwise moment Mw is created by the weight vector Fw of the display unit 512 and its horizontal displacement D2 from the pivot point 541 of the display system (i.e., Mw=Fw×D2), and a clockwise moment Mt is created (i.e., Mt=Ft×D1) in the hoop 516 via the tension force vector Ft and offset (i.e., displacement D1) between the frontal and occipital portions 538, 540 to resist the moment Mw. Further, an additional force vector Fb2 is created by bending the occipital portion 540 outwards (via the pre-load applied by strap 542), which creates an additional moment Mb2 (i.e., Mb2=Fb2×D3). In this example, the moment Mt resists the moments Mw and Mb2 induced on the system.

In some forms, the medial adjustment mechanism can comprise a rigidly bound elastic portion. The rigidly bound elastic portion can, for example, be mounted about the posterior, medial region of the occipital portion 540 and threaded through the opposing holes 563 in each of the posterior ends 568. The length of the rigidly bound elastic portion can be manually controlled (e.g., can be adjusted) to increase or decrease the distance between the posterior ends 568 and therefore adjust the size of the positioning and stabilising structure 514 to fit different shaped heads.

The rigidly bound elastic portion comprises an elastic component and an inelastic component. The two components are connected, whereby the elongation of the elastic component is limited by the length of the inelastic component. In some forms, the elastic component is shorter in length than the inelastic component, so as to allow the elastic component to elongate until the length of elongation equals the length of the inelastic component. For example, when the rigidly bound elastic portion is mounted to the positioning and stabilising structure 514 in-use, a user may be able to apply dynamic loading to the head-mounted display (e.g., the user jumps and moves around) and the elastic component applies sufficient tension to the user's head to prevent the positioning and stabilising structure 514 from sliding off. If the user applies excess dynamic loading to the head-mounted display, the inelastic component can prevent the occipital portion displacing away from the user's head (e.g., loosening the fit) and ensure the head-mounted display does not slide off the user's head.

Referring to FIG. 12c, the positioning and stabilising structure 514 may exhibit a high degree of adjustment in a manner that provides intuitive of fit and adjustment. Further the structure provides responsive stability that can cater for dynamic movements of the user. A further feature of the design is that the reactive forces induced by the display unit 512 is catered for by the frontal and occipital portions 538, 540 whilst still allowing for fine independent adjustment of the unit. In particular, adjustment of the display unit 512 in an anterior and posterior direction controls the contacting pressure of the interfacing structure on the face (e.g., adjustment until forehead pad provided to interfacing structure lightly touches the face), adjustment in the frontal portion 538, assist in accommodating different head sizes and location of the display unit 512 in a superior-inferior position (e.g., headphone-style adjustment (e.g., self-levelling contact) relative to the ears keeps display unit at correct height), whilst adjustment of the occipital portion 540, assists in fit, location of contacting points, and the amount of counter-moment generated to aid comfort and load distribution in the structure 514 (e.g., occipital portion 540 provides combination of properties: rigidity to control the direction of pull, conformability for comfort and grip, elasticity to automatically hold the system snug, coupled with selectable adjustment).

Referring to FIG. 13b, the forehead support connector 524 can further comprise a forehead support rigidiser 556. In some forms, the forehead support rigidiser can be pre-tensioned to apply a moment load to the positioning and stabilising structure 514 that urges the display housing 522 to rotate inwards (e.g., posteriorly) towards the user's face in-use (e.g., as indicated by the arrow). Advantageously, the display housing 522 is directed into or toward the user's face without requiring the positioning and stabilising structure 514 to be tensioned by strap 542 to pull the display unit 512 into or toward the user's face. The moment load created by the pre-tensioned forehead support rigidiser 556 acts similarly to a spring loading on the display unit 512. The schematic lines 566 and 568 of FIG. 13b illustrate respective loading and non-loading conditions applied to the rigidiser 556. In a loading condition (e.g., line 566), the positioning and stabilising structure 514 is in-use on a user's head, wherein the display unit 512 is urged towards the user's face, and the rigidiser 556 behaves like a leaf-spring, deflecting away from the user's face. In the un-loaded or non-loading condition (e.g., line 568), the rigidiser 556 is pre-loaded so as to deflect the display housing 522 inwards in readiness to receive a user's face.

5.1.1.7 Hub Support

Referring to FIGS. 14a to 14b, disclosed is a further embodiment of a positioning and stabilising structure 614 for a head-mounted display system 610. The head-mounted display system 610 differs from the embodiment shown in FIGS. 9a to 13b in that the head-mounted display 610 further comprises a central support structure or hub component 662, arranged to locate around a user's ear. In the illustrated example, the hub component 662 may comprise a central part or hub of the positioning and stabilising structure 614 that connects to the frontal portion 638 and/or the occipital portion 640.

In some forms, the hub component 662 is rotatably connected to the frontal portion 638 (e.g., an anterior portion) and/or to the occipital portion 640 (e.g., a posterior portion). The frontal portion 638 and occipital portion 640 may articulate about the hub 662 to enable the frontal portion 638 to, for example, rotate forward or rearward relative to the coronal plane, and the occipital portion 640 to raise or lower relative to the Frankfort horizontal.

Referring to FIG. 14b, examples of two possible configurations of the frontal portion 638 relative to the hub 662 are illustrated. In a first example (i.e., shown in solid line), the frontal portion 638 is configured in a position proximal to the parietal bone. In a second example (i.e., shown in dotted line), the frontal portion 638 is configured in a position proximal to the frontal bone.

In some forms, the frontal portion 638 can be independently angled or moved relative to the occipital portion 640. The frontal portion can be adjusted to move towards the centre of gravity of the system. In some forms, the occipital portion can move upwards or downwards to support the positioning and stabilising structure 614 against the occipital bone of the user's head. In some other forms, the occipital portion 640 can comprise a type of counter-weight (w) to balance the display unit 612 (see e.g., FIGS. 14a and 14b).

Referring to FIG. 14c, the hub 662 can, in-use, direct the force vectors of the frontal portion 638 and occipital portion 640 around the user's ear. For example, in some forms the occipital portion 640 can be articulated about the hub 662 into a position offset and parallel to the frontal portion 638. In this configuration, the vectors applied to the occipital portion 640 can translate around the perimeter of the hub 662 and through the frontal portion 638.

Referring now to FIG. 14d. In some forms, the hub component 662 is also rotatably connected to the display unit 612. The display unit 612 may articulate about the hub 662 to enable the display unit to rotate, for example, to raise or lower from the eyes of the user, i.e. move relative to the Frankfort horizontal. That is, the positioning and stabilising structure may allow for upward, e.g., superior, pivoting movement (or pivotal movement) of the display unit to allow for movement of the display unit to a nonoperational position without removal of the positioning and stabilising structure (e.g., flip-up version). In some forms, the pivoting movement (or pivotal movement) of the display unit involves a pivoting arrangement (or pivotal movement) which includes the positioning and stabilising structure. In some forms, this pivoting arrangement may provide a release mechanism at the forehead support connector (e.g., release mechanism releasably locks the display unit in operational (i.e., lowered) and nonoperational (i.e., raised) positions) and/or provide limited hinging regions at the temporal connectors (e.g., limited hinging regions may limit hinging movement of the temporal connectors, e.g., at the connection to the display unit).

In some forms, the hub component 662 may accommodate some of the weight of the display unit 612, thereby creating a pivot axis for the head mounted display 610 about the user's ears and in the region of the mid coronal plane. This can relieve loading on the frontal portion and assist in angular adjustment of the display unit about the hub 662.

Examples of two possible configurations of the display unit 612 are illustrated in FIG. 14d. In a first example, the display unit 612 is configured in front of the user's eyes (e.g., generally parallel with the Frankfort horizontal). In a second example, the display unit 612 is shown in a raised position above the user's eye (e.g., angled relative to the Frankfort horizontal). Advantageously, moving the display unit 612 between these two positions enables the user to move the display unit 612 away from their eyes during use (e.g., game play), or before donning and doffing the head-mounted display system 610.

In some forms, an audio device (A) (e.g., headphones such as noise cancelling headphones) can be located on the hub 662 (see e.g., FIG. 14*b*). The audio device A can be configured to releasably engage with the hub 662 (e.g., about a snap-lock type feature). In some forms, an audio device A can be placed on the hub 662 to encapsulate a user's ear, in-use.

5.1.1.8 Materials and Composites

In one form of the present technology, a positioning and stabilising structure 14 comprises a strap constructed from a laminate of a resilient (e.g. elastomeric and/or textile) skin-contacting layer, a foam inner layer and a textile outer layer. In other words, the positioning and stabilising structure 14 comprises at least one strap 14. In one form, the foam is porous to allow moisture, (e.g., sweat), to pass through the strap. In one form, the textile outer layer comprises loop material to engage with a hook material portion (e.g., the tab portion 54). In some forms of the technology the skin contacting layer is formed from a material that helps wick moisture away from the user's face. This may help to maintain comfort if the user sweats while wearing the user interface.

In one form of the present technology, a positioning and stabilising structure 14 is provided that is configured to have a low profile, or cross-sectional thickness, to reduce the perceived or actual bulk of the apparatus (or display system). In one example, the positioning and stabilising structure 14 comprises at least one strap having a generally rectangular cross-section. In another example the positioning and stabilising structure comprises at least one strap having a profile with one or more rounded edges to provide greater comfort and to reduce the risk of straps marking or irritating the user.

In some forms, the straps of the positioning and stabilising structure 14 may at least partially be made of or comprise at least one synthetic polymer such as nylon and/or polyurethane (e.g., lycra). Further, the straps may comprise different layers, e.g., of different materials. Different layers may be connected one to another (e.g., using ultra-sonic welding, adhesives, etc.). In an example, the straps may comprise different layers of different materials, e.g. an outer layer of an aesthetically pleasing material and/or an inner layer facing the user's head made of a soft and/or pleasing material. For example, the straps forming the parietal portion of the hoop may be made of an inexpensive and/or comfortable material. In a further example, with reference to FIGS. 61 and 62, the straps (such as straps 14) can comprise an internal layer 17 having a thickness of 2.5-4.0 millimetre (mm) of a low density polyurethane foam with an outer layer 15 configured to surround the internal layer 17. The outer layer 15 may be formed from a laminated layer made up of nylon, polyester, another similar material that can be manufactured to provide a soft exterior surface, or a mixture thereof. The laminated layer may comprise one or more layers. In some forms, the outer layer 15 may be formed from a mixture of nylon and polyester. Consequently, the selection of material(s) for the straps may improve the comfort of the straps.

In some forms, an outer layer 15 of the straps of the positioning and stabilising structure 14 can comprise a resilient component made of an elasticated nylon knit that is formed so as to slide freely (or longitudinally) over an internal layer 17 that acts as a rigidiser (e.g., FIG. 61). The rigidiser (e.g., internal layer 17) can act as a frame (or support) for the strap 14, and can be formed from a material such as TPE that is advantageously both lightweight and offers controlled flexibility.

In an example, a strap may be a single layer component such as an elastomer/fabric. The strap may alternatively be a composite or multiple layer component such as a textile and foam composite, or outer textile layers and inner spacer fabrics. The straps may be made of a spandex or elastane/foam composite or may be formed of other suitable materials (such as a 3D spacer fabric or a double-knit interlock textile).

Different materials for different layers of a strap portion and/or different straps may be selected depending on the specific properties/functions/requirements. In an example, the straps of the positioning and stabilising structure may be BPA-free and Gelamid® which may be applied at least for portions of the strap.

In some forms, it may be desirable for at least one of the materials used for the strap(s) of the positioning and stabilising structure to be breathable. In a further example, the straps may be formed from a breathable neoprene substitute. For example, the neoprene substitute can have inner and outer resilient layers comprised of porous, four-way stretchable textile. The inner layer being designed to wick moisture away from the skin surface and the outer textile layer being a loop textile for receiving Velcro® hooks.

The textile on the user contacting side may preferably have the same weave as the textile on the non-user contacting side, such that the stretch characteristics of the straps are approximately equal on both sides. Also, it is preferred that the textile on the user contacting side have the same heat shrinkage characteristics as the non-user contacting side. This is to prevent the positioning and stabilising structure from deforming unevenly when processed or exposed to heat, or otherwise thermoformed.

The textile on the user contacting side may be a different textile to the non-user contacting side, such that the textile on the user contacting side is more comfortable than the non-user contacting side.

The straps may be cut from a sheet of material (e.g., flame laminated), or cut from a roll of narrow resilient (e.g. elastomeric and/or textile) strap and then thermoformed and ultrasonically welded to create rounded edges before being ultrasonically welded together. The straps may have a geometry that allows them to be nested on the sheet to increase yield, e.g., the geometry may be substantially linear.

In some forms, the positioning and stabilising structure can be comprised of straps configured as separate elements. As such, the positioning and stabilising structure can be made up of an assembly of straps (e.g., a strap assembly). For example, the strap 48 can be connected, e.g., by a welded joint, to the parietal portion 38. The separate elements may be joined together during the manufacturing process. Alternatively, straps of the positioning and stabilising structure may be configured as or made of one piece. In another example, the straps 48 and the parietal portions 38 may be cut out of one material sheet.

Designing the strap pieces separately may allow flexibility for the strap pieces to be made relatively smaller which contributes to an increased yield and simpler process of manufacturing. In addition, the design of the strap pieces may allow for less material wastage when cut from a sheet, e.g., due to the substantially rectangular shape of the parietal portion straps. Moreover, manufacturing the strap assembly in separate pieces may allow for the substitution of materials that are less expensive, more comfortable and/or have an aesthetically pleasing colour.

The width of the straps of the positioning and stabilising structure 14, and thus the footprint, may be additionally reduced by using different materials, different strap thicknesses and/or different compositions. Different materials and/or cheaper materials may be used for some parts or portions of the structure 14, e.g., with the same support and/or comfort. In an example, the parietal portion of the hoop may have an increased thickness compared to the occipital portion of the hoop. This may increase comfort. Additionally, having a smaller overall size of the occipital portion of the hoop can allow a user to bend their head backwards towards their spine (e.g., in a posterior direction) with an additional freedom of movement.

The joints between adjacent strap portions may be constructed as a thinned region or thinned connection portions to encourage bending. The thinned region may function as a flex point or hinge (e.g., a living hinge) to provide increased flexibility where desired. The flex point or hinge may be reinforced using hot-melt seam tape, or thinner textile layer with an adhesive backing, or other reinforcement methods.

Such a hinge feature of the connection may permit the straps to better accommodate the shape of a user's head. A combination of linear and nonlinear joints may be utilized to achieve a desired level of flexibility and direction of flexion, as well as a desired level of three-dimensional shaping to a component made up of a series of parts which were originally a flat material (such as textile or paper, for example). Such shaping may include darts, tucks, gathers, or a curved seam.

In some examples, materials having differing degrees of flexibility may be combined in an alternating manner to form a controlled flex region. Components may be stacked one on top of the other and ultrasonically welded together in a manner that leaves no space therebetween. The user interface component may be constructed of a soft material, e.g., a soft textile.

In an example, the support connector 24 that extends across the frontal bone of the user to connect the support hoop 16 may be connected together by welding, e.g., by ultrasonic welding. In an example, portions of the support connector 24 and the hoop 16 may overlap. These members may be placed in an ultrasonic welding tool.

An advantage of the ultrasonic welding process is that a flush or butt joint does not increase the thickness of the components at the joint and is visually appealing, unlike stitching where components must be overlapped, and which results in an uneven thickness. Even if the edges of the two or more components are butted together and stitched without any or substantial overlapping, the stitches will create a rougher, stiffened and raised joint. Further, the ultrasonic flush or butt joint may result in a smooth connection that may reduce skin irritation, chaffing or facial marking, even when reinforced with seam reinforcement tape. An advantage of using an overlapped ultrasonic weld variation is that multiple components may be joined in a single machine in one operation. Furthermore, the ultrasonic welding process may be designed such that the joint is embodied as a thinned region or thinned portion between the components.

In an embodiment, the straps may be thermoformed and then edges of the strap may be ultrasonically cut. The thermoformed and ultrasonically cut strap provides rounded edges which provides substantially reduced facial marking in-use. In addition, the thermoformed and ultrasonically cut edges are softer and less abrasive, which provides a more comfortable feel on the user's face in-use, e.g., more comfortable feel around the user's ears.

In a further embodiment, at least a portion of the positioning and stabilising structure may be constructed from a spacer fabric, where the edges of the spacer fabric may be ultrasonically welded. This may cause the edges of the spacer fabric to be rounded, thereby reducing facial marking and increasing comfort for the user.

In an embodiment, one or more aspects of the positioning and stabilising structure may be structured to enhance comfort in-use. For example, the rigidiser may be relatively thin. In another example, the strap may include a nylon rigidiser enclosed in foam. In such embodiment, the density of the foam may be increased to improve comfort and reduce chances of feeling the nylon rigidiser. Alternatively, the thickness of the foam may be utilized to alter the softness or roundness of the edge of the strap. For example, thicker layers of foam are more likely to produce rounder corners than thinner layers of foam. In a further embodiment, the foam may begin at one thickness, and be compressed to another thickness during processing.

In an embodiment, foam on the user contacting side may be less dense or have a lower hardness than foam on non-user contacting side. It is also possible to have more than one layer of foam and more than one rigidiser component.

In some alternative embodiments not shown, the rigidiser may include a semi-rigid moulded component that is overmoulded with a soft polymeric material (e.g., TPE, TPU). The polymeric material provides a softer material for contacting the user's face in use. In some forms, the moulded component may be provided with soft touch or flock coatings.

In certain forms of the present technology, the positioning and stabilising structure can be formed to have a biocompatible material as an outer surface, e.g., silicone rubber, textile laminate, etc. The biocompatible material can be devoid of toxicity and reduce any risk of skin reaction.

In certain forms of the present technology, the positioning and stabilising structure can be formed from durable materials that can withstand daily use, including repetitive disassembly and cleaning.

In some forms, a reduction in the overall weight of the head mounted display can be proportional to a reduction in one or more of: (a) the number of components; (b) the rigidity of the positioning and stabilising structure; (c) the rigidity of the interfacing structure; and (d) the ability to adjust the features of the head mounted display such as the positioning and stabilising structure or interfacing structure.

For example, foam (such as polyurethane foam, or viscoelastic foam) or foam-like components can be lighter and more compliant than silicone components. In a further example, spacer fabrics comprising lightweight materials such as textiles can be used to bridge across sections of the positioning and stabilising structure to assist with weight reduction. However, where some stiffness is required, it may be appropriate to utilise silicone or TPE (e.g., in a frame rigidiser).

5.1.1.9 Forehead Support Arrangements

Referring to FIG. 3a, the forehead support connector 24 of the positioning and stabilising structure 14 can be connected to the superior edge of the display unit housing 22. In some forms the connector 24 can be connected to the display unit housing 22, e.g., about a forehead support 25 (see e.g., FIG. 13a), which can be adjusted to allow the positioning and stabilising structure to accommodate the configuration of a user's face.

5.1.1.9.1 Forehead Support

Referring now to FIG. 13a, the forehead support 25 can be connected to the superior edge 21 of the display unit housing 22 and in some forms can be mechanically coupled to the forehead support connector 24. The support 25 can comprise a forehead contacting portion 27 which is in contact with the user's forehead to support and stabilize the load of the display unit 12.

The forehead support 25 can be configured to be essentially straight or it can be curved. In the case where the connector (e.g., the forehead support 25) is curved, the curvature generally follows the curvature of the user's forehead. While this is the most likely structure, it is within the scope of the present invention to use a forehead support 25 that has the opposite curvature, or any combination thereof. The forehead support 25 can be made from a thermoplastic material.

The forehead support 25 can be presented at an angle which is generally parallel to the user's forehead to provide improved comfort to the user. Advantageously, this can reduce the likelihood of pressure sores which may result from an uneven presentation. In-use, some user anatomical structures may require the forehead support 25 to be positioned higher up the forehead. In this case the angle of presentation of the support 25 can be adjusted to suit the user.

The forehead support 25 can be provided with one or more openings. These openings can be adapted to serve numerous purposes including points of connection to the housing, points of connection to any another support surface, points of connection for straps to secure the head-mounted display to the user (e.g. forehead support strap 48) and apertures for a forehead contacting portion, e.g. a forehead contacting pad.

In some forms of the forehead support 25, the apertures are designed to receive the forehead pad. The apertures can be disposed about the forehead support 25 in a manner to allow a user to adjust the position of the forehead pad.

The apertures are also designed to allow a user to attach the forehead pad securely to the forehead support 25. In some forms, the apertures are designed to allow a user to attach the forehead pad securely and reversibly to the forehead support 25. In some forms, the forehead pad is adapted to releasably engage with the forehead support 25.

In one form, the forehead contacting pad is generally plate- or disc-shaped. In other forms, the pad may have a concave surface to correspond to a convex portion of the forehead of a user in-use. Possible shapes of the base portion include rectangular and oval shapes.

In one form, the forehead pad may comprise one or more portions. In one form, two base portions of a forehead pad are adapted in order to be situated above left and right eyebrows of the user.

5.1.1.9.2 Forehead Contacting Portion

The forehead contacting portion 27 comprises a forehead contacting surface 29 which, in an in-use position, is seated on a forehead area of a user. In some forms, the forehead contacting portion 27 can be made of an elastomer material.

The contacting surface 29 can optionally include a raised surface pattern. The pattern reduces the possibility of a suction effect of the surface thereby reducing the drawing of blood in the region and making the contacting portion more comfortable. The raised pattern has the added benefit of reducing sweating. In another embodiment, the surface can be given a sand-blasted finish to improve ventilation and reduce the likelihood of sweating.

In some forms, the contacting surface 29 can have cut away portions to improve the flexibility of the contacting portion. Another advantage of the cut away portions is that the contacting portion 27, in-use, can better accommodate rolling and twisting of the display unit on a user's face. A further advantage of the cut away portions in the contacting portion is that they can reduce the effect of a single point of pressure on the forehead, e.g. reduce discomfort.

In some forms, the contacting portion includes a jacket, which defines a hollow chamber that is filled with a viscous medium in such a way that a wall of the jacket that forms the contacting surface 29 is subjected, on its side facing away from the forehead area of the user, essentially to the pressure of the viscous medium. The hollow chamber filled with viscous material may be used as a contacting portion between the user and other components of the positioning and stabilising structure, e.g. portions of the support hoop, and also may be used in the interfacing portion.

In some forms, the forehead contacting portion can be comprised of materials that include rubber and flexible plastics. In some embodiments the contacting portion is constructed from cured Liquid Silicone Rubber or alternatively, a silicone with a suitable hardness. These examples are merely intended to be illustrative and are not limiting in any manner

5.1.1.9.3 Forehead Support Connector Strap

As shown in FIGS. 3a to 3c, the forehead support connector 24 of the positioning and stabilising structure 14 comprises a forehead support strap 48 arranged to run generally along or parallel to the sagittal plane of the user's head. The strap 48 is adapted to connect to the superior edge region of the display unit housing 22 and the parietal portion 38 of the rear support hoop 16. In an example, the strap 48 can be connected, e.g., by a welded joint, to the parietal portion 38 and can be connected to the display unit housing 22 by an adjustment mechanism 50.

The strap 48 is adjustable to enable dimensional control of the forehead support connector 24. As shown in FIGS. 3a and 3c, an end portion or tab portion 54 of the strap 48, in-use, is threaded through a forehead support hole 52 in a forehead tab portion 54 of the superior edge region 21 of the display unit 12. The strap 48 may be secured to itself after passing through the hole 52 in the tab 54, for example, with hook-and-loop fastening means, which allows fine or micro adjustment of the straps for comfort and fit (e.g., tightness). In an example, the forehead support strap 48 may comprise a similar material to rear support hoop 16 and/or the connection straps 42, e.g., textile-foam composite (e.g., breathable material, e.g., multi-layered construction including at an outer textile layer and an inner foam layer).

The forehead support connector 24 supports the weight of the display unit 12. The length of the strap 48 between the tab 54 and the parietal portion 38 of the hoop 16 may be adjusted by pulling more or less of the strap 48 through the tab 54. The strap therefore is able to be adjusted to raise or lower the position of the display unit 12 relative to the user's nose. Advantageously, this adjustment can move the display unit housing 22 away from the user's nose to relieve pressure felt on either of the face, nose, and/or cheeks. The forehead support connector 24 secures the display unit 12 in position so that the display unit does not slide downwards or laterally on the user's head.

In an example, the thickness and/or width of the forehead support strap 48 may vary along at least a portion of its length, e.g., forehead support strap 48 may include wider and thinner sections along its length to facilitate connection and to distribute load.

The adjustment mechanism 50 is positioned, in use, out of contact with a user's frontal bone region.

In an alternative example, the positioning and stabilising structure 14 does not include a forehead support connector 24/forehead support strap 48, e.g., see example of FIGS. 5a to 5c.

FIGS. 4a to 4c illustrate a support for a head-mounted display unit 110 according to a second example of the present technology. In FIGS. 4a to 4c, like reference numerals denote similar or like parts to FIGS. 3a to 3c, with the addition of 100 to allowing distinguishing between embodiments. Referring to FIG. 4c, the forehead support connector 124 can further comprise a forehead support rigidiser 156. The forehead support rigidiser can provide further stabilisation and support for the display unit 112 above the user's nose and cheeks (e.g., to relieve pressure on the user's nose and cheeks). The rigidiser 156 can be connected to the superior edge region 121 of the user interfacing structure 111, and form part of the forehead support hole 152 to receive an end portion or tab portion 154 of the strap 148 for dimensional adjustment of the positioning and stabilising structure 114. As illustrated the forehead support strap 148 is arranged beneath the forehead support rigidiser 156 for comfort and load distribution.

In some forms, the adjustment mechanism 150 may further comprise an angle adjustment mechanism (not shown) for easy lifting of the visor from an in-use position to a stowed position, i.e. not in-use.

In an example, the system may be structured and arranged to redistribute one or more components from the display unit to the positioning and stabilizing structure, e.g., to redistribute weight from the display unit to the positioning and stabilizing structure. For example, the forehead support rigidiser 156 and/or forehead support strap 148 may be used to at least partially support one or more non-location essential electrical components, e.g., batteries, hard drive storage, to shift weight from the front of the user's head to a more central location, i.e., to counterbalance weight of the display unit. In alternative examples, one or more components from the display unit may be at least partially supported by the rear support hoop 116 and/or temporal connectors 118 to redistribute weight.

5.1.2 Interfacing Structure

A user interface may be partly characterised according to the design intent of where the interfacing structure is to engage with the face in-use. Some interfacing structures may be limited to engaging with regions of the user's face that protrude beyond the arc of curvature of the face engaging surface of the interfacing structure. These regions may typically include the user's forehead and cheek bones. This may result in user discomfort at localised stress points. Other facial regions may not be engaged at all by the interfacing structure or may only be engaged in a negligible manner that may thus be insufficient to increase the translation distance of the clamping pressure. These regions may typically include the sides of the user's face, or the region adjacent and surrounding the user's nose. To the extent to which there is a mismatch between the shape of the user's face and the interfacing structure, one or both may be adaptable in order for an appropriate contact or other relationship to form.

In some embodiments of the present technology, the interfacing structure may comprise a single seal-forming or cushioning element that overlays one or more of a portion of the nasal ridge region, the frontal bone region and each of the left and right infraorbital margin regions of the face, in-use. In some embodiments the interfacing structure may be designed for mass manufacture. For example, the interfacing structure can be designed to comfortably fit a wide range of different face shapes and sizes.

Referring to FIG. 8, in one form of the present technology the head-mounted display system 410 further comprises an interfacing structure 411 that provides a facial interface 413 that is arranged to engage with, and be in opposing relation to, the user's face in use. The interfacing structure 411 can, in some forms, provide a cushioning function so as to improve the overall comfort for a user. The facial interface 413 can, in some forms, be arranged to at least partially block light from entering the display unit housing 422 in-use.

The interfacing structure 411 extends about a display contained by the display unit housing 422. The interfacing structure 411 may extend about the display and define a viewing opening to the display. In an example, the facial interface 413 extends around the user's eyes, and may engage (e.g., light sealing) with the user's face, e.g., along the user's nose, cheeks and/or forehead.

The positioning and stabilising structure 414 can be attached to the display unit housing 422 whereby the interfacing structure 411 of the present technology is held in the operable position on a user's face. In some alternative forms, the positioning and stabilising structure 414 can be attached to a portion of the interfacing structure 411 whereby the interfacing structure 411 of the present technology is held in the operable position on a user's face.

FIG. 15a illustrates a split front view of a further embodiment of an interfacing structure 611 in use, where the interfacing structure 611 is otherwise generally formed to be symmetrical on either side of central axis A-A. The left-hand side of central axis A-A illustrates an example of an interfacing structure 611 as it may be positioned in use to engage with the user's face generally around a periphery of a user's eyes. The right-hand side of central axis A-A illustrates an example of the user's face beneath the interfacing structure 611, showing the facial regions that may be in contact with the interfacing structure 611 in use. In broad terms, the interfacing structure 611 may be formed on regions of the epicranius 601, the user's sphenoid 603, across the outer cheek region 605 between the sphenoid 603 to the left or right zygomatic arch 607, over the zygomatic arch 607, across the inner cheek region 609 from the zygomatic arches 607 towards the alar crests 619, and on the user's nasal ridge 617 inferior to the sellion to enclose a portion of the user's face therebetween.

The interfacing structure 611 provides a substantially continuous facial interface or face engaging surface 613 around the periphery of the user's eyes, i.e., the facial interface or face engaging surface 613 is adapted to contact the user's face on regions of the epicranius, the sphenoid, across the outer cheek region between the sphenoid to the left or right zygomatic arch, over the zygomatic arch, across the inner cheek region from the zygomatic arches towards the alar crests, and on the nasal ridge inferior to the sellion to enclose the user's eyes therebetween. That is, the interfacing structure 611 provides continuous contact (e.g., at least light sealing) around the entirety of the user's eye to prevent or at least reduce the ingress of undesirable light. In this regard, the substantially continuous facial interface or face engaging surface 613 may be contoured and/or angled along its periphery to conform or closely follow the contours/facial profile of the user's face.

In use, the interfacing structure 611 may be compressed against the user's face (e.g., via the positioning and stabilising structure), and the interfacing structure 611 is configured and arranged such that the compression force or load applied to the user's face is distributed or spread around a periphery thereof so that the load is not concentrated on a minimal number of contact points. Moreover, the interfacing structure 611 comprises varying compliance around the periphery thereof configured to allow selective distribution of the force onto the user's face. For example, the interfacing structure may include a first compliance at a first region and a second compliance at a second region, and the first region and the second region are configured around the periphery of the interfacing structure to allow selective distribution of the force onto the user's face. This arrangement allows higher levels of pressure to be spread across regions of the user's face that are more adept at absorbing the pressure, e.g., epicranius and the sphenoid.

In some forms of the present technology, not shown, a system is provided where the interfacing structure is integrally formed with display unit housing. In some forms of the present technology, such as the embodiments shown in FIGS. 15*b*, 16, and 18 to 20*d*, a system is provided where the interfacing structure is formed as a separate removable component that is configured to integrate with, and be retained by, the display unit housing so as to engage with, and be in opposing relation to, the user's face in use. That is, the display unit housing may provide a common frame structured and arranged to removably retain each of a number of interfacing structures (each corresponding to a different size and/or shape range and/or material type) to allow variants of interfacing structures to be exchanged based on fit or user preference.

Referring to FIG. 8, when the interfacing structure 411 is formed as a removable component, a number of interfacing structure 411 embodiments can be formed, with each embodiment being configured to correspond to a different size and/or shape range. For example, the head-mounted display system 410 may comprise one form of an interfacing structure 411 suitable for a large sized head. This may not be suitable for users with smaller sized heads and may thus result in reduced comfort and performance. An interfacing structure 411 suitable for a small sized head may not be suitable for a large sized head and may likewise result in reduced comfort and performance for the user. Thus, a removable interfacing structure 411 may be advantageous in that it enables a user to customise the head-mounted display system 410 and to select the interfacing structure 411 that best fits their individual facial anthropomorphic features. In some further embodiments, a user can have their facial anthropomorphic features measured in order to custom design and form a suitable interfacing structure 411. A removable interfacing structure 411 also allows for applications, such as medical use, where the structure 411 may be disposable or may allow separate cleaning to comply with surgical procedures.

Referring to FIG. 15*b*, when the interfacing structure 611 is formed as a removable component, it can be formed to comprise a chassis 621 of rigid, or semi-rigid, material that is configured to facilitate engagement with the display unit housing 622. For example, in some embodiments the chassis can be formed of a plastic material. The chassis 621 can comprise one or more engagement elements 623 around the periphery thereof that are configured to detachably mate with a corresponding element configured on the display unit housing 622. Suitable engagement elements may include one or more of a clip, fastener, magnet, or Velcro provided that the number and location of the engagement elements utilised in any given embodiments are capable of ensuring that the chassis 621 and display unit housing 622 are relatively fixed to one another without allowing significant slippage to occur therebetween. For example, as in FIGS. 15*a* and 15*b*, the engagement elements 623 can be two clips that are spaced laterally from one another so as to locate on symmetrically opposing sides of the central axis A-A. Similar engagement elements 723 are shown in FIGS. 16*a* to 16*c*, and similar engagement element 823 is shown in FIGS. 20*a* and 20*a*-1.

In some forms, a complementary opening of the display unit housing 622 may be smaller than the engagement elements 623. The engagement elements 623 may be able to fit into the smaller complementary opening with a friction fit, press fit, and/or snap fit in order to mechanically engage the display unit housing 622 to the interfacing structure 611. The user may pull the display unit housing 622 away from their interfacing structure 611 (e.g., their face) in order to remove the plenum chamber 3200, and expose their mouth and/or nose through the opening 3152. The force provided by the user is sufficient to overcome the friction-fit and/or press-fit, so that the plenum chamber 3200 may be pulled away In some further embodiments, a series of indents, not shown, can be formed at the in-use lower portion of the chassis in addition to the clips that are formed at the in-use upper portion of the chassis. As one skilled in the art would appreciate, other combinations of engagement elements are also considered within the functional scope of the present technology. In some further embodiments, not shown, the display unit housing can comprise a groove that captively engages with the outer peripheral rim of the chassis so as to provide additional vertical support to the engagement elements and further reduce relative movement between the display unit housing and interfacing structure.

The chassis 621 acts as a base for the rest of the interfacing structure 611. In addition, the chassis 620 can provide some rigidity and necessary structure to the interface support structure 615 of the interfacing structure 611, and therethrough also to the face engaging surfaces 613. The chassis 621 can be adhesively engaged to the support structure 615, or in some embodiments mechanically bonded to the support structure 615, with the method used to join the chassis 621 to the support structure 615 being dependant on the composition of the materials and their specific structures. The chassis 621 can be generally curved laterally across the user's face. In some embodiments, the curvature can generally correspond to a curvature of an individual user's face. In some examples, such as in FIG. 16*b*, the curvature of the chassis 721 can be relatively small, with the support structure 715 being formed to extend therefrom to bridge the distance to the user's face and thus having varying depths laterally across the user's face. In other words, the support structure 715 can extend to a greater depth in the regions adjacent the sides of the user's face, in comparison to the smaller depth formed in the region proximal the central axis A-A of the user's face. In some embodiments, the chassis 621, 721, 821 may advantageously remain the same size and shape, whilst the remainder of the interfacing structure 611, 711, 811 can be varied so as to be provide multiple modular embodiments, or custom designed modular embodiments that suit a user's individual facial anthropomorphic features.

In some embodiments, the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. In alternative embodiments, the interfacing structure can be integrally formed as a single component from a foam or an elastomeric material.

In some embodiments, two or more of the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. For example, FIGS. AA to AC show an interfacing structure A000 comprising a support structure in the form of a support flange A002, supporting an integral face engaging flange A006 having a face engaging surface A008. In further embodiments, additional components may be provided to the interfacing structure A000. In alternative embodiments, the interfacing structure can be integrally formed as a single component from a foam or an elastomeric material.

In some embodiments, the chassis 721 can be formed as a separate component from the rest of the interfacing structure 711 which is manufactured as a singular integrally formed body (see e.g., FIGS. 16a to 16c). For example, in some examples, one or more regions of the face engaging surface 713' can be formed together around the periphery of the interfacing structure 711' as an inwardly projecting flange-like rim that stems from the support structure 715' (e.g. FIG. 17a). Alternatively, in some embodiments, the face engaging surface 713" can be supported by a spring-like supporting flange 725" that stems from the support structure 715" and is substantially concealed beneath the face engaging surface 713" (e.g. FIG. 17b). For example, the supporting flange 725" and support structure 715" can both be formed from silicone, with the material thickness of the supporting flange 725" being thinner than that of the support structure 715" so as to provide a more compliant, yet resilient, spring-like support to the portion of the interfacing structure 711" that engages the user's face. In some examples, the face engaging surface 713" can be loosely overlaid over the supporting flange 725" such that each can respond independently to the compression pressure applied when interacting with a user's face in use. In some embodiments, the overlaid face engaging surface 713" can be bonded with the supporting flange 725" over which it is overlaid, whereby they effectively form a singular body that responds in unison to the compression pressure applied when interacting with a user's face in use.

The face engaging surface 713 can comprise one or more regions of silicone, or one or more layers of a textile material or foam. The one or more regions of the face engaging surface 713 can be formed to have varying thicknesses and/or varying surface finishes, whereby the resultant face engaging surface 713 can have a variable compliance therealong when compressed against a user's face in use.

Some or all of the face engaging surface 713 may be regions of (relatively) reduced friction. Where silicone is used, this may be achieved by providing a so-called frosted surface. With a region of reduced friction, the sealing surface may adhere to the user's face less than without the region of reduced friction. For example, the region of reduced friction may be provided to allow the side(s) of the user's nose to slide freely along the face engaging surface 713. Likewise, a textile or foam materials having (relatively) reduced friction outer surface finishes can be used to form part or all of the face engaging surface 713.

Some or all of the face engaging surface 713 may be regions of (relatively) high friction. Where silicone is used, this may be achieved by providing a so-called polished surface. With a region of high friction, the sealing surface may adhere to the user's' face better than without the region of reduced friction, thus reducing the slippage of the display unit housing 722. Likewise, a textile or foam materials having (relatively) high friction outer surface finishes can be used to form part or all of the face engaging surface 713.

In some examples, one or more distinct regions of the face engaging surface 713 can be formed to have different finishes or different levels of friction so as to optimise the grip and retention performance of the face engaging surface 713 whilst also improving user comfort (e.g., one or more regions with frosted surface and one or more regions of polished surface). In some examples, a combination of two or more materials can be used to form the overall face engaging surface 713, where different materials can be used in different regions. This may improve retention of the display unit housing 722 whilst also improving user comfort.

In some forms, the heat wicking performance of the face engaging surface can be improved by using a silicone material whereby the user comfort may be improved.

Referring to FIGS. 18 and 19, the support structure 715 can be formed to comprise one or more distinct regions 715',715" having varying thicknesses and/or being further supported by the addition of stiffening ribs 715'''. In some regions the support structure can be thinner 715', or generally provide less resistance to compression, for example in the regions adjacent the user's zygomatic arch, cheek bones, and nose. In some other regions, the support structure can be thicker 715", or can generally be structured to provide more resistance to compression, for example in the regions adjacent the user's forehead or sphenoid. In some examples, the thickness of the support structure 715 can be varied incrementally thereacross, rather than as distinct regions having a singular thickness. In some embodiments, stiffening ribs 715''' can be formed as wide regions of thicker material, whilst in other embodiments, stiffening ribs 715''' can be formed as a tie-like support from narrow and/or less compliant material.

Thinner regions of the support structure 715 can provide a more compliant, yet resilient, cushion support to the face engaging surface 713 above. For example, in some embodiments, thinner regions may be formed from silicone material have a thickness of 0.3-0.5 mm By contrast, thicker regions of the support structure 715 can provide a less compliant, more resistant, and relatively rigid structural support to the face engaging surface 713 above. For example, in some embodiments, thicker regions may be formed from silicone material have a thickness of 1.5-2 mm By forming a support structure 715 from a plurality of distinct thicker and thinner regions, or a blend of incrementally varying thicknesses, the load resistance of the support structure 715 may be optimised. The overall compliance of the interfacing structure 711 at any given point around the periphery of the user's face in use, may thus be a result of the properties of the chassis 721, support structure 715 and face engaging surface 713.

In some embodiments, it may be advantageous for the interfacing structure 711 to balance compliance against resilience and rigidity, so as to spread the resistance force applied by the interfacing structure 711 when compressed against a user's face in use. In addition, it may be advantageous to provide an interfacing structure 711 where the translation distance of the compression pressure, applied when interacting with a user's face in use, is spread across regions of the users face that are more adept at absorbing the pressure, rather than allowing the load to be focused locally on a minimal number of contact points. Thus, the overall compliance of the disclosed interfacing structure 711, can be formed to allow for the face engaging surface 713 to adaptably mould to the user's face. This may advantageously reduce regions of the face engaging surface 713 that are spaced from the users face, or that do not sufficiently interact with the user's face so as to contribute to the assist with spreading the pressure. For example, with reference to FIG. 15a, regions of the user's epicranius 601 and sphenoid 603 below the temples may be capable of bearing higher levels of pressure, whilst regions on either side of the user's zygomatic arch 607 may be capable of bearing lower levels of pressure. In addition, it may be preferable for some regions to only receive relatively light or substantially no pressure at all, such as on the zygomatic arch 607 itself, or on the user's nasal ridge 617. In regions that can only bear light or substantially no pressure, it may be advantageous for the face engaging surface 713 to be highly compliant so as to interact gently thereat whereby the ingress of undesirable light is reduced or prevented.

In some further embodiments, the interfacing structure 811 can comprise a discrete chassis 821, support structure 815 and face engaging surface 813 (e.g. FIGS. 20a to 20d). For example, the face engaging surface 813' can be formed as a foam cushion 829' that is attached directly to an upper portion 827 of the support structure 815 (e.g. FIG. 21a). The upper portion 827 of the support structure 815 can be formed to extend inwardly from the periphery of the support structure 815 wall as a spring-like ledge that functions to support the face engaging surface 813' from buckling in use.

In some alternative embodiments, the face engaging surface 813" covers a foam cushion under layer 829" that is attached directly to an upper portion 827 of the support structure 815 (e.g. FIG. 21b). For example, a silicone or textile material face engaging surface 813" can be supported loosely, or at least partially bonded, over a foam cushion under layer 829". The foam cushion under layer 829" can function as a spring-like, compliant, yet somewhat resilient, cushion support that is concealed beneath the face engaging surface 813". In such embodiments, the material that contacts the user's face can be one that is more easily cleaned than foam, and may thus improve the hygiene of the interfacing structure 811. The foam cushion (e.g., foam cushion 829', foam cushion 829") may, for example, be made from any suitable material such as one or more of the following example materials: Polyethylene, Polyurethane, Ethylene vinyl acetate (EVA). In some cases, the foam cushion may be a semi-open closed cell foam, such as one made of polyurethane. The cushion of semi-open cell foam may have a limited permeability, for example, a permeability characteristic in a range of about 0 to 20 litres per minute. A transverse cross-section through the cushion 829 may take a substantially triangular or pear-like shape with a sealing face that follows the contours of a user's face. The foam used may define the physical properties of the overall interfacing structure 811. The foam may allow the interfacing structure 811 to accommodate major variations, and to successfully conform to the contours of the user's face. The compliant nature of the foam cushion may also provide micro-adjustment and may thus form a comfortable interfacing layer when interacting with the user's skin.

In another example of the present technology, the foam cushion under layer 829 can be fixed (either removably or permanently) to the support structure 815, or in some further embodiments, directly to the chassis 821. The foam cushion under layer 829 can be configured to have a varied rigidity in different regions therealong in order to increase comfort for the user in use.

In certain forms of the present technology, the face engaging surface of the interfacing structure can comprise a cushion formed from semi-compressible materials such as a dense foam (e.g., polyurethane foam or viscoelastic foam) or other similar materials such as rubber that may be formed to be generally resiliently compressible, whilst simultaneously being somewhat resistant to the compression. The resulting semi-rigid, yet resiliently compressible, cushion may additionally be formed to maintain a curvature with a relatively small radius, thereby providing a "one-size-fits-most" user interface cushion.

In some forms of the present technology, the interfacing structure can be adjustably sized across a range of widths and/or shapes so as to be customisable to the facial anthropomorphic features of the user. For example, with reference to FIG. 22, the interfacing structure 911 can comprise two adjustable face engaging surfaces 913', each being located at a respective one of the left and right hand sides of the interfacing structure 911. Each of the adjustable face engaging surfaces 913' can be slidably moved relative to each other, and relative to a substantially rigid chassis 920. When the adjustable face engaging surfaces 913' are moved away from one another, the overall width W of the interfacing structure 911 can be increased. When the adjustable face engaging surfaces 913' are moved towards one another, the overall width W of the interfacing structure 911 can be decreased. In some forms, the interfacing structure 911 can further comprise two static face engaging surfaces 913", one bridging across the users nose region, and one bridging across the user's forehead region. Each of the two static face engaging surfaces 913" can be formed to have a length that is sufficient, whereby the respective distal ends 914" of the two static face engaging surfaces 913" overlap with the respective distal ends 914' of the adjustable face engaging surfaces 913'. In this way, the adjustable and static face engaging surfaces 913', 913" can together form a functionally continuous interfacing structure 911 around the user's eyes. The resulting interfacing structure 911 may provide an improved fit for the user's individual facial anthropomorphic features which may advantageously improve the ability of the interfacing structure 911 to increase the translation distance of the clamping pressure applied to a user's face when tightening the positioning and stabilising system. This may also thus improve the comfort of the interfacing structure 911, and may reduce instances of localised pressure points. In some further embodiments, the static face engaging surfaces 913" can be formed to have a shape and length whereby they can also shield the interior of the display unit housing 922 from the ingress of undesirable light. In some further embodiments, the static face engaging surfaces 913" can be formed to have a shape and length whereby an air gap is formed between the static face engaging surfaces 913" and the adjustable face engaging surfaces 913'. This may advantageously improve the breathability and comfort of the head-mounted display system 910.

In some embodiments, the adjustable face engaging surfaces 913' can be moved relative to the chassis 920 or display unit housing 922 by a corresponding adjustment of the relative position of the ocular lenses within the display unit housing 922. For example, with reference to FIG. 23, the relative position of the axis D-D, E-E through the ocular lenses of the display unit housing 922 may be adjustable. In some embodiments, the adjustment can be made by moving a sliding tab that projects outwardly from the display unit housing 922. As the spacing between a user's eyes may be proportional the width of the user's head, an adjustment of the relative position of the ocular lenses may thus also provide a suitable adjustment to the width of the interfacing structure 911. For example, the relative position of the axis D-D, E-E through the ocular lenses can be moved from a wider width XX (see e.g., FIG. 23a) to a narrower width YY (see e.g., FIG. 23b), thus also reducing the overall width of the face engaging surfaces' by a proportionally corresponding distance, from a wider width XX' (see e.g., FIG. 23a) to a narrower width YY' (see e.g., FIG. 23b). Likewise, the ocular lenses 923 can be moved from a narrower width YY (see e.g., FIG. 23b) to a wider width XX (see e.g., FIG. 23a), thus increasing the overall width of the face engaging surfaces' by a proportionally corresponding distance, from a narrower width YY' (see e.g., FIG. 23b) to a wider width XX' (see e.g., FIG. 23a). In some forms, the face engaging surfaces around the nasal ledge 931 can also be adjustably moved by a movement of the relative position of the axis D-D, E-E through the ocular lenses 923. For example, the nasal ledge 931 can be adjustably narrowed and positioned into the space between the ocular lenses 923 in the display unit housing 922 when the interfacing structure 911 is moved into a narrower configuration (see e.g., FIG. 23b), or adjustably pulled wider and removed from the space between the ocular lenses in the display unit housing 922 when the interfacing structure 911 is moved into a wider configuration (see e.g., FIG. 23a).

In some alternative embodiments, not shown, the adjustable face engaging surfaces can be moved relative to the chassis by a uniquely configured adjustment mechanism, such as a sliding tab or rack-and-pinion style adjustment mechanism.

The sides of the nose, including above the nasal bones, proximal to the frontal process of the maxilla, and lateral cartilage can be highly variable in profile between users. In addition, the nasal bridge may be particularly sensitive when a force is applied thereupon by an interfacing structure. Furthermore, it may be important to avoid occlusion of a user's air passageway in use. The interfacing structure can thus be formed to avoid application of a compressive pressure against the nasal region. With reference to FIGS. 15a and 15b, the chassis 621 comprises a nasal ledge 631 that effectively leaves a gap in the otherwise substantially continuous face engaging surfaces 613. The nasal ledge 631 can be formed to be substantially wider and deeper than a user's nose so as to avoid one or more of the potential problems identified above. In some further embodiments, the nasal ledge 631 can be generally saddle-shaped. The nasal ledge 631 can be formed as a continuation of the rest of the face engaging surfaces 613, or in some embodiments, the nasal ledge 631 can be formed as a discrete section of the face engaging surfaces 613. In embodiments where the nasal ledge 631 is a discrete section, the nasal ledge 631 can be formed to be removable. This may advantageously improve the ease with which the nasal ledge 631 is cleaned. Exemplary nasal ledges 731, 831 are also shown in FIGS. 16a to 16c and FIGS. 20a to 20d.

For example, in some embodiments, the face engaging surfaces 1013 of the nasal ledge 1031 can be formed from a pliable material that is able to easily elastically bend inwards, like a flap 1033, so as to accommodate the user's nose (see e.g. FIG. 24). The flaps 1033 can rest on the sides of the user's nose bridge in use. In some forms, the face engaging surfaces 613 of the nasal ledge 631 can be formed as a hood of loose material that allows the user's nose to enter therein without applying any substantial resistance force. Alternatively, in some embodiments, the face engaging surfaces 613 of the nasal ledge 631 can be formed from a section of highly stretchable and depressible material, such as one or more of a textile or a foam.

In general, the interfacing structure in accordance with the present technology can be constructed from one or more materials such as silicone, a textile material or foam. For example, in certain forms of the present technology, the interfacing structure can comprise a layer of visco-elastic polyurethane foam. In a further example, in certain forms of the present technology, the interfacing structure can comprise a layer of liquid silicone rubber (LSR) that is overmoulded onto a polycarbonate or nylon chassis.

In certain forms of the present technology, the interfacing structure may advantageously be constructed from a biocompatible material (e.g., silicone rubber).

In some forms of the present technology, one or more portions of the interfacing structure can be formed to be substantially opaque. In some further forms of the present technology, one or more portions of the interfacing structure can be coloured matt black. This may advantageous in reducing the ingress of undesired light through the interfacing structure itself.

It should be understood that material selection may affect the compressibility, compliance and/or resilience properties of the interfacing structure. For example, different foams with different densities will have correspondingly different compressibility characteristics. Further, different silicone materials with differing thicknesses or flexibility will have different compressibility characteristics.

In certain forms of the present technology, the interfacing structure can be constructed from a biocompatible material, e.g. silicone rubber. In some further forms, the face engaging surface of the interfacing structure can be removable. For example, the face engaging surface can be a removable single-use, or washable cover.

The interfacing structure may have advantages in one or more forms of the present technology. For example, in addition to the advantages described above, the human facial structure may include variations from person to person that provide challenges when designing a face engaging surface that can adapt for use with many facial variations. The variations may include different shapes of the facial structure (e.g., differently shaped noses and/or differently curved cheeks) and/or different tissue content (e.g. more or less fatty tissue). These variations may result in an interfacing structure that works very well for one person but poorly for another. Also, perceived comfort may vary from person to person independent of facial structure.

In some forms of the present technology, not shown, interfacing structure can further comprise one or more forehead interfacing structures. The forehead interfacing structures can be adapted to engage with the user's forehead above the display unit housing. The forehead interfacing structures can also be integrated with the positioning and stabilising system, or as a stand-alone region of the interfacing structure.

Medical Applications

The positioning and stabilising structure and/or interfacing structure can be adapted to comprise biocompatible materials, as in-use, multiple components of the positioning and stabilising structure and interfacing structure may contact, e.g. the skin, of the user. Designing the positioning and stabilising structure and interfacing structure to comprise such materials aims to protect users from potential biological risks arising from the use of the structure.

5.1.2.1 Material Biocompatibility

Biocompatible materials are considered to be materials that undergo a full evaluation of their biological responses, relevant to their safety in use, according to ISO 10993-1 standard. The evaluation considers the nature and duration of anticipated contact with human tissues when in-use. In some forms of the present technology, the materials utilised in the positioning and stabilising structure and interfacing structure may undergo at least some of the following biocompatibility tests:

Cytotoxicity—Elution Test (MeM Extract): ANSI/AAMI/ISO 10993-5

Skin Sensitisation: ISO 10993-10

Irritation: ISO 10993-10

Genotoxicity—Bacterial Mutagenicity Test: ISO 10993-3

Implantation: ISO 10993-6

5.1.2.2 Cleaning

In some forms, the positioning and stabilising structure and the interfacing structure are designed to be used by a single user, and cleaned in a home of the user (e.g., washed in soapy water) without requiring specialised equipment for disinfection and sterilisation.

In some other forms, the components of the positioning and stabilising structure and interfacing structure are used in labs, clinics and hospitals wherein a single head-mounted display may be reused on multiple persons or used during medical procedures. In each of the labs, clinics and hospitals the head-mounted displays, or relevant components thereof, can be reprocessed and be exposed to, for example, processes of thermal disinfection, chemical disinfection and sterilisation. As such, the design of the positioning and stabilising structure and interfacing structure may need to be validated for disinfection and sterilisation of the mask in accordance with ISO17664.

Materials may be chosen to withstand reprocessing. For example, robust materials may be used in the positioning and stabilising structure to withstand exposure to high level disinfection solutions and agitation with a brush. Further, some components of the positioning and stabilising structure are separable, and in-use may be disconnected to improve the reprocessing efficacy.

In a further example, the contacting portion of the forehead support connector 24 will, in use, be in contact with the user's head and therefor may become dirty. The contacting portion may be designed to be removed from the forehead support connector 24, to provide the ability to remove it for cleaning and/or replacement. It may be desirable to wash the contacting portion while not getting the positioning and stabilising structure wet. This may be facilitated by allowing these components to disconnect for such a purpose. In a further example, the rear support hoop can be in contact with the user's hair or skin when worn. The rear support hoop is therefore preferably made from a material that is easily cleaned and further, designed to be removed from the positioning and stabilising structure for independent cleaning.

5.1.3 Materials

The surface of the interfacing structure or positioning and stabilising structure that engages and interacts with the user's head can be formed so as to have a shape and material properties that assist with the reduction of point loads and pressure induced markings and/or hot spots on the user's head. With reference to FIG. 63, in some forms the resulting interfacing surface 1110 of the engaging structure 1108 can distribute the pressure load P across a larger surface area of the user's head 1120. The shape and material properties of the engaging structure 1108, and in particular the interfacing surface 1110, may thus provide improved comfort for a user.

Similarly, in some forms the geometry of the edges of the interfacing surfaces can be shaped to follow a contour that assists, in conjunction with the overall shape and material properties of the interfacing surface, with matching the contour of the user's head and thus distributing the pressure load more efficiently thereby improving the comfort for the user. For example, the interfacing surfaces 1110 may have a curved contoured edge 1112 that assists with spreading the contact load over a greater surface area, thereby reducing the likelihood of a point load forming pressure induced markings and/or hot spots on the user's head (e.g., FIGS. 63 and 64).

In general, an increase in surface area can be correlated with a decrease in pressure and discomfort experienced by a user, as the force can be distributed across a larger contact area. However, the total surface area of the interfacing surface needs to be optimised in a trade-off against the overall size, bulk and weight of the interfacing structure which may have detrimental impacts on the user comfort when wearing the head-mounted display. For example, if the interfacing surface is too large, a user may experience claustrophobia or experience muscle pain in their neck and shoulders due to the increased weight.

Furthermore, in some forms it may be important that the interfacing surface provides a perception of comfort to the user based on the general appearance and feel of the outer surface when touched, or when worn during use. For example, by reducing sharp edges, even those that do not contact the user, the user's perception of comfort may be advantageously improved. In a further example, it may be advantageous to form the interfacing surface outer surface from materials that are not scratchy, materials that are able to wick moisture (e.g., sweat) and allow for evaporative cooling, or materials that do not irritate the user's skin and/or materials that are breathable.

The material properties of the interfacing surface of the interfacing structure or positioning and stabilising structure can thus be influential on the overall comfort for the user.

For example, in some forms, it may be advantageous to have an engaging structure 1108, such as the straps of the positioning and stabilising structure that is able to flexibly twist T so as to comply with the contours of a user's head (e.g., FIG. 64). The compliance and ability to conform the interfacing surface to the user's head can increase the total contact surface area, thereby assisting with the distribution of the tightening force across a larger contact area and reducing uncomfortable pressure points.

In other forms, the engaging structure 1108 can comprise a compliant material such as foam or textile material, where unlike thermoplastic materials, the interfacing surface can more readily adapt and form around the curves and contours of the user's head. For example, such material properties may be advantageous for portions of the positioning and stabilising structure 1114 that cross around an upper portion of the user's head 1122 (e.g., FIG. 65). The portions 1116 of the positioning and stabilising structure 1114 that, when not in use, would not be sufficiently curved so as to engage with the upper portion of the user's head 1122 can thus be resiliently bent without damaging the positioning and stabilising structure 1114 in order to conform and assist with distributing the pressure load across the user's head.

In some forms the engaging structure 1108 can be elastically resilient, whereby the force distribution can be more evenly spread across the overall interfacing surface. For example, with reference to FIG. 66, when the strap of the positioning and stabilising structure 1134 are stretched apart under load L, the strain force can be substantially evenly spread across the length of the strap. Consequently, the elasticity of the strap has a relatively flat force (y-axis)-displacement (x-axis) profile, thereby illustrating that the force does not change much when the engaging structure is extended (or displaced).

In some other forms, discrete regions, segments, or portions of the interfacing structure or positioning and stabilising structure can be formed to exhibit increased compliance when compared with the rest of the positioning and stabilising structure. For example, with reference to FIG. 67, regions 1144 of the interfacing structure 1142 that are located adjacent more sensitive regions of the user's face (such as the bridge of the nose), or that are located adjacent facial projections 1140 such as a cheek bone, can comprise a viscoelastic foam, or similar materials that can allow for increased local compliance.

In some forms, foam used in the interfacing structure or positioning and stabilising structure can be formed to have a density in the range of approximately 55 kg/m$^3$. In other forms, the density can be in the range of approximately 50-55 kg/m$^3$. In other forms, the foam density can be in the range of approximately 55-60 kg/m$^3$. In other forms, the foam density can be in the range of approximately 45-65 kg/m$^3$. The density can also be higher or lower depending on exact requirements of the foam. For example, the foam density can vary across the interfacing structure or positioning and stabilising structure, so as to have localised regions of greater compliance, or localised regions of greater stiffness.

In some forms, a head mounted display unit (e.g., head mounted display unit 12) may be constructed at least partially out of a textile material in order to be comfortable and easier to manufacture, while also providing a substantially universal or adjustable fit to an individual user's face. The head mounted display unit may be constructed entirely out of a textile material, or only portions may be constructed out of a textile material. Other portions may be constructed from another material (e.g., a foam, a rigidised material, etc.).

5.1.3.1 Magnetic Retention

In one form of the present technology (see e.g., FIG. 89-4), the positioning and stabilising structure 13500 includes a first magnetic portion 13316. The first magnetic portion 13316 includes a first polarity.

In certain forms (see e.g., FIG. 89-4), the first magnetic portion 13316 is a magnetic thread (e.g., thin wires with polymer yarn which have been twisted and magnetised, or magnetic material in polymer melt which have been extruded into fibres to make thread which is then magnetised) sewn into the positioning and stabilising structure 13500. The magnetic thread may extend along a portion of at least one strap of the positioning and stabilising structure 13500. In another example, the first magnetic portion may be a magnet, a layer of fluid (e.g., magnetic ink, ferromagnetic fluid, ferro-fluid, etc.), or a similar material that includes magnetic properties.

In certain forms, the first magnetic section 13316 is disposed proximate an end of the side strap. A second magnetic section 13318 (e.g., a magnet, a magnetic thread) with an opposite polarity from the first magnetic section 13316 is spaced apart from the first magnetic section 13316. However, the magnetic sections 13316, 13318 may be replaced with another coupling means (e.g., Velcro). Using magnetic sections 13316, 13318 (e.g., magnetic thread) may reduce pilling or snagging when connecting and disconnecting the magnetic sections 13316, 13318 from one another.

In certain forms, head mounted display unit 13100 and/or the positioning and stabilizing structure 13500 include a sleeve or loop that selectively receives the strap of the headgear. The strap may be threaded through the loop and doubled back on itself in order to allow the first magnetic section 13316 to couple to the second magnetic section 13318 (see e.g., FIG. 89-4) in a length adjustable fashion (e.g., changing the length of strap that is doubled back on itself in order to increase or decrease the size of the positioning and stabilising structure). The second magnetic section 13318 may be larger (i.e., include a larger area on the strap) than the first magnetic section 13316, so that the first magnetic section 13316 can couple to the second magnetic section 13318 in a variety of positions (e.g., corresponding with a different tightness).

As shown in FIG. 20a-1, the user interfacing structure 811 includes a first magnetic portion 3114 in one form of the present technology. The first magnetic portion 3114 includes a first polarity.

In certain forms, the first magnetic portion 3114 is a magnetic thread (e.g., thin wires with polymer yarn which have been twisted and magnetised, or magnetic material in polymer melt which have been extruded into fibres to make thread which is then magnetised) sewn into the user interfacing structure 811. The magnetic thread may extend around or substantially around the perimeter of the user interfacing structure 811. The magnetic thread may also extend around a portion of the perimeter of the user interfacing structure 811.

In certain forms, the first magnetic portion 3114 is a material attracted to magnets (e.g., a ferrous metal). The magnetic material is incorporated (e.g., sewn into, glued to, or magnetic threads added, etc.) into the material of the user interfacing structure 811. The additional component (e.g., a display unit housing) includes a magnet and/or a magnetic thread that is attracted to the first magnetic portion 3114.

In certain forms (not shown), the first magnetic portion 3114 is a layer of fluid (e.g., magnetic ink, ferromagnetic fluid, ferro-fluid, etc.) applied to the user interfacing structure 811. The fluid may have magnetic properties (e.g., is attracted to a similar material with the opposite polarity), but does not require additional components (e.g., molded onto the user interfacing structure 811) to form a seal.

In certain forms (not shown), the first magnetic portion 3114 is a magnet coupled (e.g., sewn, glued, etc.) into the user interfacing structure 811. The magnet may also be molded (e.g., in-molded, over-molded, etc.) onto the user interfacing structure 811. The magnet may be provided in any orientation, and along any length of the user interfacing structure 811. Multiple magnets may be provided on different sides (e.g., top/bottom, left/right, etc.) of the user interfacing structure 811. The multiple magnets may have the same polarity as one another.

In certain forms, the display unit housing (e.g., display unit housing 522 in FIG. 13b) includes a second magnetic portion with an opposite polarity than the first magnetic portion 3114 of the user interfacing structure 811. The first magnetic portion 3114 and the opposite magnetic portion on the display unit housing provide the user with a haptic response to indicate that the display unit housing is properly aligned with the user interfacing structure 811. In some embodiments, engagement between the second magnetic portion on the display unit housing and the first magnetic portion 3114 may be sufficient to retain the display unit housing in an operational position in relation to the user interfacing structure 811. In other examples, the display unit housing may include a third magnetic portion spaced apart from the second magnetic portion and having the same polarity as the first magnetic portion 3114 (i.e., an opposite polarity than the second magnetic portion). In this case, the magnetic interaction between the first and second magnetic portions may not be sufficient to retain the display unit housing in the operational position (e.g., additional mechanical connections, a press-fit, a snap fit, a friction fit, or similar method of engagement may be needed). The repulsive force of the third magnetic portion and the attractive force of the first magnetic portion in relation to the first magnetic portion 3114 may assist the user in properly orienting the display unit housing.

In certain forms, the second magnetic portion is a magnetic thread (e.g., thin wires with polymer yarn which have been twisted and magnetised, or magnetic material in polymer melt which have been extruded into fibres to make thread which is then magnetised) sewn into the display unit housing. The magnetic thread may extend around or substantially around the perimeter of the display unit housing. The magnetic thread may also extend around a portion of the perimeter of the display unit housing. Where the third magnetic portion is included, the second and third magnetic threads are sewn into opposite sides of the display unit housing (e.g., left/right, top/bottom, etc.). The display unit housing couples to the user interfacing structure 811 when aligned correctly (i.e., the second magnetic thread is adjacent to the first magnetic portion 3114), and is prevented from coupling to the user interfacing structure 811 when aligned improperly (i.e., the second magnetic thread is distal to the first magnetic portion 3114).

In certain forms, the second magnetic portion and/or the third magnetic portion is a magnet, a material attracted to magnets, and/or a layer of fluid (e.g., magnetic ink, ferromagnetic fluid, ferro-fluid, etc.) (e.g., a ferrous metal). The magnet, material attracted to magnets, and/or a layer of fluid (e.g., magnetic ink, ferromagnetic fluid, ferro-fluid, etc.) provides magnetic attractive or repulsive forces with the first magnetic portion 3114.

When aligned properly (e.g., the first magnetic portion 3114 adjacent to the second magnetic portion), the user interfacing structure 811 and the display unit housing are coupled together and relatively fixed in place. In some forms, the magnetic force creates an engaged interface between the user interfacing structure 811 and the display unit housing that allows substantially no ambient light to pass through. No additional structure is required in order to retain the display unit housing in the operational position. In some forms, the magnetic force is less than the force necessary to keep the display unit housing in the operational position (e.g., less than the force of gravity), and an additional structure (e.g., a mechanical fastener, a snap-fit, a press-fit, a frication-fit, etc.) helps to retain the display unit housing in place and prevent the ingress and/or egress of light. For example, the engagement elements 823 may provide the additional structure to help retain the display unit housing.

In either form, the magnetic force is less than a force applied by a user's hand (e.g., when moving the display unit housing to the decoupled position).

5.1.3.2 Adaptive Material

In one form of the present technology (see e.g., FIGS. 68-81), the head mounted display system 13000 includes adaptive materials 13800 that change based on a variety of usage conditions.

In certain forms, the adaptive materials 13800 provide an adaptive seal (e.g., a light seal). A property of the adaptive material (e.g., rigidity, size, strength, etc.) changes with the presence of the specific usage conditions.

In one form (see e.g., FIGS. 68 and 69), the adaptive material 13800 increases in size or expands over time with additional presence of the usage conditions. The adaptive material 13800 may provide a stronger seal as it expands. For example, the sealant force from the adaptive material(s) 13800 is low or non-existent when the head mounted display system is first worn, and increases with increased presence of the conditions.

In one form (see e.g., FIGS. 70-73), the adaptive material 13800 experiences substantially elastic deformation through cycles of usage conditions. For example, the adaptive material 3800 is capable of expanding and contacting (e.g., depending on conditions) to approximately the same maximums with each successive cycle.

In certain forms (see e.g., FIGS. 70 and 71), the adaptive material 13800 is sandwiched between a rigidized material 13808 (e.g., rigidized textile) and a textile material 13812 (e.g., flexible textile). The textile material be substantially similar or the same as the textile material 13101. The rigidized material 13808 can bias and direct the expansion of the adaptive material 13800 (e.g., toward a user's face). The rigidized material 13808 may include other properties (e.g., impermeability) to block particles from reaching the adaptive material 13800 and/or the user's face. The textile material 13812 can be flexible and stretch as the adaptive material 13800 expands. The textile material 13812 can also be elastic so that it returns to its original shape after the adaptive material 13812 contracts. The textile material 13812 is generally soft in order to provide comfort to the user's face. The textile material 13812 may also be coated with a slightly adhesive material in order to increase the frictional force between the textile material 13812 and the user's face.

In one form, locations along the head mounted display system 13000 that do not include adaptive material 13800 may be formed from rigidized material 13808. This controls where the expansion occurs (i.e., expansion occurs where the adaptive material 13800 is located and is limited from expanding in other locations by the rigidized material 13808). Textile material 13812 may be included instead of or in addition to the rigidized material 13808 at locations that do not include the adaptive material 13800. The textile material 13812 may allow some expansion to occur, but would not expand on its own independent of the adaptive material 13800.

In one form (see e.g., FIGS. 20b-1, 20b-2, 20c-1, 20c-2, 89-2, 89-3, 90, and 91), a portion of the head mounted display system 13000 (e.g., the user interfacing structure 13300) includes at least one fold to form a bellows 13804. The bellows 13804 are formed from a combination of adaptive material 13800, rigidized material 13808, and textile material 13812 (although one or more of these could be eliminated in some examples). The adaptive material 13800 may cause the bellows 13804 to expand. The rigidized material 13808 direct the expansion of the adaptive material 13800 in a predetermined manner or pattern. Both the rigidized material 13808 and the textile material 13812 may not react to the conditions that cause the adaptive material to expand.

In some forms, the head mounted display system 13000 may be constructed using injection molding. In some forms, various types of adaptive materials 13800 may be molded into various sections of the head mounted display system 13000. These may all be the same type of adaptive material 13800 with various properties (e.g., expand from the same force but expand different amounts), different types of adaptive material (e.g., swellable, heat activated, and/or auextic materials, described below), or a combination of both

5.1.3.2.1 Moisture Swellable Material

In one form of the present technology, the adaptive material 13800 is a swellable material. The adaptive material 13800 expands as it absorbs liquid or moisture. The swellable material 13800 returns to substantially its original size when the moisture evaporates.

In one form, the swellable material 13800 is a swellable foam that increases in size with the absorption of moisture. For example, the swellable foam may be a polyurethane foam. In other embodiments, the swellable material 13800 includes sodium acrylamide or nylon.

In one form, the swellable material 13800 is disposed around a perimeter of an opening of the user interfacing structure (e.g., 13300). The swellable material 13800 may extend around the entire perimeter of the user interfacing structure. The swellable material 13800 may also extend around only a portion of the user interfacing structure. For example, the swellable material 13800 may be positioned in order to contact at least one of the user's glabella, nasal ridge, epicranius, sphenoid, outer cheek region between the sphenoid and the left or right zygomatic arch, zygomatic arch, inner cheek region from the zygomatic arches towards the alar crests, and on the user's nasal ridge inferior to the sellion. The swellable material 13800 may expand at any of these regions as the result of the user sweating or due to moisture in the air (e.g., moisture in exhaled air). The expansion of the swellable material 13800 may provide a better contact with the user's face (e.g., greater light sealing) and/or may provide the user with added comfort (e.g., because there is more padding).

In one form, the swellable material 13800 is disposed on the positioning and stabilizing structure (e.g., on the positioning and stabilising structure 13500 in FIG. 89-1). The swellable material 13800 may be included throughout the positioning and stabilising structure 13500, or may be included only in specific locations (e.g., proximate to a posterior region of the user's head) along the positioning and stabilising structure 13500. For example, the swellable material 13800 may be included only on the side strap or temporal connector (see e.g., FIG. 93-2) and/or only on the rear strap (e.g., proximate to the user's occiput as shown in FIG. 89-1). The swellable material 13800 may expand at any of these regions as the result of the user sweating. The expansion of the swellable material 13800 may provide the user with added comfort (e.g., because there is more padding). In other forms, the entire positioning and stabilising structure 13500 may include the swellable material, instead of only discrete locations.

In one form, a rigid support 13808 is provided proximate to the swellable material 13800. The rigid support 13808 may be rigid material added to the head mounted display system, rigid threads sewn into the head mounted display interface, and/or a heat treated and/or lased section of the head mounted display interface. The rigid support 13808 is substantially fixed (i.e., does not expand) with respect to the swellable material 13800. The rigid support 13808 is able to bias or direct the direction of expansion of the swellable material 13800.

In certain forms, the rigid support 13808 may be positioned only partially around the swellable material 13800. For example, the swellable material 13800 may be positioned proximate an inner surface (i.e., the surface configured to contact the user) and the rigid support 13808 may be positioned proximate an outer surface (i.e., a surface facing away from the user). The rigid support 13808 is therefore able to direct the expansion of the swellable material 13800 into the user's face (e.g., to provide additional cushioning).

In certain forms, the swellable material 13800 may surround the rigid support 13808. For example, the rigid support 13808 may limit the inwardly expansion of the swellable material 13800, and direct the expansion radially outward.

5.1.3.2.2 Heat Activated Material

In one form of the present technology, the adaptive material 13800 is a heat activated material 13800. The adaptive material 13800 expands as it absorbs heat. The heat activated material 13800 returns to substantially its original size when the heat dissipates.

In one form, the heat activated material 13800 is a heat activated foam that increases in size with the absorption of heat. For example, the heat activated foam has a close cell foam structure where gas is entrapped and expands when the temperature exceeds a pre-determined value. For example, the heat activated material 13800 includes shape memory alloys or polymers such as polyurethane.

In certain forms, the heat activated material 13800 is activated between 70° F. and 120° F. Preferably, the heat activated material 13800 is activated around body temperature e.g. between 32° C.-34° C. (89.6° F.-93.2° F.) to 38° C.-39° C. (100.4° F.-102.2° F.). In certain forms, the heat activated material 13800 is activated between 75° F. and 115° F. In certain forms, the heat activated material 13800 is activated between 85° F. and 110° F. In certain forms, the heat activated material 13800 is activated between 90° F. and 110° F.

In one form, the heat activated material 13800 is disposed around a perimeter of an opening of the user interfacing structure (e.g., 13300). The heat activated material 13800 may extend around the entire perimeter of the user interfacing structure 13300. The heat activated material 13800 may also extend around only a portion of the user interfacing structure 13300. For example, the heat activated material 13800 may be positioned in order to contact at least one of the user's glabella, nasal ridge, epicranius, sphenoid, outer cheek region between the sphenoid and the left or right zygomatic arch, zygomatic arch, inner cheek region from the zygomatic arches towards the alar crests, and on the user's nasal ridge inferior to the sellion. The heat activated material 13800 may expand at any of these regions as the result of the user sweating or heat created by the head mounted display system. The heat activate material may also expand because conduction from the user's skin and/or convection from the electronics of the head mounted display system. The expansion of the heat activated material 13800 may provide a better contact with the user's face (e.g., greater light sealing) and/or may provide the user with added comfort (e.g., because there is more padding). In other forms, the heat activated material 13800 may be on the user interfacing structure 13300 and may expand to make contact with the user's face, but may not provide a light sealing effect. In other words, the heat activated material 13800 may assist in cushioning the user's face, without sealing against the user's face.

In one form, the heat activated material 13800 is disposed on the positioning and stabilising structure 13500. The heat activated material 13800 may be included throughout the headgear, or may be included only in specific locations (e.g., proximate a user's temple). For example, the heat activated material 13800 may be included only on the side straps or the temporal connectors (see e.g., FIG. 93-2) and/or only on the rear strap (e.g., against the user's occiput like in FIG. 89-1). The heat activated material 13800 may expand at any of these regions as the result of the user sweating. The heat activated material may also expand because of conduction from the user's skin. The expansion of the heat activated material 13800 may provide the user with added comfort (e.g., because there is more padding). In other forms, the entire positioning and stabilising structure 13500 may include the heat activated material, instead of only discrete locations.

In certain forms, the textile material 13812 is a partially insulated material, which may slow the heat transfer to the adaptive material 13800. The adaptive material would not expand as soon as the user interfacing structure 13300 was applied. Instead, the adaptive material 13800 may not reach the necessary expansion temperature for a period of time (e.g., 30 minutes, one hour, two hours, etc.) after the head mounted display system is applied. For example, this may not occur until the user has begun using the head mounted display system.

In one form, a rigid support 13808 is provided proximate to the heat activated material 13800. The rigid support 13808 may be a rigid material added to the head mounted display interface, rigid threads sewn into the head mounted display interface, and/or a heat treated and/or lased section of the head mounted display interface. The rigid support 13808 is substantially fixed (i.e., does not expand) with respect to the heat activated material 13800. The rigid support 13808 is able to bias or direct the direction of expansion of the heat activated material 13800.

In certain forms, the rigid support 13808 may be positioned only partially around the heat activated material 13800. For example, the heat activated material 13800 may be positioned proximate an inner surface (i.e., configured to contact the user) and the rigid support 13808 may be positioned proximate an outer surface (i.e., opposite to the inner surface). The rigid support 13808 is therefore able to direct the expansion of the heat activated material 13800 into the user's face (e.g., to provide more cushioning).

In certain forms, the heat activated material 13800 may surround the rigid support 13808. For example, the rigid support 13808 may limit the inwardly expansion of the heat activated material 13800, and directs the expansion in a radially outwardly direction.

5.1.3.2.3 Auxetic Materials

In one form of the present technology (see e.g., FIGS. 68 and 69), the adaptive material 13800 is an auxetic material. The adaptive material 13800 expands as it receives a tensile force F (e.g., in a direction perpendicular, parallel, and/or oblique with respect to the force vector). The auxetic material 13800 returns to substantially its original size when the tensile force F is removed. The auxetic material 13800 is generally aligned with the tensile force. If the tensile force and the auxetic material 13800 are not aligned, the force may not cause the auxetic material 13800 to expand.

In one form, the auxetic material 13800 is an auxetic foam that increases in size (e.g., width) with the application of tension. For example, the auxetic foam may be a polyurethane foam. In other embodiments, the auxetic material 13800 may include silicon or polyurethane.

In one form, the auxetic material 13800 is an auxetic thread that increases in size (e.g., diameter) with the application of tension. For example, the auxetic thread may be thermal yarns.

In one form, the auxetic material 13800 is disposed around a perimeter of an opening of the user interfacing structure (e.g., 13300). The auxetic material 13800 may extend around the entire perimeter of the user interfacing structure 13300. The auxetic material 13800 may also extend around only a portion of the user interfacing structure 13300. For example, the auxetic material 13800 may be positioned in order to contact at least one of the user's glabella, nasal ridge, epicranius, sphenoid, outer cheek region between the sphenoid and the left or right zygomatic arch, zygomatic arch, inner cheek region from the zygomatic arches towards the alar crests, and on the user's nasal ridge inferior to the sellion. The auxetic material 13800 may expand at any of these regions as the result of tension applied by the positioning and stabilising structure (e.g., 13500). The expansion of the auxetic material 13800 may provide a better contact with the user's face (e.g., greater light sealing) and/or may provide the user with added comfort (e.g., because there is more padding). In other forms, the auextic material 13800 may be on the head mounted display interface and may expand to make contact with the user's face, but may not provide a light sealing effect. In other words, the auextic material 13800 may assist in cushioning the user's face, without sealing against the user's face.

In one form, the auxetic material 13800 is disposed on the positioning and stabilising structure 13500 (e.g., on the headgear). The auxetic material 13800 may be included throughout the headgear, or may be included only in specific locations (e.g., proximate the user's temple). For example, the auxetic material 13800 may be included only on the side straps and/or the temporal connectors (see e.g., FIG. 93-2) and/or only on the rear strap (e.g., proximate to the user's occiput as shown in FIG. 89-1). The auxetic material 13800 may expand at any of these regions as the result of tension applied to the positioning and stabilising structure 13500 (e.g., headgear). The expansion of the auxetic material 13800 may provide the user with added comfort (e.g., because there is more padding).

In one form, a rigid support 13808 is provided proximate to the auxetic material 13800. The rigid support 13808 may be rigid material added to the head mounted display system, rigid threads sewn into the head mounted display system, and/or a heat treated and/or lased section of the head mounted display system. The rigid support 13808 is substantially fixed (i.e., does not expand) with respect to the auxetic material 13800. The rigid support 13808 is able to bias or direct the direction of expansion of the auxetic material 13800. The rigid support 13808 is also able to transfer tension to areas of the head mounted display system not aligned with the tensile force F, that otherwise would not expand when tension was applied to the head mounted display interface.

In certain forms, the rigid support 13808 may be positioned only partially around the auxetic material 13800. For example, the auxetic material 13800 may be positioned proximate an inner surface (i.e., configured to contact the user's head) and the rigid support 13808 may be positioned proximate an outer surface (i.e., opposite the inner surface). The rigid support 13808 is therefore able to direct the expansion of the auxetic material 13800 into the user's face (e.g., to provide additional cushioning).

In certain forms, the auxetic material 13800 may surround the rigid support 13808. For example, the rigid support 13808 may limit the inwardly expansion of the auxetic material 13800, and direct the auextic material 13800 to expand radially outward.

5.1.3.2.4 Combination of Adaptive Materials

In one form of the present technology, multiple adaptive materials 13800 may be used together in order to act in concert. For example, the user interfacing structure 13300 and/or the positioning and stabilising structure 13500 may include a pair of adaptive materials.

In certain forms, the adaptive materials 13800 have the same adaptive properties. For example, both adaptive materials 13800 may have auxetic properties. The first adaptive material may expand while under a first range of tensions, and the second adaptive material may expand while under a second range of tensions (i.e., the adaptive materials 13800 are staged).

In certain forms, the first adaptive material has a different adaptive property than the second adaptive material. For example, the first adaptive material 13800 may have auxetic properties and expand when tension T is applied. As the first adaptive material expands, the second adaptive material 13800 may not expand, and may actually compress as the first adaptive material 13800 expands into the second adaptive material 13800.

The second adaptive material 13800 may expand because of moisture and/or heat, in addition to the expansion of the first adaptive material 13800. The first adaptive material 13800 may limit the inward expansion of the second adaptive material 13800 (e.g., because the applied tension T causes the first adaptive material 13800 to maintain its outer shape).

The staged expansion may be useful to create a better seal (e.g., a light seal) and/or provide additional comfort as a user wears the head mounted user interface. For example, the first adaptive material 13800 (e.g., an auxetic material) may expand when the positioning and stabilising structure 13500 is tightened on the user's head. During use, the second adaptive material 13800 may slowly expand as the user wears the head mounted display system (e.g., as heat transfer and/or liquid absorption occur). The second adaptive material 13800 may fill in any space and maintain a cushioned engagement against the user's face. The second adaptive material 13800 may also expand more slowly than the first adaptive material 13800 so that the headgear of the positioning and stabilising structure is not too tight (e.g., uncomfortable to wear).

In one form, the first adaptive material 13800 and the second adaptive material 13800 may be reversed (e.g., the first adaptive material 13800 is moisture and/or heat activated, and the second adaptive material 13800 is an auxetic material). The first adaptive material may expand first (e.g., as a result of heat transfer and/or liquid absorption). The first adaptive material 13800 applies tension T to the second adaptive material 13800 as the first adaptive material 13800 expands. The tension T produced as a result of the first adaptive material 13800 expanding causes the auxetic second adaptive material 13800 to expand.

In one form, the side straps of the positioning and stabilising structure 13500 bifurcate from the display housing 13200 on each respective side. An opening may be formed between the bifurcated side straps on the respective side. In some embodiments, an adaptive material 13800 (e.g., a moisture and/or heat activated material) is disposed in the opening. As the adaptive material 13800 expands, the side straps receive a tensile force. The side straps may include an additional adaptive material 13800 which may have auxetic properties. As the adaptive material 13800 in the bifurcated region expands, the adaptive material 13800 lining the side straps may also expand.

In some forms, a stiffened or rigid member may be connected in the same location as the adaptive material 13800. For example, the stiffened or rigid member may be threaded through the adaptive material 13800 and/or may be imbedded within the adaptive material 13800. In some forms, the stiffened or rigid member may be a metal wire or metal thread, or may be a stiffening portion 13900 (as described below).

In some forms, the stiffened or rigid member may limit the expanded and/or compressed shape of the adaptive material 13800. For example, the stiffened or rigid member may provide a maximum compressed shape for the adaptive material 13800. This shape may conform to a particular user's face buy may not allow the adaptive material 13800 to completely compress.

Although described above in certain examples, any combination of the adaptive materials 13800 could be incorporated in any location through the head mounted display system.

5.1.3.3 Stiffening Portions

As shown in FIGS. 74-84, one form of the present technology includes a head mounted display system with stiffening portions 13900 that include material properties adapted to resist an external force (e.g., a tensile force and/or a compressive force).

In some embodiments, the stiffening portions 13900 are mouldable or capable of being formed into a shape so as to provide a better fit with the user's face for improved comfort. For example, the material of the stiffening portions 13900 may include thermoplastic or thermosoftening plastic which have activation agent dependent material properties e.g. its material properties such as stiffness is altered when its temperature is within a predetermined range. In this embodiment, the stiffening portions 13900 may include phase change materials which are activated when it is around body temperature i.e. the phase of the stiffening portions 13900 shift from solid to liquid or vice versa thereby altering its stiffness depending on the temperature range.

In some embodiments, elevated temperatures result in the stiffening portions 13900 becoming more pliable (e.g. the stiffening portions phase change into liquid or semi-liquid) which allows some sections to be made (or moulded or formed) into a specific shape or form. Upon cooling, the stiffening portions 13900 stiffen or solidify thereby forming the head mounted display system 13000 into a shape which conforms to the user's face contour(s) better.

In some embodiments, the stiffening portions 13900 have an altered stiffness upon application of a treatment. In some embodiments, the stiffening portions 13900 alter its material properties, for example stiffness, upon other activation agents (other than temperature). For example, the stiffening portions 13900 are activated by pressure or force which allows the user to form the head mounted display system 13000 whilst it is being worn to ensure that a good fit is achieved. In another embodiment, the activation agent may be liquid or a particular chemical. In other embodiments, the activation agent may be an electrical charge. In this embodiment, the stiffening portions 13900 may be a liquid crystal polymer which stiffens when an electrical charge passes through it. In another embodiment, resistance or electrical tracks are embedded within the stiffening portions which allow electrical current to pass, thereby resulting in a change in temperature.

In certain forms, the head mounted display system 13000 is constructed at least partially from a textile material. As described above, the illustrated embodiments of the head mounted display system 13000 is formed from a one-piece construction of textile, although the head mounted display system 13000 may be constructed in a different fashion using the textile material.

As shown in FIG. 74, the stiffening portions 13900*c* (e.g., a second material) may be a thread (i.e., thread 13900) that is sewn into the textile material 13812 (e.g., a first or base material). In some embodiments, the thread 13900 may be sewn into the textile material 13812 after the head mounted display system 13000 is assembled. In other embodiments, the thread 13900 may be sewn into the textile material 13812 while the head mounted display system 13000 is being assembled. The thread 13900 may be used to couple different layers of the head mounted display system 13000 together.

In certain forms, the thread 13900 is a different material than the textile material 13812. The thread 13900 has different material properties than the textile material 13812, including an increased stiffness as compared to the textile material 13812. In the illustrated embodiment, the thread 13900 is a textile thread; although in other embodiments, the thread 13900 may be another material (e.g., a metal, a plastic, etc.).

In certain forms, the thread 13900 is a different material than the textile material 13812, and includes different material properties after an application of a treatment. For example, the material properties (e.g., stiffness) of the thread 13900 and the textile material 13812 may be substantially the same prior to the application of the treatment. With the application of the treatment, the material properties of the thread 13900 change (e.g., a treatment-induced increase in stiffness). In other embodiments, material properties between the pre-treated thread 13900 and the textile material 13812 may be different, but the treatment still alters the material properties of the thread 13900 (e.g., increases its stiffness).

In certain forms, the treatment may consist of applying heat, pressure, a chemical, or a laser to the thread 13900 (e.g., specific areas or its entire length). Application of one of these treatments causes the stiffness (or other material properties) to alter, and enables the thread 13900 to act as a stiffened portion. These treatments may be applied before or after the thread 13900 is coupled to the textile material 13812. The treatment may also be in the form of an external force applied after the head mounted display system 13000 is constructed. For example, the thread 13900 may be made from an adaptive material 13800 (e.g., an auxetic material), and would increase in stiffness when the usage conditions changed (e.g., a tensile force was applied). In some embodiments, the treatment may include a combination of applying heat, pressure, a chemical, or a laser, as well as an external force.

In other forms, the stiffened portion 13900 may not be a thread and/or the stiffened portion 13900 may be coupled to the textile material 13812 in a different manner. This may include adhesives (e.g., glue), fasteners (mechanical, magnetic, etc.), or any other suitable means.

In certain forms, the textile material 13812 is unaffected by the application of the treatment to the thread 13900. In other words, the textile material 13812 includes no treatment-induced properties that change as a result of the application of the treatment. Thus, the treatment may be applied while the thread 13900 is coupled to the textile material 13812, without changing the material properties of the textile material 13812.

5.1.3.3.1 Locations

As shown in FIG. 3*a*-2, 3*c*-1, 4*a*-2, 4*c*-1, 5*a*-2, 41A-1, 89-5, and 93-1, the stiffening portions (or stiffeners) 13900 are coupled to the head mounted display system (e.g., 13000) in a variety of locations. Specifically, the stiffening portions 13900 are coupled to the user interfacing structure 11, 111, 211, 1311, 3800, 13300 and/or the positioning and stabilising structure 14, 114, 214, 1300, 13500, 15500. In other words, at least one stiffening portion 13900 may be coupled to the positioning and stabilising structure, to the user interfacing structure, or both the positioning and stabilising structure and the user interfacing structure. A stiffening portion 13900 may also be coupled to any other portion of the head mounted display system without departing from the scope of the present technology.

The following description is focused on the stiffening portions 13900 used in the head mounted display system 13000 as one example, although the description is equally applicable to any other example of head mounted display interface.

In one form of the present technology, the user interfacing structure 13300 may include a first or upper stiffener 13900 and a second or lower stiffener 13900. The upper stiffener 13900 and the lower stiffener 13900 are made from the same material; although in other embodiments, they may be different materials.

The upper and lower stiffeners 13900, 13900 may be positioned proximate outer edges of the user interfacing structure 13300. Together, the upper and lower stiffeners 13900, 13900 substantially traverse the perimeter of the user interfacing structure 13300. Each stiffener 13900, 13900 is also a continuous member (e.g., the upper stiffener 13900 is made from a continuous thread).

By including the stiffeners 13900 around substantially the entire perimeter of the user interfacing structure 13300, the entire outer perimeter of the user interfacing structure 13300 can maintain its shape under the application of a force (e.g., a compressive and/or tensile force). By maintaining its shape, particularly under tensile forces from the positioning and stabilising structure 13500, the user interfacing structure 13300 can maintain better contact against the user's face.

In some forms, having stiffeners 13900 extend around substantially the entire perimeter of the user interfacing structure 13300 may not be ideal. Certain portions of the user's face may be better adapted to support tensile forces than others (e.g., the nasal bridge or sellion is less adapted to handle a tensile force than a portion of the user's cheek). In this case, it is beneficial to include stiffeners 13900 only along those regions, so that the user interfacing structure 13300 has more flexibility at other locations (e.g., to adapt to contours unique to a user's face).

In some forms, the stiffeners 13900 may extend at least partially around a portion of the user interfacing structure 13300 that is intended to contact the user's face without forming a seal (e.g., a light seal). The same advantages as described above can still be achieved in directing forces away from sensitive regions of the user's face.

When a force is applied to the user interfacing structure 13300, the stiffeners 13900 direct the forces toward locations that do not include stiffeners 13900. In other words, the user may feel the forces proximate the zygomatic arch (e.g., where there is more skin, muscle, etc.), where receiving forces are more comfortable. The user may feel limited forces at the sellion (e.g., where there is less skin, muscle, etc.), where applied forces create additional discomfort. Creating greater discontinuities in the stiffeners 13900 (e.g., positioning the stiffeners 13900 around only a portion of the perimeter of the user interfacing structure 13300) may reduce manufacturing costs because fewer stiffeners and/or treatments are needed. Additionally, this may promote user compliance because the user interfacing structure 13300 may be more comfortable to wear, since it is able to form to the contours of the user's face, while also limiting forces on sensitive areas (e.g., the sellion).

In the illustrated embodiment, the stiffeners 13900 each extend onto the straps of the positioning and stabilising structure 13500. As described above, the user interfacing structure 13300 and the positioning and stabilising structure 13500 are formed from a single piece of textile material. At least one of the temporal connectors is permanently connected to the display unit housing 13200, so the stiffeners 13900 may extend continuously from one side of the positioning and stabilising structure 13500, along the user interfacing structure 13300, and to the other side of the positioning and stabilising structure 13500.

In one form, each stiffener 13900 is disposed proximate an outer edge of each side strap. This maintains a spacing between the stiffeners 13900. The stiffeners 13900, are capable of transferring forces from the user interfacing structure 13300 to the positioning and stabilising structure 13500. This substantially limits forces applied directly to the front of a user's face, and instead directs the forces to the lateral regions of the user's head (e.g., the cheeks). This may be more comfortable for a user, as force is directed away from sensitive areas in the oro-nasal region. Additionally, the stiffeners 13900 may assist in maintaining the shape of the user interfacing structure 13300, while also providing a light seal sufficiently strong enough to block ambient light. The transition 3328 (e.g., proximate to the anterior end 28 of the temporal connector 18) between the user interfacing structure 13300 and the positioning and stabilising structure 13500 may be in contact or to proximate the user's face. It may be beneficial to have this region remain proximate to the user's face in order to maintain the contact between the user interfacing structure 13300 and the user's face.

In certain forms, multiple stiffeners 13900 may be used along the length of the positioning and stabilising structure 13500. For example, stiffeners 13900 may be purposefully left out of certain areas of the positioning and stabilising structure 13500. These areas may sit along regions of the user's face most suited for receiving a load (e.g., cheeks). Stiffeners 13900 may be disposed on either side of these areas in order to direct the force specifically to those areas. As shown in FIG. 3a-2, stiffeners 13900 are spaced apart from one another around the different straps. An unstiffened region 13902 (see e.g., FIG. 75) is disposed in the gap between the adjacent stiffeners 13900. The unstiffened regions 13902 may have a greater degree of flexibility as compared to the regions with the stiffeners 13900.

In other forms, the stiffeners 13900 may extend substantially along the length of the straps of the positioning and stabilising structure 13500 (e.g., a single stiffener 13900 may extend the entire length of the positioning and stabilising structure 13500). In other words, there may be no unstiffened regions along the straps, and/or along the positioning and stabilising structure 13500 as a whole.

In one form (see e.g., FIGS. 14a and 14b), the positioning and stabilising structure 614 includes ear pieces 662 that define a generally ring shape and fit around a user's ear. The ear pieces 662 may be formed (partially or entirely) from a textile material, and stretch and deform as they pass over the user's ear.

It may be desirable for the ear pieces 662 to maintain their ring shape. This will assist the user in more easily removing the ear pieces 662, and preventing unnecessary forces on the ear (e.g., pinching), which may be uncomfortable or painful.

The ear pieces 662 may be formed with stiffeners 13900 so that they maintain their ring shape under forces. Each ear piece 662 may include a pair of ear stiffeners 13900. The ear stiffeners 13900 are separate from the stiffeners 13900 on the straps of the positioning and stabilising structure 614 (e.g., separate pieces of thread). Together, each pair of ear stiffeners 13900 may extend only partially around the ear pieces 662. This allows the ear piece 662 to flex in order to fit around different shaped ears, but also maintains rigidity in the ear piece 662 in order to maintain the general shape of the ear piece 662.

In one form (see e.g., FIG. 3c-1), the positioning and stabilising structure 18 includes a top strap 48 that extends between the parietal portion 38. Top stiffeners 13900 can be coupled at various positions along the top strap 38.

In the illustrated embodiment, multiple stiffeners 13900 (e.g., formed from multiple threads) are formed along the length of the top strap 38. The stiffeners 13900 may assist in maintaining the shape of the top strap 38. The top strap 38 may also be allowed to flex (e.g., expand) along locations without the stiffeners 13900. This allows the top strap 38 to adjust to a specific contour and/or size of a user's head. In other words, the top strap 38 may expand in predetermined locations in order to provide a better fit on the user's head (e.g., so that it is not too tight).

In one form (see e.g., FIG. 3a-2), the positioning and stabilising structure 14 includes an occipital portion 40 that overlays the user's occipital bone. In the illustrated embodiment, the different straps of the positioning and stabilising structure 14 as a whole to be formed from a one-piece textile construction.

The occipital portion 40 engages the occiput of the user's head. In order to provide a secure fit for the user, the occipital portion 40 is able to adjust (e.g., stretch) in order to conform to the user's head. Back stiffeners 13900 can limit the adjustment, so that the occipital portion 40 may remain snug against the user's head. This may assist in providing a comfortable engagement between the display housing 12 and the user's face.

5.1.3.3.2 Combination of Materials

As shown in FIGS. 75 and 76, the textile 13812 is movable between a relaxed position (see e.g., FIG. 75) and a stressed position (see e.g., FIG. 76). In the relaxed position, the unstiffened region 13902 is substantially the same thickness as the regions with the stiffeners 13900.

As shown in FIG. 76, when a tensile force is applied to the textile 13812 (e.g., the textile 13812 stretches as a result of a larger user's head), a thickness of the unstiffened region 13902 decreases, and the total length of the textile 13812 increases. The stiffeners 13900 direct the force to act in the unstiffened region 13902, so that the region with the stiffeners 13900 does not stretch, or stretches by a limited amount as compared to the unstiffened region 13902. By directing the forces, the user may only experience the force in an unstiffened region 13902.

As shown in FIGS. 77 and 78, an adaptive material 13800 is disposed in the unstiffened region 13902. Specifically, the adaptive material 13800 may be an auxetic material, although other types of adaptive materials may be used. In the relaxed position, the auxetic material 13800 is unstressed and is substantially the same thickness as the region with stiffeners 13900.

As shown in FIG. 78, when a tensile force is applied to the textile 13812 a thickness of the unstiffened region 13902 increases, and the total length of the textile 13812 increases.

As described above, the auxetic material 13800 is disposed in specific places on the head mounted display system in order to provide specific benefits (e.g., improved light sealing, improved cushioning, etc.) to the user. The stiffeners 13900 transfer forces to the auxetic material, so that the auxetic material 13800 expands. The stiffeners 13900 also limit expansion in areas lacking the auxetic material so that only the auxetic materials 13800 are able to expand. Additionally, the stiffeners 13900 limit expansion of other materials into the stiffeners (i.e., compression of the region containing the stiffeners 13900). This is particularly useful in controlling the expansion of the auxetic materials 13800 so that the expansion only occurs in desired locations.

With reference to FIG. 20a-1, stiffeners may be included proximate the magnetic section 3314. For example, the entire perimeter of the magnetic sections 3314 may include stiffeners. This could be a separate stiffener, or the magnetic section 3114 may include stiffened properties. Treatment can be applied to these stiffeners to increase the stiffness of the magnetic sections 3114. In use, this may provide for a stronger magnetic connection when connecting to the display unit housing because the sections are stiffeners and better able to sit flush with one another.

As shown in FIGS. 79-81, the stiffeners 13900 may be made from a thread of adaptive material. In other words, the adaptive material may be a textile, and a thread of that textile may be used to construct the stiffener 13900. In the relaxed position (see e.g., FIG. 79), the stiffeners 13900 are also in a relaxed position, as is the rest of the textile material 13812.

The textile 13812 of FIGS. 80 and 81 work in reverse from the textile in FIG. 78. In other words, instead of using the stiffeners 13900 to direct the forces to the unstiffened region 13902, the forces are directed to the stiffeners 13900 themselves. The textile 13812 functions as a staged spring. In other words, as a force is applied, the auxetic material 13800 in the stiffeners 13900 expands. However, the region containing the stiffeners 13900 may not substantially expand. This may provide benefits to the user in those specific regions. Additionally, the unstiffened region 13902 is configured to not deform while this occurs (see e.g., FIG. 80). As the force increases, the auxetic material 13800 reaches its maximum expansion, and the unstiffened region begins to deform (see e.g., FIG. 81).

In other embodiments, the staged process may be reversed. In other words, the unstiffened region 13902 expands first to a maximum length (see e.g., FIG. 81). While this occurs, expansion into the region with the stiffeners 13900 does not occur. If a force is applied past the maximum expansion of the unstiffened region 13902, the auxetic material in the stiffeners 13900 then expands (see e.g., FIG. 80).

In either embodiment, the user may receive benefits from the staged expansion in the textile 13812. The user is able to stretch the textile 13812 in order to comfortably wear the head mounted display system 13000. The auxetic material 13800 may also provide benefits to the user in sensitive locations, while still directing the forces to the unstiffened region 13902.

5.1.3.3.3 Custom Fitted User Interfaces

In one form, the head mounted display interface 13000 is constructed with the textile material 13812 and include one or more sections with thread 13900 that has not been treated (i.e., is not stiffened). The thread 13900 may have a similar stiffness (or other material property) to the textile material 13812, or the thread 13900 may have a different stiffness (i.e. be stiffer or less stiff) compared to the textile material 13812. In some embodiments, the sections with the thread 13900 is not at its maximum stiffness.

In certain forms, the head mounted display interface 13000 is customizable for an individual user. The entire head mounted display interface 13000 may include the thread 13900, and selective areas will be stiffened in order to conform to an individual user's facial structure or contour. Alternatively, certain sections of the head mounted display interface 13000 include the thread 13900 and selective areas of the sections may be stiffened to conform an individual user's facial structure. This will provide each user with a custom fit that may improve comfort, in order to enhance a user's experience.

As shown in FIG. 82, the head mounted display interface 13000 is constructed at step 13950 (e.g., as one piece from the textile material 13812). The thread 13900 may be added to the head mounted display interface 13000 at step 13950. Alternatively, the thread 13900 may be added at step 13955. The thread 13900 may be added at step 3955 as one continuous thread 13900, or multiple threads 13900 may be added in order to provide discontinuities between the threads 13900 (e.g., and create unstiffened regions 13902).

In some embodiments, an individual user's face is scanned, analysed and/or measured at step 13960 in order to identify and map facial topography. For example, a computing device (e.g a laptop, mobile phone or tablet) receives data associated with a user's face (e.g. uploaded by a user or retrieved from data storage). Advantageously, the computing device includes a camera which is configured to capture an image of the user's face or an infrared camera, for example, configured to obtain a 3D scan of a user's face. A computer system may use this data to map out the ideal locations for stiffening i.e. locations where treatment should be applied to the thread 13900. For example, the computer system may determine locations on the user's face less adapted to support a tensile load. The computer system may also determine the amount of stiffening needed at each of the identified locations. For example, there may be degrees of adjustment for each stiffener 13900 so locations least adapted to support a tensile load may be determined to require the most stiffening. There may be a relationship (e.g., linear, exponential, logarithmic, etc.) between the points identified as less adapted to support a tensile load, and the amount of stiffening applied. The computer system may be part of the computing device used to receive data associated with the user's face. Alternatively, the computer system part of a cloud computing network and is in communication with the computing device.

This may be useful for customizing the stiffening in the user interfacing structure 13300 in order to better engage with each user's unique facial contours. For example, a user with a larger nose (e.g., a larger sellion) may require additional stiffening in that region than a user with a smaller nose.

In other examples, the computer system may map out locations which would benefit from reshaping i.e. locations where treatment should be applied to the thread 13900 to reshape or reform certain sections of the head mounted display interface 13000 to better fit the user's unique facial contours. The computer system may display recommendations for customizing the head mounted display interface 13000, for example, on a display. For example, an image, or a plurality of images, of the head mounted display interface 13000 and may indicate which sections of the thread 13900 that should be stiffened or reshaped to achieve better comfort.

In other examples, the user may use a form-to-shape template in order to manually map or trace the user's face. The template may be provided or sent to the user. Subsequently, the template may be pressed against the user's face so that the template conforms to the shape of the user's facial structure. In other words, a trace of the user's face is obtained. This technique may similarly identify locations on the user's face where stiffening may be beneficial (e.g., at locations not adapted to support tensile loads) without requiring a computer to scan the user's face. In some forms, the template may be loaded into a computer after the trace is complete.

A treatment can be applied, at step 13965, to an individual's head mounted display system 13000 after the scanning step 13960 is complete. The treatment further stiffens the thread 13900 at locations identified by the computer system as needing additional stiffness. These treatments may include applying lasers, heat (e.g. adjusting the temperature surrounding the head mounted display system 13000), pressure, or any other similar method. After the treatment is applied 13965, the head mounted display interface 13000 is customized for a specific user. In some embodiments, a successive treatment may be applied in order to remove some stiffness from the threads 13900. For example, the user's face may need to be rescanned 3960 and the treatment reapplied 13965 if the initial fit was not appropriate (e.g., not comfortable).

In some forms, the treatment can be applied, at step 13965, by an individual user. For example, the stiffener 13900 may be a thermal fusible yarn, which may stiffen upon the application of heat. The user may general sufficient heat from common household appliances (e.g., a hairdryer, an iron, etc.). This may allow a single or relatively few varieties of manufactured head mounted display system 13000, and each individual user may be able to customize their own unique fit, which may reduce manufacturing costs.

In certain embodiments, the computer system or computing device receives or calculates position data from step 13960. For example, position data corresponds to ideal locations on the head mounted display interface 13000 for treatment-induced stiffness increases, based on the user's facial geometry and/or contours. In some embodiments, the computer system or computing device may actuate a device to provide treatment based on the position data i.e. to the threads 13900 to the identified locations. The actuation of the laser emitting device may include a mapped route of locations (i.e. coordinates) and/or the total time of treatment to be applied at each location. A greater amount of treatment may be applied to locations less adapted to handle tensile forces (e.g., the bridge of the user's nose). The position data may also instruct a laser emitting device to stop emitting at certain locations on the head mounted display interface 13000 where treatment-induced stiffness increases are not needed for the particular user. In this way, each head mounted display interface 13000 may be customized for a particular user using the individual position data.

In other forms, the laser may be replaced with any other treatment applicator. For example, the position data may be used to control a heat source, a pressure source, a chemical applicator, or any other similar device. Each applicator may be controlled in a similar manner as the laser emitting device.

In still other forms, the laser emitting device, or other applicator, may be controlled by hand. For example, at the step of scanning and measuring 13960, position data is obtained from one or more images or scanned media of the user's face. A person, e.g. the user, can then use the position data to identify corresponding locations on the head mounted display interface 13000 which would benefit from treatment and apply the treatment 13965.

As shown in FIG. 83, the head mounted display interface 13000 is constructed at step 13950 (e.g., as one piece from the textile material 13812). In this embodiment, the threads 13900 are not included on the head mounted display interface 13000 at this step (e.g., the head mounted display interface 13000 includes no stiffeners 13900).

Next, an individual user's face is scanned and measured at step 13960 in order to identify and map facial topography. The computer system can use this data and map out the ideal locations threads 13900 to be applied. Specifically, this may be useful for customizing the stiffening in the user interfacing structure 13300 in order to identify where stiffeners 13900 would be most useful to be applied on a head mounted display interface 13000 for a specific user.

Treatment is then applied at step 13965 to threads 13900 using any method previously described to stiffen the threads 13900. In this embodiment, the treatment is applied indiscriminately to the thread 13900. At the instant that the treatment is applied 13965, the threads 13900 are separate (e.g., uncoupled) from the head mounted display interface 13000, and stiffening the thread 13900 does not affect the head mounted display interface 13000.

Once the threads 13900 have been treated, they are coupled at step 3955 (e.g., sewn into) to the head mounted display interface 13000 at locations identified by the computer system. For example, the computer system or computing device may have identified specific locations along the user interfacing structure 13300 where the threads 13900 may provide increased benefits to the user. In some embodiments, some stiffeners 13900 may be coupled to the head mounted display interface 13000 prior to scanning the user (e.g., on the positioning and stabilising structure 13500), and the results from scanning the user 13960 may be used to couple stiffeners 13900 to the user interfacing structure 13300.

As shown in FIG. 84, the head mounted display interface 13000 or a portion of the head mounted display interface 13000 (e.g., the user interfacing structure 13300 or the positioning and/or stabilising structure 13500) may be constructed at step 13950 from the thread 13900. In other words, the material used to make the thread 13900 is used to construct the head mounted display interface 13000. In this embodiment, the locations that can be stiffened are not delineated by when a thread may be coupled. In other words, any portion of the head mounted display interface 13000 that includes the material 13900 may be stiffened. This may allow for greater customization, and ultimately greater benefits to the user.

Next, an individual user's face is scanned and measured at step 13960 in order to identify and map facial topography. The computer system or computing device can use this data and map out the ideal locations for treatment to be applied. While threads are thin and may only be able to be coupled in particular locations, constructing the head mounted display interface 13000 from the material allows more locations to be stiffened, while also easily changing the thickness of the stiffened area.

Treatment is then applied at step 13965 to material 13900 using any method previously described to stiffen the threads 13900. In this embodiment, the treatment is applied across the surface of the head mounted display interface 13000 at any location identified by the computer system. Once the treatment is applied, the head mounted display interface 13000 (e.g., the user interfacing structure 13300 and/or the positioning and stabilising structure 13500) is stiffened and customized for a particular user.

In certain forms, any combination of these steps can be used on a single head mounted display interface 13000. For example, portions of the head mounted display interface 13000 may be constructed out of the material 13900, while other portions may be constructed out of the textile material 13812 with threads 13900 added and/or stiffened at locations specified by the computer program.

5.1.3.4 Cleaning Assisted Textiles

As shown in FIGS. 85 to 88, one form of the present technology includes a head mounted display interface 13000 made from a material such as textile materials, for example, that promotes a sanitary environment for using the head mounted display interface 13000. The textile materials assist the user in maintaining a clean or substantially clean head mounted display interface 13000 (e.g., reduce pathogens, adhesion of biofilm and/or other debris), in order to promote enjoyment and/or limit illness associated with wearing the head mounted display interface 13000.

In some forms (see e.g., FIG. 3*a*), the head mounted display interface 10 rests against the user's head during use. Over the course of use, sweat and other debris (e.g., dirt, bacterial, etc.) may transfer from the user to the head mounted display interface 10, for example on inner surface in contact with the user. Similarly, sweat and debris may also transfer to other locations on the head mounted display interface 10 in contact with the user (e.g., the inner surface the positioning and stabilising structure 14). During normal use, a layer of debris (e.g., biofilm) may build up along locations in contact with, or adjacent to, the user. In addition, some growth of microorganisms/microbrial organisms such as bacteria, fungi, yeast or algae may occur on some textile materials which may have been exacerbated by adhesion of biofilm on the textile material. The adhesion of biofilm is undesirable as it may cause odour (due to the growth of bacteria, for example) and/or may also cause degradation of the textile material.

The condensation, sweat, and/or debris built up during use of the head mounted display interface 10 may settle while the device is not being worn. The biofilm present when the head mounted display interface 10 is removed after use may remain and or increase (e.g., aided by the condensate). When the user dons the head mounted display interface 10 for a successive use, the built up biofilm may be transferred back to the user's skin. This could introduce new bacteria to the user's immune system, which could lead to various illnesses.

5.1.3.4.1 Materials

In one form, the textile used to construct the head mounted display system 13000 has one or more surface properties that assist in limiting and/or preventing the build-up or adhesion of biofilm or other debris on the head mounted display system 13000 i.e. the material properties of the textile makes it a self-cleaning or easily cleanable material. For example, the surface property of the textile may be imparted by or attributable to a surface structure (e.g. microstructure) or a chemical or biological substance (e.g. coating).

For example, a chemical treatment including one or more chemicals or biological substances that provide anti-bacterial or anti-microbial properties may be coated on a surface of the textile. For example, anti-microbial technology or antibacterial agents may work at a cellular level to continually disrupt the growth and reproduction of microorganisms. Some examples of anti-microbial agents includes quaternary ammonium compounds (QACs), triclosan (i.e., 2,4,4'-trichloro-2'-hydroxydiphenyl ether ($C_{12}H_7Cl_3O_2$)), metals or metal compounds (e.g. oxide or salt compounds based on silver, copper, zinc or cobalt).

The surface structure may be a formation and/or contour on a surface of the textile. In some embodiments, the surface structure may be a microstructure that is not visible to the naked eye. Advantageously, the size of the microstructure prevents or limits adhesion of biofilm or other debris. In some embodiments, the size of the microstructure is at a sub-micron level. Preferably, the size of the microstructure results in the water contact angle being low thereby resulting in a reduction in surface tension which limits adhesion of water and/or debris on the textile. The microstructure may be included throughout various parts of the head mounted display system 13000. For example, the microstructure may only be present on portions of the head mounted display system 13000 that regularly contact the user's skin (e.g., the inner surfaces) or is adjacent or nearby these contact areas. In another embodiment, the microstructure may also be included throughout the entire head mounted display system 13000 (e.g., interior and exterior surfaces). Alternatively, the microstructure may be present on selected parts of the head mounted display system 13000 which are susceptible to debris or biofilm adhesion. Advantageously, the surface structure of the textile is hydrophobic (i.e. with a water contact angle of larger than 150°) thereby acting as a shield to avoid water molecules from penetrating inside the fabric layer. This surface structure may be provided by means of a coating (e.g. nanocoating) and/or a water or oil repellent barrier agent.

In some forms, the surface structure may be a natural structure of a given material. In some forms, the surface structure may be formed (e.g., laser edged) into a mold in order to form a molded part with the desired surface structure. In some forms, the surface structure may be formed (e.g., laser edged) onto a component after an initial assembly process (e.g., after molding is completed).

In some forms, different surface structures may provide different visual indications to a user. In some forms, a color may be added to the component with the surface structure. The combination of the color and surface structure may make surface imperfections more apparent to the user.

5.1.3.4.1.1 Rough

As shown schematically and on an enlarged scale in FIG. 85, the textile of the head mounted display system 13000 (e.g., the positioning and stabilising structure 13300) may be formed as a relatively rough surface 7800. A microstructure of the rough surface 7800 includes a plurality of peaks 7802 and valleys 7804. Preferably, the distance between the peaks 7802 and valleys 7804 is a distance which limits and/or prevents the adhesion of biofilm. As shown in FIG. 85, the peaks are separated from each other by a valley i.e. the peak-to-peak distance is the length of a valley. The peak-to-peak distance should be smaller than the size of a water molecule which advantageously limits the penetration of water molecules into the textile. For example, as particularly shown in FIG. 85, the tops of the peaks 7802 are flat. In other embodiments, the tops of the peaks 7802 are rounded and in some other embodiments, the tops of the peaks 7802 are sharp.

While the surface is relatively rough, it is smooth enough so as not to cause discomfort to a user's skin. Advantageously, the coefficient of friction of the textile is a predetermined value and low enough that it touch-feel against a user's skin is comfortable yet high enough for limiting adhesion of biofilm on the peaks.

The rough surface 7800 assists in reducing the adhesive force between biofilm and the textile. The microstructure (i.e., 7802, 7804) is formed so that the biofilm forms on the peaks 7802, but is substantially prevented from reaching the valleys 7804. Thus, the surface contact area of the biofilm is reduced, compared to a surface without the rough microstructure. Any biofilm formed on the textile may be washed away with a cleaning solution (e.g., water, soapy water, etc.). The low adhesive force between the biofilm and the textile makes removing the biofilm easier, than if the microstructure was not present.

In one form, the peaks 7802 may include a hydrophilic layer (e.g., coating) and the valleys 7804 may include a hydrophobic layer (e.g., coating). The hydrophobic layer may limit material (e.g., water, biofilm, etc.) from settling in the valleys 7804, and promote material to settle on the peaks 7802. This may keep material at or near the peaks 7802 so that the material may be more easily cleaned (e.g., because the material is not lodged in the valleys 7804).

5.1.3.4.1.2 Rough with Coated Tips

As shown schematically and on an enlarged scale in FIG. 86, the textile material of the head mounted display system 13000 (e.g., the positioning and stabilising structure 13500) may be infused with a material 7806 to limit the formation of a biofilm. The textile may include a grooved microstructure 7808, with the layer of material 7806 substantially covering the peaks 7810 and valleys 7812 of the microstructure 7808. The material 7806 may be applied at only the peaks 7810 (e.g., the location where the biofilm can adhere). In other forms, the material 7806 may be applied to the valleys 7812 or to both the peaks 7810 and valleys 7812. In some embodiments, only certain peaks 7810 and/or valleys 7812 are coated with the layer of material 7806. In other embodiments, the peaks 7810 are coated with the layer of material 7806 but some valleys 7812 are also coated with the layer of material 7806.

In one form, the material 7808 is a material which provides self-cleaning or anti-bacterial properties such as a metal oxide such as silver or zinc (e.g., pure silver, a silver compound, etc.). The silver 7808 may be applied to the textile as a coat of material. The silver 7808 may also be nano-particles or nano-membrane that are infused with the textile, and form an outer layer. The silver may also be a silver thread that is woven into the textile. Of course, other material which provide similar surface properties may be used as a coating on the textile.

In one form, the silver particles 7808 interfere with the growth of microorganisms that make up the biofilm. In other words, the silver interferes with the microorganism's cells, and limits their growth on the textile. In this way, the textile may be self-cleaning in that it can inactivate or kill microorganisms without a separate inactivation agent (e.g., UV light, soap and/or water, etc.). The silver 7808 present in the textile is itself an inactivation agent. In some embodiments, a self-cleaning textile may also mean a textile which have material properties which make it more easily cleanable.

In certain forms, the valleys 7812 may include a hydrophobic layer (e.g., coating). The hydrophobic layer may limit material (e.g., water, biofilm, etc.) from settling in the valleys 7812, and promote material to settle on the peaks 7810. This may keep material at or near the peaks 7810 so that the material may be forced to interact with the silver 7808 (e.g., and limit the biofilm's growth). Including a hydrophobic layer may also make the textile easier to clean (e.g., because the material is not lodged in the valleys 7812).

5.1.3.4.1.3 Rough with Coated Layer

As shown in FIG. 87, the textile material of the head mounted display system 13000 (e.g., the positioning and stabilising structure 13500) may be coated with a layer of material 7814 intended to assist in the removal of biofilm. The textile 3101 may include a grooved microstructure 7816, with the layer of material 7814 substantially covering the peaks 7818 and valleys 7820 of the microstructure 7816. The layer of material 7814 may be applied so that the peaks 7818 and valleys 7820 are still present. In other words, the layer of material 7814 does not completely fill in the valleys 7820.

In one form, the material 7814 is titanium dioxide or zinc oxide. The titanium dioxide 7814 may be applied to the textile 3101 as a coat of material. The titanium dioxide 7814 may also be nano-particles or nano-membrane that are infused with the textile 3101, and form an outer layer.

In one form, titanium dioxide 7814 defines a photocatalytic material (e.g., a material that speeds up a chemical reaction in the presence of light). For example, titanium dioxide 7814 may specifically react with ultraviolet (UV) light. As the reaction occurs, the titanium dioxide 7814 releases free radicals that interact with the air (e.g., to form ozone). The free radicals then break down and interact with biofilm. This interaction can kill pathogens in the biofilm.

In certain forms, the chemical reaction between the titanium dioxide 7814 and the UV light transforms the surface on which the photocatalytic material is present into a hydrophilic surface. The hydrophilic surface allows water to spread out around the surface (e.g., because the surface attracts water). The water can fill the valleys 7820 and move the biofilm away from the surface of the textile. The water can then be washed away, and carry the biofilm along so that the head mounted display system 13000 is substantially clean.

In some embodiments, the head mounted display system 13000 may be used together with the container 7850 which may include UV light sources 7860a.

5.1.3.4.1.4 Smooth

As shown in FIG. 88, the microstructure 7822 may be smooth and have a relatively low coefficient of friction (e.g., as compared to the embodiments of FIGS. 85-87). While the microstructure 7822 is relatively smooth, it still has a coefficient of friction necessary to enable proper positioning on a user's face. The smooth microstructure 7822 may provide resistance to biofilm formation. In other words, the texture of the surface substantially prevents biofilm from adhering to the surface. As opposed to the rough microstructure 7800 where the grooves reduced the adhesive force of the biofilm, the smooth microstructure 7822 substantially negates any adhesive force so that the biofilm is substantially unable to adhere to the textile.

In certain forms, the microstructure 7822 may include a hydrophobic layer (e.g., coating). The hydrophobic layer may limit material (e.g., water, biofilm, etc.) from settling on the textile, and/or promote material to flow off of the textile so that the material may be more easily cleaned. For example, a coating which imparts hydrophobic properties may be applied on the textile for creating a barrier against water or debris thereby limiting or preventing adhesion on the textile.

5.1.3.4.1.5 Rough with Varying Length

As shown schematically and on an enlarged scale in FIG. 88-1, the textile of the head mounted display system 13000 may be formed as a relatively rough surface 7824. A microstructure of the rough surface 7824 includes a plurality of peaks 7826 and valleys 7828. Preferably, the distance between the peaks 7826 and valleys 7828 is a distance which limits and/or prevents the adhesion of biofilm. As shown in FIG. 88-1, the peaks are separated from each other by a valley. The peak-to-peak distance should be smaller than the size of a water molecule which advantageously limits the penetration of water molecules into the textile. For example, as particularly shown in FIG. 88-1, the tops of the peaks 7826 are flat. In other embodiments, the tops of the peaks 7826 are rounded and in some other embodiments, the tops of the peaks 7826 are sharp.

While the surface is relatively rough, it is smooth enough so as not to cause discomfort to a user's skin. Advantageously, the coefficient of friction of the textile is a pre-determined value and low enough that it touch-feel against a user's skin is comfortable yet high enough for limiting adhesion of biofilm on the peaks.

The rough surface 7824 assists in reducing the adhesive force between biofilm and the textile. The microstructure (i.e., 7826, 7828) is formed so that the biofilm forms on the peaks 7826, but is substantially prevented from reaching the valleys 7828. Thus, the surface contact area of the biofilm is reduced, compared to a surface without the rough microstructure. Any biofilm formed on the textile 3101 may be washed away with a cleaning solution (e.g., water, soapy water, etc.). The low adhesive force between the biofilm and the textile makes removing the biofilm easier, than if the microstructure was not present.

In one form, the peaks 7826 may include a hydrophilic layer (e.g., coating) and the valleys 7828 may include a hydrophobic layer (e.g., coating). The hydrophobic layer may limit material (e.g., water, biofilm, etc.) from settling in the valleys 7828, and promote material to settle on the peaks 7826. This may keep material at or near the peaks 7826 so that the material may be more easily cleaned (e.g., because the material is not lodged in the valleys 7828).

In some forms, the peaks 7826 may be non-uniform. For example, a length of each peak 7826 may be different so that adjacent peaks 7826 are different sizes. As shown in FIG. 88-1, the peaks 7826 may form a repeating diamond pattern, where the length of the peak 7826 oscillates from a minimum, to a maximum, and back to a minimum.

5.1.3.4.1.6 Rough with Overlap

As shown schematically and on an enlarged scale in FIG. 88-2, the textile of the head mounted display system 13000 may be formed as a relatively rough surface 7830. A microstructure of the rough surface 7830 includes a plurality of peaks 7832 and valleys 7834. Preferably, the distance between the peaks 7832 and valleys 7834 is a distance which limits and/or prevents the adhesion of biofilm. As shown in FIG. 88-2, the peaks are separated from each other by a valley. The peak-to-peak distance should be smaller than the size of a water molecule which advantageously limits the penetration of water molecules into the textile. For example, as particularly shown in FIG. 88-2, the tops of the peaks 7832 are rounded or pointed. In other embodiments, the tops of the peaks 7832 are flat.

While the surface is relatively rough, it is smooth enough so as not to cause discomfort to a user's skin. Advantageously, the coefficient of friction of the textile 3101 is a pre-determined value and low enough that it touch-feel against a user's skin is comfortable yet high enough for limiting adhesion of biofilm on the peaks.

The rough surface 7832 assists in reducing the adhesive force between biofilm and the textile. The microstructure (i.e., 7832, 7834) is formed so that the biofilm forms on the peaks 7832, but is substantially prevented from reaching the valleys 7834. Thus, the surface contact area of the biofilm is reduced, compared to a surface without the rough microstructure. Any biofilm formed on the textile may be washed away with a cleaning solution (e.g., water, soapy water, etc.). The low adhesive force between the biofilm and the textile makes removing the biofilm easier, than if the microstructure was not present.

In one form, the peaks 7832 may include a hydrophilic layer (e.g., coating) and the valleys 7834 may include a hydrophobic layer (e.g., coating). The hydrophobic layer may limit material (e.g., water, biofilm, etc.) from settling in the valleys 7834, and promote material to settle on the peaks 7832. This may keep material at or near the peaks 7832 so that the material may be more easily cleaned (e.g., because the material is not lodged in the valleys 7834).

In some forms, the peaks 7832 may be non-uniform. For example, a length of each peak 7832 may be different so that adjacent peaks 7832 are different sizes. As shown in FIG. 88-2, the peaks 7832 may form a repeating diamond pattern, where the length of the peak 7832 oscillates from a minimum, to a maximum, and back to a minimum (e.g., similar to the example shown in FIG. 88-1). Each unit (i.e., a minimum to minimum) may be formed separately from the other units. The units may be arranged in an overlapping pattern, where each unit is at least partially covered by adjacent units.

5.1.3.4.2 Cleaning

The textile material comprising the head mounted display system 13000 may not be entirely self-cleaning (e.g., biofilm or other debris may remain on a surface of the head mounted display system 13000) and/or the user may desire to clean the head mounted display system 13000 (e.g., to ensure that substantially all biofilm is removed). For example, the structure of the textile may limit adhesion of debris, but it may not inactivate the debris (e.g., it is more difficult for pathogens to stick to the textile, but they are still living). In another example, the structure of the textile may reduce the number of pathogens on the textile, but a layer of biofilm (e.g., dead pathogens) may remain. User preference and/or industry standards may determine in what situation the textile is clean (i.e., certain users may accept one situation as being clean, while other users may not).

Cleaning the head mounted display system 13000 may provide the user with an additional assurance that a substantial amount of debris from a previous use will not be transferred to the user or another user on a successive use. Cleaning the head mounted display system 13000 also provides the user the opportunity to take ownership of the cleaning. Either of these may help promote compliance with the therapy, as the user may be more assured that the head mounted display system 13000 is clean and ready to use.

5.1.3.4.2.1 Cleaning Container

As shown in FIGS. 94-99, a cleaning receptacle or container 7850 may be used to clean the head mounted display system 13000 after being worn. The container 7850 works in conjunction with and/or in addition to the textile in order to substantially remove debris from the head mounted display system 13000 and/or to deactivate the debris. Of course, other head mounted display systems (not shown) may be used with the container 7850. Advantageously, the cleaning container 7850 is particularly effective to clean head mounted display system 13000 including textile.

In one form, the container 7850 includes walls 7852 that define an internal cavity 7854. The cavity 7854 is sized to selectively house at least a portion of the head mounted display system 13000. For example, a display unit 13100, a display housing 13200, and a positioning and stabilizing structure 13500 may all fit within the internal cavity 7854 at the same time (e.g., in a coupled position and/or in an uncoupled position). In other examples, the internal cavity 7854 may only be able to hold some of the display unit

13100, the display housing 13200, and the positioning and stabilizing structure 13500 at one time. The container 7850 may include a stand 7886 that supports the head mounted display system 13000.

In one form, the container 7850 includes a lid 7856 movably (e.g., pivotably, slidably, etc.) coupled to one wall 7852. The lid 7856 is movable between an open position, where the internal cavity 7854 is at least partially exposed, and a closed position, where the internal cavity 7854 is covered. The lid 7856 may be retained in the closed position by fasteners 7858a, 7858b (e.g., a mechanical fastener, a magnetic fastener, etc.) in order to substantially prevent the ingress or egress of fluids from the internal cavity 7854 (see e.g., FIG. 95).

In certain forms, at least one hook 7888 is coupled to the lid 7856. In the closed position, the hooks 7888 are positioned within the internal cavity 7854. The hooks can support the weight of the head mounted display system 13000, and suspend the head mounted display system 13000 so that all sides are exposed to be cleaned. Of course, other forms of temporary coupling of the head mounted display system 13000 to the container 7850 may be possible.

As shown in FIGS. 98 to 99, one or more cleaning modules 7860 are disposed throughout the internal cavity 7854. The cleaning modules 7860 are coupled to the walls 7852 and face toward a center of the internal cavity 7854, where the head mounted display system 13000 may be temporarily coupled to the container 7850.

In other embodiments, cleaning may take place in more than one stages. For example, the head mounted display system 13000 may be configured to move with respect to the cleaning modules 7860. Advantageously, this enables more surfaces of the head mounted display system 13000 to be exposed to the cleaning modules 7860. This may also require less cleaning modules 7860 to clean a head mounted display system 13000. For example, the stand 7886 may further include a rotating member which is configured to actuate the stand 7886 to rotate along a central axis so as to rotate the head mounted display system 13000 with respect to the cleaning modules 7860. In certain embodiments, the stand 7886 is exposed to the cleaning modules 7860 for a predetermined amount of time sufficient to clean the exposed surfaces of the head mounted display system 13000, after which the stand 7886 is rotated along a central axis for a predetermined angle of rotation (e.g. 10°) and these steps are repeated until all (or a substantial amount of) the surfaces of the head mounted display system 13000 have been cleaned (i.e. exposed to the cleaning modules 7860).

In another embodiment, the container 7850 conforms to the outline of the head mounted display system 13000 to achieve a more compact form factor which may be more easily transported.

5.1.3.4.2.1.1 UV Light

As shown in FIGS. 98 and 99, one form of the cleaning modules 7860a are UV light sources that emit inactivation agents in the form of UV light. The UV light sources 7860a emit UV light into the internal cavity 7854. The UV light may contact articles within the internal cavity 7854 and provide antiseptic properties.

In certain forms, surfaces of the internal cavity 7854 may be made of a reflective material in order to further distribute the UV light to the cavity 7854. This may assist in directing photons of the UV light to contact all surfaces of the head mounted display system 13000. The UV light sources 7860a may also include an optic (e.g., a diffuser, a diffractor, a reflector, etc.). The optic may be a removable piece or it may be permanently fixed to the UV light source 7860a. The optic may further assist in distributing the UV light around the internal cavity 7854.

In certain forms (see e.g., FIG. 96), the container 7850 includes an electrical cord 7862 to power the UV light sources. The electrical cord plugs into a wall socket, and provides the UV light sources with electrical current. Alternatively, the electrical cord plugs into a port such as a USB, micro USB or USB type-c powered port.

In certain forms (see e.g., FIG. 96), the container 7850 includes an external compartment 7864 that houses batteries 7866 (e.g., rechargeable batteries), which can be selectively positionable within the external compartment 7864 in order provide electrical current to the UV light sources 7860a. The batteries 7866 may be a back up to the electrical cord 7862 (e.g., only provide current when the cord 7862 is not plugged in or the power is out), or the container 7850 may have only batteries 7866 or an electrical cord 7862.

In one form (see e.g., FIG. 97), a wall 7852 of the container 7850 includes a control 7868 that selectively operates the UV light source. The control 7868 may be an electronic screen (e.g., an LCD screen) that allows a user to control a variety of functions of the UV light source 7860a. For example, the control 7868 may turn the UV lights on and off, change the intensity of the UV light, control how longer the UV lights remain on for (e.g., a timer), and/or set a timed delay for the UV lights. Buttons 7870 may be disposed next to the screen 7868 in order to enable user input. In other embodiments, the screen 7868 may be a touch screen or touch switch and the container may not include physical buttons 7870.

In certain forms, the control 7868 may only be operable by the user when the lid 7856 is in the closed position. For example, the fasteners 7858a, 7858b may be electrically connected to the control. In the open position, the fasteners 7858a, 7858b form an open circuit, and the control 7868, or a portion of the control 7868 (e.g., certain features), is inoperable. The user may be unable to turn the UV light sources 7860a on while the internal cavity 7854 is exposed to the ambient. In the closed position, the fasteners 7858a, 7858b form a closed circuit, and the control 7868 is operable.

In use, the user may insert the entire head mounted display system 13000 or a portion of the head mounted display system 13000 into the internal cavity 7854 while the lid 7856 is in the open position. The user may then move the lid 7856 into the closed position. Once the first fastener 7858a is secured to the second fastener 7858b, the user may operate the control 7868. The user selects a desired control pattern (e.g., elapsed time, intensity, etc.). The control 7868 then operates the UV light sources 7860a at the selected control pattern. While the UV light sources 7860a are on, the lid 7856 may remain in the closed position (e.g., locked) so that the user is unable to open the lid 7856. Once the selected control pattern is complete, the lid 7856 unlocks and the user is able to pivot the lid 7856 to the open position and remove the head mounted display system 13000.

Light emitted from the UV light source 7860a interacts with any pathogens present in the internal compartment (e.g., on the head mounted display system 13000). The UV light may kill substantially all of the pathogens present on the head mounted display system 13000. This may reduce adhesion of or eliminate any built up biofilm on exterior surfaces of the head mounted display system 13000 (e.g., the inner surface). The UV light may also penetrate through the outer surface of the head mounted display system 13000 to reduce or eliminate biofilm present on the internal surfaces.

In one form, the light emitted from the UV light source interacts with the photocatalytic layer (see e.g., FIG. 87). Free radicals are generated as the photocatalytic layer absorbs the UV light. These free radicals interact with the air in the internal cavity 7854 (e.g., and create ozone). The free radicals break down and interact with pathogens in present in the internal cavity 7854. The free radicals further assist in reducing or eliminating any built up biofilm on exterior surfaces of the head mounted display system 13000.

In some forms, other types of light may be used to remove biofilm form the head mounted display system 13000. For example, infrared light and/or visible light may be used instead of and/or in addition to UV light. In other forms, sunlight may be used to remove the biofilm, and the user may be able to at least partially clean the head mounted display system without the container 7850.

5.1.3.4.2.1.2 Negative Air Ions

In one form, the cleaning modules 7860 emit negative air ions that act as inactivation agents in the form. The negative air ion sources 7860 emit ions into the internal cavity 7854. The ion may contact articles within the internal cavity 7854 and provide antiseptic properties. The negative air ions may be used alone or with the UV light source (or any other type of cleaning module 7860) in order to more effective remove biofilm from the head mounted display system 13000. In some forms, the UV light source 7860 may provide negative air ions.

5.1.3.4.2.1.3 Liquid Washing

In some forms, the cleaning modules 7860 may be fluid spray nozzles 7860 that emit inactivation agents in the form of cleaning fluid. The fluid spray nozzles 7860 emit a fluid mixture into the internal cavity 7854. The fluid mixture may contact articles within the internal cavity 7854 and provide antiseptic properties, for example.

In some forms, fluid spray nozzles may not be used with the display unit 13100 so that the water does not damage the electronic components. However, the fluid spray nozzles may still be used with the positioning and stabilising structure 13500.

The cleaning module with the fluid spray nozzles are described in Singapore Provisional Application No. 10201914123U, which is incorporated herein by reference in its entirety.

5.1.3.4.2.2 Sensing

In one form, the container 7850 may include a sensor 7884 that detects tears or micro-tears, biofilm, or other imperfections in the head mounted display system 13000 (see e.g., FIGS. 95 to 97). The sensor 7884 may be operated via the control 7868. For example, the user can select the sensor 7884 using the buttons 7870 of the control 7868 and instruct the sensor 7884 to detect one or more imperfections during the selected control pattern.

In one form, the sensor 7884 may move (e.g., along a surface of the lid 7856, pivot in place, etc.) in order to fully scan the internal cavity 7854 or certain sections of the head mounted display system 13000. Alternatively, the head mounted display system 13000 may be placed on a rotating platform so as to allow the sensor 7884 to scan more section of the head mounted display system 13000. The sensor 7884 may track from one side to another in order to detect anything within the internal cavity 7854 (e.g., the head mounted display system 13000), and any associated imperfections.

In certain forms (see e.g., FIG. 100), the sensor 7884 may be a scanner that moves along a length of the container 7850. The sensor 7884 scans the head mounted display system 13000 positioned in the container and detects any imperfections. The container 7850 may include a structure to promote a certain orientation of the head mounted display system 13000 to provide the optimal surface to sense (e.g., the inner surface of the user interfacing structure 13300).

In one form, the container 7850 may include a plurality of sensors 7884 that cover the lid 7856. Each sensor 7884 is responsible for scanning only a portion of the interior cavity 7854. Together, all of the sensors 7884 scan the entire interior cavity 7854 without the need for the individual sensors 7884 to move. In other words, the control 7868 is able to piece together a reading from each sensor 7884 and map the interior cavity 7854 without the individual sensors having to move.

In one form, the sensor 7884 may determine a quantity of inactivation agent to provide to the internal cavity 7854. For example, the sensor 7884 may determine how much UV light and/or cleaning solution to apply to the internal cavity 7854.

5.1.3.4.2.2.1 Communication

In some forms, the container 7850 can communicate with an external device. These devices may include a communication device (e.g., a cell phone, a laptop, a tablet, a server, etc.). The communication device may also not be a physical device, and may instead be a cloud that can store information.

As the container 7850 operates, the control 7868 may communicate with the communication device to provide the results from the sensor 7884. For example, the sensor 7884 may inform the external device that a control pattern elapsed (i.e., the head mounted display system 13000 was cleaned by the container 7850). The sensor 7884 may also inform the device as to the presence of imperfections.

In certain forms, this communication may take places with a wired connection (e.g., via a communication cable). Alternatively or in addition, the communication may take place wirelessly (e.g., via Bluetooth, WiFi, radio frequency, etc.).

The container 7850 and the communication device can communicate via a communication path. The container 7850 may send sensed results to the communication device. For example, this may be a smartphone app, an external server, and/or a cloud. In some examples, the communication device may be controlled by the user. For example, the user may use the device to determine when the head mounted display system 13000 was last cleaned and/or whether any imperfections were detected on the head mounted display system 13000. The user may use this data to determine if/when the head mounted display system 13000 (e.g., the user interfacing structure 13500) needs to be replaced (e.g., because a predetermined number of cleaning cycles have been run and/or because an imperfection is detected).

5.1.3.4.2.3 Hand Washing

In some forms, the user may hand wash the head mounted display system 13000 (e.g., the positioning and stabilising 13500) after use. The user may run the positioning and stabilising structure 13500 under a stream of water (e.g., from a sink) and/or may use a cleaning substance (e.g., soap) to scrub the surface of the positioning and stabilising structure 13500.

In one form, the surface contours of different microstructures (see e.g., FIGS. 85-88) may limit the adhesion of the biofilm to the head mounted display system 13000. When the head mounted display system 13000 is exposed to water (or a similar fluid stream), the biofilm is rinsed away (e.g., down a drain of the sink 7880). The user may scrub the head mounted display system 13000 with the cleaning substance in order to further assist in removing the biofilm.

In certain forms, the user may clean the head mounted display system 13000 and may be able to manipulate the head mounted display system 13000 in order to clean all surfaces of the head mounted display system 13000.

In certain forms, the user may clean the head mounted display system 13000 while it is in the decoupled position (e.g., the user interfacing structure 13300 is separate from the display housing 13200). This allows the user to clean the crevices along the surface of the user interfacing structure 13200. The head mounted display system 13000 may then be set out to dry.

5.1.4 Anthropometrical Data Models

The geometry of the head-mounted display can be designed with reference to anthropometrical data models. The anthropometrical data models can be developed from a collection of three-dimensional head shapes. The anthropometrical data models can be used to represent sizing and clustering based on head shape variation as shown in FIGS. 25a to 25b (e.g., target head geometry with top three components of variation being shown in FIG. 25b), sizing based on nominated facial zones as shown in FIGS. 26a to 26b (e.g., shape variation in the eye/nose region with the top four components of variation being shown in the example of FIG. 26b), and sizing based on anthropometrical landmarks as shown in FIGS. 27a to 27b (e.g., correlation between 2D landmarks such as relationship between eye location and face width at the eye socket as shown in FIG. 27b).

For example, anthropometrical data models can be used to determine sizing requirements for the interfacing structure. These requirements can consider head shape variations and facial feature variations based on anthropometrical landmarks. Further, relationships between facial landmarks may be derived from the data; for example, a relationship between eye location and face width. Advantageously, the interfacing structure can be configured to accommodate these variations.

In a further example, anthropometrical data models can be used in conjunction with software applications, e.g. mobile phone applications, to compare three-dimensional scans of a user's head and identify their head size. In this example, a user may operate the camera of their mobile phone to produce the three-dimensional scan. The software application may be used inform the user of their head size compared to the anthropometrical data models and recommend the appropriate size, e.g. positioning and stabilising structure to provide the best fit. For example, a medium size may be suggested out of a given plurality of size options, e.g. small, medium or large. Alternatively, a custom sized positioning and stabilising structure can be made according to the three-dimensional scan for a user according to their individual facial landmarks.

The above-described head-mounted display systems provide alternative examples of the present technology structured and arranged to enhance comfort, fit range, usability, system architecture, use in a medical environment, and manufacturability.

The head-mounted display systems according to examples of the present technology provide enhanced comfort with minimised facial markings and pain from prolonged use. For example, comfort may be achieved by providing universal load distribution in which load is optimised on all contact surfaces by avoiding or minimising load on areas prone to discomfort and redistributing this load to areas able to comfortably bare the load (e.g., avoid or minimise load on the nasal bridge and sides of the nose and apply or redistribute this load to the top and/or rear of the head). Also, comfort may be achieved by providing regional load distribution in which load is evenly distributed by design and material selection in regions of the face where contact is unavoidable (e.g., contact points around the eyes may comprise compliant materials that evenly distribute load and avoid pain points/facial marking). In addition, comfort may be achieved by minimising weight as less weight in the overall system leads to less tension to position and maintain the system in the right configuration. In this regard, the head-mounted display systems according to examples of the present technology provide a minimalist design (e.g., low profile) to achieve fit range, comfort, and correct configuration, e.g., componentry optimised to minimize size and number of components to achieve function and use of robust and lightweight materials.

The head-mounted display systems according to examples of the present technology provide enhanced fit range or universal fit without trading off comfort, usability and cost. For example, fit range may be achieved by providing adjustability with geometry and material selection and adjustment mechanism. The components of the positioning and stabilising structure are designed and materials may be selected to provide desired force versus displacement (e.g., straps may stretch to a desired length under a predetermined force). The adjustment mechanism provides simplicity as sizing of the positioning and stabilising structure and associated straps may be manually adjusted and set, and componentry can be minimised while maximising ease of use, e.g., single handed adjustment of straps and alternative use of magnetic clips (e.g., easy removal without losing strap settings) for connection. Also, the adjustment mechanism provides minimal size and weight which reduces the bulk of adjustment mechanisms with optimal materials and minimal components. Further, enhanced fit range may be achieved by anthropometrics in which adjustment range may be designed to fit the optimal anthropometric range of the desired market.

The head-mounted display systems according to examples of the present technology provide enhanced usability with low-touch simple set up solutions and low dexterity threshold solutions. For example, low-touch set up may be achieved with self-adjusting solutions including stretchable materials or simple mechanical actuation where only a few minor adjustments may be necessary for correct fit. Also, the system may include adjust and lock solutions to facilitate usability (i.e., set and forget), e.g., mechanisms to guide adjustment (e.g., magnets) and locking mechanisms to set adjustment (e.g., clips). Further, the system provides ease of use so that it is capable of adjustment when worn by a user with low-dexterity and/or minimal vision.

The head-mounted display systems according to examples of the present technology provide enhanced system architecture which optimises componentry location such that it minimises cost while maximising comfort, fit range and usability. For example, the system may provide enhanced weight distribution in which electrical and/or mechanical components are positioned in ideal locations from a comfort perspective. Also, the system may comprise modularity such that components may be selected or upgraded based on user preference, e.g., electrical component, face contacting cushions, straps, and/or ear buds may be selected based on preference.

The head-mounted display systems according to examples of the present technology enhance use in a medical environment. For example, the system may be biocompatible and/or cleanable with materials selected that are cleanable for re-use in a medical environment and/or pass biocompatibility requirements.

The head-mounted display systems according to examples of the present technology enhance manufacturability by providing mass producible solutions at low cost while maintaining high quality and functionality.

As noted above, the present technology may find particular application in head-mounted display systems in the form of virtual reality (VR) display apparatus and/or augmented reality (AR) display apparatus.

5.2 Additional Aspects of the Present Technology 5.2.1 Head-Mounted Display Systems with Battery Packs FIGS. 28A-28C, 29, 30, 42A-42E, 44A-44D, 49A-49E, 52A-52B, 53A-53C and 54 show examples of head-mounted display systems 1000. In these particular examples the head-mounted display systems 1000 are configured for use as virtual reality (VR) headsets. The head-mounted display system 1000 in each of these examples comprises a head-mounted display unit 1200 and a battery pack 1500. The head-mounted display unit 1200 may comprise a display configured for VR. The battery pack 1500 is configured for powering the head-mounted display system 1000.

Each head-mounted display system 1000 comprises a positioning and stabilising structure 1300 configured to hold the head-mounted display unit 1200 anterior to a user's eyes such that the display is viewable by the user in use. The head-mounted display unit 1200 may also be configured to hold the battery posterior to the user's head in use.

The positioning and stabilizing structure 1300 comprises a posterior support portion 1350 configured to engage a posterior portion of a user's head, the posterior support portion 1350 in these examples comprising a parietal strap portion 1310 configured to overlie the parietal bones of the user's head in use and an occipital strap portion 1320 configured to overlie or lie below an occipital bone of the user's head in use.

In these examples, the positioning and stabilizing structure 1300 further comprises a pair of lateral strap portions 1330 configured to connect between the posterior support portion 1350 and the head-mounted display unit 1200, each configured to be located on a respective lateral side of the user's head in use.

The positioning and stabilizing structure 1300 may further comprise a top strap portion 1340 configured to connect between the battery pack 1500 and the head-mounted display unit 1200. The top strap portion 1340 may be configured to overlie a superior portion of the user's head in use.

5.2.1.1 Parietal Strap Portion

In the examples shown in FIGS. 28A-28C, 29, 30, 42A-42E, 44A-44D, 49A-49E, 52A-52B, 53A-53C and 54, the position of the parietal strap portion 1310 is moveable with respect to the top strap portion 1340 in the anterior and posterior directions. That is, the user is able to move the parietal strap portion 1310 through a range of positions on their head without also moving the top strap portion 1340. The ability to move the parietal strap portion 1310 may advantageously allow the user to spread the parietal strap portion 1310 and occipital strap portion 1320 apart without moving the top strap portion 1340. Spreading the parietal strap portion 1310 and occipital strap portion 3120 may advantageously create hoop stress within the loop formed by these two portions, providing for a secure fit to the posterior surfaces of the user's head. In particular, an angle between the parietal strap portion 1310 and the occipital strap portion 1320 may be able to be adjusted by the user.

The parietal strap portion 1310 passes underneath the top strap portion 1340 in this example. By passing underneath, the parietal strap portion 1310 may advantageously be able to engage the user's head securely (e.g. sufficiently tightly) without limiting the ability of the top strap portion 1340 to be moved in the anterior-posterior directions.

As shown in particular in FIGS. 28B and 28C, the top strap portion 1340 may pass through a buckle 1312 connected to the parietal strap portion 1310. The buckle 1312 may be configured limit lateral movement of the top strap portion 1340, which may advantageously keep the top strap portion 1340 centred on the user's head in use. In this example, the buckle 1312 is located in the sagittal plane of the user's head in use.

In other examples the parietal strap portion 1310 may be immovable with respect to the top strap portion 1340. In some examples the parietal strap portion 1310 is fixedly connected to the top strap portion 1340.

5.2.1.2 Top Strap Portion

As shown in FIGS. 28A and 28B in particular, the top strap portion 1340 is connected to the occipital strap portion 1320 in this example.

In this example, the top strap portion 1340 is adjustable in length. This may advantageously allow a user to achieve a more secure, stable and/or comfortable fit when wearing the head-mounted display system 1000. The top strap portion 1340 may be adjustable in length between the head-mounted display unit 1200 and the battery pack 1500. Alternatively or additionally, the top strap portion 1320 may be adjustable in length between the head-mounted display unit 1200 and the occipital strap portion 1320.

In this example, the top strap portion 1340 is connected to the head-mounted display unit 1200 through an eyelet 1202 connected to the head-mounted display unit 1200 and looped back and secured to itself. An end portion of the top strap portion 1340 may secure to another portion of the top strap portion 1340 with a hook-and-loop fastener connection.

In the examples shown in FIGS. 28A and 29, an outer layer 1341 of the top strap portion 1340 is configured to be passed through the eyelet 1202 and looped back and secured to itself. However, a user-facing layer 1344 does not pass through the eyelet. The user-facing layer 1344 remains in contact with the user's head. The top strap portion 1340 may be substantially inextensible.

As shown in FIG. 28A and FIG. 29, the top strap portion 1340 comprises a layered construction. That is, the top strap portion 1340 may be formed from a plurality of layers. The top strap portion 1340 comprises a substantially inextensible layer 1343 in these examples, which may prevent the top strap portion 1340 from extending in length (optionally along with other components or layers which may also prevent the top strap portion 1340 from extending in length). As shown in FIG. 28A and FIG. 29, an anterior end of the substantially inextensible layer 1343 is spaced along the length of the top strap portion from the head-mounted display unit. This may advantageously allow the length of the top strap portion 1340 to be adjusted without the head-mounted display unit 1200 interfering with the substantially inextensible layer 1343.

In these examples, the top strap portion comprises a textile user-facing layer 1344. That is, the user-facing layer 1344 may be formed from a textile material. Additionally or alternatively, the top strap portion 1340 may comprise a textile outer layer 1341.

In the examples shown in FIGS. 28A-28C and FIG. 29, the top strap portion 1340 comprises a power cable 1510 connecting the battery pack 1500 to the head-mounted display unit 1200 to provide power from the battery pack to the head-mounted display unit 1200 in use. The battery pack 1500 may power the display and other electronic components. In these examples, the power cable 1510 is internal to the top strap portion 1340.

Figure 42E:
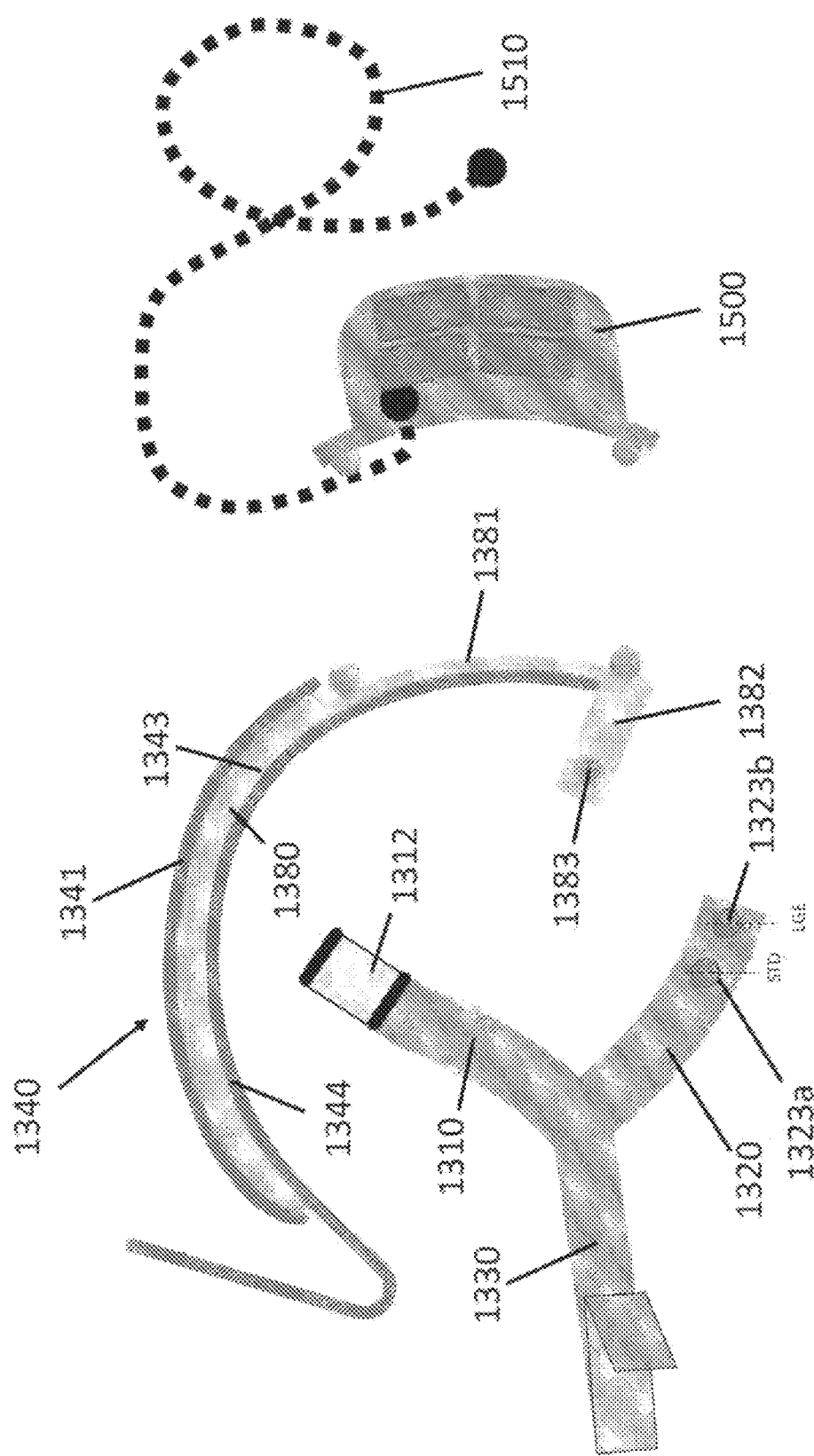

FIG. 43A-43D shows another example of the present technology in which the power cable 1510 is internal to the top strap portion 1340. In this example, the power cable 1510 is insertable through an interior of the top strap portion 1340 by the user. In particular, the power cable 1510 is insertable through the top strap portion 1340 between the substantially inextensible layer 1343 and the outer layer 1341. FIG. 42E shows the positioning and stabilising structure 1300 in a disassembled state and FIGS. 42A and 42C show the head-mounted display system 100 assembled. FIG. 42B is a cross section view showing the interior of the top strap portion 1340 with internal power cable 1510 visible.

5.2.1.3 Anterior and Posterior Portions of Top Strap Portion

FIG. 54 shows another example of the present technology. In this example the top strap portion 1340 comprises an anterior portion 1345 and a posterior portion 1346. The posterior portion 1346 is configured to engage the user's head in use. However, the anterior portion 1345 is configured to not engage the user's head in use. The anterior portion 1345 is spaced from the user's head. Advantageously, the spacing partially or fully avoids the anterior portion 1345 compressing, impinging or otherwise interfering with the user's hair on the user's head in the area over which the anterior portion 1345 lies in use.

Excessive compression of or interference with the user's hair may result in a lack of comfort during use or embarrassment when the user doffs the head-mounted display system. The top strap portion 1340 with an anterior portion 1345 which does not engage the user's head (e.g. does not press against the user's head) in use may at least partially address these problems or concerns. The amount of contact the anterior portion 1345 may make with a particular user's hair will depend on the length and style of the user's hair. The anterior portion 1345 may not engage the user's head but, if a user has a sufficiently long hair length and/or style, the user's hair may nevertheless contact the anterior portion 1345. However, as the anterior portion 1345 does not engage the user's head, it may not overly compress, interfere with or mess up the user's hair.

The anterior portion 1345 may not engage the user's head by, for example, not being in contact with the user's head (e.g. if it would not be in contact with the user's skin even if the user had no hair), by not pressing, wrapping and/or fitting against and/or exerting force on the user's head. The posterior portion 1346 may engage the user's head by being in contact with the user's head (e.g. if it would be in contact with the user's skin if the user had no hair), by pressing, wrapping and/or fitting against and/or exerting force on the user's head.

As shown in FIG. 54, in this particular example the top strap portion 1340 comprises a shape having a bend between the posterior portion 1346 and the anterior portion 1345. The top strap portion 1340 may be shaped to follow a curvature of the user's head in the posterior portion 1346 of the top strap portion 1340 and deviate from the curvature of the user's head in the anterior portion 1345 of the top strap portion 1340. In some examples, the top strap portion 1340 is rigidised to support the anterior portion 1345 in spaced relation to the user's head. The anterior portion 1345 may be spaced superiorly from a fringe, forehead and/or frontal bone region of the user's head.

As shown in FIG. 54, the anterior portion 1345 curves inferiorly towards the head-mounted display unit 1200. Additionally, the anterior portion 1345 of the top strap portion 1340 may extend in a partially superior direction from the posterior portion 1346 of the top strap portion 1340 (e.g. extends from an anterior end 1347 of the posterior portion 1346).

The anterior portion 1345 of the top strap portion 1340 may be connected to the posterior portion 1346 of the top strap portion 1340 at an anterior end 1347 of the posterior portion 1346.

The anterior end 1347 of the posterior portion 1346 may be located in a number of different locations with respect to the user's head, in various examples of the present technology. The anterior end 1347 may be located posteriorly to a fringe region of the user's head. For example, the anterior end 1347 may be located between a fringe region and the coronal suture of the user's head in use. In some examples the anterior end 1347 is located posteriorly to the frontal bone of the user's head in use. In some examples the anterior end 1347 is located proximate a coronal plane of the user's head in use, the coronal plane aligned with each otobasion superior of the user's head. In some examples the anterior end 1347 is located posterior to the coronal plane aligned with each otobasion superior of the user's head in use. In some examples the anterior end 1347 of the posterior portion 1346 may be located proximate a parietal strap portion 1310 of the positioning and stabilising structure 3300 in use. As described above, the top strap portion 1340 may comprise a bend. The bend may be located at or proximate the anterior end 1347 of the posterior portion 1346, for example as shown in FIG. 54.

As shown in FIG. 54, the top strap portion 1340 connects between the head-mounted display unit 1200 and a battery pack 1500 for powering the head-mounted display system 1000. The battery pack 1500 may be located against a posterior surface of the user's head in use. The top strap portion 1340 may advantageously transfer the downwards weight force of the battery pack 1500 to an upwards supportive force on the head-mounted display unit 1200 countering a downwards weight force of the head-mounted display unit 1200.

The top strap portion 1340 may be adjustable in length. As shown in FIG. 54, the top strap portion 1340 is configured to be connected to the head-mounted display unit 1200 through an eyelet 1202 connected to a display unit housing 1205 of the head-mounted display unit 1200 and looped back and secured to itself (for example with a hook-and-loop fastening or a buckle). In particular, a user-facing layer 1344 of the top strap portion 1340 is configured to be passed through the eyelet 1202 and looped back and secured to itself (e.g. with a hook-and-loop fastening, buckle or the like). In this particular example, no outer layer of the top strap portion 1340 passes through the eyelet 1202.

A user-facing layer 1344 may be user-contacting (e.g. it may be a user-contacting layer) or non-user-contacting (e.g. it may be a non-user-contacting layer). Some or all of the user-facing layer 1344 may contact the user (e.g. against their hair/head). At least some of the user-facing layer 1344 may not contact the user and/or may not engage the user's head. For example, in the FIG. 54 positioning and stabilising structure 1300, a portion of the user-facing layer 1344 (e.g. the anterior portion 1345) does not contact the user (e.g. it is spaced from the user's head). Additionally, in the FIG. 54 example, a portion of the user-facing layer 1344 (e.g. the posterior portion 1346) contacts the user (e.g. it is in contact with the user's hair/head).

The top strap portion 1340 (e.g. both the anterior portion 1345 and posterior portion 1346) may be substantially inextensible and may comprise a layered construction. In the example shown in FIG. 54, the top strap portion 1340 comprises a substantially inextensible layer 1343. In this example the substantially inextensible layer 1343 at least partially rigidises the top strap portion 1340. The substantially inextensible layer in some examples (e.g. the FIG. 54 example and in other examples) may function as a rigidiser. For example, the substantially inextensible layer 1343 may rigidise the top strap portion 1340 by imparting a shape to the top strap portion 1340. It is to be understood that a rigidised strap may still be bendable, but may be rigidised in the sense that it is self-supporting or more rigid than a floppy strap portion. The substantially inextensible layer 1343 extends along both the anterior portion 1345 and the posterior portion 1346. The substantially inextensible layer 1343 may rigidise the anterior portion 1345 to support the anterior portion 1345 in spaced relation to the user's head. That is, the anterior portion 1345 may be rigidised such that it is supported off the user's head so that it does not engage the user's head in use. As illustrated in FIG. 54, an anterior end of the substantially inextensible layer 1343 is spaced along the length of the top strap portion 1340 from the head-mounted display unit 1200. For example, there is a gap between an anterior end of the substantially inextensible layer 1343 and the head-mounted display unit 1200. In some examples the top strap portion 1340 comprises a textile user-facing layer 1344. In some examples the top strap portion 1340 comprises a textile outer layer, for example covering the substantially inextensible layer 1343.

In some examples a top strap portion 1340 comprising an anterior portion 1345 that does not engage the user's head comprises a power cable 1510 (not shown in FIG. 54) for connecting the battery pack 1500 to the head-mounted display unit 1200 to provide power from the battery pack 1500 to the head-mounted display unit 1200 in use. The power cable 1510 may be internal to the top strap portion 1340. For example, the power cable 1510 may be insertable through an interior of the top strap portion 1340 by the user. In some examples the power cable 1510 is insertable through the top strap portion 1340 between the substantially inextensible layer 1343 and a textile outer layer.

The substantially inextensible layer 1343 may be a portion of an adjustment rigidiser 1380. Adjustment rigidisers 1380 are described below, the features of which may be applied to an adjustment rigidiser forming the substantially inextensible layer 1343 of the positioning and stabilising structure 1300 shown in FIG. 54.

It is to be understood that the top strap portion 1340 described with reference to FIG. 54 (e.g. a top strap portion 1340 having an anterior portion 1345 that does not engage the user's head in use) may have any one or more of the features described with reference to any of the other exemplary top strap portions described herein. Likewise, a top strap portion 1340 having an anterior portion 1345 that does not engage the user's head may be applied to any of the other head-mounted display systems 1000 described herein.

5.2.1.4 Battery Pack

As shown by way of example in FIG. 28A, the battery pack 1500 in some examples of the present technology is connected to the top strap portion 1340 at a superior location 1501 and an inferior location 1502. In other examples the battery pack 1500 may be connected to the top strap portion 1340 at only one of these locations and/or or to a different component.

In the FIG. 28A example, the battery pack 1500 is removably connected to the top strap portion 1340. The battery pack 1500 may be connected to the top strap portion 1340 by a hook-and-loop connection. Alternatively, the battery pack 1500 may be connected via buttons, studs (e.g. domes) or the like. In this example the inferior location 1502 at which the battery pack 1500 connects to the top strap portion 1340 is proximate the occipital strap portion 1320.

Connecting the battery pack 1500 in this manner may advantageously allow the parietal strap portion 1310 and/or the occipital strap portion 1320 to engage the user's head unimpeded by the battery pack 1500.

The battery pack 1500 may comprise a concave inner surface configured to correspond approximately to a curvature of the user's head.

FIGS. 43A-43C show battery packs 1500 according to various examples of the present technology, suitable use in head-mounted display systems 1000 shown in FIGS. 28A-28C, 29, 30, 42A-42E, 44A-44D, 49A-49E, 52A-52B, 53A-53C and 54 for example. The posterior surface of a user's head is indicated by 1010 to illustrate an in-use position of each battery packs 1500 and its internals. As shown in each view, the battery pack 1500 comprises a battery pack housing 1505 and a plurality of cells 1502 contained within the housing 1505, in these examples. The cells 1502 may be spaced equidistantly in the battery pack housing 1505 from an anterior wall of the battery pack housing 1505, as shown in FIG. 43A. One of more of the cells 1502 may be spaced further from an anterior wall of the battery pack housing 1505 than another one or more of the cells 1502, as shown in FIG. 43B. Spacing the cells 1502 further posteriorly may advantageously enable the battery pack 1500 to create a larger moment to counter the weight of the head-mounted display unit 1200. Alternatively or additionally, each of the plurality of cells 1502 may be spaced from an anterior wall of the battery pack housing 1505, as shown in FIG. 13C.

The battery pack housing may contain a counterweight 1512 configured to contribute to a balance of weight between the battery pack 1500 and the head-mounted display unit 1500, as show in FIG. 43C. In the FIG. 43C example, the battery pack housing 1505 is spaced from a posterior surface 1010 of the user's head (in this particular example by a pad 1511, which may be designed for comfort). The counterweight 1512 may be a dead-weight formed from metal, water, sand, or other dense material, in permanent or removable configuration. In some examples the battery pack 1500 may be replaced by a counterweight alone, for example if the battery is located in the head-mounted display unit 1200. The battery pack housing 1505 may also comprise supports to increase the offset distance from the posterior surface 1010 of the user's head.

5.2.1.5 Power Cable Strap Portion

As described above, the head-mounted display system 1000 may comprise a power cable 1510 connected between the battery pack 1500 and the head-mounted display unit 1200. FIGS. 46A-46C and 47A-47B show such examples. The power cable 1510 may be located within the top strap portion 1340 in use (FIGS. 46B and 46C) or may be located alongside the top strap portion 1340 in use (FIG. 46A).

In the example shown in FIGS. 47A-47B, the power cable 1510 is attached to a power cable strap portion 1520 proximate the head-mounted display unit 1200. The power cable strap portion 1520 in this examples is extendable in length. A serpentine portion of the power cable 1510 is attached to the power cable strap portion 1520 in a serpentine pattern, enabling the power cable strap portion 1520 and the serpentine portion of the power cable 1510 to extend in length. Further, in these examples, the power cable 1510 is attached to the parietal strap portion 1320.

5.2.1.6 Power Cable Management

FIGS. 48 and 49A-49E show further examples of the present technology in which a power cable 1510 connects a head-mounted display unit 1200 and a battery pack 1500. As described herein, the head-mounted display unit 1200 may comprise a display unit housing 1205 comprising a display, and an interfacing structure 3800 constructed and arranged to be in opposing relation with the user's face and engage the user's face.

As shown in FIG. 48, the power cable 1510 may enter the display unit housing 1205 outside of a periphery of the interfacing structure 3800. In this example, the display unit housing 1205 comprises a posterior-facing side (visible in FIG. 48) and an interfacing structure 3800 extending posteriorly from the posterior-facing side. The posterior-facing side may be larger than the periphery of the interfacing structure 3800 allowing the power cable 1510 to enter the display unit housing 1205 through an opening 1206 in the posterior-facing side of the display unit housing 1205.

More particularly, the posterior facing side of the display unit housing 1205 in this example comprises a rectangular shape and the interfacing structure 3800 comprises a rounded shape. The opening 1206 in the posterior-facing side is located proximate a corner of the rectangular shape of the posterior-facing side.

FIGS. 49A-49E show examples of head-mounted display systems 1000 having positioning and stabilising structures 1300 which comprise a posterior support portion 1350 comprising a parietal strap portion 1310 configured to overlie the parietal bones of the user's head in use and an occipital strap portion 1320 configured to overlie or lie below an occipital bone of the user's head in use. The positioning and stabilising structures 1300 further comprise a pair of lateral strap portions 1330 configured to connect between the posterior support portion 1350 and the head-mounted display unit 1200, each configured to be located on a respective lateral side of the user's head in use. Further, the positioning and stabilising structures 1300 comprise a top strap portion 1340 configured to connect between the battery pack 1500 and the head-mounted display unit 1200, the top strap portion 1340 configured to overlie a superior portion of the user's head in use.

Figure 49A:
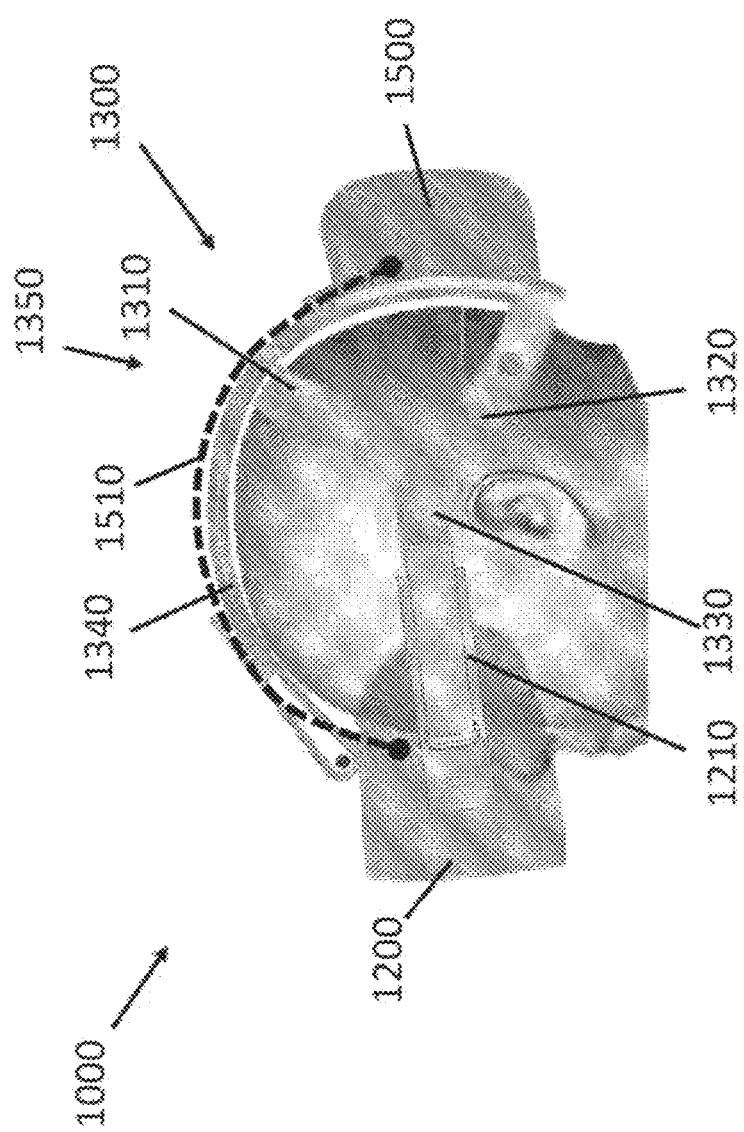

In each of these examples, the power cable 1510 runs along (e.g. is attached to, otherwise secured at or aligned with) the top strap portion 1340 from the battery pack 1500 to the head-mounted display unit 1200 (as shown in FIG. 49A).

Figure 49B:
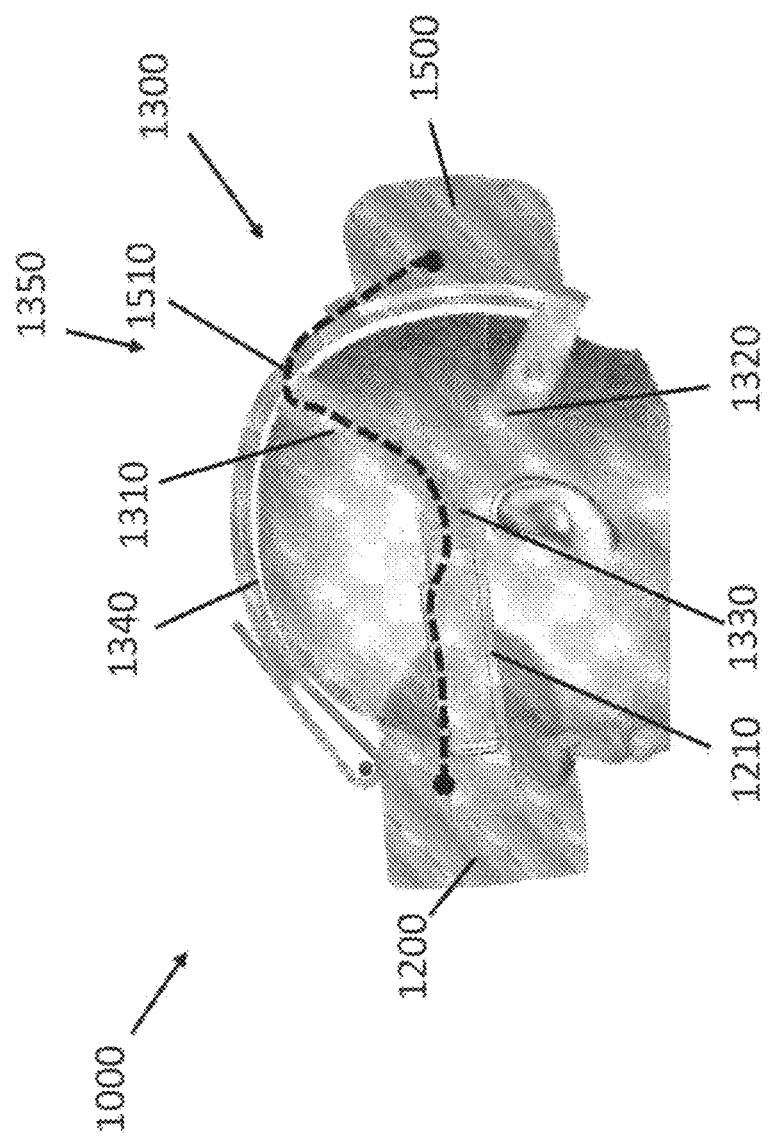
Figure 49C:
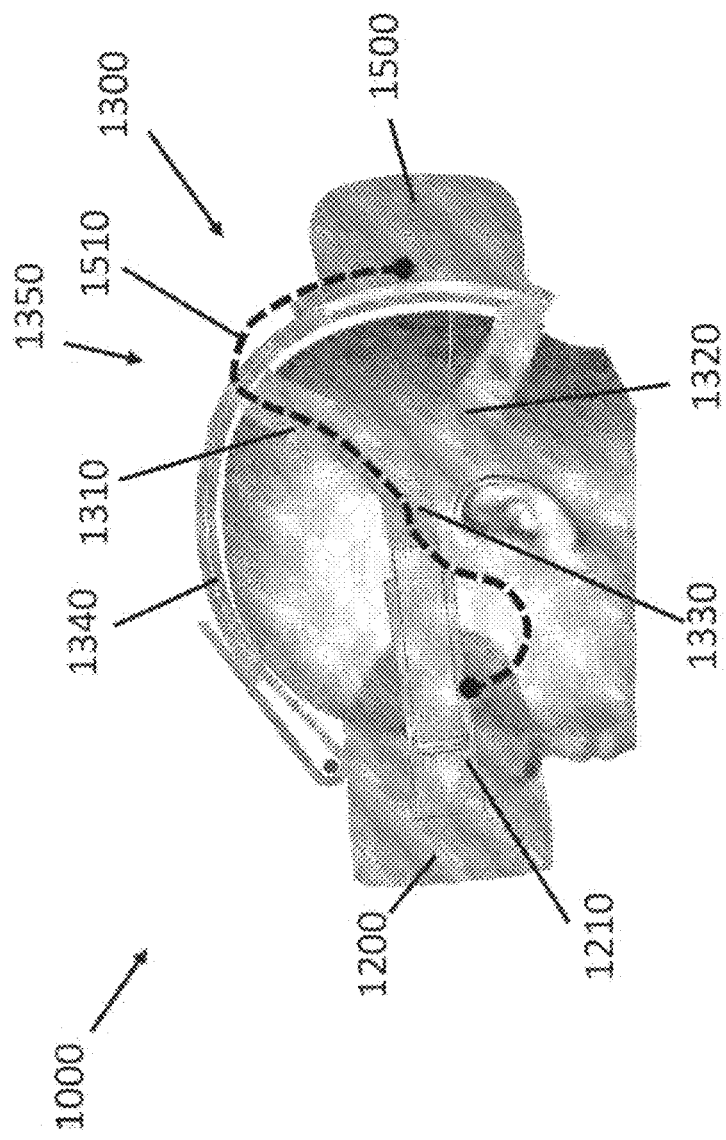

The power cable 1510 may run along the parietal strap portion 1310 and one of the lateral strap portions 1330 from the battery pack 1500 to the head-mounted display unit 1200 (as shown in FIGS. 49B and 49C). The power cable 1510 may connect to the head-mounted display unit at a laterally-facing side thereof (as shown in FIG. 49C).

Figure 49D:
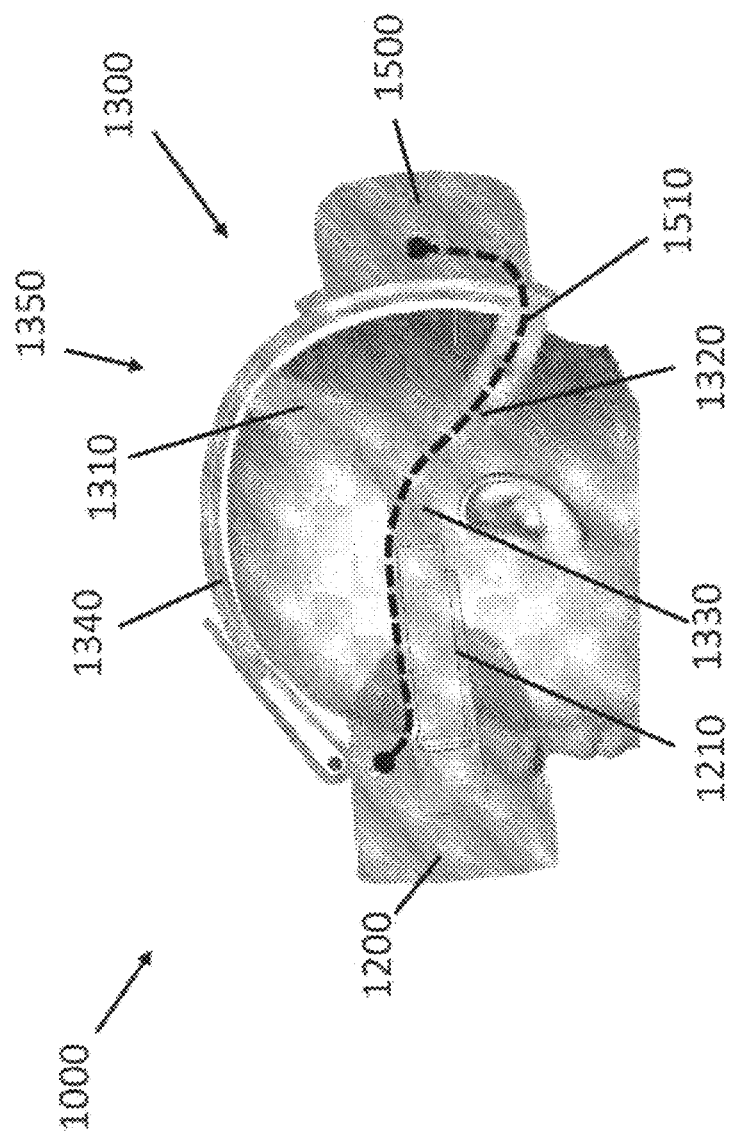
Figure 49E:
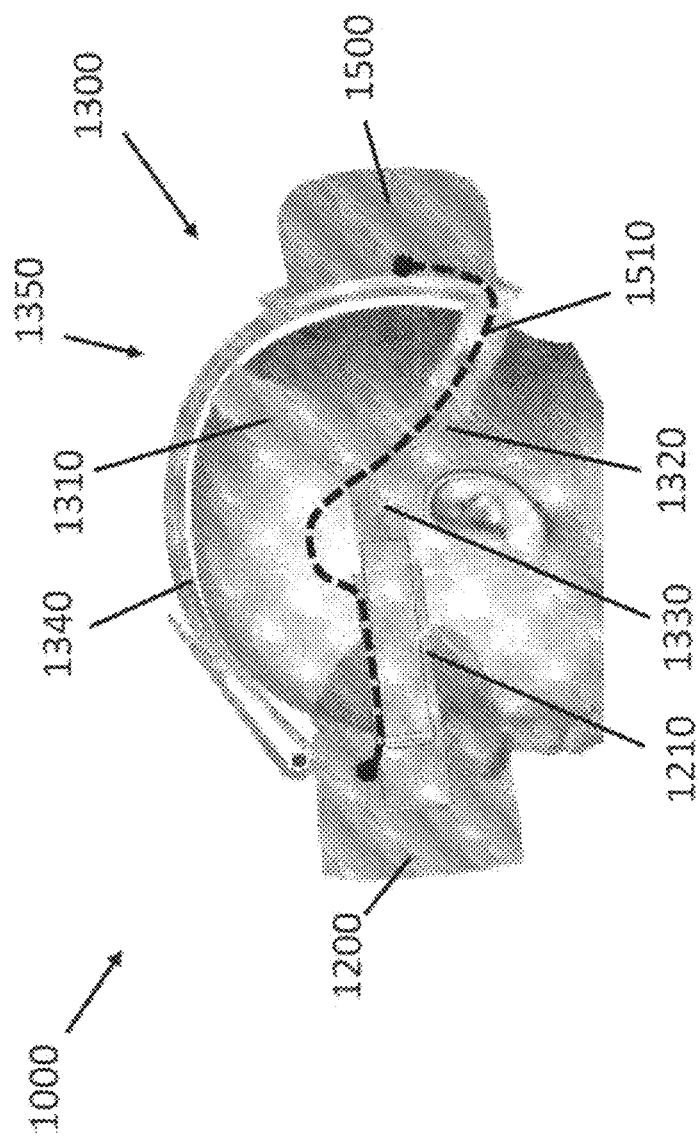

The power cable 1510 may run along the occipital strap portion 1320 and one of the lateral strap portions 1330 (as shown in FIG. 49D). The power cable 1510 may comprise a slack portion configured to tolerate movement between the head-mounted display unit 1200 and the battery pack 1500 (for example during active use, adjustment or transport, for example), as shown in each of FIGS. 49C and 49E.

5.2.1.7 Retractable Power Cable

In some examples of the present technology, such as the example shown in FIG. 29, a portion of the power cable 1510 is located within the battery pack 1500 and is able to be extended from and retracted into the battery pack 1500. This may advantageously allow the length of the top strap portion 1340 to be adjusted without affecting the location of the battery pack 1500 and/or the occipital strap portion 1320. A retractable power cable 1510 may also be incorporated into other examples, such as any of the other head-mounted display systems 1000 described herein.

One or more layers of the top strap portion 1340 may be partially located within the battery pack 1500 and may be able to be extended from and retracted into the battery pack 1500 together with the power cable 1510.

As shown in FIG. 29, the outer layer 1341 of the top strap portion 1340 is, in this example, located within the battery pack 1500 and is able to be extended from and retracted into the battery pack 1500 together with the power cable 1510. Additionally, the substantially inextensible layer 1343 of the top strap portion 1340 is located within the battery pack 1500 and is able to be extended from and retracted into the battery pack 1500 together with the power cable 1510. In other examples, such as the example shown in FIG. 28A, the substantially inextensible layer 1343 is located between the battery pack 1500 and the user's head. In this example (and also in the example shown in FIG. 28A) the user contacting layer 1341 of the top strap portion 1340 is located between the battery pack 1500 and the user's head.

The portion of the power cable 1510 located within the battery pack 1500 and the one or more layers of the top strap portion 1340 partially located within the battery pack 1500 may form a retractable portion of the top strap portion 1340 able to be extended from and retracted into the battery pack 1500 to adjust a length of the top strap portion 1340 between the battery pack 1500 and the head-mounted display unit 1200. That is, power cable 1510 and one or more layers of the top strap portion 1340 may form a retractable portion that the user can extend from and retracted into the battery pack 1500. The retractable portion may comprise the outer layer 1341, the power cable 1510, and the substantially inextensible layer 1343, for example. The user-facing layer 1344 may not form part of the retractable portion. The user-facing layer 1344 may be located between the battery pack 1500 and the user's head. The user-facing layer 1344 may split from one or more other layers of the top strap portion 1340. The battery pack 1500 may slide over the user-facing layer 1344 (and any other layers not located within the battery pack 1500), to enable adjustment of the length of the top strap portion 1340 between the battery pack 1500 and the head-mounted display unit 1200 and/or to enable the position of the battery pack 1500 on the user's head to be adjusted.

In some examples of the present technology, the retractable portion of the top strap portion 1340 is able to be moved between a plurality of predetermined positions with respect to the battery pack 1500 at which the position of the retractable portion is able to be fixed with respect to the battery pack 1500. For example, the retractable portion may be moveable with respect to the battery pack 1500 between three positions corresponding to Small, Medium and Large sizes. The user may adjust the top strap portion 1340 to a chosen one of these sizes. In some examples, the top strap portion 1340 may be fixed to the head-mounted display unit 1200. In the example shown in FIG. 29, the top strap portion 1340 is adjustable at the head-mounted display unit 1200 in that a user is able to pull more or less of the top strap portion 1340 (or at least an end portion of the outer layer 1341 thereof) through the eyelet 1202. The user may make course adjustments to a length of the top strap portion 1340 by changing the amount of the top strap portion 1340 within the battery pack, and may make fine adjustments with by changing the amount of the top strap portion 1340 pulled through the eyelet 1202. The positioning and stabilizing structure 1300 may therefore provide for two mechanisms of adjustment of a length of the top strap portion 1340, which may include a coarse adjustment mechanism and a fine adjustment mechanism.

In other examples, the retractable portion of the top strap portion 1340 is able to be moved continuously within a range of possible positions with respect to the battery pack 1500. The retractable portion may be held in place by a locking mechanism (e.g. a spring loaded buckle or other catch) or may be held in place in use by the tension in the top strap portion 1340.

5.2.1.8 Arms

As shown in FIG. 28A, FIG. 29 and FIG. 30, the head-mounted display unit 1200 comprises a display unit housing 1205 and a pair of arms 1210 extending from the display unit housing 1205. In each example, the lateral strap portions 1330 of the positioning and stabilizing structure 1300 each connect to a respective one of the arms 1210. Features of arms described herein may also be incorporated into other examples, such as any of the other head-mounted display systems 1000 described herein.

As shown in each of FIG. 28A, FIG. 29 and FIG. 30, each lateral strap portion 1330 connects to a posterior end of a respective one of the pair of arms 1210. As shown in FIG. 28A, FIG. 29, in this example, each lateral strap portion 1330 passes through an eyelet 1212 at the posterior end of the respective arm 1210 and is fastened back onto itself.

As shown in FIG. 30, in this example, each lateral strap portion 1330 connects to a respective one of the pair of arms 1210 proximate an anterior end of the arm 1210. In particular, each lateral strap portion 1330 passes through an eyelet 1214 at or proximate the posterior end of the respective arm 1210 and through a hole 1216 proximate the anterior end of the arm and is fastened to the arm 1210. As illustrated, in this example, each lateral strap portion 1330 is fastened to a laterally facing side of the respective arm 1210. As shown in FIG. 30, an end portion 1332 of each lateral strap portion 1330 is secured to the arm 1210. The lateral strap portion 1330 may fasten to the respective arm 1210 with a hook and loop fastening arrangement, by one or more of a series of domes, or by another suitable mechanism. In other examples, the arm 1210 may comprise a spring loaded buckle or other catch that prevents retraction of the lateral strap portion 1330 through the hole 1216.

In each of the examples shown in FIG. 28A, FIG. 29 and FIG. 30, each of the pair of arms 1210 is able to pivot with respect to the display unit housing 1205. Each of the arms 1210 may be covered with a textile material. Each arm 1210 may be sheathed by a tubular textile material.

FIG. 42D shows a pair of arms 1210 according to another example of the present technology. Each arm 1210 has an eyelet 1214 (in this example in the form of an open slot into which a strap portion can be slipped) and a hole 1216 through which a strap portion can be pulled through and fastened back on itself or on another portion configured for attachment.

Figure 50A:
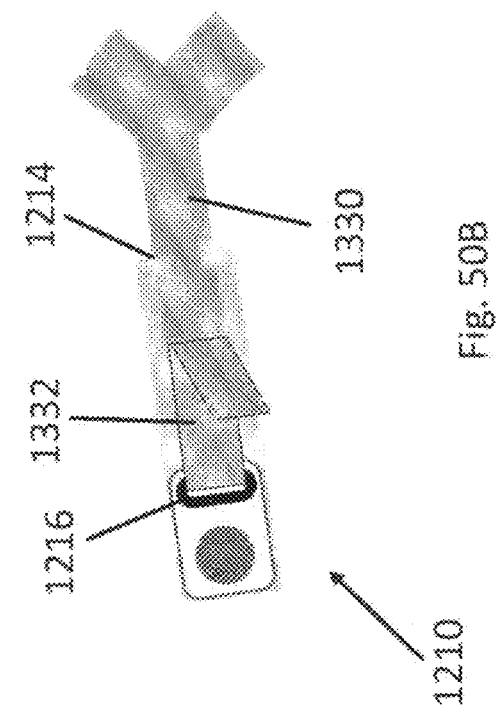
Figure 50B:
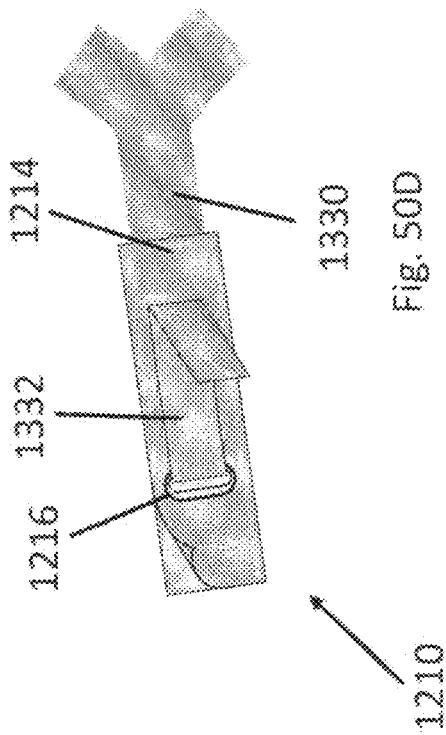
Figure 50C:
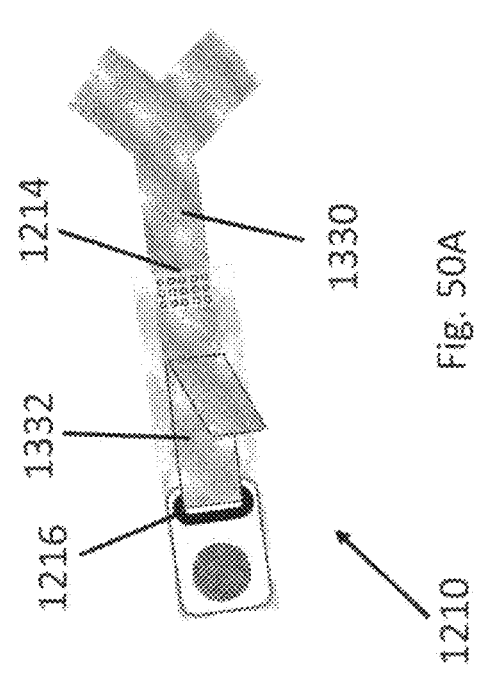
Figure 50D:
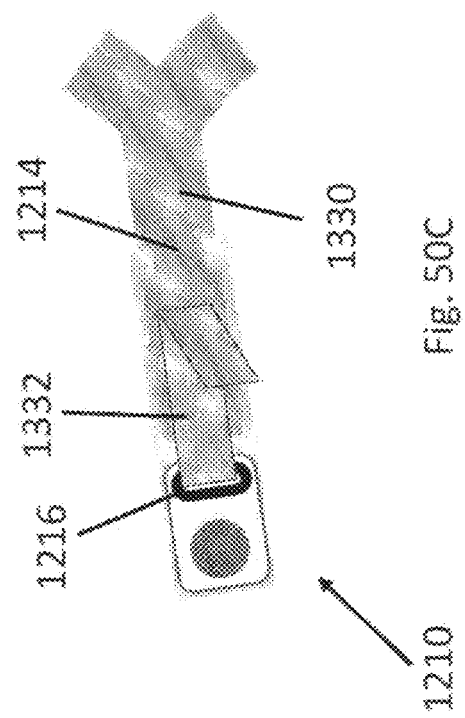

FIGS. 50A-50D show arms 1210 according to further examples of the present technology. Each lateral strap portion 1330 may be fastened to an exposed portion of itself within the arm 1210, as shown in FIGS. 50A, 50B and 50C. As shown in each of FIGS. 50A, 50B and 50C, end portions 1332 of the lateral strap portions 1330 are fastened back onto the lateral strap portions 1330. As shown in FIGS. 50B and 50C, the eyelet 1214 at or proximate the posterior end of the arm 1210 is partially open allowing the strap 1330 to move in a transverse direction with respect to the strap 1330 into/out of the eyelet 1214. In some examples, as depicted in FIG. 50D, each arm 1210 is covered in a sock, each lateral strap portion 1330 (e.g. the end portion 1332 thereof) being fastened to the sock (e.g. with a hook-and-loop type fastening).

As shown in FIGS. 51A and 51B, in some examples each arm 1210 comprises a substantially rigid portion 1217 overmoulded to a textile portion 1218. In these examples (or in other examples), the strap connecting to the arm 1210 may comprise a feature to prevent run-through of the strap, for example a widened portion of the strap.

5.2.1.9 Adjustment Rigidiser

Figure 45D:
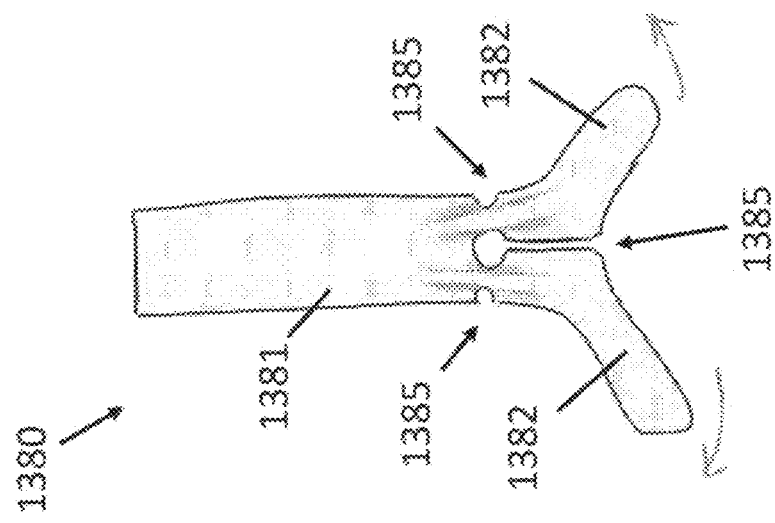
Figure 45C:
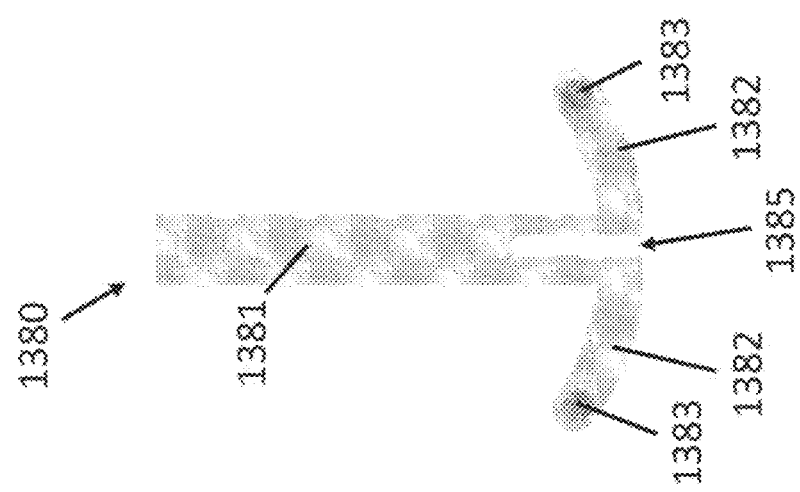

FIGS. 42A-42E and FIGS. 44A-44E show head-mounted display systems 1000 according to further examples of the present technology, although share features with the examples shown in FIGS. 28A-28C, 29 and 30A, not all of which will be repeated. The following description will focus on differences. FIGS. 45A, 45C and 45D show adjustment rigidisers 1380, which will be described below. FIG. 45B shows a positioning and stabilising structure 1300 having a parietal strap portion 1310, occipital strap portion 1320 and top strap portion 1340 configured for use with the adjustment rigidisers 1380. An adjustment rigidiser 1380 as described herein may also be applied to other examples, such as any of the other head-mounted display systems 1000 described herein.

In the examples shown in FIGS. 42A-42E and 44A-44D, the positioning and stabilising structures 1300 comprise lateral strap portions 1330 configured to connect to arms 1210. In other examples the positioning and stabilising structures 1300 may comprise elastic elements configured to connect to covers on arms 1210 and connect via a button connection and/or a hook-and-loop fastening.

With reference to FIGS. 42A-42E, 44A-44D and 45A-45D, the positioning and stabilising structure 1300 may comprise an adjustment rigidiser 1380 comprising a substantially inextensible member. In these examples the adjustment rigidiser 1380 is configured to connect to the occipital strap portion 1320. The adjustment rigidiser 1380 may be configured to reduce a length of the occipital strap portion 1320.

The occipital strap portion 1320 may comprise three or more occipital strap connection points 1323, the adjustment rigidiser 1380 being selectively connectable to a first pair of the occipital strap connection points 1323 and to a second pair 1323 of the occipital strap connection points 1232. When the adjustment rigidiser 1380 is connected to the first pair of the occipital strap connection points 1323, the occipital strap portion may have a first effective length (e.g. corresponding to a small size). When the adjustment rigidiser 1380 is connected to the second pair of the occipital strap connection points 1323, the occipital strap portion may have a second effective length longer than the first effective length. (e.g. corresponding to a large size). The different connection options allow an effective length of a strap portion to be varied by the user to achieve a good fit when using the head-mounted display system 1000.

In some examples, the adjustment rigidiser 1380 constrains the occipital strap portion 1320 to the first effective length when the adjustment rigidiser 1380 is connected to the first pair of the occipital strap connection points 1320.

As shown in FIGS. 45A, 45C and 45D, the adjustment rigidiser 1380 comprises a pair of adjustment rigidiser connection points 1383 configured to connect to the occipital strap connection points 1323. The occipital strap portion 1320 shown FIG. 45B comprises four occipital strap connection points 1323 (two points 1323a corresponding to a standard size and two points 1323b corresponding to a large size, in this example).

As shown in FIGS. 44C-1 and 44D-1, certain forms of the strap connection portion 1320 may include magnetic thread 13140 instead of discrete connection points (e.g., as shown in FIGS. 44C and 44D). The magnetic thread may make the positioning and stabilising structure less bulky, and may allow for a greater number of possible adjustment points. The adjustment rigidiser connection points 1383 may be similarly modified to include magnetic thread 13142 (as described above).

The second pair of occipital strap connection points 1323b may be located medially of the first pair of occipital strap connection points 1323a.

In other examples, the occipital strap portion 1320 may comprise a left portion separated from a right portion, the adjustment rigidiser 1380 being configured to connect the left portion and the right portion.

With reference again to FIGS. 42A-E, 44A-D and 45A-D, the adjustment rigidiser 1380 in these examples comprises a medial rigidising portion 1381 and a pair of lateral rigidising portions 1382 extending laterally from the medial rigidising portion 1381, the adjustment rigidiser connection points 1383 being located on the lateral rigidising portions 1382. One adjustment rigidiser connection point 1383 is located on each lateral rigidising portion 1382 in these examples.

In these examples, the medial rigidising portion 1381 is configured to be located in use overlying the user's occipital bone and overlying a junction between the user's parietal bones. More particularly, the medial rigidising portion 1381 is configured to be located on the user's head at or proximate the user's frontal bone, overlying a junction between the user's parietal bones and connecting to the occipital strap portion 1320.

The adjustment rigidiser 1380 may form part of the top strap portion of the positioning and stabilising structure 1300, as illustrated. The adjustment rigidiser may form a substantially inextensible layer 1343 of the top strap portion 1340.

In the example shown in FIGS. 42A-E, the adjustment rigidiser 1380 is permanently attached within the top strap portion 1340. In particular, the adjustment rigidiser 1380 is permanently attached to a user-facing layer 1344 of the top strap portion 1340. The top strap portion 1340 may be foldable, for example at a hinge region, for transport.

In each of the examples shown in FIGS. 42A-E and 44A-D, the battery pack is configured to connect to the adjustment rigidiser 1380. Additionally, a power cable 1510 is located in use between the adjustment rigidiser 1380 and an outer layer 1341 of the top strap portion 1340. The power cable 1510 is insertable between the adjustment rigidiser 1380 and the outer layer 1341 of the top strap portion 1340.

In the example shown in FIGS. 44A-44D, the adjustment rigidiser 1380 is separable from a user-facing layer 1344 of the top strap portion 1340, as illustrated in particular in FIG. 44D. In this example, the adjustment rigidiser 1380 is insertable between the user-facing layer 1344 and an outer layer 1341 of the top strap portion 1340. The adjustment rigidiser 1380 is configured to connect to the user-facing layer 1344. In particular the adjustment rigidiser 1380 comprises hook material 1384 configured to form a hook-and-loop connection to the user-facing layer 1344 of the top strap portion 1340. The adjustment rigidiser 1380 may be foldable, for example at a hinge region, for transport.

The power cable 1510 may be permanently attached to the adjustment rigidiser 1380, as illustrated in FIG. 44D. Additionally, the battery pack 1500 may be permanently attached to the adjustment rigidiser 1380 (for example with screws or an otherwise permanent attachment).

In the examples shown in FIGS. 45C and 45D, the adjustment rigidiser 1380 comprises an inferior cutout 1385 between the pair of lateral rigidising portions 1382 allowing the adjustment rigidiser 1380 to flex at or proximate the connection of the lateral rigidising portions 1382 to the medial rigidising portion 1381. The adjustment rigidiser 1380 shown in FIG. 45D also comprises lateral cutouts 1385 on opposing lateral sides of the medial rigidising portion 1381 proximate the lateral rigidizing portions 1382 allowing the adjustment rigidiser 1380 to flex proximate the lateral cutouts 1385. In the example shown in FIG. 45B, the user-facing layer 1344 of the top strap portion 1340 comprises a cutout 1325 corresponding to (e.g. aligned with) the inferior cutout 1385 in the adjustment rigidiser 1380. The cutouts 1385 and/or 1325 provide a flexing behaviour that allows the occipital strap portion 1320 (or other strap to which an adjustment rigidiser may be connected) to stretch. The stretch may advantageously provide for adapting to head size variation, or dynamic forces during use, by means of adaptation.

5.2.1.10 Stretchable Adjustable Connection

FIGS. 52A, 52B and 53A-C show head-mounted display systems 1000 according to further examples of the present technology, in these examples comprising lockable extendable connection portions 1335. Lockable extendable connection portions 1335 may also be provided to any of the other head-mounted display systems 1000 described herein.

In general, a positioning and stabilising structure 1300 may comprise a first strap portion and a second strap portion connected by a lockable extendable connection portion 1335, which may comprise both an elastically extendable connector strap portion 1338 and a substantially inextensible connector strap portion 1336. The elastically extendable connector strap portion 1338 may be configured to allow a predetermined amount of separation of the first strap portion from the second strap portion. That is, it may elastically extend to an extent to allow the first and second strap portions to separate (this may assist a user in donning the positioning and stabilising structure 1300). The substantially inextensible connector strap portion 1336 may be configured to releaseably attach the first strap portion to the second strap portion to prevent separation of the first strap portion from the second strap portion (or at least reduce the degree of possible separation). That is, when the substantially inextensible connector strap portion 1336 attaches the first and second strap portions, it prevents them from separating as the elastically extendable connector strap portion 1338 may otherwise allow (this may secure the positioning and stabilising structure 1300 on the user's head in use). The elastically extendable connector strap portion 1338 may also advantageously hold the head-mounted display system 1000 on the user's head with sufficient stability to enable the user to make adjustments to the fit prior to connection of the substantially inextensible connector strap portion 1336.

The user may don the head-mounted display system 1000 with the first and second strap portions unattached by the substantially inextensible connector strap portion 1336 (FIG. 52A). The elastically extendable connector strap portion 1338 may expand to allow the positioning and stabilising structure 1300 to fit over and/or around the user's head, after which the user may attach the first and second strap portions to each other with the substantially inextensible connector strap portion 1336 to hold them securely together for use of the head-mounted display system 1000 (FIG. 52B).

The substantially inextensible connector strap portion 1336 may be able to be adjusted in length. As shown in FIGS. 52A and 52B the substantially inextensible connector strap portion 1336 comprises a clip 1339 having an eyelet through which a portion of the substantially inextensible connector strap portion 1336 is threaded and fastened back onto itself (for example with a hook-and-loop fastening), allowing for more or less of the strap to be pulled through the eyelet.

The substantially inextensible connector strap portion 1336 in this example comprises a magnetic clip 1339 configured to magnetically attach to a connection point 1337 on the positioning and stabilising structure 1300.

In some examples, the elastically extendable connector strap portion 1338 may connect to the head-mounted display unit 1200 at an internal surface of an arm 1210, directly to a pivot point or to a side of the head-mounted display unit 1200.

In some examples, the positioning and stabilising structure 1300 comprises a lockable extendable connection portion 1335 in each lateral strap portion 1330. As shown in FIGS. 52A and 52B, the lockable extendable connection portion 1335 is provided to the lateral strap portion 1330. In this example the lockable extendable connection portion 1335 connects the lateral strap portion 1330 to a strap portion formed by the junction of a parietal strap portion 1310 and an occipital strap portion 1320.

As shown in FIG. 53A, each lockable extendable connection portion 1335 may be located at an arm 1210, extending posteriorly from the head-mounted display unit 1200 (e.g. an arm as has been described herein). In some examples lockable extendable connection portions 1335 may connect directly to a connection point on the head-mounted display unit 1200 (e.g. there may be no arms 1210). In such an examples the lockable extendable connection portion 1335 may pivot about its connection to the head-mounted display unit 1200.

As shown in FIG. 53B, each lockable extendable connection portion 1335 may be located proximate a junction between each lateral strap portion 1330, the parietal strap portion 1310 and the occipital strap portion 1320.

As shown in FIG. 53C, the positioning and stabilising structure 1300 may comprise a lockable extendable connection portion 1335 in an occipital strap portion 1320. In some examples the lockable extendable connection portion 1335 may connect a portion of the occipital strap portion 1320 to an adjustment rigidiser 1380 at this location.

In other examples, the positioning and stabilising structure 1300 may comprise a lockable extendable connection portion 1335 elsewhere, such as in a parietal strap portion 1310, in a top strap portion 1340, or elsewhere.

5.2.1.11 Frontal Support Portion

FIGS. 40A and 40B show head-mounted display systems 1000 according to further examples of the present technology. Each comprises a head-mounted display unit 1200 comprising a display, and a positioning and stabilising structure 1300 configured to hold the head-mounted display unit 1200 in an operable position on a user's head in use.

In these examples, the positioning and stabilising structure 1300 comprises a posterior support portion 1350 configured to engage a posterior portion of a user's head. The positioning and stabilising structure 1300 also comprises a pair of lateral strap portions 1330 configured to connect between the posterior support portion 1350 and the head-mounted display unit 1200, each configured to be located on a respective lateral side of the user's head in use.

Each positioning and stabilising structure 1300 also comprises a frontal support portion 1360 configured to engage the user's head at a location overlying a frontal bone of the user's head, in use. This is shown in FIGS. 40A and 40B.

The frontal support portion 1360 is connected to the head-mounted display unit 1200 in each example. The frontal support portion 1360 may be connected to the head-mounted display unit at one or more locations as will be described.

5.2.1.12 Frontal Support Portion Connects to Head-Mounted Display Unit

As shown in each of FIGS. 40A and 40B, the positioning and stabilising structure 1300 comprises a frontal connector 1362 connected between the frontal support portion 1360 and the head-mounted display unit 1200. In these examples, the frontal connector 1362 is located substantially in the sagittal plane of the user's head. In other examples, the positioning and stabilising structure 1300 may comprise two or more frontal connectors 1362, which may be spaced apart, for example symmetrically across the sagittal plane. The frontal connector 1362 may restrict (e.g. limit or prevent) downwards movement of the head-mounted display unit 1200 in use, especially when the user moves their head.

The frontal connector 1362 may be formed from a flexible material. In some examples the flexible material comprises a flexible inelastic material, such as a thermoplastic material. In other examples the flexible material may comprise an elastic material, such as one of silicone, TPE or an elastic textile strap. The frontal connector 1362 may advantageously hold the head-mounted display unit 1200 steady as the user moves. A frontal connector 1362 formed from elastic material may advantageously act as a shock-absorber during active movement of the user.

In other examples, the frontal connector 1362 is formed from a substantially rigid material, such as a thermoplastic material.

5.2.1.13 Frontal Support Portion Connects to Posterior Support Portion

The frontal support portion 1360 may additionally or alternatively be connected to the posterior support portion 1350.

With reference to FIG. 40A, the positioning and stabilising structure 1300 comprises a pair of lateral connectors 1364 each connected between the frontal support portion 1360 and the posterior support portion 1350. In this particular example, the posterior support portion 1350 comprises a parietal strap portion 1310 configured to overlie the parietal bones of the user's head in use and an occipital strap portion 1320 configured to overlie or lie below an occipital bone of the user's head in use. Each of the lateral connectors 1364 may be connected to a respective side of the posterior support portion 1350 proximate the occipital strap portion 1320, or connected to a respective side of the occipital strap portion 1320. In the illustrated example the positioning and stabilising structure 1300 also comprises lateral strap portions 1330 connecting the posterior support portion 1350 to the head-mounted display unit 1200. In other examples the lateral connectors 1364 may connect to respective lateral support straps 1330.

Each lateral connector 1364 may be elastically extendable. Alternatively, or additionally, each lateral connector may be adjustable in length.

Each lateral connector 1364 may be fixedly connected to the frontal support portion 1360 and releasably attachable to the posterior support portion 1350. Alternatively, each lateral connector 1364 may be releasably attachable to the frontal support portion 1360 and releasably attachable to the posterior support portion 1350. In further examples, each lateral connector 1364 may be releasably attachable to the frontal support portion 1360 and fixedly connected to the posterior support portion 1350. Each lateral connector 1364 may be connected to the posterior support portion 1350 and/or to the frontal support portion 1360 by a snap button, a clip or a hook-and-loop connection.

The lateral connectors 1364 connecting the frontal support portion 1360 to the posterior support portion 1350 (and to the occipital strap portion 1320 in this particular example) enables the frontal support portion 1360 to be held securely (e.g. sufficiently tightly) against the user's head overlying the frontal bone. In particular, this may advantageously allow the frontal support portion 1360 to support a large amount of the weight of the head-mounted display unit 1200, and hold the head-mounted display unit 1200 in position during active movement in use.

5.2.1.14 Arms

As illustrated in each of FIGS. 40A and 40B, the head-mounted display unit 1200 may comprise a display unit housing 1205 and a pair of arms 1210 extending from the display unit housing 1205. The lateral strap portions 1330 each connect to a respective one of the arms 1210, in these examples. In particular, each lateral strap portion 1330 connects to a posterior end of a respective one of the pair of arms 1210. As shown, each lateral strap portion 1330 passes through an eyelet 1212 at the posterior end of the respective arm 1210 and is fastened back onto itself. Each of the pair of arms 1210 is able to pivot with respect to the display unit housing 1205 in these examples.

5.2.1.15 Frontal Support Portion Connects to Arms

With reference to FIG. 40B, the positioning and stabilising structure 1300 in this example comprises a pair of lateral connectors 1364 each connected between the frontal support portion 1364 and a respective one of the pair of arms 1210.

Each lateral connector 1364 may be elastically extendable. Alternatively, or additionally, each lateral connector may be adjustable in length.

Each lateral connector 1364 may be fixedly connected to the frontal support portion 1360 and releasably attachable to a respective one of the arms 1210. Alternatively, each lateral connector 1364 may be releasably attachable to the frontal support portion 1360 and releasably attachable to a respective one of the arms 1210. In further examples, each lateral connector 1364 may be releasably attachable to the frontal support portion 1360 and fixedly connected to a respective one of the arms 1210. Each lateral connector 1364 may be connected to a respective one of the arms 1210 and/or to the frontal support portion 1360 by a snap button, a clip or a hook-and-loop connection.

Lateral connectors 1364 connecting the frontal support portion 1360 to the arms 1210 may enable the frontal support portion 1360 to support some or all of the weight of the head-mounted display unit 1200, via the arms, optionally in addition to the frontal connector 1362, and hold the head-mounted display unit 1200 in position during active movement in use.

5.2.1.16 Hair Strap Portion

FIGS. 41A and 41B show a head-mounted display system 1000 according to another example of the present technology. The head-mounted display system 1000 comprises a positioning and stabilising structure 1300 configured to hold a head-mounted display unit 1200 in an operable position on the user's head (as shown in FIGS. 41A and 41B in use).

In this example, the positioning and stabilising structure 1300 comprises a posterior support portion 1350 configured to engage a posterior portion of a user's head and one or more anterior support portions (in this example particular example a pair of lateral strap portions 1330 and a top strap portion 1340) configured to connect the posterior support portion 1350 and the head-mounted display unit 1200 in use. In other examples the top strap portion 1340 may be omitted, or the positioning and stabilising structure may have a pair of upper lateral strap portions and a pair of lower lateral strap portions, for example.

In this example, the positioning and stabilising structure 1300 comprises a hair strap portion 1370 connected to the posterior support portion 1350. The hair strap portion 1370 may be positionable in use between the user's head and hair descending from the posterior portion of the user's head. The hair strap portion 1370 may be able to be put under the user's hair, if the user has sufficiently long hair. The hair strap portion 1370 may anchor under the hair, e.g. between the hair and neck or hair and head, to provide further stability to the head-mounted display system 1000. FIG. 41B shows the hair strap portion 1370 under the user's hair.

As discussed above, in this example the one or more anterior support portions comprises a pair of lateral strap portions 1330 connecting the posterior support portion 1350 to the head-mounted display unit 1200.

As illustrated, the hair strap portion 1370 comprises a pair of ends 1371 and 1372 connected to respective lateral sides of the posterior support portion 1350. Each end of the hair strap portion 1370 is located proximate the Frankfort horizontal plane of the user's head in use. The hair strap portion 1370 may be removably attachable at one or both ends of the hair strap portion 1370 to the posterior support portion 1350.

In some examples, the hair strap portion 1370 comprises a left strap portion and a right strap portion removably attached to the left strap portion. The left strap portion may be removably attached to the right strap portion proximate a sagittal plane of the user's head in use. The user may separate the two strap portions and reconnect them under their hair when donning the head-mounted display system 1000.

In some examples, the hair strap portion 1370 is elastically extendable. In other examples, the hair strap portion 1370 is substantially non-extendable.

As shown in FIGS. 41A and 41B, in this illustrated example the posterior support portion 1350 comprises a parietal strap portion 1310 configured to overlie the parietal bones of the user's head in use and an occipital strap portion 1320 configured to overlie or lie below an occipital bone of the user's head in use. In particular, the hair strap portion 1370 is connected to the occipital strap portion in use. The hair strap portion 1370 may be connected to the occipital strap portion 1320 proximate ends of the occipital strap portion 1320.

A hair strap portion 1370 as described herein may be incorporated into any of the positioning and stabilising structures 1300, having an occipital strap portion, described herein.

5.2.1.17 Releasable Attachment of Posterior Portion

Figure 57A:
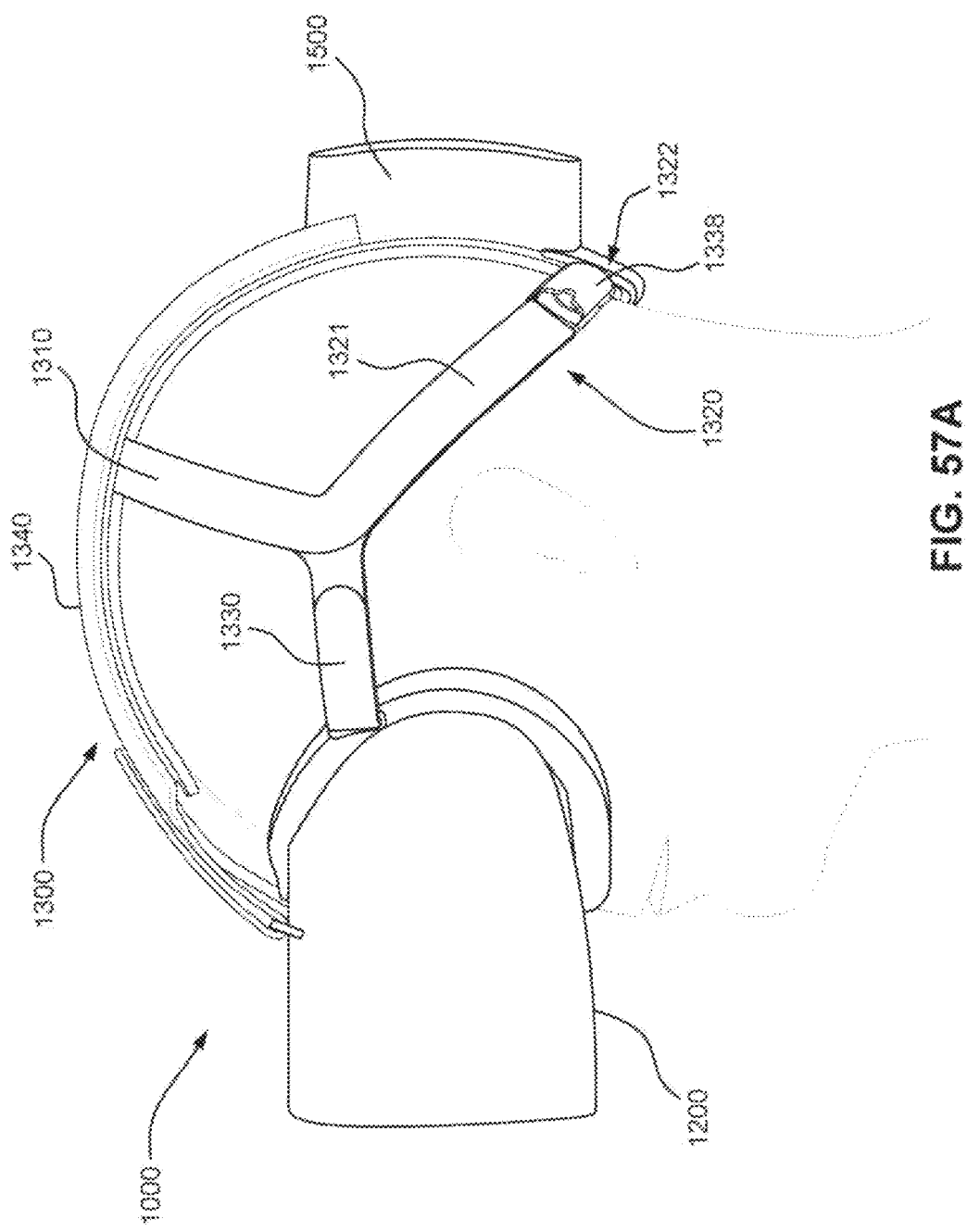
Figure 57B:
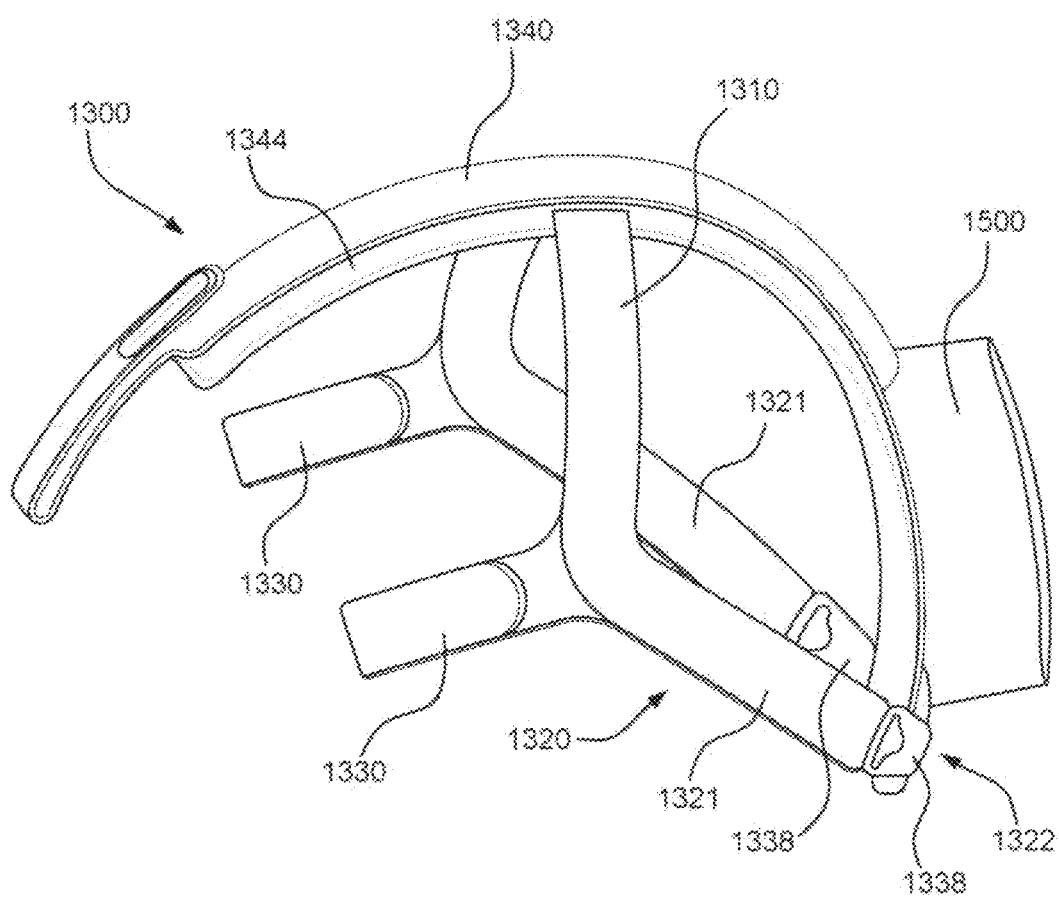
Figure 57C:
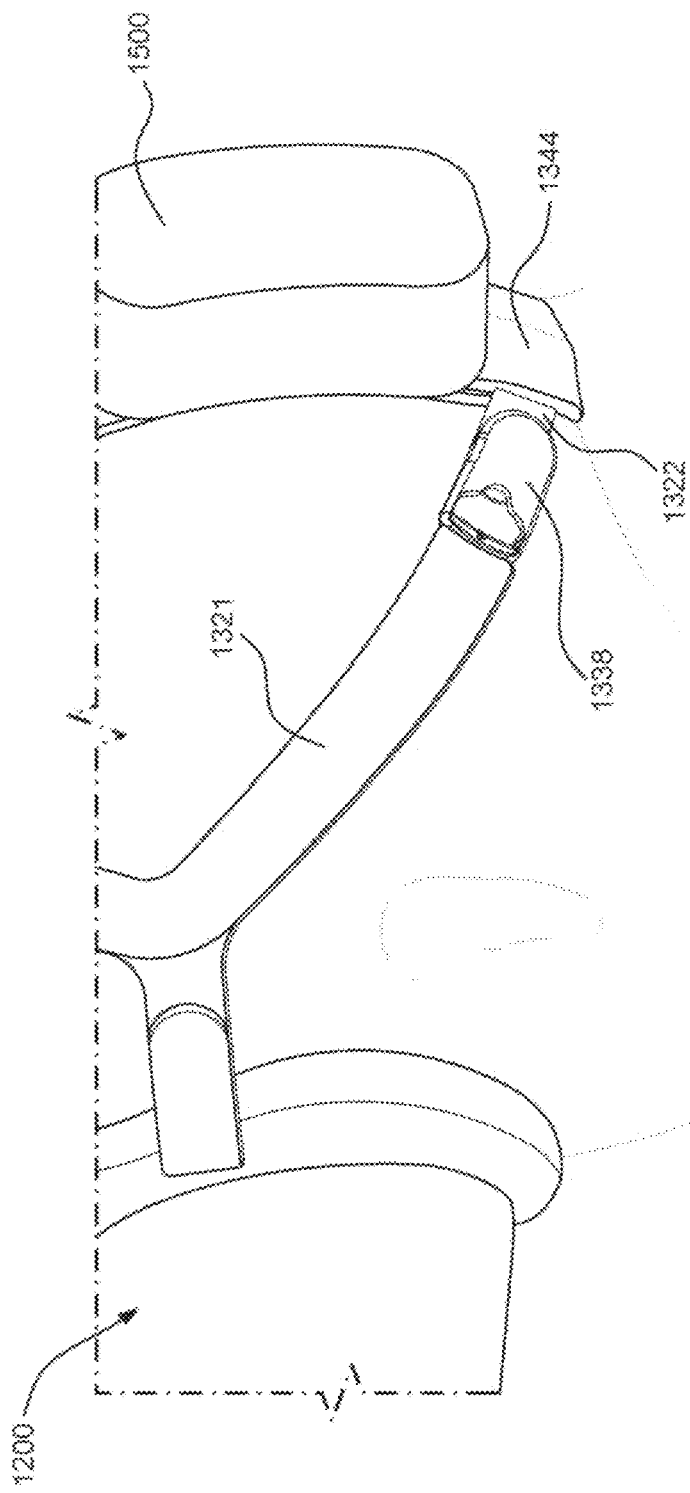

FIGS. 57A-57D show head-mounted display systems 1000 according to further examples of the present technology, although share features with the examples described elsewhere, not all of which will be repeated. FIGS. 57A and 57B show a positioning and stabilising structure 1300 having a parietal strap portion 1310, a pair of lateral strap portions 1330, and a top strap portion 1340.

The positioning and stabilising structure 1300 further has an occipital strap portion 1320 formed by a pair of lateral occipital strap portions 1321 extending from the parietal strap portion 1310, each of the lateral occipital strap portions 1321 releasably attached to a medial occipital portion 1322 configured to overlie or lie below an occipital bone of the user's head in use. In other examples the lateral occipital strap portions 1321 may not extend from a parietal strap portion 1310 and may instead extend (e.g. in a partially inferior and partially posterior direction) from another component of the positioning and stabilising structure 1300 or head-mounted display system 1000.

The parietal strap portion 1310, the medial occipital portion 1322 and the lateral occipital strap portions 1321 may form a posterior support portion 1350 configured to engage a posterior portion of a user's head in use. The parietal strap portion 1310 is configured to overlie the parietal bones of the user's head in use. The pair of lateral occipital strap portions 3122 are each configured to be located on a respective lateral side of the user's head in use. As shown in FIG. 57A for example, the positioning and stabilising structure 1300 may comprise a top strap portion 1340 configured to connect between the posterior support portion 1350 and the head-mounted display unit 1200.

In some examples the top strap portion 1340 connects directly to the posterior support portion 1350 (e.g. connecting directly to the parietal strap portion 1310 or occipital strap portion 1320). In other examples the top strap portion 1350 connects to the posterior support portion 1350 via another component, such as a battery pack 1500. That is, in some examples the top strap portion 1340 is connected to the posterior support portion 1350 by connecting to a battery pack 1500 which is connected to a component of the posterior support portion 1350, such as the occipital strap portion 1320.

The head-mounted display system 1000 may comprise a battery pack 1500 for powering the head-mounted display system 1000. The battery pack 1500 may be located posteriorly to the user's head in use. The battery pack 1500 may be configured to be connected to the top strap portion 1340 in use. Any features of a top strap portion 1340 and battery pack 1500 described elsewhere herein may be applied to the top strap portion 1340 and battery pack 1500 shown in FIGS. 57A-57D, unless context clearly requires otherwise.

In the example illustrated, the medial occipital portion 1322 is rigidised. The medial occipital portion 1322 may comprise an occipital rigidiser. In alternative examples the medial occipital portion 1322 may comprise a flexible strap, e.g. a medial occipital portion strap. In some examples, the medial occipital portion 1322 may form part of the top strap portion 1340. The medial occipital portion 1322 may be permanently attached within the top strap portion 1340, for example permanently attached to a user-facing layer In some examples the medial occipital portion 1322 may be secured to the top strap portion 1340, for example stitched or welded in place to a user-facing layer 1344 of the top strap portion 1340. In alternative examples, the medial occipital portion 1322 may be secured in a similar manner as described elsewhere with reference to the adjustment rigidiser 1380.

In some examples, the positioning and stabilising structure 1300 comprises a releasable fastener between each of the pair of lateral occipital strap portions 1321 and the medial occipital portion 1322. Each releasable fastener may comprise a fastener portion configured to be attached to a corresponding connection point 1337. In the FIG. 57A-57D example, the medial occipital portion 1322 comprises a pair of connection points 1337 configured to connect to corresponding fastener portions provided to the respective lateral occipital strap portions 1321.

Figure 57D:
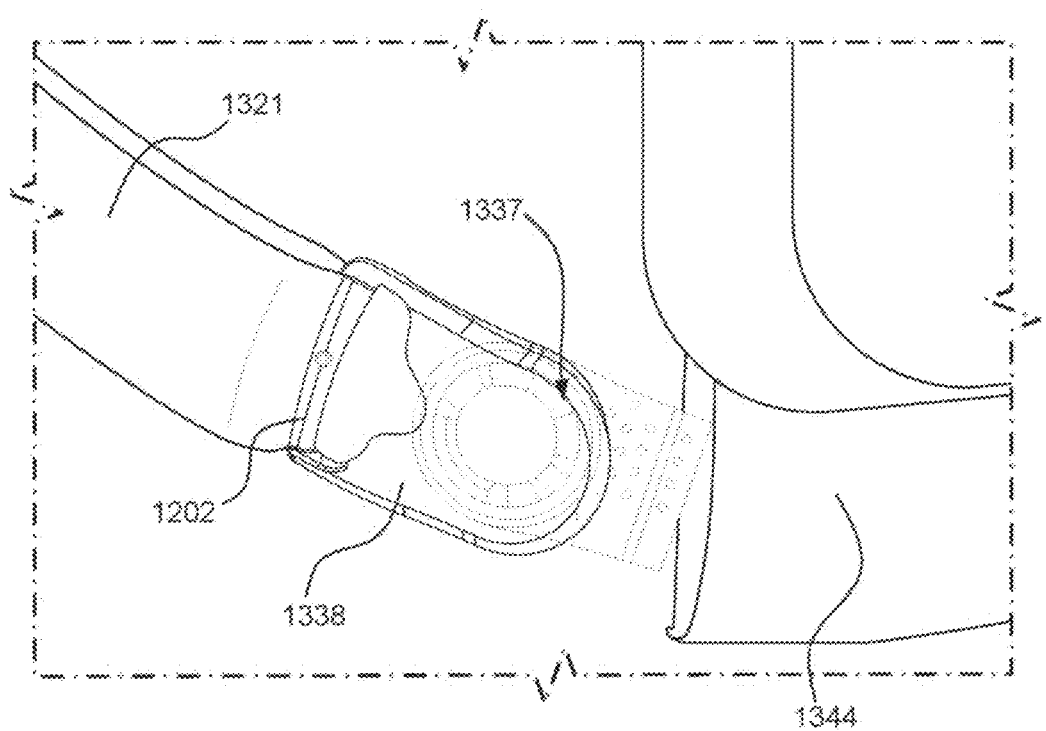

As shown in FIG. 57D, in some examples the releasable attachment is provided by a magnetic fastener. Each magnetic fastener may comprise a magnetic clip portion configured to magnetically attach to a respective one of the connection points 1337. As shown in FIG. 57D, a magnetic clip 1339 is secured to the lateral occipital strap portion 1321, the magnetic clip 1339 configured to magnetically attach to a connection point 1337 on the posterior occipital portion 1322.

In examples, the length of each of the lateral occipital strap portions 1321 may be adjustable. For example, each magnetic clip 1338 may have an eyelet 1202, and a portion of each of the pair of lateral occipital strap portions 1321 may be threaded through the eyelet and fastened back onto itself at a desired length.

5.2.1.18 Washable Portion of Positioning and Stabilising Structure

FIGS. 60A-60C show further illustrations of the positioning and stabilising structure 1300 shown in FIGS. 57A-57D described above. Many features, such as those relating to the magnetic clips 1338, will not be repeated here but are applicable in combination with the concepts described below. The positioning and stabilising structure 1300 shown in FIGS. 60A-60C also shares some features with the examples shown in FIGS. 42A-42D and 44A-44D. Unless required otherwise, the features of each of these embodiments are to be understood to be applicable to each of the other examples as alternatives or in combination.

In the FIGS. 60A-60C example, the top strap portion 1340 comprises a user-facing layer 1344 and an outer layer 1341 (on an opposite side of the top strap portion 1340 to the user-facing layer 1344). In this example, the user-facing layer 1344 of the top strap portion 1340, the parietal strap portion 1310, the occipital strap portion 1320 and lateral strap portions 1330 are separable from the outer layer 1341 of the top strap portion 1340. FIG. 60B shows these components separated from the outer layer 1341 of the top strap layer 1340. FIG. 60C shows the separated outer layer 1341 of the top strap portion 1340 (in this example the outer layer 1341 is formed by a sleeve 1348, to be described below).

Advantageously, the user-facing layer 1344 of the top strap portion 1340, the parietal strap portion 1310, the occipital strap portion 1320 and lateral strap portions 1330 form a washable portion (shown in FIG. 60B). These components may all be formed from washable materials, e.g. textile materials, plastic materials, non-electronic components. The washable portion can be separated from the outer layer 1314 of the top strap portion 1340 for washing by the user, for example periodically or when dirty as required.

The top strap portion 1340 in this example comprises a substantially inextensible layer 1343 (e.g. a rigidiser, being at least partially rigid in the sense that it is able to at least partially hold its shape under its own weight) located between the outer layer 1341 and the user-facing layer 1340 in use. The substantially inextensible layer 1343 may transfer the weight of a rear-mounted battery pack 1500 into an upwards force on the head-mounted display unit 1200. In examples in which there is no rear-mounted battery pack 1500 (e.g. in which any battery is in the head-mounted display unit 1200), the substantially inextensible layer 1343 may support the head-mounted display unit 1200 by anchoring it to the posterior support portion 1350. In the FIG. 60A-60C example, the head-mounted display system 1000 comprises a battery pack 1500 for powering the head-mounted display system 1000, the battery pack 1500 is configured to be located posteriorly to the user's head in use. The top strap portion 1340 is connected to the battery pack in use.

The washable portion may be separable from the substantially inextensible layer 1343. In this example the top strap portion 1340 comprises a sleeve 1348 forming the outer layer 1341. The substantially inextensible layer 1343 is located within the sleeve 1348. The sleeve 1348 is connected to the battery pack 1500, as shown in FIG. 60C. The head-mounted display system 1000 may comprise a power cable connected between the battery pack 1500 and the head-mounted display unit 1200, the power cable located within the sleeve 1348 (e.g. in a manner described elsewhere herein).

The washable portion may be releasably attached to the sleeve 1348 with one or more hook and loop fastenings. The outer layer 1341 of the top strap portion 1340 is configured to connect to the head-mounted display unit 1200 (for example via an eyelet or in any other manner described herein). The sleeve 1348 may be formed from a textile material.

5.2.2 Arms Inside of Head-Mounted Display Unit Periphery

While in some examples of the present technology, arms 1210 of a head-mounted display unit 1200 may extend from an outside of a display unit housing, in some examples of the present technology, arms 1210 may extend from inside of a head-mounted display unit 1200.

Figure 55A:
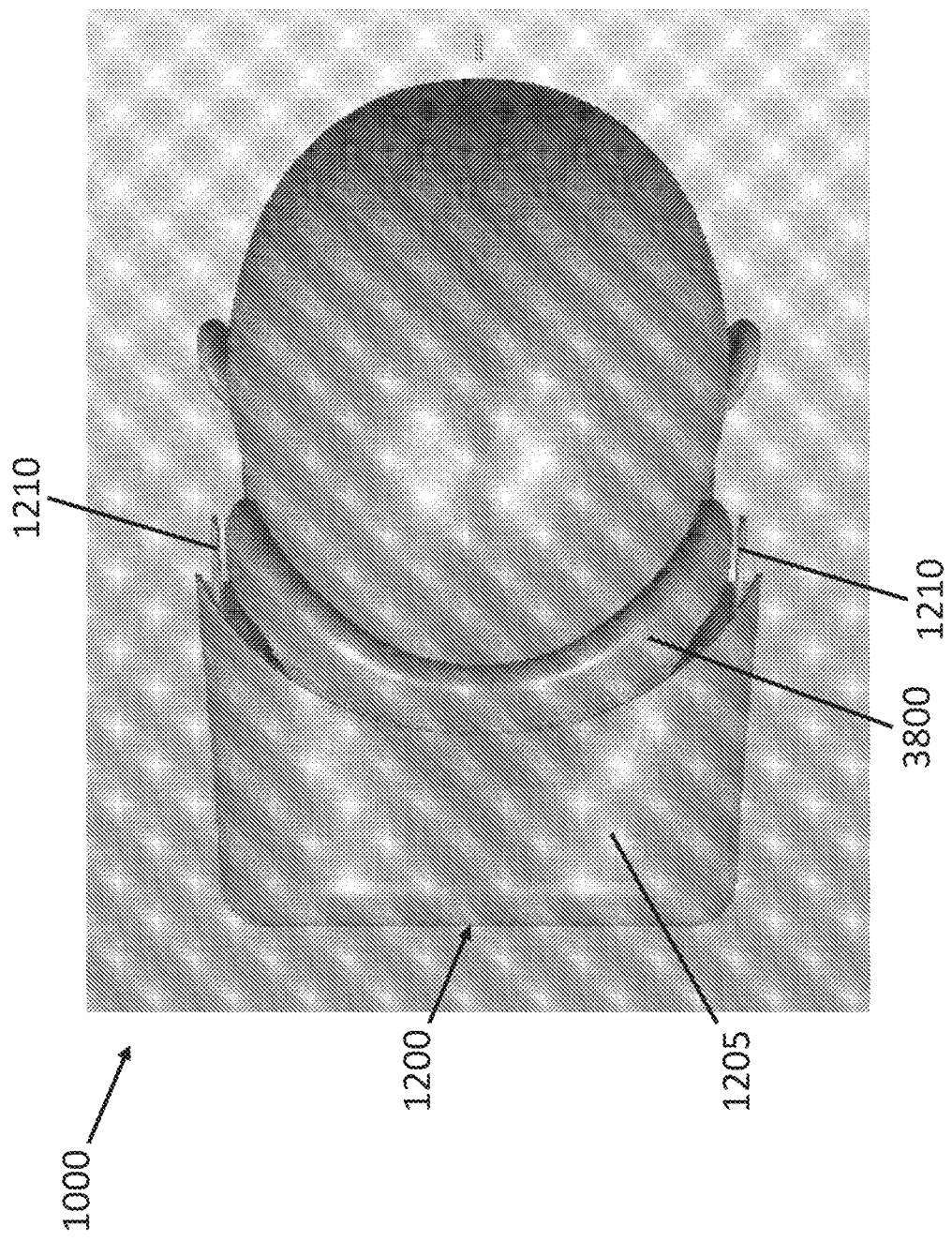

As shown in FIGS. 55A-55I, a head-mounted display system 1000 may comprise a head-mounted display unit 1200 and a positioning and stabilising structure 1300 (not shown in FIGS. 55A-55I) structured and arranged to hold the head-mounted display unit 1200 in an operational position over a user's face in use (e.g. in the position shown in FIG. 55A). The positioning and stabilising structure may comprise a posterior support portion 1350 configured to engage a posterior portion of a user's head, and a pair of lateral strap portions 1330 configured to connect between the posterior support portion 1350 and the head-mounted display unit 1200, each configured to be located on a respective lateral side of the user's head in use. The head-mounted display unit 1200 may comprise a display unit housing 1205 comprising a display, and an interfacing structure 3800 configured to contact the user's face in use.

The head-mounted display unit 1200 may further comprise a pair of arms 1210. Each arm 1210 may extend posteriorly from the display unit housing 1205, the arms 1210 each being configured for attachment to a respective one of the lateral strap portions 1330 of the positioning and stabilising structure 1300.

In the example shown in FIGS. 55A-55I, the display unit housing 1205 has a posterior side having a periphery (e.g. an outermost periphery). Each of the arms 1210 extend from the display unit housing 1205 from within the periphery of the posterior side of the display unit housing 1205. Arms 1210 extending from inside of the periphery of the display unit housing may reduce the overall width of the head-mounted display unit 1200 and/or may facilitate closer to optimal headgear force vectors (e.g. closer to parallel with the anterior-posterior axis).

Figure 55B:
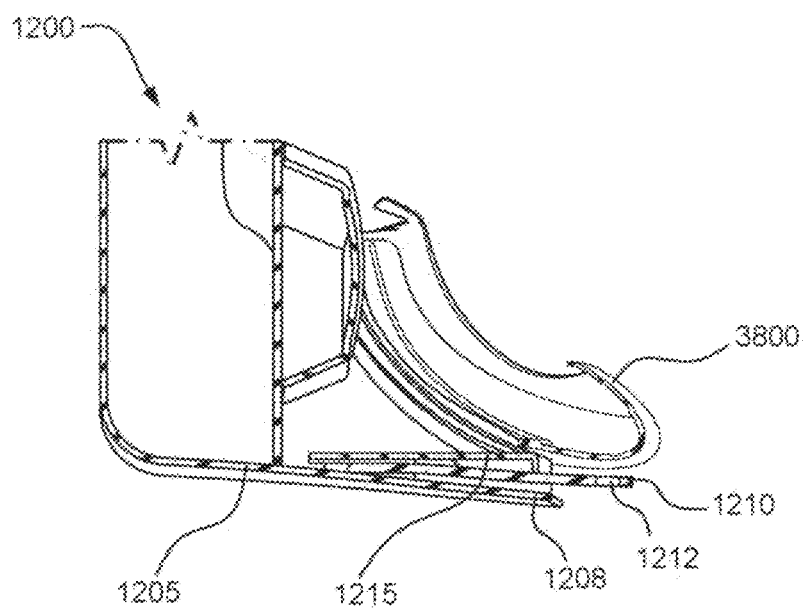
Figure 55C:
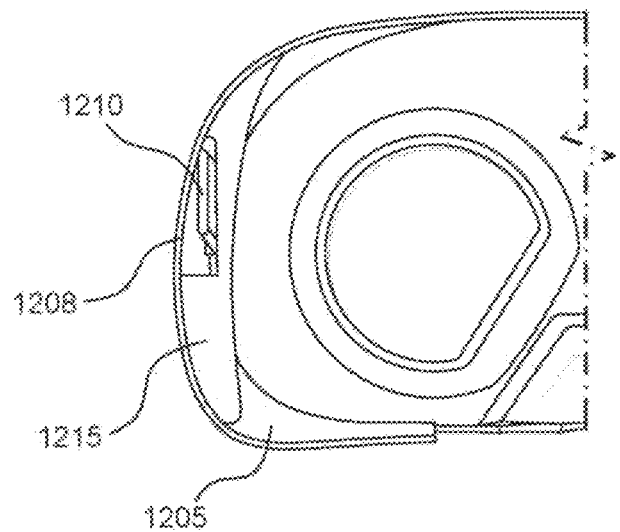
Figure 55D:
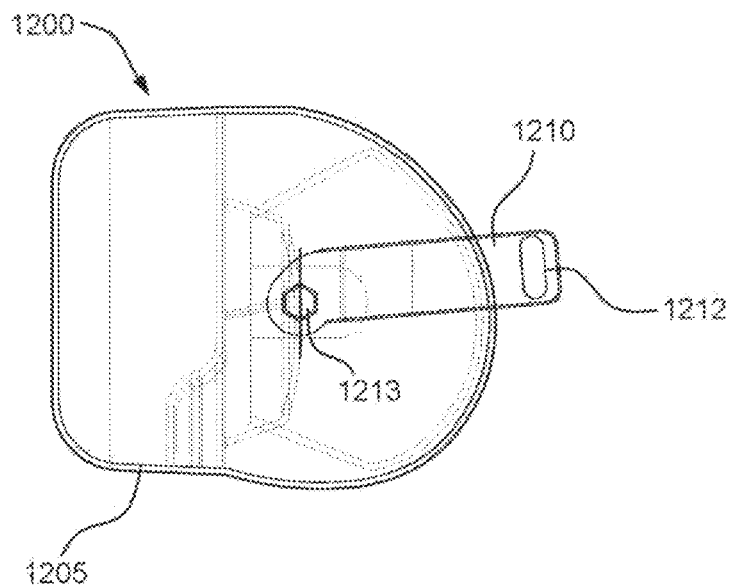

As shown in FIGS. 55A-55C in particular, the interfacing structure 3800 has a periphery, and each of the arms 1210 is located between the periphery of the posterior side of the display unit housing 1205 and the periphery of the interfacing structure 3800. The arms 1210 may each be located medially of an adjacent portion of the display unit housing 1205. Additionally, the arms 1210 may each be located laterally of an adjacent portion of the interfacing structure 3800. The lateral-most portions of the display unit housing 1205 may be lateral to some or all of the arms 1210. The lateral-most portions of the display unit housing 1205 may be located laterally of the connection between a respective one of the arms 1205 and the display unit housing 1205, for example.

Each of the arms 1210 may comprise an eyelet 1212 configured to receive a respective one of the lateral strap portions 1330 of the positioning and stabilising structure 1300. The eyelet 1212 of each arm may be located at or proximate a posterior end of the respective arm 1210.

Figure 55E:
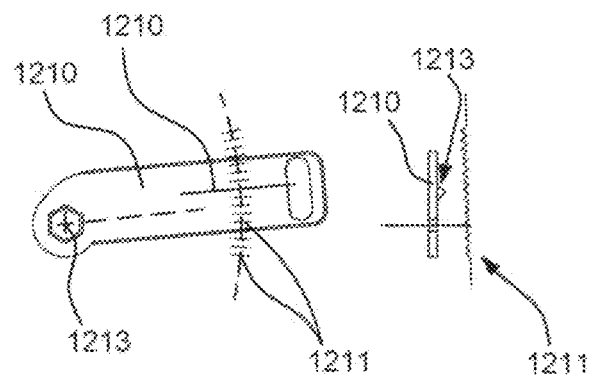
Figure 55F:
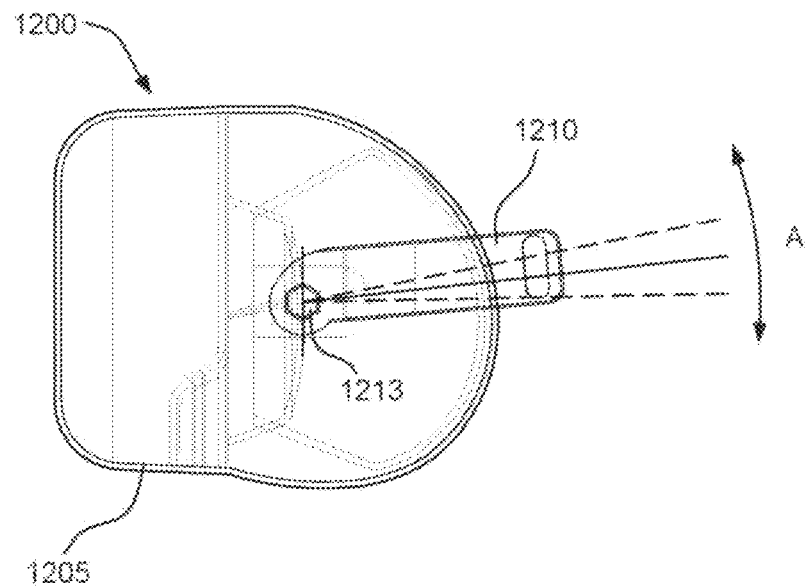
Figure 55G:
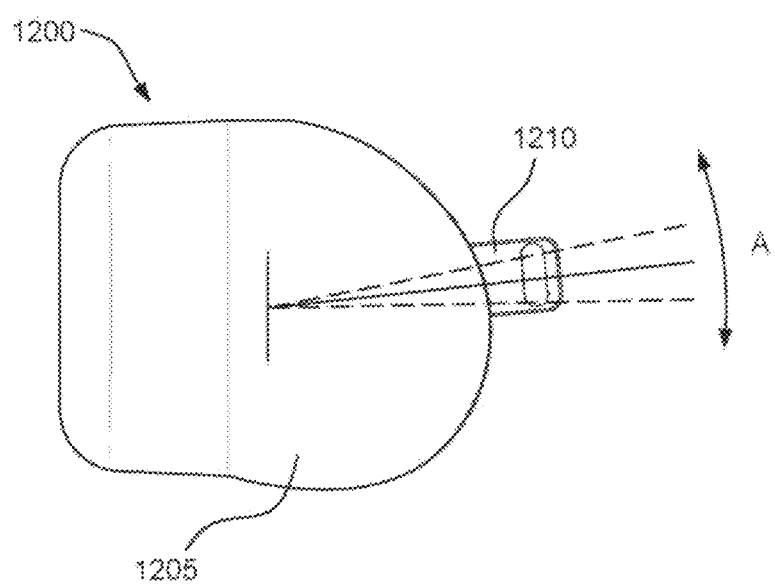
Figure 55H:
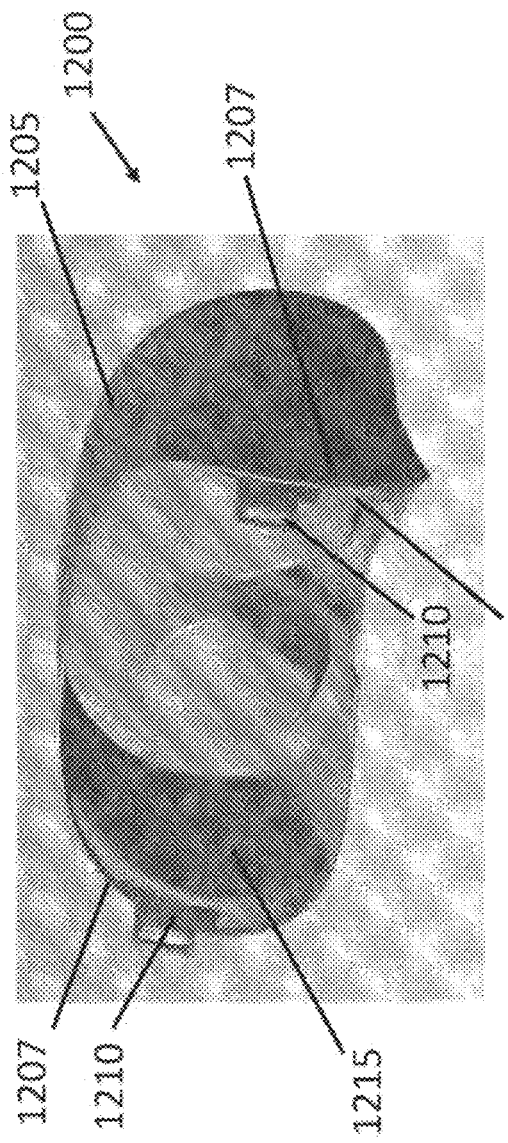
Figure 55I:
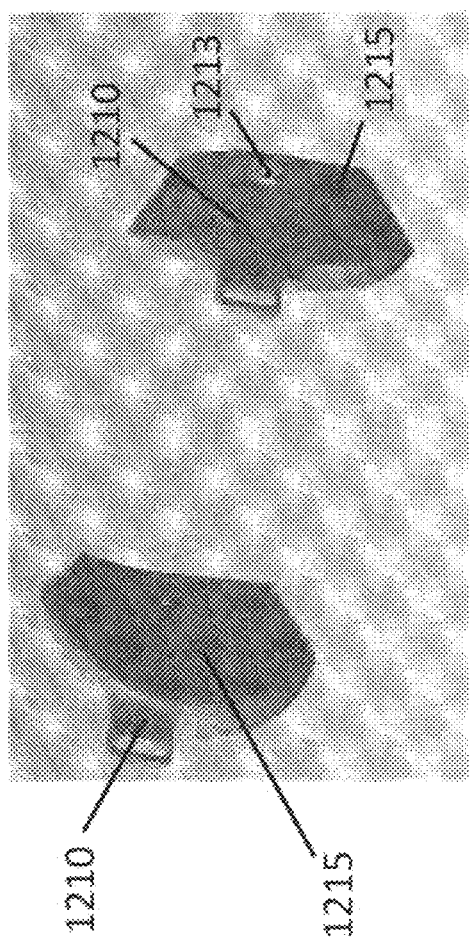

Each of the pair of arms 1210 may be able to pivot with respect to the display unit housing 1205. FIGS. 55D-55G and 55I show a pivot point 1213 of each arm. The pivot point may be proximate the display and may be located anterior to the user's face. Each of the arms 1210 may be configured to pivot about a horizontal axis perpendicular to the sagittal plane of the user's head in use. Each of the arms 1210 may be configured to pivot through an angular range A of at least 9 degrees (FIGS. 55F and 55G). In some examples the angular range A may be at least 19 degrees.

In some examples, each of the arms 1210 has a predetermined resistance to pivotal movement with respect to the display unit housing 1205. As depicted in FIG. 55E, each of the arms 1210 may be configured to pivot between a plurality of predetermined incremental orientations (e.g. the arms 1210 may snap, fall or fit into place at a plurality of orientations). The predetermined resistance to pivotal movement being required to be overcome before the arms 1210 are able to pivot from one predetermined incremental orientation to another.

The display unit housing 1205 in the FIG. 55E example comprises a plurality of recesses 1211 (e.g. formed by a plurality of bumps) corresponding to the predetermined incremental orientations. Additionally, each of the arms 1210 comprises a protrusion 1213 configured to fit to each of the recesses 1211. A predetermined force (e.g. predetermined resistance to pivotal movement) may be required to move each arm 1210 from one recess 1211 to another.

In another example, each of the arms 1210 is connected to the display unit housing 1205 such that a predetermined static torque resistance is required to be overcome for each arm 1210 to pivot with respect to the display unit housing 1205. In some examples, the predetermined static torque resistance is provided by static friction. The static friction may act between each arm 1210 and a respective portion of the display unit housing 1205 or respective arm mounting portion 1215 (to be described below). In some examples, the head-mounted display system 1000 comprises a pair of friction rings 1220 (e.g. O-rings, washers or the like). FIG. 59 shows a schematic cross section view through the pivot point 1213 of an arm 1210. Each friction ring 1220 may be mounted in contact with a respective one of the arms 1210 and with an adjacent surface within the head-mounted display unit 1200 (which may be a surface of an arm mounting portion 1215. The friction rings 1220 provide static friction required to be overcome for each arm 1210 to pivot with respect to the display unit housing 1205. As shown in FIG. 59, each friction ring 1220 may be received in a correspondingly shaped recess within the arm 1210. This may hold the friction ring 1220 in place without the friction ring 1220 occupying excessive space within the head-mounted display unit 1200. In this example a bolt 1221 and nut 1222 secure the arm 1210 to the arm mounting portion 1215. The friction rings 1220 may be formed from a high-friction material and/or clamped to result in the desired friction and predetermined static torque resistance.

The arms 1210 may have a length such that the posterior end of each arm 1210 is located proximate a respective one of the user's ears.

As shown in FIGS. 55B, 55C, 55H and 55I in particular, each of the arms 1210 is attached to a respective one of a pair of arm mounting portions 1215, in this particular example. The display unit housing 1205 may comprise a pair of lateral portions 1207 on opposing lateral sides of the display unit housing 1205, each of the arm mounting portions 1215 being attached to a medial side of a respective one of the lateral portions 1207. In this example, each of the arms is located between a respective arm mounting portion 1215 and a respective lateral portion 1207 of the display unit housing 1205. Each arm 1210 may be pivotably connected to a respective arm mounting portion 1215. In other examples, each arm mounting portion 1215 is attached to or is integrally formed with the display unit housing 1205 or other component, such as a lens plate.

As shown in FIGS. 58A and 58B, in some examples each of the arms 1210 has a transverse cross sectional shape comprising a major axis MA and a minor axis MN. Each arm 1210 is larger in the major axis MA than in the minor axis MN in this example (e.g. the arms 1210 each have a flat shape, which may be rectangular for examples). In some examples of the present technology, the major axis MA is aligned parallel to the sagittal plane of the user's head in use along the length of the arm 1210. FIG. 58A shows a cross section of the arm 1210 having a vertical orientation (e.g. aligned with the sagittal plane). One drawback of this arrangement is that the arm 1210 may be limited in how much it can pivot before interfering with the display unit housing 1205 (as depicted in FIG. 58A). Accordingly, in some examples of the present technology, at a point along the length of each arm 1210 located interior to the display unit housing (e.g. where interference may occur), the major axis MA is oriented at an oblique angle O to the sagittal plane of the user's head in use (equal to an angle O with a vertical axis VA), as depicted in FIG. 58B. The angular range through which the arm 1210 may be able to be pivoted may be increased in this example in comparison to the FIG. 58A example with no or only a small amount of extra space occupied by the arm 1210 and associated surrounding components.

In some examples, at the point along the length of each arm 1210 located interior to the display unit housing 1205, the major axis MA of the transverse cross sectional shape has a superomedial-inferolateral orientation in use. This is the orientation shown in FIG. 58B.

In some examples, each of the arms 1210 is shaped such that the major axis MA of the transverse cross section changes orientation along the length of the arm 1210. For example, the shape or cross sectional orientation of each arm 1210 may have one orientation inside of the head-mounted display unit 1200 (e.g. a major axis MA having a superomedial-inferolateral orientation) and another orientation outside of the head-mounted display unit 1200 (e.g. a vertical orientation). In some examples, at a point along the length of each arm 1210 located exterior to the display unit housing 1205, the major axis MA is oriented substantially parallel to the sagittal plane of the user's head in use.

A head-mounted display system 1000 having arms 1200 as described with reference to FIGS. 55A-55I may have any one or more of the other features described in herein (such as a top strap portion 1340), unless the context clearly requires otherwise).

5.2.3 Headgear Buckle Integrated into Interface Structure

With reference to FIGS. 56A and 56B, in some examples the head-mounted display unit 1200 comprises a display unit housing 1205 and an interfacing structure 3800. The interfacing structure 3800 may be constructed and arranged to be in opposing relation with the user's face. The interface structure 3800 may comprise a face-engaging portion 3810 configured to engage the user's face in use, and a chassis 3802 connected to the face-engaging portion 3810 and further connected to the display unit housing 1205 to attach the interfacing structure 3800 to the display unit housing 1205.

FIGS. 56A and 56B are schematic cross section views of a superior portion of the interfacing structure 3800 and display unit housing 1205 aligned with the sagittal plane of the user's head.

In the FIGS. 56A and 56B examples, the chassis 3802 of the interfacing structure 3800 is configured for attachment to a top strap portion 1340 of a positioning and stabilising structure 1300 for holding the head-mounted display unit 1200 in an operable position on a user's head in use. The positioning and stabilising structure 1300 may further comprise a posterior support portion 1350 configured to engage a posterior portion of a user's head, and a pair of lateral strap portions 1330 configured to connect between the posterior support portion 1310 and the head-mounted display unit 1205, each configured to be located on a respective lateral side of the user's head in use. Features of top strap portions 1340 and positioning and stabilising structures 1300 are described elsewhere herein.

As shown in FIGS. 56A and 56B, the chassis 3802 may comprise an eyelet 3812 through which the top strap portion 1340 is able to be looped back and secured to itself. In the FIG. 56A example, the eyelet 3812 is formed by both the chassis 3802 and the display unit housing 1205 such that the top strap portion 1340 is able to be looped around both a portion of the chassis 3802 and a portion of the display unit housing 1205. In the FIG. 56B example, the eyelet 3812 is formed in a superiorly projecting portion 3814 of the chassis 3802. As illustrated, the superiorly projecting portion 3814 may project through an opening in the display unit housing 1205.

The top strap portion 1340 may pass through the eyelet 3812, loop back and secure to itself, e.g. with a hook-and-loop fastening, a buckle, a magnetic connection or the like.

The chassis 3802 may be a substantially rigid portion and may be formed from a thermoplastic material or an elastomer, such as a high durometer elastomer.

5.2.4 Interfacing Structure

In some embodiments, two or more of the chassis, support structure and face engaging surfaces of the interfacing structure can be integrally formed as a single component comprising varying thicknesses and finishes thereacross so as to provide the desired level of rigidity at the chassis or desired level of cushioning effect at the face engaging surfaces. For example, in some such embodiments, the interfacing structure can be formed from a singular silicone body. For example, FIGS. 31A to 31C show an interfacing structure 3100 comprising a support structure in the form of a support flange 3102, supporting an integral face engaging flange 3106 having a face engaging surface 3108. In further embodiments, additional components may be provided to the interfacing structure 3100. In alternative embodiments, the interfacing structure can be integrally formed as a single component from a foam or an elastomeric material.

In some forms of the present technology, an interfacing structure may comprise a face engaging portion constructed from a flexible and resilient material (for example, an elastomer such as silicone), supported by a more rigid support portion (for example, constructed from a plastics material). In embodiments the rigid support portion may comprise a chassis.

For example, with reference to FIG. 32A, the interfacing structure 3200 may comprise a rigid support portion 3202 to which a flexible and resilient face engaging portion 3204 may be provided. The face engaging portion 3204 may be curved in cross-section, having a support flange 3206 and an integral face engaging flange 3208 having a face engaging surface 3210. An overlapping portion 3212 of the face engaging portion 3204 may be secured to the rigid support portion 3202.

In a further example, with reference to FIG. 32B, the rigid support portion 3202 may comprise a locating portion, for example recess 3214. The face engaging portion 3204 may comprise a biasing portion, for example spring 3216, received within the recess 3214 and configured to provide a biasing force to the face engaging portion 3204 in the direction of the user's face.

In a further example, with reference to FIG. 32C, the face engaging portion 3204 may comprise a concertina section 3218 between the rigid support portion 3202 and the face engaging flange 3208. The concertina section 3218 comprises one or more folds, and may provide a higher degree of flexibility or increased movement to assist with compliance against the user's face.

In some forms of the present technology, the interfacing structure may comprise a foam portion supported by the resilient and flexible face engaging portion, wherein the foam portion provides the face engaging surface.

For example, with reference to FIG. 33A, the interfacing structure 3300 may comprise a rigid support portion 3302 to which a flexible and resilient face engaging portion 3304 may be provided, in a configuration similar to that described with reference to FIG. 32A. The face engaging portion 3304 has a support flange 3306 and an integral face engaging flange 3308, with an overlapping portion 3310 secured to the rigid support portion 3302. A foam cushion 3312 having a face engaging surface 3314 is provided to a user facing side of the face engaging flange 3308. In examples the foam cushion 3312 may be permanently attached to the face engaging flange 3308. In alternative embodiments the foam cushion 3312 may be releasably attached to the face engaging flange 3308. In the example of FIG. 33A, the foam cushion 3312 may comprise a textile-foam composite (e.g. a foam core with a textile outer layer). In the example of FIG. 33B, the foam cushion 3312 may comprise a flocked foam. In the example of FIG. 33C, the foam cushion 3312 may comprise a raw foam.

In some forms, the foam cushion 3312 in FIGS. 33A-33C may be constructed from an adaptive foam 13800 (see e.g., FIGS. 33A-1 to 33C-1). As described in detail above, the adaptive foam may expand under certain usage conditions, and may assist in providing the user with additional cushioning (e.g., and comfort).

In some forms of the present technology, the interfacing structure may comprise a textile layer provided to the resilient and flexible face engaging portion, wherein the textile layer provides the face engaging surface.

For example, with reference to FIG. 34A, the interfacing structure 3400 may comprise a rigid support portion 3402 to which a flexible and resilient face engaging portion 3404 may be provided, in a configuration similar to that described with reference to FIG. 32A. The face engaging portion 3404 has a support flange 3406 and an integral face engaging flange 3408, with an overlapping portion 3410 secured to the rigid support portion 3402. A textile layer 3412 having a face engaging surface 3414 is provided to a user facing side of the face engaging flange 3408. In the example of FIG. 34A the textile layer 3412 is releasably attached to the face engaging portion 3404 using retaining means 3416. In one example the retaining means 3416 may be a rigid element clipping the textile layer 3412 in place. In another example the retaining means 3416 may be elasticised, fitting over the face engaging portion 3404 to hold it in place. In an alternative embodiment, with reference to FIG. 34B, the textile layer 3412 may be permanently attached to the face engaging flange 3308. It is envisaged that in this embodiment, the surface area of the textile layer 3412 may be smaller in comparison with that of FIG. 34A, as the textile layer 3412 may be delimited to the region likely to contact the user's skin—i.e. does not need to extend as far around the exterior of the face engaging portion 3404. This may also have the effect of reducing the impact of the textile layer 3412 on spring properties of the exposed region of the support flange 3406.

In some forms of the present technology, an interfacing structure may comprise a face engaging portion supported by a more rigid support portion (for example, constructed from a plastics material), wherein the face engaging portion comprises a foam cushion and an elastomeric cover over the foam cushion.

For example, with reference to FIG. 35A, the interfacing structure 3500 may comprise a rigid support portion 3502 to which a flexible and resilient face engaging portion 3504 may be provided. The face engaging portion 3504 may have a support flange 3506, and a cushion support flange 3508 extending from the support flange 3506. A foam cushion 3510 is provided on cushion support flange 3508. A cushion cover 3512 (made of, for example, an elastomer) extends over the foam cushion 3510 and provides a face engaging surface 3514 in use. In this example, the cushion cover 3512 is releasably attached, for example using securing means 3516. The free edge of the cushion cover 3512 extends beyond the cushion support flange 3508.

In another example, with reference to FIG. 35B, the cushion cover 3512 is permanently attached to the support flange 3506 and cushion support flange 3508 (for example, being integrally formed). In the example of FIG. 35B the cushion cover 3512 does not extend around the foam cushion 3512 so far as to reach the cushion support flange 3508.

FIG. 35C shows an example in which the cushion support flange 3508 extends from the rigid support portion 3502, and is made of a more rigid material than the cushion cover 3012.

In examples, such as that illustrated in FIG. 35D, the cushion cover 3512 may extend from a position on the cushion support flange 3508 proximal to the user's face in use. In such an example, the exposure of the foam cushion 3510 may be considered to be "outward" facing, in comparison with an "inward" facing exposure of the foam cushion 3510 in the example of FIG. 35B.

In another example, with reference to FIG. 35E, the face engaging portion 3504 comprises an overlapping portion 3516 secured to the rigid support portion 3502. The cushion cover 3512 may overlay the foam cushion 3510 and the 3506 support flange. In an example, the edge of the cushion cover 3512 may sit proximal to the rigid support portion 3502. In alternative examples, the cushion cover 3512 may be connected to the rigid support portion 3502.

In some forms, the foam cushion 3312 in FIGS. 35A-35E may be constructed from an adaptive foam 13800 (see e.g., FIGS. 35A-1 to 35C-1). As described in detail above, the adaptive foam may expand under certain usage conditions, and may assist in providing the user with additional cushioning (e.g., and comfort).

In some forms of the present technology, an interfacing structure may be provided in which support structure and face engaging portions of the interfacing structure may be integrally formed as a single component comprising varying thicknesses so as to provide the desired levels of rigidity and/or cushioning effect at the face engaging surfaces.

For example, FIGS. 36A to 36E show an integrally formed interfacing structure 3600 generally comprising a forehead portion 3602, two cheek portions 3604, and two side portions 3606 proximate the user's sphenoid regions in use and connecting the forehead portion 3602 to the respective cheek portions 3604. A tab 3608 extends from a free end of each cheek portion 3604. The interfacing structure 3600 comprises a plurality of regions of varying thickness. A first region 3610 extends around the inner periphery of the interfacing structure 3600—i.e. the edge of the interfacing structure 3600 closest to the user's face. A second region 3612 extends around the outer periphery of the interfacing structure 3600. A third region 3614 extends around the inner periphery of the interfacing structure 3600, positioned between the first region 3610 and the second region 3612. Fourth regions 3616 are provided in each cheek portion 3604, bounded by the first region 3610 and the third region 3614. In this example, the first region 3610 has a greater thickness (for example about 2 mm) than the fourth regions 3616 (for example about 1.5 mm). The fourth regions 3616 have a greater thickness than the third region 3614 (for example about 1 mm). The third region 3614 has a greater thickness than the second region (for example about 0.7 mm).

In the example shown in FIGS. 36A to 36E, the width of the first region 3610 is wider through the forehead portion 3602 than at the cheek portions 3604, or side portions 3606. Further, the width of the second region 3612 is greater through the forehead portion 3602 than at the cheek portions 3604.

In certain forms, the third region 3614 and/or the fourth region 3616 of the interfacing structure 3600 may be constructed from an adaptive material 13800 (see e.g., FIGS. 36A-1 to 36C-1). As described below, the adaptive material 13800 may be capable of expanding under certain usage conditions.

In some forms of the present technology, an interfacing structure may be provided in which the face engaging portion of the interfacing structure is configured to be biased towards engagement with a user's face, in use. In embodiments, only selected regions of the face engaging portion may be biased towards engagement with a user's face. In embodiments, the interfacing structure may be shaped such that, when unloaded, regions of the face engaging portion extend towards the user at an angle non-parallel to the surface of the user's face with which the face engaging portion is intended to engage. With reference to FIG. 37A, the interfacing structure 3700 comprises a support flange 3702, supporting an integral face engaging flange 3704 engaging the user's face 3706 in use. At least a portion of the cross-section of the interfacing structure 3700 may be shaped to be "pre-loaded"—i.e. biased towards the user's face when brought into engagement. For example, a resting position (indicated by dashed line 3708) of the face engaging flange 3704 may be such that the face engaging flange 3704 is non-parallel with the user's face (indicated by dashed line 3710), angled towards the user. This may assist with encouraging engagement with the user's face, and friction between the interfacing structure 3700 and the user.

In embodiments it may be desirable to provide such "pre-loading" in select regions. Referring to FIG. 37B, a first region 3712 of the user's face may typically be recessed. Such recessed areas may be prone to permitting light to enter through gaps between the user's face and the interfacing structure 3700. As such, a corresponding first interface region 3714 of the interfacing structure 3700 may be shaped to bias the face engaging flange 3704 towards engagement with the user's face in the first region 3712. Conversely, a second region 3716 of the user's face may typically protrude and be prone to discomfort cause by pressure from the interfacing structure 3700. A corresponding second interface region 3718 of the interfacing structure 3700 may be shaped to avoid biasing the face engaging flange 3704 towards engagement with the user's face in the first region 3712, or at least to a reduced extent in comparison with the first interface region 3714.

5.2.5 Airflow Through Interfacing Structure

In some forms of the present technology, an interfacing structure may comprise a chassis configured to permit airflow into the space between the interfacing structure and the user. In an example, with reference to FIG. 38A, the interfacing structure 3800 may comprise a chassis 3802 comprising a main chassis portion 3804 configured to extend laterally across the user's face in use, and side chassis portions 3806 configured to extend a generally posterior direction. The chassis 3802 comprises an opening 3808 between the main chassis portion 3804 and each side chassis portion 3806. A face engaging portion 3810 is provided to the chassis 3802.

Referring to FIG. 38B, a display unit 3820 having a display unit housing 3822 is shown being worn by the user. Air may flow through the opening 3808 and between the display unit housing 3822 and face engaging portion 3810.

In examples, reinforcing may be provided between the main chassis portion 3804 and each side chassis portion 3806. For example, as shown in FIG. 38C, the chassis 3802 may comprise one or more reinforcing members span between the main chassis portion 3804 and side chassis portion 3806.

FIGS. 38D and 38E show another example of a display unit 3820 having an interfacing structure 3800 comprising a chassis 3802 configured to permit airflow into the space between the interfacing structure 3800 and the user. In this example, the chassis 3802 is configured to be secured to a mounting plate 3824 of the display unit 3820, the mounting plate 3284 having a generally flat configuration and extending laterally across the user's face in use. Side chassis portions 3806 extend in a generally posterior direction from the mounting plate 3824, towards the sides of the user's head.

A face engaging portion 3810 is provided to the chassis 3802. In an example, the face engaging portion 3810 may be a singular structure, such as described with reference to FIGS. 36A to 36E, constructed from a flexible and resilient material such as an elastomer, while the chassis may be constructed of a more rigid material.

In examples, the face engaging portion 3810 may be integral with the chassis 3802 to provide a singular component. The singular component comprising the face engaging portion 3810 and the chassis 3802 may be releasably fastened to the display unit 3820, such as to the mounting plate 3284. For example, a releasable fastening arrangement may be provided comprising one or more of: hook-and-loop fastening means, magnetic fastening means, and clips or retainers that allow a friction, interference, snap or other mechanical fixing arrangement.

The chassis 3802 comprises a lateral opening 3808 in each side chassis portion 3806. One or more gaps between the housing of the display unit 3820 and the interfacing structure 3800 permit air to flow through the lateral openings 3808 to and from the external environment (as indicated by the dashed arrows in FIG. 38D and FIG. 38E).

In examples, one or more superior openings may be provided in the chassis 3802, permitting airflow between the external environment and the space within the interfacing structure 3800. In examples, one or more inferior openings may be provided in the chassis 3802, permitting airflow between the external environment and the space within the interfacing structure 3800. In examples, the chassis 3802 may comprise one or more of: a lateral opening 3808, a superior opening, and an inferior opening.

5.2.6 Inwardly Biased Interfacing Structure

FIG. 39A shows an interfacing structure 3800 according to another example of the present technology. Similarly to the interfacing structure 3800 described above with reference to FIGS. 38A-38C, the interfacing structure 3800 comprises a chassis comprising a main chassis portion 3804 configured to extend laterally across the user's face in use, and side chassis portions 3806 configured to extend in a generally posterior direction. Each side chassis portion 3806 extends in a generally posterior direction from a respective lateral side of the main chassis portion 3804. The interfacing structure 3800 further comprises a face engaging portion 3810 connected about at a periphery of the chassis 3804, the face engaging portion 3810 configured to contact the user's face in use.

In this example, each of the side chassis portions 3806 is biased medially towards the user's head to bias the face engaging portion 3810 into contact with the user's head on each side of the user's head at or proximate the user's sphenoid bone. That is, the side chassis portions 3806 are biased inwards to cause the face engaging portion 3810 to engage lateral-facing surfaces of the user's head lateral to eyes (e.g. at or proximate the user's sphenoid bone).

The chassis 3802 may be flexible (e.g. as a whole or having particular flexible portions) allowing the side chassis portions 3806 to be spread laterally to a splayed configuration by the user's head and biased medially towards an unsplayed configuration in use. The side chassis portions 3806 may be flexible so as to flex or pivot with respect to the main chassis portion 3804 allowing the side chassis portions 3806 to be spread laterally to a splayed configuration by the user's head and biased medially towards an unsplayed configuration in use.

In some examples, the side chassis portions 3806 are able to flex or pivot with respect to the main chassis portion 3804 allowing the side chassis portions 3806 to be spread laterally to a splayed configuration by the user's head and biased medially towards an unsplayed configuration in use, each side chassis portion 3806 biased medially by a biasing component.

The biasing component may comprise a spring element configured to pull each side chassis portion 3806 medially. In other examples, the biasing component comprises a spring element configured to push each side chassis portion 3806 medially.

The face engaging portion 3810 may have one of the configurations described herein in relation to a portion of an interfacing structure which engages the user's face. The face engaging portion 3810 may comprise a face engaging flange. The face engaging flange may curve inwardly from the chassis 3804. The face engaging flange is formed from silicone.

In some examples, the chassis 3802 comprises at least one opening 3808 between the main chassis portion 3804 and each side chassis portion 3806. In some examples the head-mounted display unit 1200 comprises a display unit housing, and an air pathway is provided between the interfacing structure 3800 and the display unit housing through the at least one opening 3808.

5.2.7 Positioning and Stabilising Structure that Connects to Interfacing Structure In some examples of the present technology, a head-mounted display system 1000 comprises a positioning and stabilising structure 1300 (e.g. one or more straps) that connects to an interfacing structure 3800 of the head-mounted display unit 1200 of the head-mounted display system 1000 (e.g. straps connect to the interfacing structure 3800 instead of a display unit housing 1205).

FIGS. 39B-39C show a positioning and stabilising structure 1300 for a head-mounted display system 1000 connected to an interfacing structure configured to contact the user's face in use. The positioning and stabilising structure 1300 in this example comprises a posterior support portion 1350 configured to engage a posterior portion of a user's head and a pair of strap portions 1332, 1334 connected to the posterior support portion 1350 and configured to connect to the interfacing structure 3800 of a head-mounted display unit. FIG. 39D shows an example in which lateral strap portions 1330 connect to an interfacing structure 3800.

5.2.8 Positioning and Stabilising Structure that Pulls Sides Inwards

FIGS. 39B-39C show head-mounted display systems 1000 (with most components of the head-mounted display unit 1200 not shown save for the interfacing structure 3800) according to examples of the present technology. In each example the interfacing structure 3800 comprises a chassis 3802 comprising a main chassis portion 3804 configured to extend laterally across the user's face in use, and a pair of side chassis portions 3806 each configured to extend in a generally posterior direction from a respective lateral side of the main chassis portion 3804. A face engaging portion 3810 is connected about a periphery of the chassis 3802, the face engaging structure 3810 configured to contact the user's face in use.

The head-mounted display systems 1000 each further comprise a positioning and stabilising structure 1300 comprising a posterior support portion 1350 configured to engage a posterior portion of a user's head, and a pair of lateral strap portions configured to connect the posterior support portion 1350 and the head-mounted display unit 1200 in use. In the example shown in FIGS. 39B and 39C, the pair of lateral strap portions comprises a pair of upper lateral strap portions 1332 and a pair of lower lateral strap portions 1334. In the example shown in FIG. 39D, the pair of lateral strap portions comprises a lateral strap portion 1330 on each side of the user's head.

In each example, the positioning and stabilising structure 1300 is connected to the head-mounted display unit 1200 such that in use the side chassis portions 3806 are urged medially towards the user's head by the lateral strap portions, to urge the face engaging portion 3810 into contact with the user's head on each side of the user's head at or proximate the user's sphenoid bone.

As illustrated, each lateral strap portion may be configured to connect to a respective one of the side chassis portions 3806. Each lateral strap portion may be configured to pull the respective side chassis portion 3806 rearwardly causing the side chassis portion 3806 to flex or pivot medially to urge the face engaging portion 3810 into contact with the user's head at or proximate the user's sphenoid bone.

In other examples, each lateral strap portion may be configured to push the respective side chassis portion 3806 medially causing the side chassis portion 3806 to flex or pivot medially to urge the face engaging portion 3810 into contact with the user's head at or proximate the user's sphenoid bone. For example, each lateral strap portion may be configured to push the respective side chassis portion 3806 medially via a substantially rigid member (e.g. an arm) or a portion of the side chassis portion 3806 in contact with the lateral strap portion.

As shown in FIG. 39D, the posterior support portion 1350 may comprise a parietal strap portion 1310 configured to overlie the parietal bones of the user's head in use and an occipital strap portion 1320 configured to overlie or lie below an occipital bone of the user's head in use. In some examples. the posterior support portion 1350 comprises a loop strap portion having a superior portion overlying the parietal bones of the user's head and an inferior portion overlying the occipital bone of the user's head.

As shown in FIGS. 39B and 39C, as described above, the pair of lateral strap portions comprises a pair of upper lateral strap portions 1332 each configured to connect between the posterior support portion 1350 and the head-mounted display unit 1200 (only the interfacing structure 3800 thereof visible) on a respective side of the user's head in use and a pair of lower lateral strap portions 1334 each configured to connect between the posterior support portion 1350 and the head-mounted display unit 1200 (only the interfacing structure 3800 thereof visible) on a respective side of the user's head in use. In this example, the upper lateral strap portions 1332 are each configured to apply a force to the head-mounted display unit 1200 having both a superior and posterior component. In some examples, the lower lateral strap portions 1334 are each configured to be removably connected to a respective side chassis portion 3806 with a magnetic connection.

5.2.9 Interfacing Structure Comprising Two or More Components

In some forms of the present technology, an interfacing structure may comprise a chassis, wherein one or more of a support portion and/or a face engaging portion of the interfacing structure, or portions thereof, may be releasably attached to the chassis.

It is envisaged that the ability to releasably attach the support portion and/or face engaging portion may assist with one or more of: cleaning of the interfacing structure, replacement of components thereof, and/or selection of characteristics of the components (for example, level of hardness or softness, surface finish or material, shape, and/or size).

In an example, the releasably attached portion of the interfacing structure may be provided at discrete locations to the chassis, i.e. may not extend along the entire periphery of the chassis. For example, the releasably attached portion(s) may be provided in one or more of: a forehead region, and/or one or more cheek regions, of the interfacing structure. In alternative examples the releasably attached portion of the interfacing structure may be provided to the entire periphery of the chassis, or at least a substantial portion thereof.

In examples, a releasably attached portion of the interfacing structure may be made of one or more of: a foam material, an elastomeric material, a textile material, or a composite material.

In an example, the interfacing structure may comprise at least one elastomeric portion, and at least one foam portion. In an example, the at least one foam portion may be attached to the interfacing structure such that the elastomeric portion covers the foam portion to provide a face engaging surface. In an example, the at least one foam portion may be attached to the chassis, the elastomeric portion, or both the chassis and the elastomeric portion.

In examples, a portion of the support portion and/or face engaging portion of the interfacing structure may be permanently attached to the chassis (e.g. integrally moulded) at select locations. Spaces may be provided in which the removeable portions may be positioned and attached relative to the chassis.

5.2.10 One Piece Textile Construction

In some forms of the present technology (see e.g., FIGS. 3a-1, 4a-1, 5a-1, 6-1, 7a-1, 7c-1, 13b-1), the display unit (e.g., display unit 12) and the positioning and stabilising structure (e.g., positioning and stabilising structure 14) include and/or are formed from a single piece of textile. In other words, the display unit, the positioning and stabilising structure, or both may be formed entirely from a single piece of textile. Alternatively, the display unit, the positioning and stabilising structure, or both may be include a single piece of textile as part of their construction, and may also be constructed from other pieces of textile and/or other materials (e.g., foam, plastic, metal, etc.). Using a single piece of material reduces manufacturing costs and provides for an easier assembly of the head mounted display system (e.g., head mounted display system 10).

In some forms (see e.g., FIG. 3a-1), at least a portion of the display unit housing 22 and the temporal connectors 18 are formed from a one-piece textile construction. For example, a single sheet of textile material may be used to construct a front or anterior face of the display unit housing 22. The single sheet of textile material may also extend past at least one edge (e.g., a posterior edge) of the display unit housing 22. The single sheet may be formed with a smaller surface area as it extends past the display unit housing 22. This portion of the sheet may be sized to fit above the user's ear, and act as the previously described temporal connector 18.

In some forms, the single piece of textile on the display unit housing 22 may be substantially flush with at least a portion of the posterior edge region 20 and/or the superior edge region 21. For example, if the display unit 12 is formed as an integral piece (e.g., the display unit housing 22 is not removable), the textile material may not overlap the posterior and/or superior edge regions 20, 21. If the display unit 12 is formed as multiple pieces (e.g., the display unit housing 22 is removable), the textile material of the display unit housing 22 and the posterior and/or superior edge regions 20, 21 form a substantially flush interface when connected.

In some forms, the textile material may overlap a portion of the posterior and/or superior edge regions 20, 21. For example, the anterior end 28 may overlap with the posterior and/or superior edge regions 20, 21 while extending in the posterior direction. In some examples, the anterior end 28 may be laterally wider than the posterior and/or superior edge regions 20, 21 (see e.g., FIG. 7c-1).

In some forms, the textile material may be folded and connected together (e.g., sewn, glued, etc.) in order to form a pocket within the textile material. In some forms, a rigidiser 32 may be positioned within the pocket in order to provide the temporal connectors 18 with rigidity and/or stiffness. The sections of textile material may also be connected together proximate to the posterior end 30 in order to limit the translation of the rigidiser 30 into the tab 36. In other examples, the textile material of the temporal arms 18 may be stiffened so that a separate rigidiser 30 is not needed.

In certain forms, there may be a seamless transition between the display unit 12 and the positioning and stabilising structure 14. For example, there may be substantially no seam across the interface between the display unit housing 22 and the anterior end 28 of each temporal connector 18. In some forms, the lack of a joint may provide a more aesthetically pleasing surface of the head mounted display system 10. In some forms, the seamless joint may also be strengthened (e.g., with the rigidiser 30).

In some forms (see e.g., FIGS. 5*a* and 5*a*-2), the positioning and stabilising structure 214 may be constructed from a single piece of textile material. For example, the rear support hoop 216 may be constructed from a single piece of textile material. This may simplify manufacturing so that multiple straps do not need to be assembled together. In this example, the entire rear support hoop 216 may have the same extensibility (i.e., because it is all constructed from the same material). However, selective rigidization may be added to the rear support hoop 216 (or any other portion of the positioning and stabilising structure 214) in order to create different extensibilities.

5.2.11 Removable Display Screen

As shown in FIGS. 89 to 91, an exemplary VR display apparatus 13000 in accordance with one aspect of the present technology comprises the following functional aspects: a display unit 13100, a display housing 13200, and a positioning and stabilizing structure 13500. In some forms, a functional aspect may provide one or more physical components. In some forms, one or more physical components may provide one or more functional aspects. In use, the display unit 13100 is arranged to be positioned proximate and anterior to the user's eyes, so as to allow the user to view the display unit 13100.

In some examples, the display unit 13100 may include a display screen 13104, a display housing 13200, an interfacing structure 13300, and/or an optical lens 13400. These components may be integrally formed in a single display unit 13100, or they may be separable and selectively connected by the user to form the display unit 13100. Additionally, the display screen 13104, the display housing 13200, the interfacing structure 13300, and/or the optical lens 13400 may be included in the display apparatus 13000, but may not be part of the display unit 13100.

For example, the display screen 13104 may be removably positionable within the display housing 13200. In some forms, the display screen 13104 may be usable independently of the interfacing structure 13300 (e.g., a user may use the display screen 13104 outside of the display housing 13200).

In an example, the display screen or display 13104 may be configured to selectively output computer generated images that are visible to the user in an operational position. In some forms, the display screen 13104 is an electronic display. The display screen 13104 may be a liquid crystal display (LCD), or a light emitting diode (LED) screen.

In some forms, the display housing 13200 provides a support structure for the display screen 13104, in order to maintain a position of at least some of the components of the display screen 13104 relative to one another, and may additionally protect the display screen 13104 and/or other components of the display unit 13100. The display housing 13200 may be constructed from a material suitable to provide protection from impact forces to the display screen 13104. The display housing 13200 may also contact the user's face, and may be constructed from a biocompatible material suitable for limiting irritation to the user.

In some forms, the interfacing structure 13300 may extend at least partially around the display housing 13200, and may form a viewing opening. The viewing opening may at least partially receive the user's face in use. Specifically, the user's eyes may be received within the viewing opening formed by the interfacing structure 13300.

In some forms, the display apparatus 13000 may include a light shield that may be constructed from an opaque material and can block ambient light from reaching the user's eyes. The light shield may be part of the interfacing structure 13300, or may be a separate element.

In an example, at least one lens 13400 may be disposed between the user's eyes and the display screen 13104. The user may view an image provided by the display screen 13104 through the lens 13400. The at least one lens 13400 may assist in spacing the display screen 13104 away from the user's face to limit eye strain. The at least one lens 13400 may also assist in better observing the image being displayed by the display screen 13104. In some forms, the at least one lens includes a first lens configured to be aligned with the user's left eye in the operational position and a second lens configured to be aligned with the user's right eye in the operational position. In some forms, the lenses 13400 are Fresnel lenses. In some forms, the display comprises a binocular display partitioned into a first section and a second section, the first section aligned with the first lens and the second section aligned with the second lens.

5.2.12 Control System

In an example, the display apparatus 13000 includes a control system 7000 (see e.g., FIG. 92) that assists in controlling the output received by the user. Specifically, the control system 7000 can control visual output from the display screen 13104.

In some forms, the control system 7000 may include sensors 7002 that monitor different parameters or values (e.g., in the physical environment), and communicates measured parameters to a processor 7004. The output received by the user may be affected by the measured parameters. For example, the processor 7004 is configured to change the computer generated images output by the display based on the measured value.

In some forms, the sensors 7002 may include an orientation sensor that can sense the orientation of the user's body, at least one camera that can be positioned to view the physical environment of the user (e.g., in order to determine orientation), and/or an eye sensor that can track movement of the user's eyes to determine which direction at least one of the user's eyes are looking.

In some forms, the processor 7004 may comprise a computer or smart phone.

In some forms, the control system 7000 is integrated into the display unit 13100. In other forms, the control system 7000 is housed in a control system support 7060 that is separate from, but connected to (e.g., electrically connected to) the display unit 13100.

In some forms of the display apparatus 13000 include a controller 13600 that can be engagable by the user in order to provide user input to the virtual environment and/or to control the operation of the display apparatus 13000. The controller 13600 can be connected to the display unit 13100, and provide the user the ability to interact with virtual objects output to the user from the display unit 13100. For example, the controller 13600 may have at least one button 13602 (see e.g., FIG. 89) selectively engageable by a user's finger, the controller 13600 being in communication with the processor 7004 and configured to send a signal to the processor when the at least one button 13602 is engaged, the processor configured to change the computer generated images output by the display 13104 based on the signal.

5.2.13 Augmented Reality

FIGS. 93 to 93-2 show an exemplary AR display apparatus 15000 in accordance with one aspect of the present technology comprising the following functional aspects: a display unit 15100, a display housing 15200, and a positioning and stabilizing structure 15500. The display apparatus 15000 may be similar to the VR display apparatus 13000.

In some examples, the display unit 15100 may include a display screen or display 15104 supported by the display housing 15200. The display screen 15104 is configured to selectively output one or more computer generated images observable by a user. The display screen 15104 may include at least one optical lens 15400 constructed from a transparent or translucent material configured to allow a user to observe their physical environment while observing the computer generated image. For example, the display screen 15104 may be glass, so the user can see through the display screen 15104. This may be particularly beneficial in AR applications, so that the user can continue to see the physical environment.

In some forms, the at least one lens 15400 includes a first lens configured to be aligned with the user's left eye in the operational position and a second lens configured to be aligned with the user's right eye in the operational position (e.g., see FIG. 93).

In an example, the AR display apparatus 15000 includes a control system 7000 (see FIG. 92) that assists in controlling the output received by the user. Specifically, the control system 7000 can control visual output from the display screen 13104. In some forms, the control system 7000 may include sensors 7002 that monitor different parameters or values (e.g., in the physical environment), and communicates measured parameters to a processor 7004. The output received by the user may be affected by the measured parameters. For example, the processor 7004 is configured to change the computer generated images output by the display based on the measured value.

5.3 Glossary

For the purposes of the present technology disclosure, in certain forms of the present technology, one or more of the following definitions may apply. In other forms of the present technology, alternative definitions may apply.

5.3.1 General

Leak: The word leak will be taken to be an unintended exposure to light. In one example, leak may occur as the result of an incomplete seal between a display unit and a user's face.

5.3.2 Materials

Closed-cell foam: Foam comprising cells that are completely encapsulated, i.e. closed cells.

Elastane: A polymer made from polyurethane.

Elastomer: A polymer that displays elastic properties. For example, silicone elastomer.

Ethylene-vinyl acetate (EVA): A copolymer of ethylene and vinyl acetate.

Foam: Any material, for example polyurethane, having gas bubbles introduced during manufacture to produce a lightweight cellular form.

Neoprene: A synthetic rubber that is produced by polymerization of chloroprene. Neoprene is used in trade products: Breath-O-Prene.

Nylon: A synthetic polyamide that has elastic properties and can be used, for example, to form fibres/filaments for use in textiles.

Open-cell foam: Foam comprising cells, i.e. gas bubbles that aren't completely encapsulated, i.e. open cells.

Polycarbonate: a typically transparent thermoplastic polymer of Bisphenol-A Carbonate.

Polyethylene: A thermoplastic that is resistant to chemicals and moisture.

Polyurethane (PU): A plastic material made by copolymerizing an isocyanate and a polyhydric alcohol and, for example, can take the form of foam (polyurethane foam) and rubber (polyurethane rubber).

Semi-open foam: Foam comprising a combination of closed and open (encapsulated) cells.

Silicone or Silicone Elastomer: A synthetic rubber. In this specification, a reference to silicone is a reference to liquid silicone rubber (LSR) or a compression moulded silicone rubber (CMSR). One form of commercially available LSR is SILASTIC (included in the range of products sold under this trademark), manufactured by Dow Corning. Another manufacturer of LSR is Wacker. Unless otherwise specified to the contrary, an exemplary form of LSR has a Shore A (or Type A) indentation hardness in the range of about 35 to about 45 as measured using ASTM D2240.

Spacer Fabric: A composite construction comprised of two outer textile substrates joined together and kept apart by an intermediate layer of monofilaments.

Spandex: An elastic fibre or fabric, primarily comprised of polyurethane. Spandex is used in trade products: Lycra.

Thermoplastic Elastomer (TPE): Are generally low modulus, flexible materials that can be stretched at room temperature with an ability to return to their approximate original length when stress is released. Trade products that use TPE include: Hytrel, Dynaflex, Medalist Thermoplastic Polyurethane (TPU): A thermoplastic elastomer with a high durability and flexibility.

5.3.3 Mechanical Properties

Resilience: Ability of a material to absorb energy when deformed elastically and to release the energy upon unloading.

Resilient: Will release substantially all of the energy when unloaded. Includes e.g. certain silicones, and thermoplastic elastomers.

Hardness: The ability of a material per se to resist deformation (e.g. described by a Young's Modulus, or an indentation hardness scale measured on a standardised sample size).

'Soft' materials may include silicone or thermo-plastic elastomer (TPE), and may, e.g. readily deform under finger pressure.

'Hard' materials may include polycarbonate, polypropylene, steel or aluminium, and may not e.g. readily deform under finger pressure.

Stiffness (or rigidity) of a structure or component: The ability of the structure or component to resist deformation in response to an applied load. The load may be a force or a moment, e.g. compression, tension, bending or torsion. The structure or component may offer different resistances in different directions.

Floppy structure or component: A structure or component that will change shape, e.g. bend, when caused to support its own weight, within a relatively short period of time such as 1 second.

Rigid structure or component: A structure or component that will not substantially change shape when subject to the loads typically encountered in use.

As an example, an I-beam may comprise a different bending stiffness (resistance to a bending load) in a first direction in comparison to a second, orthogonal direction. In another example, a structure or component may be floppy in a first direction and rigid in a second direction.

5.3.4 Anatomy

The following definitions correspond references identified in FIGS. 1-2.

5.3.4.1 Anatomy of the Face

Ala: the external outer wall or "wing" of each nostril (plural: alar)

Alare: The most lateral point on the nasal ala.

Alar curvature (or alar crest) point: The most posterior point in the curved base line of each ala, found in the crease formed by the union of the ala with the cheek.

Bridge (nasal): The nasal bridge is the midline prominence of the nose, extending from the Sellion to the Pronasale.

(nose) Cartilaginous framework: The cartilaginous framework of the nose comprises the septal, lateral, major and minor cartilages.

Cheilion: A point located at the corner of the mouth.

Endocanthion: The point at which the upper and lower eyelids meet, proximal to the Sellion.

Epicranius: The epicranius, or frontal belly, refers to structures that cover the cranium.

External occipital protuberance: A protuberance on the outer surface of the occipital bone.

Frankfort horizontal plane: A line extending from the most inferior point of the orbital margin to the left tragion. The tragion is the deepest point in the notch superior to the tragus of the auricle.

Glabella: Located on the soft tissue, the most prominent point in the midsagittal plane of the forehead.

Lateral nasal cartilage: A generally triangular plate of cartilage. Its superior margin is attached to the nasal bone and frontal process of the maxilla, and its inferior margin is connected to the greater alar cartilage.

Lip, superior (labrale superius): A point on the face between the mouth and nose, lying in the median sagittal plane.

Naso-labial sulcus or Naso-labial fold: The skin fold or groove that runs from each side of the nose to the corners of the mouth, separating the cheeks from the upper lip.

Naso-labial angle: The angle between the columella and the upper lip, while intersecting subnasale.

Otobasion inferior: The lowest point of attachment of the auricle to the skin of the face.

Otobasion superior: The highest point of attachment of the auricle to the skin of the face.

Pronasale: the most protruded point or tip of the nose, which can be identified in lateral view of the rest of the portion of the head.

Sagittal plane: A vertical plane that passes from anterior (front) to posterior (rear) dividing the body into right and left halves.

Sellion: Located on the soft tissue, the most concave point overlying the area of the frontonasal suture.

Subnasal point: Located on the soft tissue, the point at which the columella merges with the upper lip in the midsagittal plane.

Superciliary arch: A protuberance of the frontal bone above the eye.

Temporalis muscle: A muscle in the temporal fossa that serves to raise the lower jaw.

Temporomandibular joint: A freely moveable joint between the temporal bone and mandible that allows for the opening, closing, protrusion, retraction, and lateral movement of the mandible.

Vermillion, upper: A red part of the lips covered with stratified squamous epithelium which is in continuity with the oral mucosa of the gingivolabial groove.

5.3.4.2 Anatomy of the Skull

Frontal bone: The frontal bone includes a large vertical portion, the squama frontalis, corresponding to the region known as the forehead.

Lateral cartilage: Portion of cartilage lateral of the Septal cartilage and inferior to the Nasal bones.

Mandible: The mandible forms the lower jaw. The mental protuberance is the bony protuberance of the jaw that forms the chin.

Masseter minor: A lower portion of the Masseter muscle of which raises the lower jaw.

Maxilla: The maxilla forms the upper jaw and is located above the mandible and below the orbits. The frontal process of the maxilla projects upwards by the side of the nose, and forms part of its lateral boundary.

Nasal bones: The nasal bones are two small oblong bones, varying in size and form in different individuals; they are placed side by side at the middle and upper part of the face, and form, by their junction, the "bridge" of the nose.

Nasion: The intersection of the frontal bone and the two nasal bones, a depressed area directly between the eyes and superior to the bridge of the nose.

Occipital bone: The occipital bone is situated at the back and lower part of the cranium. It includes an oval aperture, the foramen magnum, through which the cranial cavity communicates with the vertebral canal. The curved plate behind the foramen magnum is the squama occipitalis.

Orbit: The bony cavity in the skull to contain the eyeball.

Parietal bones: The parietal bones are the bones that, when joined together, form the roof and sides of the cranium.

Septal cartilage: Cartilage of the nasal septum.

Sphenoid bone: A wedge shaped bone of the base of the cranium.

Supraorbital foramen: An opening in the inferior bone of the orbit for the passage of the Supraorbital nerve, artery and vein.

Temporal bones: The temporal bones are situated on the bases and sides of the skull, and support that part of the face known as the temple.

Trapezius minor: A triangular-shaped superficial muscle of the upper back.

Zygomatic arch/bone: The face includes two zygomatic bones, located in the upper and lateral parts of the face and forming the prominence of the cheek.

5.3.5 User Interface

Frame: Frame will be taken to mean the display housing unit that bears the load of tension between two or more points of connection with a hoop.

Interpupillary Distance: The distance between the centres of the pupils of the eyes.

Hoop: Hoop will be taken to mean a form of positioning and stabilizing structure designed for use on a head. For example the hoop may comprise a collection of one or more struts, ties and stiffeners configured to locate and retain a user interface in position on a user's face for holding a display unit in an operational position in front of a user's face. Some ties are formed of a soft, flexible, elastic material such as a laminated composite of foam and fabric/textile.

Membrane: Membrane will be taken to mean a typically thin element that has, preferably, substantially no resistance to bending, but has resistance to being stretched.

Seal: May be a noun form ("a seal") which refers to a structure, or a verb form ("to seal") which refers to the effect. Two elements may be constructed and/or arranged to 'seal' or to effect 'sealing' therebetween without requiring a separate 'seal' element per se.

Shell: A shell will be taken to mean a curved, relatively thin structure having bending, tensile and compressive stiffness. For example, a curved structural wall of a display unit housing may be a shell. In some forms, a shell may be faceted.

Stiffener: A stiffener will be taken to mean a structural component designed to increase the bending resistance of another component in at least one direction.

Strut: A strut will be taken to be a structural component designed to increase the compression resistance of another component in at least one direction.

Swivel (noun): A subassembly of components configured to rotate about a common axis, preferably independently, preferably under low torque. In one form, the swivel may be constructed to rotate through an angle of at least 360 degrees. In another form, the swivel may be constructed to rotate through an angle less than 360 degrees.

Tie (noun): A structure designed to resist tension.

5.3.6 Shape of Structures

Products in accordance with the present technology may comprise one or more three-dimensional mechanical structures, for example the seal forming portion of the display unit. The three-dimensional structures may be bounded by two-dimensional surfaces. These surfaces may be distinguished using a label to describe an associated surface orientation, location, function, or some other characteristic. For example, a structure may comprise one or more of an anterior surface, a posterior surface, an interior surface and an exterior surface. In another example, a seal forming structure may comprise a face-contacting (e.g. outer) surface, and a separate non-face-contacting (e.g. underside or inner) surface. In another example, a structure may comprise a first surface and a second surface.

To facilitate describing the shape of the three-dimensional structures and the surfaces, we first consider a cross-section through a surface of the structure at a point, p. See FIG. 2a to FIG. 2e, which illustrate examples of cross-sections at point p on a surface, and the resulting plane curves. FIGS. 2a to 3e also illustrate an outward normal vector at p. The outward normal vector at p points away from the surface. In some examples we describe the surface from the point of view of an imaginary small person standing upright on the surface.

5.3.6.1 Curvature in One Dimension

The curvature of a plane curve at p may be described as having a sign (e.g. positive, negative) and a magnitude (e.g. 1/radius of a circle that just touches the curve at p).

Positive curvature: If the curve at p turns towards the outward normal, the curvature at that point will be taken to be positive (if the imaginary small person leaves the point p they must walk uphill). See FIG. 2a (relatively large positive curvature compared to FIG. 2b) and FIG. 2b (relatively small positive curvature compared to FIG. 2a). Such curves are often referred to as concave.

Zero curvature: If the curve at p is a straight line, the curvature will be taken to be zero (if the imaginary small person leaves the point p, they can walk on a level, neither up nor down). See FIG. 2c.

Negative curvature: If the curve at p turns away from the outward normal, the curvature in that direction at that point will be taken to be negative (if the imaginary small person leaves the point p they must walk downhill). See FIG. 2d (relatively small negative curvature compared to FIG. 2e) and FIG. 2e (relatively large negative curvature compared to FIG. 2d). Such curves are often referred to as convex.

5.3.6.2 Curvature of Two Dimensional Surfaces

A description of the shape at a given point on a two-dimensional surface in accordance with the present technology may include multiple normal cross-sections. The multiple cross-sections may cut the surface in a plane that includes the outward normal (a "normal plane"), and each cross-section may be taken in a different direction. Each cross-section results in a plane curve with a corresponding curvature. The different curvatures at that point may have the same sign, or a different sign. Each of the curvatures at that point has a magnitude, e.g. relatively small. The plane curves in FIGS. 2a to 3e could be examples of such multiple cross-sections at a particular point.

Principal curvatures and directions: The directions of the normal planes where the curvature of the curve takes its maximum and minimum values are called the principal directions. In the examples of FIG. 2a to FIG. 2e, the maximum curvature occurs in FIG. 2a, and the minimum occurs in FIG. 2e, hence FIG. 2a and FIG. 2e are cross sections in the principal directions. The principal curvatures at p are the curvatures in the principal directions.

Region of a surface: A connected set of points on a surface. The set of points in a region may have similar characteristics, e.g. curvatures or signs.

Saddle region: A region where at each point, the principal curvatures have opposite signs, that is, one is positive, and the other is negative (depending on the direction to which the imaginary person turns, they may walk uphill or downhill). A saddle region is shown, for example, in FIG. 2h.

Dome region: A region where at each point the principal curvatures have the same sign, e.g. both positive (a "concave dome") or both negative (a "convex dome"). A dome region is shown, for example, in FIG. 2g.

Cylindrical region: A region where one principal curvature is zero (or, for example, zero within manufacturing tolerances) and the other principal curvature is non-zero.

Planar region: A region of a surface where both of the principal curvatures are zero (or, for example, zero within manufacturing tolerances).

Edge of a surface: A boundary or limit of a surface or region. An edge on a surface is shown, for example, in FIG. 2g.

Path: In certain forms of the present technology, 'path' will be taken to mean a path in the mathematical—topological sense, e.g. a continuous space curve from f(0) to f(1) on a surface. In certain forms of the present technology, a 'path' may be described as a route or course, including e.g. a set of points on a surface. (The path for the imaginary person is where they walk on the surface, and is analogous to a garden path). A path on surface is shown, for example, in FIG. 2g.

Path length: In certain forms of the present technology, 'path length' will be taken to mean the distance along the surface from f(0) to f(1), that is, the distance along the path on the surface. There may be more than one path between two points on a surface and such paths may have different path lengths. (The path length for the imaginary person would be the distance they have to walk on the surface along the path).

Straight-line distance: The straight-line distance is the distance between two points on a surface, but without regard to the surface. On planar regions, there would be a path on the surface having the same path length as the straight-line distance between two points on the surface. On non-planar surfaces, there may be no paths having the same path length as the straight-line distance between two points. (For the imaginary person, the straight-line distance would correspond to the distance 'as the crow flies'.) A straight line distance is shown, for example, in FIG. 2g.

5.3.6.3 Space Curves

Space curves: Unlike a plane curve, a space curve does not necessarily lie in any particular plane. A space curve may be considered to be a one-dimensional piece of three-dimensional space. An imaginary person walking on a strand of the DNA helix walks along a space curve. A typical human left ear comprises a helix, which is a left-hand helix, see FIG. 2i. A typical human right ear comprises a helix, which is a right-hand helix, see FIG. 2k. FIG. 2j shows a right-hand helix. The edge of a structure, e.g. the edge of a membrane, may follow a space curve. In general, a space curve may be described by a curvature and a torsion at each point on the space curve. Torsion is a measure of how the curve turns out of a plane. Torsion has a sign and a magnitude. The torsion at a point on a space curve may be characterised with reference to the tangent, normal and binormal vectors at that point.

Tangent unit vector (or unit tangent vector): For each point on a curve, a vector at the point specifies a direction from that point, as well as a magnitude. A tangent unit vector is a unit vector pointing in the same direction as the curve at that point. If an imaginary person were flying along the curve and fell off her vehicle at a particular point, the direction of the tangent vector is the direction she would be travelling.

Unit normal vector: As the imaginary person moves along the curve, this tangent vector itself changes. The unit vector pointing in the same direction that the tangent vector is changing is called the unit principal normal vector. It is perpendicular to the tangent vector.

Binormal unit vector: The binormal unit vector is perpendicular to both the tangent vector and the principal normal vector. Its direction may be determined by a right-hand rule (see e.g. FIG. 2m), or alternatively by a left-hand rule (FIG. 2l).

Osculating plane: The plane containing the unit tangent vector and the unit principal normal vector. See FIGS. 2l and 2m.

Torsion of a space curve: The torsion at a point of a space curve is the magnitude of the rate of change of the binormal unit vector at that point. It measures how much the curve deviates from the osculating plane. A space curve which lies in a plane has zero torsion. A space curve which deviates a relatively small amount from the osculating plane will have a relatively small magnitude of torsion (e.g. a gently sloping helical path). A space curve which deviates a relatively large amount from the osculating plane will have a relatively large magnitude of torsion (e.g. a steeply sloping helical path). With reference to FIG. 2j, since T2>T1, the magnitude of the torsion near the top coils of the helix of FIG. 2j is greater than the magnitude of the torsion of the bottom coils of the helix of FIG. 2j With reference to the right-hand rule of FIG. 2k, a space curve turning towards the direction of the right-hand binormal may be considered as having a right-hand positive torsion (e.g. a right-hand helix as shown in FIG. 2j). A space curve turning away from the direction of the right-hand binormal may be considered as having a right-hand negative torsion (e.g. a left-hand helix).

Equivalently, and with reference to a left-hand rule (see FIG. 2l), a space curve turning towards the direction of the left-hand binormal may be considered as having a left-hand positive torsion (e.g. a left-hand helix). Hence left-hand positive is equivalent to right-hand negative.

5.3.6.4 Holes

A surface may have a one-dimensional hole, e.g. a hole bounded by a plane curve or by a space curve. Thin structures (e.g. a membrane) with a hole, may be described as having a one-dimensional hole. See for example the one-dimensional hole in the surface of structure shown in FIG. 2n, bounded by a plane curve.

A structure may have a two-dimensional hole, e.g. a hole bounded by a surface. For example, an inflatable tyre has a two-dimensional hole bounded by the interior surface of the tyre. See the two-dimensional hole through the structure shown in FIG. 2o, bounded by a surface as shown.

6 OTHER REMARKS

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Furthermore, "approximately", "substantially", "about", or any similar term as used herein means +/−5 to +/−10% of the recited value.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilised to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

The invention claimed is:

1. A head-mounted display system comprising:
    a head mounted display unit comprising a display;
    a positioning and stabilising structure configured to hold the head mounted display unit in an operable position on a user's head in use, the positioning and stabilizing structure comprising:
        headgear including at least one strap configured to contact the user's head, in use; and
    wherein the positioning and stabilising structure includes a posterior support portion with a self-cleaning textile material and configured to engage a posterior portion of the user's head, wherein the textile material includes a textile surface with a textile microstructure configured to limit adhesion of debris.

2. The head-mounted display system of claim 1, wherein the posterior support portion comprises a parietal strap portion configured to overlie the parietal bones of the user's head in use and an occipital strap portion configured to overlie or lie below an occipital bone of the user's head in use.

3. The head-mounted display system of claim 1, wherein the at least one strap includes a pair of lateral strap portions configured to connect between the posterior support portion and the head mounted display unit.

4. The head-mounted display system of claim 3, wherein each lateral strap of the pair of lateral straps is configured to be located on a respective lateral side of the user's head in use.

5. The head-mounted display system of claim 1, wherein the at least one strap includes a top strap portion configured to connect between the posterior support portion and the head mounted display unit, wherein the top strap portion includes a user-facing layer and an outer layer, and wherein the top strap portion is configured to overlie a superior portion of the user's head in use.

6. The head-mounted display system of claim 1, wherein the at least one strap includes a rigidized portion that includes at least one thread that is more rigid than at least one other thread of a one piece construction of textile material.

7. The head-mounted display system of claim 1, wherein the head mounted display unit comprises a display unit housing for housing the display and a user interfacing structure connected to the display unit housing and configured to contact the user's face in use.

8. The head-mounted display system of claim 1, wherein the microstructure of the textile surface is grooved and includes peaks and valleys.

9. The head-mounted display system of claim 8, wherein the valleys include a hydrophobic surface and the peaks include a hydrophilic surface.

10. The head-mounted display system of claim 1, wherein the textile material is configured to allow water to lift debris off of the textile material, and remove the debris as the water moves off of the textile material.

11. The head-mounted display system of claim 1, wherein the textile material includes a surface structure that limits adhesion of debris, and wherein the surface structure is rough and is configured to prevent adhesion of debris.

12. The head-mounted display system of claim 1, wherein the textile material is at least partly coated with a layer of silver that contributes to the microstructure and increases surface roughness, the layer of silver being configured to interfere with a formation of a biofilm on the textile material.

13. The head-mounted display system of claim 1, wherein a photocatalytic layer is formed on the textile material.

14. The head-mounted display system of claim 13, wherein the photocatalytic layer is made of titanium dioxide.

15. The head-mounted display system of claim 13, wherein the photocatalytic layer is configured to be activated when exposed to UV light.

16. The head-mounted display system of claim 1, wherein the head mounted display unit comprises a display unit housing for housing the display and a user interfacing structure connected to the display unit housing and configured to contact the user's face in use, and wherein the user interfacing structure includes the microstructure.

17. The head-mounted display system of claim 1, wherein the textile material includes a nano-membrane.

18. The head-mounted display system of claim 1, wherein:
    the head mounted display unit and/or the positioning and stabilising structure includes an exterior surface configured to face a user's skin or ambient;
    an interior surface positioned opposite the exterior surface and at least partially isolated from the user's skin and the ambient; and
    wherein the exterior surface and/or the interior surface include the self-cleaning textile material.

19. The head-mounted display system of claim 8, wherein the valleys are sized to be smaller than a size of a water molecule.

20. The head-mounted display system of claim 8, wherein the peaks are coated or infused with a material or layer to limit formation of a biofilm, and the valleys are not coated or infused.

21. The head-mounted display system of claim 8, wherein the peaks have different sizes from one another.

22. The head-mounted display system of claim 8, wherein the peaks form a repeating diamond pattern, where a length of the peaks oscillate from a minimum, to a maximum, and back to the minimum.

23. A cleaning receptacle comprising:
a housing defining an interior cavity configured to house the head-mounted display system comprising a head mounted display unit comprising a display, a positioning and stabilising structure configured to hold the head mounted display unit in an operable position on a user's head in use, the positioning and stabilizing structure comprising headgear including at least one strap configured to contact the user's head, in use; and wherein at least one of the head mounted display unit and the positioning and stabilising structure include a self-cleaning textile material, wherein the textile material includes a textile surface with a textile microstructure configured to limit adhesion of debris;
a lid selectively enclosing the interior cavity; and
an inactivation agent configured to inactivate biofilm from the textile material.

24. The cleaning receptacle of claim 23, wherein the interior cavity includes a cleaning module is a UV light source and the inactivation agent is UV light.

25. The cleaning receptacle of claim 23, wherein a photocatalytic layer is formed on the textile material, and wherein inactivation agent is configured to interact with the photocatalytic layer on the textile material.

\* \* \* \* \*